United States Patent
Hakuta et al.

(10) Patent No.: US 7,176,269 B2
(45) Date of Patent: Feb. 13, 2007

(54) CURABLE COMPOSITION AND ITS USE

(75) Inventors: Takashi Hakuta, Ichihara (JP);
Masaaki Kawasaki, Ichihara (JP);
Yoshiharu Kikuchi, Ichihara (JP);
Mitsunao Arino, Ichihara (JP);
Mitsuko Nagai, Ichihara (JP); Hiroaki Sakaguchi, Yokohama (JP); Masaki Sugawara, Yokohama (JP); Masao Kishi, Yokohama (JP); Kaoru Ueno, Yokohama (JP); Takashi Abe, Yokohama (JP); Michio Sekine, Yokohama (JP)

(73) Assignee: Mitsui Chemicals, Inc., Tokyo (JP)

(*) Notice: Subject to any disclaimer, the term of this patent is extended or adjusted under 35 U.S.C. 154(b) by 574 days.

(21) Appl. No.: 10/070,507

(22) PCT Filed: Jul. 24, 2001

(86) PCT No.: PCT/JP01/06375

§ 371 (c)(1),
(2), (4) Date: Mar. 7, 2002

(87) PCT Pub. No.: WO02/08333

PCT Pub. Date: Jan. 31, 2002

(65) Prior Publication Data

US 2003/0096904 A1 May 22, 2003

(30) Foreign Application Priority Data

| Jul. 25, 2000 | (JP) | 2000-224004 |
|---|---|---|
| Jul. 25, 2000 | (JP) | 2000-224005 |
| Jul. 25, 2000 | (JP) | 2000-224006 |
| Jul. 25, 2000 | (JP) | 2000-224007 |
| Jul. 25, 2000 | (JP) | 2000-224008 |
| Jul. 25, 2000 | (JP) | 2000-224009 |
| Jul. 25, 2000 | (JP) | 2000-224010 |
| Jul. 25, 2000 | (JP) | 2000-224011 |
| Jul. 25, 2000 | (JP) | 2000-224072 |
| Jul. 25, 2000 | (JP) | 2000-224073 |
| Jul. 25, 2000 | (JP) | 2000-224074 |
| Jul. 25, 2000 | (JP) | 2000-224075 |
| Jul. 25, 2000 | (JP) | 2000-224076 |
| Jul. 25, 2000 | (JP) | 2000-224077 |
| Jul. 25, 2000 | (JP) | 2000-224078 |
| Jul. 25, 2000 | (JP) | 2000-224224 |
| Jul. 25, 2000 | (JP) | 2000-224225 |
| Jul. 25, 2000 | (JP) | 2000-224228 |
| Jul. 25, 2000 | (JP) | 2000-229035 |
| Jul. 25, 2000 | (JP) | 2000-229037 |
| Jul. 25, 2000 | (JP) | 2000-229038 |
| Jul. 25, 2000 | (JP) | 2000-229039 |
| Jul. 25, 2000 | (JP) | 2000-229040 |
| Jul. 25, 2000 | (JP) | 2000-229042 |
| Jul. 25, 2000 | (JP) | 2000-229043 |

(51) Int. Cl.
C08G 77/60 (2006.01)

(52) U.S. Cl. ........... 528/34; 525/100; 525/104; 525/476; 525/477; 528/18; 528/26; 528/29; 528/35; 528/38; 524/425; 524/435; 524/451

(58) Field of Classification Search ........... 526/279, 526/308, 336; 528/31, 35
See application file for complete search history.

(56) References Cited

U.S. PATENT DOCUMENTS

| 3,503,943 | A | * | 3/1970 | O'Farrell et al. | 525/331.7 |
|---|---|---|---|---|---|
| 4,028,483 | A | * | 6/1977 | Bond et al. | 526/279 |
| 4,043,953 | A |  | 8/1977 | Chang et al. |  |
| 4,153,765 | A | * | 5/1979 | Tsai | 525/370 |
| 4,798,864 | A | * | 1/1989 | Topcik | 525/71 |
| 5,034,490 | A |  | 7/1991 | Jacobine et al. |  |
| 5,171,816 | A |  | 12/1992 | Jacobine et al. |  |
| 5,821,290 | A | * | 10/1998 | Labauze | 524/188 |
| 6,329,460 | B1 | * | 12/2001 | Ishikawa et al. | 524/506 |
| 6,468,583 | B1 | * | 10/2002 | Jackson et al. | 427/117 |
| 6,525,110 | B1 | * | 2/2003 | Yatsuyanagi et al. | 523/212 |
| 6,608,144 | B1 | * | 8/2003 | Nakamura et al. | 525/331.7 |

(Continued)

FOREIGN PATENT DOCUMENTS

CN  1148606 A  4/1997

OTHER PUBLICATIONS

"Organic Chemistry" Francis Carey, copyrighted 1987, McGraw-Hill Book Company, pp. 783-801.*

*Primary Examiner*—Marc S. Zimmer
(74) *Attorney, Agent, or Firm*—Buchanan Ingersoll & Rooney PC

(57) ABSTRACT

The curable composition of the present invention contains (A1) a silyl-containing ethylene/α-olefin/non-conjugated polyene random copolymer rubber which has a structural unit derived from a norbornene compound as the non-conjugated polyene with at least one specific vinyl group at the terminal and contains a specific hydrolyzable silyl group, and (B) a compound, other than the rubber (A1), having a hydroxyl group and/or a hydrolyzable group, e.g., (B1) a compound having a silanol group and/or a compound which can react with moisture to form a compound having a silanol group in the molecule.

This compound improves elongation of the cured product and residual surface tackiness, and, at the same time, is high in curing speed and capable of giving the cured product of high resistance to weather. It is suitable for, e.g., adhesives, tackifiers, paints, sealants, waterproof materials, spray materials, shaping materials and casting rubber materials.

40 Claims, No Drawings

FOREIGN PATENT DOCUMENTS

| | | |
|---|---|---|
| CN | 1203613 A | 12/1998 |
| EP | 0 260 103 A1 | 3/1988 |
| EP | 572927 A1 * | 12/1993 |
| EP | 0 855 426 A1 | 7/1998 |
| EP | 0 896 982 A1 | 2/1999 |
| EP | 1 116 731 A1 | 7/2001 |
| JP | 50-156599 A | 12/1975 |
| JP | 52-073998 | 6/1977 |
| JP | 54-036395 | 3/1979 |
| JP | 57-063351 A | 4/1982 |
| JP | 57-182350 A | 11/1982 |
| JP | 59-071377 A | 4/1984 |
| JP | 61-034066 A | 2/1986 |
| JP | 61-034067 A | 2/1986 |
| JP | 61-060771 A | 3/1986 |
| JP | 62-280217 A | 12/1987 |
| JP | 63-006041 A | 1/1988 |
| JP | 63-047747 B | 9/1988 |
| JP | 64-075567 A | 3/1989 |
| JP | 01-252670 A | 10/1989 |
| JP | 02-000660 A | 1/1990 |
| JP | 02-097562 A | 4/1990 |
| JP | 02-117955 A | 5/1990 |
| JP | 02-185565 A | 7/1990 |
| JP | 02-196842 A | 8/1990 |
| JP | 04-292616 A | 10/1992 |
| JP | 5-112684 A1 * | 7/1993 |
| JP | 07-096648 B | 10/1995 |
| JP | 08-041349 A | 2/1996 |
| JP | 08-041360 A | 2/1996 |
| JP | 09-286895 A | 11/1997 |
| JP | 09-302213 A | 11/1997 |
| JP | 09291116 A * | 11/1997 |
| JP | 10-152584 A | 6/1998 |
| JP | 10-182992 A | 7/1998 |
| JP | 10-316804 A | 12/1998 |
| JP | 11-116832 A | 4/1999 |
| WO | WO 200107490 A1 * | 2/2001 |

* cited by examiner

CURABLE COMPOSITION AND ITS USE

FIELD OF THE INVENTION

The present invention relates to a curable composition containing a silyl-containing ethylene/α-olefin/non-conjugated polyene random copolymer rubber which has a structural unit derived from a norbornene compound as the non-conjugated polyene with a specific terminal vinyl group, and contains a specific hydrolyzable silyl group in the molecule, and also to use of the same.

BACKGROUND OF THE INVENTION (1) A number of methods have been proposed for producing a propylene oxide-based polymer having at least one reactive, functional silicon group in the molecule, as described later, and some of them are already produced industrially. An organic polymer with polyoxy propylene forming as the main chain and functional methoxy silyl group bound to the terminal, e.g., the one produced and sold by Kaneka Corporation (MS Polymer™), may be insufficient in elongation of the cured product and have residual tackiness on the surface, depending on its purposes, due to the effects of the composition and service conditions.

Japanese Patent Laid-Open Publication No.34066/1986 discloses a composition of improved tensile characteristics, characterized in that it comprises a propylene oxide-based polymer having at least one reactive, functional silicon group in the molecule, a compound having one silanol group in the molecule, and/or a compound which can react with water to form a compound having one silanol group in the molecule. Japanese Patent Laid-Open Publication No.34067/1986 discloses a curable, elastic composition, characterized in that it comprises an organic vinyl-based polymer having at least one reactive, functional silicon group in the molecule, a compound having one silanol group in the molecule, and/or a compound which can react with water to form a compound having one silanol group in the molecule.

Therefore, there are demands for a curable elastic composition (curable rubber composition) improved in elongation of the cured product and in residual tackiness, and, at the same time, high in curing speed and capable of giving the cured product of high resistance to weather.

(2) It is known that a saturated hydrocarbon-based polymer (which is essentially free of an unsaturated C—C bond, except aromatic ring) having at least one reactive silicon group in the molecule shows interesting nature that it is crosslinked even at room temperature by the hydrolysis of the reactive silicon group with moisture or the like, followed by formation of the siloxane bond to form a rubber-like cured product, wherein the "reactive silicon group" means the silicon-containing group which has a hydrolyzable group bound to the silicon atom and can form the siloxane bond.

Such a saturated hydrocarbon-based polymer has the main chain composed of a saturated hydrocarbon, which is resistant to heat-or light-caused deterioration, can give a cured product excellent in resistance to heat and weather, and gas-barrier property. The saturated hydrocarbon-based polymer, therefore, can find uses, e.g., sealant for laminated glass and elastic sealant for buildings.

A silanol condensing catalyst can be used for crosslinking/curing a polymer having a reactive silicon group. Use of this type of catalyst can reduce curing time. In particular, a sealant for laminated glass, a product which must be delivered in a very short procurement period, is required to be cured very quickly. As such, a strong, silanol-condensing catalyst is required for the above purposes.

Japanese Patent Laid-Open Publication No. 41360/1996 discloses a curable composition which uses a compound represented by the general formula $Q_2Sn(OZ)_2$ or $[Q_2Sn(OZ)]_2O$ (wherein, Q is a monovalent hydrocarbon group of 1 to 20 carbon atoms; and Z is an organic group having a functional group which can form a coordinate bond with Sn within its structure or a monovalent hydrocarbon group of 1 to 20 carbon atoms) serving as the silanol condensing catalyst to accelerate curing of a saturated hydrocarbon-based polymer having a reactive silicon group. These curing catalysts tend to accelerate curing of the saturated hydrocarbon-based polymer faster than a divalent tin-based curing catalyst (e.g., tin octylate) or tin carboxylate catalyst (e.g., dibutyl tin dilaurate). However, curing time is required to be still shorter for a sealant for laminated glass, a product which must be delivered in a very short procurement period.

Several additives have been proposed to accelerate the silanol condensation for a saturated hydrocarbon-based polymer having a reactive silicon group. For example, Japanese Patent Laid-Open Publication No. 97562/1990 discloses a curable composition which uses "a polyhydroxy-monosilane having two or more silicon-bonded hydroxyl groups in the molecule." Japanese Patent Laid-Open Publication No. 196842/1990 discloses a curable composition which uses "a silicon compound, other than polysiloxane, having two or more silicon-bonded hydroxyl groups and two or more silicon atoms in the molecule." Incorporation of one of these silanol compounds does improve curability, which, however, is still insufficient, and a more effective additive is in demand.

A sealant for laminated glass is required to have non-primer adhesion, i.e., to be fast adhesive to a variety of objects in the absence of a primer. More recently, the above property has been required not only for sealant for laminated glass but also for sealant for other purposes, e.g., by elastic sealant for buildings, to improve application efficiency by dispensing with a primer. However, the sealant which uses the above-described saturated hydrocarbon-based polymer containing a reactive silicon group is insufficient in adhesion in the absence of a primer.

Japanese Patent Laid-Open Publication No. 116832/1999 describes that the inventors have found, after having extensively studied to solve the above problems, that the composition can have improved curing speed and adhesion without causing any problem, e.g., deteriorated properties of the cured product, when incorporated with a specific compound, reaching the invention.

The invention disclosed by the above publication relates to a curable composition of improved curing speed and adhesion, characterized in that it comprises (A) a saturated hydrocarbon-based polymer having at least one reactive silicon group, (B) a tetravalent tin compound, and (C) a silicon compound represented by the general formula $R^1{}_aSi(OR^2)_{4-a}$ (wherein, $R^1$ and $R^2$ are each a hydrocarbon group of 1 to 20 carbon atoms, which may be substituted or not substituted; and "a" is an integer of 0 to 3), in particular, comprising (A) 100 parts by weight of a saturated hydrocarbon-based polymer having at least one reactive silicon group in the molecule and molecular weight of 500 to 50,000, (B) 0.1 to 20 parts by weight of a tetravalent tin alcoholate, and/or (C) 0.01 to 20 parts by weight of a silicon compound represented by the general formula $R^1{}_aSi(OR^2)_{4-a}$ (wherein, $R^1$ is an aryl group of 1 to 20 carbon atoms; R² is a hydrocarbon group of 1 to 20 carbon atoms, which may be substituted or not substituted; and "a" is an integer of 0 to 3).

The inventors of the present invention have double-checked the curable composition described in the above publication, to confirm that its curing speed is admittedly improved but still insufficient.

Therefore, there are demands for a curable rubber composition still higher in curing speed, and more excellent in adhesion to a variety of objects and resistance to weather.

(3) One example of the reactive silicon group is represented by the formula —Si(OCH$_3$)$_3$ and hydrolyzable with moisture in air into —Si(OH)$_3$, which reacts with another reactive silicon group through silanol condensation to form a siloxane bond (Si—O—Si). Therefore, the polymer containing a reactive silicon compound can be crosslinked/cured in the presence of moisture even at room temperature. Of these polymers, an oxyalkylene polymer with, e.g., polyoxypropylene in the main chain skeleton, has been widely used as sealant for buildings and other industrial purposes, because of its characteristics, e.g., liquid at room temperature and curable into a rubber elastomer. However, when it is used to fill a joint (i.e., gap between the construction material, e.g., wall material) or the like, it leaves residual tackiness on the cured product surface, even after it is cured, deteriorating the outer appearances resulting from contamination of the surface with dust or the like. A paint may be applied to the cured product surface. In this case, the paint is not always sufficiently adhesive to the sealant surface, in particular when a solvent-based paint is used.

Japanese Patent Laid-Open Publication No. 302213/1997 discloses a curable composition comprising (a) an oxyalkylene polymer containing at least one reactive silicon group in the molecule, and (b) a silicon compound containing at least one amino group and at least one trialkyl siloxy group in the molecule. It is claimed to leave residual tackiness to only a limited extent, after it is cured, and to be highly adhesive to a paint.

Nevertheless, improvements of these characteristics are still insufficient, and more improvements in curing speed and resistance of the cured product to weather are demanded.

Therefore, there are demands for a curable composition high in curing speed, leaving little residual tackiness on the cured product surface, after it is cured, highly resistant to weather, showing high adhesion between a paint and sealant surface, when the former is applied, and useful for sealant, primer or the like.

(4) RTV (room temperature vulcanizable) silicone rubber is well known as a polymer curable even at low temperature (room temperature) to form a rubber-like material, and has been used for sealants for buildings and a variety of formed materials. However, RTV silicone rubber, having polysiloxane in the main chain, is expensive and insufficient in some properties.

Therefore, a rubber-based organic polymer curable at room temperature like RTV silicone rubber is proposed by, e.g., Japanese Patent Laid-Open Publication No. 156599/1975. It has a rubber-based organic polymer instead of polysiloxane in the main chain.

The polymer has a functional, reactive silicon group which is curable by forming the siloxane bond and is curable even at room temperature, like RTV silicone rubber, to form a rubber-like material by the following reaction. It is cheaper than polysiloxane, and has characteristics which polysiloxane lacks.

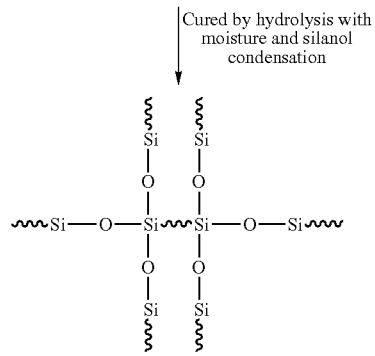

wherein, X' is a hydrolyzable group.

Rubber is generally required to have tensile characteristics of low modulus and high elongation, and so is a rubber-based organic polymer having the reactive silicon group.

Japanese Patent Laid-Open Publication Nos. 34066/1986 and 34067/1986 propose incorporation of monovalent silanol compound or derivative thereof as the method to improve modulus and elongation of a cured rubber-based organic polymer having a reactive silicon group.

The compound disclosed by each of the above publications may not always improve modulus and elongation sufficiently, and may leave problems, even when modulus and elongation are improved, e.g., insufficient curing of the cured product to leave tackiness on the surface, insufficient properties for formed materials or sealants, and poor storage stability of the composition. In other words, few conventional curable compositions containing a rubber-based organic polymer having a reactive silicon group satisfy all of the requirements of excellent modulus and elongation of the cured product, free of residual tackiness on the cured product surface, and excellent storage stability of the composition.

Japanese Patent Publication No. 96648/1995 discloses a combination of rubber-based organic polymer and organosiloxane compound, the former having a functional, reactive silicon group crosslinking-cured by the siloxane bond. However, it is still insufficient in curing speed and resistance to weather, among others.

Therefore, there are demands for a curable composition containing a rubber-based organic polymer having a reactive, functional silicon group, which is rapidly cured with moisture, excellent in tensile-related properties, capable of giving a rubber-like elastomer free of residual tackiness on the surface, and improved in resistance to weather and storage stability.

(5) It is already known that a vinyl-based resin containing a hydrolyzable silyl group is hydrolyzed at normal temperature with moisture in air to form a resin of dense network structures, excellent in, e.g., gloss, resistance to weather, discoloration and solvent, hardness, and adhesion to inorganic base materials.

A vinyl-based resin containing a hydrolyzable silyl group can find wide uses, e.g., paint, adhesive, coating material, sealant and binder, because of its favorable characteristics described above.

However, a vinyl-based resin containing a hydrolyzable silyl group is not always satisfactory in adhesion to organic base materials. For example, a paint for repairing automobiles is required to be adhesive to coating films of various conventional paints, in particular to melamine acrylic and melamine alkyd paints.

One of the known methods to improve adhesion to melamine acrylic and melamine alkyd paints is incorporation of an amine-based silane coupling agent or modification thereof, which, however, may cause problems, e.g., reduced storage stability of the vinyl-based copolymer containing a hydrolyzable silyl group and its tendency to coloration.

Japanese Patent Laid-Open Publication No. 75567/1989 discloses a resin composition curable at room temperature, comprising (A) 100 parts by weight of a vinyl-based polymer containing a silyl group, with the main chain essentially composed of a vinyl-based polymer chain and at least one silicon atom bonded to a hydrolyzable group at the terminal or in the side chain in the molecule, (B) 0.1 to 100 parts by weight of a specific silane compound, and (C) 0 to 20 parts by weight of a curing catalyst. It describes that vinyl-based copolymer containing a hydrolyzable Silyl group can have greatly improved adhesion to melamine alkyd paint or melamine acrylic paint, when incorporated with a specific silane compound, and that the resin composition curable at room temperature is found to have improved properties, e.g., hardness, and resistance to solvent and contamination of the cured coating film.

However, the composition is not always satisfactory in resistance to weather. The publication is completely silent on ethylene/α-olefin/non-conjugated polyene random copolymer rubber.

Therefore, there are demands for a rubber composition curable at room temperature, high in curing speed, excellent in resistance to weather, and capable of giving its highly adhesive cured product.

(6) A compound having a reactive silyl group is used for various purposes, e.g., paint, coating material, silane coupling agent, adhesive for rubber and sealant, for reactivity of its silyl group. In particular, the compound having a condensed silyl group curable at room temperature, having a reactive group, e.g., hydroxy, acetoxy, oxime or alkoxy group, has found wide applications.

The compound having a condensed silyl group curable at room temperature is hydrolyzed normally in the presence of a curing catalyst, although the hydrolysis proceeds with moisture in air in the absence of the catalyst. The well-known curing catalysts include organotin compounds, e.g., dibutyl tin dilaurate and dibutyl tin dimaleate. However, they are slow in curing speed, showing little curing acceleration effect under heating at low temperature of around 60 to 80° C., and still low curing speed even at baking temperature of 120 to 300° C. Therefore, there are demands for a catalyst higher in curing speed than the conventional organotin compound. There are problems to be solved when the catalyst is used for repairing automobiles and coating bridges, which need a quick-drying paint, and for the purposes which need a simple coating system, e.g., production lines for new vehicles, curtain walls and precoated metals.

Japanese Patent Laid-Open Publication No. 660/1990 discloses a curable composition containing, as the effective ingredients;

(A) at least one type of compound containing a silyl group selected from the group consisting of polyester having at least one type of specific silyl group, vinyl-based copolymer with acrylic or methacrylic acid, diallyl phthalate-based compound and diallyl phthalate-based copolymer, (B) an amine compound selected from the group consisting of aliphatic amine, alicyclic amine, modified cycloaliphatic polyamine and ethanol amine, (C) a silane coupling agent, represented by the general formula $Y_3$—Si-Z, wherein Y is an alkoxy group; and Z is an alkyl group containing a functional group selected from the group consisting of an amino group which may be substituted with an aminoalkyl group or mercapto group), and (D) a lacquer-based paint, an acryl lacquer-based paint, an acrylic resin-based paint, a thermosetting acrylic-based paint, an alkyd paint, a melamine paint, an epoxy-based paint, or organopolysiloxane.

The publication also describes that a silyl-containing compound having a hydrolyzable group can be cured faster, in particular under heating, when incorporated with a catalyst quantity of a specific amine compound and silane coupling agent, and further with a lacquer-based, acryl lacquer-based, acrylic resin-based, thermosetting acrylic-based paint, alkyd paint, melamine paint, epoxy-based paint, or organopolysiloxane, without causing any adverse effect on properties of the cured product of lacquer-based, acryl lacquer-based, acrylic resin-based, thermosetting acrylic-based paint, alkyd paint, melamine paint, epoxy-based paint, or organopolysiloxane.

However, the inventors of the present invention have double-checked the composition to confirm that it is still insufficient in curing speed and unsatisfactory in resistance to weather. It also describes a silyl-containing compound having a hydrolyzable group, but is completely silent on ethylene/α-olefin/non-conjugated polyene random copolymer rubber.

Therefore, there are demands for a curable rubber composition, easily cured with moisture in air at room temperature or under heating, and at high speed, and excellent in resistance to weather of the cured product.

(7) Japanese Patent Laid-Open Publication No. 73998/1977, for example, discloses an oxyalkylene-based polymer having a silicon-containing group with hydroxyl and/or a hydrolyzable group bonded to the silicon atom, and crosslinkable by forming the siloxane bond (such a silicon-containing group is here in after referred to as reactive silicon group). It is typically represented by the following general formula:

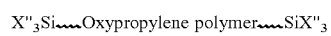

wherein, X" is a hydrolyzable group, e.g., methoxy group.

An oxyalkylene-based polymer having a reactive silicon group is cured at room temperature after forming the siloxane bond (Si—O—Si) between the polymer molecules by the action of moisture in air, as is the case with a silicon rubber curable at room temperature, to form a rubber-like cured product. The cured product has been used for, e.g., sealant and adhesive, because of its excellent properties, e.g., elongation, strength and adhesion.

The rubber-like cured product, when to be used for sealant or the like, is required to have various properties of which tensile-related characteristics and adhesion to an object are more important. The tensile-related characteristics include modulus, elongation and breaking strength, and low modulus and high elongation as the characteristics of rubber are frequently required. Adhesion includes adhesive strength to an object and its resistance to weather, and high adhesive strength and high resistance to weather are required. In particular, it is frequently used as a sealant for buildings for transparent materials, e.g., glass, and is required to have high resistance of adhesive strength to weather, especially while it is irradiated with sunray.

Japanese Patent Laid-Open Publication No. 34066/1986 proposes a composition comprising an oxyalkylene-based polymer having a reactive silicon group and a compound having a silanol group in the molecule and/or a compound having a hydrolyzable silicon group in its molecule reacting with moisture to form a compound with a silanol group in the molecule (hereinafter referred to as monovalent silanol-based compound), as the one which gives a low-modulus cured product.

Japanese Patent Laid-Open Publication No. 182350/1982 discloses use of a compound having amino group and a silicon atom with a hydrolyzable group, e.g., γ-aminopropyltrimethoxysilane ($H_2NCH_2CH_2CH_2Si(OCH_3)_3$) or γ-aminopropylmethyldimethoxysilane ($H_2NCH_2CH_2CH_2Si(CH_3)(OCH_3)_2$) bonded to the silicon atom, to improve adhesion of the cured product of oxyalkylene-based polymer having a reactive silicon group.

However, a composition containing a compound having a silicon atom to which 3 hydrolyzable groups are bonded, e.g., γ-aminopropyltrimethoxysilane, has a disadvantage of deteriorated effect of the monovalent silanol-based compound, due to increased modulus of its cured product. On the other hand, a composition containing a compound having a silicon atom to which 2 hydrolyzable groups are bonded, e.g., γ-aminopropylmethyldimethoxysilane, has a disadvantage of insufficient resistance of its adhesive strength to weather, although its cured product scarcely has an increased modulus.

Japanese Patent Laid-Open Publication No. 117955/1990 proposes a composition comprising an oxyalkylene-based polymer having a reactive silicon group and monovalent silanol-based compound, incorporated with a compound having amino group and a silicon atom to which 2 hydrolyzable groups are bonded, and a small quantity of a compound having amino group and a silicon atom to which 3 hydrolyzable groups are bonded, as the curable composition of improved modulus-related properties, adhesive strength to an object and resistance of adhesive strength to weather. However, the curable product of the above composition is still insufficient in resistance to weather, leaving room for further improvement.

Therefore, there are demands for a curable composition high in curing speed, giving a weather-resistant cured product, and suitable for adhesive, sealant or the like.

(8) Japanese Patent Laid-Open Publication No. 73998/1977, for example, discloses an oxyalkylene-based polymer having a silicon-containing group with hydroxyl and/or a hydrolyzable group bonded to the silicon atom, and crosslinkable by forming the siloxane bond (such a silicon-containing group is hereinafter referred to as reactive silicon group). It is typically represented by the following general formula:

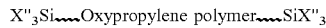

X"$_3$Si—Oxypropylene polymer—SiX"$_3$ wherein, X" is a hydrolyzable group, e.g., methoxy group.

An oxyalkylene-based polymer having a reactive silicon group is cured at room temperature after forming the siloxane bond (Si—O—Si) between the polymer molecules by the action of moisture in air, as is the case with a silicon rubber curable at room temperature, to form a rubber-like cured product. The cured product has been used for, e.g, sealant and adhesive, because of its excellent properties, e.g., elongation, strength and adhesion.

In general, the polymer is frequently used as a composition incorporated with a filler for, e.g., cost reduction. However, incorporation of a filler substantially increases the viscosity of the composition, and use of a plasticizer is technically essential to sufficiently reduce the viscosity to make the composition processable by the common method.

In general, use of a filler or plasticizer causes various problems, of which deteriorated storage stability, especially that leading to decreased curing speed of the stored composition, is more serious.

Therefore, there are demands for a curable composition high in curing speed and storage stability (especially quickly cured when it is used, even after being stored for extended periods), and giving a weather-resistant cured product.

(9) A vinyl-based resin containing silyl group is characterized in that it is curable at room temperature with moisture, in particular that in air, which opens up wide applicable areas for the composition. However, its disadvantages of short pot life and insufficient resistance to weather have sometimes limited its applications.

Japanese Patent Publication No. 47747/1988 proposes an invention relating to a vinyl-based resin composition. The vinyl-based resin (A) containing silyl group for the composition has at least one silyl group represented by

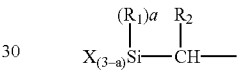

(wherein, $R_1$ and $R_2$ are each hydrogen or monovalent hydrocarbon group selected from the group consisting of alkyl, aryl and aralkyl group of 1 to 10 carbon atoms; X is a halogen or a group selected from the group consisting of alkoxy, acyloxy, aminoxy, phenoxy, thioalkoxy and amino group, at least one being alkoxyl or phenoxy group; and "a" is an integer of 0 to 2) in the molecule, and also has a molecular weight of 1,000 to 20,000.

The publication describes that the curable composition is stable, and comprising (A) the above vinyl-based resin, (B) an alcohol and/or alkyl orthoformate, and (C) an alkoxysilane compound. It also describes that the invention relates to a composition containing a compound which contains a silyl group at the terminal or in the side chain. It is curable at room temperature with moisture, in particular that in air, which is characteristic of a vinyl-based resin containing a silyl group, and, at the same time, is characterized by stability of long pot life. As such, it is very suitable as a resin for solventless or high solid content type paint, which has been attracting much attention as the non-polluting, energy-saving type paint. In particular, the resin of the invention, the publication describes, has a lower molecular weight than the conventional vinyl-based resin, which brings about a great advantage that it is applicable more easily to a non-polluting or high solid content type paint. The vinyl-based resin containing a silyl group for the composition of the invention can be easily produced by, e.g., reacting a vinyl-based resin having a C—C double bond with a hydrosilane compound in the presence of a catalyst of Group VIII transition metal.

However, the inventors of the present invention have double-checked the curable composition to confirm that it is still insufficient in curability at room temperature and resistance to weather, although it admittedly has the above-described characteristics.

Therefore, there are demands for a curable rubber composition high in storage stability and curing speed, and giving a highly weather-resistant cured product.

(10) A silicon-containing group having a hydrolyzable group bonded to the silicon atom and crosslinkable by forming a siloxane bond (such a group is hereinafter referred to as reactive silicon group) may be represented by —Si(OCH$_3$)$_3$, which is a well-known functional group.

This functional group is hydrolyzed with moisture, e.g., that in air, into —Si(OH)$_3$ or the like, which reacts with another reactive silicon group to form a siloxane bond (Si—O—Si) by silanol condensation.

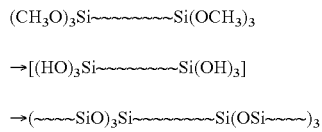

Therefore, a polymer having a reactive silicon group can be crosslinked/cured even at room temperature in the presence of moisture. Of these polymers, the one with a rubber-based main chain skeleton has characteristics of being highly viscous liquid at room temperature and being cured into a rubber elastomer, and is widely used as sealant for buildings and other industrial purposes. Such sealant is applied to a gap (joint) of a construction material, to fill up and keep it water-and air-tight, after it is cured.

Of these rubber-based polymers, a saturated hydrocarbon-based polymer, e.g., polyisobutylene, can yield a cured product excellent in resistance to weather and heat, and gas-barrier property. High gas-barrier property means high moisture-blocking property, which is a disadvantage for a polymer to be cured with moisture in air, because it needs a fairly long time, a week or more, to be thoroughly cured inside, although cured soon on the surface. Japanese Patent Laid-Open Publication No. 185565/1990 proposes a composition which is dispersed with a hydrate of metallic salt to be quickly cured at room temperature to deep inside.

The polymer having a reactive silicon group is frequently used after being incorporated with a silanol condensing catalyst (curing catalyst), filler, plasticizer or the like to form the curable composition. The curable compositions may fall into two general categories, one-liquid and two-liquid types. The one-liquid type curable composition is a liquid containing all of the above-described additives. It is convenient in that it needs no mixing procedure before use, but must be kept completely dehydrated to prevent curing before use. On the other hand, two-liquid type curable composition is less convenient in that it needs the mixing procedure before use, but not necessarily kept dehydrated as completely as the one-liquid type, because the polymer having a reactive silicon group will not be cured easily in the absence of the silanol condensing catalyst, even when moisture is present to some extent.

A hydrate of metallic salt, described above, cannot be used as the moisture source for curing the polymer which is used to produce a one-liquid type curable composition, because curing of the polymer will start as soon as it is mixed with a silanol condensing catalyst and the hydrate.

Titanium and tin compounds are frequently used as silanol condensing catalysts. Many of them are decomposed in the presence of moisture, and it is considered that the silanol condensing catalysts are decomposed by a hydrate of metallic salt. Therefore, a hydrate of metallic salt, when used as the moisture source, is added to a curable composition immediately before the composition is used (cured), or to the major ingredient of a two-liquid type composition, i.e., that containing the polymer component.

However, it is inconvenient to add only the hydrate of metallic salt immediately before the composition is used (cured). Moreover, incorporation of the hydrate of metallic salt in the major ingredient may cause another problem i.e., increased viscosity of the major ingredient as a result of curing of the polymer having a reactive silicon group, although to a limited extent.

A sealant is frequently incorporated with a silane coupling agent as the tackifier. However, a silane coupling agent is liable to react with moisture, and cannot be added as the additive neither to the major ingredient nor hardening agent. For example, a silane coupling agent such as γ-isocyanate propyltrimethoxysilane (ONCCH$_2$CH$_2$CH$_2$Si(OCH$_3$)$_3$) reacts with a hydrate of metallic salt when added to the major ingredient, and is decomposed by the silanol condensing catalyst when added to the hardening agent, with the result that it will no longer work as the silane coupling agent for, e.g., increasing tackiness.

Japanese Patent Laid-Open Publication No. 182992/1998 discloses a curable composition. The object of the invention is to provide a curable composition of a saturated hydrocarbon-based polymer and a hydrate of metallic salt as the moisture source, the former having a silicon-containing group, e.g., a hydrolyzable group of silicon to which moisture-curable polyisobutylene is bonded, and crosslinkable by forming the siloxane bond, as the composition showing no increase in viscosity while it is being stored. Another object of the invention is to provide a curable composition which can incorporate a compound, e.g., that, like a silane coupling agent, having a reactive silicon group readily reactive with moisture. The invention provides a two-liquid or multi-liquid type curable composition with hydrate of metallic salt incorporated in a hardening agent containing a silanol condensing catalyst. In short, the invention provides a two-liquid and multi-liquid type curable compositions composed of at least two types of liquids of (A) a major ingredient of saturated hydrocarbon-based polymer having a hydrolyzable group bonded to silicon, and a silicon-containing group crosslinkable by forming the siloxane bond, and (B) a hardening agent containing a silanol condensing catalyst and hydrate of metallic salt.

However, there is still room for improvement in the isobutylene-based polymer as the saturated hydrocarbon-based polymer of the invention, because of its insufficient curing speed and resistance to weather.

The publication is silent on a multi-liquid type curable rubber composition, composed of at least two types of liquids, containing a silyl-containing ethylene/α-olefin/non-conjugated polyene random copolymer rubber which has a structural unit derived from a norbornene compound as the non-conjugated polyene with a specific terminal vinyl group, and contains a specific hydrolyzable silyl group in the molecule.

Therefore, there are demands for a curable rubber composition which incorporates a hydrate of metallic salt as the moisture source, showing no increase in its viscosity while being stored, high in curing speed and resistance to weather, and can incorporate a compound having a reactive silicon group readily reactive with moisture, e.g., a silane coupling agent.

(11) Japanese Patent Laid-Open Publication No. 6041/1988 discloses an isobutylene-based polymer having, at the molecular terminal, a silicon-containing group with hydroxyl or a hydrolyzable group bonded to the silicon atom and crosslinkable by forming the siloxane bond (such a group is hereinafter referred to as reactive silicon group). It is curable even at normal temperature with moisture into a rubber-like cured product excellent in properties, e.g., resistance to heat, water and weather.

However, the cured product necessarily has a long molecular chain to have good rubber elasticity, which invariably increases its viscosity and makes it difficult to handle. This disadvantage may limit its use, due to difficulty in application. Decreasing the viscosity of the polymer to avoid the above problems will invariably cause insufficient elongation-related properties of the polymer. The high moisture-barrier property of the cured isobutylene-based polymer may deteriorate its curability, because of insufficient supply of moisture necessary for curing.

Japanese Patent Laid-Open Publication No. 252670/1989 proposes, in order to solve the above problems, a curable resin composition comprising a saturated hydrocarbon-based polymer having at least one silicon-containing group with hydroxyl or a hydrolyzable group bonded to the silicon atom and crosslinkable by forming the siloxane bond, and also an organosilicon polymer. The composition, however, cannot always solve the above problems sufficiently, and is insufficient in resistance to weather and curing speed of the cured product.

Therefore, there are demands for a composition low in viscosity, good in workability, sufficient in curing speed, excellent in, e.g., resistance to weather, heat and water, and capable of giving a rubber-like cured product high in strength and elongation (low modulus of elasticity).

(12) The main chain skeleton of an ethylene/α-olefin/non-conjugated polyene random copolymer rubber is composed of a structural unit derived from ethylene and that from α-olefin, and a small quantity of copolymerized non-conjugated polyene-based monomer as the third component to introduce the unsaturated C—C bond necessary for crosslinking. As a result, it is used as a vulcanizable elastomer which can give the vulcanized product much higher in resistance to heat and weather than a diene-based elastomer, e.g., natural rubber, polyisoprene or polybutadiene. However, resistance to weather of the vulcanized product is still damaged by the unsaturated C—C bond for vulcanization, although it has a significantly smaller quantity of the unsaturated C—C bond than a diene-based elastomer.

Viewed from vulcanization speed, it is slow due to insufficient quantity of the unsaturated C—C bond, limiting speed of the production line for vulcanization. This should be one of the causes for a cost increase.

Therefore, there are demands for a rubber composition high in vulcanization speed, improved in resistance to weather and excellent in mechanical strength, while keeping the various favorable characteristics of an ethylene/α-olefin/non-conjugated polyene random copolymer rubber, e.g., excellent resistance to heat and chemicals of the vulcanized product.

(13) A polymer having a hydrolyzable silyl group (a silicon-containing group having hydroxyl or a hydrolyzable group bonded to the silicon atom, and capable of forming the siloxane bond) is crosslinked/cured in the presence of moisture, and hence can be used as a curable composition. Of these polymers, the one with polyether serving as the main chain skeleton is generally known as a modified silicone, and has been widely used for sealant or the like.

A mixture of a polymer having a hydrolyzable silyl group and a curable resin which is compatible with the polymer and curable through a different curing reaction shows phase separation when cured, and can form cured products of various layered structure. Properties of a cured product obtained from the composition composed of a polymer having a hydrolyzable silyl group and epoxy resin compatible therewith greatly depend on cohesive force of the matrix. A method is proposed for incorporating a silane coupling agent which controls production of such cured product and for changing its content, as disclosed by Japanese Patent Laid-Open Publication No. 292616/1992.

The above-described curable composition can be controlled for the layered structure of the cured product. Therefore, the curable resin composition can be improved in modulus of elasticity and tensile shear strength, because size of the dispersed epoxy resin particles and matrix strength can be changed over a wide range. However, the resin composition is still insufficient in curing speed and resistance to weather.

Therefore, there are demands for a rubber composition high in adhesion and curing speed, and giving various types of cured products of high resistance to weather and other characteristics, e.g., a cured product of greatly varying layered structures, another cured product of low modulus of elasticity and high elongation, or still another cured product of high modulus of elasticity and tensile shear strength realized by decreasing size of the dispersed epoxy resin particles and increasing epoxy resin content of the matrix.

(14) A rubber-based organic polymer having a hydrolyzable silyl group, although showing an interesting characteristic that it can be cured even at room temperature into a rubber elastomer, normally has a disadvantage of insufficient strength of the cured product, which limits its applicable areas.

Japanese Patent Laid-Open Publication No. 280217/1987 discloses a curable composition composed of a rubber-based organic polymer having a hydrolyzable silyl group and epoxy resin, incorporated with two types of silicon compounds, one having both a functional group reactive with an epoxy group and hydrolyzable silicon group in the molecule, and the other having at least two hydroxyl groups bonded to a silicon atom in the molecule, in order to overcome the disadvantages of the conventional cured rubber-based organic polymer having a hydrolyzable silyl group.

Incorporation of these silicon compounds into the curable composition improves insufficient strength of the rubber-based organic polymer having a hydrolyzable silicon group, and gives the cured product of high strength irrespective of moisture quantity. The composition, however, still has disadvantages of insufficient curing speed and resistance of the cured product to weather.

Therefore, there are demands for a curable rubber composition improved in toughness and strength, giving the cured product of high strength irrespective of moisture quantity, and, at the same time, high in curing speed and giving the cured product of high resistance to weather.

(15) A saturated hydrocarbon-based polymer containing a reactive silicon group is crosslinked by hydrolysis of the reactive silicon group with moisture proceeding even at room temperature and subsequent formation of the siloxane bond, to give a rubber-like cured product. As such, it is used as sealant for laminated glass and elastic sealant for buildings.

The elastic sealant for buildings is generally incorporated with a filler of calcium carbonate, e.g., gelatinized calcium carbonate or limestone powder. The composition incorporated with gelatinized calcium carbonate for sealants is high in thixotropy, has less thready, and hence is high in workability. The cured product is suitable for sealants for buildings, because of its tensile-related properties of low modulus and high elongation.

Limestone powder, on the other hand, is used as a bulking agent.

A sealant for laminated glass is required to have a sufficiently high modulus and strength to support the glass, unlike a sealant for buildings which is required to have a low modulus and high elongation. It is therefore essential for a sealant for laminated glass to have mechanical properties, e.g., strength and hardness, and, at the same time, good workability. However, a composition containing a saturated hydrocarbon-based polymer having a reactive silicon group cannot simultaneously satisfy these properties.

Japanese Patent Laid-Open Publication No. 316804/1998 discloses a saturated hydrocarbon-based polymer having a reactive silicon group incorporated with calcium carbonate and talc as the curable composition that can solve the problem of inclusively satisfying these properties. However, the proposed composition may not always sufficiently satisfy workability and mechanical properties. Moreover, it is not always satisfactory in curing speed and resistance to weather of the cured product.

Therefore, there are demands for a rubber composition well-balanced between workability and mechanical properties of the cured product, sufficient in curing speed and resistance to weather of the cured product, and suitable as a sealant for laminated glass.

(16) A curable polymer is a liquid or the like moldable before curing, giving a solid, e.g., rubber-like one, of high strength when cured. The curable polymer is widely used for adhesives and sealants. The adhesives and sealants for glass and plastics are required to have an additional property of resistance to light, because the surface for which they are used is irradiated with light, unlike the ones which are used for opaque materials. They completely lose the function of adhesive or sealant, when deteriorated with light, because the adhesive layer will peel off. Adhesion is specifically referred to as weather-resistant adhesion, when it is required to have resistance to light as an important property for transparent materials. An adhesive or sealant for buildings, in particular, is required to retain the additional property of weather-resistant adhesion for extended periods. The adhesion layer is very thin and will lose weather-resistant adhesion, when it is made of a material insufficient in resistance to weather to any extent. There are not many materials which show excellent weather-resistant adhesion.

A saturated hydrocarbon-based polymer having a crosslinkable silicon group falling into the category of curable polymers is cured, e.g., by the actions of moisture in air. When cured, it will show favorable characteristics, e.g., high resistance to weather and heat, adhesion in the presence of water, non-polluting nature, and low moisture permeability. Moreover, it shows good workability and is sprayed smoothly, because it can be fluid to have an adequate viscosity and structural viscosity (thixotropy) at room temperature. In addition, the polymer is not malodorous, giving off little odor while being handled, and particularly suitable for sealants (Japanese Patent Laid-Open Publication No. 6041/1988). Japanese Patent Laid-Open Publication No. 198673/1989 describes that the above polymer can be used as a sealant also for transparent material, e.g., laminated glass. When used for laminated glass, it brings about the merits of increasing line production speed and showing its effect by single sealing, instead of double sealing required for the conventional one, because it can be quickly cured under heating. It can be also used for laminated glass double-sealed by the common method, needless to say.

It is found, however, when a curable composition containing a saturated hydrocarbon-based polymer having a crosslinkable silicon group is used for some transparent materials, in particular surface-treated glass such as heat ray reflective type, the cured composition may not always show sufficient weather-resistant adhesion.

Japanese Patent Laid-Open Publication No.286895/1997 proposes a curable composition containing a saturated hydrocarbon-based polymer having a crosslinkable silicon group incorporated with a combination of specific light stabilizer and silane coupling agent, as the one with improved weather-resistant adhesion for surface-treated glass. However, its cured product is still insufficient in resistance to weather, and there is room for improvement in its curing speed.

Therefore, there are demands for a curable composition high in curing speed, giving its cured product of high resistance to weather, and suitable for adhesives and sealants.

(17) A polyalkylene oxide-based polymer, e.g., polypropylene oxide-based polymer, having a reactive silicon group at the terminal of the molecule is already known. It has a characteristic of being cured with moisture even at room temperature into a rubber-like solid. However, the polymer has disadvantages of insufficient resistance to heat, water and weather.

Therefore, there are demands for a curable rubber composition containing, as the main ingredient, a silyl-containing rubber containing a specific hydrolyzable silyl group in the molecule, and giving the cured product excellent in resistance to weather and heat.

(18) A saturated hydrocarbon-based polymer having at least one reactive silicon-containing group, with hydroxyl or a hydrolyzable group bonded to the silicon atom and crosslinkable by forming the siloxane bond, is known to show interesting nature that it is crosslinked with moisture or the like even at room temperature by forming the siloxane bond accompanied with the hydrolysis or the like of the reactive silicon group, to form a rubber-like cured product. Therefore, it is useful for, e.g., sealants for laminated glass and elastic sealants for buildings.

A sealant for laminated glass is required to have non-primer adhesion, i.e., to be fast adhesive to various objects in the absence of a primer. More recently, the above property has been required not only for sealant for laminated glass but also for sealant for other purposes, e.g., by elastic sealant for buildings, to improve application efficiency by dispensing with a primer. However, the sealant which uses the above-described saturated hydrocarbon-based polymer containing a reactive silicon group is insufficient in adhesion in the absence of a primer.

Moreover, a sealant for laminated glass, in particular that for the glass fringe, is required to be excellent especially in weather-resistant adhesion. The above-described saturated hydrocarbon-based polymer containing a reactive silicon group is somehow insufficient in weather-resistant adhesion. In particular, it has a disadvantage of insufficient weather-resistant adhesion for highly insulating, heat ray reflective glass, which has been widely used recently.

Japanese Patent Laid-Open Publication No.152584/1998 discloses a curable composition comprising (A) a saturated hydrocarbon-based polymer containing at least one reactive silicon group, (B) a silane coupling agent, and (C) a compound containing an unsaturated group in the molecule which triggers polymerization by reacting with oxygen in air, and/or photopolymerizable compound. However, this curable composition has still room for improvement both in curing speed and resistance to weather.

Therefore, there are demands for a curable composition containing, as the main ingredient, a saturated hydrocarbon-based polymer having a reactive silicon group which is highly adhesive to various materials, improved in weather-resistant adhesion for various types of glass, in particular heat ray reflective glass, and excellent in resistance to weather and curing speed.

(19) A silicone-based tack agent of silicone resin based on dimethyl polysiloxane rubber is known as a heat-resistant tack agent.

However, it is generally known that this silicone-based tack agent has disadvantages, e.g., strong tackiness with non-polar compounds, e.g., polytetrafluoroethylene, and compatibility with the so-called silicone releasing paper coated with a silicone releasing agent, because both contain polysiloxane, making itself difficult to peel off the releasing paper and damaging its releasing effect.

On the other hand, tack agents of good releasing property include those composed of a component having only an organic skeleton, e.g., rubber-based tack agents, such as natural or synthetic rubber incorporated with a tackifier resin, and acrylic-based tack agents produced by copolymerization with an acrylate ester. They have their own disadvantages; for example, the former is of non-crosslinking type and cannot be expected to have high resistance to heat, while the latter, although crosslinkable by the actions of a crosslinking agent, e.g., that of isocyanate, incorporated therein, may not give the crosslinked product itself showing sufficient resistance to heat. Therefore, they may not show sufficient resistance to heat as a tack agent.

Recently, use of a group containing hydrolyzable silicon is proposed to obtain a tack agent of high resistance to heat, wherein the group triggers a condensation reaction in the polymer of organic skeleton in which it is incorporated, to form the thermally stable siloxane crosslinking.

Such a tack agent composition is disclosed by, e.g., Japanese Patent Laid-Open Publication No.71377/1984. This siloxane-crosslinking type tack agent has a disadvantage of poor relesability, as is the case with the above-described silicone-based tack agent, in spite of its polymer main chain being essentially of organic skeleton. More concretely, when it is adhered to a releasing paper or film coated with a silicone-based releasing agent, or when a laminate with the tack agent on one side of the base and silicone-based releasing agent on the other side is wound, exfoliation resistance between the tack agent and releasing paper or releasing film increases with time, possibly breaking the releasing paper when the worst comes to the worst, and making it impossible to release the paper.

As is generally known, a silicone-based releasing paper frequently serves as the essential component of adhesive tapes, and the so-called silicone-based tack agent described above is not well separated from a silicone-based releasing paper. Although development of releasing paper coated with a non-silicone-based (e.g., fluorine-based) releasing agent has been considered, application of the tack agent to releasing paper is limited, because it is not smoothly separated from the paper.

Japanese Patent Laid-Open Publication No.60771/1986 discloses a tack agent composition comprising (A) an organic polymer containing at least one hydrolyzable silicon group in the molecule, (B) a tackifier resin, and (C) a specific organic zirconium or aluminum as the curing catalyst. It is developed in consideration of the actual situations that there is no tack agent composition high in resistance to heat and well releasable from a releasing paper coated with a silicone-based releasing agent. The composition is said to be well releasable from a silicone-based paper or film.

However, further improvements in releasability and resistance to heat have been desired. Moreover, improvements in resistance to weather and curing speed are left as the major technical problems to be solved.

Therefore, there are demands for a tack agent composition high in resistance to heat, well releasable from a releasing paper or the like coated with a silicone-based releasing agent, and also high in curing speed and resistance to weather.

(20) Japanese Patent Laid-Open Publication No.36395/1979 describes that a vinyl-based resin containing a hydrolyzable silyl group at the terminal or in the side chain is not only excellent in, e.g., gloss, resistance to weather and discoloration, but improved in adhesion to inorganic materials by the actions of the hydrolyzable silyl group, and forming a resin of dense network structures by crosslinking at room temperature with moisture, in particular that in air to have high hardness, and resistance to solvent, water, heat and weather.

According to Japanese Patent Laid-Open Publication No.63351/1982, however, the vinyl-based resin containing a hydrolyzable silyl group, although giving an excellent resin when cured in the presence of a curing catalyst, has a disadvantage of short pot life in the open atmosphere, in particular when the vinyl-based resin having 3 hydrolyzable silyl groups contains the curing catalyst.

The above publication also describes the followings.

The inventions to improve the pot life in open atmospheres have been already applied for patents. For example, U.S. Pat. No. 4,043,953 discloses an invention which improves pot life of a polymerized organic silane in the presence of a curing catalyst, wherein the polymer is produced by copolymerization of a monomer containing a $CH_2=C<$ group, except the one containing an active hydrogen group, e.g., hydroxyl, carboxyl and amide group, with acrylate alkoxysilane, methacrylate alkoxysilane or vinyl alkoxysilane, and incorporated with a hydrolyzable, reactive silane monomer represented by the general formula $X_nSi(OR)_{4-n}$ (wherein, X is an organic group of 1 to 12 carbon atoms; R is methyl, ethyl, 2-methoxymethyl, 2-ethoxyethyl, or an alkyl group having a carbon number of 5 or less; and "n" is an integer of 0 to 2) at 0.5 to 15% by weight, based on the polymerized organic silane.

The curing catalysts useful for the above invention include an organic acid, e.g., p-toluene sulfonate and n-butyl phosphate; metallic salt of orgaic acid, e.g., tin naphthenate, dibutyl tin dilaurate, iron stearate and lead octenate; and organic amine, e.g., boron isodiamine, methylene diamine and imidazole at 0.1 to 5% by weight, preferably 0.2 to 1% by weight. However, the pot life was measured after the polymerized organic silane, hydrolyzable, reactive silane monomer and curing catalyst were stored in a closed condition in the embodiments. The publication is silent on pot life in an open atmosphere, which is of practical importance. Indeed, pot life of the polymerized organic silane, hydrolyzable, reactive silane monomer and curing catalyst, as described in the USP publication, in an open atmosphere is satisfactory only when an organic amine is used, and short in the other cases. However, the resin cured in the presence of an organic amine has a disadvantage of coloration by the amine, and development of other catalysts has been desired.

Japanese Patent Laid-Open Publication No.63351/1982 discloses a composition of improved pot life, developed under the above situations. The publication discloses a composition of improved pot life, comprising 100 parts by weight of a vinyl-based silyl group containing resin with the main chain essentially composed of a vinyl-based polymer and having at least one silicon group bonded to a hydrolyzable group in the molecule at the terminal or in the side chain, and 0.01 to 10 parts by weight of a curing catalyst selected from the group consisting of a mercaptide type organotin compound having the Sn—S bond, a sulfide type organotin compound having the Sn=S bond, a mixture of a carboxylate type organotin compound and a mercaptide type organotin compound having the Sn—S bond, a mixture of a carboxylate type organotin compound and a sulfide type organotin compound having the Sn=S bond, a mixture of a carboxylate type organotin compound and organic carboxylic acid, a mixture of a carboxylate type organotin compound and organic carboxylate anhydride, and a mixture of an organic carboxylate compound and organic carboxylate anhydride.

The above-described vinyl-based resin containing silyl group can be produced by reacting a hydrosilane compound with a vinyl-based resin having the C—C double bond in the presence of a catalyst of Group VIII transition metal. The publication describes that the vinyl-based resin useful for the invention is not limited, except that it contains a hydroxyl group, and that the adequate resins include (meth)acrylate ester, e.g., methyl (meth)acrylate, ethyl (meth)acrylate, butyl (meth)acrylate and 2-ethylhexyl (meth)acrylate; carboxylic acid, e.g., (meth)acrylic acid, itaconic acid and fumaric acid; acid anhydride, e.g., maleic anhydride; epoxy compound, e.g., glycidyl (meth)acrylate; amino compound, e.g., diethylaminoethyl acrylate and aminoethyl vinyl ether; amide compound, e.g., (meth)acrylamide, amide itaconate, α-ethylacrylamide, crotonamide, diamide fumarate, diamide maleate and N-butoxymethyl (meth)acrylamide; and resin containing, as the main ingredient, a copolymer selected from the group consisting of acrylonitrile, styrene, α-methyl styrene, vinyl chloride, vinyl acetate, vinyl propionate and the like.

Japanese Patent Laid-Open Publication No.63351/1982, however, is silent on ethylene/α-olefin/non-conjugated polyene random copolymer rubber produced by copolymerization of ethylene, α-olefin of 3 to 20 carbon atoms and norbornene compound having vinyl group (=C=CH$_2$) at the terminal, instead of the vinyl-based resin.

Therefore, there are demands for a curable rubber composition composed of an ethylene/α-olefin/non-conjugated polyene random copolymer rubber containing a hydrolyzable silyl group at the terminal or in the side chain and curing catalyst, improved in pot life in an open atmosphere, high in curing speed, and excellent in resistance to weather.

(21) A curable composition containing an organotin compound is already known, where the organotin compound is in the form of a saturated hydrocarbon-based polymer having at least one silicon-containing group with hydroxyl or a hydrolyzable group bonded to the silicon atom and crosslinkable by forming the siloxane bond (such a silicon-contaiing group is hereinafter referred to as reactive silicon group). However, such curable composition involves various problems, e.g., low in curing speed, residual tackiness and insufficient curing of the thin film.

Japanese Patent Laid-Open Publication No.41360/1996 describes use of a specific organotin compound in order to solve the above problems. However, the composition has been strongly desired to have further improved curing speed. At the same time, improvement in resistance to weather has been left as the major problem to be solved.

Therefore, there are demands for a curable composition forming the three-dimensional network structures with moisture in air, quickly cured into the solid of rubber-like elasticity, and excellent resistance to weather.

(22) A saturated hydrocarbon-based polymer having at least one reactive silicon group in the molecule is known to have interesting nature that it is crosslinked with moisture or the like even at room temperature by forming the siloxane bond accompanied with the hydrolysis or the like of the reactive silicon group, to form a rubber-like cured product. The polymer is excellent in resistance to heat, water and weather, and useful for sealants for laminated glass and elastic sealants for buildings.

The sealant for laminated glass is required to have excellent non-primer adhesion,i.e., to be fast adhesive to various objects in the absence of a primer. More recently, the above property has been required not only for sealant for laminated glass but also for sealant for other purposes, e g., by elastic sealant for buildings, to improve application efficiency by dispensing with a primer. However, the sealant which uses the above-described saturated hydrocarbon-based polymer containing a reactive silicon group is insufficient in adhesion in the absence of a primer. Moreover, it is not always satisfactory in curing speed and resistance to weather.

Therefore, there are demands for a curable rubber composition containing, as the major ingredient, rubber containing a hydrolyzable silyl group, high in curing speed, and excellent in adhesion to various objects and in resistance to weather.

(23) The vehicle bodies have been coated with an underbody coating material on the back side of the floor or sides for various purposes, e.g., prevention of damages by gravel or the like bounded back on a running vehicle, rust prevention and damping to reduce vibration and noise, and also with a body sealer on a place structurally difficult to treat for rust prevention, e.g., joint between the internal and external plates, for prevention of rust by rainwater, moisture or the like. Vinyl chloride sol has been used as the material suitable for the above purposes.

Recently, the coating material for vehicles is strongly required to have better functions, e.g., still improved rust-prevention and damping effects by the thinner film for reducing weight, and reduced vehicle baking temperature or even dispensing with the baking step for resources- and energy-saving viewpoints.

Vinyl chloride sol, although inexpensive and meeting the minimum requirements, has a disadvantage that sufficient rust-preventive effect or resistance to chipping (or damage-preventive effect) may not be realized at low baking temperature, because of slow gelation. Moreover, its damping effect is inherently not very high, and tends to further deteriorate as the coating film is required to be thinner.

Japanese Patent Laid-Open Publication No.41349/1996 discloses a coating material for vehicles comprising a saturated hydrocarbon-based polymer having a reactive silicon group as the crosslinking group. It is improved in various properties, e.g., those related to low-temperature baking, rust prevention, resistance to chipping and damping as compared with vinyl chloride sol. Nevertheless, however, these properties are still insufficient, in particular damping property being expected for further improvement. Improvements are also expected for curing speed and weather resistance of the coating film thereof.

Therefore, there are demands for a curable composition, e.g., coating material for vehicles, high in curing speed even at low baking temperature, fast curable, and forming the uniform, stable coating film even when it is thin, excellent in rust prevention, chipping resistance, damping properties and weather resistance.

(24) Many industries, e.g., building, automobile and electric appliance industries, have been using a variety of sealants for joining similar or dissimilar materials in assembling/fabrication lines, and also for other purposes, e.g., reinforcement, repair and replacement. Sealants of various curing modes or main chain structures have been proposed for specific purposes. However, few sealants commonly used for laminated glass satisfy all of resistance to weather and heat, non-polluting property, low moisture-permeability and weather-resistant adhesion. Still less is the sealant having low-odor property, in addition to the above.

For example, a polysulfide-based sealant now being used is insufficient in low moisture-permeability, although showing excellent weather resistance, heat resistance and non-polluting properties, and cannot be used for single sealing independently.

It is also insufficient in weather-resistant adhesion, one of the most important properties for sealing laminated glass, for heat ray reflective glass, which has been recently massively used for energy-saving purposes. In laminated glass production, this may need an additional step of removing a metallic coating film that reflects heat ray before the glass is filled with the sealant. Moreover, it is also insufficient in properties related to hot water-resistant adhesion and low odor, leaving environmental problems in the laminated glass production process.

A condensing curing type silicone-based sealant, as another type of sealant for laminated glass, is insufficient in non-polluting property and low moisture-permeability, although satisfying weather resistance, heat resistance, weather-resistant adhesion and low-odor properties, and cannot be used for single sealing independently.

Therefore, there are demands for a sealant for laminated glass satisfying weather resistance, heat resistance, non-polluting, low moisture-permeability, weather-resistant adhesion and low-odor properties, and also excellent in mechanical characteristics and producible at low cost.

(25) Sealants for laminated glass fall into two general categories, for primary and secondary sealing. A laminated glass unit is sealed at its edges with one type of sealant (single sealing) or 2 types of sealants for primary and secondary sealing (dual sealing), depending on specific purposes.

A butyl rubber-based hot melt resin (hereinafter sometimes referred to as hot melt butyl) is commonly used as a sealant for single sealing and primary sealant for dual sealing. It has following characteristics.

Hot melt butyl is a solid or waxy polymer at room temperature, becoming fluid when heated at around 100 to 250° C. When used as an adhesive, it is adhered to various base surfaces after being molten by wetting these surfaces. In an actual laminated glass production process, hot melt butyl is discharged from a dedicated applicator by which it is molten under heating, and solidified after it is applied as sealant temperature rapidly decreases. Therefore, it is curable for a much shorter period than other reaction-curing type sealants, and hence can greatly reduce the curing period and facilitate sealant management and handling. Therefore, it will play a still more important role in the future laminated glass markets, because of its good workability to simultaneously realize its reduced procurement periods and increased productivity.

However, single-sealed laminated glass, mainly using hot melt butyl, is low in structural strength and difficult to secure steam-barrier property at the laminated glass inside for extended periods. Therefore, it can find limited industrial applications, e.g., sealant for show case units, which are replaced in a relatively short cycle.

The secondary seal in a dual-sealed laminated glass is low in steam-barrier property, although high in mechanical characteristics (e.g., adhesion to the glass), and needs primary sealing. Therefore, it is structured to block steam passing through the secondary seal by hot melt butyl. This dual-sealed laminated glass needs 2 types of sealants in the production process, and is more costly, although having longer serviceability, than the single-sealed type. Even a dual-sealed laminated glass cannot sustain primary sealing, when the secondary seal is aged, possibly deteriorated to the single-sealed glass grade.

Adhesion of hot melt butyl depends on tackiness of butyl rubber, and is possibly deteriorated by embrittlement at low temperature. Moreover, the sealant is thermoplastic at high temperature, possibly its softening to cause deviation of the laminate components from each other, andhence is required to be resistant to creeping at high temperature to prevent the above problems.

Comparing thermoplastic hot melt butyl with the reaction-curing type sealant (e.g., polysulfide-based or silicone-based sealant), the former has at present major disadvantages of significant fluctuations of properties, e.g., mechanical properties, with temperature, although much better in workability. Therefore, it tends to have narrower applicable areas in terms of glass size and weight than the reaction-curing type.

Therefore, there are demands for a sealant for laminated glass, improved in temperature-dependence of structural strength and adhesion to a base material, while keeping steam-barrier characteristics of hot melt butyl, and suitable as the sealant for laminated glass for primary sealing for dual sealing or single sealing.

The present invention has the following objects.

(1) The present invention is intended to solve the problems involved in the conventional technologies (1) described above. Accordingly, it is an object of the present invention to provide a curable elastic composition (curable rubber composition) improved in elongation of the cured product and residual tackiness, in its surface and, at the same time, high in curing speed and capable of giving the cured product of high resistance to weather, and also to provide use of the same.

(2) The present invention is also intended to solve the problems involved in the conventional technologies (2) described above. Accordingly, it is another object of the present invention to provide a curable rubber composition containing, as the main ingredient, a silyl-containing ethylene/α-olefin/non-conjugated polyene random copolymer rubber which has a structural unit derived from a norbornene compound as the non-conjugated polyene with a specific vinyl group at the terminal and containing a specific hydrolyzable silyl group in the molecule, and high in curable speed and excellent in adhesion to a variety of objects and resistance to weather, and also to provide use of the same.

(3) The present invention is also intended to solve the problems involved in the conventional technologies (3) described above. Accordingly, it is still another object of the present invention to provide a curable composition high in curing speed, leaving little residual tackiness on the cured product surface, after it is cured, highly resistant to weather, showing high adhesion between a paint and sealant surface, when the former is applied, and useful for sealant, primer or the like.

(4) The present invention is also intended to solve the problems involved in the conventional technologies (4) described above. Accordingly, it is still another object of the present invention to provide a curable composition containing a rubber-based organic polymer having a reactive silicon group, which is rapidly cured with moisture, excellent in tensile-related properties, capable of giving a rubber-like elastomer free of residual tackiness on the surface, and improved in resistance to weather and storage stability.

(5) The present invention is also intended to solve the problems involved in the conventional technologies (5) described above. Accordingly, it is still another object of the present invention to provide a rubber composition curable at room temperature, high in curing speed, excellent in resistance to weather, and capable of giving the highly adhesive cured product, and also to provide use of the same.

(6) The present invention is also intended to solve the problems involved in the conventional technologies (6) described above. Accordingly, it is still another object of the present invention to provide a curable rubber composition, easily cured with moisture in air at room temperature or under heating, and at high speed, and excellent in resistance to weather.

(7) The present invention is also intended to solve the problems involved in the conventional technologies (7) described above. Accordingly, it is still another object of the present invention to provide a curable composition high in curing speed, giving a weather-resistant cured product, and suitable for adhesive, sealant or the like.

(8) The present invention is also intended to solve the problems involved in the conventional technologies (8) described above. Accordingly, it is still another object of the present invention to provide a curable composition quickly cured when it is used, even after being stored for extended periods, and giving a weather-resistant cured product.

(9) The present invention is also intended to solve the problems involved inthe conventional technologies (9) described above. Accordingly, it is still another object of the present invention to provide a curable rubber composition high in storage stability and curing speed, and giving a highly weather-resistant cured product, and also to provide use of the same.

(10) The present invention is also intended to solve the problems involved in the conventional technologies (10) described above. Accordingly, it is still another object of the present invention to provide a new curable rubber composition which incorporates a hydrate of metallic salt as the moisture source, and also to provide use of the same.

It is still another object of the present invention to provide a curable rubber composition showing no increase in viscosity while being stored, high in curing speed and resistance to weather, and also to provide use of the same.

It is still another object of the present invention to provide a curable rubber composition which can incorporate a compound having a reactive silicon group readily reactive with moisture, e.g., silane coupling agent, and also to provide use of the same.

(11) The present invention is also intended to solve the problems involved in the conventional technologies (11) described above. Accordingly, it is still another object of the present invention to provide a composition low in viscosity, good in workability, sufficient in curing speed, excellent in, e.g., resistance to weather, heat and water, and capable of giving a rubber-like cured product high in strength and elongation (low modulus of elasticity).

(12) The present invention is also intended to solve the problems involved in the conventional technologies (12) described above. Accordingly, it is still another object of the present invention to provide a rubber composition high in vulcanization speed, improved in resistance to weather and excellent in mechanical strength, while retaining the various favorable characteristics of an ethylene/α-olefin/non-conjugated polyene random copolymer rubber, e.g., excellent resistance to heat and chemicals of the vulcanized product.

(13) The present invention is also intended to solve the problems involved in the conventional technologies (13) described above. Accordingly, it is still another object of the present invention to provide a rubber composition high in adhesion; giving the cured product with greatly changed layered structures, low in elasticity and high in elongation; giving the cured product dispersed with an epoxy resin whose content in the matrix increases as its particle size decreases, and high in modulus of elasticity and tensile shear strength; sufficiently high in curing speed, and giving the cured product of high resistance to weather, and also to provide a method of producing the same.

(14) The present invention is also intended to solve the problems involved in the conventional technologies (14) described above. Accordingly, it is still another object of the present invention to provide a curable rubber composition improved in toughness and strength, giving the cured product of high strength irrespective of moisture quantity, and, at the same time, high in curing speed and giving the cured product of high resistance to weather.

(15) The present invention is also intended to solve the problems involved in the conventional technologies (15) described above. Accordingly, it is still another object of the present invention to provide a rubber composition well-balanced between workability and mechanical properties of the cured product, sufficient in curing speed and resistance to weather of the cured product, and suitable as a sealant for laminated glass.

(16) The present invention is also intended to solve the problems involved in the conventional technologies (16) described above. Accordingly, it is still another object of the present invention to provide a curable composition high in curing speed, giving the cured product of high resistance to weather, and suitable for adhesives and sealants.

(17) The present invention is also intended to solve the problems involved in the conventional technologies (17) described above. Accordingly, it is another object of the present invention to provide a curable rubber composition containing, as the main ingredient, a silyl-containing ethylene/α-olefin/non-conjugated polyene random copolymer rubber which has a structural unit derived from a norbornene compound with a specific vinyl group at the terminal as the non-conjugated polyene and containing a hydrolyzable silyl group in the molecule, and giving the cured product excellent in resistance to weather and heat, and also to provide use of the same.

(18) The present invention is also intended to solve the problems involved in the conventional technologies (18) described above. Accordingly, it is still another object of the present invention to provide a curable rubber composition containing, as the main ingredient, a saturated hydrocarbon-based polymer having a reactive silicon group, which is highly adhesive to various materials, improved in weather-resistant adhesion for various types of glass, in particular heat ray reflective glass, and excellent in resistance to weather and curing speed.

(19) The present invention is also intended to solve the problems involved in the conventional technologies (19) described above. Accordingly, it is still another object of the present invention to provide a tack agent composition high in resistance to heat, well releasable from a releasing paper or the like coated with a silicone-based releasing agent, and also high in curing speed and resistance to weather, and also to provide use of the same.

(20) The present invention is also intended to solve the problems involved in the conventional technologies (20) described above. Accordingly, it is still another object of the present invention to provide a rubber composition composed of an ethylene/α-olefin/non-conjugated polyene random copolymer rubber containing a hydrolyzable silyl group at the terminal or in the side chain and a curing catalyst, improved in pot life in an open atmosphere.

It is still another object of the present invention to provide a curable rubber composition high in curing speed and excellent in resistance to weather, and also to provide use of the same.

(21) The present invention is also intended to solve the problems involved in the conventional technologies (21) described above. Accordingly, it is still another object of the present invention to provide a new curable composition forming the three-dimensional network structures with moisture in air, quickly cured into the solid of rubber-like elasticity, and excellent resistance to weather.

(22) The present invention is also intended to solve the problems involved in the conventional technologies (22) described above. Accordingly, it is still another object of the present invention to provide a curable rubber composition containing, as the major ingredient, an ethylene/α-olefin/non-conjugated polyene random copolymer rubber containing a hydrolyzable silyl group, high in curing speed, and excellent in adhesion to various objects and in resistance to weather.

(23) The present invention is also intended to solve the problems involved in the conventional technologies (23) described above. Accordingly, it is still another object of the present invention to provide a curable composition, e.g., coating material for vehicles, high in curing speed even at low baking temperature, fast curable, and forming the uniform, stable coating film even when it is thin, excellent in rust prevention, chipping resistance, damping properties and resistance to weather.

(24) The present invention is also intended to solve the problems involved in the conventional technologies (24) described above. Accordingly, it is still another object of the present invention to provide a sealant for laminated glass satisfying weather resistance, heat resistance, non-polluting, low moisture-permeability, weather-resistant adhesion and low-odor properties, and also excellent in mechanical characteristics and producible at low cost.

(25) The present invention is also intended to solve the problems involved in the conventional technologies (25) described above. Accordingly, it is still another object of the present invention to provide a sealant for laminated glass, improved in temperature-dependence of structural strength and adhesion to a base material, while keeping steam-barrier characteristics of hot melt butyl, and suitable as the sealant for laminated glass for primary sealing for dual sealing or single sealing.

DISCLOSURE OF THE INVENTION

The curable composition of the present invention is characterized in that it contains a silyl-containing ethylene/α-olefin/non-conjugated polyene random copolymer rubber (A1) which has a structural unit derived from a norbornene compound, represented by the following general formula [I] or [II], with at least one specific vinyl group at the terminal, as the non-conjugated polyene and containing a hydrolyzable silyl group, represented by the following general formula [III] in the molecule, and a compound (B), other than the rubber (A1), having hydroxyl and/or a hydrolyzable group.

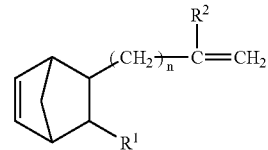

[I]

wherein, "n" is an integer of 0 to 10;
$R^1$ is hydrogen atom or an alkyl group of 1 to 10 carbon atoms; and
$R^2$ is hydrogen atom or an alkyl group of 1 to 5 carbon atoms.

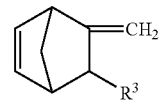

[II]

wherein, $R^3$ is hydrogen atom or an alkyl group of 1 to 10 carbon atoms.

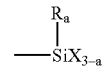

[III]

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, mercapto, alkenyloxy, thioalkoxy and amino group; and "a" is an integer of 0 to 2.

The compound (B) having hydroxyl and/or a hydrolyzable group is preferably a silicon-containing compound.

The curable compositions of the present invention include the followings.

(1) A curable elastic composition characterized in that it contains the silyl-containing ethylene/α-olefin/non-conjugated polyene random copolymer rubber (A1), and a compound having a silanol group and/or a compound which can react with moisture to form a compound having a silanol group in the molecule (B1).

(2) A curable rubber composition characterized in that it contains the silyl-containing ethylene/α-olefin/non-conjugated polyene random copolymer rubber (A1), and a tetravalent tin compound (C), and a silicon compound (B2) represented by the following general formula [V]:

$R^4{}_a Si(OR^5)_{4-a}$ [V]

wherein, $R^4$ and $R^5$ are each a hydrocarbon group of 1 to 20 carbon atoms which may be substituted or not substituted, and "a" is 0, 1, 2, or 3.

(3) A curable composition characterized in that it contains
(a) the silyl-containing ethylene/α-olefin/non-conjugated polyene random copolymer rubber (A1), and
(b) a silicon compound (B3) having at least one amino group and at least one trialkylsiloxy group in the molecule.

(4) A curable composition characterized in that it contains
(a) the silyl-containing ethylene/α-olefin/non-conjugated polyene random copolymer rubber (A1), and
(b) an organosilicon compound (B4) represented by the following general formula [VI]:

$$(R^2(CH_3)_2SiO)_nR^1 \quad [VI]$$

wherein, $R^1$ is an alcohol residue or weak acid residue, $R^2$ is methyl or vinyl group, and "n" is a positive integer.

(5) A rubber composition curable at room temperature, characterized in that it contains
the silyl-containing ethylene/α-olefin/non-conjugated polyene random copolymer rubber (A1), and
a silane compound (B5) represented by one of the following general formulae [VII-1] to [VII-6]:

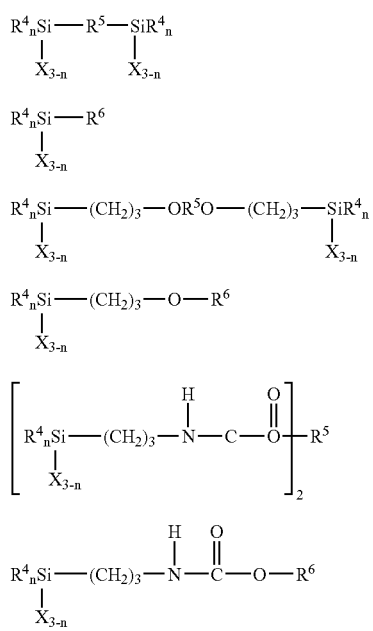

wherein, $R^4$ is a monovalent hydrocarbon group of 1 to 10 carbon atoms, selected from the group consisting of alkyl, aralkyl and aryl;
X is a group selected from the group consisting of halogen, hydroxy, alkoxyl, acyloxy, aminoxy, phenoxy, thioaikoxy, amino, ketoximate, mercapto and alkenyloxy;
$R^5$ is an alkylene or arylene group of 8 to 200 carbon atoms; $R^6$ is a monovalent alkyl group of 8 to 200 carbon atoms; and "n" is an integer of 0 to 2.

(6) A curable rubber composition, characterized in that it contains, as the active ingredients,
the silyl-containing ethylene/α-olefin/non-conjugated polyene random copolymer rubber (A1), (D) amines selected from the group consisting of aliphatic amines, alicyclic amines, modified cycloaliphatic polyamines and ethanol amines,
(B6) a silane coupling agent represented by the general formula $Y_3(Si)Z$, wherein Y is an alkoxyl group; and Z is an alkyl group containing a functional group selected from the group consisting of amino group, which maybe substituted with an aminoalkyl group or not, and mercapto group, and
(E) a resin composed of a lacquer-based paint, an acrylic lacquer-based paint, an acrylic resin-based paint, a thermosetting acrylic paint, an alkyd paint, a melamine paint, an epoxy paint or organopolysiloxane.

(7) A curable composition, characterized in that it contains
(a) the silyl-containing ethylene/α-olefin/non-conjugated polyene random copolymer rubber (A1), and
(b) a silane-based compound substituted with amino group (B7)

(8) A curable composition, characterized in that it contains
the silyl-containing ethylene/α-olefin/non-conjugated polyene random copolymer rubber (A1), and
a filler (F), a plasticizer (G), a curing catalyst (H) and an organocarboxylate compound (B8).

(9) A curable rubber composition, characterized in that it contains
the silyl-containing ethylene/α-olefin/non-conjugated polyene random copolymer rubber (A1),
alcohols (B9), and/or a hydrolyzable ester compound (I) (except a hydrolyzable organosilicon compound (B10)), and
a hydrolyzable organosilicon compound (B10).

(10) A two- or multi-liquid type curable rubber composition composed of at least two liquids, characterized in that it contains
a major ingredient (I) containing the silyl-containing ethylene/α-olefin/non-conjugated polyene random copolymer rubber (A1), and a curing agent (II) containing,
a silanol condensing catalyst (J) and water or a hydrate of a metallic salt (B11).

Each of the curable compositions (1) to (10) may contain the silyl-containing ethylene/α-olefin/non-conjugated polyene random copolymer rubber (A2), described later, in place of the silyl-containing ethylene/α-olefin/non-conjugated polyene random copolymer rubber (A1).

The other curable compositions of the present invention are characterized in that they contain, in the molecule, the silyl-containing ethylene/α-olefin/non-conjugated polyene random copolymer rubber (A2) containing a hydrolyzable silyl group, represented by the following general formula (1), and a high-molecular compound (K) other than the rubber (A2) and/or an inorganic filler (L):

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, thioalkoxy, amino, mercapto and alkenyloxy group; and "m" is an integer of 0 to 2.

These curable compositions include the followings.

(11) A rubber composition, characterized in that it contains the silyl-containing ethylene/α-olefin/non-conjugated polyene random copolymer rubber (A2), and an organosilicon polymer (K1)

(12) A rubber composition, characterized in that it contains the silyl-containing ethylene/α-olefin/non-conjugated polyene random copolymer rubber (A2), an organic rubber (K2) and a crosslinking agent (M) for the organic rubber (K2).

(13) A rubber composition, characterized in that it contains the silyl-containing ethylene/α-olefin/non-conjugated polyene random copolymer rubber (A2), an epoxy resin (K3), a silane coupling agent (N), a silanol condensing catalyst (O), and a curing agent (P) for the epoxy resin.

(14) A rubber composition, characterized in that it contains the silyl-containing ethylene/α-olefin/non-conjugated polyene random copolymer rubber (A2), an epoxy resin (K3), a silicon compound (Q) containing a hydrolyzable silyl group and a functional group reactive with the epoxy group in the molecule, and a silicon compound (R) containing at least two hydroxyl groups bonded to the silicon atom in the molecule.

(15) A rubber composition, characterized in that it contains the silyl-containing ethylene/α-olefin/non-conjugated polyene random copolymer rubber (A2), calcium carbonate (L1), and talc (L2).

In the compositions (11) to (15), the silyl-containing ethylene/α-olefin/non-conjugated polyene random copolymer rubber (A2) normally has at least one type of silyl groups represented by the following general formula (2) or (3):

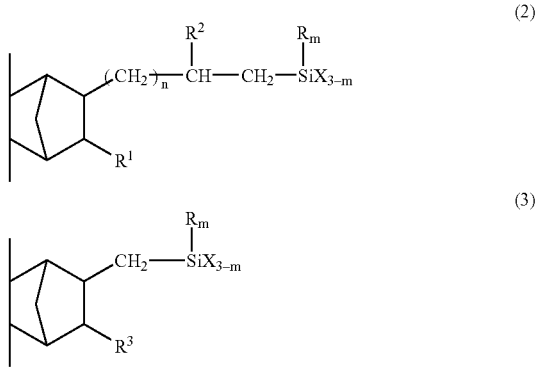

wherein, R is a monovalent hydrocarbon group of 1 to 12 carbon atoms; $R^1$ is a hydrogen atom or an alkyl group of 1 to 10 carbon atoms; $R^2$ is a hydrogen atom or an alkyl group of 1 to 5 carbon atoms; $R^3$ is a hydrogen atom or an alkyl group of 1 to 10 carbon atoms; X is a hydrolyzable group selected from the group consisting of hydride, halogen, alkoxyl, acyloxy, ketoximate, amide, acid amide, aminoxy, thioalkoxy, amino, mercapto and alkenyloxy group; and "m" is an integer of 0 to 2 and "n" is an integer of 0 to 10.

It is particularly preferable that the silyl-containing ethylene/α-olefin/non-conjugated polyene random copolymer rubber (A2) is produced by reacting an ethylene/α-olefin/non-conjugated polyene random copolymer rubber having a norbornene compound with at least one terminal vinyl group as the non-conjugated polyene represented by the following general formula (4) and/or (5):

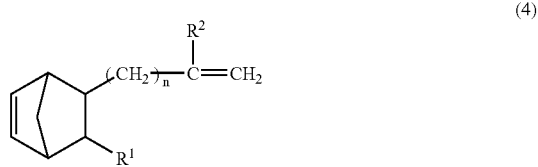

wherein, $R^1$ is a hydrogen atom or an alkyl group of 1 to 10 carbon atoms; $R^2$ is a hydrogen atom or an alkyl group of 1 to 5 carbon atoms; $R^3$ is a hydrogen atom or an alkyl group of 1 to 10 carbon atoms; and "n" is an integer of 0 to 10, with a silicon compound represented by the following general formula (6):

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, thioalkoxy, amino, mercapto and alkenyloxy group; and "m" is an integer of 0 to 2, to add the SiH group in the silicon compound to the double bond of the copolymer rubber.

Each of the curable compositions (11) to (15) may contain the silyl-containing ethylene/α-olefin/non-conjugated polyene random copolymer rubber (A1) in place of the silyl-containing ethylene/α-olefin/non-conjugated polyene random copolymer rubber (A2).

The other curable compositions of the present invention are characterized in that they contain the silyl-containing ethylene/α-olefin/non-conjugated polyene random copolymer rubber (A1) and a stabilizer.

(16) A curable composition, characterized in that it contains (a) the silyl-containing ethylene/α-olefin/non-conjugated polyene random copolymer rubber (A1), (b) a nickel-containing light stabilizer (S) and (C) a silane coupling agent (T).

(17) A curable rubber composition, characterized in that it contains the silyl-containing ethylene/α-olefin/non-conjugated polyene random copolymer rubber (A1), and a sulfur-based aging inhibitor (U).

(18) A curable composition, characterized in that it contains the silyl-containing ethylene/α-olefin/non-conjugated polyene random copolymer rubber (A1), and a compound (V) having, in the molecule, an unsaturated group capable of triggering polymerization by reacting with oxygen in air and/or a photopolymerizable material.

Each of the curable compositions (16) to (18) may contain the silyl-containing ethylene/α-olefin/non-conjugated polyene random copolymer rubber (A2) in place of the silyl-containing ethylene/α-olefin/non-conjugated polyene random copolymer rubber (A1).

The other curable compositions of the present invention are characterized in that they contain the silyl-containing ethylene/α-olefin/non-conjugated polyene random copolymer rubber (A1) and a silanol catalyst.

(19) A tackifier composition, characterized in that it contains the silyl-containing ethylene/α-olefin/non-conjugated polyene random copolymer rubber (A1), a tackifier resin (W), and a curing catalyst (H) comprising an organozirconium compound (H1) represented by the following general formula [VIII] or an organoaluminum compound (H2) represented by the following general formul [IX]:

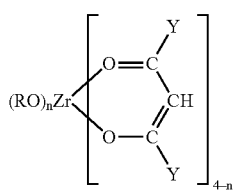

[VIII]

wherein, "n" is an integer of 0 to 4,

R is a monovalent hydrocarbon group of 1 to 20 carbon atoms, and

Y is a group selected from the group consisting of hydrocarbon of 1 to 8 carbon atoms, halogenated hydrocarbon, cyanoalkyl, alkoxyl, halogenated alkoxyl, cyanoalkoxy and amino group, which may be the same or different, and

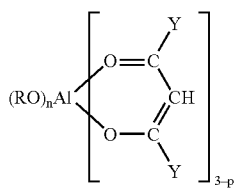

[IX]

wherein, "p" is an integer of 0 to 3,

R is a monovalent hydrocarbon group of 1 to 20 carbon atoms, and

Y is a group selected from the group consisting of hydrocarbon of 1 to 8 carbon atoms, halogenated hydrocarbon, cyanoalkyl, alkoxyl, halogenated alkoxyl, cyanoalkoxy and amino group, which may be the same or different.

(20) A rubber composition of improved pot life, characterized in that it contains the silyl-containing ethylene/α-olefin/non-conjugated polyene random copolymer rubber (A1), a curing catalyst (H) composed of a mercaptide type organotin compound (H3) having the Sn—S bond, a sulfide type organotin compound (H4) having the Sn=S bond, organocarboxylic acid (H5), organocarboxylic anhydride (H6), or a mixture of one of the above compounds and a carboxylic type organotin compound (H7).

(21) A curable composition, characterized in that it contains the silyl-containing ethylene/α-olefin/non-conjugated polyene random copolymer rubber (A1), and a compound (H8) as the curing catalyst (H), represented by the general formula $Q_2Sn(OZ)_2$ or $[Q_2Sn(OZ)]_2O$, wherein, Q is a monovalent hydrocarbon group of 1 to 20 carbon atoms; and Z is a monovalent hydrocarbon group of 1 to 20 carbon atoms or organic group having a functional group capable of forming therein a coordination bond with Sn.

(22) A curable rubber composition, characterized in that it contains the silyl-containing ethylene/α-olefin/non-conjugated polyene random copolymer rubber (A1), and titanates (Y)

Each of the curable compositions (19) to (22) may contain the silyl-containing ethylene/α-olefin/non-conjugated polyene random copolymer rubber (A2) in place of the silyl-containing ethylene/α-olefin/non-conjugated polyene random copolymer rubber (A1).

The other curable compositions of the present invention include the followings.

They are crosslinkable rubber compositions composed of an organic polymer (Z) containing a hydrolyzable silyl group represented by the following general formula [III] and essentially no unsaturated double bond in the main chain, and a compound (B), preferably a silicon containing compound, containing a hydroxyl and/or a hydrolyzable group; and used for electric/electronic device members, transportation machines, and civil engineering/construction, medical and leisure areas:

[III]

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, mercapto, alkenyloxy, thioalkoxy and amino group; and "a" is an integer of 0 to 2.

More concretely, these compositions include the followings.

(1) A curable elastomer composition, which is a crosslinkable rubber composition characterized in that it is composed of the organic polymer (Z) and a compound having a silanol group in the molecule and/or a compound which can react with moisture to form a compound having a silanol group in the molecule (B1), and is used for electric/electronic device members, transportation machines, and civil engineering/construction, medical and leisure areas.

(2) A curable rubber composition, which is a crosslinkable and characterized in that it contains the organic polymer (Z), a tetravalent tin compound (C) and a silicon compound (B2), and is used for electric/electronic device members, transportation machines, and civil engineering/construction, medical and leisure areas.

(3) A curable composition, characterized in that it contains (a) the organic polymer (Z) and (b) a silicon compound (B3) having at least one amino group and at least one trialkylsiloxy group in the molecule, and is used for electric/electronic device members, transportation machines, and civil engineering/construction, medical and leisure areas.

(4) A curable composition, characterized in that it contains (a) the organic polymer (Z) and (b) an organosilicon compound (B4) represented by the following general formula [VI]:

$$(R^2(CH_3)_2SiO)_nR^1 \qquad [VI]$$

wherein, $R^1$ is an alcohol residue or weak acid residue, $R^2$ is methyl or vinyl group, and "n" is a positive integer, and is used for electric/electronic device members, transportation machines, and civil engineering/construction, medical and leisure areas.

(5) A rubber composition, which is curable at room temperature crosslinkable, characterized in that it contains the organic polymer (Z) and a silane compound (B5), and is used for electric/electronic device members, transportation machines, and civil engineering/construction, medical and leisure areas.

(6) A curable rubber composition which is crosslinkable, characterized in that it contains, as the active ingredients, the organic polymer (Z), amines (D) selected from the group consisting of aliphatic amines, alicyclic amines, modified cycloaliphatic polyamines and ethanol amines, a silane coupling agent (B6) represented by the general formula $Y_3(Si)Z$, wherein Y is an alkoxyl group; and Z is an alkyl group containing a functional group selected from the group consisting of amino group, which may be substituted with an aminoalkyl group or not, and mercapto group, and a resin (E) composed of a lacquer-based paint, an acrylic lacquer-based paint or an acrylic resin-based paint, or a thermosetting acrylic paint, an alkyd paint, a melamine paint, an epoxy paint or organopolysiloxane, and is used for electric/electronic device members, transportation machines, and civil engineering/construction, medical and leisure areas.

(7) A curable composition, characterized in that it contains (a) the organic polymer (Z) and (b) a silane-based compound substituted with amino group (B7), and is used for electric/electronic device members, transportation machines, and civil engineering/construction, medical and leisure areas.

(8) A curable composition, characterized in that it contains the organic polymer (Z), a filler (F), aplasticizer (G), a curing catalyst (H) and an organocarboxylate compound (B8), and is used for electric/electronic device members, transportation machines, and civil engineering/construction, medical and leisure areas.

(9) A curable rubber composition, characterized in that it is crosslinkable and contains the organic polymer (Z), alcohols (B9), and/or a hydrolyzable ester compound (I) (except the hydrolyzable organosilicon compound (B10) and a hydrolyzable organosilicon compound (B10), and is used for electric/electronic device members, transportation machines, and civil engineering/construction, medical and leisure areas.

(10) A two- or multi-liquid type curable crosslikable rubber composition composed of at least two liquids, characterized in that it contains the major ingredient (I) containing the organic polymer (Z)

a curing agent (II) containing a silanol condensing catalyst (J) and water or a hydrate of a metallic salt (B11), and is used for electric/electronic device members, transportation machines, and civil engineering/construction, medical and leisure areas.

The rubber compositions of the present invention are crosslinkable ones composed of an organic polymer (Z1) containing a hydrolyzable silyl group represented by the following general formula (1) and essentially no unsaturated double bond in the main chain, a high-molecular compound (K) other than the polymer (Z1) and/or an inorganic filler (L), and used for electric/electronic members, transportation machines, and civil engineering/construction, medical and leisure areas:

(1)

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, thioalkoxy, amino, mercapto and alkenyloxy group; and "m" is an integer of 0 to 2.

These rubber compositions include the followings:

(11) A rubber composition, which is crosslinkable and characterized in that it contains the organic polymer (Z1) and an organosilicon polymer (K1), and is used for electric/electronic device members, transportation machines, and civil engineering/construction, medical and leisure areas.

(12) A rubber composition, which is crosslinkable and characterized in that it contains the organic polymer (Z1), organic rubber (K2) and a crosslinking agent (M) for the organic rubber (K2), and is used for electric/electronic device members, transportation machines, and civil engineering/construction, medical and leisure areas.

(13) A rubber composition, which is crosslinkable and characterized in that it contains the organic polymer (Z1), an epoxy resin (K3), a silane coupling agent (N), a silanol condensing catalyst (O) and a curing agent (P) for the epoxy resin, and is used for electric/electronic device members, transportation machines, and civil engineering/construction, medical and leisure areas.

(14) A rubber composition, which is crosslinkable and characterized in that it contains the organic polymer (Z1), an epoxy resin (K3), a silicon compound (Q) containing a functional group reactive with the epoxy group and hydrolyzable silyl group in the molecule and a silicon compound (R) containing at least two hydroxyl groups bonded to the silicon atom in the molecule, and is used for electric/electronic device members, transportation machines, and civil engineering/construction, medical and leisure areas.

(15) A rubber composition, which is crosslinkable and characterized in that it contains the organic polymer (Z1), calcium carbonate (L1) and talc (L2), and is used for electric/electronic device members, transportation machines, and civil engineering/construction, medical and leisure areas.

(16) A curable composition, characterized in that it contains (a) the organic polymer (Z), (b) a nickel-containing light stabilizer (S) and a silane coupling agent (T), and is used for electric/electronic device members, transportation machines, and civil engineering/construction, medical and leisure areas.

(17) A rubber composition, which is crosslinkable and characterized in that it contains the organic polymer (Z) and a sulfur-based aging inhibitor (U), and is used for electric/electronic device members, transportation machines, and civil engineering/construction, medical and leisure areas.

(18) A curable composition, characterized in that it contains the organic polymer (Z), and a compound (V) having, in the molecule, an unsaturated group capable of triggering polymerization by reacting with oxygen in air and/or photopolymerizable material, and is used for electric/electronic device members, transportation machines, and civil engineering/construction, medical and leisure areas.

(19) A tackifier composition, which is a crosslinkable rubber composition and characterized in that it contains the organic polymer (Z), a tackifier resin (W) and a curing catalyst (H) composed of an organozirconium compound (H1) or an organoaluminum compound (H2), and is used for electric/electronic device members, transportation machines, and civil engineering/construction, medical and leisure areas.

(20) A rubber composition, which is crosslinkable and characterized in that it contains the organic polymer (Z) and a curing catalyst (H) composed of a mercaptide type organotin compound (H3) having the Sn—S bond, a sulfide type organotin compound (H4) having the Sn=S bond, organocarboxylic acid (H5), organocarboxylic anhydride (H6), or a mixture of one of the above compounds and a carboxylic type organotin compound (H7), and is used for electric/electronic device members, transportation machines, and civil engineering/construction, medical and leisure areas.

(21) A curable composition, characterized in that it contains the organic polymer (Z) and a compound (H8) as the curing catalyst (H), represented by the general formula $Q_2Sn(OZ)_2$ or $[Q_2Sn(OZ)]_2O$, wherein, Q is a monovalent hydrocarbon group of 1 to 20 carbon atoms; and Z is a monovalent hydrocarbon group of 1 to 20 carbon atoms or an organic group having a functional group capable of forming therein a coordination bond with Sn, and is used for electric/electronic device members, transportation machines, and civil engineering/construction, medical and leisure areas.

(22) A curable rubber composition, characterized in that it contains the organic polymer (Z) and titanates (Y), and is used for electric/electronic device members, transportation machines, and civil engineering/construction, medical and leisure areas.

(23) A curable composition, characterized in that it contains the silyl-containing ethylene/α-olefin/non-conjugated polyene random copolymer rubber (A1), and is used for electric/electronic device members, transportation machines, and civil engineering/construction, medical and leisure areas.

In the above curable composition (23), the silyl-containing ethylene/α-olefin/non-conjugated polyene random copolymer rubber (A2) may be used in place of the silyl-containing ethylene/α-olefin/non-conjugated polyene random copolymer rubber (A1).

The electric/electronic device members for which the composition of the present invention can be used include those for heavy electrical equipments, electronic devices, sealants for electric/electronic device circuits and substrates, potting materials, coating materials and adhesives, repair materials for wire coatings, insulation sealants for wire joint members, rolls for OA devices, vibration absorbers, and sealants for gel and condensers.

The sealants can go into refrigerators, freezers, washing machines, gas meters, microwave ovens, steam irons and leakage breakers, among others.

The potting materials can go into high-voltage transformer circuits, printed circuit boards, high-voltage transformers equipped with a variable resistance, electric insulators, semiconductor devices, electroconductive devices, solar batteries and flyback transformers for TV sets, among others.

The coating materials can be used for coating thick-wall resistors for high-voltage services and circuit elements for hybrid ICs; HICs; electrical insulator members; semiconductor members, electroconductive members; modules; printed circuits; ceramic substrates; buffers for diodes, transistors and bonding wires; semiconductor devices; and optical fibers for optical communications, among others.

The adhesives can be used for adhesion of CRT wedges, necks, electrical insulator members, semiconductor members and electroconductive members, among others.

The transportation machines in which the compositions of the present invention can go into include vehicles, ships, aircraft and railway vehicles.

More concretely, the compositions of the present invention can be used for the following areas. They can go into vehicles as sealants for engine gaskets, electrical members and oil filters; as potting materials for igniter HICs and hybrid ICs; as coating materials for bodies, window panes and engine controller substrates; and as adhesives for oil pan gaskets, timing cover belts, braids, head lamp lenses, sunroof seals and mirrors, among others.

They can also go into ships as sealants for wiring connecting/distribution boxes, electrical system members and wires; and adhesives for wires and glass, among others.

They can also go into the civil engineering/construction areas as sealants for building materials, e.g., butt joints in the glass screening method for commercial buildings, joints around glass between sashes, joints for interiors in bathrooms, toilets and showcases, joints in bath tubs, flexible joints in exteriors of prefabricated housings, and joints for sizingboards; sealants for laminated glass; sealants for civil engineering works, e.g., for repairing roads; paints/adhesives for metals, glass, stone materials, slates, concrete and tiles; and adhesive sheets, waterproof sheets and vibration-preventive sheets, among others.

They can also go into medical areas, e.g., sealants for rubber plugs for medicinal purposes, syringe gaskets and rubber plugs for decompressioned blood tubes.

They can also go into leisure areas, e.g., swimming caps, diving masks and earplugs for swimming; and gel buffers for sporting shoes and baseball gloves.

The major areas the curable compositions of the present invention can go into are sealants, potting agents, coating materials and adhesives.

The curable compositions for sealants, potting agents, coating materials and adhesives include the crosslinkable rubber compositions composed of the organic polymer (Z) and a compound (B), preferably silicon-containing compound, having a hydroxyl and/or a hydrolyzable group.

More concretely, these compositions include the followings.

(1)' A sealant, a potting agent, a coating material or an adhesive, characterized in that it is composed of a crosslinkable rubber composition, containing
the organic polymer (Z) and
a compound having a silanol group in the molecule and/or the compound which can react with moisture to form a compound having a silanol group in the molecule (B1).

(2)' A sealant, a potting agent, a coating material or an adhesive, characterized in that it is composed of a crosslinkable rubber composition, containing
the organic polymer (Z),
a tetravalent tin compound (C) and
a silicon compound (B2).

(3)' A sealant, a potting agent, a coating material or an adhesive, characterized in that it is composed of a curable composition, containing
(a) the organic polymer (Z) and
(b) a silicon compound (B3) having at least one amino group and at least one trialkylsiloxy group in the molecule.

(4)' A sealant, a potting agent, a coating material or a adhesive, characterized in that it is composed of a curable composition, containing
(a) the organic polymer (Z) and
(b) an organosilicon compound (B4) represented by the following general formula [VI]:

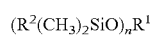    [VI]

wherein, $R^1$ is an alcohol residue or weak acid residue, $R^2$ is methyl or vinyl group, and "n" is a positive integer.

(5)' A sealant, a potting agent, a coating material or an adhesive, characterized in that it is composed of a crosslinkable rubber composition, containing
the organic polymer (Z) and
a silane compound (B5).

(6)' A sealant, a potting agent, a coating material or an adhesive, characterized in that it is composed of a crosslinkable rubber composition, containing, as the active ingredients,
the organic polymer (Z),
amines (D) selected from the group consisting of aliphatic amines, alicyclic amines, modified cycloaliphatic polyamines and ethanol amines,
a silane coupling agent (B6) represented by the general formula $Y_3(Si)Z$, wherein Y is an alkoxyl group; and Z is an alkyl group containing a functional group selected from the group consisting of amino group, which maybe substituted with an aminoalkyl group or not, and mercapto group, and
a resin (E) composed of a lacquer-based paint, an acrylic lacquer-based paint or an acrylic resin-based paint, or a thermosetting acrylic paint, an alkyd paint, a melamine paint, an epoxy paint or organopolysiloxane.

(7)' A sealant, a potting agent, a coating material or an adhesive, characterized in that it is composed of a curable composition, containing,
(a) the organic polymer (Z) and (b) a silane-based compound substituted with amino group (B7).

(8)' A sealant, a potting agent, a coating material or an adhesive, characterized in that it is composed of a curable composition, containing,
the organic polymer (Z), a filler (F), a plasticizer (G),a curing catalyst (H) and an organocarboxylate compound (B8).

(9)' A sealant, a potting agent, a coating material or an adhesive, characterized in that it is composed of a curable rubber composition, containing,
the organic polymer (Z),
alcohols (B9), and/or a hydrolyzable ester compound (I) (except the hydrolyzable organosilicon compound (B10) and
a hydrolyzable organosilicon compound (B10).

(10)' A sealant, a potting agent, a coating material or an adhesive, characterized in that it is composed of a two- or multi-liquid type crosslinkable rubber composition composed of at least two liquids, characterized in that it contains,
the major ingredient (I) containing the organic polymer (Z), a curing agent (II) containing
a silanol condensing catalyst (J) and water or a hydrate of a metallic salt (B11).

The compositions of the present invention are also used for a sealant, a potting agent, a coating material or an adhesive, characterized in that it is composed of a crosslinkable rubber composition comprising the organic polymer (Z1), a high-molecular compound (K) other than the polymer (Z1) and/or an inorganic filler (L). More concretely, these compositions include the followings.

(11)' A sealant, a potting agent, a coating material or an adhesive, characterized in that it is composed of a crosslinkable rubber composition, containing the organic polymer (Z1) and an organosilicon polymer (K1).

(12)' A sealant, a potting agent, a coating material or an adhesive, characterized in that it is composed of a crosslinkable rubber composition, containing the organic polymer (Z1), organic rubber (K2) and a crosslinking agent (M) for the organic rubber (K2).

(13)' A sealant, a potting agent, a coating material or an adhesive, characterized in that it is composed of a crosslinkable rubber composition, containing the organic polymer (Z1), an epoxy resin (K3), a silane coupling agent (N), a silanol condensing catalyst (O) and a curing agent (P) for the epoxy resin.

(14)' A sealant, a potting agent, a coating material or an adhesive, characterized in that it is composed of a crosslinkable rubber composition, containing the organic polymer (Z1), an epoxy resin (K3), a silicon compound (Q) containing a functional group reactive with the epoxy group and hydrolyzable silyl group in the molecule and a silicon compound (R) containing at least two hydroxyl groups bonded to the silicon atom in the molecule.

(15)' A sealant, a potting agent, a coating material or an adhesive, characterized in that it is composed of a crosslinkable rubber composition, containing the organic polymer (Z1), calcium carbonate (L1) and talc (L2).

(16)' A sealant, a potting agent, a coating material or an adhesive, characterized in that it is composed of a curable composition, containing (a) the organic polymer (Z), (b) a nickel-containing light stabilizer (S) and (C) a silane coupling agent (T).

(17)' A sealant, a potting agent, a coating material or an adhesive, characterized in that it is composed of a crosslinkable rubber composition, containing the organic polymer (Z) and a sulfur-based aging inhibitor (U).

(18)' A sealant, a potting agent, a coating material or an adhesive, characterized in that it is composed of a curable composition, containing the organic polymer (Z), and a compound (V) having, in the molecule, an unsaturated group capable of triggering polymerization by reacting with oxygen in air and/or a photopolymerizable material.

(20)' A sealant, a potting agent, a coating material or an adhesive, characterized in that it is composed of a crosslinkable rubber composition, containing
the organic polymer (Z) and
a curing catalyst (H) composed of a mercaptide type organotin compound (H3) having the Sn—S bond, a sulfide type organotin compound (H4) having the Sn=S bond, organocarboxylic acid (H5), organocarboxylic anhydride (H6), or a mixture of one of the above compounds and a carboxylic type organotin compound (H7).

(21)' A sealant, a potting agent, a coating material or an adhesive, characterized in that it is composed of a curable composition, containing
the organic polymer (Z) and
a compound (H8) as the curing catalyst (H), represented by the general formula $Q_2Sn(OZ)_2$ or $[Q_2Sn(OZ)]_2O$,
wherein, Q is a monovalent hydrocarbon group of 1 to 20 carbon atoms; and Z is a monovalent hydrocarbon group of 1 to 20 carbon atoms or organic group having functional group capable of forming therein a coordination bond with Sn.

(22)' A sealant, a potting agent, a coating material or an adhesive, characterized in that it is composed of a curable rubber composition, containing the organic polymer (Z) and titanates (Y).

(23)' A coating material for vehicles, characterized in that it contains the silyl-containing
ethylene/α-olefin/non-conjugated polyene random copolymer rubber (A1).

(24)' A sealant, a potting agent, a coating material for purposes other than vehicles or an adhesive, characterized in that it is composed of a curable composition, containing the silyl-containing ethylene/α-olefin/non-conjugated polyene random copolymer rubber (A1).

(25)' A sealant for laminated glass, characterized in that it contains
the silyl-containing ethylene/α-olefin/non-conjugated polyene random copolymer rubber (A2), a curing catalyst (H) and water or a hydrate of a metallic salt (B11).

(26)' A sealant for laminated glass, characterized in that it contains
the silyl-containing ethylene/α-olefin/non-conjugated polyene random copolymer rubber (A2), a hot melt resin (X), a curing catalyst (H) and water or a hydrate of a metallic salt (B11).

The silyl-containing ethylene/α-olefin/non-conjugated polyene random copolymer rubber (A2) normally contains at least one type of silyl-containing unit represented by the general formula (2) or (3).

It is particularly preferable that the silyl-containing ethylene/α-olefin/non-conjugated polyene random copolymer rubber (A2) is produced by reacting an ethylene/α-olefin/non-conjugated polyene random copolymer rubber having a norbornene compound as the non-conjugated polyene with at least one terminal vinyl group represented by the general formula (4) and/or (5), with a silicon compound represented by the general formula (6), to add SiH group of the silicon compound to the double bond of the copolymer rubber.

In the sealant, the potting agent, the coating material or the adhesive (23)' to (26)', the silyl-containing ethylene/α-olefin/non-conjugated polyene random copolymer rubber (A2) may be also used in place of the silyl-containing ethylene/α-olefin/non-conjugated polyene random copolymer rubber (A1), and vice versa.

BEST MODES FOR CARRYING OUT THE INVENTION

The curable compositions and their uses of the present invention are described more concretely.

Curable Elastomer Composition (1)

The curable elastomer composition (1) of the present invention comprises a silyl-containing ethylene/α-olefin/non-conjugated polyene random copolymer rubber (A1) and a compound having a silanol group and/or a compound which can react with moisture to form a compound having a silanol group in the molecule (B1)

[Silyl-Containing ethylene/α-olefin/Non-Conjugated polyene Random copolymer Rubber (A1)]

The silyl-containing ethylene/α-olefin/non-conjugated polyene random copolymer rubber (A1) for the present invention contains a hydrolyzable silyl group, represented by the following general formula [III], and can be produced by, e.g., reacting a specific ethylene/α-olefin/non-conjugated polyene random copolymer rubber $(A_0)$ with a specific silicon compound (hydrosilylation reaction):

[III]

R in the general formula [III] is a monovalent hydrocarbon group of 1 to 12 carbon atoms which may be substituted or not, preferably a monovalent hydrocarbon group free of aliphatic unsaturated bond, including alkyl, e.g., methyl, ethyl, propyl, butyl, hexyl or cyclohexyl; aryl, e.g., phenyl or tolyl; or the above-described group whose hydrogen atom bonded to the carbon atom is totally or partly substituted with a halogen, e.g., fluorine.

X is a hydrolyzable group selected from the group consisting of hydride (—H), halogen, alkoxyl, acyloxy, ketoxymate, amide, acidamide, aminoxy, mercapto, alkenyloxy, thioalkoxy and amino group.

The concrete examples of halogen, alkoxyl, acyloxy, ketoxymate, acid amide and thioalkoxy group are those for X in the general formula [IV], described later.

"a" is an integer of 0 to 2, preferably 0 or 1.

Ethylene/α-Olefin/Non-Conjugated Polyene Random Copolymer Rubber ($A_O$)

The ethylene/α-olefin/non-conjugated polyene random copolymer rubber ($A_O$) for the present invention is a random copolymer of ethylene, α-olefin of 3 to 20 carbon atoms, and non-conjugated polyene.

The concrete examples of the α-olefins of 3 to 20 carbon atoms include propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, and 12-ethyl-1-tetradecene.

Of these, the α-olefins of 3 to 10 carbon atoms are more preferable, in particular propylene, 1-butene, 1-hexene and 1-octene.

These α-olefins may be used either individually or in combination.

The non-conjugated polyene for the present invention is a norbornene compound with a vinyl group at the terminal, represented by the following general formula [I] or [II]:

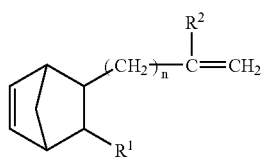

[I]

"n" is an integer of 0 to 10, $R^1$ is hydrogen atom or an alkyl group of 1 to 10 carbon atoms, e.g., methyl, ethyl, propyl, isopropyl, n-butyl, i-butyl, sec-butyl, t-butyl, n-pentyl, i-pentyl, t-pentyl, neopentyl, hexyl, i-hexyl, heptyl, octyl, nonyl, and decyl, $R^2$ is hydrogen atom or an alkyl group of 1 to 5 carbon atoms of the concrete examples for $R^1$,

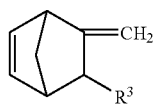

[II]

wherein, $R^3$ is hydrogen atom or an alkyl group of 1 to 10 carbon atoms, the concrete example of which is the same as the example for $R^1$.

The specific examples of the norbornene compounds represented by the general formula [I] or [II] include 5-methylene-2-norbornene, 5-vinyl-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-butenyl)-2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methyl-5-hexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, and 5-(1,2,3-trimethyl-4-pentenyl)-2-norbornene. Of these, more preferable ones are 5-vinyl-2-norbornene, 5-methylene-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(6-heptenyl)-2-norbornene and 5-(7-octenyl)-2-norbornene. The norbornene compounds may be used either individually or in combination.

A non-conjugated polyene shown below may be used, in addition to the above-described one, e.g., 5-vinyl-2-norbornene, within limits not detrimental to the object of the present invention.

More concretely, these non-conjugated polyenes include linear non-conjugated polyenes, e.g., 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene; cyclic non-conjugated polyenes, e.g., methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene and dicyclopentadiene; and trienes, e.g., 2,3-diisopropylidene-5-norbornene, 2-ethylidene-3-isopropylidene-5-norbornene and 2-propenyl-2,2-norbornadiene.

The ethylene/α-olefin/non-conjugated polyene random copolymer rubber ($A_O$) comprising the above components has the following properties.

(i) Molar Ratio of ethylene to α-Olefin of 3 to 20 Carbon Atoms (ethylene/α-Olefin)

The ethylene/α-olefin/non-conjugated polyene random copolymer rubber ($A_O$) contains (a) the unit derived from ethylene and (b) the unit derived from α-olefin of 3 to 20 carbon atoms (sometimes referred simply as "α-olefin" hereinafter) in a molar ratio of 40/60 to 95/5, preferably 50/50 to 90/10, more preferably 55/45 to 85/15, still more preferably 60/40 to 80/20 [(a)/(b) molar ratio].

The random copolymer rubber can give, when its (a)/(b) molar ratio falls in the above range, a rubber composition which is formed into a crosslinked rubber shape excellent in resistance to aging under heating, strength characteristics and rubber elasticity, and, at the same time, excellent in resistance to cold temperature and moldability.

(ii) Iodine Value

The ethylene/α-olefin/non-conjugated polyene random copolymer rubber ($A_O$) has an iodine value of 0.5 to 50 (g/100 g), preferably 0.8 to 40 (g/100 g), more preferably 1 to 30 (g/100 g), still more preferably 1.5 to 25 (g/100 g).

The random copolymer rubber can give, when its iodine value falls in the above range, a desired content of the hydrolyzable silyl group, and a rubber composition which is formed into a crosslinked rubber shape excellent in compression-resistant permanent set and resistant to aging under service conditions (under heating) An iodine value exceeding 50 is disadvantageous costwise and hence undesirable.

(iii) Intrinsic Viscosity

The ethylene/α-olefin/non-conjugated polyene random copolymer rubber ($A_O$) has an intrinsic viscosity [η] of 0.001 to 2 dl/g, determined in decalin kept at 135° C., preferably 0.01 to 2 dl/g, more preferably 0.05 to 1.0 dl/g, still more preferably 0.05 to 0.7 dl/g, still more preferably 0.1 to 0.5 dl/g.

The random copolymer rubber can give, when its intrinsic viscosity [η] falls in the above range, a highly fluidic rubber composition which is formed into a crosslinked rubber shape excellent in strength properties and compression-resistant permanent set.

(iv) Molecular Weight Distribution (Mw/Mn)

The ethylene/α-olefin/non-conjugated polyene random copolymer rubber ($A_O$) has a molecular weight distribution (Mw/Mn) of 3 to 100, determined by gel permeation chromatography (GPC), preferably 3.3 to 75, more preferably 3.5 to 50.

The random copolymer rubber can give, when its molecular weight distribution (Mw/Mn) falls in the above range, a rubber composition which is formed into a crosslinked rubber shape excellent in fabricability and strength properties.

The ethylene/α-olefin/non-conjugated polyene random copolymer rubber ($A_O$) is produced by the random copolymerization with ethylene, an α-olefin of 3 to 20 carbon atoms and a norbornene compound with a vinyl group at the terminal, represented by the general formula [I] or [II] under the conditions of a polymerization temperature: 30 to 60° C. (preferably 30 to 59° C.), a polymerization pressure: 4 to 12 kgf/cm$^2$ (preferably 5 to 8 kgf/cm$^2$), and a molar ratio of charged non-conjugated polyene to ethylene (non-conjugated polyene/ethylene): 0.01 to 0.2, in the presence of a catalyst which contains the compounds (h) and (i) described below as the major ingredients. The random copolymerization is preferably effected in a hydrocarbon solvent.

(h) A soluble vanadium compound represented by the general formula $VO(OR)_nX_{3-n}$ (wherein, R is a hydrocarbon group; X is a halogen atom; and "n" is an integer of 0 to 3) or a vanadium compound represented by $VX_4$ (wherein, X is a halogen atom)

The above-described soluble vanadium compound (h) is the component soluble in the hydrocarbon solvent for the polymerization system. More concretely, the representative ones are vanadium compounds represented by the general formula $VO(OR)_aX_b$ or $V(OR)_cX_d$ (wherein, R is a hydrocarbon group, $0 \leq a \leq 3$, $0 \leq b \leq 3$, $2 \leq a+b \leq 3$, $0 \leq c \leq 4$, $0 \leq d \leq 4$, and $3 \leq c+d \leq 4$), and adducts of the electron donors for these compounds.

Still more concretely, the examples of these compounds include $VOCl_3$, $VO(OC_2H_5)Cl_2$, $VO(OC_2H_5)_2Cl$, $VO(O-iso-C_3H_7)Cl_2$, $VO(O-n-C_4H_9)Cl_2$, $VO(OC_2H_5)_3$, $VOBr_3$, $VCl_4$, $VOCl_3$, $VO(O-n-C_4H_9)_3$ and $VCl_3 \cdot 2OC_6H_{12}OH$.

(i) An organoaluminum compound represented by the general formula $R'_mAlX'_{3-m}$ (wherein, R' is a hydrocarbon group; X is a halogen atom; and "m" is an integer of 1 to 3).

The concrete examples of the organoaluminum compounds (i) include trialkyl aluminum, e.g., triethyl aluminum, tributyl aluminum and triisopropyl aluminum;

dialkyl aluminum alkoxide, e.g., diethyl aluminum ethoxide and dibutyl aluminum butoxide;

alkyl aluminum sesquialkoxide, e.g., ethyl aluminum sesquiethoxide and butyl aluminum sesquibutoxide;

partially alkoxylated alkyl aluminum, having an average composition represented by the general formula $R^1{}_{0.5}Al(OR^1)_{0.5}$ or the like;

dialkyl aluminum halide, e.g., diethyl aluminum chloride, dibutyl aluminum chloride and diethyl aluminum bromide;

partially halogenated alkyl aluminum, e.g., alkyl aluminum sesquihalide (e.g., ethyl aluminum sesquichloride, butyl aluminum sesquichloride and ethyl aluminum sesquibromide), and alkyl aluminum dihalide (e.g., ethyl aluminum dichloride, propyl aluminum dichloride and butyl aluminum dibromide);

partially hydrogenated alkyl aluminum, e.g., dialkyl aluminum hydride (e.g., diethyl aluminum hydride and dibutyl aluminum hydride), and alkyl aluminum dihydride (e.g., ethyl aluminum dihydride and propyl aluminum dihydride); and partially alkoxylated or halogenated alkyl aluminum, e.g., ethyl aluminum ethoxychloride, butyl aluminum butoxychloride and ethyl aluminum ethoxybromide.

It is preferable to use the catalyst comprising the soluble vanadium compound represented by $VOCl_3$ as a compound (h) and a blend of $Al(OC_2H_5)_2Cl/Al_2(OC_2H_5)_3Cl_3$ (blending ratio: 1/5 or more) as compounds (i), because it gives an ethylene/α-olefin/non-conjugated polyene random copolymer rubber ($A_O$) containing the insolubles at 1% or less, after it is treated with a Soxhlet extractor (solvent: boiling xylene, extraction time: 3 hours, and mesh: 325).

A metallocene catalyst, e.g., that disclosed by Japanese Patent Laid-Open Publication No. 40586/1997, maybe used for the copolymerization.

Silicon Compound

The silicon compound useful for the present invention is represented by the following general formula [IV]:

[IV]

R in the general formula [IV] is a monovalent hydrocarbon group of 1 to 12 carbon atoms, which may be substituted or not, preferably free of an unsaturated aliphatic bond, including alkyl, e.g., methyl, ethyl, propyl, butyl, hexyl and cyclohexyl; aryl, e.g., phenyl and tolyl; and these groups whose hydrogen atoms bonded to carbon atom are partially or totally substituted with a halogen atom, e.g., fluorine.

X is a hydride (—H), halogen, alkoxyl, acyloxy, ketoxymate, amide, acid amide, aminoxy, mercapto, alkenyloxy, thioalkoxy, or amino group.

The halogen groups includes chlorine, fluorine, bromine and iodine atoms.

The alkoxyl groups include methoxy, ethoxy, propoxy, propoxybutoxy, isopropoxy, isobutoxy, sec-butoxy, tert-butoxy, pentyloxy, hexyloxy and phenoxy.

The acyloxy groups include acetoxy and beozoyloxy.

The ketoxymate groups include acetoxymate, dimethylketoxymate, diethylketoxymate and cyclohexylmate.

The amide groups include dimethylamide, diethylamide, dipropylamide, dibutylamide and diphenylamide.

The acid amide groups include carboxylic acid amide, maleic acid amide, acrylic acid amide and itaconic acid amide.

Thioalkoxy groups include thiomethoxy, thioethoxy, thiopropoxy, thioisopropoxy, thioisobutoxy, sec-thiobutoxy, tert-thiobutoxy, thiopentyloxy, thiohexyloxy and thiophenoxy.

The amino groups include dimethylamino, diethylamino, dipropylamino, dibutylamino and diphenylamino.

Of these groups, the alkoxyl groups, in particular those of 1 to 4 carbon atoms, are more preferable.

"a" in the general formula [IV] is an integer of 0 to 2, preferably 0 or 1.

The concrete examples of the silicon compounds represented by the general formula [IV] include halogenated silanes, e.g., trichlorosilane, methyldichlorosilane, dimethylchlorosilane, ethyldichlorosilane, diethylchlorosilane, phenyldichlorosilane and diphenylchlorosilane;

alkoxysilanes, e.g., trimethoxysilane, triethoxysilane, methyldimethoxysilane, ethyldimethoxysilane, butyldimethoxysilane, methyldiethoxysilane, ethyldiethoxysilane, butylethoxysilane and phenyldimethoxysilane;

acyloxysilanes, e.g., triacetoxysilane, methyldiacetoxysilane and phenyldiacetoxysilane;

ketoxymatesilanes, e.g., tris(acetoxymate)silane, bis(dimethylketoxymate)methylsilane, bis(methylethylketoxymate)methylsilane, bis(cyclohexylketoxymate)methylsilane;

aminoxysilanes, e.g., aminoxysilane and triaminoxysilane; and aminosilanes, e.g., methyldiaminosilane and triaminosilane. Of these compounds, alkoxysilanes are particularly preferable.

The silicon compound represented by the general formula [IV] is preferably incorporated at 0.01 to 5 mols per mol of the double bond present in the ethylene/α-olefin/non-conjugated polyene random copolymer rubber ($A_0$), more preferably 0.05 to 3 mols.

The hydrosilylation reaction is effected in the presence of a transition metal complex catalyst.

The effective catalysts for the hydrosilylation reaction include a complex compound of a Group VIII transition metal selected from the group consisting of platinum, rhodium, cobalt, palladium and nickel, of which chloroplatinic acid and a platinum/olefin complex are particularly preferable. In this case, the quantity of the catalyst is 0.1 to 10,000 ppm as the metal unit based on the ethylene/α-olefin/non-conjugated polyene random copolymer rubber ($A_0$) as the reactant, preferably 1 to 1000 ppm, more preferably 20 to 200 ppm.

The hydrosilylation reaction is effected at 30 to 180° C., preferably 60 to 150° C., under an elevated pressure, as required, for around 10 seconds to 10 hours.

A solvent may be used, although not essential. When it is to be used, an inert solvent, e.g., an ether or hydrocarbon, is preferable.

In the present invention, the hydrosilylation reaction produces the ethylene/α-olefin/non-conjugated polyene random copolymer rubber (A1) having a hydrolyzable silyl group, represented by one of the following general formulae. It is the ethylene/α-olefin/non-conjugated polyene random copolymer rubber ($A_0$) which has the SiH group of the silicon compound, represented by the general formula [IV], bonded to the double bond.

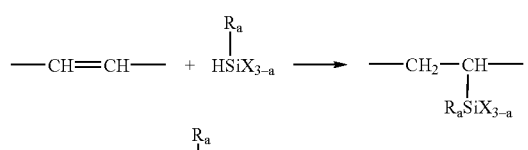

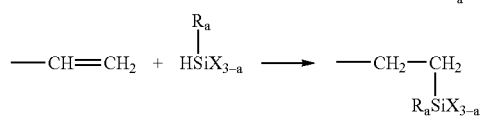

It is possible to add a siloxane hydrogen-modified at one terminal, represented by the following general formula, to the copolymer rubber (A1), in addition to the compound with a hydrolyzable silyl group, represented by the general formula [IV], to impart the weather resistance, slippage and gas permeation characteristic of the siloxane to the copolymer rubber:

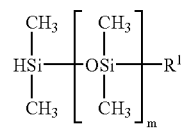

wherein, $R^1$ is a monovalent hydrocarbon group of 1 to 12 carbon atoms, which may be substituted or not, like R for the general formula [IV], particularly preferably an alkyl group; and "m" is an integer of 5 to 200, particularly preferably 10 to 150.

Compound Having a Silanol Group and/or Compound Which Can React With Moisture to Form a Compound Having a Silanol Group in the Molecule (B1)

The compound having a silanol group in the molecule for the present invention is not limited, so long as it has one ≡SiOH group in the molecule. The concrete examples of these compounds useful for the present invention include:

compounds represented by the general formula $R_3SiOH$ (wherein, R is an alkyl or aryl group, which may be substituted or not, and may be the same or different), e.g., $(CH_3)_3SiOH$, $(CH_3CH_2)_3SiOH$, $(CH_3CH_2CH_2)_3SiOH$, $(n-C_4H_9)_3SiOH$, $(sec-C_4H_9)_3SiOH$, $(t-C_4H_9)_3SiOH$, $(C_5H_{11})_3SiOH$, $(C_6H_{13})_3SiOH$, $(C_6H_5)_3SiOH$, $(C_6H_5)_2Si(CH_3)(OH)$, $(C_6H_5)Si(CH_3)_2(OH)$, $(C_6H_5)_2Si(C_2H_5)(OH)$, $(C_6H_5)Si(C_2H_5)_2(OH)$, $(C_6H_5)$—$CH_2Si(C_2H_5)_2(OH)$,

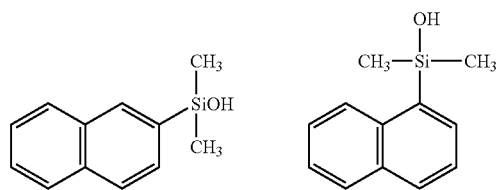

and cyclic polysiloxane compounds having a silanol group,

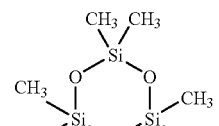

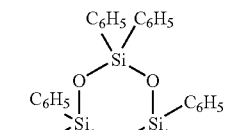

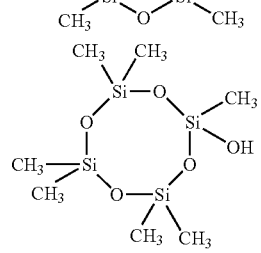

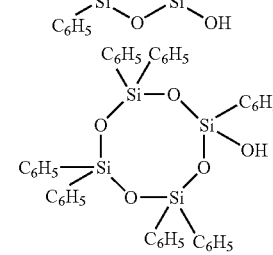

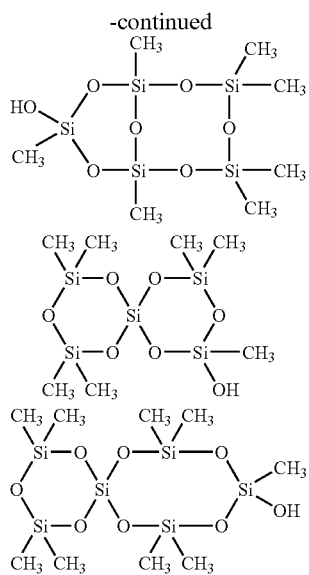

linear polysiloxane compounds having a silanol group, e.g.,

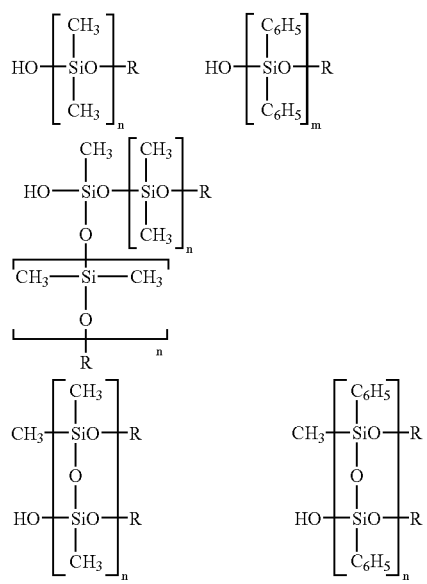

compounds having a silanol group bonded to the terminal of a polymer whose main chain comprises silicon and carbon, e.g.,

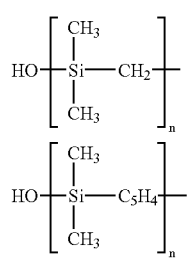

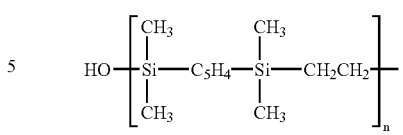

componds having a silanol group bonded to the polysilane's main chain at the terminal, e.g.,

compounds having a silanol group bonded to the terminal of a polymer whose main chain comprises silicon, carbon and oxygen, e.g.,

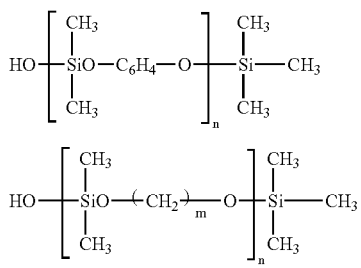

The compound having ≡SiOH group at a higher content shows the higher effect at the same quantity. $(CH_3)_3SiOH$ and $(CH_3CH_2)_3SiOH$ are more preferable from this respect, and $(C_6H_5)_3SiOH$, $(C_6H_5)_2Si(CH_3)(OH)$ and $(C_6H_5)Si(CH_3)_2(OH)$ are more preferable for their handling easiness and stability in air.

The compounds which can react with moisture to form a compound having a silanol group in the molecule for the present invention include the followings, each of which is known as the silylation agent:

$(CH_3)_3Si-NH-Si(CH_3)_3$, $(CH_3)_3SiN(CH_3)_2$, $(CH_3)_3SiO-C(CH_3)(NSi(CH_3)_3)$,

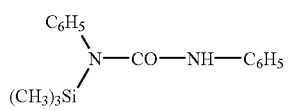

$(CH_3)_3Si-NH-CO-NH-Si(CH_3)_3$, and

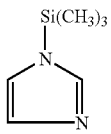

$CF_3$—$SO_2$—$OSi(CH_3)_3$. They can be suitably used for the present invention, and $(CH_3)_3Si$—$NH$—$Si(CH_3)_3$ is particularly preferable for high content of $\equiv SiOH$ group in the hydrolyzable product.

The compound (B1) has the effects of improving tensile characteristics (i.e., decreasing modulus and increasing elongation) of the cured product, and also residual tackiness. The improved tensile characteristics is conceivably due to the following phenomenon: the silicon compound or the silanol compound as the hydrolysis product thereof reacts with the hydrolyzable silyl group in the silyl-containing ethylene/α-olefin/non-conjugated polyene random copolymer rubber (A1) in such a way to cap the group, to decrease the number of the crosslinking points of the copolymer rubber (A1) and, in turn, increase the molecular weight between the crosslinking points, with the result that the cured product of low modulus and high elongation is produced. The phenomenon involved in improvement of the residual tackiness is not well understood. It is, however, considered that the increased molecular weight between the crosslinking points is accompanied by the decrease in number of the free molecular chains/branches that are not involved in the crosslinking, to decrease the residual tackiness.

Quantity of the compound (B1) to be incorporated varies depending on the expected properties of the cured product. It is incorporated at a rate determined by the ratio of the silanol ($\equiv SiOH$) equivalents per mol of the hydrolyzable silyl group in the silyl-containing ethylene/α-olefin/non-conjugated polyene random copolymer rubber (A1). The compound (B1) is incorporated normally at 0.1 to 0.9 equivalents of the silanol group per mol of the silyl-containing ethylene/α-olefin/non-conjugated polyene random copolymer rubber (A1), to give the cured product of low modulus and high elongation. It is necessary, however, to leave the hydrolyzable silyl group uncapped despite the presence of the compound (B1) at a rate of at least 0.1 groups in the molecule. The compound (B1) may be incorporated at more than 0.9 equivalent of the silanol group, which, however, is not recommended from the economic consideration. The composition incorporating the compound (B1) at 0.3 equivalents or more, preferably 0.5 equivalents or more, may not be sufficiently cured and left uncured. Surprisingly, however, the thin layer portion on the uncured composition surface is sufficiently cured to be completely tackiness-free. In other words, the composition is semi-cured, sufficiently cured in the surface portion but left uncured inside. Such a composition can suitably find use for sealants, e.g., the so-called mastic sealant.

The methods for incorporating the compound (B1) fall into 3 general categories. The first method merely adds the compound (B1) to the silyl-containing ethylene/α-olefin/non-conjugated polyene random copolymer rubber (A1), wherein it is uniformly dispersed and dissolved by carefully setting the conditions, e.g., temperature and stirring conditions, as required in consideration of the compound (B1) properties. In this case, the composition may not be necessarily transparent completely, and can sufficiently achieve the objectives even when it is not transparent, so long as the composition (B1) is sufficiently dispersed therein. A dispersibility improver, e.g., surfactant, may be used, as required.

The second method mixes a given quantity of the compound (B1) with the final product, when it is used. For example, when the composition is used as a two-liquid type sealant, the compound (B1) may be mixed as the third component with the base and curing agent for the composition.

The third method reacts the compound (B1) beforehand with the silyl-containing ethylene/α-olefin/non-conjugated polyene random copolymer rubber (A1) in the presence of a tin-based, titanate ester-based, acid or basic catalyst, as required, or in the presence of water when the compound (B1) is a compound which can react with moisture to form a compound having a silanol group in the molecule, followed by evaporation under a vacuum and heating.

The concrete examples of the catalysts useful for the present invention include:

titanate esters, e.g., those of tetrabutyl titanate and tetrapropyl titanate;

organotin compounds, e.g., dibutyl tin dilaurate, dibutyl tin maleate, dibutyl tin diacetate, tin octylate and tin naphthenate; lead octylate;

amine-based compounds and salts of these compounds and carboxylates, e.g., butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(dimethylaminomethyl) phenol, morpholine, N-methyl morpholine, and 1,3-diazabicyclo(5,4,6)undecene-7 (DBU);

low-molecular-weight polyamide resins produced by the reactions of excessive quantities of polyamines and polybasic acids;

products of the reactions between excessive quantities of polyamines and epoxy compounds; and silanol condensing catalysts, e.g., silane coupling agents containing amino group (e.g., γ-aminopropyl trimethoxy silane and N-(β-aminoethyl)aminopropyl methyldimethoxy silane). These compounds may be used either individually or in combination.

The curable elastomer composition (1) of the present invention thus produced may be incorporated, as required, with various additives, e.g., white carbon, carbon black, calcium carbonate, titanium oxide, talc, asbestos and glass fibers, which serve, e.g., as a reinforcing or non-reinforcing filler, a plasticizer, an antioxidant, an ultraviolet ray absorber, a pigment, or a flame retardant, so as to be useful as an adhesive, tackifier, paint and sealant compositions, waterproof material, spray material, shaping material or casting rubber material. Of these, application to sealant and tackifiner agent compositions is especially useful.

The curable elastomer composition (1) of the present invention, when used as a sealant, may be incorporated, as required, with a plasticizer, a filler, a reinforcing agent, a dripping inhibitor, a colorant, an aging inhibitor, an adhesion promoter, a curing catalyst or a property adjuster.

The plasticizers useful for the present invention include:

phthalate esters, e.g., dibutylphthalate, diheptyl phthalate, di(2-ethylhexyl) phthalate, butyl benzyl phthalate and bytyl phthalyl butyl glycolate;

non-aromatic, dibasic acid esters, e.g., dioctyl adipate and dioctyl cebacate;

esters of polyalkylene glycol, e.g., diethylene glycol dibenzoate and triethylene glycol dibenzoate;

phosphate esters, e.g., tricresyl phosphate and tributyl phosphate;

chlorinated paraffins; and hydrocarbon-based oils, e.g., polybutene, hydrogenated polybutene, ethylene/α-olefin oligomer, α-methyl styrene oligomer, biphenyl, triphenyl, triaryl dimethane, alkylene triphenyl, liquid polybutadiene, hydrogenated liquid polybutadiene, alkyl diphenyl, partially hydrogenated ter-phenyl, paraffin oil, naphthene oil and atactic polypropylene. The above compound is selected, depending on specific purposes, e.g., adjustment of characteristics and properties. They may be used either individually or in combination, although not necessarily essential.

Of these, the hydrocarbon-based compounds free of unsaturated group (e.g., hydrogenated polybutene, hydrogenated liquid polybutadiene, paraffin oil, naphthene oil and atactic polypropylene) are more preferable, because they are well compatible with various components for the composition of the present invention, affecting curing speed of the rubber composition to only a limited extent, giving the cured product of high resistance to weather, and inexpensive.

The above plasticizer may replace the solvent used when a hydrolyzable silyl group is introduced in the ethylene/α-olefin/non-conjugated polyene random copolymer rubber ($A_0$), in order to adjust reaction temperature and viscosity of the reaction system.

The fillers and reinforcing agents useful for the present invention include limestone powder and calcium carbonate; calcium carbonate surface-treated with a fatty acid, resin acid, or cationic or anionic surfactant; magnesium carbonate; talc; titanium oxide; barium sulfate; alumina; powder of metal (e.g., aluminum, zinc or iron); bentonite; kaolin clay; fumed silica; quartz powder; and carbon black. These are the common ones, and one or more of these compounds may be used. Of these, the filler or reinforcing agent capable of imparting transparency, e.g., fumed silica, can give the sealant with high transparency.

The dripping inhibitors useful for the present invention include a hydrogenated castor oil derivative; and metallic soaps, e.g., calcium stearate, aluminum stearate and barium stearate. A dripping inhibitor may not be necessary, depending on purposes of the curable composition, and a filler or reinforcing agent incorporated.

The colorants useful for the present invention include the common inorganic and organic pigments, and dyes, each of which may be used, as required.

The property adjusters useful for the present invention include various silane coupling agents: such as alkyl alkoxy silanes, e.g., methyltrimethoxy silane, dimethyldimethoxy silane, trimethylmethoxy silane and n-propyltrimethoxy silane; alkyl isopropenoxy silanes, e.g., dimethyldiisopropenoxy silane, methyltriisopropenoxy silane and γ-glycidoxypropylmethyldiisopropenoxy silane; alkoxy silanes having a functional group, e.g., γ-glycidoxypropylmethyldimethoxy silane, γ-glycidoxypropyltrimethoxy silane, vinyl trimethoxy silane, vinyldimethylmethoxysilane, γ-aminopropyltrimethoxysilane, N-(β-aminoethyl)aminopropylmethyldimethoxy silane, γ-mercaptopropyltrimethoxy silane and γ-mercaptopropylmethyldimethoxy silane; silicone varnishes; and polysiloxanes.

The above property adjuster can increase hardness, or decrease hardness and increase elongation of the curable elastomer composition (1) of the present invention, when it is cured.

Use of an adhesion promoter is not essential, because the silyl-containing ethylene/α-olefin/non-conjugated polyene random copolymer rubber (A1) per se is adhesive to glass, other ceramic materials and metals, and adhesive to materials in a wider range in the presence of a primer of every kind. However, the composition can improve adhesion to materials in a still wider range, when incorporated with one or more types of epoxy resin, phenolic resin, varying silane coupling agents, alkyl titanates or aromatic polyisocyanates.

The curing catalysts useful for the present invention include: titanate esters, e.g., those of tetrabutyl titanate and tetrapropyl titanate; organotin compounds, e.g., dibutyl tin dilaurate, dibutyl tin maleate, dibutyl tin diacetate, tin octylate and tin naphthenate; lead octylate; amine-based compounds and salts of these compounds and carboxylates, e.g., butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris (dimethylaminomethyl) phenol, morpholine, N-methyl morpholine, and 1,3-diazabicyclo(5,4,6) undecene-7 (DBU); low-molecular-weight polyamide resin products of the reactions between excessive quantities of polyamines and polybasic acids; products of the reactions between excessive quantities of polyamines and epoxy compounds; and known silanol condensing catalysts, e.g., silane coupling agents containing amino group (e.g., γ-aminopropyl trimethoxy silane and N-(β-aminoethyl)aminopropyl methyldimethoxy silane). These compounds may be used either individually or in combination. The curing catalyst may be dissolved in a solvent for, e.g., improving workability and reducing viscosity. The solvent useful for the above purposes include aromatic hydrocarbon-based ones, e.g., toluene and xylene; ester-based ones, e.g., ethyl acetate, butyl acetate, amyl acetate and cellosolve acetate; and ketone-based ones, e.g., methylethylketone, methylisobutylketone and diisobutylketone. The solvent may be used during the process of producing the silyl-containing ethylene/α-olefin/non-conjugated polyene random copolymer rubber (A1).

The aging inhibitors useful for the present invention include a common antioxidant, e.g., a sulfur-based one, radical inhibitor and ultraviolet ray absorber, although use of the aging inhibitor is not essential.

The sulfur-based aging inhibitors useful for the present invention include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, mercaptols, monothio acids, polythio acids, thioamides, and sulfoxides.

More concretely, the sulfur-based aging inhibitors include:

mercaptans, e.g., 2-mercaptobenzothiazole; salts of mercaptans, e.g., zinc salt of 2-mercaptobenzothiazole;

sulfides, e.g., 4,4'-thio-bis(3-methyl-6-t-butyl phenol), 4,4'-thio-bis(2-methyl-6-t-butyl phenol), 2,2'-thio-bis (4-methyl-6-t-butyl phenol), bis(3-methyl-4-hydroxy-5-t-butylbenzyl) sulfide, terephthaloyl di(2,6-di-methyl-4-t-butyl-3-hydroxybenzyl) sulfide, phenothiazine, 2,2'-thio-bis-(4-octylphenol) nickel, dilauryl thiodipropionate, distearyl thiodipropionate, dimyristyl thiodipropionate, ditridecyl thiodipropionate, distearylβ,β'-thiodibutyrate, lauryl-stearylthiodipropionate and 2,2-thio[diethyl-bis-3(3,5-di-t-butyl-4-hydroxy phenol)propionate];

polysulfides, e.g., 2-benzothiazole disulfide;

dithiocarboxylates, e.g., zinc dibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethylcarbamate;

thioureas, e.g., 1-butyl-3-oxy-diethylene-2-thiourea, di-o-tolyl-thiourea and ethylene thiourea; and thiophosphates, e.g., trilauryltrithiophosphate.

The above-described sulfur-based aging inhibitor prevents decomposition/aging of the main chain under heating much more efficiently than the other types for the curable rubber composition of the present invention, controlling the problems, e.g., residual surface tackiness.

The radical inhibitors useful for the present invention include phenol-based ones, e.g., 2,2-methylene-bis(4-methyl-6-t-butyl phenol) and tetrakis[methylene-3-(3,5-di-t-butyl-4-hydroxyphenyl)propio nate] methane; and amine-based ones, e.g., phenyl-β-naphthylamine, α-naphthylamine and N,N'-sec-butyl-p-phenylenediamine, phenothiazine and N,N'-diphenyl-p-phenylenediamine.

The ultraviolet ray absorbers useful for the present invention include 2-(2'-hydroxy-3',5'-di-t-butylphenyl) benzotriazole and bis(2,2,6,6-tetramethyl-4-piperidine) cebacate.

The aging inhibitor is incorporated at about 0.1 to 20 parts by weight per 100 parts by weight of the silyl-containing ethylene/α-olefin/non-conjugated polyene random copolymer rubber (A1), preferably 1 to 10 parts by weight.

The sealant composition maybe prepared for a one-liquid type, where the composition of all of the components is prepared beforehand and sealed, and cured with moisture in air after it is applied, or for a two-liquid type, where the separately prepared curing agent composition of, e.g., a curing catalyst, a filler, a plasticizer and water as the curing agent is mixed with the silyl-containing ethylene/α-olefin/non-conjugated polyene random copolymer rubber before use.

When the sealant composition is used for the one-liquid type, it is preferable that the water-containing component is dehydrated/dried beforehand, or dehydrated during mixing/kneading under a vacuum, because it contains all of the components before use.

When used for the two-liquid type, on the other hand, the sealant composition may contain water to some extent, because the silyl-containing ethylene/α-olefin/non-conjugated polyene random copolymer rubber (A1) is not incorporated beforehand with the curing catalyst and hence will not be gelled even in the presence of water. Nevertheless, however, it is preferable to dehydrate/dry the composition, when it is required to have storage stability for extended periods.

The preferable dehydration/drying method is drying under heating for the solid, e.g., powdery, composition, and dehydration under a vacuum or in the presence of synthetic zeolite, activated alumina or silica gel for the liquid composition. Moreover, it maybe dehydrated in the presence of a small quantity of an isocyanate compound, where the isocyanate group reacts with water. The composition will have still improved storage stability, when treated for the above-mentioned dehydration/drying and incorporated with a lower alcohol, e.g., methanol or ethanol; or alkoxysilane compound, e.g., n-propyltrimethoxy silane, vinyl methyldimethoxysilane, γ-mercaptopropylmethyldimethoxysilane and γ-glycidoxypropyltrimethoxysilane.

The curable elastomer composition (1) of the present invention, when used as a tackifier, may be incorporated, as required, with a curing catalyst, an aging inhibitor, a plasticizer, a reinforcing agent, a property adjuster or a solvent, which can be used for the sealant. It may be further incorporated, depending on its purposes, a known additive commonly used for tackifiers, e.g., rosin ester resin, phenol resin, xylene resin, xylene/phenol resin, coumarone resin, petroleum-based resin (e.g., aromatic-, aliphatic/aromatic copolymer- or alicyclic-based resin), terpene resin, terpene/phenol resin or low-molecular-weight polystyrene resin. The tackifier composition can find wide uses, e.g., tapes, sheets, labels and foils. For example, the above-described tackifier composition, of non-solvent liquid, solvent type, emulsion type or hot-melt type, is applied to a base material, e.g., synthetic resin or modified natural film, paper, any type of cloth, metallic foil, metallized plastic foil, asbestos or cloth of glass fibers, and cured at normal or elevated temperature after being exposed to moisture or water.

Curable Elastomer Composition (1) and its Uses

The curable elastomer composition (1) of the present invention contains the curable composition with the silyl-containing ethylene/α-olefin/non-conjugated polyene random copolymer rubber as the component (A1), as described in detail earlier. More concretely, it contains the organic polymer (Z) containing the hydrolyzable silyl group represented by the general formula [III] and essentially no unsaturated double bond in the main chain, and the compound (B1) having a silanol group and/or the compound which can react with moisture to form a compound having a silanol group in the molecule.

It can be suitably used for electric/electronic device members, transportation machines, and civil engineering/construction, medical and leisure areas, as described in DISCLOSURE OF THE INVENTION.

The curable elastomer composition (1) of the present invention can be used as a sealant, a potting agent, a coating material or an adhesive for electric/electronic device members, transportation machines, and civil engineering/construction, medical and leisure areas.

The curable elastomer composition (1) of the present invention is developed by the inventors of the present invention, who have extensively studied a composition which can replace the propylene oxide-based polymer described in BACKGROUND OF THE INVENTION, and give the cured product improved in elongation and residual surface tackiness, faster in curing speed and higher in resistance to weather. They have found that the composition containing a silyl-containing ethylene/α-olefin/non-conjugated polyene random copolymer rubber having a structural unit derived from a norbornene compound as the non-conjugated polyene with a specific terminal vinyl group, and containing a specific hydrolyzable silyl group in the molecule and a compound having a silanol group and/or a compound which can react with moisture to form a compound having a silanol group in the molecule is faster in curing speed, can give the cured product of higher resistance to weather, improved in elongation and residual surface tackiness, reaching the present invention.

Japanese Patent Laid-Open Publication Nos. 34066/1986 and 34067/1986, cited earlier, are completely silent on an ethylene/α-olefin/non-conjugated polyene random copolymer rubber having a structural unit derived from a norbornene compound with a specific terminal vinyl group, and containing a specific hydrolyzable silyl group in the molecule.

Curable Rubber Composition (2)

The curable rubber composition (2) of the present invention is composed of the silyl-containing ethylene/α-olefin/non-conjugated polyene random copolymer rubber (A1), a tetravalent tin compound (C), a silicon compound (B2) and, as required, a silane coupling agent containing isocyanate group.

Tetravalent Tin Compound (C)

The curable rubber composition (2) of the present invention contains a tetravalent tin compound (C) as the high-activity, silanol condensing catalyst.

More concretely, the tetravalent tin compounds (C) useful for the present invention include:
tin carboxylates,
dialkyl tin oxides, and
tin compounds represented by the general formula $Q_d Sn(OZ)_{4-d}$ or $[Q_2Sn(OZ)]_2O$ (wherein, Q is a monovalent hydrocarbon group of 1 to 20 carbon atoms; Z is a monovalent hydrocarbon group of 1 to 20 carbon atoms or an organic group having a functional group which can form a coordinate bond with Sn within its structure; and "d" is an integer of 1 to 3).

The other effective curing catalyst significantly accelerating the silanol condensation is the product by the reactions between a tetravalent tin compound (e.g., dialkyl tin oxide or dialkyl tin diacetate) and low-molecular-weight silicon compound having a hydrolyzable silicon group (e.g., tetraethoxy silane, methyltriethoxy silane, diphenyl dimethoxy silane or phenyl trimethoxy silane).

Of these, the tin compounds represented by the above-described general formula (i.e., chelate compounds, e.g., dibutyl tin bisacetylacetate, or tin alcolates) are more preferable, because they have high activity as the silanol condensing catalysts, and accelerate curing of the rubber composition. The tin alcolates are still more preferable, because they accelerate curing of the curable rubber composition of the present invention more notably, and have longer workable time, i.e., time span for which works, e.g., spatula finishing, can be done after the main ingredient is kneaded with the curing agent.

The tin carboxylates useful for the present invention include: dibutyl tin dilaurate, dibutyl tin diacetate, dibutyl tin diethylhexanolate, dibutyl tin dioctate, dibutyl tin dimethylmaleate, dibutyl tin diethylmaleate, dibutyl tin dibutylmaleate, dibutyl tin diisooctylmaleate, dibutyl tin ditridecylmaleate, dibutyl tin dibenzylmaleate, dibutyl tin maleate, dioctyltindiacetate, dioctyltindistearate, dioctyl tin dilaurate, dioctyl tin diethylmaleate and dioctyl tin diisooctylmaleate.

The dialkyl tin oxides useful for the present invention include: dibutyl tin oxide, dioctyl tin oxide, and a mixture of dibutyl tin oxide and a phthalate ester.

The concrete examples of the chelate compounds include:

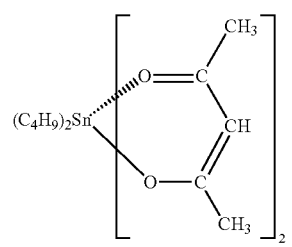

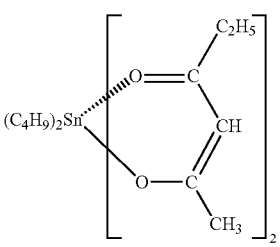

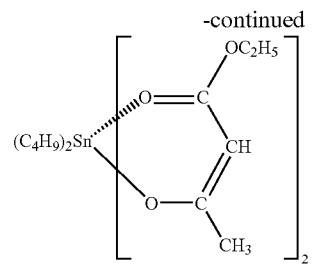

The concrete examples of the tin alcolates include:

$(C_4H_9)_3SnOCH_3$, $(C_4H_9)_2Sn(OCH_3)_2$, $C_4H_9Sn(OCH_3)_3$, $Sn(OCH_3)_4$, $(C_4H_9)_2Sn(OC_3H_7)_2$, $(C_4H_9)_2Sn(OC_4H_9)_2$, $(C_4H_9)_2Sn(OC_8H_{17})_2$, $(C_4H_9)_2Sn(OC_{12}H_{25})_2$, $(C_8H_{17})_2Sn(OCH_3)_2$,

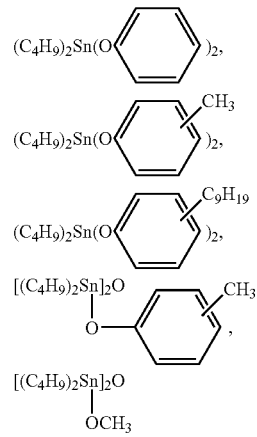

Of these, dialkyl tin dialkoxide is more preferable. Especially, dibutyl tin dimethoxide is most preferable, because of its low cost and high availability.

The tetravalent tin compound (C), working as the silanol condensing catalyst, may be used in combination with another silanol condensing catalyst, so long as the object of the present invention is attained.

The concrete examples of such silanol condensing catalysts include:
titanate esters, e.g., those of tetrabutyl titanate and tetrapropyl titanate;
organoaluminum compounds, e.g., aluminum trisacetylacetonate, aluminum trisethylacetoacetate and diisopropoxy aluminum ethylacetoacetate;
chelate compounds, e.g., zirconium tetraacetylacetonate and titanium tetraacetylacetonate;
lead octylate;

amine-based compounds, e.g., butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris (dimethylaminomethyl) phenol, morpholine, N-methyl morpholine, 2-ethyl-4-methylimidazole, and 1,8-diazabicyclo(5,4,0) undecene-7 (DBU);

salts of these amine-based compounds and carboxylates;

low-molecular-weight polyamide resins produced by the reactions of excessive quantities of polyamines and polybasic acids;

products of the reactions between excessive quantities of polyamines and epoxy compounds; and silane coupling agents containing amino group, e.g., γ-aminopropyl trimethoxy silane and N-(β-aminoethyl) aminopropyl methyldimethoxy silane;

and other known silanol condensing catalysts, e.g., acidic and basic catalysts.

These compounds may be used either individually or in combination.

The tetravalent tin compound (C) is incorporated normally at 0.01 to 50 parts by weight per 100 parts by weight of the silyl-containing ethylene/α-olefin/non-conjugated polyene random copolymer rubber (A1), preferably 0.1 to 20 parts by weight, more preferably 1 to 10 parts by weight. The tetravalent tin compound (C) as the silanol curing catalyst, when used in the above range, sufficiently accelerates the curing reaction at a high speed, and gives the good cured product without causing local heat or foaming while the rubber composition is being cured. Moreover, the composition has a relatively long pot life, and good workability.

Silicon Compound (B2)

The curable rubber composition (2) of the present invention may be incorporated with a silicon compound (B2) having no silanol groups represented by the following general formula [V], in order to further enhance activity of the tetravalent tin compound (C) as the silanol condensing catalyst:

$$R^4{}_a Si(OR^5)_{4-a} \quad [V]$$

wherein, $R^4$ and $R^5$ are each a hydrocarbon group of 1 to 20 carbon atoms which may be substituted or not, and "a" is 0, 1, 2, or 3.

The concrete examples of the silicon compounds (C) useful for the present invention include:

$(CH_3)_3SiOCH_3$, $(CH_3)_2Si(OCH_3)_2$, $(CH_3)_3SiOC_2H_5$, $(CH_3)_2Si(OC_2H_5)_2$, $(CH_3)_3SiOC_6H_5$, $(CH_3)_2Si(OC_6H_5)_2$, $(C_6H_5)_3SiOCH_3$, $(C_6H_5)_2Si(OCH_3)_2$, $(C_6H_5)_3SiOC_2H_5$, $(C_6H_5)_2Si(OC_2H_5)_2$, $(C_6H_5)_3SiOC_6H_5$, $(C_6H_5)_2Si(OC_6H_5)_2$, $CH_3Si(OCH_3)_3$, $C_6H_5Si(OCH_3)_3$, $CH_3Si(OC_2H_5)_3$, $C_6H_5Si(OC_2H_5)_3$, $CH_3Si(OC_6H_5)_3$, $C_6H_5Si(OC_6H_5)_3$, $C_6H_5Si(CH_3)(OCH_3)_2$, $(C_6H_5)_2Si(CH_3)(OC_6H_5)$, $C_6H_5Si(CH_3)_2(OCH_3)$, $(C_6H_5)_2Si(CH_3)(OCH_3)$, $(C_6H_5)_2Si(OC_4H_9)_2$, $(C_4H_9)_2Si(OC_6H_5)_2$, $(C_6H_5)_2Si(OC_8H_{17})_2$, $(C_8H_{17})_2Si(OC_6H_5)_2$, $(C_6H_5)_2Si(OC_{12}H_{25})_2$, $(C_{12}H_{25})_2Si(OC_6H_5)_2$, $(CH_3)_2Si(OC_4H_9)_2$, $(C_2H_5)_3SiOCH_3$, $(CH_3)_2Si(OC_8H_{17})_2$, $(C_2H_5)_2Si(OCH_3)_2$, $(CH_3)_2Si(OC_{12}H_{25})_2$, $C_2H_5Si(OCH_3)_3$,

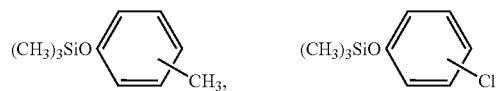

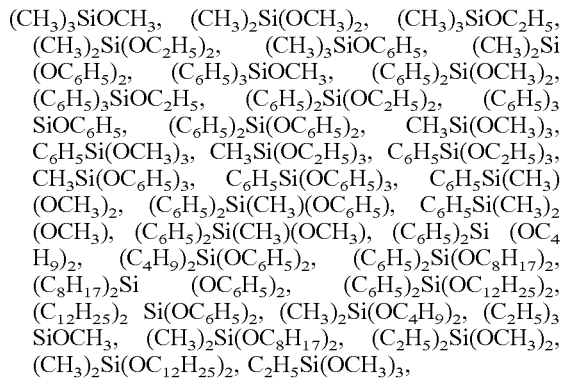

Of these compounds, those represented by the general formula [V] with $R^4$ of an aryl group of 6 to 20 carbon atoms are more preferable, because of their notable effect of accelerating curing of the composition. These compounds include phenyltrimethoxysilane, phenylmethyldimethoxysilane, phenyldimethylmethoxysilane, diphenyldimethoxysilane, diphenyldiethoxysilane and triphenylmethoxysilane. Especially, diphenyldimethoxysilane and diphenyldiethoxysilane are most preferable, because of their low cost and high availability.

The silicon compound (B2) is incorporated normally at 0.001 to 50 parts by weight per 100 parts by weight of the silyl-containing ethylene/α-olefin/non-conjugated polyene random copolymer rubber (A1), preferably 0.01 to 20 parts by weight, more preferably 0.1 to 10 parts by weight. The silicon compound (B2), when used in the above range, brings the notable effect of accelerating curing of the composition without deteriorating hardness and tensile strength of the cured product.

Other Components

The curable rubber composition of the present invention (2) may be incorporated, as required, with one or more additives within limits not detrimental to the object of the present invention. These additives useful for the present invention include silane coupling agent containing isocyanate group, anti-settling agent and leveling agent; cellulose, nitrocellulose and cellulose acetate butyrate; resin, e.g., alkyd, acrylic, vinyl chloride, chlorinated propylene, chlorinated rubber and polyvinyl butyral resin; adhesion improver; property adjuster; storage stability improver; plasticizer; filler; aging inhibitor; ultraviolet ray absorber; metal deactivator; ozone-caused aging inhibitor; light stabilizer; amine-based radical chaining inhibitor; phosphorus-based peroxide decomposer; lubricant; pigment; and foaming agent.

The silane coupling agent containing isocyanate group can improve adhesion strength of the cured silyl-containing ethylene/α-olefin/non-conjugated polyene random copolymer rubber (A1) to an object or base.

The silane coupling agent containing isocyanate group is a compound having a silicon atom containing group with a hydrolyzable group bonded to the silicon atom (hydrolyzable silicon group) and isocyanate group. The concrete examples of the hydrolyzable silicon group are those represented by the general formula [III] with X of hydrolyzable group, i.e., hydride, halogen, alkoxyl, acyloxy, ketoxymate, amide, acid amide, aminoxy, thioalkoxy or amino group. Of these, a silicon group having an alkoxyl group, e.g., methoxy or ethoxy, is more preferable for speed of hydrolysis. The silane coupling agent has preferably 2 or more hydrolyzable groups, more preferably 3 or more.

The concrete examples of the silane coupling agent containing isocyanate group useful for the present invention include γ-isocyanate propyltrimethoxysilane, γ-isocyanate propyltriethoxysilane, γ-isocyanate propylmethyldiethoxysilane and γ-isocyanate propylmethyldimethoxysilane.

The curable rubber composition (2) of the present invention may be further incorporated with a silane coupling agent other than the one containing isocyanate group or a tackifier other than a silane coupling agent.

The silane coupling agents free of isocyanate group useful for the present invention include silanes containing amino group, e.g., γ-aminopropyltrimethoxysilane, γ-aminopropyltriethoxysilane, γ-aminopropylmethyldimethoxysilane, γ-aminopropylmethyldiethoxysilane, γ-(2-aminoethyl) aminopropyltrimethoxysilane, γ-(2-aminoethyl) aminopropylmethyldimethoxysilane, γ-(2-aminoethyl) aminopropyltriethoxysilane, γ-(2-aminoethyl) aminopropylmethyldiethoxysilane, γ-ureidepropyltrimethoxysilane, N-phenyl-γ-aminopropyltrimethoxysilane, N-benzyl-γ-aminopropyltrimethoxysilane and N-vinylbenzyl-γ-aminopropyltriethoxysilane;

mercapto-containing silanes, e.g., γ-mercaptopropyltrimethoxysilane, γ-mercaptopropyltriethoxysilane, γ-mercaptopropylmethyldimethoxysilane and γ-mercaptopropylmethyldiethoxysilane;

epoxy-containing silanes, e.g., γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane and β-(3,4-epoxycyclohexyl)ethyltriethoxysilane;

carboxysilanes, e.g., β-carboxyethyltriethoxysilane, β-carboxyethylphenylbis(2-methoxyethoxy)silane and N-β-(carboxymethyl)aminoethyl-γ-aminopropyltrimethoxysilane;

silanes containing a vinyl type unsaturated group, e.g., vinyltrimethoxysilane, vinyltriethoxysilane, γ-methacryloyloxypropylmethyldimethoxysilane and γ-acryloyloxypropylmethyltriethoxysilane;

halogen-containing silanes, e.g., γ-chloropropyltrimethoxysilane; and silane isocyanurates, e.g., tris(trimethoxysilyl)isocyanurate.

The derivatives produced by modifying some of the above may be also used as the silane coupling agents. They include amino-modified silyl polymer, silylated aminopolymer, unsaturated aminosilane complex, phenylaminoalkyl(long chain)silane, aminosilylated silicone, and silylated polyester.

The above isocyanate-containing silane coupling agents may be used either individually or in combination.

The isocyanate-containing silane coupling agent is incorporated normally at 0.1 to 20 parts by weight per 100 parts by weight of the silyl-containing
ethylene/α-olefin/non-conjugated polyene random copolymer rubber (A1), preferably 0.2 to 15 parts by weight, more preferably 0.5 to 10 parts by weight.

The isocyanate-containing silane coupling agent, when incorporated in the curable rubber composition (2) of the present invention, brings about the effects of significantly improving adhesion of the composition to a variety of objects, e.g., in organic bases of glass, aluminum, stainless steel, zinc, copper and mortar, and organic bases of vinyl chloride, acrylic resin, polyester, polyethylene, polypropylene and polycarbonate, in the presence or absence of a primer, inter alia more significantly in the absence of a primer.

For the adhesion improvers, the commonly used adhesives, silane coupling agents (e.g., aminosilane and epoxysilane compounds) and others may be used. The concrete examples of the adhesion improvers include phenol resin, epoxy resin, γ-aminopropyl trimethoxy silane, N-(β-aminoethyl)aminopropyl methyldimethoxy silane, coumarone/indene resin, rosin ester resin, terpene/phenol resin, α-methyl styrene/vinyl toluene copolymer, polyethylmethyl styrene, alkyl titanate, and aromatic polyisocyanate. The adhesion improver is incorporated preferably at about 1 to 50 parts by weight per 100 parts by weight of the silyl-containing
ethylene/α-olefin/non-conjugated polyene random copolymer rubber (A1), more preferably 5 to 30 parts by weight.

The storage stability improvers useful for the present invention include compounds with silicon to which a hydrolyzable group is bonded and esters of ortho-organic acids. The concrete examples of the storage stability improvers include methyltrimethoxy silane, methyltriethoxy silane, tetramethoxy silane, ethyltrimethoxy silane, dimethyldiethoxy silane, trimethylisobutoxy silane, trimethyl(n-butoxy) silane, n-butyltrimethoxy silane, and methyl orthoformate.

The storage stability improver is incorporated preferably at about 0.5 to 20 parts by weight per 100 parts by weight of the silyl-containing ethylene/α-olefin/non-conjugated polyene random copolymer rubber (A1), more preferably 1 to 10 parts by weight.

The plasticizer useful for the present invention is also not limited, and any commonly used one may be used. However, it is preferably the one compatible with each component for the curable rubber composition (2) of the present invention.

The concrete examples of these plasticizers include:

hydrocarbon-based compounds, e.g., polybutene, hydrogenated polybutene, ethylene/α-olefin co-oligomer, α-methyl styrene oligomer, biphenyl, triphenyl, triaryl dimethane, alkylene triphenyl, liquid polybutadiene, hydrogenated liquid polybutadiene, alkyl diphenyl, partially hydrogenated ter-phenyl, paraffin oil, naphthene oil and atactic polypropylene;

parafin chlorides;

phthalate esters, e.g., dibutyl phthalate, diheptyl phthalate, di(2-ethylhexyl) phthalate, butyl benzyl phthalate and bytyl phthalyl butyl glycolate;

non-aromatic, dibasic acid esters, e.g., dioctyl adipate and dioctyl cebacate;

esters of polyalkylene glycol, e.g., diethylene glycol dibenzoate and triethylene glycol dibenzoate; and phosphate esters, e.g., tricresyl phosphate and tributyl phosphate.

Of these, saturated hydrocarbon-based compounds are more preferable. They may be used either individually or in combination.

Of the above-described compounds, hydrocarbon-based compounds free of unsaturated group, e.g., hydrogenated polybutene, hydrogenated liquid polybutadiene, paraffin oil, naphthene oil and atactic polypropylene, are more preferable for various reasons, e.g., high compatibility with each component for the rubber composition of the present invention, limited effects on curing speed of the rubber composition, good resistance to weather of the cured product, and cheapness.

The plasticizer may be used in place of the solvent during the process of introducing a hydrolyzable silyl group into the above-described ethylene/α-olefin/non-conjugated polyene random copolymer rubber ($A_0$), for the purposes of, e.g., adjusting reaction temperature and viscosity of the reaction system.

The plasticizer is incorporated preferably at about 10 to 500 parts by weight per 100 parts by weight of the silyl-containing ethylene/α-olefin/non-conjugated polyene random copolymer rubber (A1), more preferably about 20 to 300 parts.

The concrete examples of the fillers described above include wood powder, pulp, cotton chips, asbestos, glass fibers, carbon fibers, mica, walnut shell powder, graphite, diatomaceous earth, white clay, fumed silica, settling silica, silicic anhydride, carbon black, calcium carbonate, clay, talc, titanium oxide, magnesium carbonate, quartz, fine aluminum powder, flint powder, and zinc powder. Of these, more preferable ones are thixotropic fillers, e.g., settling silica, fumed silica and carbon black; and calcium carbonate, titanium oxide and talc.

The filler, when used, is incorporated preferably at about 10 to 500 parts by weight per 100 parts by weight of the silyl-containing ethylene/α-olefin/non-conjugated polyene random copolymer rubber (A1), more preferably about 20 to 300 parts by weight.

The aging inhibitors useful for the present invention include commonly used known sulfur-based ones, radical inhibitors and ultraviolet ray absorbers.

The sulfur-based aging inhibitors useful for the present invention include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, monothio acids, polythio acids, thioamides, and sulfoxides.

More concretely, the sulfur-based aging inhibitors include:
  mercaptans, e.g., 2-mercaptobenzothiazole; salts of mercaptans, e.g., zinc salt of 2-mercaptobenzothiazole;
  sulfides, e.g., 4,4'-thio-bis(3-methyl-6-t-butyl phenol), 4,4'-thio-bis(2-methyl-6-t-butyl phenol), 2,2'-thio-bis (4-methyl-6-t-butyl phenol), bis(3-methyl-4-hydroxy-5-t-butylbenzyl) sulfide, terephthaloyl di(2,6-di-methyl-4-t-butyl-3-hydroxybenzyl) sulfide, phenothiazine, 2,2'-thio-bis-(4-octylphenol) nickel, dilauryl thiodipropionate, distearyl thiodipropionate, dimyristyl thiodipropionate, ditridecyl thiodipropionate, distearylβ,β'-thiodibutyrate, lauryl-stearylthiodipropionate and 2,2-thio[diethyl-bis-3(3,5-di-t-butyl-4-hydroxy phenol)propionate];
  polysulfides, e.g., 2-benzothiazole disulfide;
  dithiocarboxylates, e.g., zinc dibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethylcarbamate;
  thioureas, e.g., 1-butyl-3-oxy-diethylene-2-thiourea, di-o-tolyl-thiourea and ethylene thiourea; and
  thiophosphates, e.g., trilauryltrithiophosphate.

The above-described sulfur-based aging inhibitor prevents decomposition/aging of the main chain under heating much more efficiently than the other types for the curable rubber composition of the present invention, controlling the problems, e.g., residual surface tackiness.

The radical inhibitors useful for the present invention include phenol-based ones, e.g., 2,2-methylene-bis(4-methyl-6-t-butyl phenol) and tetrakis[methylene-3-(3,5-di-t-butyl-4-hydroxyphenyl)propio nate] methane; and amine-based ones, e.g., phenyl-β-naphthylamine, α-naphthylamine and N,N'-sec-butyl-p-phenylenediamine, phenothiazine and N,N'-diphenyl-p-phenylenediamine.

The ultraviolet ray absorbers useful for the present invention include 2-(2'-hydroxy-3',5'-di-t-butylphenyl) benzotriazole and bis(2,2,6,6-tetramethyl-4-piperidine) cebacate.

The aging inhibitor is incorporated at about 0.1 to 20 parts by weight per 100 parts by weight of the silyl-containing ethylene/α-olefin/non-conjugated polyene random copolymer rubber (A1), preferably 1 to 10 parts by weight.

The curability improving effect by the combination of the tetravalent tin compound (C) and silicon compound (B2), represented by the general formula [V], for the present invention is similarly observed, irrespective of the presence or absence of the isocyanate-containing silane coupling agent, which is used for the present invention as required.

Improvement of curability is also observed, when various additives described above are incorporated. More concretely, the curable rubber composition (2) of the present invention can be cured notably faster if incorporated with the above-described additives, when the composition (2) is used as an elastomer sealant for construction, and sealant for laminated glass and electric/electronic device members, e.g., back side of a solar cell; electrical insulator for insulating coatings of wires and cables; tackifier and adhesive; and sealant that makes the edge (cut section) of net-reinforced or laminated glass rust-preventive and water-proof.

Curable Rubber Composition (2) and its Uses

The curable rubber composition (2) of the present invention contains the curable composition with the hydrolyzable silyl-containing ethylene/α-olefin/non-conjugated polyene random copolymer rubber as the component (A1). More concretely, it contains the organic polymer (Z) containing the hydrolyzable silyl group represented by the general formula [III] and essentially no unsaturated double bonds in the main chain, a tetravalent tin compound (C), a specific silicon compound (B1) and, as required, a silane coupling agent containing isocyanate group. It can be suitably used for electric/electronic device members, transportation machines, and civil engineering/construction, medical and leisure areas, as described earlier.

The curable rubber composition (2) of the present invention can be used as a sealant, a potting agent, a coating material or an adhesive for electric/electronic device members, transportation machines, and civil engineering/construction, medical and leisure areas.

Curable Composition (3)

The curable composition (3) of the present invention contains (a) the silyl-containing ethylene/α-olefin/non-conjugated polyene random copolymer rubber (A1) and (b) a silicon compound (B3) having at least one amino group and at least one trialkylsiloxy group in the molecule.

The silyl-containing ethylene/α-olefin/non-conjugated polyene random copolymer rubber (A1) as the component (a) has an intrinsic viscosity [η] of around 0.001 to 2 dl/g, preferably 0.01 to 1 dl/g, more preferably 0.05 to 1 dl/g, still more preferably 0.05 to 0.7 dl/g, still more preferably 0.1 to 0.5 dl/g. It is recommended that the copolymer rubber has at least 0.1 reactive silicon group per the polymer molecule, preferably 0.5 to 20. When the number of the reactive silicon group present in the molecule is less than 0.1, the copolymer rubber will be insufficient in curability. When it is excessively large, on the other hand, the copolymer rubber cannot

Silicon Compound (B3)

The silicon compound (B3) for the present invention having at least one amino group and at least one trialkylsiloxy group in the molecule is represented by the following general formula:

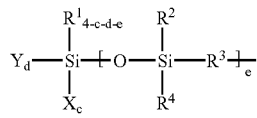

wherein, $Y_d$ is an alkyl group having an amino group; $R^1$ is an alkyl group of 1 to 20 carbon atoms, aryl group of 6 to 20 carbon atoms, aralkyl group of 7 to 20 carbon atoms, or triorganosiloxy group represented by the formula $R^5_3SiO-$ (wherein, $R^5$ is a monovalent hydrocarbon group of 1 to 20 carbon atoms, three $R^5$'s may be the same or different), which may be the same or different when there are 2 or more $R^1$'s; X is a hydroxyl group, a similar or dissimilar hydrolyzable group or the group represented by $-O-SiQ_3$, wherein Q is a group selected from the group consisting of hydroxyl, similar or dissimilar hydrolyzable group, a monovalent organic group of 1 to 20 carbon atoms, which may be substituted or not substituted and triorganosiloxy; and contains at least one hydroxyl, or a similar or dissimilar hydrolyzable group; $R^2$, $R^3$ and $R^4$ are each an alkyl group of 1 to 6 carbon atoms or phenyl group, which may be substituted or not substituted; and "c" is an integer of 0 to 2 and "d" and "e" are 1 or 2, respectively.

The examples of these compounds include γ-aminopropyltrimethylsiloxydiethoxysilane, N-(β-aminoethyl)-γ-aminopropyltrimethylsiloxydimethoxysilane, N-(β-aminoethyl)-γ-aminopropyltrimethylsiloxymethylmethoxysilane, diethylenetriaminopropyltrimethylsiloxydimethoxysilane, N,N-dimethyl-γ-aminopropyltrimethylsiloxydimethoxysilane. The above-described compound can be easily synthesized by reacting a silicon compound having at least one amino group and at least one hydrolyzable group in the molecule with a trialkylsilanol Ae compound.

The examples of the silicon compounds having at least one amino group and at least one hydrolyzable group in the molecule include, but not limited to, γ-aminopropyltriethoxylsilane (Nippon Unicar Co., Ltd., A-1100), N-(β-aminoethyl)-γ-aminopropyltrimethoxysilane (Nippon Unicar Co., Ltd., A-1120), N-(β-aminoethyl)-γ-aminopropylmethyldimethoxysilane (Shin-Etsu Chemical Co., Ltd., KBM-602), diethylenetriaminopropyltrimethoxysilane (Nippon Unicar Co., Ltd., A-1130), N,N-dimethyl-γ-aminopropyltrimethyoxy silane (Chisso, D5200), N,N'-bis[γ-trimethoxysilylpropyl]ethylenediamine (Chisso, XS1003), N-benzyl-γ-aminopropyltrimethoxysilane (Shin-Etsu Chemical Co., Ltd., X-12-512), and N-phenyl-γ-aminopropyltrimethoxysilane (Shin-Etsu Chemical Co., Ltd., KBM573).

The examples of the trialkyl silanol compounds include, but not limited to, trimethyl silanol, triethyl silanol and triphenyl silanol.

have good mechanical properties, because of the resultant excessively tight network structure.

Other Components

The curable composition (3) of the present invention may be incorporated, as required, with one or more plasticizers of various types. The plasticizer(s) can give good results, when incorporated at 0 to 300 parts by weight as the total quantity per 100 parts by weight of the silyl-containing ethylene/α-olefin/non-conjugated polyene random copolymer rubber (A1). The improvement effect will be rarely observed, when the total quantity of plasticizer(s) exceeds 300 parts, because of excessive content of the liquid component.

The plasticizers useful for the present invention include phthalate esters, e.g., those of dioctyl phthalate, diisodecyl phthalate, dibutyl phthalate and butyl benzyl phthalate; epoxy plasticizers, e.g., epoxidized soybean oil, epoxidized linseed oil and benzyl epoxystearate; polyester-based plasticizers, e.g., polyesters of a dibasic acid and divalent alcohol; polyethers, e.g., polypropylene glycol and derivatives thereof; hydrocarbon-based plasticizers, e.g., polybutene, ethylene/α-olefin oligomer, polystyrene, α-methyl styrene oligomer, biphenyl, triphenyl, triaryl dimethane, alkylene triphenyl, liquid polybutadiene, hydrogenated liquid polybutadiene, alkyl diphenyl, partially hydrogenated ter-phenyl, paraffin oil, naphthene oil and atactic polypropylene; and polychloroprene, polyisoprene and chlorinated paraffins. These compounds may be used either individually or in combination of any form.

These compounds may be used either individually or in combination. Of these, the hydrocarbon-based compounds free of unsaturated group (e.g., hydrogenated polybutene, hydrogenated liquid polybutadiene, paraffin oil, naphthene oil and atactic polypropylene) are more preferable, because they are well compatible with various components for the curable composition (3) of the present invention, affecting curing speed of the rubber composition to only a limited extent, giving the cured product of high resistance to weather, and inexpensive. The above plasticizer may replace the solvent used when a reactive silicon group is introduced in the saturated hydrocarbon-based polymer, in order to adjust reaction temperature and viscosity of the reaction system.

The composition (3) of the present invention may be incorporated with a silanol condensing catalyst, in order to accelerate the reactions of the hydrolyzable silyl group.

The concrete examples of the silanol condensing catalysts useful for the present invention include titanate esters, e.g., those of tetrabutyl titanate and tetrapropyl titanate; organotin compounds, e.g., dibutyl tin dilaurate, dibutyl tin maleate, dibutyl tin diacetate, tin octylate, tin naphthenate, product of the reaction between dibutyl tin oxide and phthalate ester, and dibutyl tin diacetylacetonate; organoaluminum compounds, e.g., aluminum trisacetylacetonate, aluminum trisethylacetoacetate and diisopropoxy aluminum ethylacetoacetate; products by the reactions between a bismuth salt and organocarboxylic acid, e.g., bismuth-tris(2-ethylhexoate) and bismuth-tris(neodecanoate); chelate compounds, e.g., zirconium tetraacetylacetonate and titanium tetraacetylacetonate; organolead compounds, e.g., lead octylate; organovanadium compounds, amine-based compounds, and salts of these compounds and carboxylates, e.g., butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl) phenol, morpholine, N-methyl morpholine, 2-ethyl-4-methylimidazole and 1,8-diazabicyclo(5,4,0) undecene-7 (DBU); low-molecular-weight polyamide resins produced by the reactions between excessive quantities of polyamines and polybasic acids; and products of the reactions between excessive quantities of polyamines and epoxy compounds. The silanol condensing catalysts useful for the present invention are not limited to the above, and include the commonly used condensing catalysts. These silanol condensing catalysts may be used either individually or in combination. Of these silanol condensing catalysts, more preferable ones are organometal compounds, and combinations of organometal compounds and amine-based compounds, viewed from curability of the composition.

The silanol condensing catalyst is incorporated preferably at about 0.1 to 50 parts by weight per 100 parts by weight of the silyl-containing ethylene/α-olefin/non-conjugated polyene random copolymer rubber (A1), more preferably 0.2 to 20 parts by weight. It is undesirable that the catalyst content relative to the copolymer rubber (A1) is below the above range, because of insufficient curing speed and insufficient extent of the curing reaction, and beyond the above range is also undesirable, because of local heating or foaming occurring during the curing process to make it difficult to produce the cured product of good properties.

The composition (3) of the present invention may be adequately incorporated, as required, with various additives, e.g., dehydrator, compatibilizer, adhesion improver, property adjuster, storage stability improver, filler, aging inhibitor, ultraviolet ray absorber, metal deactivator, ozone-induced aging inhibitor, light stabilizer, amine-based radical chaining inhibitor, phosphorus-based peroxide decomposer, lubricant, pigment, foaming agent, flame retardant, antistatic agent, and silane compound.

The adhesion improvers useful for the present invention include commonly used adhesives, silane coupling agents, e.g., aminosilane compounds and epoxysilane compounds; and others. The concrete examples of these adhesion improvers include phenolic resin, epoxy resin, γ-aminopropyl trimethoxysilane, N-(β-aminoethyl)aminopropyl methyldimethoxysilane, coumarone/indene resin, rosin ester resin, terpene/phenol resin, α-methyl styrene/vinyl toluene copolymer, polyethylmethyl styrene, alkyl titanates, and aromatic polyisocyanate. The adhesion improver is incorporated preferably at about 1 to 50 parts by weight per 100 parts by weight of total of the components (A1) and (B3), more preferably 5 to 30 parts by weight.

The storage stability improvers useful for the present invention include compounds with silicon to which a hydrolyzable group is bonded and esters of ortho-organic acids. The concrete examples of the storage stability improvers include methyltrimethoxy silane, methyltriethoxy silane, tetramethoxy silane, ethyltrimethoxy silane, dimethyldiethoxy silane, trimethylisobutoxy silane, trimethyl(n-butoxy) silane, n-butyltrimethoxy silane, and methyl orthoformate.

The concrete examples of the fillers include wood powder, pulp, cotton chips, asbestos, glass fibers, carbon fibers, mica, walnut shell powder, rice hull powder, graphite, diatomaceous earth, white clay, fumed silica, settling silica, silicic anhydride, carbon black, calcium carbonate, clay, kaolin, talc, titanium oxide, magnesium carbonate, quartz powder, glass beads, fine aluminum powder, flint powder, and zinc powder. Of these, more preferable ones are thixotropic fillers, e.g., settling silica, fumed silica and carbon black; and calcium carbonate, titanium oxide and talc. They may be used either individually or in combination.

The aging inhibitors useful for the present invention include commonly used known ones, e.g., sulfur-based ones, radical inhibitors and ultraviolet ray absorbers.

The sulfur-based aging inhibitors useful for the present invention include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, mercaptols, monothio acids, polythio acids, thioamides, and sulfoxides. More concretely, the sulfur-based aging inhibitors include mercaptans, e.g., 2-mercaptobenzothiazole; salts of mercaptans, e.g., zinc salt of 2-mercaptobenzothiazole; sulfides, e.g., 4,4'-thio-bis(3-methyl-6-t-butyl phenol), 4,4'-thio-bis(2-methyl-6-t-butyl phenol), 2,2'-thio-bis(4-methyl-6-t-butyl phenol), bis(3-methyl-4-hydroxy-5-t-butylbenzyl) sulfide, terephthaloyldi(2, 6-dimethyl-4-t-butyl-3-hydroxybenzyl) sulfide, phenothiazine, 2,2'-thio-bis (4-octyl phenol) nickel, dilauryl thiodipropionate, distearyl thiodipropionate, dimyristyl thiodipropionate, ditridecyl thiodipropionate, distearylβ,β'-thiodibutyrate, lauryl-stearyl thiodipropionate and 2,2-thic [diethyl-bis-3-(3,5-di-t-butyl-4-hydroxy phenol) propionate]; polysulfides, e.g., 2-benzothiazole disulfide; dithiocarboxylates, e.g., zinc dibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethyldithiocarbamate; thioureas, e.g., 1-butyl-3-oxy-diethylene-2-thiourea, di-o-tolyl-thiourea and ethylene thiourea; and thiophosphates, e.g., trilauryltrithiophosphate.

The above-described sulfur-based aging inhibitor prevents decomposition/aging of the main chain under heating much more efficiently than the other types for the composition (3) of the present invention, controlling the problems, e.g., residual surface tackiness.

The radical inhibitors useful for the present invention include phenol-based ones, e.g., 2,2-methylene-bis(4-methyl-6-t-butyl phenol) and tetrakis[methylene-3-(3,5-di-t-butyl-4-hydroxyphenyl)propio nate] methane; and amine-based ones, e.g., phenyl-β-naphthylamine, α-naphthylamine, N,N'-sec-butyl-p-phenylenediamine, phenothiazine and N,N'-diphenyl-p-phenylenediamine.

The ultraviolet ray absorbers useful for the present invention include 2-(2'-hydroxy-3',5'-di-t-butylphenyl) benzotriazole and bis(2,2,6,6-tetramethyl-4-piperidine) cebacate.

The curable composition (3) of the present invention may be incorporated with a polymer having a reactive silicon group other than the component (a) the ethylene/α-olefin/non-conjugated polyene random copolymer rubber containing a hydrolyzable silyl group (A1), e.g., polydimethyl siloxane.

The method of producing the composition (3) of the present invention, composed of (a) the hydrolyzable silyl-containing ethylene/α-olefin/non-conjugated polyene random copolymer rubber (A1) and (b) the silicon compound (B3), is not limited. More concretely, the component (b) is incorporated and uniformly dispersed in the component (a) while adequately controlling the conditions, e.g., stirring conditions, if required. These components may be also mixed with each other by a mixer, roll or kneader.

The composition thus prepared is applicable to one-liquid type curable composition, to say nothing of two-liquid type. For the one-liquid type, the composition of the present invention is prepared in an essentially moisture-free condition. It can withstand storage for extended periods when kept in a closed condition, and quickly starts curing from the surface when exposed to the atmosphere.

The curable composition (3) of the present invention is useful as an elastomer sealant for building structures, civil engineering works, and other industrial areas, and also can find use as paints, adhesives, impregnating agents and coating materials.

Curable Rubber Composition (3) and its Uses

The curable rubber composition (3) of the present invention contains the curable composition with the hydrolyzable silyl-containing ethylene/α-olefin/non-conjugated polyene random copolymer rubber as the component (A1). More concretely, it contains
(a) the organic polymer (Z) and
(b) the silicon compound having at least one amino group and at least one trialkylsiloxy group in the molecule (B3), and is suitably used for electric/electronic device members, transportation machines, and civil engineering/construction, medical and leisure areas, as described earlier.

The curable composition (3) of the present invention can be used as sealants, potting agents, coating materials or adhesives for electric/electronic device members, transportation machines, and civil engineering/construction, medical and leisure areas.

In other words, the present invention provides sealants, potting agents, coating materials and adhesives, composed of the curable composition which comprises (a) the organic polymer (Z) and (b) the silicon compound having at least one amino group and at least one trialkylsiloxy group in the molecule (B3).

Curable Composition (4)

The curable composition (4) of the present invention contains (a) the silyl-containing ethylene/α-olefin/non-conjugated polyene random copolymer rubber (A1) and (b) an organosilicon compound (B4).

Organosilicon Compound (B4)

The organosilicon compound (B4) for the present invention is represented by the following general formula [VI]:

$$(R^2(CH_3)_2SiO)_nR^1 \quad [VI]$$

wherein, $R^1$ is an alcohol residue or weak acid residue; $R^2$ is methyl or vinyl group; and "n" is a positive integer.

$R^1$ in the general formula [VI] is preferably a mono- to tri-valent alcohol residue or a weak acid residue, wherein the term alcohol residue means a monovalent or polyhydric alcohol partly or totally left by its hydroxyl group, while weak acid residue means a monovalent or polyvalent weak acid partly or totally left by its hydroxyl group. The residue may be a compound simultaneously having hydroxyl group and a weak acid group (e.g., carboxyl) partly or totally left by its hydroxyl group.

The concrete examples of alcohols and weak acids which can be represented by $R^1$ include aliphatic alcohols of 30 or less carbon atoms, which may be substituted or not substituted, e.g., methanol, ethanol, n-butanol, i-butanol, n-pentanol, i-pentanol, ethylene chlorohydrin, benzyl alcohol, cyclohexanol, 3-chloropropanol, ethylene glycol, propanediol, propylene glycol, butanediol, glycerin and acetylacetone (tautomers); aromatic hydroxy compounds of 6 to 30 carbon atoms, which may be substituted or not substituted, e.g., phenol, cresol, chlorophenol, bisphenol A, naphthol, hydroquinone and hydronaphthoquinone; aliphatic and aromatic carboxylic acids of 30 or less carbon atoms, which may be substituted or not substituted, e.g., formic, acetic, propionic, butyric, valeric, capric, caproic, lauric, palmitic, stearic, oleic, heptacosanoic, behenic, melissic, acrylic, undecylenic, sorbic, linolic, linolenic, arachidonic, propiolic, stearolic, oxalic, malonic, succinic, glutaric, adipic, maleic, fumaric, itaconic, benzoic, phthalic, terephthalic, trimellitic, chlorobenzoic, toluyl, oxypropionic, oxybenzoic and oxytoluyl acids; diethylene glycol, triethylene glycol, polyethylene glycol, polypropylene glycol, polybutadiene having hydroxyl or carboxyl group, hydrogenated polybutadiene having hydroxyl or carboxyl group, polyethylene terephthalate and polybutylene terephthalate having hydroxyl and/or carboxyl group; and inorganic acids, e.g., boric and carbonic acids.

Of these alcohols and weak acids, the organic compounds are preferably free of hetero atoms other than oxygen and halogen.

The organosilicon compound (B4) having phenyl group as $R^1$, which may be substituted or not substituted, is particularly preferable, because of its wide availability and good effects it brings.

The weak acid in this specification is defined as the acid having a pKa of 1 or more, preferably 2 or more, more preferably 3 or more, when dissolved in water.

$R^2$ in the general formula [VI] is methyl or vinyl ($CH_2$=$CH$—) group. Any other group is not desirable for $R^2$, because it may not sufficiently achieve the objects of the present invention. Methyl group is more preferable, because of its wider availability.

The concrete examples of the suitable organosilicon compounds (B4) include $CH_3OSi(CH_3)_3$, $CH_3CH_2OSi(CH_3)_3$, $ClCH_2CH_2OSi(CH_3)_3$,

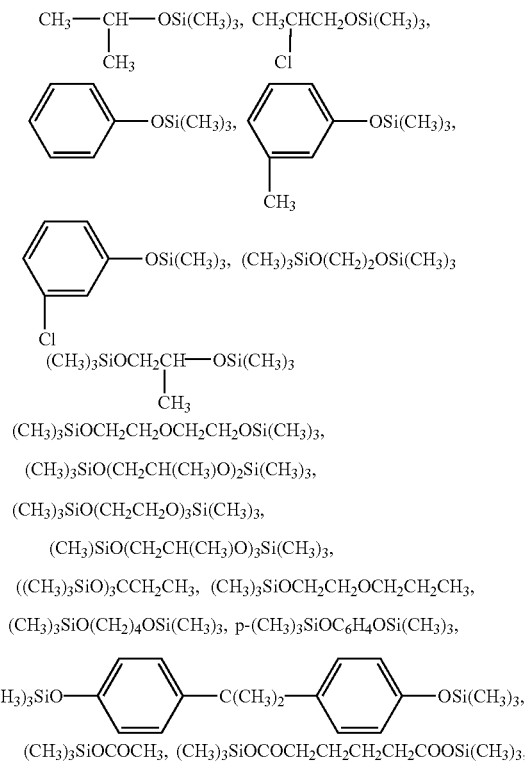

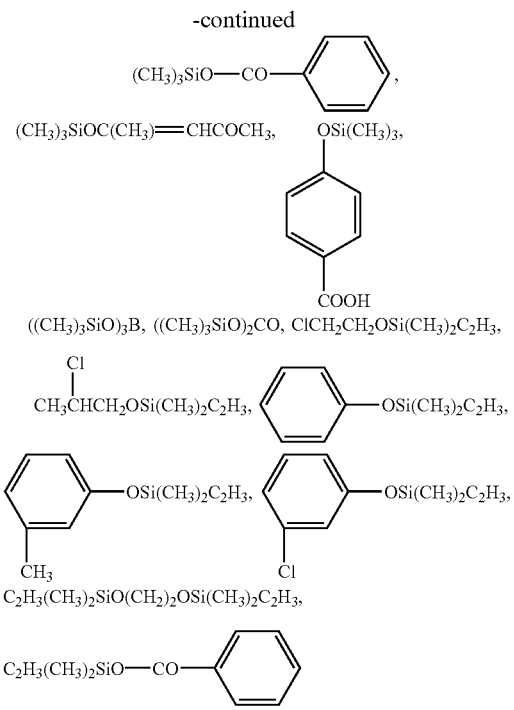

Of these compounds, more preferable ones are those having a molecular weight of 140 or more, still more preferably 150 or more, viewed from improvement in modulus and elongation. The most preferable one is

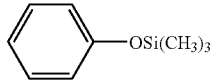

because of its wider availability. The upper limit of the molecular weight of the organosilicon compound (B4) is not limited, but it is preferably 5,000 or less, more preferably 2,000 or less.

Content of the organosilicon compound (B4) should be adequately selected for the specific properties the cured product is expected to have. It is incorporated normally at 0.1 to 50 parts by weight per 100 parts by weight of the silyl-containing ethylene/α-olefin/non-conjugated polyene random copolymer rubber (A1), preferably 1 to 20 parts by weight.

The organosilicon compound (B4) is hydrolyzed while the composition is cured to form the silanol compound, which reacts with the hydrolyzable silyl group or hydrolyzed hydrolyzable group in the copolymer rubber (A1).

The method of mixing the silyl-containing ethylene/α-olefin/non-conjugated polyene random copolymer rubber (A1) and organosilicon compound (B4) with each other is not limited, so long as the component (B4) is uniformly dissolved or dispersed in the component (A1) by carefully setting the conditions, e.g., temperature and stirring conditions, as required. In this case, the composition may not be necessarily transparent completely, and can sufficiently achieve the objectives even when it is not transparent, so long as the composition (B4) is dispersed almost uniformly. A dispersibility improver, e.g., surfactant, may be used, as required.

Other Components

The curable composition (4) of the present invention may be incorporated, as required, with various additives, e.g., white carbon, carbon black, calcium carbonate, titanium oxide, talc, asbestos and glass fibers, which serve, e.g., as a reinforcing or non-reinforcing filler, a plasticizer, an antioxidant, an ultraviolet ray absorber, a pigment, or a flame retardant, to be useful as adhesives, tackifiers, paints, sealant compositions, waterproof materials, spray materials, shaping materials or casting rubber materials. Of these, application to sealant compositions is especially useful.

The curable composition (4) of the present invention, when used as a sealant, may be incorporated, as required, with a plasticizer, filler, reinforcing agent, dripping inhibitor, colorant, aging inhibitor, adhesion promoter, curing catalyst or property adjuster.

The plasticizers useful for the present invention include phthalate esters, e.g., those of dibutyl phthalate, diheptyl phthalate, di(2-ethylhexyl) phthalate, butyl benzyl phthalate and butyl phthalyl butyl glycolate; non-aromatic, dibasic acid esters, e.g., those of dioctyl adipate and dioctyl cebacate; esters of polyalkylene glycol, e.g., those of diethylene glycol dibenzoate and triethylene glycol dibenzoate; phosphate esters, e.g., those of tricresyl phosphate and tributyl phosphate; chlorinated paraffins; and hydrocarbon-based compounds, e.g., alkyl diphenyl, polybutene, hydrogenated polybutene, ethylene/α-olefin oligomer, α-methyl styrene oligomer, biphenyl, triphenyl, triaryl dimethane, alkylene triphenyl, liquid polybutadiene, hydrogenated liquid polybutadiene, paraffin oil, naphthene oil and atactic polypropylene. The above compound is selected, depending on specific purposes, e.g., adjustment of characteristics and properties. They may be used either individually or in combination, although not necessarily essential. The plasticizer may be incorporated, while the polymer is produced.

Of these, the hydrocarbon-based compounds free of unsaturated groups (e.g., hydrogenated polybutene, hydrogenated liquid polybutadiene, paraffin oil, naphthene oil and atactic polypropylene) are more preferable, because they are well compatible with various components for the composition (4) of the present invention, affecting curing speed of the composition to only a limited extent, giving the cured product of high resistance to weather, and inexpensive.

The above plasticizer may replace the solvent used when the reactive silicon group is introduced in the saturated hydrocarbon-based polymer, to adjust reaction temperature and viscosity of the reaction system.

The fillers and reinforcing agents useful for the present invention include limestone powder and calcium carbonate; calcium carbonate surface-treated with a fatty acid, a resin acid, or a cationic or anionic surfactant; magnesium carbonate; talc; titanium oxide; barium sulfate; alumina; powder of metal (e.g., aluminum, zinc or iron); bentonite; kaolin clay; fumed silica; quartz powder; and carbon black. These are the common ones, and one or more of these compounds may be used. Of these, the filler or reinforcing agent capable of imparting transparency, e.g., fumed silica, can give the sealant with high transparency.

The dripping inhibitors useful for the present invention include a hydrogenated castor oil derivative; and metallic soaps, e.g., calcium stearate, aluminum stearate and barium stearate. A dripping inhibitor may not be necessary, depending on purposes of the curable composition, and a filler or a reinforcing agent incorporated.

The colorants useful for the present invention include the common inorganic and organic pigments, and dyes, each of which may be used, as required.

The property adjusters useful for the present invention include various silane coupling agents: such as alkyl alkoxy silanes, e.g., methyltrimethoxy silane, dimethyldimethoxy silane, and n-propyltrimethoxy silane; alkyl isopropenoxy silane, e.g., dimethyldiisopropenoxy silane, methyltriisopropenoxy silane and γ-glycidoxypropylmethyldiisopropenoxy silane; alkoxy silanes having a functional group, e.g., γ-glycidoxypropylmethyldimethoxy silane, γ-glycidoxypropyltrimethoxy silane, vinyl trimethoxy silane, γ-aminopropyltrimethoxy silane, N-(β-aminoethyl) aminopropylmethyldimethoxy silane, γ-mercaptopropyltrimethoxy silane and γ-mercaptopropylmethyldimethoxy silane; silicone varnishes; and polysiloxanes.

The above property adjuster can increase hardness, or decrease hardness and increase elongation of the curable composition (4) of the present invention, when it is cured.

Use of an adhesion promoter is not essential, because the polymer of the present invention itself is adhesive to glass, other ceramic materials and metals, and adhesive to materials in a wider range in the presence of a varying primer. However, the composition can have improved adhesion to materials in a still wider range, when incorporated with one or more types of epoxy resin, phenolic resin, various silane coupling agents, alkyl titanate or aromatic polyisocyanate.

The curing catalysts useful for the present invention include: titanate esters, e.g., those of tetrabutyl titanate and tetrapropyl titanate; organotin compounds, e.g., dibutyl tin dilaurate, dibutyl tin maleate, dibutyl tin diacetate, tin octylate and tin naphthenate; lead octylate; amine-based compounds and salts of these compounds and carboxylates, e.g., butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris (dimethylaminomethyl) phenol, morpholine, N-methyl morpholine, and 1,3-diazabicyclo(5,4,6) undecene-7 (DBU); low-molecular-weight polyamide resins produced by the reactions between excessive quantities of polyamines and polybasic acids; products of the reactions between excessive quantities of polyamines and epoxy compounds; and known silanol condensing catalysts, e.g., silane coupling agents containing amino group (e.g., γ-aminopropyl trimethoxy silane and N-(β-aminoethyl)aminopropyl methyldimethoxy silane). These compounds may be used either individually or in combination.

A solvent may be used for, e.g., improving workability and reducing viscosity. The solvents useful for the above purposes include aromatic hydrocarbon-based ones, e.g., toluene and xylene; ester-based ones, e.g., ethyl acetate, butyl acetate, amyl acetate and cellosolve acetate; and ketone-based ones, e.g., methylethylketone, methylisobutylketone and diisobutylketone. The solvent may be used during the process of producing the polymer.

The aging inhibitors useful for the present invention include a commonly used antioxidant, e.g., sulfur-based aging inhibitor, radical inhibitor and ultraviolet ray absorber, although use of the aging inhibitor is not essential.

The sulfur-based aging inhibitors useful for the present invention include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, mercaptols, monothio acids, polythio acids, thioamides, and sulfoxides.

More concretely, the sulfur-based aging inhibitors include mercaptans, e.g., 2-mercaptobenzothiazole; salts of mercaptans, e.g., zinc salt of 2-mercaptobenzothiazole; sulfides, e.g., 4,4'-thio-bis(3-methyl-6-t-butyl phenol), 4,4'-thio-bis (2-methyl-6-t-butyl phenol), 2,2'-thio-bis(4-methyl-6-t-butyl phenol), bis(3-methyl-4-hydroxy-5-t-butylbenzyl) sulfide, terephthaloyldi(2,6-dimethyl-4-t-butyl-3-hydroxybenzyl) sulfide, phenothiazine, 2,2'-thio-bis (4-octyl phenol) nickel, dilauryl thiodipropionate, distearyl thiodipropionate, dimyristyl thiodipropionate, ditridecyl thiodipropionate, distearylβ,β'-thiodibutyrate, lauryl-stearyl thiodipropionate and 2,2-thio[diethyl-bis-3-(3,5-di-t-butyl-4-hydroxy phenol)propionate]; polysulfides, e.g., 2-benzothiazole disulfide; dithiocarboxylates, e.g., zinc dibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethyldithiocarbamate; thioureas, e.g., 1-butyl-3-oxy-diethylene-2-thiourea, di-o-tolyl-thiourea and ethylene thiourea; and thiophosphates, e.g., trilauryltrithiophosphate.

The above-described sulfur-based aging inhibitor prevents decomposition/aging of the main chain under heating much more efficiently than the other types for the curable composition of the present invention, controlling the problems, e.g., residual surface tackiness.

The radical inhibitors useful for the present invention include phenol-based ones, e.g., 2,2-methylene-bis(4-methyl-6-t-butyl phenol) and tetrakis [methylene-3-(3,5-di-t-butyl-4-hydroxyphenyl)propio nate] methane; and amine-based ones, e.g., phenyl-β-naphthylamine, α-naphthylamine, N,N'-sec-butyl-p-phenylenediamine, phenothiazine and N,N'-diphenyl-p-phenylenediamine.

The ultraviolet ray absorbers useful for the present invention include 2-(2'-hydroxy-3',5'-di-t-butylphenyl) benzotriazole and bis(2,2,6,6-tetramethyl-4-piperidine) cebacate.

The sealant composition may be prepared for a one-liquid type, where the composition of all of the components is prepared beforehand and sealed, and cured with moisture in air after it is applied, or for a two-liquid type, where the separately prepared curing agent composition of, e.g., a curing catalyst, a filler, a plasticizer and water as the curing agent is mixed with the polymer composition before use.

When the sealant composition is used for the one-liquid type, it is preferable that the water-containing component is dehydrated/dried beforehand, or dehydrated during mixing/kneading under a vacuum, because it contains all of the components before use.

When used for the two-liquid type, on the other hand, the sealant composition may contain water to some extent, because the polymer-containing main ingredient is not necessarily incorporated beforehand with the curing catalyst and hence will not be gelled even in the presence of water. Nevertheless, however, it is preferable to dehydrate/dry the composition, when it is required to have storage stability for extended periods.

The preferable dehydration/drying method is drying under heating for the solid, e.g., powdery, composition, and dehydration under a vacuum or in the presence of synthetic zeolite, activated alumina or silica gel for the liquid composition. Moreover, it maybe dehydrated in the presence of a small quantity of an isocyanate compound, where the isocyanate group reacts with water.

The composition will have still improved storage stability, when treated for dehydration/drying and incorporated with a lower alcohol, e.g., methanol or ethanol; or alkoxysilane compound, e.g., n-propyltrimethoxy silane, vinyl methyldimethoxysilane, γ-mercaptopropylmethyldimethoxysilane, γ-mercaptopropylmethyldiethoxysilane or γ-glycidoxypropyltrimethoxysilane.

Curable Composition (4) and its Uses

The curable composition (4) of the present invention contains the curable composition with the hydrolyzable silyl-containing ethylene/α-olefin/non-conjugated polyene random copolymer rubber as the component (A1), as described earlier. More concretely, it contains (a) the organic polymer (Z) and (b) the organosilicon compound (B4). It can be suitably used for electric/electronic device members, transportation machines, and civil engineering/construction, medical and leisure areas.

The curable composition (4) of the present invention can be used as sealants, potting agents, coating materials or adhesives for electric/electronic device members, transportation machines, and civil engineering/construction and leisure areas.

In other words, the present invention provides sealants, potting agents, coating materials and adhesives, composed of the curable composition, comprising (a) the organic polymer (Z) and (b) the organosilicon compound (B4).

Rubber Composition Curable at Normal Temperature (5)

The rubber composition curable at normal temperature (5) of the present invention contains the silyl-containing ethylene/α-olefin/non-conjugated polyene random copolymer rubber (A1), a silane compound (B5), and, as required, a curing catalyst.

Silane Compound (B5)

The silane compound (B5) for the present invention is represented by one of the following general formulae [VII-1] to [VII-6]:

$$R^4_n Si\underset{X_{3-n}}{|}\!\!-\!R^6\!-\!\underset{X_{3-n}}{|}\!\!SiR^4_n, \quad [\text{VII-1}]$$

$$R^4_n Si\underset{X_{3-n}}{|}\!\!-\!R^6, \quad [\text{VII-2}]$$

$$R^4_n Si\underset{X_{3-n}}{|}\!\!-\!(CH_2)_3\!-\!OR^5O\!-\!(CH_2)_3\!-\!\underset{X_{3-n}}{|}\!\!SiR^4_n, \quad [\text{VII-3}]$$

$$R^4_n Si\underset{X_{3-n}}{|}\!\!-\!(CH_2)_3\!-\!O\!-\!R^6, \quad [\text{VII-4}]$$

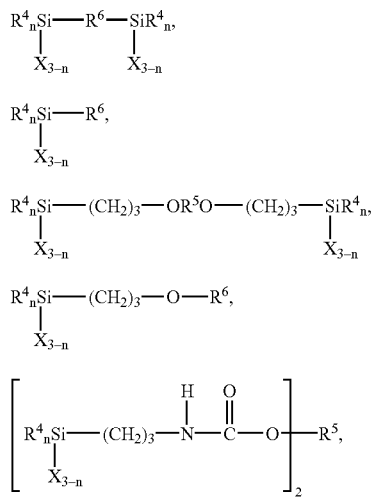
[VII-5]

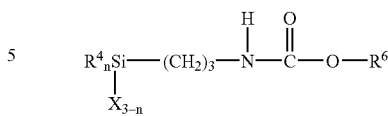
[VII-6]

wherein, $R^4$ is a hydrocarbon group selected from the group consisting of alkyl, aryl and aralkyl group of 1 to 10 carbon atoms;
X is a halogen or a group selected from the group consisting of hydroxy, alkoxyl, acyloxy, aminoxy, phenoxy, thioalkoxy, amino, ketoxymate and alkenyloxy group;
$R^5$ is an alkylene or arylene group of 8 to 200 carbon atoms;
$R^6$ is a monovalent alkyl group of 8 to 200 carbon atoms; and
"n" is an integer of 0 to 2.

The silane compound represented by the general formula [VII-1] or [VII-2] can be synthesized through hydrosilylation by reacting a polyolefin compound of a molecular weight of 100 to 3,000 having an allyl group at one or both terminals with the hydrosilane compound represented by the following general formula:

$$HSiR^4_n\underset{X_{3-n}}{|}$$

wherein, $R^4$ is a monovalent hydrocarbon group selected from the group consisting of alkyl, aryl and aralkyl group of 1 to 10 carbon atoms;
X is a halogen or a group selected from the group consisting of hydroxy, alkoxyl, acyloxy, aminoxy, phenoxy, thioalkoxy, amino, ketoxymate, alkenyloxy; and
"n" is an integer of 0 to 2.

The silane compound represented by the general formula [VII-3] or [VII-4] can be synthesized by the Williamson's ether synthesis method followed by hydrosilylation, wherein a polyolefin compound having a molecular weight of 100 to 3,000 with hydroxyl group at one or both terminals is provided with allyl group at one or both terminals in the first step, and the product is hydrosilylated with the above-described hydrosilane compound in the second step.

The silane compound represented by the general formula [VII-5] or [VII-6] can be synthesized by, e.g., sealing a polyolefin compound having a molecular weight of 100 to 3,000 with hydroxyl group at one or both terminals with an isocyanate silane.

The hydrosilylation between the allyl group and hydrosilane compound quantitatively proceeds at 50 to 150° C. for 1 to 4 hours in the presence of a catalyst of Group 8 transition metal complex selected from the group consisting of platinum, rhodium, cobalt, palladium and nickel.

The reaction between the hydroxyl group and isocyanate silane can proceed in the presence or absence of a catalyst. However, a catalyst may be used, when the addition reaction is to be accelerated. The catalysts useful for the above purpose include organotin compounds, e.g., dibutyltin dilaurate and tinoctylate, and tertiary amine compounds, e.g., dimethyl benzylamine and triethylamine. The reaction proceeds at 50 to 150° C., and is traced by the NCO absorption at 2270 cm$^{-1}$ in the far-infrared absorption spectral pattern.

The concrete examples of the polyolefin compounds with allyl group at one or both terminals include 1-octene, 1-decene, 1-tetradecene, 1-hexadecene, 1-octadecene, 1,7-octadiene, 1,9-decadiene and 1,13-tetradecadiene.

The concrete examples of the polyolefin compounds with hydroxyl group at one or both terminals include 1-octanol, 1-decanol, 1-tetradecanol, 1-hexadecanol, 1-octadecanol, 1,8-octanediol, 1,10-decanediol, 1,14-tetradecanediol, 1,16-hexadecanediol, 1,18-octadecanediol, polyolefinpolyol (Polytail-HA, <M-1000>®, Polytail HA®, Mitubishi Chemical Corporation), and polybutadiene glycol and hydrogenated polybutadiene glycol (NISSO-PB G-1000®, NISSO-PB G-2000®, NISSO-PB GI-1000®, and NISSO-PB GI-2000®, Nippon Soda).

The concrete examples of the hydrosilane compounds include halogenated silanes, e.g., trichlorosilane, methyldichlorosilane, dimethylchlorosilane and phenyldichlorosilane;

alkoxysilanes, e.g., trimethoxysilane, triethoxysilane, methyldimethoxysilane, methyldiethoxysilane and phenyldimethoxysilane;

acyloxysilanes, e.g., triacetoxysilane, methyldiacetoxysilane and phenyldiacetoxysilane;

dimethylethylmethyloximesilane; and triaminoxysilane, methyldiaminoxysilane and methyldiaminosilane.

The concrete examples of the isocyanate silane include γ-isocyanate, propyl trimethoxysilane, γ-isocyanate propyl triethoxysilane, γ-isocyanate propyl methyldimethoxysilane.

Curing Catalyst (C)

The concrete examples of the curing catalysts (C), which may be used for the present invention, as required, include:

organotin compounds, e.g., dibutyl tin dilaurate, dibutyl tin maleate, dioctyl tin laurate, dioctyl tin maleate and tin octylate;

phosphoric acid and phosphate ester, e.g., phosphoric acid, monomethyl phosphate, monoethyl phosphate, monobutyl phosphate, monooctyl phosphate, monodecyl phosphate, dimethyl phosphate, diethyl phosphate, dibutyl phosphate, dioctyl phosphate and didecyl phosphate;

propylene oxide, butylene oxide, cyclohexene oxide, glycidyl methacrylate, glycidol, allyl glycidyl ether, γ-glycidoxypropyltrimethoxysilane, γ-glycidoxypropyltriethoxysilane, γ-glycidoxypropylmethyldimethoxysilane,

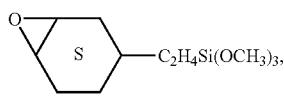

products of the addition reactions between an epoxy compound and phosphoric acid or mono acidic phosphate ester, e.g., CarduraE® (Yuka Shell Epoxy), and Epikote 828®and Epikote 1001® (Yuka Shell Epoxy);

mono[β-hydroxyethyl methacrylate] acid phosphate (KAYAMER PM-1®, KAYAMER PM-2® and KAYAMER PM-21® (NIPPON KAYAKU), and copolymer having a number-average molecular weight of 1,000 to 30,000 and acidic phosphate ester group, produced by copolymerization of a compound simultaneously having an acidic phosphate ester group and polymerizable double bond in the molecule (e.g., product of the reaction between glycidyl methacrylate and a phosphate) with a vinyl monomer;

alkyl titanate;

organoaluminum;

acidic compounds, e.g., maleic acid and paratoluenesulfonic acid;

amines, e.g., hexylamine, di-2-ethylhexylamine, N,N-dimethyldodecylamine and dodecylamine; and alkaline compounds, e.g., sodium hydroxide and potassium hydroxide.

The reaction can proceed in the absence of the curing catalyst (C). However, the above catalysts may be used either individually or in combination, when the curing reaction is to be accelerated.

Compositional Ratio

The mixing ratio of the silyl-containing ethylene/α-olefin/non-conjugated polyene random copolymer rubber (A1), silane compound (B5) and curing catalyst (C) is preferably (A)/(B)/(C) of 100/0.1 to 100/0 to 20 by weight, more preferably 100/0.5 to 20/0.01 to 10.

The silane compound (B5) cannot exhibit the effect of improving adhesion at a content below 0.1 parts by weight per 100 parts by weight of the silyl-containing ethylene/α-olefin/non-conjugated polyene random copolymer rubber (A1), and may cause troubles, e.g., deteriorated compatibility with the copolymer rubber (A1) and coating film becoming fragile, at above 100 parts by weight. Therefore, its content beyond the above range is undesirable.

The mechanisms involved in the effect of the silane compound (B5) having a long polyolefin chain to improve adhesion are not fully understood, but it conceivably results from incorporation of the compound (B5) of relatively low molecular weight into the network structure.

The effects of the silane compound (B5) are not limited to improving adhesion to melamine alkyd or melamine acrylic resin, but to improving hardness, resistance to solvents and pollution prevention of the rubber composition (5) of the present invention curable at normal temperature. These effects are particularly noted for improving hardness and resistance to solvents with the silane compound (B5) having 2 hydrolyzable silyl groups in the molecule, and for improving pollution prevention with the silane compound (B5) having one hydrolyzable silyl group in the molecule.

Other Components

The rubber composition (5) of the present invention curable at normal temperature may be incorporated with a dehydrator, although not essential. It may be incorporated, however, in order to keep the rubber composition (5) stable for extended periods or serviceable over repeated cycles of use without causing problems.

The concrete examples of the dehydrators useful for the present invention include hydrolyzable ester compounds, e.g., methyl orthoformate, ethyl orthoformate, methyl orthoacetate, ethyl orthoacetate, methyltrimethoxysilane, γ-methacryloxypropyltrimethoxysilane, vinyl trimethoxysilane, methyl silicate and ethyl silicate.

The hydrolyzable ester compound may be added to the silyl-containing ethylene/α-olefin/non-conjugated polyene random copolymer rubber (A1), while it is being produced or after it is produced.

The rubber composition (5) of the present invention curable at normal temperature may be further incorporated with various additives, e.g., anti-settling agent and leveling agent; cellulose, , e.g., nitrocellulose and cellulose acetate butyrate; resin, e.g., alkyd, acrylic, vinyl chloride, chlorinated propylene, chlorinated rubber and polyvinyl butyral rubber; adhesion improver; property adjuster; storage stability improver; plasticizer; filler; aging inhibitor; ultraviolet ray absorber; metal deactivator; ozone-caused aging inhibitor; light stabilizer; amine-based radical chaining inhibitor; phosphorus-based peroxide decomposer; lubricant; pigment; and foaming agent, within limits not detrimental to the object of the present invention.

For the adhesion improvers, the commonly used adhesives, silane coupling agents (e.g., aminosilane and epoxysilane compounds) and others may be used. The concrete examples of the adhesion improvers include phenol resin, epoxy resin, γ-aminopropyl trimethoxy silane, N-(β-aminoethyl)aminopropyl methyldimethoxy silane, coumarone/indene resin, rosin ester resin, terpene/phenol resin, α-methyl styrene/vinyl toluene copolymer, polyethylmethyl styrene, alkyl titanate, and aromatic polyisocyanate. The adhesion improver is incorporated preferably at about 1 to 50 parts by weight per 100 parts by weight of the silyl-containing ethylene/α-olefin/non-conjugated polyene random copolymer rubber (A1), more preferably 5 to 30 parts by weight.

The storage stability improvers useful for the present invention include esters of ortho-organic acids. The storage stability improver is incorporated preferably at about 0.5 to 20 parts by weight per 100 parts by weight of the silyl-containing ethylene/α-olefin/non-conjugated polyene random copolymer rubber (A1), more preferably 1 to 10 parts by weight.

The plasticizer useful for the present invention is also not limited, and any commonly used one may be used. Preferably, it should be compatible with each component for the rubber composition (5) of the present invention curable at normal temperature.

The concrete examples of these plasticizers include:
hydrocarbon-based compounds, e.g., polybutene, hydrogenated polybutene, ethylene/α-olefin co-oligomer, α-methyl styrene oligomer, biphenyl, triphenyl, triaryl dimethane, alkylene triphenyl, liquid polybutadiene, hydrogenated liquid polybutadiene, alkyl diphenyl, partially hydrogenated ter-phenyl, paraffin oil, naphthene oil and atactic polypropylene;
parafin chlorides;
phthalate esters, e.g., those of dibutyl phthalate, diheptyl phthalate, di(2-ethylhexyl) phthalate, butyl benzyl phthalate and butyl phthalyl butyl glycolate;
non-aromatic, dibasic acid esters, e.g., those of dioctyl adipate and dioctyl cebacate;
esters of polyalkylene glycol, e.g., those of diethylene glycol benzoate and triethylene glycol dibenzoate; and
phosphate esters, e.g., those of tricresyl phosphate and tributyl phosphate.

Of these, saturated hydrocarbon-based compounds are more preferable. They may be used either individually or in combination.

Of the above-described compounds, the hydrocarbon-based compounds free of unsaturated group, e.g., hydrogenated polybutene, hydrogenated liquid polybutadiene, paraffin oil, naphthene oil and atactic polypropylene, are more preferable for various reasons; e.g., high compatibility with each component for the rubber composition of the present invention, limited effects on curing speed of the rubber composition, good resistance to weather of the cured product, and cheapness.

The plasticizer may be used in place of the solvent during the process of introducing a hydrolyzable silyl group into the above-described ethylene/α-olefin/non-conjugated polyene random copolymer rubber ($A_0$), for the purposes of, e.g., adjusting reaction temperature and viscosity of the reaction system.

The plasticizer is incorporated preferably at about 10 to 500 parts by weight per 100 parts by weight of the silyl-containing ethylene/α-olefin/non-conjugated polyene random copolymer rubber (A1), more preferably about 20 to 300 parts by weight.

The concrete examples of the fillers include wood powder, pulp, cotton chips, asbestos, glass fibers, carbon fibers, mica, walnut shell powder, graphite, diatomaceous earth, white clay, fumed silica, settling silica, silicic anhydride, carbon black, calcium carbonate, clay, talc, titanium oxide, magnesium carbonate, quartz, fine aluminum powder, flint powder, and zinc powder. Of these, more preferable ones are thixotropic fillers, e.g., settling silica, fumed silica and carbon black; and calcium carbonate, titanium oxide and talc. The filler, when used, is incorporated preferably at about 10 to 500 parts by weight per 100 parts by weight of the silyl-containing ethylene/α-olefin/non-conjugated polyene random copolymer rubber (A1), more preferably about 20 to 300 parts by weight.

The aging inhibitors useful for the present invention include commonly used known sulfur-based ones, radical inhibitors and ultraviolet ray absorbers.

The sulfur-based aging inhibitors useful for the present invention include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, mercaptols, monothio acids, polythio acids, thioamides, and sulfoxides.

More concretely, the sulfur-based aging inhibitors include:
mercaptans, e.g., 2-mercaptobenzothiazole;
salts of mercaptans, e.g., zinc salt of 2-mercaptobenzothiazole;
sulfides, e.g., 4,4'-thio-bis(3-methyl-6-t-butyl phenol), 4,4'-thio-bis(2-methyl-6-t-butyl phenol), 2,2'-thio-bis (4-methyl-6-t-butyl phenol), bis(3-methyl-4-hydroxy-5-t-butylbenzyl) sulfide, terephthaloyl di(2,6-dimethyl-4-t-butyl-3-hydroxybenzyl) sulfide, phenothiazine, 2,2'-thio-bis (4-octyl phenol) nickel, dilauryl thiodipropionate, distearyl thiodipropionate, dimyristyl thiodipropionate, ditridecyl thiodipropionate, distearylβ,β'-thiodibutyrate, lauryl-stearylthiodipropionate and 2,2-thio[diethyl-bis-3-(3,5-di-t-butyl-4-hydroxy phenol) propionate];
polysulfides, e.g., 2-benzothiazole disulfide;
dithiocarboxylates, e.g., zincdibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethyldithiocarbamate;
thioureas, e.g., 1-butyl-3-oxy-diethylene-2-thiourea, di-o-tolyl-thiourea and ethylene thiourea; and
thiophosphates, e.g., trilauryltrithiophosphate.

The above-described sulfur-based aging inhibitor prevents decomposition/aging of the main chain under heating much more efficiently than the other types for the curable rubber composition of the present invention, controlling the problems, e.g., residual surface tackiness.

The radical inhibitors useful for the present invention include phenol-based ones, e.g., 2,2-methylene-bis(4-methyl-6-t-butyl phenol) and tetrakis[methylene-3-(3,5-di-t-butyl-4-hydroxyphenyl)propio nate] methane; and amine-based ones, e.g., phenyl-β-naphthylamine, α-naphthylamine, N,N'-sec-butyl-p-phenylenediamine, phenothiazine and N,N'-diphenyl-p-phenylenediamine.

The ultraviolet ray absorbers useful for the present invention include 2-(2'-hydroxy-3',5'-di-t-butylphenyl) benzotriazole and bis(2,2,6,6-tetramethyl-4-piperidine) cebacate.

The aging inhibitor is incorporated at about 0.1 to 20 parts by weight per 100 parts by weight of the silyl-containing ethylene/α-olefin/non-conjugated polyene random copolymer rubber (A1), preferably 1 to 10 parts by weight.

Rubber Composition Curable at Normal Temperature (5) and its Uses

The rubber composition (5) of the present invention curable at normal temperature contains the curable composition with the silyl-containing ethylene/α-olefin/non-conjugated polyene random copolymer rubber as the component (A1). More concretely, it contains the organic polymer (Z), the silane compound (B5), and, as required, the curing catalyst (C). It can be suitably used for electric/electronic device members, transportation machines, and civil engineering/construction, medical and leisure areas, as described earlier.

The rubber composition (5) of the present invention curable at normal temperature can be used as sealants, potting agents, coating materials or adhesives for electric/electronic device members, transportation machines, and civil engineering/construction, medical and leisure areas.

Curable Rubber Composition (6)

The curable rubber composition (6) of the present invention contains the silyl-containing ethylene/α-olefin/non-conjugated polyene random copolymer rubber (A1), and specific amines (D), a specific silane coupling agent (B6) and a specific resin (E) as the active ingredients.

Amines (D)

The amines (D) useful for the present invention are selected from the group consisting of aliphatic amines, alicyclic amines, modified cycloaliphatic polyamines and ethanolamines.

The concrete examples of the aliphatic amines useful for the present invention include triethylamine, ethylenediamine, hexanediamine, diethylenetriamine, triethylenetetramine and tetraethylenepentamine.

The concrete examples of the alicyclic amines useful for the present invention include piperidine and piperazine.

The concrete examples of the modified cycloaliphatic polyamines useful for the present invention include those used as hardening agents for epoxy resin.

The concrete examples of the ethanolamines useful for the present invention include monoethanolamine, diethanolamine and triethanolamine.

These amines maybe used either individually or in combination.

The amines are incorporated normally at 30 parts by weight or less but more than 0 parts per 100 parts by weight of the silyl-containing ethylene/α-olefin/non-conjugated polyene random copolymer rubber (A1), more preferably 0.1 to 5 parts by weight.

Silane Coupling Agents (B6)

The silane coupling agent (B6) useful for the present invention is represented by the following general formula

$Y_3(Si)Z$ wherein Y is an alkoxyl group; and Z is an alkyl group containing a functional group selected from the group consisting of an amino group which may be substituted with an aminoalkyl group or not, and mercapto group.

The concrete examples of the silane coupling agents (B6) represented by the above-described general formula include γ-aminopropyltriethoxysilane, N-β-(aminoethyl)-γaminopropyltriethoxysilane, γ-mercaptopropyltriethoxysilane, γ-aminopropyltrimethoxysilane, N-β-(aminoethyl)-γ-aminopropyltrimethoxysilane, γ-mercaptopropyltrimethoxysilane.

The silane coupling agent (B6) is incorporated normally at 10 parts by weight or less but more than 0 parts per 100 parts by weight of the silyl-containing ethylene/α-olefin/non-conjugated polyene random copolymer rubber (A1), more preferably 0.1 to 5 parts by weight.

Resins (E)

The resins (E) useful for the present invention include a known lacquer-based, acrylic lacquer-based, acrylic resin-based, thermosetting acrylic, alkyd, melamine and epoxy paint, and organopolysiloxane.

For the present invention, an adequate quantity of the resin (E) is mixed with the silyl-containing ethylene/α-olefin/non-conjugated polyene random copolymer rubber (A1), the amines (D) and the silane coupling agent (B6)

Content of the resin (E) is not limited, but it is recommended to be incorporated normally at 0.1 to 1,000 parts by weight, including the solvent when the resin (E) is dissolved therein, per 100 parts by weight of the silyl-containing ethylene/α-olefin/non-conjugated polyene random copolymer rubber (A1), preferably 1 to 500 parts by weight.

Curable Rubber Composition (6)

The curable rubber composition (6) of the present invention is composed of the silyl-containing ethylene/α-olefin/non-conjugated polyene random copolymer rubber (A1)! amines (D), a silane coupling agent (B6) and a resin (E) as the active ingredients, as described earlier.

The curable rubber composition (6) of the present invention maybe incorporated, as required, with various additives, e.g., adhesion improver, property adjuster, storage stability improver, plasticizer, filler, aging inhibitor, ultraviolet ray absorber, metal deactivator, ozone-induced aging inhibitor, light stabilizer, amine-based radical chaining inhibitor, phosphorus-based peroxide decomposer, lubricant, pigment and foaming agent, within limits not detrimental to the object of the present invention.

The adhesion improvers useful for the present invention include silane coupling agents, e.g., commonly used adhesives and aminosilane compounds; and others. The concrete examples of these adhesion improvers include phenolic resin, epoxy resin, γ-aminopropyl trimethoxysilane, N-(β-aminoethyl)aminopropyl methyldimethoxysilane, coumarone/indene resin, rosin ester resin, terpene/phenol resin, α-methyl styrene/vinyl toluene copolymer, polyethylmethyl styrene, alkyl titanate, and aromatic polyisocyanate. The adhesion improver, when used, is incorporated preferably at about 1 to 50 parts by weight per 100 parts by weight of the silyl-containing ethylene/α-olefin/non-conjugated polyene random copolymer rubber (A1), more preferably about 5 to 30 parts by weight.

The storage stability improvers useful for the present invention include esters of ortho-organic acids, e.g., alkyl ortho-formate.

The storage stability improver, when used, is incorporated preferably at about 0.5 to 20 parts by weight per 100 parts by weight of the silyl-containing ethylene/α-olefin/non-conjugated polyene random copolymer rubber (A1), more preferably about 1 to 10 parts by weight.

The plasticizer useful for the present invention is also not limited, and any commonly used one may be used. Preferably, it should be compatible with each component for the rubber composition (6) of the present invention.

The concrete examples of these plasticizers include:

hydrocarbon-based compounds, e.g., polybutene, hydrogenated polybutene, ethylene/α-olefin co-oligomer, α-methyl styrene oligomer, biphenyl, triphenyl, triaryl dimethane, alkylene triphenyl, liquid polybutadiene, hydrogenated liquid polybutadiene, alkyl diphenyl, partially hydrogenated ter-phenyl, paraffin oil, naphthene oil and atactic polypropylene;

parafin chlorides;

phthalate esters, e.g., those of dibutyl phthalate, diheptyl phthalate, di(2-ethylhexyl) phthalate, butyl benzyl phthalate and butyl phthalyl butyl glycolate;

non-aromatic, dibasic acid esters, e.g., those of dioctyl adipate and dioctyl cebacate;

esters of polyalkylene glycol, e.g., those of diethylene glycol benzoate and triethylene glycol dibenzoate; and phosphate esters, e.g., those of tricresyl phosphate and tributyl phosphate. Of these, saturated hydrocarbon-based compounds are more preferable. They may be used either individually or in combination.

Of these, the hydrocarbon-based compounds free of unsaturated group (e.g., hydrogenated polybutene, hydrogenated liquid polybutadiene, paraffin oil, naphthene oil and atactic polypropylene) are more preferable, because they are well compatible with various components for the rubber composition (6) of the present invention, affecting curing speed of the rubber composition to only a limited extent, giving the cured product of high resistance to weather, and inexpensive.

The above plasticizer may replace the solvent used when a hydrolyzable silyl group is introduced into the above-described ethylene/α-olefin/non-conjugated polyene random copolymer rubber ($A_0$), in order to adjust reaction temperature and viscosity of the reaction system.

The plasticizer, when used, is incorporated preferably at about 10 to 500 parts by weight per 100 parts by weight of the silyl-containing ethylene/α-olefin/non-conjugated polyene random copolymer rubber (A1), more preferably about 20 to 300 parts by weight.

The concrete examples of the fillers include wood powder, pulp, cotton chips, asbestos, glass fibers, carbon fibers, mica, walnut shell powder, graphite, diatomaceous earth, white clay, fumed silica, settling silica, silicic anhydride, carbon black, calcium carbonate, clay, talc, titanium oxide, magnesium carbonate, quartz, fine aluminum powder, flint powder, and zinc powder. Of these, more preferable ones are thixotropic fillers, e.g., settling silica, fumed silica and carbon black; and calcium carbonate, titanium oxide and talc. The filler, when used, is incorporated preferably at about 10 to 500 parts by weight per 100 parts by weight of the silyl-containing ethylene/α-olefin/non-conjugated polyene random copolymer rubber (A1), more preferably about 20 to 300 parts by weight.

The aging inhibitors useful for the present invention include commonly used known ones, e.g., sulfur-based ones, radical inhibitors and ultraviolet ray absorbers.

The sulfur-based aging inhibitors useful for the present invention include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, mercaptols, monothio acids, polythio acids, thioamides, and sulfoxides.

The concrete examples of the sulfur-based aging inhibitors useful for the present invention include:

mercaptans, e.g., 2-mercaptobenzothiazole;

salts of mercaptans, e.g., zinc salt of 2-mercaptobenzothiazole;

sulfides, e.g., 4,4'-thio-bis(3-methyl-6-t-butyl phenol), 4,4'-thio-bis(2-methyl-6-t-butyl phenol), 2,2'-thio-bis(4-methyl-6-t-butyl phenol), bis(3-methyl-4-hydroxy-5-t-butyl-benzyl) sulfide, terephthaloyldi(2,6-dimethyl-4-t-butyl-3-hydroxybenzyl) sulfide, phenothiazine, 2,2'-thio-bis (4-octyl phenol) nickel, dilauryl thiodipropionate, distearyl thiodipropionate, dimyristyl thiodipropionate, ditridecyl thiodipropionate, distearylβ,β'-thiodibutyrate, lauryl-stearyl thiodipropionate and 2,2-thio[diethyl-bis-3-(3,5-di-t-butyl-4-hydroxy phenol)propionate];

polysulfides, e.g., 2-benzothiazole disulfide;

dithiocarboxylates, e.g., zincdibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethyldithiocarbamate;

thioureas, e.g., 1-butyl-3-oxy-diethylene-2-thiourea, di-o-tolyl-thiourea and ethylene thiourea; and thiophosphates, e.g., trilauryltrithiophosphate.

The above-described sulfur-based aging inhibitor prevents decomposition/aging of the main chain under heating much more efficiently than the other types for the curable rubber composition of the present invention, controlling the problems, e.g., residual surface tackiness.

The radical inhibitors useful for the present invention include phenol-based ones, e.g., 2,2-methylene-bis(4-methyl-6-t-butyl phenol) and tetrakis[methylene-3-(3,5-di-t-butyl-4-hydroxyphenyl)propio nate] methane; and amine-based ones, e.g., phenyl-β-naphthylamine, α-naphthylamine, N,N'-sec-butyl-p-phenylenediamine, phenothiazine and N,N'-diphenyl-p-phenylenediamine.

The ultraviolet ray absorbers useful for the present invention include 2-(2'-hydroxy-3',5'-di-t-butylphenyl) benzotriazole and bis(2,2,6,6-tetramethyl-4-piperidine) cebacate.

The aging inhibitor, when used, is incorporated preferably at about 0.1 to 20 parts by weight per 100 parts by weight of the silyl-containing ethylene/α-olefin/non-conjugated polyene random copolymer rubber (A1), more preferably about 1 to 10 parts by weight.

Curable Rubber Composition (6) and its Uses

The curable rubber composition (6) of the present invention contains the curable composition with the silyl-containing ethylene/α-olefin/non-conjugated polyene random copolymer rubber as the component (A1). More concretely, it contains the organic polymer (Z), the amines (D), the silane coupling agent (B6) and resin (E) as the active ingredients, the resin (E) being composed of a lacquer-based, acrylic lacquer-based, acrylic resin-based, thermosetting acrylic, alkyd, melamine or epoxy paint, or organopolysiloxane. It can be suitably used for electric/electronic device members, transportation machines, and civil engineering/construction, medical and leisure areas, as described earlier.

The curable rubber composition (6) of the present invention can be used as sealants, potting agents, coating materials or adhesives for electric/electronic device members, transportation machines, and civil engineering/construction and leisure areas.

Curable Composition (7)

The curable composition (7) of the present invention contains (a) the silyl-containing ethylene/α-olefin/non-conjugated polyene random copolymer rubber (A1) and (b) a silane-based compound substituted with amino group (B7).

The curable composition (7) of the present invention preferably contains (a) the silyl-containing ethylene/α-olefin/non-conjugated polyene random copolymer rubber (A1), (b) the compound having a silanol group and/or the compound which can react with moisture to form a compound having a silanol group in the molecule (B1), and the above-described silane-based compound substituted with amino group (B7),wherein the compound (B7) is composed of:
(c) a compound having a group containing silicon, to which 2 hydrolyzable groups are bonded, and amino group (B7-1), and
(d) a compound having a group containing silicon, to which 3 hydrolyzable groups are bonded, and amino group (B7-2).

The curable composition (7) of the present invention exhibits excellent characteristics with respect to curing speed and resistance to weather, which are mainly derived from the ethylene/α-olefin/non-conjugated polyene random copolymer rubber (A1) containing the hydrolyzable silyl group.

The curable composition (7) of the present invention is incorporated, as required, with a compound having a silanol group and/or a compound which can react with moisture to form a compound having a silanol group in the molecule (monovalent silanol-based compound) (B1).

The component (B1) is expected to bring the effect of decreasing modulus of the cured silyl-containing ethylene/α-olefin/non-conjugated polyene random copolymer rubber (A1). It is readily available, and has the excellent characteristic in that it produces the above effect when merely incorporated in the ethylene/α-olefin/non-conjugated polyene random copolymer rubber containing the hydrolyzable silyl group (A1).

Silane-based Compound Containing Amino Group (B7)

The curable composition (7) of the present invention is incorporated with a silane-based compound containing amino group (B7), in combination with the ethylene/α-olefin/non-conjugated polyene random copolymer rubber containing the hydrolyzable silyl group (A1). Various types of silane-based compounds containing amino group may be used, individually or in combination. It is however preferable to simultaneously use the compounds (B7-1) and (B7-2) described in detail below, wherein the compound (B7-1)

has a group containing silicon, to which 2 hydrolyzable groups are bonded, and amino group(s) (bifunctional aminosilane compound) and the compound (B7-2) has a group containing silicon, to which 3 hydrolyzable groups are bonded, and amino group(s) (trifunctional aminosilane compound).

Bifunctional Aminosilane Compound (B7-1)

The group containing silicon to which 2 hydrolyzable groups are bonded in the bifunctional aminosilane compound (B7-1) for the present invention is represented by the following general formula:

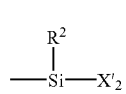

wherein, $R^2$ is a monovalent organic group of 1 to 40 carbon atoms; and X' is a hydrolyzable group.

The examples of the hydrolyzable groups include halogen and hydrogen atom, and alkoxyl, acyloxy, ketoxymate, amino, amide, aminoxy, mercapto and alkenyloxy group. Alkoxyl group, e.g., methoxy or ethoxy, is more preferable because of its mild hydrolyzability.

Amino group may be —$NH_2$ or substituted amino group, e.g., —$NH_2$ whose hydrogen atom is substituted with another group. The amino group is represented by the general formula —$N(R^4)_2$, wherein $R^4$ is hydrogen atom or a hydrocarbon group of 1 to 30 carbon atoms, which may be substituted or not, and may be the same or different).

The concrete examples of the bifunctional aminosilane compounds (B7-1) include $H_2NCH_2CH_2CH_2Si(CH_3)(OCH_3)_2$, $H_2NCH_2CH_2NHCH_2CH_2CH_2Si(CH_3)(HCH_3)_2$, $(CH_3)NHCH_2CH_2CH_2Si(CH_3)(OCH_3)_2$, $(C_2H_5)NHCH_2CH_2NHCH_2CH_2CH_2Si(CH_3)(OCH_3)_2$, $H_2NCH_2CH_2CH_2Si(CH_3)(OCOCH_3)_2$, $H_2NCH_2CH_2CH_2Si(CH_3)(ON=C(CH_3)(C_2H_5))_2$ and $H_2NCH_2CH_2CH_2Si(CH_3)(OC(CH_3)=CH_2)_2$.

The bifunctional aminosilane compound (B7-1) is incorporated preferably at 0.1 to 20 parts by weight per 100 parts by weight of the silyl-containing ethylene/α-olefin/non-conjugated polyene random copolymer rubber (A1), more preferably 0.5 to 10 parts by weight. At the same time, it is not desirable to incorporate the bifunctional aminosilane compound (B7-1) at an excessive content relative to the monovalent silanol-based compound ($B_1$). The monovalent silanol-based compound (B1)/bifunctional aminosilane compound (B7-1) ratio is preferably 1/0.01 to 1/5 by weight, more preferably 1/0.05 to 1/2 by weight.

Trifunctional Aminosilane Compound (B7-2)

The group containing silicon to which 3 hydrolyzable groups are bonded in the trifunctional aminosilane compound (B7-2) for the present invention is represented by the general formul a —$SiX_3$, wherein X is a hydrolyzable group. The amino group can be the same as that described earlier.

The concrete examples of the trifunctional aminosilane compounds (B7-2) include $H_2NCH_2CH_2CH_2Si(OCH_3)_3$, $H_2NCH_2CH_2NHCH_2CH_2CH_2Si(OCH_3)_3$, $(CH_3)NHCH_2CH_2CH_2Si(OCH_3)_3$, $(C_2H_5)NHCH_2CH_2NHCH_2CH_2CH_2Si(OCH_3)_3$, $H_2NCH_2CH_2CH_2Si(OCOCH_3)_3$, $H_2NCH_2CH_2CH_2Si(ON=C(CH_3)(C_2H_5))_3$ and $H_2NCH_2CH_2CH_2Si(OC(CH_3)=CH_2)_3$.

The trifunctional amino silane compound (B7-2) is incorporated preferably at 0.01 to 5 parts by weight per 100 parts by weight of the silyl-containing ethylene/α-olefin/non-conjugated polyene random copolymer rubber (A1), more preferably 0.05 to 3 parts by weight. At the same time, it is not desirable to incorporate the trifunctional aminosilane compound (B7-2) at an excessive content relative to the monovalent silanol-based compound (B1), because of increased modulus of the cured composition. The monovalent silanol-based compound (B1)/trifunctional aminosilane compound (B7-2) ratio is preferably 1/0.01 to 1/0.75 by weight, more preferably 1/0.02 to 1/0.5 by weight.

Other Components

The curable composition (7) of the present invention may be incorporated, as required, with one or more additives, e.g., a curing promoter, a plasticizer or a filler.

The curing promoters useful for the present invention include an organotin compound, an acidic phosphate ester, a product by the reaction between an acidic phosphate ester and an amine, saturated or unsaturated polyvalent carboxylic acid or its anhydride, and organic titanate compounds.

The organotin compounds useful for the present invention include dibutyl tin dilaurate, dioctyl tin maleate, dibutyl tin phthalate, tin octylate and dibutyl tin methoxide.

The acidic phosphate esters useful for the present invention include those containing the part represented by the following formula

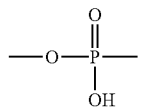

for example, those represented by the following general formula:

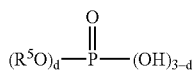

wherein, "d" is 1 or 2; and $R^5$ is an organic group. More concretely, they include the following compounds:

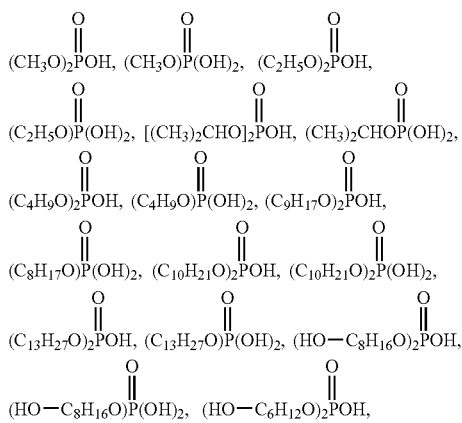

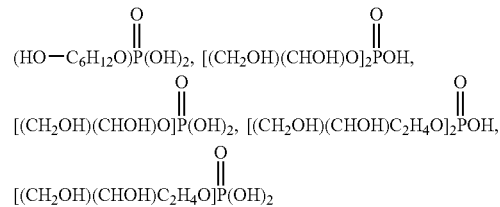

The organic titanate compound includes titanate esters, e.g., those of tetrabutyl titanate, tetraisopropyl titanate and triethanolamine titanate.

The curing promoter, when used, is incorporated preferably at 0.1 to 10 parts by weight per 100 parts by weight of the silyl-containing ethylene/α-olefin/non-conjugated polyene random copolymer rubber (A1).

The plasticizers useful for the present invention include low-molecular-weight plasticizers, e.g., dioctyl phthalate, high-molecular-weight plasticizers, and high-viscosity plasticizers.

The concrete examples of the plasticizers useful for the present invention include phthalate esters, e.g., those of dibutyl phthalate, diheptyl phthalate, di(2-ethylhexyl) phthalate, butyl benzyl phthalate and butyl phthalyl butyl glycolate; non-aromatic, dibasic acid esters, e.g., those of dioctyl adipate and dioctyl cebacate; esters of polyalkylene glycol, e.g., those of diethylene glycol dibenzoate and triethylene glycol dibenzoate; phosphate esters, e.g., those of tricresyl phosphate and tributyl phosphate; chlorinated paraffins; and hydrocarbon-based oils, e.g., alkyl diphenyl, polybutene, hydrogenated polybutene, ethylene/α-olefin oligomer, α-methyl styrene oligomer, biphenyl, triphenyl, triaryl dimethane, alkylene triphenyl, liquid polybutadiene, hydrogenated liquid polybutadiene, paraffin oil, naphthene oil, atactic polypropylene and partially hydrogenated ter-phenyl.

These plasticizers may be used either individually or in combination. The plasticizer may be incorporated, while the polymer is produced.

Of these, the hydrocarbon-based compounds free of unsaturated groups (e.g., hydrogenated polybutene, hydrogenated liquid polybutadiene, paraffin oil, naphthene oil and atactic polypropylene) are more preferable, because they are well compatible with various components for the curable composition (7) of the present invention, affecting curing speed of the composition to only a limited extent, giving the cured product of high resistance to weather, and inexpensive.

The above plasticizer maybe selected in dependence on specific purposes, e.g., adjustment of characteristics and properties.

The plasticizer, when used, is incorporated preferably at about 1 to 400 parts by weight per 100 parts by weight of the silyl-containing ethylene/α-olefin/non-conjugated polyene random copolymer rubber (A1), more preferably 1 to 150 parts, still more preferably 10 to 120 parts, particularly preferably 20 to 100 parts by weight.

The concrete examples of the fillers include wood powder, pulp, cotton chips, asbestos, glass fibers, carbon fibers, mica, walnut shell powder, rice hull powder, graphite, diatomaceous earth, white clay, fumed silica, settling silica, silicic anhydride, carbon black, calcium carbonate, clay, kaolin, talc, titanium oxide, magnesium carbonate, quartz powder, glass beads, fine aluminum powder, flint powder, and zinc powder. Of these, more preferable ones are thixotropic fillers, e.g., settling silica, fumed silica and carbon black; and calcium carbonate, titanium oxide and talc. They may be used either individually or in combination.

The aging inhibitors useful for the present invention include commonly used known ones, e.g., sulfur-based ones, radical inhibitors and ultraviolet ray absorbers.

The sulfur-based aging inhibitors useful for the present invention include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, mercaptols, monothio acids, polythio acids, thioamides, and sulfoxides.

More concretely, the sulfur-based aging inhibitors include:

mercaptans, e.g., 2-mercaptobenzothiazole; salts of mercaptans, e.g., zinc salt of 2-mercaptobenzothiazole; sulfides, e.g., 4,4'-thio-bis(3-methyl-6-t-butyl phenol), 4,4'-thio-bis (2-methyl-6-t-butyl phenol), 2,2'-thio-bis(4-methyl-6-t-butyl phenol), bis(3-methyl-4-hydroxy-5-t-butylbenzyl) sulfide, terephthaloyl di(2,6-dimethyl-4-t-butyl-3-hydroxybenzyl) sulfide, phenothiazine, 2,2'-thio-bis (4-octyl phenol) nickel, dilauryl thiodipropionate, distearyl thiodipropionate, dimyristyl thiodipropionate, ditridecyl thiodipropionate, distearylβ,β'-thiodibutyrate, lauryl-stearyl thiodipropionate and 2,2-thio[diethyl-bis-3-(3,5-di-t-butyl-4-hydroxy phenol)propionate]; polysulfides, e.g., 2-benzothiazole disulfide; dithiocarboxylates, e.g., zinc dibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethyldithiocarbamate; thioureas, e.g., 1-butyl-3-oxy-diethylene-2-thiourea, di-o-tolyl-thiourea and ethylene thiourea; and thiophosphates, e.g., trilauryltrithiophosphate.

The above-described sulfur-based aging inhibitor prevents decomposition/aging of the main chain under heating much more efficiently than the other types for the curable composition (7) of the present invention, controlling the problems, e.g., residual surface tackiness.

The radical inhibitors useful for the present invention include phenol-based ones, e.g., 2,2-methylene-bis(4-methyl-6-t-butyl phenol) and tetrakis [methylene-3-(3,5-di-t-butyl-4-hydroxyphenyl)propio nate]methane; and amine-based ones, e.g., phenyl-β-naphthylamine, α-naphthylamine, N,N'-sec-butyl-p-phenylenediamine, phenothiazine and N,N'-diphenyl-p-phenylenediamine.

The ultraviolet ray absorbers useful for the present invention include 2-(2'-hydroxy-3',5'-di-t-butylphenyl) benzotriazole and bis(2,2,6,6-tetramethyl-4-piperidine) cebacate.

The curable composition (7) of the present invention thus prepared is useful for adhesives, tackifiers, paints, waterproof materials for coating films, sealant compositions, shaping materials, casting rubber materials and foaming materials.

When used as a sealant for construction works, for example, the composition (7) of the present invention is incorporated with an inorganic filler, e.g., calcium carbonate, talc or kaolin, normally at 10 to 300 parts by weight, and further with a pigment (e.g., titanium oxide, carbon black), ultraviolet ray absorber or aging inhibitor (radical chaining inhibitor), as required, and kneaded sufficiently uniformly by a kneader or paint roll. The composition is cured, when applied and exposed to moisture in air, into a rubber elastomer of good characteristics.

Curable Composition (7) and its Uses

The curable composition (7) of the present invention contains the curable composition with the silyl-containing ethylene/α-olefin/non-conjugated polyene random copolymer rubber as the component (A1). More concretely, the curable composition (7), containing (a) the organic polymer (Z) and (b) the silane-based compound substituted with amino group (B7) can be suitably used for electric/electronic device members, transportation machines, and civil engineering/construction, medical and leisure areas, as described earlier.

It is preferable, as described earlier, that the composition (7) is composed of:
(a) the organic polymer (Z),
(b) the monovalent silanol-based compound (B1), and the above-described silane-based compound substituted with amino group (B7), which is composed of:
(c) the bifunctional aminosilane compound (B7-1) and
(d) the trifunctional aminosilane compound (B7-2).

The curable composition (7) of the present invention can be suitably used as sealants, potting agents, coating materials or adhesives for electric/electronic device members, transportation machines, and civil engineering/construction, medical and leisure areas.

In other words, the present invention can provide sealants, potting agents, coating materials and adhesives, composed of the curable composition containing the organic polymer (Z) and silane-based compound substituted with amino group (B7).

It is preferable, as described earlier, that each of the sealants, potting agents, coating materials and adhesives is composed of:
(a) the organic polymer (Z),
(b) the monovalent silanol-based compound (B1), and the above-described silane-based compound substituted with amino group (B7), which is composed of:
(c) the bifunctional aminosilane compound (B7-1) and
(d) the trifunctional aminosilane compound (B7-2).

Curable Composition (8)

The curable composition (8) of the present invention contains the silyl-containing ethylene/α-olefin/non-conjugated polyene random copolymer rubber (A1), and a filler (F), a plasticizer (G), a curing catalyst (H) and an organocarboxylate compound (B8).

The curable composition (8) of the present invention exhibits excellent characteristics with respect to curing speed and resistance to weather, which is mainly derived from the ethylene/α-olefin/non-conjugated polyene random copolymer rubber (A1) containing the hydrolyzable silyl group.

Filler (F)

The filler (F) useful for the present invention is not limited. The concrete examples of the fillers include reinforcing fillers, e.g., fumed silica, settling silica, silicic anhydride, silicic hydride and carbon black; inorganic or organic fillers, e.g., calcium carbonate, magnesium carbonate, diatomaceous earth, fired clay, clay, talc, titanium oxide, bentonite, organic bentonite, ferric oxide, zinc oxide, activated zinc white, hydrogenated castor oil, PVC and polyolefin; fibrous fillers, e.g., asbestos and glass fibers or filaments;

inorganic or organic balloons, e.g., those of silas, glass, saran and phenol.

They may be used either individually or in combination.

Plasticizer (G)

The plasticizer (G) useful for the present invention is not limited. The concrete examples of the plasticizers include phthalate esters, e.g., those of dibutyl phthalate, diheptyl phthalate, di(2-ethylhexyl) phthalate, dioxtyl phthalate, butyl benzyl phthalate and butyl phthalyl butyl glycolate; non-aromatic, dibasic acid esters, e.g., those of dioctyl adipate and dioctyl cebacate; esters of polyalkylene glycol, e.g., those of diethylene glycol dibenzoate and triethylene glycol dibenzoate; phosphate esters, e.g., those of tricresyl phosphate and tributyl phosphate; chlorinated paraffins; and hydrocarbon-based oils, e.g., alkyl diphenyl, polybutene, hydrogenated polybutene, ethylene/α-olefin oligomer, α-methyl styrene oligomer, biphenyl, triphenyl, triaryl dimethane, alkylene triphenyl, liquid polybutadiene, hydrogenated liquid polybutadiene, paraffin oil, naphthene oil, atactic polypropylene and partially hydrogenated ter-phenyl.

These compounds may be used either individually or in combination. The plasticizer may be incorporated, while the polymer is produced.

Of these, the hydrocarbon-based compounds are more preferable, because they are commonly used, low in cost and excellent in resistance to weather.

Curing Catalyst (H)

The curing catalyst (H) useful for the present invention is not limited. The concrete examples of the curing catalysts include silanol condensing catalysts, such as: titanate esters, e.g., those of tetrabutyl titanate and tetrapropyl titanate; tin carbonates, e.g., dibutyl tin dilaurate, dibutyl tin maleate, dibutyl tin diacetate, tin octylate and tin naphthenate; product of the reaction between dibutyl tin oxide and a phthalate ester; dibutyl tin acetylacetonate; organoaluminum compounds, e.g., aluminum trisacetylacetonate, aluminum trisethylacetoacetate and diisopropoxy aluminum ethylacetoacetate; chelate compounds, e.g., zirconium tetraacetylacetonate and titanium tetraacetylacetonate; lead octylate; amine-based compounds, and salts of these compounds and carboxylates, e.g., butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl) phenol, morpholine, N-methyl morpholine, 2-ethyl-4-methylimidazole and 1,8-diazabicyclo(5,4,0) undecene-7 (DBU); low-molecular-weight polyamide resins produced by the reactions between excessive quantities of polyamines and polybasic acids; products of the reactions between excessive quantities of polyamines and epoxy compounds; and amine-containing silane coupling agents, e.g., γ-aminopropyl trimethoxysilane, N-(β-aminoethyl)aminopropyl methyldimethoxysilane. The silanol condensing catalysts useful for the present invention are not limited to the above, and include the commonly used condensing catalysts, acidic or basic. These catalysts may be used either individually or in combination.

Of these curing catalysts, more preferable ones are titanium- and tin-based ones, viewed from availability and cost performance.

The curing condensing catalyst is incorporated preferably at about 0.1 to 20 parts by weight per 100 parts by weight of the silyl-containing ethylene/α-olefin/non-conjugated polyene random copolymer rubber (A1), more preferably 1 to 10 parts by weight. The catalyst content below the above-mentioned range is undesirable, because of insufficient curing speed and insufficient extent of the curing reaction, and the content beyond the above range is also undesirable, because of local heating or foaming occurring during the curing process to make it difficult to produce the cured product of good properties.

Organocarboxylic Acid Compound (B8)

The organocarboxylic acid compounds (B8) useful for the present invention include aliphatic monocarboxylic, aliphatic dicarboxylic, aliphatic polycarboxylic, and aromatic carboxylic acids. The concrete examples are described below for each type, although not limited thereto.

(1) Aliphatic monocarboxylic acids:
(a) saturated aliphatic monocarboxylic acids, e.g., formic, acetic, acetoacetic, ethylmethylacetic, propionic, butyric, isobutyric, 2-ethylbutyric, ethoxybutyric, valeric, isovaleric, hexanic, 2-ethylhexanic, octanic, decanic, undecanic, stearic, glyoxylic, glycolic and gluconic acids;
(b) olefinic monocarboxylic acids, e.g., acrylic, methacrylic, angelic, crotonic, isocrotonic, 10-undecenic, elaidic, erucic and oleic acids;
(c) acetylenic monocarboxylic acids, e.g., propiolic acd;
(d) diolefinic monocarboxylic acids, e.g., linolic and linoelaidic acids;
(e) highly unsaturated monocarboxylic acids, e.g., linolenic and arachidonic acids; and
(f) halogen-substituted monocarboxylic acids, e.g., chloroacetic, 2-chloroacrylic and chlorobenzoic acids;

(2) Aliphatic dicarboxylic acids:
(a) saturated dicarboxylic acids, e.g., adipic, azelaic, ethylmalonic, glutaric, oxalic, malonic, succinic and oxydiacetic acids; and
(b) unsaturated dicarboxylic acids, e.g., maleic, fumaric, acetylene dicarboxylic and itaconic acids;

(3) Aliphatic polycarboxylic acids:
(a) tricarboxylic acids, e.g., aconitic, citric and isocitric acids (4) Aromatic carboxylic acids:
(a) aromatic monocarboxylic acids, e.g., benzoic, 9-anthracene carboxylic, atrolactic, anisic, isopropyl benzoic, salicylic and toluylic acids; and
(b) aromatic polycarboxylic acids, e.g., phthalic, isophthalic, terephthalic, carboxyphenylacetic and pyromellitic acids (5) Others
Amino acids, e.g., alanine, leucine, threonine, aspartic acid, glutamic acid, arginine, cysteine, methionine, phenylalanine, tryptophan and histidine Any compound may be used for the organocarboxylic acid (B8) for the present invention, so long as it has at least one carboxyl group. These compounds may be used either indvidually or in combination. Of the above-described compounds, aliphatic monocarboxylic compounds are more preferable, those of 2 to 30 carbon atoms being still more preferable.

Content of the organocarboxylic acid (B8) can be set depending on purposes, e.g., improvement of curing speed or of curing delay after the composition is stored. It is however incorporated normally at 0.01 to 10 parts by weight per 100 parts by weight of the silyl-containing ethylene/α-olefin/non-conjugated polyene random copolymer rubber (A1), preferably 0.1 to 5 parts by weight, viewed from the balance between improvement effects and cost.

Other Components

The curable composition (8) of the present invention may be adequately incorporated, as required, with various additives, e.g., dehydrator, tackifier, property adjuster, storage stability improver, aging inhibitor, ultraviolet ray absorber, metal deactivator, ozone-induced aging inhibitor, light stabilizer, amine-based radical chaining inhibitor, phosphorus-based peroxide decomposer, lubricant, pigment and foaming agent.

The dehydrators useful for the present invention include those reactive with water, particularly preferably hydrolyzable silicon compounds. The hydrolyzable silicon compound is a generic term for the low-molecular-weight silicon compounds having a hydrolyzable functional group reactive in the presence of moisture, normally preferably those having a molecular weight of 300 or less. It may contain any functional group, in addition to a hydrolyzable functional one. The hydrolyzable groups include alkoxyl, acyloxy, ketoximate, amino, aminoxy, amide and alkenyloxy. The other functional groups include epoxy-, amino-, acrylic- and mercapto-containing groups.

The concrete examples of these compounds include

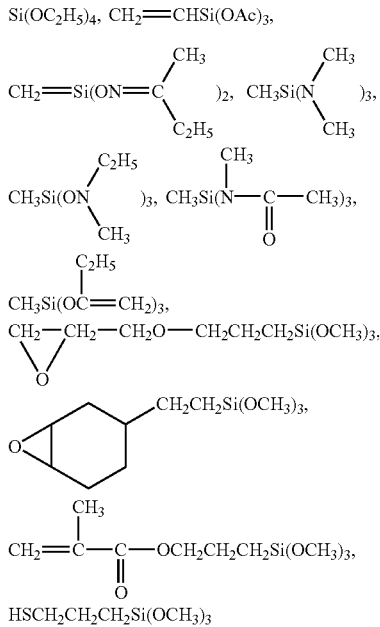

In addition to the dehydrator, an aminosilane compound may be incorporated as the tackifier agent and dehydrator.

The aminosilane compounds useful for the present invention include amino-substituted alkoxysilanes and derivatives thereof. The concrete examples of these compounds include the products by the reactions of an amino-substituted alkoxysilane or derivative thereof, e.g.,

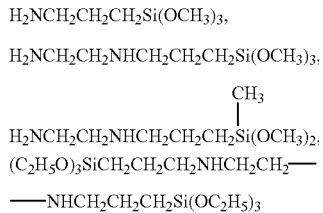

with an epoxy silane, e.g.,

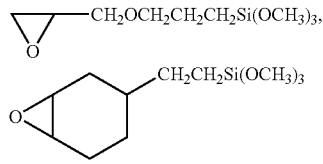

or the above described amino-substituted alkoxysilane with an acryloylsilane, e.g.,

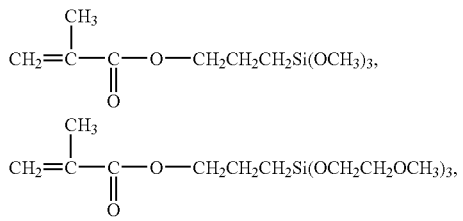

The product of the reaction of an amino-substituted alkoxysilane with epoxy silane compound or with acryloyl-silane compound can be easily produced by stirring the silane compound and amino-substituted alkoxysilane, mixed in a molar ratio of 0.2 to 5, at room temperature to 180° C. for 1 to 8 hours.

The amino-substituted alkoxysilane or derivative thereof is incorporated preferably at about 0.01 to 20 parts by weight per 100 parts by weight of the silyl-containing ethylene/α-olefin/non-conjugated polyene random copolymer rubber (A1).

The adhesion improvers useful for the present invention include commonly used adhesives and silane coupling agents, e.g., epoxysilane compounds and aminosilane compounds; and others. The concrete examples of these adhesion improvers include phenolic resins, epoxy resins, γ-aminopropyl trimethoxysilane, N-(β-aminoethyl)aminopropyl methyldimethoxysilane, coumarone/indene resins, rosin ester resins, terpene/phenol resins, α-methyl styrene/vinyl toluene copolymers, polyethylmethyl styrenes, alkyl titanates, and aromatic polyisocyanates.

The storage stability improvers useful for the present invention include compounds with silicon to which a hydrolyzable group is bonded and esters of ortho-organic acids. The concrete examples of the storage stability improvers include methyltrimethoxy silane, methyltriethoxy silane, tetramethoxy silane, ethyltrimethoxy silane, dimethyldiethoxy silane, trimethylisobutoxy silane, trimethyl (n-butoxy) silane, n-butyltrimethoxy silane, and methyl orthoformate.

The aging inhibitors useful for the present invention include commonly used known ones, e.g., sulfur-based ones, radical inhibitors and ultraviolet ray absorbers.

The sulfur-based aging inhibitors useful for the present invention include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, mercaptols, monothio acids, polythio acids, thioamides, and sulfoxides.

More concretely, the sulfur-based aging inhibitors include mercaptans, e.g., 2-mercaptobenzothiazole; salts of mercaptans, e.g., zinc salt of 2-mercaptobenzothiazole; sulfides, e.g., 4,4'-thio-bis(3-methyl-6-t-butyl phenol), 4,4'-thio-bis (2-methyl-6-t-butyl phenol), 2,2'-thio-bis(4-methyl-6-t-butyl phenol), bis(3-methyl-4-hydroxy-5-t-butylbenzyl) sulfide, terephthaloyldi(2,6-dimethyl-4-t-butyl-3-hydroxybenzyl) sulfide, phenothiazine, 2,2'-thio-bis (4-octyl phenol) nickel, dilauryl thiodipropionate, distearyl thiodipropionate, dimyristyl thiodipropionate, ditridecyl thiodipropionate, distearylβ,β'-thiodibutyrate, lauryl-stearyl thiodipropionate and 2,2-thio[diethyl-bis-3(3,5-di-t-butyl-4-hydroxy phenol)propionate]; polysulfides, e.g., 2-benzothiazole disulfide; dithiocarboxylates, e.g., zinc dibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethyldithiocarbamate; thioureas, e.g., 1-butyl-3-oxy-diethylene-2-thiourea, di-o-tolyl-thiourea and ethylene thiourea; and thiophosphates, e.g., trilauryltrithiophosphate.

The above-described sulfur-based aging inhibitor prevents decomposition/aging of the main chain under heating much more efficiently than the other types for the composition of the present invention, controlling the problems, e.g., residual surface tackiness.

The radical inhibitors useful for the present invention include phenol-based ones, e.g., 2,2-methylene-bis(4-methyl-6-t-butyl phenol) and tetrakis[methylene-3-(3,5-di-t-butyl-4-hydroxyphenyl)propio nate]methane; and amine-based ones, e.g., phenyl-β-naphthylamine, α-naphthylamine, N,N'-sec-butyl-p-phenylenediamine, phenothiazine and N,N'-diphenyl-p-phenylenediamine.

The ultraviolet ray absorbers useful for the present invention include 2-(2'-hydroxy-3',5'-di-t-butylphenyl) benzotriazole and bis(2,2,6,6-tetramethyl-4-piperidine) cebacate.

The method of producing the composition (8) of the present invention is not limited. For example, the composition comprising the above-described components is kneaded at normal or elevated temperature by a mixer, roll or kneader, or mixing the components after being dissolved in a small quantity of an adequate solvent. These components are incorporated in an adequate ratio, to produce a one-liquid or two-liquid type curable composition.

The curable composition (8) of the present invention forms the three-dimensional network structures when exposed to moisture in air, transforming itself into the solid showing rubber-like elasticity.

Curable Composition (8) and its Uses

The curable composition (8) of the present invention contains the curable composition with the hydrolyzable silyl-containing ethylene/α-olefin/non-conjugated polyene random copolymer rubber as the component (A1). More concretely, the curable composition (8) of the present invention contains (a) the organic polymer (Z), and a filler (F), plasticizer (G), curing catalyst (H) and organocarboxylate compound (B8). It can be suitably used for electric/electronic device members, transportation machines, and civil engineering/construction, medical and leisure areas, as described earlier.

The curable composition (8) of the present invention can be used as sealants, potting agents, coating materials or adhesives for electric/electronic device members, transportation machines, and civil engineering/construction, medical and leisure areas.

In other words, the present invention provides sealants, potting agents, coating materials and adhesives, composed of the curable composition, composed of the organic polymer (Z), and filler (F), plasticizer (G), curing catalyst (H) and organocarboxylate compound (B8).

The curable composition of the present invention (8) is particularly useful for an elastomer sealant for buildings, ships, automobiles and roads. It is also useful for various types of sealant and adhesive compositions, because it is adhesive to a wide range of bases, e.g., formed shapes of glass, porcelain, lumber, metal s and resin in the presence or absence of primer. Moreover, it is also useful for tackifiers, paints, waterproof materials for coating films, food wrapping materials, shaping materials, casting rubber materials and foaming materials.

Curable Rubber Composition (9)

The curable rubber composition (9) of the present invention contains the silyl-containing ethylene/α-olefin/non-conjugated polyene random copolymer rubber (A1), alcohols (B9) and/or a hydrolyzable ester compound (I) (except a hydrolyzable organosilicon compound (B10).

Alcohols (B9)

Of the alcohols (B9) and/or hydrolyzable ester compounds (I) (except a hydrolyzable organosilicon compound (B10)) useful for the present invention, the concrete examples of the alcohols (B9) include metahnol, ethanol, 2-methoxyethanol, sec-butanol and tert-butanol. Preferably, these mentioned alcohols are used for the present invention.

The alcohols (B9) are incorporated preferably at 5 to 40 parts by weight per 100 parts by weight of the silyl-containing ethylene/α-olefin/non-conjugated polyene random copolymer rubber (A1), more preferably 7 to 30 parts, still more preferably 10 to 20 parts by weight. At below 5 parts, they may not sufficiently improve the storage stability of the curing composition as one of the objects of the present invention. At above 40 parts, on the other hand, a phenomenon known as brushing may occur, which may make not only the composition itself but also coating film thereof turbid white.

Hydrolyzable Ester Compound (I)

Of the alcohols (B9) and/or hydrolyzable ester compounds (I) (except a hydrolyzable organosilicon compound (B10)) useful for the present invention, the hydrolyzable ester compounds (I) are preferably alkyl orthoformates. The concrete examples of alkyl orthoformates include methyl orthoformate, ethyl orthoformate, propyl orthoformate, butyl orthoformate and orthophenyl, of which methyl orthoformate and ethyl orthoformate are more preferable. The hydrolyzable ester compounds (I) is incorporated preferably at 3 to 30 parts by weight per 100 parts by weight of the silyl-containing ethylene/α-olefin/non-conjugated polyene random copolymer rubber (A1), more preferably 5 to 20 parts, still more preferably 10 to 20 parts by weight. At below 3 parts, it may not sufficiently improve the storage stability of the curing composition as one of the objects of the present invention. The upper limit of its content is not limited, but it is not highly economical to use it at above 30 parts.

Hydrolyzable Organosilicon Compound (B10)

The hydrolyzable organosilicon compounds (B10) useful for the present invention include alkoxysilane compounds. The concrete examples of these compounds include trimethoxysilane, triethoxysilane, methyldiethoxysilane, methyldimethoxysilane, phenyldimethoxysilane, ethyldiethoxysilane, ethyldimethoxysilane, butyldiethoxysilane, butyldimethoxysilane, methyltrimethoxysilane, ethyltrimethoxysilane, butyltrimethoxysilane, phenyltrimethoxysilane, methyltriethoxysilane, ethyltriethoxysilane, butyltriethoxysilane, phenyltriethoxysilane, dimethyldiethoxysilane, dibutyldiethoxysilane, and diphenyldiethoxysilane.

The hydrolyzable organosilicon compound (B10) is incorporated preferably at 2 to 20 parts by weight per 100 parts by weight of the silyl-containing ethylene/$\alpha$-olefin/non-conjugated polyene random copolymer rubber (A1), more preferably 2 to 15 parts, still more preferably 2 to 10 parts by weight. At below 2 parts, it may not sufficiently improve the storage stability of the curing composition as one of the objects of the present invention. At above 20 parts, on the other hand, the cured coating film may become fragile.

Curing Promotors

A curing promoter is not essential for curing the curable rubber composition of the present invention. The curing promoters useful for the present invention, when used, include an alkyl titanate, metal salt of carboxylic acid (e.g., tin octylate and dibutyl tin laurate), amine salt (e.g., dibutylamine-2-hexoate), and other acidic and basic catalysts.

The curing promoter is incorporated preferably at 0.001 to 10 parts by weight per 100 parts by weight of the silyl-containing ethylene/$\alpha$-olefin/non-conjugated polyene random copolymer rubber (A1).

Other Components

The curable rubber composition (9) of the present invention may be incorporated, as required, with one or more additives within limits not detrimental to the object of the present invention. The additives useful for the present invention include adhesion improver, property adjuster, storage stability improver, plasticizer, filler; aging inhibitor, ultraviolet ray absorber, metal deactivator, ozone-caused aging inhibitor, light stabilizer, amine-based radical chaining inhibitor; phosphorus-based peroxide decomposer, lubricant, pigment, and foaming agent.

The adhesion improvers useful for the present invention include commonly used adhesives and silane coupling agents, e.g., aminosilane compounds and epoxy silane compounds; and others. The concrete examples of these adhesion improvers include phenolic resins, epoxy resins, $\gamma$-aminopropyl trimethoxysilane, N-($\beta$-aminoethyl)aminopropyl methyldimethoxysilane, coumarone/indene resins, rosin ester resins, terpene/phenol resins, $\alpha$-methyl styrene/vinyl toluene copolymers, polyethylmethyl styrenes, alkyl titanates, and aromatic polyisocyanates. The adhesion improver, when used, is incorporated preferably at about 1 to 50 parts by weight per 100 parts by weight of the silyl-containing ethylene/$\alpha$-olefin/non-conjugated polyene random copolymer rubber (A1), more preferably 5 to 30 parts by weight.

The storage stability improvers useful for the present invention include esters of ortho-organic acids (other than an alkyl orthoformate). The storage stability improver, when used, is incorporated preferably at about 0.5 to 20 parts by weight per 100 parts by weight of the silyl-containing ethylene/$\alpha$-olefin/non-conjugated polyene random copolymer rubber (A1), more preferably 1 to 10 parts by weight.

The plasticizer useful for the present invention is also not limited, and any commonly used one may be used. Preferably, it should be compatible with each component for the rubber composition (9) of the present invention.

The concrete examples of these plasticizers include:

hydrocarbon-based compounds, e.g., polybutene, hydrogenated polybutene, ethylene/$\alpha$-olefin oligomer, $\alpha$-methyl styrene oligomer, biphenyl, triphenyl, triaryl dimethane, alkylene triphenyl, liquid polybutadiene, hydrogenated liquid polybutadiene, alkyl diphenyl, partially hydrogenated ter-phenyl, paraffin oil, naphthene oil and atactic polypropylene;

parafin chlorides;

phthalate esters, e.g., those of dibutyl phthalate, diheptyl phthalate, di(2-ethylhexyl) phthalate, butyl benzyl phthalate and butyl phthalyl butyl glycolate;

non-aromatic, dibasic acid esters, e.g., those of dioctyl adipate and dioctyl cebacate;

esters of polyalkylene glycol, e.g., those of diethylene glycol benzoate and triethylene glycol dibenzoate; and phosphate esters, e.g., those of tricresyl phosphate and tributyl phosphate. Of these, saturated hydrocarbon-based compounds are more preferable. They may be used either individually or in combination.

Of the above-described compounds, hydrocarbon-based compounds free of unsaturated group, e.g., hydrogenated polybutene, hydrogenated liquid polybutadiene, paraffin oil, naphthene oil and atactic polypropylene, are more preferable for various reasons, e.g., high compatibility with each component for the rubber composition (9) of the present invention, limited effects on curing speed of the rubber composition, good resistance to weather of the cured product, and cheapness.

The plasticizer may be used in place of the solvent during the process of introducing a hydrolyzable silyl group into the above-described ethylene/$\alpha$-olefin/non-conjugated polyene random copolymer rubber (A$_0$), for the purposes of, e.g., adjusting reaction temperature and viscosity of the reaction system.

The plasticizer is incorporated preferably at about 10 to 500 parts by weight per 100 parts by weight of the silyl-containing ethylene/$\alpha$-olefin/non-conjugated polyene random copolymer rubber (A1), more preferably about 20 to 300 parts.

The concrete examples of the fillers include wood powder, pulp, cotton chips, asbestos, glass fibers, carbon fibers, mica, walnut shell powder, graphite, diatomaceous earth, white clay, fumed silica, settling silica, silicic anhydride, carbon black, calcium carbonate, clay, talc, titanium oxide, magnesium carbonate, quartz, fine aluminum powder, flint powder, and zinc powder. Of these, more preferable ones are thixotropic fillers, e.g., settling silica, fumed silica and carbon black; and calcium carbonate, titanium oxide and talc. The filler, when used, is incorporated preferably at about 10 to 500 parts by weight per 100 parts by weight of the silyl-containing ethylene/α-olefin/non-conjugated polyene random copolymer rubber (A1), more preferably about 20 to 300 parts by weight.

The aging inhibitors useful for the present invention include commonly used known ones, e.g., sulfur-based ones, radical inhibitors and ultraviolet ray absorbers.

The sulfur-based aging inhibitors useful for the present invention include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, mercaptols, monothio acids, polythio acids, thioamides, and sulfoxides.

More concretely, the sulfur-based aging inhibitors include:

mercaptans, e.g., 2-mercaptobenzothiazole;

salts of mercaptans, e.g., zinc salt of 2-mercaptobenzothiazole;

sulfides, e.g., 4,4'-thio-bis(3-methyl-6-t-butyl phenol), 4,4'-thio-bis(2-methyl-6-t-butyl phenol), 2,2'-thio-bis(4-methyl-6-t-butyl phenol), bis(3-methyl-4-hydroxy-5-t-butyl-benzyl) sulfide, terephthaloyl di(2,6-dimethyl-4-t-butyl-3-hydroxybenzyl) sulfide, phenothiazine, 2,2'-thio-bis (4-octyl phenol) nickel, dilauryl thiodipropionate, distearyl thiodipropionate, dimyristyl thiodipropionate, ditridecyl thiodipropionate, distearylβ,β'-thiodibutyrate, lauryl-stearyl thiodipropionate and 2,2-thio[diethyl-bis-3(3,5-di-t-butyl-4-hydroxy phenol)propionate];

polysulfides, e.g., 2-benzothiazole disulfide;

dithiocarboxylates, e.g., zinc dibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethyldithiocarbamate;

thioureas, e.g., 1-butyl-3-oxy-diethylene-2-thiourea, di-o-tolyl-thiourea and ethylene thiourea; and thiophosphates, e.g., trilauryltrithiophosphate.

The above-described sulfur-based aging inhibitor prevents decomposition/aging of the main chain under heating much more efficiently than the other types for the curable rubber composition of the present invention, controlling the problems, e.g., residual surface tackiness.

The radical inhibitors useful for the present invention include phenol-based ones, e.g., 2,2-methylene-bis(4-methyl-6-t-butyl phenol) and tetrakis[methylene-3-(3,5-di-t-butyl-4-hydroxyphenyl)propio nate]methane; and amine-based ones, e.g., phenyl-β-naphthylamine, α-naphthylamine, N,N'-sec-butyl-p-phenylenediamine, phenothiazine and N,N'-diphenyl-p-phenylenediamine.

The ultraviolet ray absorbers useful for the present invention include 2-(2'-hydroxy-3',5'-di-t-butylphenyl) benzotriazole and bis(2,2,6,6-tetramethyl-4-piperidine) cebacate.

The aging inhibitor, when used, is incorporated at about 0.1 to 20 parts by weight per 100 parts by weight of the silyl-containing ethylene/α-olefin/non-conjugated polyene random copolymer rubber (A1), preferably 1 to 10 parts by weight.

Curable Rubber Composition (9)

The curable rubber composition (9) of the present invention contains, as described earlier, the silyl-containing ethylene/α-olefin/non-conjugated polyene random copolymer rubber (A1), alcohols (B9) and/or a hydrolyzable ester (I), preferably an alkyl orthoformate, a hydrolyzable organosilicon compound (B10), preferably an alkoxysilane compound, and, as required, a curable promoter.

Preparation of Curable Rubber Composition (9)

The method of preparing the curable rubber composition (9) is not limited. One example is kneading the silyl-containing ethylene/α-olefin/non-conjugated polyene random copolymer rubber (A1) together with the alcohols (B9) and/or hydrolyzable ester (I), hydrolyzable organosilicon compound (B10), and, as required, one or more additives, e.g., curing promoter, adhesion improver, property adjuster, storage stability improver, plasticizer, filler and pigment, to uniformly disperse these components in the copolymer rubber. The composition is kneaded at room temperature to 180° C. for 30 seconds to 30 minutes by a planetary mixer, roll, kneader or intermix mixer.

The composition thus prepared is applicable to one-liquid type curable composition, to say nothing of two-liquid type. For the one-liquid type, it is essential to remove moisture from the composition when the copolymer rubber (A1) is dispersed with the other components. It can withstand storage for extended periods when kept in a closed condition, and quickly starts curing from the surface when exposed to the atmosphere. Moisture can be preferably removed from the composition under heating or by use of a mixer equipped with a pressure reducing device.

Curable Rubber Composition (9) and its Uses

The curable composition (9) of the present invention contains, as described earlier, the curable composition with the silyl-containing ethylene/α-olefin/non-conjugated polyene random copolymer rubber as the component (A1). More concretely, the curable composition (9) of the present invention contains the silyl-containing ethylene/α-olefin/non-conjugated polyene random copolymer rubber (A1), alcohols (B9) and/or a hydrolyzable ester (I), a hydrolyzable organosilicon compound (B10), and, as required, a curable promoter. It can be suitably used for electric/electronic device members, transportation machines, and civil engineering/construction, medical and leisure areas, as described earlier.

The curable rubber composition of the present invention (9) can be suitably used as sealants, potting agents, coating materials or adhesives for electric/electronic device members, transportation machines, and civil engineering/construction, and leisure areas.

Curable Rubber Composition (10)

The curable rubber composition (10) of the present invention is a two- or multi-liquid type curable rubber composition composed of at least two liquids, i.e., the major ingredient (I) containing the silyl-containing ethylene/α-olefin/non-conjugated polyene random copolymer rubber (A1), and a curing agent (II) containing a silanol condensing (curing) catalyst (J) and water or a hydrate of a metallic salt (B11). The major ingredient (II) may be further incorporated with a silane coupling agent.

The curing agent (II) contains a silanol condensing catalyst (J) and water or a hydrate of a metallic salt (B11).

Silanol Condensing (Curing) Catalyst (J)

The silanol condensing (curing) catalyst (J) as one of the components for the hardening agent (II) for the present invention may be a known one.

The concrete examples of the silanol condensing (curing) catalysts useful for the present invention include:

titanate esters, e.g., those of tetrabutyl titanate and tetrapropyl titanate;

tin carbonates, e.g., dibutyl tin dilaurate, dibutyl tin diacetate, dibutyl tin diethylhexanoate, dibutyl tin dioctylate, dibutyl tin dimethylmaleate, dibutyl tin diethylmaleate, dibutyl tin dibutylmaleate, dibutyl tin diisooctylmaleate, dibutyl tin ditridecylmaleate, dibutyl tin dibenzylmaleate, dibutyl tin maleate, dibutyl tin diacetate, tin octylate, dioctyl tin distearate, dioctyl tin dilaurate, dioctyl tin diethylmaleate, dioctyl tin diisooctylmaleate, dioctyl tin versatate and tin naphthenate;

tin alkoxides, e.g., dibutyl tin dimethoxide, dibutyl tin diphenoxide and dibutyl tin diisopropoxide;

tin oxides, e.g., dibutyl tin oxide and dioctyl tin oxide;

product of the reaction between dibutyl tin oxide and phthalate ester;

dibutyl tin bisacetylacetonate;

organoaluminum compounds, e.g., aluminum trisacetylacetonate, aluminum trisethylacetoacetate and diisopropoxy aluminum ethylacetoacetate;

chelate compounds, e.g., zirconium tetraacetylacetonate and titanium tetraacetylacetonate;

lead octylate;

amine-based compounds, and salts of these compounds and carboxylates, e.g., butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris (dimethylaminomethyl) phenol, morpholine, N-methyl morpholine, 2-ethyl-4-methylimidazole and 1,8-diazabicyclo(5,4,0) undecene-7 (DBU);

low-molecular-weight polyamide resins produced by the reactions between excessive quantities of polyamines and polybasic acids;

products of the reactions between excessive quantities of polyamines and epoxy compounds;

amino-containing silane coupling agents, e.g., γ-aminopropyl trimethoxysilane and N-(β-aminoethyl)aminopropyl methyldimethoxy silane); and other known silanol condensing catalysts, acidic or basic.

Of these catalysts, the more preferable ones are tetravalent tin compounds, in particular dialkoxy tin dialkoxides, more specifically dibutyl tin bisacetylacetonate, dibutyl tin dimethoxide and dibutyl tin dipropoxide, when quick curing at room temperature is required. The effects of the present invention will be exhibited more significantly when the tetravalent tin compound, e.g., dialkyl tin dialkoxide, is used, because it shows essentially neither deactivation when mixed with water or a hydrate of metallic salt in the curing agent, nor deterioration in curing speed after being stored.

These catalysts may be used either individually or in combination.

The silanol condensing catalyst (J) is incorporated in the curing agent (II) component preferably at about 0.1 to 20 parts by weight per 100 parts by weight of the silyl-containing ethylene/α-olefin/non-conjugated polyene random copolymer rubber (A1) in the major ingredient (I), more preferably 1 to 10 parts by weight. The silanol condensing catalyst (J) content below the above-mentioned range is undesirable, because of insufficient curing speed and insufficient extent of the curing reaction. The content beyond the above range is also undesirable, because it may cause local heating or foaming occurring during the curing process to make it difficult to produce the cured product of good properties, and unacceptably short pot life. It is also undesirable viewed from its workability.

Water or Hydrate of a Metallic Salt (B11)

Of the water or hydrate of a metallic salt (B11) in the curing agent (II) component for the present invention, the hydrate of a metallic salt serves as the water source necessary for condensing/curing the silyl-containing ethylene/α-olefin/non-conjugated polyene random copolymer rubber (A1) in the major ingredient (I) component, and promotes formation of the crosslinked structures.

The common commercial hydrates of metallic salts can be widely used for the present invention. They include hydrates of alkali-earth metals and other metals. The concrete examples of these hydrates include $Al_2O_3.H_2O$, $Al_2O_3.3H_2O$, $Al_2(SO_4)_3.18H_2O$, $Al_2(C_2O_4)_3.4H_2O$, $AlNa(SO_4)_2.12H_2O$, $AlK(SO_4)_2.12H_2O$, $BaCl_2.2H_2O$, $Ba(OH)_2.8H_2O$, $CaSO_4.2H_2O$, $CaS_2O_3.6H_2O$, $Ca(NO_3)_2.4H_2O$, $CaHPO_4.2H_2O$, $Ca(C_2O_4).H_2O$, $Co(NO_3)_2.6H_2O$, $Co(CH_3COO)_2.4H_2O$, $CuCl_2.2H_2O$, $CuSO_4.5H_2O$, $FeCl_2.4H_2O$, $FeCl_3.6H_2O$, $FeSO_4.7H_2O$, $Fe(NH_4)(SO_4)_2.12H_2O$, $K_2CO_3.1.5H_2O$, $KNaCO_3.6H_2O$, $LiBr.2H_2O$, $Li_2SO_4.H_2O$, $MgSO_4.H_2O$, $MgSO_4.7H_2O$, $MgHPO_4.7H_2O$, $Mg_3(PO_4)_2.8H_2O$, $MgCO_3.3H_2O$, $Mg_4(CO_3)_3(OH)_2.3H_2O$, $MoO_3.2H_2O$, $NaBr.2H_2O$, $Na_2SO_3.7H_2O$, $Na_2SO_4.10H_2O$, $Na_2S_2O_3.5H_2O$, $Na_2S_2O_6.2H_2O$, $Na_2B_4O_7.10H_2O$, $NaHPO_3.2.5H_2O$, $Na_3PO_4.12H_2O$, $Na_2CO_3.H_2O$, $Na_2CO_3.7H_2O$, $Na_2CO_3.10H_2O$, $NaCH_3COO.3H_2O$, $NaHC_2O_4.H_2O$, $NiSO_4.6H_2O$, $NiC_2O_4.2H_2O$, $SnO_2.nH_2O$, $NiC_2O_4.2H_2O$, $Sn(SO_4)_2.2H_2O$, $ZnSO_3.2H_2O$, $ZnSO_4.7H_2O$, $Zn_3(PO_4)_2.4H_2O$ and $Zn(CH_3COO)_2.2H_2O$.

Of these, the hydrates of alkali and alkali-earth metals are more preferable. The concrete examples of these hydrates include $MgSO_4.7H_2O$, $Na_2CO_3.10H_2O$, $Na_2SO_4.10H_2O$, $Na_2S_2O_3.5H_2O$, $Na_3PO_4.12H_2O$ and $Na_2B_4O_7.10H_2O$.

These hydrates of metallic salts may be used either individually or in combination.

When water is used for the present invention, it is incorporated preferably at 0.01 to 25 parts by weight per 100 parts by weight of the silyl-containing ethylene/α-olefin/non-conjugated polyene random copolymer rubber (A1), more preferably 0.05 to 15 parts, still more preferably 0.2 to 5 parts by weight.

The hydrate of metallic salts is incorporated preferably at 0.01 to 50 parts by weight per 100 parts by weight of the silyl-containing ethylene/α-olefin/non-conjugated polyene random copolymer rubber (A1), more preferably 0.1 to 30 parts, still more preferably 1 to 20 parts, most preferably 2 to 10 parts by weight.

The water and hydrates of metallic salts may be used either individually or in combination.

Other Components

The curable rubber composition (10) of the present invention may be incorporated with various additives.

These additives may be represented by tackifier, which is represented by silane coupling agent, although not limited thereto.

The silane coupling agent is a compound having a group containing silicon atom to which a hydrolyzable group is bonded (hereinafter referred to as hydrolyzable silicon group) and one or more other groups. The examples of the hydrolyzable silicon group include those represented by the following general formula (1), preferably those represented by the general formula (2):

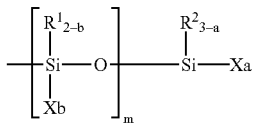

wherein, $R^1$ and $R^2$ are each an alkyl group of 1 to 20 carbon atoms, aryl group of 6 to 20 carbon atoms, aralkyl group of 7 to 20 carbon atoms, or triorganosiloxy group represented by $(R')_3SiO-$ (R's are each a hydrocarbon group of 1 to 20 carbon atoms, which may be substituted or not substituted;

X is a hydrolyzable group; and

"a" is an integer of 0 to 3, "b" is an integer of 0 to 2, wherein "a" and "b" are not simultaneously zero; and "m" is an integer of 0 to 19,

(2)

wherein, $R^2$, X and "a" are the same as those for the general formula (1).

These hydrolyzable groups include hydrogen atom, alkoxyl, acyloxy, ketoxymate, amino, amide, aminoxy, mercapto and alkenyloxy, which are commonly used. Of these, the more preferable ones include methoxy and ethoxy groups, because of their high hydrolysis speed. The silane coupling agent preferably contains 2 or more hydrolyzable groups, more preferably 3 or more.

The functional groups, other than the hydrolyzable silicon ones, useful for the present invention include primary, secondary and tertiary amino, mercapto, epoxy, carboxyl, vinyl, isocyanate and isocyanurate groups, and halogen atom.

Of these, the more preferable ones include primary, secondary and tertiary amino, epoxy, isocyanate and isocyanurate groups and particularly preferable ones are isocyanate and epoxy groups.

The silane coupling agents useful for the present invention include:

amino-containing silanes, e.g., γ-aminopropyltrimethoxysilane, γ-aminopropyltriethoxysilane, γ-aminopropylmethyldimethoxysilane, γ-(2-aminoethyl) aminopropyltrimethoxysilane, γ-(2-aminoethyl) aminopropylmethyldimethoxysilane, γ-(2-aminoethyl) aminopropyltriethoxysilane, γ-(2-aminoethyl) aminopropyltriethoxysilane, γ-ureidopropyltrimethoxysilane, n-β-(n-vinylbenzylaminoethyl)-γ-aminopropyltriethoxysilane and γ-anilinopropyltrimethoxysilane;

mercapto-containing silanes, e.g., γ-mercaptopropyltrimethoxysilane, γ-mercaptopropyltriethoxysilane, γ-mercaptopropylmethyldimethoxysilane and γ-mercaptopropylmethyldiethoxysilane;

epoxy-containing silanes, e.g., γ-glycidoxypropyltrimethoxysilane, γ-glycidoxypropyltriethoxysilane, γ-glycidoxypropylmethyldimethoxysilane and β-(3,4-epoxycyclohexyl)ethyltriethoxysilane;

carboxysilanes, e.g., β-carboxyethyltriethoxysilane, β-carboxyethylphenylbis(2-methoxyethoxy)silane and n-β-(carboxymethylaminoethyl)-γ-aminopropyltrimethoxysilane;

silanes containing a vinyl type unsaturated group, e.g., vinyltrimethoxysilane, vinyltriethoxysilane, γ-methacryloyloxypropylmethyldimethoxysilane and γ-acryloyloxypropylmethyltriethoxysilane;

halogen-containing silanes, e.g., γ-chloropropyltrimethoxysilane;

silane isocyanurates, e.g., tris(trimethoxysilyl)isocyanurate; and isocyanate-containing silanes, e.g., γ-isocyanate propyltrimethoxysilane and γ-isocyanate propyltriethoxysilane.

Moreover, the modifications of these compounds as their derivatives are also useful as the silane coupling agents. These compounds include amino-modified silyl polymers, silylated amino polymers, unsaturated aminosilane complexes, block isocyanate silanes, phenylamino-long chain-alkyl silanes aminosilylated silicone and silylated polyesters.

These silane coupling agents tend to be hydrolyzed easily in the presence of moisture, but can be kept stable when incorporated in the major ingredient (I) for the curable rubber composition (10) of the present invention.

It is needless to say that a compound having epoxy or isocyanate group in the molecule (including isocyanate polymer) can be used as the tackifier other than a silane coupling agent without causing any problem.

These tackifiers may be used either individually or in combination.

The tackifier is incorporated for the present invention at 0.01 to 20 parts by weight per 100 parts by weight of the silyl-containing ethylene/α-olefin/non-conjugated polyene random copolymer rubber (A1), particularly preferably 0.1 to 10 parts by weight.

The curable rubber composition (10) may be further modified with one or more of various fillers.

The fillers useful for the present invention include:

reinforcing fillers, e.g., fumed silica, settling silica, silicic anhydride, silicic hydride, talc and carbon black;

other fillers, e.g., limestone powder, gelatinized calcium carbonate, diatomaceous earth, fired clay, clay, titanium oxide, bentonite, organic bentonite, ferric oxide, zinc oxide and activated zinc white; and fibrous fillers, e.g., glass fibers or filaments.

Of these, the reinforcing silica, mainly of fumed silica, settling silica, silicic anhydride, silicic hydride, talc or carbon black, is used when the curable rubber composition of high strength is to be produced. The cured product of high strength and modulus can be prepared, when it is incorporated at 1 to 100 parts by weight per 100 parts by weight of the silyl-containing ethylene/α-olefin/non-conjugated polyene random copolymer rubber (A1) in the major ingredient (I) for the present invention.

On the other hand, when the cured product of low modulus and high elongation is to be produced, it is recommended to incorporate the other type of filler, e.g., limestone powder, gelatinized calcium carbonate, diatomaceous earth, fired clay, clay, titanium oxide, bentonite, organic bentonite, ferric oxide, zinc oxide or activated zinc white at 5 to 400 parts by weight per 100 parts by weight of the silyl-containing ethylene/α-olefin/non-conjugated polyene random copolymer rubber (A1) in the major ingredient (I) for the present invention.

These fillers may be used either individually or in combination.

The filler may be incorporated in the major ingredient (I) component or curing agent (II) component, or both.

When incorporated with a plasticizer in combination with the filler, the curable rubber component (10) of the present invention will have one or more additional advantages, e.g., further improved elongation of the cured product and a larger quantity of the filler being incorporated.

For the plasticizer, any commonly used one may be used. Preferably, it should be compatible with the silyl-containing ethylene/α-olefin/non-conjugated polyene random copolymer rubber (A1).

The concrete examples of the plasticizers include process oil, polybutene, hydrogenated polybutene, α-methyl styrene oligomer, liquid polybutadiene, hydrogenated liquid polybutadiene, paraffin oil, naphthene oil and atactic polypropylene. Of these, more preferable ones are the hydrocarbon-based compounds free of unsaturated group, e.g., process oil, hydrogenated polybutene, hydrogenated liquid polybutadiene, paraffin oil and naphthene oil.

The concrete examples of the plasticizers include process oil, paraffin oil, naphthene oil, polybutadiene and ethylene/α-olefin oligomer. The plasticizer may be used in place of the solvent during the process of introducing a hydrolyzable silyl group into the above-described ethylene/α-olefin/non-conjugated polyene random copolymer rubber ($A_0$), for the purposes of, e.g., adjusting reaction temperature and viscosity of the reaction system.

The curable rubber composition (10) of the present invention may be adequately incorporated, as required, with various additives, e.g., antioxidant, ultraviolet ray absorber, light stabilizer, flame retardant, thixotropy enhancer, pigment and surfactant, within limits not detrimental to the objects of the invention.

The curable rubber composition (10) of the present invention may be used for either two-liquid composition or liquid composition comprising three or more types of liquids. When used for a two-liquid composition, for example, the initial properties of the cured product can be stably realized, when the major ingredient (I) incorporated with filler, plasticizer or the like and the curable agent (II) incorporated with filler, plasticizer or the like, separately prepared for the present invention, are mixed with each other immediately before the two-liquid composition is used, even after they are stored for extended periods.

The curable rubber composition (10) of the present invention is useful mainly for a curable elastomer composition, which can be suitably used as sealants for electric/electronic device members, civil engineering works (e.g., stopping water), buildings, ships automobiles and roads. It is also useful for various types of adhesive compositions, because it is fast adhesive to widely varying base materials, e.g., glass, stone, ceramics, lumber, synthetic resins and metals, in the absence of primer.

The curable rubber composition (10) of the present invention is particularly useful as a sealant for laminated glass, stably exhibiting its adhesion for extended periods for, e.g., float glass and various types of surface-treated heat ray reflective glass, and spacers of pure aluminum and aluminum produced by anodization.

Curable Rubber Composition (10) and its Uses

The curable rubber composition (10) of the present invention contains, as described earlier, the curable composition with the silyl-containing ethylene/α-olefin/non-conjugated polyene random copolymer rubber as the component (A1). More concretely, the curable composition (10) of the present invention contains at least the major ingredient (I) containing the organic polymer (Z), and a curing agent (II) containing a silanol condensing catalyst (J) and water or a hydrate of a metallic salt (B11) It can be suitably used for electric/electronic device members, transportation machines, and civil engineering/construction, medical and leisure areas, as described earlier.

The curable rubber composition (10) of the present invention can be used as sealants, potting agents, coating materials or adhesives for electric/electronic device members, transportation machines, and civil engineering/construction, medical and leisure areas.

Rubber Composition (11)

The rubber composition (11) of the present invention contains the specific silyl-containing ethylene/α-olefin/non-conjugated polyene random copolymer rubber (A2) and an organosilicon polymer (K1).

The silyl-containing ethylene/α-olefin/non-conjugated polyene random copolymer rubber (A2) (hereinafter sometimes referred to as "silyl-containing copolymer rubber (A2)) contains a hydrolyzable silyl group, represented by the following general formula (1), preferably having a structural unit derived from a norbornene compound as the non-conjugated polyene with at least one specific terminal vinyl group, represented by the above-described general formula (4) or (5), and the hydrolyzable silyl group represented by the following general formula (1) in the side chain or at the terminal of the ethylene/α-olefin/non-conjugated polyene random copolymer rubber:

(1)

wherein, R is a monovalent hydrocarbon group of 1 to 12 carbon atoms, which may be substituted or not substituted, preferably a monovalent hydrocarbon group not having aliphatic unsaturated bonds, e.g., alkyl group (e.g., methyl, ethyl, propyl, butyl, hexyl or cyclohexyl), aryl group (e.g., phenyl or tolyl) or the above-described group whose hydrogen atom bonded to the carbon atom is totally or partly substituted with a halogen (e.g., fluorine); X is a group selected from the group consisting of hydride, halogen, alkoxyl, acyloxy, ketoxymate, amide, acid amide, aminoxy, thioalkoxy, amino, mercapto and alkenyloxy, of which alkoxyl, in particular having 1 to 4 carbon atoms, is more preferable; and "m" is an integer of 0 to 2, preferably 0 or 1.

The silyl group represented by the general formula (1) is the same as the hydrolyzable silyl group represented by the general formula [III] for the ethylene/α-olefin/non-conjugated polyene random copolymer rubber (A1).

The silyl-containing ethylene/α-olefin/non-conjugated polyene random copolymer rubber (A2) normally has at least one type of silyl group represented by the following general formula (2) or (3):

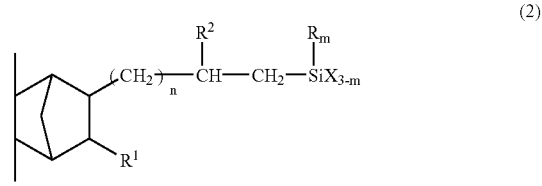

(2)

-continued

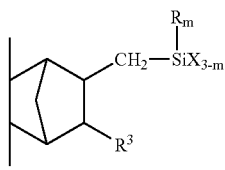
(3)

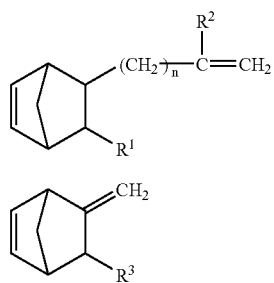
(4)

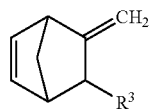
(5)

wherein, R is a monovalent hydrocarbon group of 1 to 12 carbon atoms; $R^1$ is hydrogen atom or an alkyl group of 1 to 10 carbon atoms; $R^2$ is hydrogen atom or an alkyl group of 1 to 5 carbon atoms; $R^3$ is hydrogen atom or an alkyl group of 1 to 10 carbon atoms; X is a hydrolyzable group selected from the group consisting of hydride, halogen, alkoxyl, acyloxy, ketoximate, amide, acid amide, aminoxy, thioalkoxy, amino, mercapto and alkenyloxy group; and "m" is an integer of 0 to 2 and "n" is an integer of 0 to 10.

R, X and "m" in the general formulae (2) and (3) are the same as those in the general formula (1), and $R^1$, $R^2$, $R^3$ and "n" are the same as those in the general formulae [I] and [II].

The silyl-containing copolymer rubber (A2) has one or more silyl groups in the molecule, preferably 0.1 to 10 groups on the average. It will no longer exhibit good rubber elasticity, due to insufficient curability, when it contains less than 0.1 silyl groups.

The method of producing the ethylene/α-olefin/non-conjugated polyene random copolymer rubber containing a hydrolyzable silyl group is not limited. However, it is particularly preferably produced by the hydrosilylation, wherein an ethylene/α-olefin/non-conjugated polyene random copolymer rubber having a norbornene compound as the non-conjugated polyene with at least one terminal vinyl group represented by the general formula (4) or (5) is reacted with a silicon compound represented by the following general formula (6):

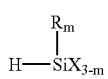
(6)

The ethylene/α-olefin/non-conjugated polyene random copolymer rubber (A2) to be reacted with the silicon compound represented by the general formula (6) is a random copolymer of ethylene, an α-olefin of 3 to 20 carbon atoms, and non-conjugated polyene.

The α-olefin of 3 to 20 carbon atoms is the same as one of the concrete examples of the α-olefin of 3 to 20 carbon atoms which constitutes the the silyl-containing ethylene/α-olefin/non-conjugated polyene random copolymer rubber (A1). The α-olefin is preferably that of 3 to 10 carbon stoms, more preferably propylene, 1-butene, 1-hexene, 1-octene or the like.

These α-olefins may be used either individually or in combination.

The non-conjugated polyene suitably used for the present invention is a norbornene compound with a terminal vinyl group represented by the general formula (4) or (5):

The general formulae (4) and (5) are each the same as the respective general formulae [I] and [II]. Therefore, the concrete examples of the norbornene compounds can be the same as those represented by the general formulae [I] and [II]. Of these, the more preferable ones include 5-vinyl-2-norbornene, 5-methylene-2-norbornene, 5-(2-propyenyl)-2-norbornene, 5-(3-butenyl)-2-norbornene, 5-(4-pentenyl)-2-norbornene, 5-(5-hexenyl)-2-norbornene, 5-(6-heptenyl)-2-norbornene and 5-(7-octenyl)-2-norbornene.

These norbornene compounds may be used either individually or in combination.

A non-conjugated polyene may be used, in addition to the above-described one, e.g., 5-vinyl-2-norbornene, within limits not detrimental to the object of the present invention.

More concretely, these non-conjugated polyenes include:

linear non-conjugated polyenes, e.g., 1,4-hexadiene, 3-methyl-1,4-hexadiene, 4-methyl-1,4-hexadiene, 5-methyl-1,4-hexadiene, 4,5-dimethyl-1,4-hexadiene and 7-methyl-1,6-octadiene;

cyclic non-conjugated polyenes, e.g., methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene and dicyclopentadiene; and trienes, e.g., 2,3-diisopropylidene-5-norbornene, 2-ethylidene-3-isopropylidene-5-norbornene and 2-propenyl-2,2-norbornadiene.

The ethylene/α-olefin/non-conjugated polyene random copolymer rubber composed of the above components has the following properties.

(i) Molar Ratio of ethylene to α-olefin of 3 to 20 Carbon Atoms (ethylene/α-olefin)

The ethylene/α-olefin/non-conjugated polyene random copolymer rubber contains the (a) unit derived from ethylene and the (b) unit of α-olefin of 3 to 20 carbon atoms (hereinafter sometimes referred to as merely α-olefin) in a molar ratio of 40/60 to 95/5, preferably 50/50 to 90/10, more preferably 55/45 to 85/15, still more preferably 60/40 to 80/20 [(a)/(b) molar ratio].

The random copolymer rubber can give, when it has an (a)/(b) molar ratio in the above range, a rubber composition which is formed into a vulcanized rubber shape excellent in resistance to aging under heating, strength characteristics and rubber elasticity, and, at the same time, excellent in moldability and resistance to cold temperature.

(ii) Iodine Value

The ethylene/α-olefin/non-conjugated polyene random copolymer rubber has an iodine value of 0.5 to 50 (g/100 g), preferably 0.8 to 40 (g/100 g), more preferably 1 to 30 (g/100 g), still more preferably 1.5 to 25 (g/100 g), wherein the iodine value corresponds to quantity of the double bond contained in the structural unit derived from the norbornene compound with a terminal vinyl group, represented by the general formula (4) or (5).

The random copolymer rubber can give, when it has an iodine value in the above range, a desired content of the hydrolyzable silyl group, and a rubber composition which is formed into a vulcanized rubber shape excellent in compression-resistant permanent set and resistant to aging under service conditions (under heating). An iodine value exceeding 50 is disadvantageous costwise and hence undesirable.

(iii) Intrinsic Viscosity

The ethylene/α-olefin/non-conjugated polyene random copolymer rubber has an intrinsic viscosity [η] of 0.001 to 2 dl/g, determined in decalin kept at 135° C., preferably 0.01 to 2 dl/g, more preferably 0.05 to 1.0 dl/g, still more preferably 0.05 to 0.7 dl/g, most preferably 0.1 to 0.5 dl/g.

The random copolymer rubber can give, when it has an intrinsic viscosity [η] in the above range, a highly fluid rubber composition which is formed into a crosslinked rubber shape excellent in strength properties and compression-resistant permanent set.

(iv) Molecular Weight Distribution (Mw/Mn)

The ethylene/α-olefin/non-conjugated polyene random copolymer rubber has a molecular weight distribution (Mw/Mn) of 3 to 100, determined by gel permeation chromatography (GPC), preferably 3.3 to 75, more preferably 3.5 to 50.

The random copolymer rubber can give, when it has a molecular weight distribution (Mw/Mn) in the above range, a rubber composition which is formed into a crosslinked rubber shape excellent in fabricability and strength properties.

The ethylene/α-olefin/non-conjugated polyene random copolymer rubber is produced by random copolymerization with ethylene, an α-olefin of 3 to 20 carbon atoms and norbornene compound with a vinyl group at the terminal, represented by the general formula (4) or (5), by the method similar to that for the ethylene/α-olefin/non-conjugated polyene random copolymer rubber (A₀). The copolymerization is preferably effected in a hydrocarbon solvent.

The method of producing the ethylene/α-olefin/non-conjugated polyene random copolymer rubber containing the modified silyl group by hydrosilylation, wherein the ethylene/α-olefin/non-conjugated polyene random copolymer rubber is reacted with a silicon compound represented by the general formula (6), is similar to that for the silyl-containing ethylene/α-olefin/non-conjugated polyene random copolymer rubber (A1).

In the hydrosilylation reaction described above, the SiH group in the silicon compound represented by the general formula (6) is added to the double bond derived from the non-conjugated polyene in the ethylene/α-olefin/non-conjugated polyene random copolymer rubber, to form the silyl-containing structure represented by the general formula (2) or (3), when the non-conjugated polyene is represented by the general formula (4) or (5), respectively.

It is possible to add a siloxane with hydrogen modified at one terminal, represented by the following general formula (7), in combination with the silicon compound represented by the general formula (6), to impart the resistance to weather, slippage and gas permeability as the characteristics of siloxane to the copolymer rubber:

(7)

wherein, $R^4$ is a monovalent hydrocarbon group of 1 to 12 carbon atoms, which maybe substituted or not substituted, particularly preferably an alkyl group; and "p" is an integer of 5 to 200, particularly preferably 10 to 150.

The silyl-containing copolymer rubber (A2) is present in the rubber composition (11) of the present invention preferably at 10% or more, more preferably 20% or more, still more preferably 30% or more.

The rubber composition (11) of the present invention is incorporated with an organosilicon polymer (K1), to decrease its viscosity and thereby to make it more easily handled, increase curing speed, and attenuate tackiness of the cured product surface.

The organosilicon polymer (K1) for the present invention is a polymer having the siloxane bond as the main skeleton with the silicon atom having organic groups and oxygen atom appearing alternately. One of the examples is a polymer represented by the general formula (8):

(8)

wherein, $R^4$, $R^5$, $R^6$ and $R^7$ are each a non-hydrolyzable organic group of 1 to 12 carbon atoms or X (which is the same as that for the general formula (1)), which may be the same or different, at least one of $R^4$ to $R^6$ is a non-hydrolyzable organic group, and $R^5$ and $R^6$ may be bonded to each other to form a ring; and "q" is an integer of 1 to 5000, preferably 5 to 100.

The concrete examples of the non-hydrolyzable organic groups of 1 to 12 carbon atoms include alkyl groups, e.g., methyl and ethyl; cycloalkyl groups, e.g., cyclohexyl; aryl groups, e.g., phenyl; and aralkyl groups, e.g., benzyl.

The concrete examples of X include those for the general formula (1). The q-$R^4$'s for the general formula (5) are not necessarily the same, and so are q-$R^5$'s.

There are widely varying organosilicon polymers useful for the present invention as those represented by K1, e.g., those disclosed by Japanese Patent Publication No. 38987/1984, Japanese Patent Laid-Open Publication Nos. 60558/1980, 78055/1980, 145147/1982, 190043/1982, 25837/1984 and 23643/1986, and "9586 Chemical Commodities" (published by Kagaku Kogyo Nippoh on Jan. 30, 1986, pp. 721 to 727). More concretely, they include silicone oil, e.g., dimethyl silicone oil and methylphenyl silicone oil; and organopolysiloxanes, e.g., those having the above-described organic group, e.g., alkyl, cycloalkyl, aryl or aralkyl. They may be used either directly or in the form of copolymer, e.g., block or graft copolymer with an organic polymer, e.g., alkyd resin, epoxy resin, polyester resin, urethane resin, acrylic resin, polyethylene oxide, polypropylene oxide, ethylene oxide/propylene oxide copolymer, polybutylene oxide or polytetrahydrofuran.

The organosilicon polymers (K1) for the present invention also include the above-described copolymers, silicone oil and organopolysiloxane into which a reactive silicon group, e.g., that represented by the general formula (1), is introduced, and the organopolysiloxane having a hydrolyzable group, e.g., hydrogen atom bonded to the silicon atom in methyl hydrogen silicone oil, and hydroxyl group.

Of the above-described organosilicon polymers (K1), those in the form of liquid or having fluidity are more suitable, because they can be handled more easily.

Those organosilicon polymers (K1) having hydroxyl or hydrolyzable group bonded to the silicon atom are suitable, because they can react with the silyl-containing copolymer rubber (A2) during the curing process, bringing about various advantages, e.g., prevented bleeding of the organosilicon polymers (K1), controlled decline of their modulus of elasticity and elongation even after they are in service in many cycles, and prevented surface tackiness.

The copolymer of the organopolysiloxane and organic polymer may be synthesized by the method disclosed by Japanese Patent Laid-Open Publication No. 145147/1982, although not limited thereto.

Of the organosilicon polymers (K1), polysiloxanes having 2 or more silanol groups are particularly suitable. These polysiloxanes can give a rubber composition, excellent particularly in curability deep inside (measure of curing speed inside of a thick cured product), and capable of imparting excellent resistance to weather and heat, among others, to the cured product.

Widely varying common polysiloxanes now commercially available can be used for the present invention. In particular, those compatible with the (A2) component can give the cured product of higher stability. It is therefore preferable to use a polysiloxane of relatively low molecular weight, e.g., that having 50 or less silicon atoms in the molecule. Some of the concrete examples of these polysiloxane structures are described below:

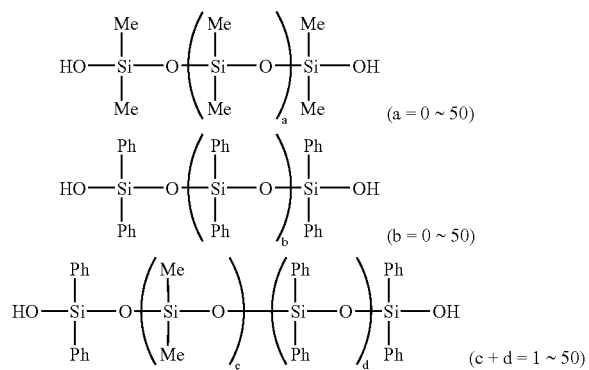

wherein, Me is methyl group and Ph is phenyl group, which hold in EXAMPLES described below).

These organosilicon polymers (K1) may be used either individually or in combination.

Content of the organosilicon polymers (K1) cannot be sweepingly generalized, because it depends on, e.g., desired Mooney viscosity (ML(1+4) at 100° C.), the obtained rubber composition and type of the organosilicon polymer (K1) used. It is however recommended that the organosilicon polymer (K1) is incorporated normally at around 1 to 1000 parts by weight per 100 parts by weight of the (A2) component, preferably around 10 to 150 parts.

When a polysiloxane having 2 or more silanol groups as the organosilicon polymer (K1), it is recommended that the organosiliconpolymer (K1) is incorporated in such a way to have around 0.1 to 8, preferably around 0.3 to 4, hydroxyl groups bonded to the silicon atom in the polysiloxane per one hydrolyzable group in the (A2) component.

In the present invention, it is preferable to incorporate the polysiloxane at around 20 to 120 parts by weight per 100 parts by weight of the (A2) component, more preferably around 25 to 100 parts. An excessively low content of the polysiloxane is undesirable, because it may result in the resin composition of insufficient curability deep inside. On the other hand, an excessively high content of the polysiloxane is also undesirable, because it may deteriorate the tensile-related characteristics of the cured product.

The cured product of the rubber composition (11) of the present invention has good resistance to, e.g., weather, heat and water, and retains the excellent characteristics of high strength and elongation, which come from the cured product of the (A2) component, and also exhibit good effects coming from the (K1) component, e.g., reduced viscosity to improve workability and prevented surface tackiness.

In the present invention, the organosilicon polymer (K1) may be used in place of the solvent during the process of introducing a reactive silicon group into the above-described ethylene/α-olefin/non-conjugated polyene random copolymer rubber, for the purposes of, e.g., adjusting reaction temperature and viscosity of the reaction system.

The rubber composition (11) of the present invention is preferably incorporated with a curing catalyst which promotes the silanol condensation.

Widely varying known curing catalysts may be used for the present invention. The concrete examples of these catalysts useful for the present invention include titanate esters, e.g., those of tetrabutyl titanate and tetrapropyl titanate; tin carboxylates, e.g., dibutyl tin dilaurate, dibutyl tin maleate, dibutyl tin diacetate, tin octylate and tin naphthenate; product of the reaction between dibutyl tin oxide and phthalate ester; dibutyl tin acetylacetonate; organoaluminum compounds, e.g., aluminum trisacetylacetonate, aluminum trisethylacetoacetate and diisopropoxy aluminum ethylacetoacetate; chelate compounds, e.g., zirconium tetraacetylacetonate and titanium tetraacetylacetonate; lead octylate; amine-based compounds, and salts of these compounds and carboxylates, e.g., butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris (dimethylaminomethyl) phenol, morpholine, N-methyl morpholine, 2-ethyl-4-methylimidazole and 1,8-diazabicyclo(5,4,0) undecene-7 (DBU); low-molecular-weight polyamide resins produced by the reactions between excessive quantities of polyamines and polybasic acids; products of the reactions between excessive quantities of polyamines and epoxy compounds; and known silanol condensing catalysts, e.g., silane coupling agents containing amino group (e.g., γ-aminopropyl trimethoxy silane and N-(β-aminoethyl)aminopropylmethyldimethoxy silane), and other known catalysts, acidic or basic. These compounds may be used either individually or in combination.

The curing catalyst, when used, is incorporated normally at 0.1 to 20 parts by weight per 100 parts by weight of the (A2) component, preferably around 1 to 10 parts by weight. An excessively low content of the catalyst is undesirable, because it may result in slow curing speed of the resin composition product. On the other hand, an excessively high content of the catalyst is also undesirable, because it may deteriorate the tensile-related characteristics of the cured product.

The rubber composition (11) of the present invention may be adequately incorporated with one or more additives. The additives useful for the present invention include adhesion improver, property adjuster, storage stability improver, plasticizer, filler; aging inhibitor, ultraviolet ray absorber, metal deactivator, ozone-caused aging inhibitor, light stabilizer, amine-based radical chaining inhibitor, phosphorus-based peroxide decomposer, lubricant, pigment, and foaming agent.

The adhesion improvers useful for the present invention include commonly used adhesives and silane coupling agents, e.g., aminosilane and epoxysilane compounds; and others.

The concrete examples of these adhesion improvers include phenolic resins, epoxy resins, γ-aminopropyl trimethoxysilane, N-(β-aminoethyl)aminopropyl methyldimethoxysilane, coumarone/indene resins, rosin ester resins, terpene/phenol resins, α-methyl styrene/vinyl toluene copolymers, polyethylmethyl styrene, alkyl titanates, and aromatic polyisocyanate. The adhesion improver, when used, is incorporated preferably at about 1 to 50 parts by weight per 100 parts by weight of the totaled (A2) and (K1) components, more preferably about 5 to 30 parts by weight.

The storage stability improvers useful for the present invention include compounds with silicon to which a hydrolyzable group is bonded, and esters of ortho-organic acids (other than an alkyl orthoformate).

The concrete examples of the storage stability improvers include methyltrimethoxy silane, methyltriethoxy silane, tetramethoxy silane, ethyltrimethoxy silane, dimethyldiethoxy silane, trimethylisobutoxysilane, trimethyl (n-butoxy) silane, n-butyltrimethoxy silane, and methyl orthoformate. The storage stability improver, when used, is incorporated preferably at about 0.5 to 20 parts by weight per 100 parts by weight of the totaled (A2) and (K1) components, more preferably about 1 to 10 parts.

The plasticizer useful for the present invention is also not limited, and any commonly used one may be used. Preferably, it should be compatible with each component for the rubber composition (11) of the present invention.

The concrete examples of these plasticizers include hydrocarbon-based compounds, e.g., polybutene, hydrogenated polybutene, ethylene/α-olefin oligomer, α-methyl styrene oligomer, biphenyl, triphenyl, triaryl dimethane, alkylene triphenyl, liquid polybutadiene, hydrogenated liquid polybutadiene, alkyl diphenyl, partially hydrogenated terphenyl, paraffin oil, naphthene oil and atactic polypropylene; parafin chlorides; phthalate esters, e.g., those of dibutyl phthalate, diheptyl phthalate, di(2-ethylhexyl) phthalate, butyl benzyl phthalate and butyl phthalyl butyl glycolate; non-aromatic, dibasic acid esters, e.g., those of dioctyl adipate and dioctyl cebacate; esters of polyalkylene glycol, e.g., those of diethylene glycol benzoate and triethylene glycol dibenzoate; and phosphate esters, e.g., those of tricresyl phosphate and tributyl phosphate. They may be used either individually or in combination.

Of these, hydrocarbon-based compounds free of unsaturated group, e.g., hydrogenated polybutene, hydrogenated liquid polybutadiene, paraffin oil, naphthene oil and atactic polypropylene, are more preferable for various reasons, e.g., high compatibility with each component for the rubber composition (11) of the present invention, limited effects on curing speed of the rubber composition, good resistance to weather of the cured product, and cheapness.

The plasticizer may be used in place of the solvent during the process of introducing a reactive silicon group into the ethylene/α-olefin/non-conjugated polyene random copolymer rubber, for the purposes of, e.g., adjusting reaction temperature and viscosity of the reaction system.

The plasticizer is incorporated preferably at about 10 to 500 parts by weight per 100 parts by weight of the totaled (A2) and (K1) components, more preferably about 20 to 300 parts by weight.

The concrete examples of the fillers include wood powder, pulp, cotton chips, asbestos, glass fibers, carbon fibers, mica, walnut shell powder, rice hull powder, graphite, diatomaceous earth, white clay, fumed silica, settling silica, silicic anhydride, carbon black, calcium carbonate, clay, talc, titanium oxide, magnesium carbonate, quartz, fine aluminum powder, flint powder, and zinc powder. Of these, more preferable ones are thixotropic fillers, e.g., settling silica, fumed silica and carbon black; and calcium carbonate, titanium oxide and talc. The filler, when used, is incorporated preferably at about 10 to 500 parts by weight per 100 parts by weight of the totaled (A2) and (K1) components, more preferably about 20 to 300 parts by weight.

The aging inhibitors useful for the present invention include commonly used known ones, e.g., sulfur-based ones, radical inhibitors and ultraviolet ray absorbers.

The sulfur-based aging inhibitors useful for the present invention include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, mercaptols, monothio acids, polythio acids, thioamides, and sulfoxides.

More concretely, the sulfur-based aging inhibitors include mercaptans, e.g., 2-mercaptobenzothiazole; salts of mercaptans, e.g., zinc salt of 2-mercaptobenzothiazole; sulfides, e.g., 4,4'-thio-bis(3-methyl-6-t-butyl phenol), 4,4'-thio-bis (2-methyl-6-t-butyl phenol), 2,2'-thio-bis(4-methyl-6-t-butyl phenol), bis(3-methyl-4-hydroxy-5-t-butylbenzyl) sulfide, terephthaloyl di(2,6-dimethyl-4-t-butyl-3-hydroxybenzyl) sulfide, phenothiazine, 2,2'-thio-bis (4-octyl phenol) nickel, dilauryl thiodipropionate, distearyl thiodipropionate, dimyristyl thiodipropionate, ditridecyl thiodipropionate, distearylβ,β'-thiodibutyrate, lauryl-stearyl thiodipropionate and 2,2-thio[diethyl-bis-3(3,5-di-t-butyl-4-hydroxy phenol)propionate]; polysulfides, e.g., 2-benzothiazole disulfide; dithiocarboxylates, e.g., zinc dibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethyldithiocarbamate; thioureas, e.g., 1-butyl-3-oxy-diethylene-2-thiourea, di-o-tolyl-thiourea and ethylene thiourea; and thiophosphates, e.g., trilauryltrithiophosphate.

The above-described sulfur-based aging inhibitor prevents decomposition/aging of the main chain under heating much more efficiently than the other types for the curable rubber composition of the present invention, controlling the problems, e.g., residual surface tackiness.

The radical inhibitors useful for the present invention include phenol-based ones, e.g., 2,2-methylene-bis(4-methyl-6-t-butyl phenol) and tetrakis[methylene-3-(3,5-di-t-butyl-4-hydroxyphenyl)propio nate]methane; and amine-based ones, e.g., phenyl-β-naphthylamine, α-naphthylamine, N,N'-sec-butyl-p-phenylenediamine, phenothiazine and N,N'-diphenyl-p-phenylenediamine.

The ultraviolet ray absorbers useful for the present invention include 2-(2'-hydroxy-3',5'-di-t-butylphenyl) benzotriazole and bis(2,2,6,6-tetramethyl-4-piperidine) cebacate.

The aging inhibitor, when used, is incorporated at about 0.1 to 20 parts by weight per 100 parts by weight of the totaled (A2) and (K1) components, more preferably about 1 to 10 parts by weight.

The rubber composition (11) of the present invention contains the rubber composition with the ethylene/α-olefin/non-conjugated polyene random copolymer rubber containing a hydrolyzable silyl group as the component (A2), wherein the organic polymer (Z1) containing a hydrolyzable silyl group represented by the above-described general formula (1) and essentially no unsaturated double bond in the main chain can be prepared by uniformly kneading the components by a kneader, e.g., intermix mixer, planetary mixer, Banbury mixer, kneader or 2-roll unit.

The rubber composition (11) of the present invention is cured at room temperature to 200° C. for several minutes to several days, because it can be cured quickly. It is particularly preferable to crosslink the composition with moisture in air at room temperature.

Curable Rubber Composition (11) and its Uses

The rubber composition (11) of the present invention contains the rubber composition with the ethylene/α-olefin/non-conjugated polyene random copolymer rubber containing a hydrolyzable silyl group as the component (A2). More concretely, the crosslinkable rubber composition (11) of the present invention contains the organic polymer (Z1) and organosilicon polymer (K1), the former containing a hydrolyzable silyl group represented by the above-described general formula (1) and essentially no unsaturated double bond in the main chain. It can be suitably used for electric/electronic device members, transportation machines, and civil engineering/construction, medical and leisure areas, as described earlier.

The curable rubber composition (11) of the present invention can be used as sealants, potting agents, coating materials or adhesives for electric/electronic device members, transportation machines, and civil engineering/construction, and leisure areas.

Rubber Composition (12)

The rubber composition (12) of the present invention contains the silyl-containing ethylene/α-olefin/non-conjugated polyene random copolymer rubber (A2), an organic rubber (K2) and a crosslinking agent (M) for the organic rubber (K2).

The rubber composition (12) of the present invention contains the silyl-containing ethylene/α-olefin/non-conjugated polyene random copolymer rubber (A2) preferably at 10% or more, more preferably at 20% or more, still more preferably at 30% or more.

The organic rubbers (K2) for the rubber composition (12) of the present invention include polypropylene glycol-based rubber containing a hydrolyzable silyl group, polyisobutylene-based rubber containing a hydrolyzable silyl group, natural rubber, polyisoprene, polybutadiene, styrene/butadiene copolymer rubber, polychloroprene, acrylic rubber, acrylonitrile/butadiene copolymer rubber, ethylene/propylene copolymer rubber (EPM), ethylene/propylene/non-conjugated polyene copolymer rubber (EPDM), butyl rubber, urethane rubber, silicone rubber, epichlorohydrin rubber, ethylene/vinyl acetate copolymer rubber, ethylene/acrylic copolymer rubber, fluorine rubber, chlorosulfonated polyethylene, and a combination thereof.

Of these, polypropylene glycol-based rubber containing a hydrolyzable silyl group, polyisobutylene-based rubber containing a hydrolyzable silyl group, natural rubber, polyisoprene, polybutadiene, styrene/butadiene copolymer rubber, polychloroprene, acrylic rubber, acrylonitrile/butadiene copolymer rubber, ethylene/propylene copolymer rubber (EPM), ethylene/propylene/non-conjugated polyene copolymer rubber (EPDM), butyl rubber, urethane rubber, ethylene/acrylic copolymer rubber, silicone rubber and a combination thereof are particularly preferable, for their compatibility with the (A2) component.

The other rubbers may be suitably used in the presence of a solubilizer.

The ratio of the silyl-containing ethylene/α-olefin/non-conjugated polyene random copolymer rubber (A2) to organic rubber (K2), i.e., (A2)/(K2) ratio, is normally 3/97 to 70/30 by weight, preferably 5/95 to 50/50 by weight, viewed from balances among formability of the three-dimensional crosslinked structures, moldability and mechanical strength.

The crosslinking agent (M) useful for the organic rubber (K2) of the present invention is not limited, so long as it is normally used as a vulcanization agent for rubber and serviceable for EPDM. For example, the crosslinking agents useful for the present invention include sulfur, sulfur donor, low-sulfur high-efficiency vulcanization promoter, quinoide, resin, peroxide and compound containing SiH group.

Others useful as the crosslinking agents (M) for the present invention include multi-functional ones, having two or more functional groups reactive with the crosslinking group in the organic rubber (K2). These functional groups include amino, isocyanate, maleimide, epoxy, hydrosilyl and carboxyl.

The rubber composition (12) of the present invention may be incorporated with a curing catalyst which promotes the silanol condensation. Widely varying known curing catalysts maybe used for the present invention. The concrete examples of these catalysts useful for the present invention include titanate esters, e.g., those of tetrabutyl titanate and tetrapropyl titanate; tin carboxylates, e.g., dibutyl tin dilaurate, dibutyl tin maleate, dibutyl tin diacetate, tin octylate and tin naphthenate; product of the reaction between dibutyl tin oxide and phthalate ester; dibutyl tin diacetylacetonate; organoaluminum compounds, e.g., aluminum trisacetylacetonate, aluminum trisethylacetoacetate and diisopropoxy aluminum ethylacetoacetate; chelate compounds, e.g., zirconium tetraacetylacetonate and titanium tetraacetylacetonate; lead octylate; amine-based compounds, and salts of these compounds and carboxylates, e.g., butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl) phenol, morpholine, N-methylmorpholine, 2-ethyl-4-methylimidazole and 1,8-diazabicyclo(5,4,0) undecene-7 (DBU); low-molecular-weight polyamide resins produced by the reactions between excessive quantities of polyamines and polybasic acids; products of the reactions between excessive quantities of polyamines and epoxy compounds; and known silanol condensing catalysts, e.g., silane coupling agents containing amino group (e.g., γ-aminopropyl trimethoxy silane and N-(β-aminoethyl)aminopropylmethyldimethoxy silane) and other known catalysts, acidic or basic. These compounds may be used either individually or in combination.

The curing catalyst, when used, is incorporated normally at 0.1 to 20 parts by weight per 100 parts by weight of the (A2) component, preferably around 1 to 10 parts by weight. An excessively low content of the catalyst is undesirable, because it may result in slow curing speed of the rubber composition product. On the other hand, an excessively high content of the catalyst is also undesirable, because it may deteriorate the tensile-related characteristics of the cured product.

The rubber composition (12) of the present invention may be adequately incorporated with one or more additives. The additives useful for the present invention include adhesion improver, property adjuster, storage stability improver, plasticizer, filler, aging inhibitor, ultraviolet ray absorber, metal deactivator, ozone-caused aging inhibitor, light stabilizer, amine-based radical chaining inhibitor, phosphorus-based peroxide decomposer, lubricant, pigment, and foaming agent.

The adhesion improvers useful for the present invention include commonly used adhesives and others, except a silane coupling agent as the silanol condensing catalyst. The concrete examples of these adhesion improvers include phenolic resin, epoxy resin, coumarone/indene resin, rosin ester resin, terpene/phenol resin, α-methyl styrene/vinyl toluene copolymer, polyethylmethyl styrene, alkyl titanate, and aromatic polyisocyanate. The adhesion improver, when used, is incorporated preferably at about 1 to 50 parts by weight per 100 parts by weight of the (A2) component, more preferably about 5 to 30 parts.

The storage stability improvers useful for the present invention include compounds with silicon to which a hydrolyzable group is bonded, and esters of ortho-organic acids. The concrete examples of the storage stability improvers include methyltrimethoxy silane, methyltriethoxy silane, tetramethoxy silane, ethyltrimethoxy silane, dimethyldiethoxy silane, trimethylisobutoxy silane, trimethyl(n-butoxy) silane, n-butyltrimethoxy silane, and methyl orthoformate. The storage stability improver, when used, is incorporated preferably at about 0.5 to 20 parts by weight per 100 parts by weight of the (A2) component, more preferably about 1 to 10 parts by weight.

The plasticizer useful for the present invention is also not limited, and any commonly used one may be used. Preferably, it should be compatible with each component for the rubber composition (12) of the present invention.

The concrete examples of these plasticizers include hydrocarbon-based compounds, e.g., polybutene, hydrogenated polybutene, ethylene/α-olefin oligomer, α-methyl styrene oligomer, biphenyl, triphenyl, triaryl dimethane, alkylene triphenyl, liquid polybutadiene, hydrogenated liquid polybutadiene, alkyl diphenyl, partially hydrogenated terphenyl, paraffin oil, naphthene oil and atactic polypropylene; parafin chlorides; phthalate esters, e.g., those of dibutyl phthalate, diheptyl phthalate, di(2-ethylhexyl) phthalate, butyl benzyl phthalate and butyl phthalyl butyl glycolate; non-aromatic, dibasic acid esters, e.g., those of dioctyl adipate and dioctyl cebacate; esters of polyalkylene glycol, e.g., those of diethylene glycol benzoate and triethylene glycol dibenzoate; and phosphate esters, e.g., those of tricresyl phosphate and tributyl phosphate. They may be used either individually or in combination.

Of these, hydrocarbon-based compounds free of unsaturated group, e.g., hydrogenated polybutene, hydrogenated liquid polybutadiene, paraffin oil, naphthene oil and atactic polypropylene, are more preferable for various reasons, e.g., high compatibility with each component for the rubber composition (12) of the present invention, limited effects on curing speed of the rubber composition, good resistance to weather of the cured product, and cheapness.

The plasticizer may be used in place of the solvent during the process of introducing a reactive silicon group into the ethylene/α-olefin/non-conjugated polyene random copolymer rubber, for the purposes of, e.g., adjusting reaction temperature and viscosity of the reaction system.

The plasticizer, when used, is incorporated preferably at about 10 to 500 parts by weight per 100 parts by weight of the (A2) component, more preferably about 20 to 300 parts by weight.

The concrete examples of the fillers include wood powder, pulp, cotton chips, asbestos, glass fibers, carbon fibers, mica, walnut shell powder, rice hull powder, graphite, diatomaceous earth, white clay, fumed silica, settling silica, silicic anhydride, carbon black, calcium carbonate, clay, talc, titanium oxide, magnesium carbonate, quartz, fine aluminum powder, flint powder, and zinc powder. Of these, more preferable ones are thixotropic fillers, e.g., settling silica, fumed silica and carbon black; and calcium carbonate, titanium oxide and talc. The filler, when used, is incorporated preferably at about 10 to 500 parts by weight per 100 parts by weight of the (A2) component, more preferably about 20 to 300 parts by weight.

The aging inhibitors useful for the present invention include commonly used known ones, e.g., sulfur-based ones, radical inhibitors and ultraviolet ray absorbers.

The sulfur-based aging inhibitors useful for the present invention include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, mercaptols, monothio acids, polythio acids, thioamides, and sulfoxides. The concrete examples of the sulfur-based aging inhibitors include mercaptans, e.g., 2-mercaptobenzothiazole; salts of mercaptans, e.g., zinc salt of 2-mercaptobenzothiazole; sulfides, e.g., 4,4'-thio-bis(3-methyl-6-t-butyl phenol), 4,4'-thio-bis(2-methyl-6-t-butyl phenol), 2,2'-thio-bis(4-methyl-6-t-butyl phenol), bis(3-methyl-4-hydroxy-5-t-butylbenzyl) sulfide, terephthaloyl di(2, 6-dimethyl-4-t-butyl-3-hydroxybenzyl) sulfide, phenothiazine, 2,2'-thio-bis(4-octyl phenol) nickel, dilauryl thiodipropionate, distearyl thiodipropionate, dimyristyl thiodipropionate, ditridecyl thiodipropionate, distearylβ,β'-thiodibutyrate, lauryl-stearyl thiodipropionate and 2,2-thio [diethyl-bis-3(3,5-di-t-butyl-4-hydroxy phenol)propionate]; polysulfides, e.g., 2-benzothiazole disulfide; dithiocarboxylates, e.g., zinc dibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethyldithiocarbamate; thioureas, e.g., 1-butyl-3-oxy-diethylene-2-thiourea, di-o-tolyl-thiourea and ethylene thiourea; and thiophosphates, e.g., trilauryltrithiophosphate.

The above-described sulfur-based aging inhibitor prevents decomposition/aging of the main chain under heating much more efficiently than the other types for the rubber composition of the present invention, controlling the problems, e.g., residual surface tackiness.

The radical inhibitors useful for the present invention include phenol-based ones, e.g., 2,2-methylene-bis(4-methyl-6-t-butyl phenol) and tetrakis[methylene-3-(3,5-di-t-butyl-4-hydroxyphenyl)propio nate]methane; and amine-based ones, e.g., phenyl-β-naphthylamine, α-naphthylamine, N,N'-sec-butyl-p-phenylenediamine, phenothiazine and N,N'-diphenyl-p-phenylenediamine.

The ultraviolet ray absorbers useful for the present invention include 2-(2'-hydroxy-3',5'-di-t-butylphenyl) benzotriazole and bis(2,2,6,6-tetramethyl-4-piperidine) cebacate.

The aging inhibitor, when used, is incorporated at about 0.1 to 20 parts by weight per 100 parts by weight of the (A2) component, more preferably about 1 to 10 parts by weight.

The rubber composition (12) of the present invention can be prepared by uniformly kneading the components by a kneader, e.g., intermix mixer, planetary mixer, Banbury mixer, kneader or 2-roll unit.

The rubber composition (12) of the present invention is cured at room temperature to 200° C. for several minutes to several days, because it can be cured quickly. It is particularly preferable to crosslink the composition with moisture in air at room temperature.

Rubber Composition (12) and its Uses

The rubber composition (12) of the present invention contains the curable composition with the ethylene/α-olefin/non-conjugated polyene random copolymer rubber containing a hydrolyzable silyl group as the component (A2). More concretely, the rubber composition (12) of the present invention contains the organic polymer (Z1), organic rubber (K2) and a crosslinking agent (M) for the organic rubber (K2). It can be suitably used for electric/electronic device members, transportation machines, and civil engineering/construction, medical and leisure areas, as described earlier.

The curable rubber composition (12) of the present invention can be used as sealants, potting agents, coating materials or adhesives for electric/electronic device members, transportation machines, and civil engineering/construction, and leisure areas.

Rubber Composition (13)

The rubber composition (13) of the present invention contains the silyl-containing ethylene/α-olefin/non-conjugated polyene random copolymer rubber (A2), an epoxy resin (K3), a silane coupling agent (N), a silanol condensing catalyst (O) and a curing agent for the epoxy resin (P).

The rubber composition (13) of the present invention contains the silyl-containing ethylene/α-olefin/non-conjugated polyene random copolymer rubber (A2) preferably at 10% or more, more preferably at 20% or more, still more preferably at 30% or more.

The epoxy resins (K3) for the rubber composition (13) of the present invention include epichlorohydrin-bisphenol A type epoxy resins; epichlorohydrin-bisphenol F type epoxy resins; epichlorohydrin-bisphenol S type epoxy resins; flame-retardant type epoxy resins (e.g., glycidyl ethers of tetrabromophenol A type); novolac type epoxy resins; hydrogenated bisphenol A type epoxy resins; glycidyl ether type epoxy resins of bisphenol A type propylene oxide adduct; glycidyl ether type epoxy resins of bisphenol A type ethylene oxide adduct; glycidyl ester type epoxy resins, e.g., diglycidyl-p-oxybenzoate, phthalate diglycidyl ester, tetrahydrophthalate diglycidyl ester, hexahydrophthalate diglycidyl ester, and adipate diglycidyl ester; glycidyl amine type epoxy resins, triglycidyl-m-aminophenol, N,N,N',N'-tetraglycidylaminophenylmethane, N,N-diglycidylaniline, and N,N-diglycidyl-o-toluidine; hydantoin type epoxy resin, e.g., 1,3-diglycidyl-5-methyl-5-ethylhydantoin; triglycidyl isocyanurate; polyalkylene glycol diglycidyl ether; polyhydric alcohols (e.g., glycerin and sorbitol) and glycidyl ether; alicyclic epoxy resins, e.g., alicyclic diepoxy acetal, alicyclic diepoxy adipate, alicyclic diepoxydiepoxy adipate, alicyclic diepoxy carboxylate, and vinylcyclohexene oxide; and epoxidized unsaturated polymers, e.g., polybutadiene and oil-derived resins. The epoxy resins (K3) useful for the present invention are not limited to the above, and commonly used epoxy resins may be used. Of these epoxy resins, the more preferable ones include those having two or more epoxy groups, because they produce the network structures more easily. Still more preferable ones include epoxy resins having glycidyl ether, in particular epichlorohydrin-bisphenol A type epoxy resin, because of its compatibility with the (A2) component.

The (K3) component, when used, is incorporated preferably 5 to 900 parts by weight per 100 parts by weight of the (A2) component, more preferably 10 to 300 parts by weight. At below 5 parts, toughness of the epoxy resin will not be realized and insufficient cohesive force will result. At above 900 parts, on the other hand, the polymer as the (A2) component having a reactive silicon group may not be included in the matrix of the cured product, with the result the cured product has insufficient elasticity and becomes fragile. Therefore, the content beyond the above range is undesirable.

The silane coupling agent (N) useful for the present invention is generally a silane containing a hydrolyzable silicon group and one or more other functional groups in the molecule, and the functional groups useful for the present invention include primary, secondary and tertiary amino, mercapto, epoxy, ureide, isocyanate, vinyl, methacryl and halogenoalkyl. Of these, the more preferable ones include those having a primary, secondary or tertiary amino, mercapto, epoxy or ureide group, which are reactive with both the polymer having a reactive silicon group of (A2) component and the epoxy resin of (K3) component. Still more preferable ones are those having an amide group, especially primary or secondary. The hydrolyzable silicon groups useful for the present invention include those represented by the above-described general formula (I) in which X is a hydrolyzable group. Alkoxyl is more preferable, because of its easiness of handling, among others. The silane coupling agents useful for the present invention include amino-containing silanes, e.g., γ-aminopropyltrimethoxysilane, γ-aminopropyltriethoxysilane, γ-aminopropylmethyldimethoxysilane, γ-aminopropylmethyldiethoxysilane, γ-(2-aminoethyl) aminopropyltrimethoxysilane, γ-(2-aminoethyl) aminopropyltriethoxysilane, γ-(2-aminoethyl) aminopropylmethyldimethoxysilane, γ-(2-aminoethyl) aminopropylmethyldiethoxysilane, γ-(5-aminopentyl) aminopropyltrimethoxysilane, γ-(5-aminopentyl) aminopropyltriethoxysilane, γ-(5-aminopentyl) aminopropyldimethoxysilane, γ-(5-aminopentyl) aminopropylmethyldiethoxysilane, N-β-(N-vinylbenzylaminoethyl)-γ-aminopropyltrimethoxysilane and γ-anilinopropyltrimethoxysilane; mercapto-containing silanes, e.g., γ-mercaptopropyltrimethoxysilane, γ-mercaptopropyltriethoxysilane, γ-mercaptopropylmethyldimethoxysilane and γ-mercaptopropylmethyldiethoxysilane; epoxy-containing silanes, e.g., γ-glycidoxypropyltrimethoxysilane, γ-glycidoxypropyltriethoxysilane, γ-glycidoxypropylmethyldimethoxysilane, γ-glycidoxypropylmethyldiethoxysilane, β-(3,4-epoxycyclohexyl)ethyltrimethoxysilane; β-(3,4-epoxycyclohexyl)ethyltriethoxysilane; β-(3,4-epoxycyclohexyl)ethylmethyldimethoxysilane; β-(3,4-epoxycyclohexyl)ethylmethyldiethoxysilane; and ureido-containing silanes, e.g., γ-ureidopropyltrimethoxysilane, γ-ureidopropyltriethoxysilane, γ-ureidopropylmethyldimethoxysilane and γ-ureidopropylmethyldiethoxysilane. These silane coupling agents (N) may be used either individually or in combination.

The (N) component is incorporated preferably at 0.01 to 50 parts by weight per 100 parts by weight of the (A2) component. At the (N) content beyond the above range, the layered structure cannot be effectively controlled, and, in particular, insufficient interfacial adhesion will result at below 0.01 part by weight, and hence undesirable. It is incorporated more preferably at 0.1 to 5 parts by weight.

The silanol condensing catalysts (O) useful for the present invention include titanate esters, e.g., those of tetrabutyl titanate and tetrapropyl titanate; organotin compounds, e.g., dibutyl tin dilaurate, dibutyl tin maleate, dibutyl tin diacetate, tin octylate, tin naphthenate, product of the reaction between dibutyl tin oxide and phthalate ester and dibutyl tin diacetylacetonate; organoaluminum compounds, e.g., aluminum trisacetylacetonate, aluminum trisethylacetoacetate and diisopropoxy aluminum ethylacetoacetate; chelate compounds, e.g., zirconium tetraacetylacetonate and titanium tetraacetylacetonate; organolead compounds, e.g., lead octylate; amine-based compounds, and salts of these compounds and carboxylates, e.g., butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris (dimethylaminomethyl) phenol, morpholine, N-methyl morpholine, 2-ethyl-4-methylimidazole and 1,8-diazabicyclo(5,4,0) undecene-7 (DBU); low-molecular-weight polyamide resins produced by the reactions between excessive quantities of polyamines and polybasic acids; and products of the reactions between excessive quantities of polyamines and epoxy compounds. The silanol condensing catalysts (O) useful for the present invention are not limited to the above, and commonly used ones maybe used. These silanol condensing catalysts may be used either individually or in combination.

Of these silanol condensing catalysts, organometallic compounds, and a combination of organometallic compound and amine-based compound are more preferable, viewed from curability of the composition. The still more preferable ones include organotin compounds, especially tetravalent ones. A combination of a tetravalent organotin compound and a compound, as the (N) component, having both amino group (especially primary or secondary) and hydrolyzable silicon group gives the cured product particularly excellent in modulus of elasticity and strength.

The (O) component is incorporated preferably at 0.01 to 20 parts by weight per 100 parts by weight of the (A2) component, preferably 0.5 to 10 parts by weight. At below 0.01 parts, the (A2) component containing a reactive silicon group will have insufficient crosslinking reactivity. At above 20 parts, on the other hand, the adverse effects on adhesion and other properties are anticipated. Therefore, the content beyond the above range is undesirable.

The epoxy resin curing agents (P) useful for the present invention include primary or secondary amines, e.g., triethylenetetramine, tetraethylenepentamine, diethylaminopropylamine, N-aminoethylpiperizine, menthenediamine, isophoronediamine, morpholine, piperizine, m-xylylenediamine, m-phenylenediamine, diaminodiphenylmethane and diaminodiphenylsulfone; tertiary amines, e.g., trialkylamine, N-methylmorpholine, N,N'-dimethylpiperazine, pyridine, picoline, guanidine, diphenylguanidine, 1,8-diazabicyclo(5,4,0) undecene-7 (DBU), benzyldimethylamine, 2-(dimethylaminomethyl) phenol and 2,4,6-tris (dimethylaminomethyl) phenol; organic acid salts of these tertiary amines; imidazoles, e.g., 2-methylimidazole, 2-ethyl-4-methylimidazole, 2-undecylimidazole and 1-benzyl-2-methylimidazole; polyamides; dicyandiamides; boron trifluoride/amine complexes; carboxylic anhydrides, e.g., phthalic anhydride, hexahydrophthalic anhydride, tetrahydrophthalic anhydride, endomethylene/tetrahydrophthalic anhydride, dodecylsuccinic anhydride, trimellitic anhydride, pyromellitic anhydride, chlorendic anhydride; alcohols; phenols; carboxylic acids; Lewis acids, e.g., boron trifluoride, phosphorus hexafluoride, aluminum trichloride and tin tetrachloride; and the salts of these Lewis acids. The epoxy resins curing agents (P) useful for the present invention are not limited to the above, and commonly used ones maybe used. These epoxy resins curing agents may be used either individually or in combination. Of these epoxy resins curing agents, tertiary amines, organic salts thereof and imidazoles are more preferable, viewed from curability of the composition.

Desired content of the (P) component varies depending on its type and type of the epoxy resin as the (K3) component. However, it is incorporated at a varying content in a range of 0.01 to 300 parts by weight per 100 parts by weight of the (K3) component for specific purposes.

The method of preparing the curable resin composition containing the (A2), (K3), (N), (O) and (P) components is not limited. It may be prepared by the common method, e.g., kneading these components by, e.g., a mixer, roll or kneader, or mixing them after dissolving each component in an adequate solvent. Each component can be adequately combined with the others to produce a one-liquid or two-liquid type composition.

The rubber composition (13) of the present invention may be adequately incorporated with one or more additives. The additives useful for the present invention include adhesion improver, property adjuster, storage stability improver, plasticizer, filler, aging inhibitor, ultraviolet ray absorber, metal deactivator, ozone-caused aging inhibitor, light stabilizer, amine-based radical chaining inhibitor, phosphorus-based peroxide decomposer, lubricant, pigment, and foaming agent.

The adhesion improvers useful for the present invention include commonly used adhesives and others, other than the above-described epoxy resin (K3) and silane coupling agent (N). The concrete examples of these adhesion improvers include phenolic resin, coumarone/indene resin, rosin ester resin, terpene/phenol resin, α-methyl styrene/vinyl toluene copolymer, polyethylmethyl styrene, alkyl titanates, and aromatic polyisocyanate. The adhesion improver, when used, is incorporated preferably at about 1 to 50 parts by weight per 100 parts by weight of the (A2) component, more preferably about 5 to 30 parts by weight.

The storage stability improvers useful for the present invention include compounds with silicon to which a hydrolyzable group is bonded, and esters of ortho-organic acids. The concrete examples of the storage stability improvers include methyltrimethoxy silane, methyltriethoxy silane, tetramethoxy silane, ethyltrimethoxy silane, dimethyldiethoxy silane, trimethylisobutoxy silane, trimethyl(n-butoxy) silane, n-butyltrimethoxy silane, and methyl orthoformate. The storage stability improver, when used, is incorporated preferably at about 0.5 to 20 parts by weight per 100 parts by weight of the (A2) component, more preferably about 1 to 10 parts by weight.

The plasticizer useful for the present invention is also not limited, and any commonly used one may be used. Preferably, it should be compatible with each component for the rubber composition (13) of the present invention. The concrete examples of these plasticizers include hydrocarbon-based compounds, e.g., polybutene, hydrogenated polybutene, ethylene/α-olefin oligomer, α-methyl styrene oligomer, biphenyl, triphenyl, triaryl dimethane, alkylene triphenyl, liquid polybutadiene, hydrogenated liquid polybutadiene, alkyl diphenyl, partially hydrogenated ter-phenyl, paraffin oil, naphthene oil and atactic polypropylene; parafin chlorides; phthalate esters, e.g., those of dibutyl phthalate, diheptyl phthalate, di(2-ethylhexyl) phthalate, butyl benzyl phthalate and butyl phthalyl butyl glycolate; non-aromatic, dibasic acid esters, e.g., those of dioctyl adipate and dioctyl cebacate; esters of polyalkylene glycol, e.g., those of diethylene glycol benzoate and triethylene glycol dibenzoate; and phosphate esters, e.g., those of tricresyl phosphate and tributyl phosphate. They may be used either individually or in combination.

Of these, hydrocarbon-based compounds free of unsaturated group, e.g., hydrogenated polybutene, hydrogenated liquid polybutadiene, paraffin oil, naphthene oil and atactic polypropylene, are more preferable for various reasons, e.g., high compatibility with each component for the rubber composition (13) of the present invention, limited effects on curing speed of the rubber composition, good resistance to weather of the cured product, and cheapness.

The plasticizer may be used in place of the solvent during the process of introducing a reactive silicon group into the ethylene/α-olefin/non-conjugated polyene random copolymer rubber, for the purposes of, e.g., adjusting reaction temperature and viscosity of the reaction system.

The plasticizer, when used, is incorporated preferably at about 10 to 500 parts by weight per 100 parts by weight of the (A2) component, more preferably about 20 to 300 parts by weight.

The concrete examples of the fillers include wood powder, pulp, cotton chips, asbestos, glass fibers, carbon fibers, mica, walnut shell powder, rice hull powder, graphite, diatomaceous earth, white clay, fumed silica, settling silica, silicic anhydride, carbon black, calcium carbonate, clay, talc, titanium oxide, magnesium carbonate, quartz, fine aluminum powder, flint powder, and zinc powder. Of these, more preferable ones are thixotropic fillers, e.g., settling silica, fumed silica and carbon black; and calcium carbonate, titanium oxide and talc. The filler, when used, is incorporated preferably at about 10 to 500 parts by weight per 100 parts by weight of the totaled (A2), (K3), (N), (O) and (P) components, more preferably about 20 to 300 parts by weight.

The aging inhibitors useful for the present invention include commonly used known ones, e.g., sulfur-based ones, radical inhibitors and ultraviolet ray absorbers.

The sulfur-based aging inhibitors useful for the present invention include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, mercaptols, monothio acids, polythio acids, thioamides, and sulfoxides. The concrete examples of the sulfur-based aging inhibitors include mercaptans, e.g., 2-mercaptobenzothiazole; salts of mercaptans, e.g., zinc salt of 2-mercaptobenzothiazole; sulfides, e.g., 4,4'-thio-bis(3-methyl-6-t-butyl phenol), 4,4'-thio-bis(2-methyl-6-t-butyl phenol), 2,2'-thio-bis(4-methyl-6-t-butyl phenol), bis(3-methyl-4-hydroxy-5-t-butylbenzyl) sulfide, terephthaloyl di(2,6-dimethyl-4-t-butyl-3-hydroxybenzyl) sulfide, phenothiazine, 2,2'-thio-bis(4-octyl phenol) nickel, dilauryl thiodipropionate, distearyl thiodipropionate, dimyristyl thiodipropionate, ditridecyl thiodipropionate, distearylβ,β'-thiodibutyrate, lauryl-stearyl thiodipropionate and 2,2-thio[diethyl-bis-3(3,5-di-t-butyl-4-hydroxy phenol)propionate]; polysulfides, e.g., 2-benzothiazole disulfide; dithiocarboxylates, e.g., zinc dibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethyldithiocarbamate; thioureas, e.g., 1-butyl-3-oxy-diethylene-2-thiourea, di-o-tolyl-thiourea and ethylene thiourea; and thiophosphates, e.g., trilauryltrithiophosphate.

The above-described sulfur-based aging inhibitor prevents decomposition/aging of the main chain under heating much more efficiently than the other types for the rubber composition of the present invention, controlling the problems, e.g., residual surface tackiness.

The radical inhibitors useful for the present invention include phenol-based ones, e.g., 2,2-methylene-bis(4-methyl-6-t-butyl phenol) and tetrakis[methylene-3-(3,5-di-t-butyl-4-hydroxyphenyl)propio nate]methane; and amine-based ones, e.g., phenyl-β-naphthylamine, α-naphthylamine, N,N'-sec-butyl-p-phenylenediamine, phenothiazine and N,N'-diphenyl-p-phenylenediamine.

The ultraviolet ray absorbers useful for the present invention include 2-(2'-hydroxy-3',5'-di-t-butylphenyl) benzotriazole and bis(2,2,6,6-tetramethyl-4-piperidine) cebacate.

The aging inhibitor, when used, is incorporated at about 0.1 to 20 parts by weight per 100 parts by weight of the (A2) component, more preferably about 1 to 10 parts by weight.

The rubber composition (13) of the present invention can be prepared by uniformly kneading the components by a kneader, e.g., intermix mixer, planetary mixer, Banbury mixer, kneader or 2-roll unit.

The rubber composition (13) of the present invention is cured at room temperature to 200° C. for several minutes to several days, because it can be cured quickly. It is particularly preferable to crosslink the composition with moisture in air at room temperature.

Uses of the Rubber Composition

The rubber composition (13) of the present invention can be suitably used as sealants, and also as adhesives, tackifiers, paints, shaping materials, spray materials, casting rubber materials and foaming materials. When it is used for a sealant, it can be a one-liquid sealant composition which is quickly cured when exposed to moisture in air while being applied to form a good rubber elastomer, because it can be kept stable for extended periods when stored in a closed condition, after the curing catalyst is kneaded with the other components in a moisture-free condition.

The rubber composition (13) of the present invention contains the curable composition with the ethylene/α-olefin/non-conjugated polyene random copolymer rubber containing a hydrolyzable silyl group as the component (A2), wherein the organic polymer (Z1) contains a hydrolyzable silyl group represented by the above-described general formula (1) and essentially no unsaturated double bond in the main chain. It can be suitably used for electric/electronic device members, transportation machines, and civil engineering/construction, medical and leisure areas, as described earlier.

The rubber composition (13) of the present invention can be used as sealants, potting agents, coating materials or adhesives for electric/electronic device members, transportation machines, and civil engineering/construction, and leisure areas.

The curable rubber composition (13) thus prepared can have a varying cohesive force of the matrix by changing type and addition rate of the silane coupling agent to control the layered structure of the cured product. As a result, it can give widely varying cured products, from the one having a low modulus of elasticity and high elongation, like the conventional cured product, to the one having a high modulus of elasticity and tensile shear strength.

In other words, the curable rubber composition (13) of the present invention is highly adhesive, and can give not only the cured product having a low modulus of elasticity and high elongation but also the one of improved cohesion force of the matrix, high in modulus of elasticity and tensile shear strength by changing addition rate of the silane coupling agent. Moreover, it is high in curing speed, and excellent in resistance to light, when cured. Therefore, it can cover desired mechanical characteristics by the simple procedure of changing addition rate of the silane coupling agent, and is particularly suitable for adhesive, sealant and tackifier agent.

Rubber Composition (14)

The rubber composition (14) of the present invention contains the silyl-containing ethylene/α-olefin/non-conjugated polyene random copolymer rubber (A2), an epoxy resin (K3), a silicon compound (Q) containing a functional group reactive with the epoxy group and the hydrolyzable silyl group in the molecule, and a silicon compound (R) containing at least two hydroxyl groups bonded to the silicon atom in the molecule.

The rubber composition (14) of the present invention contains the silyl-containing ethylene/α-olefin/non-conjugated polyene random copolymer rubber (A2) preferably at 10% or more, more preferably at 20% or more, still more preferably at 30% or more.

The epoxy resins (K3) for the rubber composition (14) of the present invention include epichlorohydrin-bisphenol A type epoxy resins, epichlorohydrin-bisphenol F type epoxy resins, flame-retardant type epoxy resins (e.g., glycidyl ethers of tetrabromophenol A type), novolac type epoxy resins, hydrogenated bisphenol A type epoxy resins, glycidyl ether type epoxy resins of bisphenol A type propylene oxide adduct; glycidyl ester type epoxy resins, e.g., diglycidyl-p-oxybenzoate, phthalate diglycidyl ester, tetrahydrophthalate diglycidyl ester, hexahydrophthalate diglycidyl ester, m-aminophenol-based epoxy resin, diaminodiphenylmethane-based epoxy resin, uretahne-modified epoxy resin, various types of alicyclic epoxy resin, N,N-diglycidylaniline, N,N-diglycidyl-o-toluidine, triglycidyl isocyanurate, polyalkylene glycol diglycidyl ether, glycidyl ethers of polyhydric alcohols, e.g., glycerin, hydantoin type epoxy resin, and epoxidized unsaturated polymers, e.g., oil-derived resins. The epoxy resins (K3) useful for the present invention are not limited to the above, and commonly used epoxy resins may be used.

Of these epoxy resins, the more preferable ones include those having at least two epoxy groups, because they are highly reactive for the curing and produce the network structures more easily. Still more preferable ones include bisphenol A type epoxy resins, phthalate ester-based diglycidyl esters, and novolac type epoxy resins.

In the present invention, a curing agent which promotes curing of the epoxy resin (K3) may be used. The epoxy resin curing agents useful for the present invention include the commonly used agents for curing epoxy resins. These curing agents include amines, e.g., triethylenetetramine, tetraethylenepentamine, diethylaminopropylamine, N-aminoethylpiperazine, m-xylylenediamine, m-phenylenediamine, diaminodiphenylmethane, diaminodiphenylsulfone, isophoronediamine, 2,4,6-tris(dimethylaminomethyl) phenol; salts of tertiary amines; polyamide resins; imidazoles; dicyandiamides; boron trifluoride complexes; carboxylic anhydrides, e.g., phthalic anhydride, hexahydrophthalic anhydride, tetrahydrophthalic anhydride, endomethylene/tetrahydrophthalic anhydride, dodecylsuccinic anhydride, pyromellitic anhydride and chlorendic anhydride; alcohols; phenols; and carboxylic acids.

Desired content of the curing agent varies depending on its type and type of the epoxy resin. However, it is incorporated at a varying content in a range of 0.1 to 300 parts by weight per 100 parts by weight of the (K3) component for specific purposes.

The (Q) component for the present invention is a silicon compound containing a functional group reactive with the epoxy group and hydrolyzable silyl group in the molecule. The functional groups in the silicon compound, reactive with an epoxy group include primary, secondary and tertiary amino, mercapto, epoxy and carboxyl. As the hydrolyzable silyl groups, any of those for the (A2) component may be used. Of these, the more preferable ones include alkoxysilyl, because of its easiness of handling, among others.

The concrete examples of these silicon compounds include amino-containing silanes, e.g., γ-aminopropyltrimethoxysilane, γ-aminopropyltrimethoxysilane, γ-aminopropylmethyldimethoxysilane, γ-(2-aminoethyl) aminopropyltrimethoxysilane, γ-(2-aminoethyl) aminopropylmethyldimethoxysilane, γ-(2-aminoethyl) aminopropyltriethoxysilane, γ-ureidopropyltriethoxysilane, N-β-(N-vinylbenzylaminoethyl)-γ-aminopropyltrimethoxysilane and γ-anilinopropyltrimethoxysilane; mercapto-containing silanes, e g., γ-mercaptopropyltrimethoxysilane, γ-mercaptopropyltriethoxysilane, γ-mercaptopropylmethyldimethoxysilane and γ-mercaptopropylmethyldiethoxysilane; epoxy bond-containing silanes, e.g., γ-glycidoxypropyltrimethoxysilane, γ-glycidoxypropylmethyldimethoxysilane, γ-glycidoxypropyltriethoxysilane, β-(3,4-epoxycyclohexyl)ethyltrimethoxysilane; and carboxyls, e.g., β-carboxylethyltriethoxysilane, β-carboxylethylphenylbis(2-methoxyethoxy) silane and N-β-(N-carboxymethylaminoethyl)-γ-aminopropyltrimethoxysilane. These silicon compounds (Q) may be used either individually or in combination.

The (R) component for the present invention is a silicon compound containing at least two hydroxyl groups, preferably 2 to 4, bonded to the silicon atom in the molecule.

These silicon compounds include polydimethylsiloxane having silanol group at the terminal, polydiphenylsiloxane having silanol group at the terminal, polydimethyldiphenylsiloxane having diphenylsilanol group at the terminal, diphenylsilanediol, bis(hydroxydimethylsilyl)benzene, polytetramethyl-p-silphenylenesiloxane, organosilicon compounds having hydroxyl group at the terminal, e.g., silicone varnish, and organopolysiloxanes.

The (A2) component whose hydrolyzable group in the rubber-based organic polymer is converted into silanol group can be also used as the (R) component. The concrete examples of these polymers include polypropylene oxide having dimethylsilanol group at the terminal of the molecule. Content of the silanol-containing rubber-based polymer depends on its molecular weight and silanol content. However, generally speaking, it is preferably incorporated at 10 to 100 parts by weight per 100 parts by weight of the (A2) component. Of these compounds, more preferable ones include diphenylsilanediol, which has a low molecular weight per one hydroxyl group bonded to the silicon atom, and itself having no possibility of self-condensing. These compounds may be used either individually or in combination.

The curable composition (14) is prepared by incorporating, as the effective ingredients, the silyl-containing ethylene/α-olefin/non-conjugated polyene random copolymer rubber as the (A2) component, an epoxy resin as the (K3) component, and silicon compounds as the (Q) and (R) components.

The curable composition (14) can be stably cured even when there is not a sufficient quantity of moisture in the ambient atmosphere, because it can be cured by the actions of the silanol group in the (R) component containing at least two hydroxyl groups bonded to the silicon atom in the molecule, when it is included in the composition comprising the (A2), (K3) and (Q) components. The composition (14) of the present invention therefore is useful, even when applied under the conditions where moisture is difficult to enter the system, particularly useful for a sealant, an adhesive and a potting agent.

The condensing reaction does proceed in the composition comprising the (A2), (K3) and (Q) components after the hydrolyzable silyl group in the (A2) and (Q) components is partly hydrolyzed. In the composition further incorporated with the (R) component, on the other hand, the condensing reaction is considered to proceed without undergoing the hydrolysis step, in the presence of the silanol group in the (R) component.

The ratio of the (K3) component to the (A2) component, i.e., (A2)/(K3) ratio, is preferably in a range of 100/1 to 100/200 by weight. The cured product tends to have an insufficient strength that above 100/1, and insufficient rubber-like properties at below 100/200. The parts by weight of the (K3) component per 100 parts by weight of the (A2) component is more preferably 10 to 120/100, still more preferably 20 to 100/100, when the rubber-like properties of the cured product are to be sufficiently manifested, and its strength is to be sufficiently improved, although the preferable ratio varies depending on purposes of the curable composition.

The silicon compound as the (Q) component is incorporated preferably at an ((A2)+(K3) components)/(Q) component ratio of 100/0.1 to 100/20 by weight, more preferably 100/0.2 to 100/10. The cured product tends to have an insufficient strength at above 100/0.1, and insufficient rubber-like properties at below 100/20.

The silicon compound as the (R) component is incorporated preferably at an (A2) component/(R) component ratio of 100/0.1 to 100/100 by weight, more preferably 100/0.2 to 100/50. The cured product tends to be influenced to moisture in the ambient atmosphere and lose stable characteristics at above 100/0.1, and insufficient rubber-like properties at below 100/100.

The method of preparing the curable rubber composition (14) containing the (A2), (K3), (Q) and (R) components is not limited. It may be prepared by the common method, e.g., kneading these components by, e.g., a mixer, roll or kneader at normal temperature or elevated temperature, or mixing them after dissolving each component in a small quantity of a suitable solvent. These components can be adequately combined with each other to produce a one-liquid or a two-liquid type composition.

The rubber composition (14) of the present invention may be adequately incorporated with one or more additives. The additives useful for the present invention include adhesion improver, property adjuster, storage stability improver, plasticizer, filler, aging inhibitor, ultraviolet ray absorber, metal deactivator, ozone-caused aging inhibitor, light stabilizer, amine-based radical chaining inhibitor, phosphorus-based peroxide decomposer, lubricant, pigment, and foaming agent.

The adhesion improvers useful for the present invention include commonly used adhesives and others, other than the above-described epoxy resin as the (K3) components and silicon compounds as the (Q) and (R) components.

The concrete examples of these adhesion improvers include phenolic resin, coumarone/indene resin, rosin ester resin, terpene/phenol resin, α-methyl styrene/vinyl toluene copolymer, polyethylmethyl styrene, alkyl titanates, and aromatic polyisocyanate. The adhesion improver, when used, is incorporated preferably at about 1 to 50 parts by weight per 100 parts by weight of the (A2) component, more preferably about 5 to 30 parts by weight.

The storage stability improvers useful for the present invention include compounds with silicon to which a hydrolyzable group is bonded, and esters of ortho-organic acids.

The concrete examples of the storage stability improvers include methyltrimethoxy silane, methyltriethoxy silane, tetramethoxy silane, ethyltrimethoxy silane, dimethyldiethoxy silane, trimethylisobutoxy silane, trimethyl (n-butoxy) silane, n-butyltrimethoxy silane, and methyl orthoformate. The storage stability improver, when used, is incorporated preferably at about 0.5 to 20 parts by weight per 100 parts by weight of the (A2) component, more preferably about 1 to 10 parts.

The plasticizer useful for the present invention is also not limited, and any commonly used one may be used. Preferably, it should be compatible with each component for the rubber composition (14) of the present invention.

The concrete examples of these plasticizers include hydrocarbon-based compounds, e.g., polybutene, hydrogenated polybutene, ethylene/α-olefin oligomer, α-methyl styrene oligomer, biphenyl, triphenyl, triaryl dimethane, alkylene triphenyl, liquid polybutadiene, hydrogenated liquid polybutadiene, alkyl diphenyl, partially hydrogenated terphenyl, paraffin oil, naphthene oil and atactic polypropylene; parafin chlorides; phthalate esters, e.g., those of dibutyl phthalate, diheptyl phthalate, di(2-ethylhexyl) phthalate, butyl benzyl phthalate and butyl phthalyl butyl glycolate; non-aromatic, dibasic acid esters, e.g., those of dioctyl adipate and dioctyl cebacate; esters of polyalkylene glycol, e.g., those of diethylene glycol benzoate and triethylene glycol dibenzoate; and phosphate esters, e.g., those of tricresyl phosphate and tributyl phosphate. They may be used either individually or in combination.

Of these, hydrocarbon-based compounds free of unsaturated group, e.g., hydrogenated polybutene, hydrogenated liquid polybutadiene, paraffin oil, naphthene oil and atactic polypropylene, are more preferable for various reasons, e.g., high compatibility with each component for the rubber composition (14) of the present invention, limited effects on curing speed of the rubber composition, good resistance to weather of the cured product, and cheapness.

The plasticizer may be used in place of the solvent during the process of introducing a reactive silicon group into the ethylene/α-olefin/non-conjugated polyene random copolymer rubber, for the purposes of, e.g., adjusting reaction temperature and viscosity of the reaction system.

The plasticizer, when used, is incorporated preferably at about 10 to 500 parts by weight per 100 parts by weight of the (A2) component, more preferably about 20 to 300 parts by weight.

The concrete examples of the fillers include wood powder, pulp, cotton chips, asbestos, glass fibers, carbon fibers, mica, walnut shell powder, rice hull powder, graphite, diatomaceous earth, white clay, fumed silica, settling silica, silicic anhydride, carbon black, calcium carbonate, clay, talc, titanium oxide, magnesium carbonate, quartz, fine aluminum powder, flint powder, and zinc powder. Of these, more preferable ones are thixotropic fillers, e.g., settling silica, fumed silica and carbon black; and calcium carbonate, titanium oxide and talc. The filler, when used, is incorporated preferably at about 10 to 500 parts by weight per 100 parts by weight of the totaled (A2), K3), (Q) and (R) components, more preferably about 20 to 300 parts by weight.

The aging inhibitors useful for the present invention include commonly used known ones, e.g., sulfur-based ones, radical inhibitors and ultraviolet ray absorbers.

The sulfur-based aging inhibitors useful for the present invention include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, mercaptols, monothio acids, polythio acids, thioamides, and sulfoxides.

The concrete examples of the sulfur-based aging inhibitors include mercaptans, e.g., 2-mercaptobenzothiazole; salts of mercaptans, e.g., zinc salt of 2-mercaptobenzothiazole; sulfides, e.g., 4,4'-thio-bis(3-methyl-6-t-butyl phenol), 4,4'-thio-bis(2-methyl-6-t-butyl phenol), 2,2'-thio-bis(4-methyl-6-t-butyl phenol), bis(3-methyl-4-hydroxy-5-t-butyl-benzyl) sulfide, terephthaloyl di(2,6-dimethyl-4-t-butyl-3-hydroxybenzyl) sulfide, phenothiazine, 2,2'-thio-bis(4-octyl phenol) nickel, dilauryl thiodipropionate, distearyl thiodipropionate, dimyristyl thiodipropionate, ditridecyl thiodipropionate, distearyl β,β'-thiodibutyrate, lauryl-stearyl thiodipropionate and 2,2-thio[diethyl-bis-3(3,5-di-t-butyl-4-hydroxy phenol)propionate]; polysulfides, e.g., 2-benzothiazole disulfide; dithiocarboxylates, e.g., zinc dibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethyldithiocarbamate; thioureas, e.g., 1-butyl-3-oxy-diethylene-2-thiourea, di-o-tolyl-thiourea and ethylene thiourea; and thiophosphates, e.g., trilauryltrithiophosphate.

The above-described sulfur-based aging inhibitor prevents decomposition/aging of the main chain under heating much more efficiently than the other types for the rubber composition of the present invention, controlling the problems, e.g., residual surface tackiness.

The radical inhibitors useful for the present invention include phenol-based ones, e.g., 2,2-methylene-bis(4-methyl-6-t-butyl phenol) and tetrakis[methylene-3-(3,5-di-t-butyl-4-hydroxyphenyl)propio nate]methane; and amine-based ones, e.g., phenyl-β-naphthylamine, α-naphthylamine, N,N'-sec-butyl-p-phenylenediamine, phenothiazine and N,N'-diphenyl-p-phenylenediamine.

The ultraviolet ray absorbers useful for the present invention include 2-(2'-hydroxy-3',5'-di-t-butylphenyl)benzotriazole and bis(2,2,6,6-tetramethyl-4-piperidine)cebacate.

The aging inhibitor, when used, is incorporated at about 0.1 to 20 parts by weight per 100 parts by weight of the (A2) component, more preferably about 1 to 10 parts by weight.

The rubber composition (14) of the present invention can be prepared by uniformly kneading the components by a kneader, e.g., intermix mixer, planetary mixer, Banbury mixer, kneader or 2-roll unit.

The rubber composition (14) of the present invention is cured at room temperature to 200° C. for several minutes to several days, because it can be cured quickly. It is particularly preferable to crosslink the composition with moisture in air at room temperature.

Uses of the Rubber Composition (14)

The rubber composition (14) of the present invention can be suitably used as a sealant, and also as adhesives, tackifiers, paints, shaping materials, spray materials, casting rubber materials and foaming materials.

When it is used for a sealant, it can be a one-liquid sealant composition which is quickly cured when exposed to moisture in air while being applied to form a good rubber elastomer, because it can be kept stable for extended periods when stored in a closed condition, after the curing catalyst is kneaded with the other components in a moisture-free condition.

The rubber composition (14) of the present invention contains the curable composition with the ethylene/α-olefin/non-conjugated polyene random copolymer rubber containing a hydrolyzable silyl group as the component (A2), wherein the organic polymer (Z1) contains a hydrolyzable silyl group represented by the above-described general formula (1) and essentially no unsaturated double bond in the main chain. It can be suitably used for electric/electronic device members, transportation machines, and civil engineering/construction, medical and leisure areas, as described earlier.

The rubber composition (14) of the present invention can be used as sealants, potting agents, coating materials or adhesives for electric/electronic device members, transportation machines, and civil engineering/construction, and leisure areas.

The curable rubber composition (14) of the present invention can be cured even at low temperature around room temperature, and quickly cured by increasing temperature to about 100 to 150° C. Therefore, it can be cured and used over a wide temperature range from low to high temperature, depending on specific purposes. The curable rubber composition (14) of the present invention can be cured at room temperature to give the product of high strength, when a combination of epoxy resin/epoxy resin curing agent is selected from those curable at room temperature. The cured product from the composition without solvent can be easily molded when a liquid-type epoxy resin is used.

The method of molding the curable rubber composition (14) of the present invention is not limited. However, the method is preferably selected from those commonly used for solid rubber, e.g., natural rubber, and for rubber-based liquid polymer, e.g., polyurethane. Such a molding method can give the cured products, e.g., molded rubber and rubber-like foamed products, of improved properties, e.g., strength. The composition (14) can be also suitably used for rubber-based adhesives, sealants, tackifiers and the like. In particular, it can give a rubber-based adhesive high both in releasing strength and shear strength, when the (A2)/(K3) ratio is set at 100/20 to 100/100 by weight.

The curable rubber composition (14) of the present invention can be stably cured irrespective of atmosphere in which it is cured, even in the absence of a sufficient quantity of moisture, and can solve the problem of low strength involved in the rubber-based cured product having a hydrolyzable silyl group. It has other advantages of high hardness, and improved resistance of the cured product to weather.

Rubber Composition (15)

The rubber composition (14) of the present invention contains the silyl-containing ethylene/α-olefin/non-conjugated polyene random copolymer rubber (A2), calcium carbonate (L1), and talc (L2). The rubber composition (15) of the present invention contains the silyl-containing ethylene/α-olefin/non-conjugated polyene random copolymer rubber (A2) preferably at 10% or more, more preferably at 20% or more, still more preferably at 30% or more. The rubber composition (15) of the present invention is incorporated with two types of inorganic fillers (L), calcium carbonate (L1) and talc (L2), to simultaneously secure good workability (spinning property) of the composition and good mechanical properties (in particular hardness) of its cured product.

Calcium carbonate as the (L1) component falls into two general categories, limestone powder produced by mechanically crushing/processing natural chalk, limestone, marble or the like, and light calcium carbonate produced by a wet process involving chemical reactions from limestone or the like as the stock material, specifically referred to as colloidal calcium carbonate, when it is produced under controlled conditions into ultrafine colloidal particles. Of these calcium carbonate types, the preferable ones are limestone powder for its low cost, and colloidal calcium carbonate for its notable effect of improving workability (spinning property) of the composition. These may be used either individually or in combination.

Limestone powder may be crushed either by a dry or wet method, the latter being unsuitable for the present invention, because its product frequently deteriorates storage stability of the rubber composition (15) of the present invention. Calcium carbonate as the component (L1) for the present invention is more preferably surface-treated one with a surface treating agent. Surface treatment of calcium carbonate as the component (L1) improves adhesion properties of the composition (15) of the present invention and further improves its effect of improving workability.

The surface treating agents useful for the present invention include organic compounds, e.g., fatty acids, fatty acid soaps and fatty acid esters; various types of surfactants; ad coupling agents, e.g., silane- and titanate-based ones.

The concrete examples of these organic compounds include fatty acids, e.g., caproic, capryl, pelargonic, capric, undecanic, lauric, myristic, palmitic, stearic, behenic and oleic acids; sodium and potassium salts thereof; and alkyl esters thereof.

The concrete examples of the surfactants useful for the present invention include polyoxyethylene alkyl ether sulfate esters and long-chain alcohol sulfate esters; sodium and potassium salts thereof as sulfate ester type anionic surfactants; alkyl benzenesulfonates, alkyl naphthalenesulfonates, paraffin sulfonates, α-olefin sulfonates and alkyl sulfosuccinates; and sodium and potassium salts thereof as sulonate type anionic surfactants.

Calcium carbonate is treated with 0.1 to 20% by weight of the surface treating agent, based on the calcium carbonate, more preferably with 1 to 5% by weight of the agent.

The agent may not bring a sufficient effect of improving workability, adhesion and resistance to weather at below 0.1%, and deteriorate storage stability of the curable composition at above 20%.

The (L1) component is preferably incorporated at 5 to 500 parts by weight per 100 parts of the (A2) component, more preferably 20 to 350 parts, still more preferably 40 to 200 parts by weight. The component may not bring a sufficient effect of improving workability (spinning property) of the rubber composition at below 5 parts, and deteriorate its adhesion at above 500 parts. These compounds maybe used either individually or in combination for the (L1) component.

Talc as the (L2) component is an inorganic filler obtained by mechanically crushing/processing/classifying the stock material known as talcum, and comprises magnesium silicate ($3MgO.4SiO_2.H_2O$) as the major ingredient. Talc as the (L2) component for the present invention may be untreated or surface-treated with a surface treating agent. When surface-treated, it improves storage stability of the rubber composition (15) of the present invention.

The surface treating agents useful for the (L2) component can be the same as those for the (L1) component.

The (L2) component is preferably incorporated at 5 to 300 parts by weight per 100 parts of the (A2) component, more preferably 20 to 200 parts, still more preferably 40 to 150 parts by weight. The component may not bring a sufficient effect of improving mechanical characteristics of the cured product from the composition at below 5 parts, and deteriorate its adhesion at above 300 parts. These compounds may be used either individually or in combination for the (L2) component.

The rubber composition (15) of the present invention may be incorporated with various types of fillers, in addition to calcium carbonate as the (L1) component and talc as the (L2) component. The concrete examples of the fillers include reinforcing fillers, e.g., fumed silica, settling silica, silicic anhydride, silicic hydride and carbon black; fillers, e.g., diatomaceous earth, fired clay, clay, talc, titanium oxide, bentonite, organic bentonite, ferric oxide, zinc oxide, activated zinc white; fibrous fillers, e.g., glass fibers or filaments.

The rubber composition (15) of the present invention may be incorporated with a silane coupling agent. This agent improves adhesion strength of the cured silyl-containing ethylene/α-olefin/non-conjugated polyene random copolymer rubber (A2) to the base material and other objects. The agent is a compound which has a group containing the silicon atom to which a hydrolyzable group is bonded (hereinafter referred to as hydrolyzable silicon group) and one or more other functional groups. The hydrolyzable silicon groups useful for the present invention include those represented by the above-described general formula (I) in which X is a hydrolyzable group. The concrete examples include those described earlier as the hydrolyzable groups, of which methoxy and ethoxy are more preferable viewed from hydrolysis speed. The compound preferably has 2 or more hydrolyzable groups, still more preferably 3 or more.

The functional groups useful for the present invention, other than the hydrolyzable silicon groups, include a primary, secondary and tertiary amino, epoxy, carboxyl, vinyl, isocyanate, isocyanurate, and halogen. Of these, primary, secondary or tertiary amino, mercapto, epoxy, isocyanate and isocyanurate are more preferable, and isocyanate and epoxy are still more preferable.

The hydrolyzable silicon group is preferably bonded to the other functional group via a hydrocarbon group, e.g., alkylene or arylene, although not limited thereto.

The silane coupling agent has a molecular weight of 500 or less, particularly preferably 300 or less.

The silane coupling agents useful for the present invention include amino-containing silanes, e.g., γ-aminopropyltrimethoxysilane, γ-aminopropyltriethoxysilane, γ-aminopropylmethyldimethoxysilane, γ-aminopropylmethyldiethoxysilane, γ-(2-aminoethyl) aminopropyltrimethoxysilane, γ-(2-aminoethyl)aminopropyltriethoxysilane, γ-(2-aminoethyl)aminopropyltriethoxysilane, γ-(2-aminoethyl)aminopropylmethyldiethoxysilane, γ-ureidopropyltrimethoxysilane, N-phenyl-γ-aminopropyltrimethoxysilane, N-benzyl-γ-aminopropyltrimethoxysilane and N-vinylbenzyl-γ-aminopropyltriethoxysilane; mercapto-containing silanes, e.g., γ-mercaptopropyltrimethoxysilane, γ-mercaptopropyltriethoxysilane, γ-mercaptopropylmethyldimethoxysilane and γ-mercaptopropylmethyldiethoxysilane; epoxy-containing silanes, e.g., γ-glycidoxypropyltrimethoxysilane, γ-glycidoxypropyltriethoxysilane, γ-glycidoxypropylmethyldimethoxysilane, γ-glycidoxypropylmethyldiethoxysilane, β-(3,4-epoxycyclohexyl) ethyltrimethoxysilane and β-(3,4-epoxycyclohexyl) ethyltriethoxysilane; carboxysilanes, e.g., β-carboxyethyltriethoxysilane, β-carboxyethylphenylbis(2-methoxyethoxy)silane and N-β-(carboxymethyl)aminoethyl-γ-aminopropyltrimethoxysilane; vinyl type unsaturated group-containing silanes; e.g., vinyltrimethoxysilane, vinyltriethoxysilane, γ-methacryloyloxypropylmethyldimethoxysilane and γ-acryloyloxypropylmethyltriethoxysilane; halogen-containing silanes, e.g., γ-chloropropyltrimethoxysilane; silane isocyanurates, e.g., tris(trimethoxysilyl)isocyanurate; and isocyanate-containing silanes, e.g., γ-isocyanate propyltrimethoxysilane, γ-isocyanate propyltriethoxysilane, γ-isocyanate propylmethyldiethoxysilane and γ-isocyanate propylmethyldimethoxysilane.

Moreover, the modifications of these compounds as their derivatives are also useful as the silane coupling agents. These compounds include amino-modified silyl polymers, silylated amino polymers, unsaturated aminosilane complexes, block isocyanate silanes, phenylamino-long chain-alkyl silanes, aminosilylated silicone and silylated polyesters.

The silane coupling agent is incorporated at 0.1 to 20 parts by weight per 100 parts by weight of the (A2) component, particularly preferably 0.5 to 10 parts. These silane coupling agents may be used either individually or in combination.

The rubber composition (15) of the present invention may be incorporated with a tackifier, other than a silane coupling agent.

The rubber composition (15) of the present invention is preferably incorporated with a curing catalyst which promotes the silanol condensation.

Widely varying known curing catalysts may be used for the present invention. The concrete examples of these catalysts useful for the present invention include titanate esters, e.g., those of tetrabutyl titanate and tetrapropyl titanate; tin carboxylates, e.g., dibutyl tin dilaurate, dibutyl tin maleate, dibutyl tin diacetate, tin octylate and tin naphthenate; product of the reaction between dibutyl tin oxide and phthalate ester; dibutyl tin diacetylacetonate; organoaluminum compounds, e.g., aluminum trisacetylacetonate, aluminum trisethylacetoacetate and diisopropoxy aluminum ethylacetoacetate; chelate compounds, e.g., zirconium tetraacetylacetonate and titanium tetraacetylacetonate; lead octylate; amine-based compounds, and salts of these compounds and carboxylates, e.g., butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methyl morpholine, 2-ethyl-4-methylimidazole and 1,8-diazabicyclo(5,4,0) undecene-7 (DBU); low-molecular-weight polyamide resins produced by the reactions between excessive quantities of polyamines and polybasic acids; products of the reactions between excessive quantities of polyamines and epoxy compounds; and known silanol condensing catalysts, e.g., silane coupling agents containing amino group (e.g., γ-aminopropyl trimethoxy silane and N-(β-aminoethyl)aminopropylmethyldimethoxy silane); and other known catalysts, acidic or basic. These compounds may be used either individually or in combination.

The curing catalyst, when used, is incorporated normally at around 0.1 to 20 parts by weight per 100 parts by weight of the (A2) component, preferably around 1 to 10 parts by weight. An excessively low content of the catalyst is undesirable, because it may result in slow curing speed of the rubber composition product. On the other hand, an excessively high content of the catalyst is also undesirable, because it may deteriorate the tensile-related characteristics of the cured product.

The rubber composition (15) of the present invention may be adequately incorporated with one or more additives. The additives useful for the present invention include adhesion improver, property adjuster, storage stability improver, plasticizer, aging inhibitor, ultraviolet ray absorber, metal deactivator, ozone-caused aging inhibitor, light stabilizer, amine-based radical chaining inhibitor, phosphorus-based peroxide decomposer, lubricant, pigment, and foaming agent.

The adhesion improvers useful for the present invention include commonly used adhesives and others, except a silane coupling agent.

The concrete examples of these adhesion improvers include phenolic resin, epoxy resin, coumarone/indene resin, rosin ester resin, terpene/phenol resin, α-methyl styrene/vinyl toluene copolymer, polyethylmethyl styrene, alkyl titanates, and aromatic polyisocyanate. The adhesion improver, when used, is incorporated preferably at about 1 to 50 parts by weight per 100 parts by weight of the (A2) component, more preferably about 5 to 30 parts by weight.

The storage stability improvers useful for the present invention include compounds with silicon to which a hydrolyzable group is bonded, and esters of ortho-organic acids.

The concrete examples of the storage stability improvers include methyltrimethoxy silane, methyltriethoxy silane, tetramethoxy silane, ethyltrimethoxy silane, dimethyldiethoxy silane, trimethylisobutoxy silane, trimethyl(n-butoxy) silane, n-butyltrimethoxy silane, and methyl orthoformate. The storage stability improver, when used, is incorporated preferably at about 0.5 to 20 parts by weight per 100 parts by weight of the (A2) component, more preferably about 1 to 10 parts.

The plasticizer useful for the present invention is also not limited, and any commonly used one may be used. Preferably, it should be compatible with each component for the rubber composition (15) of the present invention.

The concrete examples of these plasticizers include hydrocarbon-based compounds, e.g., polybutene, hydrogenated polybutene, ethylene/α-olefin oligomer, α-methyl styrene oligomer, biphenyl, triphenyl, triaryl dimethane, alkylene triphenyl, liquid polybutadiene, hydrogenated liquid polybutadiene, alkyl diphenyl, partially hydrogenated terphenyl, paraffin oil, naphthene oil and atactic polypropylene; parafin chlorides; phthalate esters, e.g., those of dibutyl phthalate, diheptyl phthalate, di(2-ethylhexyl)pthalate, butyl benzyl phthalate and butyl phthalyl butyl glycolate; non-aromatic, dibasic acid esters, e.g., those of dioctyl adipate and dioctyl cebacate; esters of polyalkylene glycol, e.g., those of diethylene glycol benzoate and triethylene glycol dibenzoate; and phosphate esters, e.g., those of tricresyl phosphate and tributyl phosphate. They may be used either individually or in combination.

Of these, hydrocarbon-based compounds free of unsaturated group, e.g., hydrogenated polybutene, hydrogenated liquid polybutadiene, paraffin oil, naphthene oil and atactic polypropylene, are more preferable for various reasons, e.g., high compatibility with each component for the rubber composition (15) of the present invention, limited effects on curing speed of the rubber composition, good resistance to weather of the cured product, and cheapness.

The plasticizer may be used in place of the solvent during the process of introducing a reactive silicon group into the ethylene/α-olefin/non-conjugated polyene random copolymer rubber, for the purposes of, e.g., adjusting reaction temperature and viscosity of the reaction system.

The plasticizer, when used, is incorporated preferably at about 10 to 500 parts by weight per 100 parts by weight of the (A2) component, more preferably about 20 to 300 parts by weight.

The aging inhibitors useful for the present invention include commonly used known ones, e.g., sulfur-based ones, radical inhibitors and ultraviolet ray absorbers.

The sulfur-based aging inhibitors useful for the present invention include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, mercaptols, monothio acids, polythio acids, thioamides, and sulfoxides.

The concrete examples of the sulfur-based aging inhibitors include mercaptans, e.g., 2-mercaptobenzothiazole; salts of mercaptans, e.g., zinc salt of 2-mercaptobenzothiazole; sulfides, e.g., 4,4'-thio-bis(3-methyl-6-t-butyl phenol), 4,4'-thio-bis(2-methyl-6-t-butyl phenol), 2,2'-thio-bis(4-methyl-6-t-butyl phenol), bis(3-methyl-4-hydroxy-5-t-butylbenzyl)sulfide, terephthaloyl di(2,6-dimethyl-4-t-butyl-3-hydroxybenzyl)sulfide, phenothiazine, 2,2'-thio-bis (4-octyl phenol)nickel, dilauryl thiodipropionate, distearyl thiodipropionate, dimyristyl thiodipropionate, ditridecyl thiodipropionate, distearylβ,β'-thiodibutyrate, lauryl-stearyl thiodipropionate and 2,2-thio[diethyl-bis-3(3,5-di-t-butyl-4-hydroxy phenol)propionate]; polysulfides, e.g., 2-benzothiazole disulfide; dithiocarboxylates, e.g., zinc dibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethyldithiocarbamate; thioureas, e.g., 1-butyl-3-oxy-diethylene-2-thiourea, di-o-tolyl-thiourea and ethylene thiourea; and thiophosphates, e.g., trilauryltrithiophosphate.

The above-described sulfur-based aging inhibitor prevents decomposition/aging of the main chain under heating much more efficiently than the other types for the rubber composition of the present invention, controlling the problems, e.g., residual surface tackiness.

The radical inhibitors useful for the present invention include phenol-based ones, e.g., 2,2'-methylene-bis(4-methyl-6-t-butyl phenol) and tetrakis[methylene-3-(3,5-di-t-butyl-4-hydroxyphenyl)propio nate]methane; and amine-based ones, e.g., phenyl-β-naphthylamine, α-naphthylamine, N,N'-sec-butyl-p-phenylenediamine, phenothiazine and N,N'-diphenyl-p-phenylenediamine.

The ultraviolet ray absorbers useful for the present invention include 2-(2'-hydroxy-3',5'-di-t-butylphenyl)benzotriazole and bis(2,2,6,6-tetramethyl-4-piperidine)cebacate.

The aging inhibitor, when used, is incorporated at about 0.1 to 20 parts by weight per 100 parts by weight of the (A2) component, more preferably about 1 to 10 parts by weight.

The effect of combining calcium carbonate as the (L1) component and talc as the (L2) component for the present invention is also observed, even when it is further incorporated with the various additives described above. More concretely, the curable rubber composition (15) of the present invention, when used as elastomer sealants for construction works, or sealants for laminated glass, SSG construction method, or rust-preventive or water-proof of edges (cut sections) of wired or laminated glass, will have still improved workability (spinning property) and mechanical characteristics (hardness).

The curable composition (15) of the present invention can be prepared by uniformly kneading the components by a kneader, e.g., intermix mixer, planetary mixer, Banbury mixer, kneader or 2-roll unit.

The curable composition (15) of the present invention is cured at room temperature to 200° C. for several minutes to several days, because it can be cured quickly. It is particularly preferable to crosslink the composition with moisture in air at room temperature.

Rubber Composition (15) and its Uses

The rubber composition (15) of the present invention contains the curable composition with the ethylene/α-olefin/non-conjugated polyene random copolymer rubber containing a reactive silicon group as the component (A2), as is the case with the rubber composition (11). More concretely, the rubber composition (15) of the present invention contains the organic polymer (Z1), calcium carbonate (L1) and talc (L2), wherein the (Z1) component contains a hydrolyzable silyl group represented by the above-described general formula (1) and essentially no unsaturated double bond in the main chain. It can be suitably used for electric/electronic device members, transportation machines, and civil engineering/construction, medical and leisure areas, as described earlier.

The curable rubber composition (15) of the present invention can be used as sealants, potting agents, coating materials or adhesives for electric/electronic device members, transportation machines, and civil engineering/construction, and leisure areas.

Curable Composition (16)

The curable composition (16) of the present invention contains (a) the silyl-containing ethylene/α-olefin/non-conjugated polyene random copolymer rubber (A1), (b) a nickel-containing light stabilizer (S) and (c) a silane coupling agent (T).

The curable composition (16) of the present invention contains the silyl-containing ethylene/α-olefin/non-conjugated polyene random copolymer rubber (A1) preferably at 10% or more, more preferably at 20% or more, still more preferably at 30% or more.

The curable composition (16) of the present invention exhibits excellent characteristics with respect to curing speed and resistance to weather, which is mainly derived from the ethylene/α-olefin/non-conjugated polyene random copolymer rubber (A1) containing the hydrolyzable silyl group.

Nickel-containing Light Stabilizer (S)

The present invention uses a light stabilizer containing atomic nickel (S) as the light stabilizer. The commercial nickel-based light stabilizers can be generally used for the present invention as the stabilizer (S).

The concrete examples of the light stabilizers include nickel dithiocarbamates, e.g., nickel dimethyldithiocarbamate, nickel diethyldithiocarbamate and nickel dibutyldithiocarbamate; nickel complexes, e.g., [2,2'-thiobis(4-t-octylphenolate)]-n-butylamine nickel, [2,2'-thiobis(4-t-octylphenolate)]-2-ethylhexylamine nickel and [2,2'-thiobis(4-t-octylphenolate)]-triethanolamine nickel; and other nickel compounds, e.g., nickel bis(octylphenyl)sulfide and nickel isopropylxanthogenate. These light stabilizers may be used either individually or in combination.

The component (S) is incorporated preferably at around 0.1 to 20 parts by weight per 100 parts by weight of the silyl-containing ethylene/α-olefin/non-conjugated polyene random copolymer rubber (A1) more preferably 1 to 10 parts by weight.

At a content of the component (S) below the above range, the curable composition of the present invention may have deteriorated weather-resistant adhesion to glass and other objects. The content exceeding the above range is disadvantageous costwise. It is considered that the nickel-containing light stabilizer (S) brings about the effect of preventing light-caused deterioration of the adhesion-improving effect by the silane coupling agent used as the (T) component. The nickel-containing light stabilizer (S) is considered to exhibit the above effect to a higher extent than the other stabilizer.

Silane Coupling Agent (T)

The silane coupling agent as the (T) component for the present invention improves adhesion strength of the cured silyl-containing ethylene/α-olefin/non-conjugated polyene random copolymer rubber (A1) to the base material and other objects. The agent is a compound which has a group containing the silicon atom to which a hydrolyzable group is bonded (hereinafter referred to as hydrolyzable silicon group) and one or more other functional groups. The concrete examples include those described earlier as the hydrolyzable groups, of which methoxy and ethoxy are more preferable viewed from hydrolysis speed. The compound preferably has 2 or more hydrolyzable groups, still more preferably 3 or more.

The functional groups useful for the present invention, other than the hydrolyzable silicon groups, include primary, secondary and tertiary amino, mercapto, epoxy, carboxyl, vinyl, isocyanate, isocyanurate, and halogen. Of these, primary, secondary or tertiary amino, epoxy, isocyanate and isocyanurate are more preferable, and isocyanate and epoxy are still more preferable.

The concrete examples of the silane coupling agents useful for the present invention include amino-containing silanes, e.g., γ-aminopropyltrimethoxysilane, γ-aminopropyltriethoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethosysilane, γ-(2-aminoethyl)aminopropyltriethoxysilane, γ-(2-aminoethyl) aminopropylmethyldiethoxysilane, γ-ureidopropyltrimethoxysilane, N-phenyl-γ-aminopropyltrimethoxysilane, N-benzyl-γ-aminopropyltrimethoxysilane and N-vinylbenzyl-γ-aminopropyltriethoxysilane; mercapto-containing silanes, e.g., γ-mercaptopropyltrimethoxysilane, γ-mercaptopropyltriethoxysilane, γ-mercaptopropylmethyldimethoxysilane and γ-mercaptopropylmethyldiethoxysilane; epoxy-containing silanes, e.g., γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane and β-(3,4-epoxycyclohexyl) ethyltriethoxysilane; carboxysilanes, e.g., β-carboxyethyltriethoxysilane, β-carboxyethylphenylbis(2-methoxyethoxy)silane and N-β-(carboxymethyl)aminoethyl-γ-aminopropyltrimethoxysilane; vinyl type unsaturated group-containing silanes; e.g., vinyltrimethoxysilane, vinyltriethoxysilane, γ-methacryloyloxypropylmethyldimethoxysilane and γ-acryloyloxypropylmethyltriethoxysilane; halogen-containing silanes, e.g., γ-chloropropyltrimethoxysilane; silane isocyanurates, e.g., tris(trimethoxysilyl)isocyanurate; and isocyanate-containing silanes, e.g., γ-isocyanate propyltrimethoxysilane, γ-isocyanate propyltriethoxysilane, γ-isocyanate propylmethyldiethoxysilane and γ-isocyanate propylmethyldimethoxysilane. Moreover, the modifications of these compounds as their derivatives are also useful as the silane coupling agents (T). These compounds include amino-modified silyl polymers, silylated amino polymers, unsaturated aminosilane complexes, block isocyanate silanes, phenylamino-long chain-alkyl silanes, aminosilylated silicone and silylated polyesters.

The silane coupling agent (T) is incorporated at 0.01 to 20 parts by weight per 100 parts by weight of the silyl-containing ethylene/α-olefin/non-conjugated polyene random copolymer rubber (A1), particularly preferably 0.1 to 10 parts by weight. These silane coupling agents (T) maybe used either individually or in combination.

The rubber composition (16) of the present invention may be incorporated with a tackifier, other than a silane coupling agent. The examples of the tackifiers, other than a silane coupling agent, include compounds having an epoxy or isocyanate group in the molecule, including isocyanate polymers.

Other Components

The composition (16) of the present invention may be incorporated, as required, with one or more additives. The additives useful for the present invention include curing catalyst which promotes the silanol condensation, storage stability improver which prevents curing of the composition (16) of the present invention while it is being stored, plasticizer, filler, aging inhibitor, ozone-caused aging inhibitor, phosphorus-based peroxide decomposer, lubricant and foaming agent.

Known curing catalysts may be used as the silanol condensing catalyst for the present invention. The concrete examples of these catalysts useful for the present invention include titanate esters, e.g., those of tetrabutyl titanate and tetrapropyl titanate; tin carboxylates, e.g., dibutyl tin dilaurate, dibutyl tin maleate, dibutyl tin diacetate, tin octylate and tin naphthenate; product of the reaction between dibutyl tin oxide and phthalate ester; dibutyl tin diacetylacetonate; organoaluminum compounds, e.g., aluminum trisacetylacetonate, aluminum trisethylacetoacetate and diisopropoxy aluminum ethylacetoacetate; chelate compounds, e.g., zirconium tetraacetylacetonate and titanium tetraacetylacetonate; lead octylate; amine-based compounds, and salts of these compounds and carboxylates, e.g., butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris (dimethylaminomethyl)phenol, morpholine, N-methyl morpholine, 2-ethyl-4-methylimidazole and 1,8-diazabicyclo(5,4,0) undecene-7 (DBU); low-molecular-weight polyamide resins produced by the reactions between excessive quantities of polyamines and polybasic acids; products of the reactions between excessive quantities of polyamines and epoxy compounds; silane coupling agents containing amino group, e.g., γ-aminopropyl trimethoxy silane and N-(β-aminoethyl)aminopropyl methyldimethoxy silane; and other known catalysts, acidic or basic. These compounds may be used either individually or in combination.

The curing catalyst is incorporated at around 0.1 to 20 parts by weight per 100 parts by weight of the silyl-containing ethylene/α-olefin/non-conjugated polyene random copolymer rubber (A1), preferably around 1 to 10 parts by weight. The catalyst content below the above range may cause insufficient curing speed and insufficient extent of the curing reaction. The content beyond the above range is also undesirable, because it may cause local heating or foaming occurring during the curing process to make it difficult to produce the cured product of good properties, and also may deteriorate pot life to an unacceptable level and workability of the composition.

The storage stability improvers useful for the present invention include compounds with silicon to which a hydrolyzable group is bonded, and esters of ortho-organic acids.

The concrete examples of the storage stability improvers include methyltrimethoxy silane, methyltriethoxy silane, tetramethoxy silane, ethyltrimethoxy silane, dimethyldiethoxy silane, trimethylisobutoxysilane, trimethyl(n-butoxy)silane, n-butyltrimethoxy silane, and methyl orthoformate.

The plasticizers useful for the present invention include low-molecular-weight ones, e.g., dioctylphthalate, high-molecular-weight ones, and high-viscosity ones.

The concrete examples of these plasticizers include phthalate esters, e.g., those of dibutyl phthalate, diheptyl phthalate, di(2-ethylhexyl)phthalate, butyl benzyl phthalate and butyl phthalyl butyl glycolate; non-aromatic, dibasic acid esters, e.g., those of dioctyl adipate and dioctyl cebacate; esters of polyalkylene glycol, e.g., those of diethylene glycol dibenzoate and triethylene glycol dibenzoate; phosphate esters, e.g., those of tricresyl phosphate and tributyl phosphate; paraffin chlorides; and hydrocarbon-based oils, e.g., alkyl diphenyl, polybutene, hydrogenated polybutene, ethylene/α-olefin oligomer, α-methyl styrene oligomer, biphenyl, triphenyl, triaryl dimethane, alkylene triphenyl, liquid polybutadiene, hydrogenated liquid polybutadiene, paraffin oil, naphthene oil, atactic polypropylene and partially hydrogenated ter-phenyl. They may be used either individually or in combination. The plasticizer may be incorporated while the polymer is being produced.

Of these, hydrocarbon-based compounds free of unsaturated group, e.g., hydrogenated polybutene, hydrogenated liquid polybutadiene, paraffin oil, naphthene oil and atactic polypropylene, are more preferable for various reasons, e.g., high compatibility with each component for the composition (16) of the present invention, limited effects on curing speed of the rubber composition, good resistance to weather of the cured product, and cheapness.

The plasticizer may be used in place of the solvent during the process of introducing a reactive silicon group into the saturated hydrocarbon-based polymer, for the purposes of, e.g., adjusting reaction temperature and viscosity of the reaction system.

The plasticizer, when used, is incorporated preferably at 1 to 400 parts by weight per 100 parts by weight of the silyl-containing ethylene/α-olefin/non-conjugated polyene random copolymer rubber (A1), more preferably 1 to 150 parts, still more preferably 10 to 120 and particularly preferably 20 to 100 parts by weight.

The concrete examples of the fillers include wood powder, pulp, cotton chips, asbestos, glass fibers, carbon fibers, mica, walnut shell powder, rice hull powder, graphite, diatomaceous earth, white clay, fumed silica, settling silica, silicic anhydride, carbon black, calcium carbonate, clay, kaolin, talc, titanium oxide, magnesium carbonate, quartz powder, glass beads, fine aluminum powder, flint powder, and zinc powder. Of these, more preferable ones are thixotropic fillers, e.g., settling silica, fumed silica and carbon black; and calcium carbonate, titanium oxide and talc. They may be used either individually or in combination.

The aging inhibitors useful for the present invention include commonly used known ones, e.g., sulfur-based ones, radical inhibitors and ultraviolet ray absorbers.

The sulfur-based aging inhibitors useful for the present invention include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, mercaptols, monothio acids, polythio acids, thioamides, and sulfoxides.

The concrete examples of the sulfur-based aging inhibitors include mercaptans, e.g., 2-mercaptobenzothiazole; salts of mercaptans, e.g., zinc salt of 2-mercaptobenzothiazole; sulfides, e.g., 4,4'-thio-bis(3-methyl-6-t-butyl phenol), 4,4'-thio-bis(2-methyl-6-t-butyl phenol), 2,2'-thio-bis(4-methyl-6-t-butyl phenol), bis(3-methyl-4-hydroxy-5-t-butyl-benzyl)sulfide, terephthaloyl di(2,6-dimethyl-4-t-butyl-3-hydroxybenzyl)sulfide, phenothiazine, 2,2'-thio-bis(4-octyl phenol)nickel, dilauryl thiodipropionate, distearyl thiodipropionate, dimyristyl thiodipropionate, ditridecyl thiodipropionate, distearyl β,β'-thiodibutyrate, lauryl-stearyl thiodipropionate and 2,2-thio[diethyl-bis-3-(3,5-di-t-butyl-4-hydroxy phenol)propionate]; polysulfides, e.g., 2-benzothiazole disulfide; dithiocarboxylates, e.g., zinc dibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethyldithiocarbamate; thioureas, e.g., 1-butyl-3-oxy-diethylene-2-thiourea, di-o-tolyl-thiourea and ethylene thiourea; and thiophosphates, e.g., trilauryltrithiophosphate.

The above-described sulfur-based aging inhibitor prevents decomposition/aging of the main chain under heating much more efficiently than the other types for the composition (16) of the present invention, controlling the problems, e.g., residual surface tackiness.

The radical inhibitors useful for the present invention include phenol-based ones, e.g., 2,2-methylene-bis(4-methyl-6-t-butyl phenol) and tetrakis[methylene-3-(3,5-di-t-butyl-4-hydroxyphenyl)propio nate]methane; and amine-based ones, e.g., phenyl-β-naphthylamine, α-naphthylamine, N,N'-sec-butyl-p-phenylenediamine, phenothiazine and N,N'-diphenyl-p-phenylenediamine.

The ultraviolet ray absorbers useful for the present invention include 2-(2'-hydroxy-3',5'-di-t-butylphenyl)benzotriazole and bis(2,2,6,6-tetramethyl-4-piperidine)cebacate.

Curable Composition (16) and its Uses

The curable composition (16) of the present invention contains the curable composition with the silyl-containing ethylene/α-olefin/non-conjugated polyene random copolymer rubber as the component (A1), as described in detail earlier. More concretely, it contains
(a) the organic polymer (Z) containing the hydrolyzable silyl group represented by the general formula [III] and essentially no unsaturated double bond in the main chain,
(b) a nickel-containing light stabilizer (S), and
(c) a silane coupling agent (T).

It can be suitably used for electric/electronic device members, transportation machines, and civil engineering/construction, medical and leisure areas, as described earlier.

The curable composition (16) of the present invention can be used as sealants, potting agents, coating materials or adhesives for electric/electronic device members, transportation machines, and civil engineering/construction, and leisure areas.

In other words, the present invention provides sealants, potting agents, coating materials and adhesives, composed of the curable composition containing the (a) organic polymer (Z), (b) nickel-containing light stabilizer (S) and (C) silane coupling agent (T).

Curable Rubber Composition (17)

The curable rubber composition (17) of the present invention contains the silyl-containing ethylene/α-olefin/non-conjugated polyene random copolymer rubber (A1), and a sulfur-based aging inhibitor (U).

A silanol condensing catalyst is used, as required, to cure the (A1) component as the major ingredient of the curable rubber composition (17) of the present invention.

The concrete examples of the condensing catalysts useful for the present invention include titanate esters, e.g., those of tetrabutyl titanate and tetrapropyl titanate; tin carboxylates, e.g., dibutyl tin dilaurate, dibutyl tin maleate, dibutyl tin diacetate, tin octylate and tin naphthenate; product of the reaction between dibutyl tin oxide and phthalate ester; dibutyl tin diacetylacetonate; organoaluminum compounds, e.g., aluminum trisacetylacetonate, aluminum trisethylacetoacetate and diisopropoxy aluminum ethylacetoacetate; chelate compounds, e.g., zirconium tetraacetylacetonate and titanium tetraacetylacetonate; lead octylate; amine-based compounds, and salts of these compounds and carboxylates, e.g., butylamine, monoethanolamine, triethylenetetramine, guanidine, 2-ethyl-4-methylimidazole and 1,3-diazabicyclo (5,4,6)endecene-7 (DBU); and other known silanol condensing catalysts, acidic or basic.

Sulfur-based Aging Inhibitor (U)

The sulfur-based aging inhibitors useful for the present invention as the (U) component include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, mercaptols, monothio acids, polythio acids, thioamides, and sulfoxides.

The concrete examples of the sulfur-based aging inhibitors as the (U) component include
mercaptans, e.g., 2-mercaptobenzothiazole;
salts of mercaptans, e.g., zinc salt of 2-mercaptobenzothiazole;
sulfides, e.g., 4,4'-thio-bis (3-methyl-6-t-butyl phenol), 4,4'-thio-bis(2-methyl-6-t-butyl phenol), 2,2'-thio-bis(4-methyl-6-t-butyl phenol), bis(3-methyl-4-hydroxy-5-t-butyl-benzyl)sulfide, terephthaloyl di(2,6-dimethyl-4-t-butyl-3-hydroxybenzyl)sulfide, phenothiazine, 2,2'-thio-bis(4-octyl phenol)nickel, dilauryl thiodipropionate, distearyl thiodipropionate, dimyristyl thiodipropionate, ditridecyl thiodipropionate, distearyl β,β'-thiodibutyrate, lauryl-stearyl thiodipropionate and 2,2-thio[diethyl-bis-3-(3,5-di-t-butyl-4-hydroxy phenol)propionate];
polysulfides, e.g., 2-benzothiazole disulfide;
dithiocarboxylates, e.g., zinc dibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethyldithiocarbamate;
thioureas, e.g., 1-butyl-3-oxy-diethylene-2-thiourea, di-o-tolyl-thiourea and ethylene thiourea; and
thiophosphates, e.g., trilauryltrithiophosphate. Other compounds may be used for the present invention, so long as they are sulfur-based ones having an aging inhibiting function.

The above-described sulfur-based aging inhibitor (U) prevents decomposition/aging of the main chain under heating much more efficiently than the other types for the composition (17) of the present invention, controlling the problems, e.g., residual surface tackiness.

The above-described sulfur-based aging inhibitor (U) is incorporated normally at 0.01 to 10 parts by weight per 100 parts by weight of the silyl-containing ethylene/α-olefin/non-conjugated polyene random copolymer rubber (A1), preferably 0.1 to 5 parts by weight. It shows a sufficient effect of improving resistance of the composition to heat without causing any problem, e.g., coloration.

One or more commonly used aging inhibitors may be used in combination of the sulfur-based aging inhibitor (U). These aging inhibitors include phenol-based radical inhibitor, e.g., 2,2'-methylene-bis(4-methyl-6-t-butyl phenol) and tetrakis [methylene-3-(3,5-di-t-butyl-4-hydroxyphenyl)propio nate] methane; ultraviolet ray absorber, e.g., 2-(2'-hydroxy-3',5'-di-t-butylphenyl)benzotriazole and bis(2,2,6, 6-tetramethyl-4-piperidine)cebacate; metal deactivator, ozone-caused aging inhibitor, light stabilizer, amine-based radical chaining inhibitor, phosphorus-based peroxide decomposer; citric acid; and phosphoric acid.

Moreover, various silane compounds may be used as the property adjuster for the present invention, to control strength, elongation and other properties of the cured product over a wide range. The concrete examples of these compounds include the following silicon compounds having one or more silanol group or other hydrolyzable groups, although not limited thereto: $(CH_3)_3SiOH$, $(CH_3CH_2)_3SiOH$, $(CH_3CH_2CH_2)_3SiOH$, $(C_6H_5—)_3SiOH$, $(C_6H_5—)_2(CH_3—)SiOH$, $(CH_3—)_2(C_6H_5—)SiOH$,

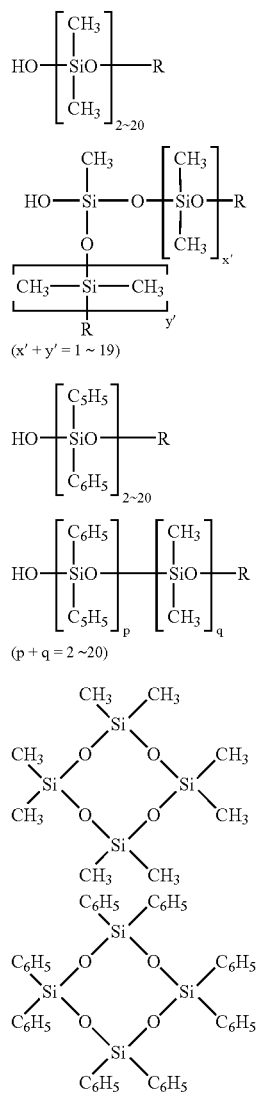

$(CH_3)_2Si(OCH_3)_2$, $(CH_3CH_2)_2Si(OCH_3)_2$, $(CH_3)_2Si(OCH_2CH_3)_2$, $(CH_3CH_2)_2Si(OCH_2CH_3)_2$, $(C_6H_5)_2Si(OCH_2CH_3)_2$, $(C_6H_5)_2Si(OCH_3)_2$, $(C_6H_5)_2Si(OH)_2$, $(CH_3—C_6H_5)_2Si(OCH_3)_2$, $(CH_3—C_6H_5)_2Si(OH)_2$, $(CH_3)_2Si(OCH_2CH_2OCH_3)_2$, $(CH_3CH_2)_2Si(OCH_2CH_2OCH_3)_2$, $(CH_3)(CH_3CH_2)Si(OCH_3)_2$, $(C_6H_5)(CH_3)Si(OH)_2$, $(C_6H_5)(CH_3CH_2)Si(OH)_2$, $(C_6H_5)(CH_3)Si(OCH_3)_2$, $(C_6H_5)(CH_3CH_2)Si(OH)_2$,

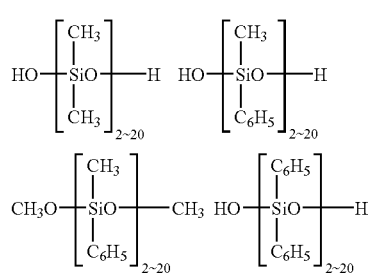

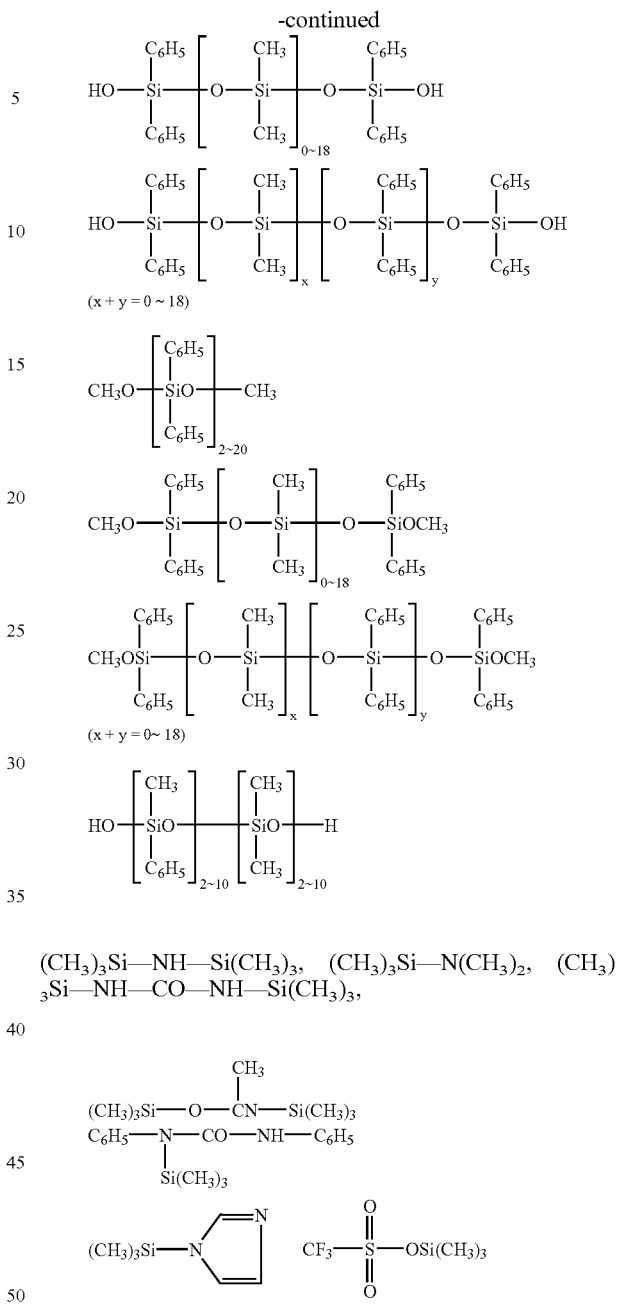

$(CH_3)_3Si—NH—Si(CH_3)_3$, $(CH_3)_3Si—N(CH_3)_2$, $(CH_3)_3Si—NH—CO—NH—Si(CH_3)_3$,

In the above formulae, R is hydrogen atom, or a hydrocarbon group of 1 to 20 carbon atoms.

The methods for incorporating the silicon compound fall into 3 general categories.

The first method merely adds the silicon compound to the silyl-containing ethylene/α-olefin/non-conjugated polyene random copolymer rubber (A1), wherein it is uniformly dispersed and dissolved by carefully setting the conditions, e.g., temperature and stirring conditions, as required in consideration of the silicon compound properties. In this case, the composition may not be necessarily transparent completely, and can adequately achieve the objectives even when it is not transparent, so long as the composition is sufficiently dispersed therein. A dispersibility improver, e.g., surfactant, may be used, as required.

The second method mixes a given quantity of the silicon compound with the final product, when it is used. For example, when the composition is used as a two-liquid type sealant, the silicon compound may be mixed as the third component with the base and the curing agent for the composition.

The third method reacts the silicon compound beforehand with the silyl-containing ethylene/α-olefin/non-conjugated polyene random copolymer rubber (A1) in the presence of a silanol condensing catalyst, as required. When the silicon compound is reacted with moisture into a compound having a silanol group in the molecule, a required quantity of water is added to the reaction system, and afterwards evaporated off under a vacuum and heating, to achieved the object.

The curable rubber composition (17) of the present invention, comprising the silyl-containing ethylene/α-olefin/non-conjugated polyene random copolymer rubber (A1) and a sulfur-based aging inhibitor (U) as the major ingredients, may be incorporated, as required, with one or more additives, to begin with the various silane compounds described above as the property adjusters. The other additives useful for the present invention include various types of filler, plasticizer, silanol condensing catalyst which promotes curing of the silyl-containing ethylene/α-olefin/non-conjugated polyene random copolymer rubber (A1), aging inhibitor other than the sulfur-based aging inhibitor (U) ultraviolet ray absorber, lubricant, pigment, foaming agent, tackifier, and water.

The concrete examples of the fillers include wood powder, pulp, cotton chips, asbestos, glass fibers, carbon fibers, mica, walnut shell powder, rice hull powder, graphite, diatomaceous earth, white clay, fumed silica, settling silica, silicic anhydride, carbon black, calcium carbonate, clay, talc, titanium oxide, magnesium carbonate, quartz, fine aluminum powder, flint powder, and zinc powder.

They may be used either individually or in combination.

The concrete examples of these plasticizers include:

hydrocarbon-based compounds, e.g., polybutene, hydrogenated polybutene, ethylene/α-olefin cooligomer, α-methyl styrene oligomer, biphenyl, triphenyl, triaryl dimethane, alkylene triphenyl, liquid polybutadiene, hydrogenated liquid polybutadiene, alkyl diphenyl, process oil, paraffin oil, naphthene oil and partially hydrogenated ter-phenyl;

paraffin chlorides;

phthalate esters, e.g., those of dibutyl phthalate, diheptyl phthalate, di(2-ethylhexyl)phthalate, butyl benzyl phthalate and butyl phthalyl butyl glycolate;

non-aromatic, dibasic acid esters, e.g., those of dioctyl adipate and dioctyl cebacate;

esters of polyalkylene glycol, e.g., those of diethylene glycol benzoate and triethylene glycol dibenzoate; and phosphate esters, e.g., those of tricresyl phosphate and tributyl phosphate. Of these, saturated hydrocarbon-based compounds are particularly more preferable. They may be used either individually or in combination. The plasticizer may be used in place of the solvent during the process of introducing a hydrolyzable silyl group into the ethylene/α-olefin/non-conjugated polyene random copolymer rubber ($A_0$), for the purposes of, e.g., adjusting reaction temperature and viscosity of the reaction system.

Moreover, the curable rubber composition (17) of the present invention may be incorporated with various tackifiers to further improve its adhesion.

The concrete examples of the tackifiers useful for the present invention include silane coupling agents, e.g., epoxy resin, phenolic resin, aminosilane and epoxysilane compounds; alkyl titanates; and aromatic polyisocyanates. These may be used either individually or in combination, to improve adhesion of the composition to various types of objects.

The curable rubber composition (17) of the present invention can be suitably used for various materials, e.g., adhesives, tackifiers, paints, sealant compositions, waterproof materials, spray materials, shaping materials and casting rubber materials.

Curable Rubber Composition (17) and its Uses

The curable rubber composition (17) of the present invention contains the curable composition with the silyl-containing ethylene/α-olefin/non-conjugated polyene random copolymer rubber as the component (A1), as described earlier. More concretely, it contains the organic polymer (Z) and a sulfur-based aging inhibitor (U). It can be suitably used for electric/electronic device members, transportation machines, and civil engineering/construction, medical and leisure areas, as described earlier.

The curable rubber composition (17) of the present invention can be used as sealants, potting agents, coating materials or adhesives for electric/electronic device members, transportation machines, and civil engineering/construction, and leisure areas.

Curable Composition (18)

The curable composition (18) of the present invention contains the silyl-containing ethylene/α-olefin/non-conjugated polyene random copolymer rubber (A1), and a compound having, in the molecule, an unsaturated group capable of triggering polymerization by reacting with oxygen in air and/or a photopolymerizable material (V).

The curable composition (18) of the present invention contains the silyl-containing ethylene/α-olefin/non-conjugated polyene random copolymer rubber (A1) preferably at 10% or more, more preferably at 20% or more, still more preferably at 30% or more.

The curable composition (18) of the present invention exhibits excellent characteristics with respect to curing speed and resistance to weather, which is mainly derived from the ethylene/α-olefin/non-conjugated polyene random copolymer rubber (A1) containing the hydrolyzable silyl group.

Oxidative-polymerizable Material and/or Photopolymerizavle Material (V)

The curable composition (18) of the present invention is incorporated with the (V) component of a compound having, in the molecule, an unsaturated group capable of triggering polymerization by reacting with oxygen in air and/or a photopolymerizable material, in order to enhance its weather-resistant adhesion. They can exhibit their functions when used individually, and may be used in combination.

Of the above-described materials for the (V) component, the compound having, in the molecule, an unsaturated group capable of triggering polymerization by reacting with oxygen in air means, in short, an oxidative-polymerizable material.

The concrete examples of the oxidative-polymerizable materials include ester compounds of unsaturated higher fatty acids and alcohols; diene-based polymers and copolymers, e.g., those of 1,2-polybutadienes, 1,4-polybutadienes and dienes of 5 to 8 carbon atoms; and various modifications of these polymers and copolymers, e.g., those modified with maleic acid or boiled oil. Reactivity of oxidative polymerization depends on, e.g., reaction temperature, humidity, and presence or absence of light and additive.

It is therefore considered that, when a compound having, in the molecule, an unsaturated group capable of triggering polymerization by reacting with oxygen in air is added as the (V) component, it works as the weather-resistant adhesion improver more strongly when irradiated with light, owing to its ability of forming a still harder coating film on the adhesion surface with an object, e.g., glass. However, it shows no deterioration of the initial adhesion strength.

When an ester compound with an ester of an unsaturated higher fatty acid and alcohol as the major ingredient is incorporated as the (V) component, the curable composition (18) will have markedly improved weather-resistant adhesion to various types of glass, e.g., heat ray reflective glass. The unsaturated higher fatty acid component for the ester of an unsaturated higher fatty acid and alcohol preferably has at least 10 carbon atoms in the molecule, and may have each at least one unsaturated group and carboxyl group.

The concrete examples of the ester compounds of unsaturated higher fatty acids include those produced by the condensation of unsaturated higher fatty acids, e.g., oleic, linolic, linolenic, eleostearic, licanic, ricinolic or arachidonic acid, with alcohol selected from the group consisting of monovalent alcohols (e.g., methanol and ethanol), divalent alcohols (e.g., ethylene glycol and propylene glycol), trivalent alcohols (e.g., trimethylol propane and glycerin), tetravalent alcohols (e.g., pentaerythritol), hexavalent alcohols (e.g., sorbit), and organosilicon compounds with hydroxyl group bonded via an organic group bonded to silicon atom.

It is known that a saturated fatty acid group has much lower reactivity for the oxidative polymerization than an unsaturated fatty acid group, and that unsaturated fatty acid groups increase reactivity in proportion to number of the double bonds they contain and degree of conjugate. Therefore, of the ester compounds of unsaturated higher fatty acids, the ones having an iodine value of 100 or more are more preferable for their high reactivity.

The ester compounds of unsaturated higher fatty acids and having an iodine value of 100 or more may be produced by condensation of an unsaturated higher fatty acid and alcohol, as described above. However, use of a drying oil is more practical costwise, because it is readily available. These drying oils include those comprising, as the major ingredient, a triglycerin ester, i.e., ester of an unsaturated higher fatty acid and glycerin, e.g., flaxseed oil, china wood oil, soybean oil, hemp-seed oil, isano oil, urushi kernel oil, Perilla oil, oiticica oil, kaya oil, walnut oil, poppy oil, cherry seed oil, pomegranate seed oil, safflower oil, tobacco seed oil, touhaze kernel oil, rubber seed oil, sunflower seed oil, grape kernel oil, balsam seed oil and honewort seed oil.

These drying oils may contain ester compounds of unsaturated higher fatty acids having 10 or more carbon atoms, ester compounds of unsaturated higher fatty acids having less than 10 carbon atoms, alcohols, unsaturated fatty acids, and saturated fatty acids. Ester compounds of unsaturated higher fatty acids having 10 or more carbon atoms preferably account for at least 80% by weight, most preferably 100% by weight of the drying oil.

As described earlier, reactivity for the oxidative polymerization increases in proportion to degree of conjugate of the unsaturated fatty acid group. Therefore, drying oils with a triglycerin ester of conjugate-based unsaturated higher fatty acids, e.g., eleostearic, licanic, punicic or canulupinic acid, as the major ingredient have high reactivity for the oxidative polymerization to improve weather-resistant adhesion of the composition more efficiently, and hence most desirable. The concrete examples of those drying oils with a triglycerin ester of conjugate-based unsaturated higher fatty acids as the major ingredient include china wood, oiticica, pomegranate seed and balsam seed oils.

These compounds with an unsaturated group in the molecule capable of triggering the polymerization by reacting with oxygen in air may be used either individually or in combination.

Of the above-described materials for the (V) component, the photopolymerizable material means, in short, a compound having an unsaturated group whose double bond is activated when irradiated with light to trigger the polymerization. Various materials are known to fall into this category, including organic monomers, oligomers, resins and compositions containing one or more of them. Any relevant commercial material may be used for the present invention. The photopolymerizable material, when used as the (V) component, works as the weather-resistant adhesion improver, because it can form a hard coating film on the adhesion surface with an object, e.g., glass, when irradiated with light. However, it shows no deterioration of the initial adhesion strength.

The photopolymerizable unsaturated groups contained in the photosensitive resins for the photopolymerization systems can be represented by vinyl, allyl, vinyl ether, vinyl thioether, vinyl amino, acetylenic unsaturated, acryloyl, methacryloyl, styryl and cinnamoyl group. Of these, acryloyl and methacryloyl are more preferable, because of their high polymerization initiation efficiency.

The examples of the photosensitive resins containing acryloyl or methacryloyl group for the photopolymerization systems include acrylamide derivatives, methacrylamide derivatives and (meth)acrylates, of which (meth)acrylates are more preferable, because of their availability for various types.

(Meth)acrylates in this specification is a generic term including both acrylates and methacrylates.

When a mono-functional photopolymerizable material with a (meth)acrylate as the major ingredient has one photosensitive group (unsaturated group), only a linear polymer is formed by the photopolymerization. In a multi-functional (meth)acrylate having two or more photosensitive (unsaturated) groups, on the other hand, photopolymerization and photocrosslinking take place simultaneously, to form polymer molecules of network structures. Therefore, such a (meth)acrylate is more preferable, because a harder coating film can be formed on the adhesion interface, to enhance the effect of improving weather-resistant adhesion.

The concrete examples of the multi-functional (meth) acrylates include propylene, butylene or ethylene glycol di(meth)acrylates having 2 functional groups; trimethylolpropane tri(meth)acrylate and pentaerythritol tri(meth)acrylate having 3 functional groups; and pentaerythritol tetra (meth)acrylate, dipentaerythritol penta(meth)acrylate and dipentaerythritol hexa(meth)acrylate having 4 or more functional groups. Moreover, the examples of the oligomers include oligoesters having a molecular weight of 10,000 or less, e.g., polyethylene glycol di(meth)acrylate and polypropylene glycol di(meth)acrylate. The multi-functional (meth) acrylates preferably have 2 or more acrylic- or methacrylic-based unsaturated groups, more preferably 3 or more. The unsaturated acrylic-based compound has the higher effect of improving weather-resistant adhesion as its number of functional groups increases.

The other examples of the photopolymerizable materials include polyvinyl cinnamates and azide resins.

The polyvinyl cinnamates include cinnamate ester compounds of polyvinyl alcohol, known as photosensitive resins with cinnamoyl group as the photosensitive group, and many other vinyl polycinnamate derivatives.

The azide resins include rubber photosensitive liquids, known as photosensitive resins with azide group as the photosensitive group and normally incorporated with a diazide compound for the photosensitive group, and others described in detail in "Photosensitive Resins, published on Mar. 17, 1972 by the Society of Printing, pp.93, 106 and 117). These may be used either individually or in combination, and incorporated, as required, with a photosensitizer.

These photopolymerizable materials may be used either individually or in combination. When the (V) component is required to exhibit its effect of improving weather-resistant adhesion more securely and more quickly, incorporation of a photosensitizer is effective for the above purpose. When the (V) component, which is a compound having, in the molecule, an unsaturated group capable of triggering polymerization by reacting with oxygen in air and/or a photopolymerizable material, is incorporated in the composition (18) of the present invention, the curable composition containing the saturated hydrocarbon-based polymer having a reactive silicon group can be greatly improved in its weather-resistant adhesion. On top of that, the (V) component has no adverse effect on the properties of the cured compositions. It is incorporated preferably at 0.1 to 20 parts by weight per 100 parts by weight of the (A1) component, particularly preferably 1 to 10 parts by weight. At below 0.1 part by weight, it may not sufficiently exhibit the effect of improving weather-resistant adhesion. At above 20 parts, it may deteriorate storage stability of the sealant composition.

The curable composition (18) of the present invention, containing the (A1) and (V) components, shows better adhesion and weather-resistant adhesion to a base material than a curable composition free of the (V) component, because the (V) component is cured by the actions of oxygen and/or light. These characteristics are exhibited even when the composition contains no silane coupling agent, described later. However, it will exhibit still better adhesion and weather-resistant adhesion, when incorporated with a silane coupling agent.

The curable composition (18) of the present invention may be incorporated, as required, with one or more additives. The additives useful for the present invention include silane coupling agent, curing catalyst which promotes the silanol condensation, property adjuster which adjusts the tensile-related properties of the cured product, plasticizer, filler, adhesion improver, aging inhibitor, radical inhibitor, ultraviolet ray absorber, metal deactivator, ozone-caused aging inhibitor, light stabilizer, phosphorus-based peroxide decomposer, lubricant, pigment, and foaming agent.

The silane coupling agent, which is incorporated as required in the curable composition (18) of the present invention, improves adhesion strength of the cured silyl-containing ethylene/α-olefin/non-conjugated polyene random copolymer rubber (A1) to the base material and other objects. It is a compound which has a group containing the silicon atom to which a hydrolyzable group is bonded (hereinafter referred to as hydrolyzable silicon group) and one or more other functional groups.

The concrete examples include those described earlier as the hydrolyzable groups, of which methoxy and ethoxy are more preferable viewed from hydrolysis speed. It preferably has 2 or more hydrolyzable groups, still more preferably 3 or more.

The functional groups useful for the present invention, other than the hydrolyzable silicon groups, include primary, secondary and tertiary amino, mercapto, epoxy, carboxyl, vinyl, isocyanate, isocyanurate, and halogen. Of these, primary, secondary or tertiary amino, epoxy, isocyanate and isocyanurate are more preferable, and isocyanate and epoxy are still more preferable.

The concrete examples of the silane coupling agents useful for the present invention include amino-containing silanes, e.g., γ-aminopropyltrimethoxysilane, γ-aminopropyltriethoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-ureidopropyltrimethoxysilane, N-phenyl-γ-aminopropyltrimethoxylsilane, N-benzyl-γ-aminopropyltrimethoxylsilane and N-vinylbenzyl-γ-aminopropyltriethoxylsilane; mercapto-containing silanes, e.g., γ-mercaptopropyltrimethoxysilane, γ-mercaptopropyltriethoxysilane, γ-mercaptopropylmethyldimethoxysilane and γ-mercaptopropylmethyldiethoxysilane; epoxy-containing silanes, e.g., γ-glycidoxypropyltrimethoxysilane, γ-glycidoxypropyltriethoxysilane, γ-glycidoxypropylmethyldimethoxysilane, γ-(3,4-epoxycyclohexyl)ethyltrimethoxysilane and γ-(3,4-epoxycyclohexyl)ethyltriethoxysilane; carboxysilanes, e.g., γ-carboxyethyltriethoxysilane, γ-carboxyethylphenylbis(2-methoxyethoxy)silane and N-β-(carboxymethyl)aminoethyl-γ-aminopropyltrimethoxysilane; vinyl type unsaturated group-containing silanes; e.g., vinyltrimethoxysilane, vinyltriethoxysilane, γ-methacryloyloxypropylmethyldimethoxysilane and γ-acryloyloxypropylmethyltriethoxysilane; halogen-containing silanes, e.g., γ-chloropropyltrimethoxysilane; silane isocyanurates, e.g., tris(trimethoxysilyl)isocyanurate; and isocyanate-containing silanes, e.g., γ-isocyanate propyltrimethoxysilane, γ-isocyanate propyltriethoxysilane, γ-isocyanate propylmethyldiethoxysilane and γ-isocyanate propylmethyldimethoxysilane. Moreover, the modifications of these compounds as their derivatives are also useful as the silane coupling agents. These compounds include amino-modified silyl polymers, silylated amino polymers, unsaturated aminosilane complexes, block isocyanate silanes, phenylamino-long chain-alkyl silanes, aminosilylated silicone and silylated polyesters.

The silane coupling agent, which is optionally used for the present invention, is incorporated preferably at 0.1 to 20 parts by weight per 100 parts by weight of the ethylene/α-olefin/non-conjugated polyene random copolymer rubber (A1) containing hydrolyzable silyl group, particularly preferably 0.5 to 10 parts by weight. These silane coupling agents may be used either individually or in combination. The composition (18) of the present invention may be further incorporated with a tackifier other than the silane coupling agent.

The plasticizer may be used in place of the solvent during the process of introducing a hydrolyzable silyl group into the ethylene/α-olefin/non-conjugated polyene random copolymer rubber ($A_0$), for the purposes of, e.g., adjusting reaction temperature and viscosity of the reaction system.

The concrete examples of these additives are described in, e.g., Japanese Patent Publication Nos. 69659/1992 and 108928/1995, and Japanese Patent Laid-Open Publication Nos. 254149/1988 and 22904/1989.

The curable composition (18) of the present invention shows a notable effect of improving adhesion to a variety of objects, e.g., inorganic bases of glass, aluminum, stainless steel, zinc, copper and mortar, and organic bases of vinyl chloride, acrylic resin, polyester, polyethylene, polypropylene and polycarbonate, in the presence or absence of a primer, more significantly in the absence of a primer.

The curable composition (18) of the present invention shows a notable effect of improving weather-resistant adhesion to various types of glass, e.g., common inorganic glass (float glass), particularly noticeably when used as a sealant composition for heat ray reflective glass. The heat ray reflective glass to which the curable composition (18) of the present invention is applicable means optically functional glass coated, on the surface, with a film of, e.g., metal, metal nitride or metal oxide, to reflect or absorb light of specific wavelength.

The effect of the unsaturated compound capable of reacting with oxygen in air is also observed, even when various additives are incorporated.

More concretely, the curable composition (18) of the present invention, when used as an elastomer sealant for construction works, or a sealant for laminated glass or rust-prevention or water-proof of edges (cut sections) of wired or laminated glass, will have still improved adhesion and weather-resistant adhesion of the sealant to various objects, when incorporated with the above compounds.

Curable Composition (18) and its Uses

The curable composition (18) of the present invention contains the curable composition with the hydrolyzable silyl-containing ethylene/α-olefin/non-conjugated polyene random copolymer rubber as the component (A1), as described earlier. More concretely, it contains the organic polymer (Z) and a compound having, in the molecule, an unsaturated group capable of triggering polymerization by reacting with oxygen in air and/or photopolymerizable material (V). It can be suitably used for electric/electronic device members, transportation machines, and civil engineering/construction, medical and leisure areas, as described earlier.

The curable composition (18) is preferably incorporated further with the above-described silane coupling agent.

The curable rubber composition (18) of the present invention can be used as sealants, potting agents, coating materials or adhesives for electric/electronic device members, transportation machines, and civil engineering/construction, and leisure areas.

In other words, the present invention provides sealants, potting agents, coating materials and adhesives, composed of the curable composition containing the organic polymer (Z) and a compound having, in the molecule, an unsaturated group capable of triggering polymerization by reacting with oxygen in air and/or photopolymerizable material (V).

The curable composition is preferably incorporated further with the above-described silane coupling agent, when it is used for sealants, potting agents, coating materials and adhesives.

Tackifier Composition (19)

The tackifier composition (19) of the present invention contains the silyl-containing ethylene/α-olefin/non-conjugated polyene random copolymer rubber (A1), a tackiness imparting resin (W) and a curing catalyst (H) composed of a specific organozirconium compound (H1) or a specific organoaluminum compound (H2).

Tackiness Imparting Resin (W)

A tackiness imparting resin (W) can be used for the present invention, to adjust the tackiness characteristics of the composition.

The tackiness imparting resin (W) is not limited. These resins useful for the present invention include those having an acidic group, e.g., rosin ester resin, phenol resin, xylene resin, xylene/phenol resin and terpene/phenol resin; various petroleum-based resins, e.g., aromatic-, aliphatic/aromatic copolymer- and alicyclic-based resins of relatively low polarity; and common tackiness imparting resins, e.g., coumarone resin, low-molecular-weight polyethyrene resin and terpene resin.

The concrete examples of these resins include, although not limited to, those of relatively low polarity, e.g., Petrosin 801™ (Mitui Chemicals), Neopolymer S™ (NIPPON PETROCHEMICALS), Tackiace A100™ (Mitui Chemicals), Quintone 1500™ (ZEON CORP.), FTR6100™ (Mitui Chemicals), Vicolastic A75™ (Hercules), Coumarone C-90™ (Nippon Steel Chemical Group); and those having a relatively low polar group, e.g., YS Polystar T-115™ and YS Polystar S-145™ (Yasuhara Yushi), Steperite Ester 7™ (Hercules), and Neopolymer E-100™ (NIPPON PETROCHEMICALS).

Content of the tackiness imparting resin (W) varies depending on its type used. However, it is incorporated preferably at up to 140 parts by weight per 100 parts by weight of the silyl-containing ethylene/α-olefin/non-conjugated polyene random copolymer rubber (A1). At above 140 parts, it may not give the composition of good tackiness characteristics.

Curing Catalyst (H)

The curing catalyst (H) for the present invention is an organozirconium compound (H1) represented by the following general formula [VIII] or an organoaluminum compound (H2) represented by the following general formul [IX]. Use of the curing catalyst (H) greatly improves releasability of the tackifier composition (19) of the present invention from silicone releasing paper.

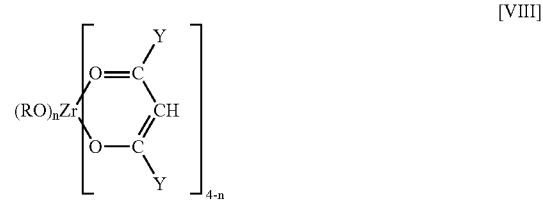

[VIII]

wherein, "n" is an integer of 0 to 4, R is a monovalent hydrocarbon group of 1 to 20 carbon atoms, and Y is a group selected from the group consisting of hydrocarbon of 1 to 8 carbon atoms, halogenated hydrocarbon, cyanoalkyl, alkoxyl, halogenated alkoxyl, cyanoalkoxy and amino group, which may be the same or different, and

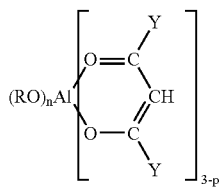

$$[\text{IX}]$$

wherein, "p" is an integer of 0 to 3, R is a monovalent hydrocarbon group of 1 to 20 carbon atoms, and Y is a group selected from the group consisting of hydrocarbon of 1 to 8 carbon atoms, halogenated hydrocarbon, cyanoalkyl, alkoxyl, halogenated alkoxyl, cyanoalkoxy and amino group, which may be the same or different.

The organozirconium compound (H1) or the organoaluminum compound (H2) means alkoxide-based compound or cheleate compound of zirconium or aluminum, represented by the above general formula [VIII] or [IX], wherein an organic group is bonded to zirconium or aluminum. It may be a monomer or an associated compound.

The concrete examples of these compounds include, but not limited to, alkoxide-based compounds, e.g., $(C_2H_5O)_4Zr$, $(iso\text{-}C_3H_7O)_4Zr$, $(n\text{-}C_4H_9O)_4Zr$, $(C_8H_{17}O)_4Zr$, $(iso\text{-}C_3H_7O)_3Al$, $(iso\text{-}C_3H_7O)_2Al$ $(sec\text{-}C_4H_9O)$ and $(sec\text{-}C_4H_9O)_3Al$; and cheleate compounds, e.g., $Zr(acac)_4$ (zirconium tetraacetylacetonate, and so forth), $(n\text{-}C_4H_9O)_3Zr$ (acac), $(n\text{-}C_4H_9O)_2Zr$ $(acac)_2$, $(n\text{-}C_4H_9O)Zr$ $(acac)_3$, $(iso\text{-}C_3H_7O)_2Al$ (acac), $Al(acac)_3$, $(iso\text{-}C_3H_7O)_2Al$ (ethyl acetoacetate) and Al (ethyl acetoacetate)$_3$.

The organozirconium compound (H1) or organoaluminum compound (H2) may be useful, even when it is associated into a trimer or tetramer. These curing catalysts (H) may be used either individually or in combination.

The curing catalyst (H) is incorporated preferably at 0.01 to 20 parts by weight per 100 parts by weight of the silyl-containing ethylene/α-olefin/non-conjugated polyene random copolymer rubber (A1). At below 0.01 part, the curing catalyst (H) may not sufficiently exhibit its catalytic effect. At above 20 parts, on the other hand, it will excessively promote the curing reaction, which will deteriorate workability of applying the tackifier composition to a base.

The curing catalyst (H) for the present invention is on a level in curing activity with the organotin-base compound, which has been widely used as the curing catalyst, causes no coloration of the tackifier, unlike an alkyl titanate-based compound used as the catalyst, and is excellent in productivity and external appearances.

Other Components

The-tackifier composition (19) of the present invention may be incorporated, as required, with one or more additives within limits not detrimental to the object of the present invention. The additives useful for the present invention include adhesion improver, property adjuster, storage stability improver, plasticizer or softening agent, filler, aging inhibitor, ultraviolet ray absorber, metal deactivator, ozone-caused aging inhibitor, light stabilizer, amine-based radical chaining inhibitor, phosphorus-based peroxide decomposer, antioxidant, lubricant, pigment, foaming agent and surfactant.

The adhesion improvers useful for the present invention include commonly used adhesives, silane coupling agents, e.g., aminosilane and epoxy silane compounds; and others. The concrete examples of these adhesion improvers include phenolic resin, epoxy resin, γ-aminopropyl trimethoxysilane, N-(β-aminoethyl)aminopropyl methyldimethoxysilane, coumarone/indene resin, rosin ester resin, terpene/phenol resin, α-methyl styrene/vinyl toluene copolymer, polyethylmethyl styrene, alkyl titanate, and aromatic polyisocyanate. The adhesion improver, when used, is incorporated preferably at about 1 to 50 parts by weight per 100 parts by weight of the silyl-containing ethylene/α-olefin/non-conjugated polyene random copolymer rubber (A1), more preferably 5 to 30 parts by weight.

The storage stability improvers useful for the present invention include esters of ortho-organic acids.

The storage stability improver, when used, is incorporated preferably at about 0.5 to 20 parts by weight per 100 parts by weight of the silyl-containing ethylene/α-olefin/non-conjugated polyene random copolymer rubber (A1), more preferably 1 to 10 parts by weight.

The plasticizer useful for the present invention is also not limited, and any commonly used one may be used. Preferably, it should be compatible with each component for the rubber composition of the present invention.

The concrete examples of these plasticizers include:

hydrocarbon-based compounds, e.g., polybutene, hydrogenated polybutene, ethylene/α-olefin cooligomer, α-methyl styrene oligomer, biphenyl, triphenyl, triaryl dimethane, alkylene triphenyl, liquid polybutadiene, hydrogenated liquid polybutadiene, alkyl diphenyl, partially hydrogenated ter-phenyl, paraffin oil, naphthene oil and atactic polypropylene;

paraffin chlorides;

phthalate esters, e.g., those of dibutyl phthalate, diheptyl phthalate, di(2-ethylhexyl)phthalate, butyl benzyl phthalate, dioctyl phthalate and butyl phthalyl butyl glycolate;

non-aromatic, dibasic acid esters, e.g., those of dioctyl adipate and dioctyl cebacate;

esters of polyalkylene glycol, e.g., those of diethylene glycol benzoate and triethylene glycol dibenzoate;

phosphate esters, e.g., those of tricresyl phosphate and tributyl phosphate; and polypropylene glycol. Of these, saturated hydrocarbon-based compounds are more preferable. They may be used either individually or in combination.

Of the above-described compounds, hydrocarbon-based compounds free of unsaturated group, e.g., hydrogenated polybutene, hydrogenated liquid polybutadiene, paraffin oil, naphthene oil and atactic polypropylene, are more preferable for various reasons, e.g., high compatibility with each component for the rubber composition of the present invention, limited effects on curing speed of the rubber composition, good resistance to weather of the cured product, and cheapness.

The plasticizer may be used in place of the solvent during the process of introducing a hydrolyzable silyl group into the above-described ethylene/α-olefin/non-conjugated polyene random copolymer rubber ($A_0$), for the purposes of, e.g., adjusting reaction temperature and viscosity of the reaction system.

The plasticizer, when used, is incorporated preferably at about 10 to 500 parts by weight per 100 parts by weight of the silyl-containing ethylene/α-olefin/non-conjugated polyene random copolymer rubber (A1), more preferably about 20 to 300 parts by weight.

The concrete examples of the fillers include wood powder, pulp, cotton chips, asbestos, glass fibers, carbon fibers, mica, walnut shell powder, graphite, diatomaceous earth, white clay, fumed silica, settling silica, silicic anhydride, carbon black, calcium carbonate, clay, talc, titanium oxide, magnesium carbonate, quartz, fine aluminum powder, flint powder, and zinc powder. Of these, more preferable ones are thixotropic fillers, e.g., settling silica, fumed silica and carbon black; and calcium carbonate, titanium oxide and talc. The filler, when used, is incorporated preferably at about 10 to 500 parts by weight per 100 parts by weight of the silyl-containing ethylene/α-olefin/non-conjugated polyene random copolymer rubber (A1), more preferably about 20 to 300 parts by weight.

The aging inhibitors useful for the present invention include commonly used known ones, e.g., sulfur-based ones, radical inhibitors and ultraviolet ray absorbers.

The sulfur-based aging inhibitors useful for the present invention include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, mercaptols, monothio acids, polythio acids, thioamides, and sulfoxides.

More concretely, the sulfur-based aging inhibitors include:

mercaptans, e.g., 2-mercaptobenzothiazole;

salts of mercaptans, e.g., zinc salt of 2-mercaptobenzothiazole;

sulfides, e.g., 4,4'-thio-bis (3-methyl-6-t-butyl phenol), 4,4'-thio-bis(2-methyl-6-t-butyl phenol), 2,2'-thio-bis(4-methyl-6-t-butyl phenol), bis(3-methyl-4-hydroxy-5-t-butyl-benzyl)sulfide, terephthaloyl di(2,6-dimethyl-4-t-butyl-3-hydroxybenzyl)sulfide, phenothiazine, 2,2'-thio-bis (4-octyl phenol)nickel, dilauryl thiodipropionate, distearyl thiodipropionate, dimyristyl thiodipropionate, ditridecyl thiodipropionate, distearyl β,β-thiodibutyrate, lauryl-stearyl thiodipropionate and 2,2-thio[diethyl-bis-3-(3,5-di-t-butyl-4-hydroxy phenol)propionate];

polysulfides, e.g., 2-benzothiazole disulfide;

dithiocarboxylates, e.g., zinc dibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethyldithiocarbamate;

thioureas, e.g., 1-butyl-3-oxy-diethylene-2-thiourea, di-o-tolyl-thiourea and ethylene thiourea; and thiophosphates, e.g., trilauryltrithiophosphate.

The above-described sulfur-based aging inhibitor prevents decomposition/aging of the main chain under heating much more efficiently than the other types for the curable rubber composition of the present invention, controlling the problems, e.g., residual surface tackiness.

The radical inhibitors useful for the present invention include phenol-based ones, e.g., 2,2-methylene-bis(4-methyl-6-t-butyl phenol) and tetrakis[methylene-3-(3,5-di-t-butyl-4-hydroxyphenyl)propio nate]methane; and amine-based ones, e.g., phenyl-β-naphthylamine, α-naphthylamine, N,N'-sec-butyl-p-phenylenediamine, phenothiazine and N,N'-diphenyl-p-phenylenediamine.

The ultraviolet ray absorbers useful for the present invention include 2-(2'-hydroxy-3',5'-di-t-butylphenyl)benzotriazole and bis(2,2,6,6-tetramethyl-4-piperidine)cebacate.

The aging inhibitor, when used, is incorporated at about 0.1 to 20 parts by weight per 100 parts by weight of the silyl-containing ethylene/α-olefin/non-conjugated polyene random copolymer rubber (A1), preferably about 1 to 10 parts by weight.

A solvent may be used for, e.g., improving workability and reducing viscosity. The solvents useful for the above purposes include aromatic hydrocarbon-based ones, e.g., toluene and xylene; ester-based ones, e.g., ethyl acetate, butyl acetate, amyl acetate and cellosolve acetate; and ketone-based ones, e.g., methylethylketone, methylisobutylketone and diisobutylketone.

The tackifier composition (19) of the present invention can find wide uses, e.g., tapes, sheets, labels and foils. For example, the above-described tackifier composition, of non-solvent liquid, solvent, emulsion or hot-melt type, is applied to a base material, e.g., synthetic resin or modified natural film, paper, any type of cloth, metallic foil metallized plastic foil, asbestos or cloth of glass fibers, and cured at normal or elevated temperature after being exposed to moisture or water.

Tackifier Composition (19) and its Uses

The tackifier composition (19) of the present invention contains the tackifier composition with the silyl-containing ethylene/α-olefin/non-conjugated polyene random copolymer rubber as the component (A1), as described earlier. More concretely, it contains the organic polymer (Z), and a tackiness imparting resin (W) and curing catalyst (H) composed of a specific organozirconium compound (H1) or a specific organoaluminum compound (H2). It can be suitably used for electric/electronic device members, transportation machines, and civil engineering/construction, medical and leisure areas, as described earlier.

For the civil engineering/construction areas, the tackifier composition (19) can find uses for, e.g., adhesive, waterproof and vibration-preventive sheets, among others.

Rubber Composition (20)

The rubber composition (20) of the present invention contains the silyl-containing ethylene/α-olefin/non-conjugated polyene random copolymer rubber (A1), and a specific curing catalyst (H).

[Curing Catalyst (H)]

The curing catalyst (H) is composed of a mercaptide type organotin compound (H3) having the Sn—S bond, a sulfide type organotin compound (H4) having the Sn=S bond, an organocarboxylic acid (H5), an organocarboxylic anhydride (H6), or a mixture of one of the above compounds with carboxylic type organotin compound (H7).

For example, the mercaptide type organotin compound (H3) having the Sn—S bond include those represented by the following formulae:

organotin compounds having an $R_2Sn(—S \ldots COO—)$ type ring, e.g.,

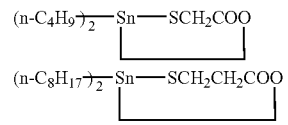

organotin compounds having an $R_2Sn(—S \ldots S—)$ type ring, e.g.,

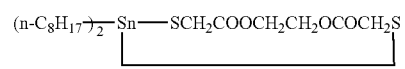

-continued

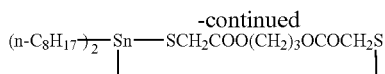

R$_2$Sn(—SCH$_2$COOR)$_2$ type organotin compounds, e.g., (n-C$_4$H$_9$—)$_2$Sn(—SCH$_2$COO-iso-C$_8$H$_{17}$)$_2$ and (n-C$_8$H$_{17}$—)$_2$Sn(—SCH$_2$COO-n-C$_{12}$H$_{25}$)$_2$;

RSn(—SCH$_2$COOR)$_3$ type organotin compounds, e.g., (n-C$_4$H$_9$—)Sn(—SCH$_2$COO-iso-C$_8$H$_{17}$)$_3$ and (n-C$_8$H$_{17}$—)Sn(—SCH$_2$COO-n-C$_{12}$H$_{25}$)$_3$.

The sulfide type organotin compounds (H4) having the Sn=S bond include an R$_2$Sn=S type one, e.g., (n-C$_8$H$_{17}$—)$_2$Sn=S.

The organocarboxylic acids (H5) include benzoic, phthalic, succinic, adipic, pyromellitic, formic and acetic acids.

The organocarboxylic anhydrides (H6) include acetic, maleic, phthalic, succinic and dipyromellitic anhydrides.

The carboxylic type organotin compounds (H7) to be mixed with one of the above-described (H3) to (H6) compounds for use of the curing catalyst (H) include those represented by the formula Sn(—OCO-n-C$_8$H$_{17}$)$_2$, e.g., (n-C$_4$H$_9$—)$_2$Sn(—OCO-n-C$_{11}$H$_{23}$)$_2$, (n-C$_4$H$_9$—)$_2$Sn(—OCOCH=CHCOOCH$_3$)$_2$, (n-C$_8$H$_{17}$—)$_2$Sn(—OCO-n-C$_{11}$H$_{23}$)$_2$ and (n-C$_8$H$_{17}$—)$_2$Sn(—OCOCH=CHCOO-n-C$_4$H$_9$)$_2$.

The tin (IV) compound is more preferable than the tin (II) compound for the present invention.

For the present invention, the ratios of the mercaptide type organotin compound (H3) having the Sn—S bond to the carboxylic type organotin compound (H7), i.e., (H3)/(H7) ratio, of the sulfide type organotin compound (H4) having the Sn=S bond to the carboxylic type organotin compound (H7), i.e., (H4)/(H7) ratio, of the organocarboxylic acid (H5) to the carboxylic type organotin compound (H7), i.e., (H5)/(H7) ratio, and of the organocarboxylic anhydride (H6) to the carboxylic type organotin compound (H7), i.e., (H6)/(H7) ratio are each 0.1 to 20, preferably 0.1 to 10.

The curing catalyst (H) is incorporated at around 0.01 to 10 parts by weight per 100 parts by weight of the silyl-containing ethylene/α-olefin/non-conjugated polyene random copolymer rubber (A1), preferably 0.1 to 10 parts by weight. The curing catalyst gives the rubber composition of improved pot life in an open atmosphere, when used at a content in the above range.

Other Components

The rubber composition (20) of the present invention may be incorporated, as required, with at least one of the compounds selected from the group consisting of trialkyl orthoformates, hydrolyzable organosilicone compounds, hydrolyzable ester compounds and alkyl alcohols within limits not detrimental to the object of the present invention.

The trialkyl orthoformates useful for the present invention include trimethyl orthoformate and triethyl orthoformate.

The hydrolyzable organosilicone compounds useful for the present invention include tetramethyl orthosilicate and tetraethyl orthosilicate.

The hydrolyzable ester compounds useful for the present invention include methyltriethoxysilane, methyltriacetoxysilane and vinyl trimethoxysilane.

The alkyl alcohols useful for the present invention include methyl alcohol, butyl alcohol, amyl alcohol and cellosolve.

The rubber composition of the present invention may be further incorporated with one or more additives, e.g., various types of fillers, pigments and plasticizers within limits not detrimental to the object of the present invention.

The fillers and pigments useful for the present invention include various types of silica, calcium carbonate, magnesium carbonate, titanium oxide, iron oxide and glass fibers.

The plasticizers useful for the present invention include process oil, paraffin oil, naphthene oil, polybutadiene and ethylene/α-olefin oligomer. The plasticizer may be used in place of the solvent during the process of introducing a hydrolyzable silyl group into the ethylene/α-olefin/non-conjugated polyene random copolymer rubber (A$_0$), for the purposes of, e.g., adjusting reaction temperature and viscosity of the reaction system.

Rubber Composition (20) and its Uses

The rubber composition (20) of the present invention contains the curable composition with the silyl-containing ethylene/α-olefin/non-conjugated polyene random copolymer rubber as the component (A1), as described earlier. More concretely, it contains the organic polymer (Z) and a specific curing catalyst (H), composed of a mercaptide type organotin compound (H3) having the Sn—S bond, sulfide type organotin compound (H4) having the Sn=S bond, organocarboxylic acid (H5), organocarboxylic anhydride (H6), or mixture of one of the above compounds and carboxylic type organotin compound (H7). It can be suitably used for electric/electronic device members, transportation machines, and civil engineering/construction, medical and leisure areas, as described earlier.

The rubber composition (20) of the present invention can be used as sealants, potting agents, coating materials or adhesives for electric/electronic device members, transportation machines, and civil engineering/construction, and leisure areas.

Curable Composition (21)

The curable composition (21) of the present invention contains the silyl-containing ethylene/α-olefin/non-conjugated polyene random copolymer rubber (A1) and a specific curing catalyst (H8)

Curing Catalyst (H8)

The copolymer rubber (A1) is crosslinked/cured by the condensation, when its hydrolyzable silicon group is hydrolyzed in the presence of moisture. The curing catalyst (H8) for the present invention works to greatly promote curing of the copolymer rubber (A1).

For the curing catalyst (H8), a compound represented by the general formula Q$_2$Sn(OZ)$_2$ or [Q$_2$Sn(OZ)]$_2$O is used, wherein Q is a monovalent hydrocarbon group of 1 to 20 carbon atoms; and Z is a monovalent hydrocarbon group of 1 to 20 carbon atoms or an organic group having a functional group capable of forming therein a coordination bond with Sn. The concrete examples of these compounds include, but not limited to:

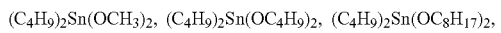

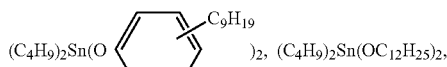

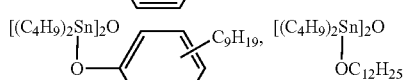

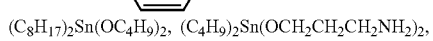

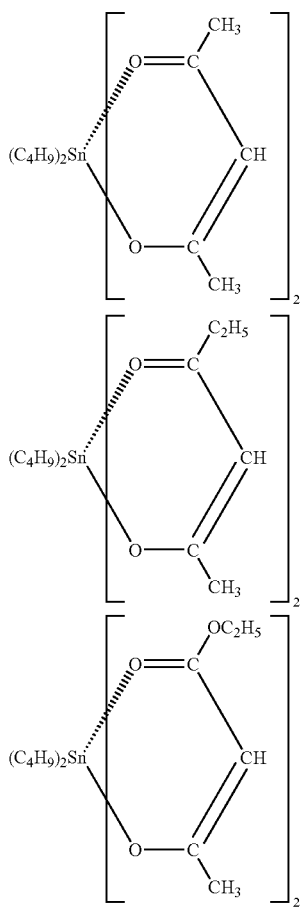

These curing catalysts (H8) may be used either individually or in combination. The curing catalyst (H8) is incorporated normally at 0.01 to 10 parts by weight per 100 parts by weight of the silyl-containing ethylene/α-olefin/non-conjugated polyene random copolymer rubber (A1), preferably 0.1 to 5 parts by weight. At below 0.01 part, it may not cure the composition (21) at a practical speed, and it may cause cost-related problems at above 10 parts.

The curing catalyst (H8) for the present invention notably promotes the quick-curing activity as compared with the organotin-based compound, which has been traditionally used, causes no coloration of the composition, unlike an alkyl titanate-based compound used as the catalyst, and is excellent not only in productivity but also in external appearances.

The curable composition (21) of the present invention, containing the components (A1) and (H8), cures very fast, starting to cure from the surface in several minutes to 1 hour when left in air at room temperature, becoming tack-free. When left for a couple of days, it is cured deep inside, turning into a solid rubber-like elastomer. The cured product is excellent in resistance to heat and acid.

Other Components

The copolymer rubber (A1) for the present invention can be modified, when incorporated with various types of fillers.

The fillers useful for the present invention include reinforcing fillers, e.g., fumed silica, settling silica, silicic anhydride, silicic hydrate and carbon black; other fillers, e.g., calcium carbonate, magnesium carbonate, diatomaceous earth, fired clay, clay, talc, titanium oxide, bentonite, organic bentonite, ferric oxide, zinc oxide, activated zinc white, hydrogenated castor oil and silas balloons; and fibrous fillers, e.g., asbestos and glass fibers or filaments.

Of these, the one, mainly selected from the group consisting of fumed silica, settling silica, silicic anhydride, silicic hydrate, carbon black, surface-treated fine calcium carbonate, fired clay, clay and activated zinc white is used when the curable composition of high strength is to be produced. The filler will bring about the favorable effect, when incorporated at 1 to 100 parts by weight per 100 parts by weight of the copolymer rubber as the component (A1). On the other hand, when the cured product of low strength and high elongation is to be produced, the filler, mainly selected from the group consisting of titanium oxide, calcium carbonate, magnesium carbonate, talc, ferric oxide, zinc oxide and silas balloons is used. It will bring about the favorable effect, when incorporated at 5 to 200 parts by weight per 100 parts by weight of the copolymer rubber as the component (A1). It is needless to say that these fillers may be used either individually or in combination.

When incorporated with a plasticizer in combination with the filler, the curable component (21) of the present invention will have one or more additional advantages, e.g., further improved elongation of the cured product and a larger quantity of the filler being incorporated.

The concrete examples of these plasticizers include phthalate esters, e.g., those of dibutyl phthalate, diheptyl phthalate, di(2-ethylhexyl)phthalate, butyl benzyl phthalate and butyl phthalyl butyl glycolate; non-aromatic, dibasic acid esters, e.g., those of dioctyl adipate and dioctyl cebacate; esters of polyalkylene glycol, e.g., those of diethylene glycol dibenzoate and triethylene glycol dibenzoate; phosphate esters, e.g., those of tricresyl phosphate and tributyl phosphate; paraffin chlorides; and hydrocarbon-based compounds, e.g., alkyl diphenyl, polybutene, hydrogenated polybutene, ethylene/α-olefin oligomer, α-methyl styrene oligomer, biphenyl, triphenyl, triaryl dimethane, alkylene triphenyl, liquid polybutadiene, hydrogenated liquid polybutadiene, paraffin oil, naphthene oil, atactic polypropylene and partially hydrogenated ter-phenyl. They may be used either individually or in combination. The plasticizer may be incorporated while the polymer is being produced.

Of these, hydrocarbon-based compounds free of unsaturated group, e.g., hydrogenated polybutene, hydrogenated liquid polybutadiene, paraffin oil, naphthene oil and atactic polypropylene, are more preferable for various reasons, e.g., high compatibility with each component for the curable composition (21) of the present invention, limited effects on curing speed of the curable composition, good resistance to weather of the curable product, and cheapness.

The plasticizer may be used in place of the solvent during the process of introducing a reactive silicon group into the saturated hydrocarbon-based polymer, for the purposes of, e.g., adjusting reaction temperature and viscosity of the reaction system.

The plasticizer will bring about the favorable effect, when incorporated at 100 parts by weight or less per 100 parts by weight of the component (A1).

The method of preparing the curable composition (21) of the present invention is not limited. It may be prepared by the common method, e.g., kneading these components by, e.g., a mixer, roll or kneader at normal or elevated temerature, or mixing them after dissolving each component in a small quantity of an adequate solvent. Each component can be adequately combined with the others mainly to produce a two-liquid type composition.

The curable composition (21) of the present invention is cured by the actions of moisture, when exposed to air, into a solid with three-dimensional network structure to have rubber-like elasticity.

The curable composition (21) of the present invention may be adequately incorporated, as required, with one or more additives, when it is used. The additives useful for the present invention include another type of curing catalyst (e.g., lauryl amine or lead octylate), adhesion imporver, property adjuster, storage stability improver, ultraviolet ray absorber, metal deactivator, ozone-caused aging inhibitor, light stabilizer, amine-based radical chaining inhibitor, phosphorus-based peroxide decomposer, lubricant, pigment, and foaming agent.

The concrete examples of the other curing catalysts useful for the present invention include titanate esters, e.g., those of tetrabutyl titanate and tetrapropyl titanate; organoaluminum compounds, e.g., aluminum trisacetylacetonate, aluminum trisethylacetoacetate and diisopropoxy aluminum ethylacetoacetate; chelate compounds, e.g., zirconium tetraacetylacetonate and titanium tetraacetylacetonate; lead octylate; amine-based compounds, and salts of these compounds and carboxylates, e.g., butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris (dimethylaminomethyl)phenol, morpholine, N-methyl morpholine, 2-ethyl-4-methylimidazole and 1,8-diazabicyclo(5,4,0)undecene-7 (DBU); low-molecular-weight polyamide resins produced by the reactions between excessive quantities of polyamines and polybasic acids; products of the reactions between excessive quantities of polyamines and epoxy compounds; silane coupling agents containing amino group, e.g., γ-aminopropyl trimethoxy silane and N-(β-aminoethyl)aminopropyl methyldimethoxy silane; and other known silanol condensing catalysts, acidic or basic.

The adhesion improvers useful for the present invention include commonly used adhesives, silane coupling agents, e.g., aminosilane and epoxy silane compounds; and others.

The concrete examples of these adhesion improvers include phenolic resin, epoxy resin, γ-aminopropyl trimethoxysilane, N-(β-aminoethyl)aminopropyl methyldimethoxysilane, coumarone/indene resin, rosin ester resin, terpene/phenol resin, α-methyl styrene/vinyl toluene copolymer, polyethylmethyl styrene, alkyl titanate, and aromatic polyisocyanate.

The storage stability improvers useful for the present invention include compounds with silicon to which a hydrolyzable group is bonded, and esters of ortho-organic acids.

The concrete examples of the storage stability improvers include methyltrimethoxy silane, methyltriethoxy silane, tetramethoxy silane, ethyltrimethoxy silane, dimethyldiethoxy silane, trimethylisobutoxy silane, trimethyl(n-butoxy)silane, n-butyltrimethoxy silane, and methyl orthoformate.

The aging inhibitors useful for the present invention include commonly used known ones, e.g., sulfur-based ones, radical inhibitors and ultraviolet ray absorbers.

The sulfur-based aging inhibitors useful for the present invention include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, mercaptols, monothio acids, polythio acids, thioamides, and sulfoxides.

The concrete examples of the sulfur-based aging inhibitors include mercaptans, e.g., 2-mercaptobenzothiazole; salts of mercaptans, e.g., zinc salt of 2-mercaptobenzothiazole; sulfides, e.g., 4,4'-thio-bis(3-methyl-6-t-butyl phenol), 4,4'-thio-bis(2-methyl-6-t-butyl phenol), 2,2'-thio-bis(4-methyl-6-t-butyl phenol), bis(3-methyl-4-hydroxy-5-t-butyl-benzyl)sulfide, terephthaloyl di(2,6-dimethyl-4-t-butyl-3-hydroxybenzyl)sulfide. phenothiazine, 2,2'-thio-bis(4-octyl phenol)nickel, dilauryl thiodipropionate, distearyl thiodipropionate, dimyristyl thiodipropionate, ditridecyl thiodipropionate, distearylβ,β'-thiodibutyrate, lauryl-stearyl thiodipropionate and 2,2-thio[diethyl-bis-3-(3,5-di-t-butyl-4-hydroxy phenol)propionate]; polysulfides, e.g., 2-benzothiazole disulfide; dithiocarboxylates, e.g., zinc dibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethyldithiocarbamate; thioureas, e.g., 1-butyl-3-oxy-diethylene-2-thiourea, di-o-tolyl-thiourea and ethylene thiourea; and thiophosphates, e.g., trilauryltrithiophosphate.

The sulfur-based aging inhibitor prevents decomposition/aging of the main chain under heating much more efficiently than the other types for the composition of the present invention, controlling the problems, e.g., residual surface tackiness.

The radical inhibitors useful for the present invention include phenol-based ones, e.g., 2,2-methylene-bis(4-methyl-6-t-butyl phenol) and tetrakis[methylene-3-(3,5-di-t-butyl-4-hydroxyphenyl)propio nate]methane; and amine-based ones, e.g., phenyl-β-naphthylamine, α-naphthylamine, N,N'-sec-butyl-p-phenylenediamine, phenothiazine and N,N'-diphenyl-p-phenylenediamine.

The ultraviolet ray absorbers useful for the present invention include 2-(2'-hydroxy-3',5'-di-t-butylphenyl)benzotriazole and bis(2,2,6,6-tetramethyl-4-piperidine)cebacate.

Curable Composition (21) and its Uses

The curable composition (21) of the present invention contains the curable composition with the silyl-containing ethylene/α-olefin/non-conjugated polyene random copolymer rubber as the component (A1), as described in detail earlier. More concretely, it contains the organic polymer (Z) and curing catalyst (H8). It can be suitably used for electric/electronic device members, transportation machines, and civil engineering/construction, medical and leisure areas, as described earlier.

The curable composition (21) of the present invention can be used as sealants, potting agents, coating materials or adhesives for electric/electronic device members, transportation machines, and civil engineering/construction, and leisure areas.

In other words, the present invention provides sealants, potting agents, coating materials and adhesives, composed of the curable composition containing the organic polymer (Z) and curing catalyst (H8).

Curable Rubber Composition (22)

The curable rubber composition (22) of the present invention contains the silyl-containing ethylene/α-olefin/non-conjugated polyene random copolymer rubber (A1), titanates (Y) and, as required, a silanol condensing catalyst.

Titanates (Y)

The titanate (Y) for the present invention is a characteristic component for the present invention which improves adhesion strength of the ethylene/α-olefin/non-conjugated polyene random copolymer rubber (A1) containing a hydrolyzable silyl group to various types of bases, e.g., glass, metal and mortar. Moreover, it works as the silanol condensing catalyst which promotes the silanol condensation of hydrolyzable silyl groups with each other in the ethylene/α-olefin/non-conjugated polyene random copolymer rubber (A1) containing a hydrolyzable silyl group.

The titanates (Y) useful for the present invention include organotitanate esters, chelate compounds of titanium and silicate esters of titanium, titanate-based coupling agents, and partially hydrolyzed condensates thereof.

The concrete examples of the titanates (Y) useful for the present invention include tetra-iso-propyl titanate, tetra-normal-butyl titanate, butyl titanate dimer, tetrakis(2-ethylhexyl)titanate, tetrastearyltitanate, tetramethyl titanate, diethoxybis(acetylacetonato)titanium, di-iso-propylbis(acetylacetonato)titanium, di-iso-propoxybis(ethylacetoacetate)titanium, iso-propoxy(2-ethyl-1,3-hexanediolato)titanium, di(2-ethylhexoxy)bis(2-ethyl-1,3-hexanediolato) titanium, di-n-butoxybis(triethanolaminato)titanium, tetraacetylacetonate titanium, hydroxybis(lactato)titanium, and hydrolysis condensates thereof.

The concrete examples of the titanate-based coupling agents useful for the present invention include the compounds represented by the following formulae, and hydrolysis condensates thereof:

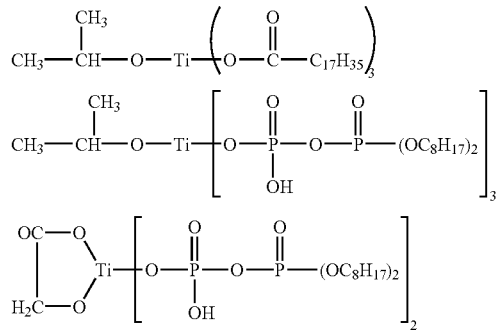
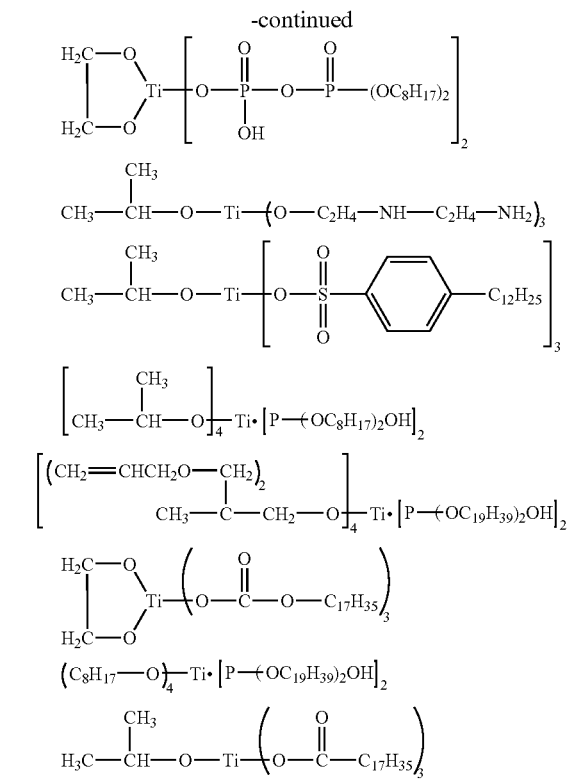

Of the above-described titanates (Y), those represented by the following general formula are more preferable, because of their especially high effect of improving adhesion:

Ti(OR)$_4$ wherein, R's are each a hydrocarbon group of 1 to 20 carbon atoms, which may be substituted or not substituted.

These titanates (Y) may be used either individually or in combination.

The titanate (Y) is incorporated preferably at 0.1 to 20 parts by weight per 100 parts by weight of the component (A1), particularly preferably 1 to 10 parts by weight. It may not exhibit sufficient effect of improving adhesion at below 0.1 part, and may deteriorate storage stability of the sealant composition at above 20 parts by weight.

Silanol Condensing Catalysts

A silanol condensing catalyst may be used for the curable rubber composition (22) of the present invention. The silanol condensing catalysts useful for the present invention include divalent or tetravalent tin-based, aluminum-based and amine-based curing catalysts. Of these catalysts, the tetravalent tin-based ones are more preferable for their high catalytic activity. The tetravalent tin-based curing catalyst and the concrete examples are similar to those of the tetravalent tin compound (C) as the one constituent component for the curable rubber composition (2) described earlier.

The silanol condensing catalysts, other than the tetravalent tin-based curing catalyst, maybe used for the present invention.

The concrete examples of these catalysts useful for the present invention include divalent tin-based curing catalysts, e.g., tin octylate, aluminum-based curing catalysts, e.g., aluminum trisacetylacetonate, aluminum trisethylacetoacetate and diisopropoxy aluminum ethylacetoacetate; zirconium tetraacetylacetonate; lead octylate; amine-based curing catalysts, e.g., butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methyl morpholine, 2-ethyl-4-methylimidazole and 1,8-diazabicyclo(5,4,0)undecene-7 (DBU), and salts of these compounds and carboxylates; low-molecular-weight polyamide resins produced by the reactions between excessive quantities of polyamines and polybasic acids; products of the reactions between excessive quantities of polyamines and epoxy compounds; silane coupling agents containing amino group, e.g., γ-aminopropyltrimethoxysilane and N-(β-aminoethyl)aminopropyl methyldimethoxy silane; and other known catalysts, acidic or basic.

These catalysts may be used either individually or in combination. The silanol condensing catalyst is incorporated preferably at 0.1 to 20 parts by weight per 100 parts by weight of the component (A1), particularly preferably 1 to 10 parts by weight. The catalyst content below the above range is undesirable, because of insufficient curing speed and insufficient extent of the curing reaction, and beyond the above range is also undesirable, because of local heating or foaming occurring during the curing process to make it difficult to produce the cured product of good properties, and also may deteriorate its pot life to an unacceptable level and workability of the composition.

Other Components

The silyl-containing ethylene/α-olefin/non-conjugated polyene random copolymer rubber (A1) is itself relatively high in viscosity, and may sometimes cause workability-related problems. It is therefore a good practice to incorporate a various type of plasticizer in the copolymer rubber to an extent not harmful to adhesion of the curable rubber composition (22) of the present invention, in order to reduce its viscosity and thereby to improve its handleability.

The plasticizer useful for the present invention is not limited, and any commonly used one may be used. Preferably, it should be compatible with each component for the silyl-containing ethylene/α-olefin/non-conjugated polyene random copolymer rubber (A1) of the present invention.

The concrete examples of these plasticizers include: phthalate esters, e.g., those of dibutyl phthalate, diheptyl phthalate, di (2-ethylhexyl) phthalate, butyl benzyl phthalate, and butyl phthalyl butyl glycolate; non-aromatic, dibasic acid esters, e.g., those of dioctyl adipate and dioctyl cebacate;

esters of polyalkylene glycol, e.g., those of diethylene glycol benzoate and triethylene glycol dibenzoate; phosphate esters, e.g., those of tricresyl phosphate and tributyl phosphate; paraffin chlorides; and hydrocarbon-based compounds, e.g., alkyl diphenyl, polybutene, hydrogenated polybutene, hydrogenated α-olefin oligomer, ethylene/α-olefin oligomer, α-methyl styrene oligomer, biphenyl, triphenyl, triaryl dimethane, alkylene triphenyl, liquid polybutadiene, hydrogenated liquid polybutadiene, paraffin oil, naphthene oil, atactic polypropylene and partially hydrogenated ter-phenyl. They may be used either individually or in combination. The plasticizer may be incorporated while the polymer is being produced.

Of these compounds, hydrocarbon-based compounds free of unsaturated group, e.g., hydrogenated polybutene, hydrogenated liquid polybutadiene, hydrogenated α-olefin oligomer, paraffin oil, naphthene oil and atactic polypropylene, are more preferable for various reasons, e.g., high compatibility with each component for the rubber composition (22) of the present invention, limited effects on curing speed of the rubber composition, good resistance to weather of the cured product, and cheapness.

The plasticizer may be used in place of the solvent during the process of introducing a reactive silyl group into the above-described ethylene/α-olefin/non-conjugated polyene random copolymer rubber, for the purposes of, e.g., adjusting reaction temperature and viscosity of the reaction system. The plasticizer is incorporated preferably at 10 to 150 parts by weight per 100 parts by weight of the silyl-containing ethylene/α-olefin/non-conjugated polyene random copolymer rubber (A1), particularly preferably 30 to 100 parts by weight. The plasticizer may not sufficiently exhibit the effect of reducing viscosity at below 10 parts, whereas it may deteriorate mechanical and adhesion properties of the composition at above 150 parts by weight. The curable rubber composition (22) of the present invention may be further incorporated with a varying aging inhibitor.

The aging inhibitors useful for the present invention include phenol-based antioxidants, aromatic amine-based antioxidants, sulfur-based hydroperoxide decomposers, phosphorus-based hydroperoxide decomposers, benzotriazole-based ultra violet ray absorbers, salicylate-based ultraviolet ray absorbers, benzophenone-based ultraviolet ray absorbers, hindered amine-based light stabilizers and nickel-based light stabilizers.

The concrete examples of the phenol-based antioxidants include 2,6-di-t-butyl phenol, 2,4-di-t-butyl phenol, 2,6-di-t-butyl-4-methyl phenol, 2,5-di-t-butylhydroquinone, n-octadecyl-3-(3,5-di-t-butyl-4-hydroxyphenyl)propionate, pentaerythrityl-tetrakis[3-(3,5-di-t-butyl-4-hydroxyphenyl) propionate], 2,2'-methylenebis(4-methyl-6-t-butyl phenol), 4,4'-butylidenebis(3-methyl-6-t-butyl phenol) and 4,4'-thiobis(3-methyl-6-t-butyl phenol).

The concrete examples of the aromatic amine-based antioxidants include N,N'-diphenyl-p-phenylenediamine and 6-ethoxy-2,2,4-trimethyl-1,2-dihydroquinoline.

The concrete examples of the sulfur-based hydroxyperoxide decomposers include dilauryl-3,3'-thiodipropionate, ditridecyl-3,3'-thiodipropionate and distearyl-3,3'-thiodipropionate.

The concrete examples of the phosphorus-based hydroxyperoxide decomposers include diphenylisooctyl phosphite and triphenyl phosphite.

The concrete examples of the benzotriazole-based ultraviolet ray absorbers include 2-(3,5-di-t-butyl-2-hydroxyphenyl)-5-chlorobenzotriazole, 2-(3-t-butyl-5-methyl-2-hydroxyphenyl)-5-chlorobenzotriazol e, 2-(3,5-di-t-butyl-2-hydroxyphenyl)benzotriazole and 2-(5-methyl-2-hydroxyphenyl)benzotriazole.

The concrete examples of the salicylate-based ultraviolet ray absorbers include 4-t-butylphenylsalicylate and 2,4-di-t-butylphenyl-3,5'-di-t-butyl-4'-hydroxybenzoate.

The concrete examples of the benzophenone-based ultraviolet ray absorbers include 2,4-dihydroxybenzophenone, 2-hydroxy-4-methoxybenzophenone, 2-hydroxy-4-n-octoxybenzophenone, 2-hydroxy-4-n-dodecyloxybenzophenone and 2-hydroxy-4-benzyloxybenzophenone.

The concrete examples of the hindered amine-based light stabilizers include bis(2,2,6,6-tetramethyl-4-piperidyl)cebacate, bis(1,2,2,6,6-pentamethyl-4-piperidyl)cebacate, 1-{2-

[3-(3,5-di-t-butyl-4-hydroxyphenyl)propionyloxy]ethyl}-4-[3-(3,5-di-t-butyl-4-hydroxyphenyl)propionyloxy]-2,2,6,6-tetramethylpiperidine and 4-benzoyloxy-2,2,6,6-tetramethylpiperidine.

The concrete examples of the nickel-based light stabilizers include nickel dibutyldithiocarbamate, [2,2'-thiobis(4-t-octylphenolate)]-2-ethylhexylamine nickel (II) and [2,2'-thiobis(4-t-octylphenolate)]-n-butylamine nickel (II).

These aging inhibitors may be used either individually or in combination. They may exhibit their functions more efficiently when used in combination than individually. In particular, a combination of a phenol-based antioxidant, a salicylate-based ultraviolet ray absorber and a hindered amine-based light stabilizer greatly improves weather resistance of the silyl-containing ethylene/α-olefin/non-conjugated polyene random copolymer rubber as the component (A1), and hence is desirable.

The aging inhibitor is incorporated preferably at 0.1 to 10 parts by weight per 100 parts by weight of the component (A1), particularly preferably 0.5 to 5 parts by weight. It may not sufficiently improve resistance of the curable rubber composition to weather at below 0.1 part, and may deteriorate its economics and adhesion at above 10 parts by weight.

The curable rubber composition (22) of the present invention is incorporated, as required, with a varying adhesion improver, other than the titanates (Y).

The adhesion improvers useful for the present invention include epoxy resin, phenol resin, various silane coupling agents and aromatic polyisocyanates.

The concrete examples of the silane coupling agents useful for the present invention include amino-containing silanes, e.g., γ-aminopropyltrimethoxysilane, γ-aminopropyltriethoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-ureidopropyltrimethoxysilane, N-phenyl-γ-aminopropyltrimethoxysilane, N-benzyl-γ-aminopropyltrimethoxysilane and N-vinylbenzyl-γ-aminopropyltriethoxysilane;

mercapto-containing silanes, e.g., γ-mercaptopropyltrimethoxysilane, γ-mercaptopropyltriethoxysilane, γ-mercaptopropylmethyldimethoxysilane and γ-mercaptopropylmethyldiethoxysilane;

epoxy-containing silanes, e.g., γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane and β-(3,4-epoxycyclohexyl)ethyltriethoxysilane;

carboxysilanes, e.g., β-carboxyethyltriethoxysilane, β-carboxyethylphenylbis (2-ethoxyethoxy)silane and N-β-(carboxymethyl)aminoethyl-γ-aminopropyltrimethoxysilane;

vinyl type unsaturated group-containing silanes; e.g., vinyltrimethoxysilane, vinyltriethoxysilane, γ-methacryloyloxypropylmethyldimethoxysilane and γ-acryloyloxypropylmethyltriethoxysilane;

halogen-containing silanes, e.g., γ-chloropropyltrimethoxysilane;

silane isocyanurates, e.g., tris(trimethoxysilyl)isocyanurate; and isocyanate-containing silanes, e.g., γ-isocyanate propyltrimethoxysilane, γ-isocyanate propyltriethoxysilane, γ-isocyanate propylmethyldiethoxysilane and γ-isocyanate propylmethyldimethoxysilane.

Moreover, the modifications of these compounds as their derivatives are also useful as the silane coupling agents. These compounds include amino-modified silyl polymers, silylated amino polymers, unsaturated aminosilane complexes, block isocyanate silanes, phenylamino-long chain-alkyl silanes, aminosilylated silicone and silylated polyesters.

The silane coupling agent is incorporated preferably at 0.1 to 20 parts by weight per 100 parts by weight of the component (A1), particularly preferably 1 to 10 parts by weight.

It may not exhibit sufficient effect of improving adhesion at below 0.1 part, and may deteriorate storage stability of the sealant composition at above 20 parts by weight. These silane coupling agents may be used either individually or in combination.

The curable rubber composition (22) of the present invention is incorporated, as required, with a various filler.

The concrete examples of the fillers include wood powder, pulp, cotton chips, asbestos, glass fibers, carbon fibers, mica, walnut shell powder, rice hull powder, graphite, diatomaceous earth, white clay, fumed silica, settling silica, silicic anhydride, carbon black, calcium carbonate, clay, talc, titanium oxide, magnesium carbonate, quartz, fine aluminum powder, flint powder, and zinc powder. Of these, more preferable ones are settling silica, fumed silica, carbon black, calcium carbonate, titanium oxide and talc. They may be used either individually or in combination.

The filler is incorporated preferably at 5 to 500 parts by weight per 100 parts by weight of the component (A1), particularly preferably 20 to 350 parts, still particularly preferably 40 to 200 parts by weight.

The curable rubber composition (22) of the present invention may be further incorporated, as required, with one or more additives, in addition to the components (A) and (Y), silanol condensing catalyst, and plasticizer, aging inhibitor, adhesion improver and filler described above. The additives useful for the present invention include property adjuster which adjusts the tensile-related properties of the cured product, weather-resistant adhesion improver, radical inhibitor, metal deactivator, ozone-caused aging inhibitor, dripping inhibitor, phosphorus-based peroxide decomposer, solvent, lubricant, pigment, and foaming agent.

The concrete examples of these additives are described in, e.g., Japanese Patent Publication Nos. 69659/1992 and 108928/1995, U.S. Pat. No. 2,512,468, and Japanese Patent Laid-Open Publication No. 22904/1989.

The effect of the titanates (Y) for the present invention is also observed, even when various additives are incorporated. More concretely, the curable rubber composition (22) of the present invention, when used as a sealant for construction works, laminated glass or a sealing agent for rust-prevention or water-proof of edges (cut sections) of wired or laminated glass, will have still improved adhesion of the sealant to various objects, when incorporated with the titanates (Y).

Curable Rubber Composition (22) and its Uses

The curable rubber composition (22) of the present invention contains the curable composition with the ethylene/α-olefin/non-conjugated polyene random copolymer rubber containing a hydrolyzable silyl group as the component (A1), as described in detail earlier. More concretely, the curable rubber composition contains the organic polymer (Z) and titanates (Y). It can be suitably used for electric/ electronic device members, transportation machines, and civil engineering/construction, medical and leisure areas, as described earlier.

The curable rubber composition may be further incorporated with the above-described silanol condensing catalyst.

The curable rubber composition (22) of the present invention can be used as sealants, potting agents, coating materials or adhesives for electric/electronic device members, transportation machines, and civil engineering/construction, and leisure areas.

In other words, the present invention provides sealants, potting agents, coating materials and adhesives, composed of the curable composition containing the organic polymer (Z) and titanates (Y).

The above-described sealants, potting agents, coating materials or adhesives may be further incorporated with the above-described silanol condensing catalyst.

Curable Composition (23)

The curable composition (23) of the present invention contains the silyl-containing ethylene/α-olefin/non-conjugated polyene random copolymer rubber (A1), and can be suitably used for electric/electronic device members, transportation machines, and civil engineering/construction, medical and leisure areas, as described earlier.

The curable composition (23) of the present invention may be further incorporated, as required, with one or more additives, e.g., curing catalyst, plasticizer and filler. The curing catalysts useful for the present invention are not limited, but common silanol condensing catalysts may be used.

The concrete examples of the curing catalysts useful for the present invention include organotin, organotitanate, organoaluminum, organozirconium, amine compounds and acidic phosphate ester, and products by the reaction between an acidic phosphate ester and an amine compound, saturated or unsaturated polyvalent carboxylic acids and anhydrides thereof, products by the reaction between salt of carboxylate and an amine compound, and lead octylate.

The concrete examples of the organotin compounds include tin carboxylates, e.g., dibutyl tin diacetate, dibutyl tin dilaurate, dibutyl tin maleate, dioctyl tin maleate, dibutyl tin phthalate, tin octylate and tin naphthenate; chelate compounds, e.g., dibutyl tin diacetylacetonate; dibutyl tin methoxide; and products of the reactions between dibutyl tin oxides and phthalate esters.

The concrete examples of the organotitanate compounds include titanate esters, e.g., those of tetrabutyl titanate, tetraisopropyl titanate, tetrapropyl titanate and triethanolamine titanate; and chelate compounds, e.g., titanium tetraacetylacetonate.

The concrete examples of the organoaluminum compounds include aluminum trisacetylacetonate, aluminum trisethylacetoacetate and diisopropoxy aluminum ethylacetoacetate.

The concrete examples of the organozirconium compounds include organozirconium compounds, e.g., zirconium tetraisopropoxide and zirconium tetrabutoxide, and chelate compounds, e.g., zirconium tetraacetylacetonate.

The concrete examples of the amine compounds include butylamine, monoethanolamine, triethylenetriamine, guanidine, 2-ethyl-4-methylimidazole and 1,8-diazabicyclo(5,4,0)undecene-7 (DBU).

The acidic phosphate esters mean the phosphate esters containing the portion of —O—P (=O)(OH)—. The examples are acidic phosphate esters, such as organic acidic phosphate esters represented by the general formula;

$$(RO)_d\text{---}P(=O)\text{---}(OH)_{3-d},$$

wherein, "d" is 1 or 2; and R is an organic residue.

The organic acidic phosphate esters include the following compounds:

$(CH_3O)_2P(=O)OH,$ $(CH_3O)P(=O)(OH)_2,$ $(C_2H_5O)_2P(=O)OH,$ $(C_2H_5O)P(=O)(OH)_2,$ $[(CH_3)_2CHO]_2P(=O)OH,$ $(CH_3)_2CHOP(=O)(OH)_2,$ $(C_4H_9O)_2P(=O)OH,$ $(C_4H_9O)P(=O)(OH)_2,$ $(C_8H_{17}O)_2P(=O)OH,$ $(C_8H_{17}O)P(=O)(OH)_2,$ $(C_{10}H_{21}O)_2P(=O)OH,$ $(C_{10}H_{21}O)P(=O)(OH)_2,$ $(C_{13}H_{27}O)_2P(=O)OH,$ $(C_{13}H_{27}O)P(=O)(OH)_2,$ $(HOC_8H_{16})_2P(=O)OH,$ $(HOC_8H_{16}O)P(=O)(OH)_2,$ $(HOC_6H_{12}O)_2P(=O)OH,$ $(HOC_6H_{12}O)P(=O)(OH)_2,$ $[(CH_2OH)(CHOH)O]_2P(=O)OH,$ $[(CH_2OH)(CHOHO)O]\text{---}P(=O)\text{---}(OH)_2,$ $[(CH_2OH)(CHOH)C_2H_4O]_2P(=O)OH$ and $[(CH_2OH)(CHOH)C_2H_4O]P(=O)(OH)_2.$ The curing catalyst is incorporated at around 0 to 20 parts by weight per 100 parts by weight of the hydrolyzable silyl-containing ethylene/α-olefin/non-conjugated polyene random copolymer rubber (A1).

The plasticizer useful for the present invention is not limited, and any commonly used one may be used. Preferably, it should be compatible with each component for the curable composition (23) of the present invention. The concrete examples of these plasticizers include phthalate esters, e.g., those of dibutyl phthalate, diheptyl phthalate, di(2-ethylhexyl)phthalate, butyl benzyl phthalate and butyl phthalyl butyl glycolate; non-aromatic, dibasic acid esters, e.g., those of dioctyl adipate and dioctyl cebacate;

esters of polyalkylene glycol, e.g., those of diethylene glycol dibenzoate and triethylene glycol dibenzoate; phosphate esters, e.g., those of tricresyl phosphate and tributyl phosphate; paraffin chlorides; and hydrocarbon-based compounds, e.g., alkyl diphenyl, polybutene, hydrogenated polybutene, ethylene/α-olefin oligomer, α-methyl styrene oligomer, biphenyl, triphenyl, triaryl dimethane, alkylene triphenyl, liquid polybutadiene, hydrogenated liquid polybutadiene, paraffin oil, naphthene oil, atactic polypropylene and partially hydrogenated ter-phenyl. They may be used either individually or in combination. The plasticizer may be incorporated while the polymer is being produced.

Of these compounds, hydrocarbon-based compounds free of unsaturated group, e.g., hydrogenated polybutene, hydrogenated liquid polybutadiene, paraffin oil, naphthene oil and atactic polypropylene, are more preferable for various reasons, e.g., high compatibility with each component for the composition (23) of the present invention, limited effects on curing speed of the curable composition, good resistance to weather of the cured product, and cheapness.

The plasticizer may be used in place of the solvent during the process of introducing a reactive silicon group into the saturated hydrocarbon-based polymer, for the purposes of, e.g., adjusting reaction temperature and viscosity of the reaction system.

The plasticizer will bring about the favorable effect when incorporated at 100 parts by weight or less per 100 parts by weight of the component (A1).

The concrete examples of the fillers include inorganic fillers, e.g., calcium carbonate, talc, diatomaceous earth, mica, kaolin, magnesium carbonate, vermiculite, titanium oxide, graphite, alumina, silica, glass balloons, silas balloons, silica balloons, calcium oxide, magnesium oxide and silicon oxide; and organic fillers, e.g., powdered rubber, recycled rubber, fine powders of thermosetting or thermoplastic resins, and hollow particles of polyethylene and the like. The filler is incorporated at around 3 to 300 parts by weight per 100 parts by weight of the silyl-containing ethylene/α-olefin/non-conjugated polyene random copolymer rubber (A1).

The aging inhibitors useful for the present invention include commonly used known ones, e.g., sulfur-based ones, radical inhibitors and ultraviolet ray absorbers.

The sulfur-based aging inhibitors useful for the present invention include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, mercaptols, monothio acids, polythio acids, thioamides, and sulfoxides.

The concrete examples of the sulfur-based aging inhibitors include mercaptans, e.g., 2-mercaptobenzothiazole; salts of mercaptans, e.g., zinc salt of 2-mercaptobenzothiazole; sulfides, e.g., 4,4'-thio-bis(3-methyl-6-t-butyl phenol), 4,4'-thio-bis(2-methyl-6-t-butyl phenol), 2,2'-thio-bis(4-methyl-6-t-butyl phenol), bis(3-methyl-4-hydroxy-5-t-butylbenzyl)sulfide, terephthaloyl di(2,6-dimethyl-4-t-butyl-3-hydroxybenzyl)sulfide, phenothiazine, 2,2'-thio-bis(4-octylphenol)nickel, dilauryl thiodipropionate, distearyl thiodipropionate, dimyristyl thiodipropionate, ditridecyl thiodipropionate, distearyl β,β'-thiodibutyrate, lauryl-stearyl thiodipropionate and 2,2-thio[diethyl-bis-3-(3,5-di-t-butyl-4-hydroxy phenol)propionate]; polysulfides, e.g., 2-benzothiazole disulfide; dithiocarboxylates, e.g., zinc dibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethyldithiocarbamate; thioureas, e.g., 1-butyl-3-oxy-diethylene-2-thiourea, di-o-tolyl-thiourea and ethylene thiourea; and thiophosphates, e.g., trilauryltrithiophosphate.

The sulfur-based aging inhibitor prevents decomposition/aging of the main chain under heating much more efficiently than the other types for the composition of the present invention, controlling the problems, e.g., residual surface tackiness.

The radical inhibitors useful for the present invention include phenol-based ones, e.g., 2,2-methylene-bis(4-methyl-6-t-butyl phenol) and tetrakis[methylene-3-(3,5-di-t-butyl-4-hydroxyphenyl)propio nate]methane; and amine-based ones, e.g., phenyl-β-naphthylamine, α-naphthylamine, N,N'-sec-butyl-p-phenylenediamine, phenothiazine and N,N'-diphenyl-p-phenylenediamine.

The ultraviolet ray absorbers useful for the present invention include 2-(2'-hydroxy-3',5'-di-t-butylphenyl)benzotriazole and bis(2,2,6,6-tetramethyl-4-piperidine)cebacate.

The aging inhibitor, when used, is incorporated preferably at around 0.1 to 20 parts by weight per 100 parts by weight of the silyl-containing ethylene/α-olefin/non-conjugated polyene random copolymer rubber (A1), more preferably 1 to 10 parts by weight.

The other additives useful for the present invention include dipping inhibitors, e.g., hydrogenated castor oil, organic bentonite and calcium stearate; colorants, tackifiers and solvents.

The curable composition (23) thus produced to contain the component (A1) is useful as a coating material, in particular as a coating material for underbodies and a sealant for bodies of vehicles for rust-prevention and vibration-insulation, and matches the requirements by the recent automobile industry.

Curable Composition (23) and its Uses

The curable composition (23) of the present invention containing the silyl-containing ethylene/α-olefin/non-conjugated polyene random copolymer rubber as the component (A1) can be suitably used for electric/electronic device members, transportation machines, and civil engineering/construction, medical and leisure areas, as described earlier. It is particularly useful as a coating material for vehicles, and other purposes.

For example, the curable composition (23) of the present invention can be suitably used as sealants, potting agents, coating materials for purposes other than vehicles or adhesives for electric/electronic device members, transportation machines, and civil engineering/construction, and leisure areas.

The curable composition (23) of the present invention is incorporated in the coating material (23)' for vehicles, sealant (24)', potting material (24)' and coating material (24)' for purposes other than vehicles and adhesive (24)', all of the present invention.

Sealant (25)' for Laminated Glass

The sealant(25)' of the present invention for laminated glass contains the silyl-containing ethylene/α-olefin/non-conjugated polyene random copolymer rubber (A2), curing catalyst (H) and water or hydrate of a metallic salt (B11).

The sealant (25)' of the present invention for laminated glass contains the silyl-containing ethylene/α-olefin/non-conjugated polyene random copolymer rubber (A2) preferably at 5 to 50% by weight, particularly preferably 5 to 40% by weight.

The curing catalyst (H) for the present invention may be a known silanol condensing catalyst. The concrete examples of the curing catalysts useful for the present invention are described earlier.

The curing catalyst (H) is incorporated preferably at 0.1 to 20 parts by weight per 100 parts by weight of the silyl-containing ethylene/α-olefin/non-conjugated polyene random copolymer rubber (A2), more preferably 1 to 10 parts by weight. The catalyst content below the above range may cause insufficient curing speed and insufficient extent of the curing reaction. The content beyond the above range is also undesirable, because it may cause local heating or foaming occurring during the curing process to make it difficult to produce the cured product of good properties, which may deteriorate pot life to an unacceptable level and workability of the composition.

Water or hydrate of a metallic salt (B11) for the present invention functions as the source of water necessary for condensing/curing of the silyl-containing ethylene/α-olefin/non-conjugated polyene random copolymer rubber (A2), and promotes formation of the crosslinked structure.

When the water source is other than water, widely varying common commercial hydrates of metals can be used. These hydrates include those of alkali-earth metals and other metals. Of these, the more preferable ones are those of alkali and alkali-earth metals. More concretely, they include $MgSO_4 \cdot 7H_2O$, $Na_2CO_3 \cdot 10H_2O$, $Na_2SO_4 \cdot 10H_2O$, $Na_2S_2O_3 \cdot 5H_2O$, $Na_3PO_4 \cdot 12H_2O$ and $Na_2B_4O_7 \cdot 10H_2O$.

Water as the component (B11) is incorporated preferably at 0.01 to 25 parts by weight per 100 parts by weight of the silyl-containing ethylene/α-olefin/non-conjugated polyene random copolymer rubber (A2), more preferably 0.05 to 15 parts, still more preferably 0.2 to 5 parts by weight.

A hydrate of metallic salt as the component (B11) is incorporated preferably at 0.01 to 50 parts by weight per 100 parts by weight of the silyl-containing ethylene/α-olefin/non-conjugated polyene random copolymer rubber (A2), more preferably 0.1 to 30 parts, still more preferably 1 to 10 parts by weight.

Water and hydrates of metallic salts may be used either individually or in combination.

The sealant (25)' of the present invention for laminated glass may be incorporated with various additives.

The representative additive is a tackifier, which is represented by a silane coupling agent. It is needless to say that a tackifier other than silane coupling agent may be used. The silane coupling agent is a compound which has a group containing the silicon atom to which a hydrolyzable group is bonded (hereinafter referred to as hydrolyzable silicon group) and one or more other functional groups. The hydrolyzable group is preferably methoxy, ethoxy or the like viewed from hydrolysis speed. It preferably has 2 or more hydrolyzable groups, still more preferably 3 or more.

The functional groups useful for the present invention, other than the hydrolyzable silicon groups, include primary, secondary and tertiary amino, mercapto, epoxy, carboxyl, vinyl, isocyanate, isocyanurate, and halogen. Of these, primary, secondary or tertiary amino, epoxy, isocyanate and isocyanurate are more preferable, and isocyanate and epoxy are still more preferable.

The concrete examples of the silane coupling agents useful for the present invention include:

amino-containing silanes, e.g., γ-aminopropyltrimethoxysilane, γ-aminopropyltriethoxysilane, γ-aminopropylmethyldimethoxysilane, γ-(2-aminoethyl)aminopropyltrimethoxysilane, γ-(2-aminoethyl)aminopropylmethyldiemethoxysilane, γ-(2-aminoethyl)aminopropyltriethoxysilane, γ-(2-aminoethyl)aminopropyltriethoxysilane, γ-ureidopropyltrimethoxysilane, n-β-(n-vinylbenzylaminoethyl)-γ-aminopropyltriethoxysilane and γ-anilinopropyltrimethoxysilane;

mercapto-containing silanes, e.g., γ-mercaptopropyltrimethoxysilane, γ-mercaptopropyltriethoxysilane, γ-mercaptopropylethyldimethoxysilane and γ-mercaptopropylmethyldiethoxysilane;

epoxy-containing silanes, e.g., γ-glycidoxypropyltrimethoxysilane, γ-glycidoxypropyltriethoxysilane, γ-glycidoxypropylmethyldimethoxysilane, and β-(3,4-epoxycyclohexyl) ethyltriethoxysilane;

carboxysilanes, e.g., β-carboxyethyltriethoxysilane, β-carboxyethylphenylbis (2-methoxyethoxy)silane and n-β-(n-carboxymethylaminoethyl)-γ-aminopropyltrimethoxysilane;

vinyl type unsaturated group-containing silanes; e.g., vinyltrimethoxysilane, vinyltriethoxysilane, γ-methacryloyloxypropylmethyldimethoxysilane and γ-acryloyloxypropylmethyltriethoxysilane;

halogen-containing silanes, e.g., γ-chloropropyltrimethoxysilane;

silane isocyanurates, e.g., tris(trimethoxysilyl)isocyanurate; and isocyanate-containing silanes, e.g., γ-isocyanate propyltrimethoxysilane and γ-isocyanate propyltriethoxysilane.

Moreover, the modifications of these compounds as their derivatives are also useful as the silane coupling agents. These compounds include amino-modified silyl polymers, silylated amino polymers, unsaturated aminosilane complexes, block isocyanate silanes, phenylamino-long chain-alkyl silanes, aminosilylated silicone and silylated polyesters. These silane coupling agents tend to be hydrolyzed easily in the presence of moisture, but can be kept stable when incorporated in the component (A2) for the sealant (25)' of the present invention for laminated glass.

The tackifiers, other than a silane coupling agent, useful for the present invention include commonly used adhesives, and other compounds. The concrete examples of these tackifiers include phenolic resin, epoxy resin, coumarone/indene resin, rosin ester resin, terpene/phenol resin, α-methyl styrene/vinyl toluene copolymer, polyethylmethyl styrene, alkyl titanate, and aromatic polyisocyanate.

The tackifier is incorporated at 0.01 to 20 parts by weight per 100 parts by weight of the silyl-containing ethylene/α-olefin/non-conjugated polyene random copolymer rubber (A2), particularly preferably 0.1 to 10 parts by weight. These tackifiers may be used either individually or in combination.

The sealant (25)' of the present invention for laminated glass may be further incorporated with a varying type of filler, to still improve its properties. The fillers useful for the present invention include reinforcing fillers, e.g., fumed silica, settling silica, silicic anhydride, silicic hydrate, talc and carbon black; other fillers, e.g., limestone powder, colloidal calcium carbonate, diatomaceous earth, fired clay, clay, titanium oxide, bentonite, organicbentonite, ferric oxide, zinc oxide and activated zinc white; and fibrous fillers, e.g., glass fibers or filaments.

Of these, the reinforcing filler, mainly of fumed silica, settling silica, silicic anhydride, silicic hydrate, talc or carbon black, is used when the curable sealant of high strength is to be produced. The cured product of good mechanical properties in terms of strength and modulus can be prepared, when it is incorporated at 1 to 100 parts by weight per 100 parts by weight of the silyl-containing ethylene/α-olefin/non-conjugated polyene random copolymer rubber (A2).

On the other hand, when the cured product of low modulus and high elongation is to be produced, it is recommended to incorporate the other type of filler, e.g., limestone powder, colloidal calcium carbonate, diatomaceous earth, fired clay, clay, titanium oxide, bentonite, organicbentonite, ferric oxide, zinc oxide or activated zinc white, at 5 to 400 parts by weight per 100 parts by weight of the silyl-containing ethylene/α-olefin/non-conjugated polyene random copolymer rubber (A2).

It is needless to say that these fillers may be used either individually or in combination.

The filler may be incorporated in the silyl-containing ethylene/α-olefin/non-conjugated polyene random copolymer rubber (A2), curing catalyst as the component (H), or both.

When incorporated with a plasticizer in combination with the filler, the sealant (25)' of the present invention for laminated glass will have one or more additional advantages, e.g., further improved elongation of the cured product and a larger quantity of the filler being incorporated.

For the plasticizer, any commonly used one may be used. Preferably, it should be compatible with the silyl-containing ethylene/α-olefin/non-conjugated polyene random copolymer rubber (A2).

The concrete examples of the plasticizers include process oil, polybutene, hydrogenated polybutene, α-methyl styrene oligomer, liquid polybutadiene, hydrogenated liquid polybutadiene, paraffin oil, naphthene oil and atactic polypropylene. Of these, more preferable ones are the hydrocarbon-based compounds free of unsaturated group, e.g., process oil, hydrogenated polybutene, hydrogenated liquid polybutadiene, paraffin oil and naphthene oil.

The plasticizer may be used in place of the solvent during the process of introducing a reactive silicon group into the ethylene/α-olefin/non-conjugated polyene copolymer rubber, for the purposes of, e.g., adjusting reaction temperature and viscosity of the reaction system.

The plasticizer, when used, is incorporated preferably at around 10 to 500 parts by weight per 100 parts by weight of the silyl-containing ethylene/α-olefin/non-conjugated polyene random copolymer rubber (A2), more preferably around 20 to 300 parts by weight.

The sealant (25)' of the present invention for laminated glass may be adequately incorporated, as required, with various additives, e.g., aging inhibitor, light stabilizer, flame retardant, thixotropy enhancer, pigment and surfactant.

The aging inhibitors useful for the present invention include commonly used known ones, e.g., sulfur-based ones, radical inhibitors and ultraviolet ray absorbers.

The sulfur-based aging inhibitors useful for the present invention include mercaptans, salts thereof, sulfides including sulfide carboxylate esters and hindered phenol-based sulfides, polysulfides, dithiocarboxylates, thioureas, thiophosphates, sulfonium compounds, thioaldehydes, thioketones, mercaptals, mercaptols, monothio acids, polythio acids, thioamides, and sulfoxides.

The concrete examples of the sulfur-based aging inhibitors include mercaptans, e.g., 2-mercaptobenzothiazole; salts of mercaptans, e.g., zinc salt of 2-mercaptobenzothiazole; sulfides, e.g., 4,4'-thio-bis(3-methyl-6-t-butyl phenol), 4,4'-thio-bis(2-methyl-6-t-butyl phenol), 2,2'-thio-bis(4-methyl-6-t-butyl phenol), bis(3-methyl-4-hydroxy-5-t-butyl-benzyl)sulfide, terephthaloyl di(2,6-dimethyl-4-t-butyl-3-hydroxybenzyl)sulfide, phenothiazine, 2,2'-thio-bis(4-octyl phenol)nickel, dilauryl thiodipropionate, distearyl thiodipropionate, dimyristyl thiodipropionate, ditridecyl thiodipropionate, distearyl β,β'-thiodibutyrate, lauryl-stearyl thiodipropionate and 2,2-thio[diethyl-bis-3-(3,5-di-t-butyl-4-hydroxy phenol)propionate]; polysulfides, e.g., 2-benzothiazole disulfide; dithiocarboxylates, e.g., zinc dibutyldithiocarbamate, zinc diethyldithiocarbamate, nickel dibutyldithiocarbamate, zinc di-n-butyldithiocarbamate, dibutyl ammonium dibutyldithiocarbamate, zinc ethyl-phenyl-dithiocarbamate and zinc dimethyldithiocarbamate; thioureas, e.g., 1-butyl-3-oxy-diethylene-2-thiourea, di-o-tolyl-thiourea and ethylene thiourea; and thiophosphates, e.g., trilauryltrithiophosphate.

The sulfur-based aging inhibitor prevents decomposition/aging of the main chain under heating much more efficiently than the other types for the rubber composition of the present invention, controlling the problems, e.g., residual surface tackiness.

The radical inhibitors useful for the present invention include phenol-based ones, e.g., 2,2-methylene-bis(4-methyl-6-t-butyl phenol) and tetrakis[methylene-3-(3,5-di-t-butyl-4-hydroxyphenyl)propionate] methane; and amine-based ones, e.g., phenyl-β-naphthylamine, α-naphthylamine, N,N'-sec-butyl-p-phenylenediamine, phenothiazine and N,N'-diphenyl-p-phenylenediamine.

The ultraviolet ray absorbers useful for the present invention include 2-(2'-hydroxy-3',5'-di-t-butylphenyl)benzotriazole and bis(2,2,6,6-tetramethyl-4-piperidine)cebacate.

The aging inhibitor, when used, is incorporated preferably at around 0.1 to 20 parts by weight per 100 parts by weight of the silyl-containing ethylene/α-olefin/non-conjugated polyene random copolymer rubber (A2), more preferably around 1 to 10 parts by weight.

Sealant (26)' for Laminated Glass

The sealant (26)' of the present invention for laminated glass contains the silyl-containing ethylene/α-olefin/non-conjugated polyene random copolymer rubber (A2), a hot melt resin (X), a curing catalyst (H) and water or a hydrate of a metallic salt (B11).

The silyl-containing ethylene/(α-olefin/non-conjugated polyene random copolymer rubber (A2), being a hydrocarbon-based polymer, shows good moisture shielding and water-proof properties, is highly adhesive to various inorganic base materials, e.g., glass and aluminum, and gives the cured product which shields moisture well.

The sealant (26)' of the present invention for laminated glass contains the ethylene/α-olefin/non-conjugated polyene random copolymer rubber (A2) preferably at 5 to 50% by weight, more preferably 10 to 50%, in order to secure a sufficient tackiness (initial adhesion) to temporarily tack a spacer to glass in the laminated glass production line.

The hot melt resin (X) for the present invention is not limited, and common commercial ones can be used. These include, for example, EVA-, polyamide-, polyester-, polyurethane-, acrylic-, butyl rubber- and polyolefin-based hot melt resins.

The hot melt resin preferably has a softening temperature of around 100 to 250° C. viewed from workability, although not limited thereto.

The more preferable ones include butyl rubber-based hot melt resins (hot melt butyl). The hot melt butyl useful for the present invention is not limited, and common, commercial ones can be used. They may be free of additives, or incorporated with one or more of additives, e.g., filler. Those useful for the present invention include butyl rubber having an unsaturation degree of around0.5to5.0 (IIR), Vistanex Series (Exxon Mobil) Terostat Series (Teroson) and Hamatite Series (Yokohama Rubber)

The hot melt resin (X) for the present invention, e.g., hot melt butyl, is directly used without being vulcanized.

The sealant (26)' of the present invention for laminated glass contains the hot melt resin (X) preferably at 20 to 95% by weight, more preferably 50 to 90%, in order to secure a sufficient tackiness (initial adhesion) to temporarily tack a spacer to glass in the laminated glass production line.

The curing catalyst (H) is incorporated preferably at 0.1 to 20 parts by weight per 100 parts by weight of the component (A2), more preferably 1 to 10 parts, in order to prevent local heating or foaming, and secure an adequate pot life at an adequate curing speed.

Water as the component (B11) is incorporated preferably at 0.01 to 25 parts by weight per 100 parts by weight of the component (A2), more preferably 0.05 to 15 parts by weight, still more preferably 0.2 to 5 parts.

The hydrate of a metallic salt as the component (B11) is incorporated preferably at 0.01 to 50 parts by weight per 100 parts by weight of the component (A2), more preferably 0.1 to 30 parts by weight, still more preferably 1 to 10 parts.

Water and the hydrates of metallic salts as the component (B11) may be used either individually or in combination.

Effects of the Invention (1) The curable elastomer composition (1) of the present invention contains the curable composition with the silyl-containing ethylene/α-olefin/non-conjugated polyene random copolymer rubber as the component (A1), as described in detail earlier. More concretely, it contains the organic polymer (Z) containing a specific hydrolyzable silyl group and essentially no unsaturated double bond in the main chain, and the compound (B1) having a silanol group and/or the compound which can react with moisture to form a compound having a silanol group in the molecule. As such, it improves elongation and residual tackiness on the surface of the cured product, is cured quickly, and gives the cured product high in resistance to weather.

Therefore, the curable elastomer composition (1) of the present invention is suitable for adhesives, tackifiers, paints, sealants, waterproof materials, spray materials, shaping materials and casting rubber materials.

(2) The curable rubber composition (2) of the present invention contains the ethylene/α-olefin/non-conjugated polyene random copolymer rubber (A1) containing a specific silyl group. More concretely, it contains the organic polymer (Z) containing a specfic hydrolyzable silyl group and essentially no unsaturated double bond in the main chain, a tetravalent tin compound (C) and a specific silicon compound (B2). As such, it is highly resistant to weather, cured quickly, and can greatly improve adhesion to various objects. When incorporated with various additives, the curable rubber composition (2) of the present invention can be further improved in adhesion to various base materials.

The curable rubber composition (2) of the present invention is particularly useful for an elastomer sealant particularly required to be cured very quickly, e.g., a sealant for laminated glass, and an electrical insulator, e.g., an insulating coating material for wires and cables.

(3) The present invention can provide the curable composition (3), cured quickly, and excellent in residual tackiness, resistance to weather and adhesion to paints.

(4) The curable composition (4) of the present invention can form a rubber-like elastomer, good in storage stability, high in curing speed, excellent in tensile properties, free of residual tackiness, and excellent in resistance to weather.

(5) The rubber composition (5) of the present invention curable at normal temperature contains the silyl-containing ethylene/α-olefin/non-conjugated polyene random copolymer rubber (A1) or the organic polymer (Z) containing a specific hydrolyzable silyl group and essentially no unsaturated double bond in the main chain, and a specific silane compound (B5). As such, it is cured quickly and excellent in resistance to weather, and can give the cured product (cured coating film) excellent in adhesion.

The rubber composition (5) of the present invention curable at normal temperature is particularly adhesive to the coating film of conventional paints, e.g., those of melamine alkyd and melamine acrylic resin, and suitably used for, e.g., paints for repairing automobiles.

(6) The curable rubber composition (6) of the present invention contains the ethylene/α-olefin/non-conjugated polyene random copolymer rubber (A1) having a specific hydrolyzable silyl group or the organic polymer (Z) containing a specific hydrolyzable silyl group and essentially no unsaturated double bond in the main chain, specific amines (D) and a specific silane coupling agent (B6). As such, it can be easily cured with moisture in air at normal temperature or under heating without affecting adversely the properties of its cured product. It can be cured quickly, and gives the cured product (cured coating film) excellent in resistance to weather.

Therefore, the curable rubber composition (6) of the present invention can find wide uses for paints curable at normal temperature or under heating, in particular those suitable for repairing automobiles, new car production lines, precoated metals, glass, rust-prevention of heavy structures (e.g., bridges) and construction materials, and also for coating materials, adhesives and sealants.

(7) The curable composition (7) of the present invention is cured quickly, and gives the cured product of greatly improved adhesive strength and weather-resistance adhesion while keeping its modulus low.

(8) The curable composition (8) of the present invention is cured quickly, and can greatly improve adhesive strength and weather-resistance adhesion of the cured product while keeping its modulus low. It also shows excellent characteristics in storage stability.

(9) The curable rubber composition (9) of the present invention contains the silyl-containing ethylene/α-olefin/non-conjugated polyene random copolymer rubber (A1) or the organic polymer (Z) containing a specific hydrolyzable silyl group and essentially no unsaturated double bond in the main chain, alcohols (B9) and/or a hydrolyzable ester compound (I), a hydrolyzable organosilicon compound (B10), and, as required, a curing promoter. As such, it is excellent in storage stability and cured quickly, and can give the cured product excellent in resistance to weather.

The curable rubber composition (9) of the present invention is useful for paints, and quickly cured at normal temperature to give coating films of very excellent surface gloss. Incorporation of ethyl silicate in the ethylene/α-olefin/non-conjugated polyene random copolymer rubber (A1) allows to freely adjust surface hardness of the coating film.

Moreover, the curable rubber composition (9) of the present invention is useful not only for paints but also for coating compositions for, e.g., aircraft, buildings and automobiles, sealant compositions and surface-treating agents for various inorganic materials.

(10) The curable rubber composition (10) of the present invention contains water or a hydrate of metallic salt as the source of water necessary for the curing reaction, together with a silanol condensing catalyst. The composition shows essentially no deterioration in curability (curing speed) after being stored, and is high in curing speed and excellent in resistance to weather. Moreover, the curable rubber composition (10) of the present invention can be incorporated with a compound having a reactive silicon group readily reactive with moisture, e.g., a silane coupling agent. It shows little crosslinking reaction while being stored, which prevented from increasing in viscosity.

(11) The rubber composition (11) of the present invention contains the ethylene/α-olefin/non-conjugated polyene random copolymer rubber (A2) containing the hydrolyzable silyl group represented by the above-described formula (1) in the molecule, and an organosilicon polmer (K1). As such, it is well workable and cured sufficiently quickly, and gives the cured product excellent in various characteristics, e.g., resistance to weather, heat and water, and strength and elongation. Incorporation of a polysiloxane having 2 or more silanol groups brings about an advantage of very high curability deep inside of the composition. Therefore, the rubber composition (11) of the present invention is particularly suitable for sealants, adhesives, paints, waterproof materials, spray materials, shaping materials and casting rubber materials.

(12) The rubber composition (12) of the present invention contains the ethylene/α-olefin/non-conjugated polyene random copolymer rubber (A2) containing the hydrolyzable silyl group represented by the above-described formula (1) in the molecule, an organic rubber (K2) and a crosslinking agent (M) for the organic rubber (K2). As such, it is vulcanized quickly, and gives the vulcanized curable rubber elastomer excellent in various characteristics, e.g., resistance to weather, heat and chemicals, and mechanical strength. Therefore, it is particularly suitable for hoses, vibration insulators, belts, coupling agents, weather strips, glass channels, cable coatings, condenser-sealing rubber, water-proof materials, sealants, adhesives, sealants for laminated glass, and formed articles, e.g., shoe soles.

(13) The present invention can give not only the cured product excellent in adhesion, greatly changed in the layered structure, and low in elasticity and high in elongation, but also the one high in modulus of elasticity and tensile shear strength by decreasing size of the epoxy resin particles dispersed therein and increasing content of the epoxy resin in the matrix. The rubber composition (13) of the present invention can be cured sufficiently quickly, and give the cured product high in resistance to weather.

(14) The present invention provides a high-strength cured product, improved in toughness and strength without being affected by moisture quantity. The curable rubber composition (14) of the present invention can be cured sufficiently quickly, and give the cured product high in resistance to weather.

(15) The curable rubber composition (15) of the present invention contains the ethylene/α-olefin/non-conjugated polyene random copolymer rubber (A2) containing the hydrolyzable silyl group represented by the above-described formula (1) in the molecule, calcium carbonate (L1) and talc (L2). As such, it is well balanced between workability and mechanical characteristics of the cured product, cured sufficiently quickly, and gives the cured product excellent in resistance to weather. Therefore, it is suitably used as a sealant for laminated glass, and also for other purposes, e.g., elastomer sealants for construction, and sealing materials for SSG construction method, rust-prevention or water-proof of edges (cut sections) of wired or laminated glass.

(16) The curable composition (16) of the present invention exhibits good weather-resistant adhesion even to a transparent object for which the conventional composition is difficult to exhibit weather-resistant adhesion, e.g., various types of surface-treated heat ray reflective glass. Moreover, it is cured quickly, and gives the cured product of high resistance to weather.

(17) The curable rubber composition (17) of the present invention is cured quickly, high in resistance to weather, and gives the cured product of high resistance to heat.

The curable rubber composition (17) of the present invention is suitably used for adhesives, tackifiers, paints, sealant compositions, waterproof agents, spray materials, shaping materials and casting rubber materials.

(18) The curable composition (18) of the present invention is cured quickly, and greatly improved in adhesion to various objects and various glassy base materials, in particular in weather-resistant adhesion to heat ray reflective glass. It is also excellent in resistance to weather. When incorporated with various additives, the curable composition (18) of the present invention is particularly useful for elastomer sealants, e.g., those for laminated glass and SSG construction method, which are required to be adhesive to various objects and weather-resistant adhesive to glassy base materials.

(19) The tackifier composition (19) of the present invention contains the silyl-containing ethylene/α-olefin/non-conjugated polyene random copolymer rubber (A1) or the organic polymer (Z) containing a hydrolyzable silyl group and essentially no unsaturated double bond in the main chain, a specific curing catalyst (H1 or H2) for the condensing reaction between the groups having the hydrolyzable silicon in the component (Z), and tackiness imparting resin (W). As such, it is excellent in releasability for silicon releasing paper or film, cured quickly, and excellent in resistance to weather.

The tackifier composition (19) of the present invention is applicable to the products required to be releasable from silicone releasing paper or film, e.g., double-faced tapes, labels and sheets.

(20) The rubber composition (20) of the present invention contains the ethylene/α-olefin/non-conjugated polyene random copolymer rubber (A1) having a hydrolyzable silyl group at the terminal or in the side chain or the organic polymer (Z) containing a specific hydrolyzable silyl group and essentially no unsaturated double bond in the main chain, and a specific curing catalyst (one of H3 to H7). As such, it can be greatly improved in pot life in an open atmosphere, and is cured quickly and excellent in resistance to weather.

The rubber composition (20) of the present invention is curable at normal or low temperature, and hence it is useful for paints or coating materials.

Moreover, the rubber composition (20) of the present invention can be blended with various resins used for traditional paints and coating materials, e.g., lacquer-, acrylic lacquer-, thermosetting acrylic, alkyd, melamine and epoxy resins in an adequate ratio. When blended, it can be improved in properties, e.g., adhesion and resistance to weather, of the traditional paints and coating materials.

Still moreover, the rubber composition (20) of the present invention is useful for coating and sealant compositions for, e.g., aircraft, structures, automobiles and glass, and surface-treating agents for various inorganic materials.

(21) The curable composition (21) of the present invention, comprising the specific copolymer rubber as the component (A1) and a specific curing catalyst as the component (H8), is cured notably quicker than the conventional curable composition. It is also greatly improved in resistance to weather.

The curable composition (21) of the present invention, exhibiting the above effects, is useful not only for tackifiers and sealants, but also for adhesives, shaping materials, vibration insulators, foaming materials, paints and spray materials.

(22) The curable rubber composition (22) of the present invention is excellent in resistance to weather, and can be greatly improved in curing speed and adhesion to various objects. When incorporated with various additives, the curable rubber composition (22) of the present invention is particularly useful for elastomer sealants, e.g., those for laminated glass and SSG construction method, which are required to be adhesive to various objects.

(23) The curable composition (23) of the present invention can be suitably used for electric/electronic device members, transportation machines, and civil engineering/construction, medical and leisure areas, particularly useful as a coating material (23)' for vehicles, and also for other purposes, e.g., sealants, potting agents and coating materials for purposes other than vehicles, and adhesives, all falling into the compositions.

(23)' The coating material of the present invention for vehicles can meet the requirements by the automobile industry for decreasing weight of vehicles, and saving resources and energy by decreasing temperature and time for baking. Moreover, it can be made into thin films which show excellent rust prevention, vibration insulation and resistance to weather, even when prepared under curing conditions of low temperature and short time.

(25)' The sealant of the present invention for laminated glass contains the ethylene/α-olefin/non-conjugated polyene random copolymer rubber (A2) having, in the molecule, a hydrolyzable silyl group represented by the general formula (1), a curing catalyst (H) and water or a hydrate of a metallic salt (B11). As such, it has various favorable characteristics, e.g., resistance to weather and heat, non-contaminating, low moisture-permeation, weather-resistant adhesion, and low odor. Moreover, it is excellent in mechanical characteristics, and can be produced at low cost.

(26)' The sealant of the present invention for laminated glass contains the ethylene/α-olefin/non-conjugated polyene random copolymer rubber (A2) having, in the molecule, a hydrolyzable silyl group represented by the general formula (1), a hot melt resin (X), a curing catalyst (H) and water or a hydrate of a metallic salt (B11). As such it is improved in dependence of its structural strength on temperature and in adhesion to a base material as compared with the conventional hot melt resin, while keeping its steam impermeability. Therefore, it is suitably used as a primary sealant for dual sealing or a sealant for single sealing for laminated glass.

EXAMPLES

The present invention is explained by EXAMPLES which by no means limit the present invention.

Examples A Series

The composition, iodine value, intrinsic viscosity [η] and molecular weight distribution (Mw/Mn) of the copolymer rubber used in each of EXAMPLES and COMPARATIVE EXAMPLES were determined by the following methods.

(1) Composition of the Copolymer Rubber

Composition of the copolymer rubber was determined by the $^{13}$C-NMR method.

(2) Iodine Value of the Copolymer Rubber

Iodine value of the copolymer rubber was determined by the titration method.

(3) Intrinsic Viscosity [η]

Intrinsic viscosity [η] of the copolymer rubber was measured in decalin kept at 135° C.

(4) Molecular Weight Distribution (Mw/Mn)

Molecular weight distribution (Mw/Mn) of the copolymer rubber was defined as ratio of weight-average molecular weight (Mw) to number-average molecular weight (Mn), both determined by GPC with GMH-HT or GMH-HTL (TOSOH CORP.) as the column and orthodichlorobenzene as the solvent.

The curing speed tests and accelerated weather resistance tests were conducted by the following methods for EXAMPLES and COMPARATIVE EXAMPLES (1) Curing Speed Test The curable composition (stock material) was cured under the conditions of 50° C. and 50% RH (relative humidity) for 24 hours in a mold, 20 by 80 by 5 mm in size.

Next, the cured product was released from the mold, and thickness of the cured portion was measured by a dial gauge of weak spring force to 0.1 mm, to evaluate its curing speed. It was marked with ⊙ when its thickness was 1 mm or more, Δ when it was 0.5 to 1 mm, and x when it was less than 0.5 mm.

(2) Accelerated Weather Resistance Test

The weather resistance test was conducted in accordance with JIS B-7753 using a Sunshine Carbon Arc weatherometer.

<Testing Conditions>

Light irradiation/rainfall cycles: Irradiation for 120 minutes/rainfall for 18 minutes
Black panel temperature: 63±2° C.
Tank inside temperature: 40±2° C.
Total light irradiation time: 250 hours Production Example

[Production of silyl-containing ethylene/propylene/5-vinyl-2-norbornene Random Copolymer Rubber (A-1)]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, VO(OEt)$_2$Cl and Al (Et)$_{1.5}$Cl$_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber (A$_0$-1) in a form of uniform solution.

A small quantity of methanol was added to the polymer solution, continuously withdrawn from the reactor bottom, in order to terminate the polymerization. The polymer was separated from the solvent by steam-stripping the solution, and dried at 55° C. for 48 hours under a vacuum.

The ethylene/propylene/5-vinyl-2-norbornene random copolymer rubber (A$_0$-1) thus produced contained ethylene at 68% by mol, and had an intrinsic viscosity [η] of 0.2 dl/g measured in decalin kept at 135° C., iodine value (IV) of 10(g/100 g) and Mw/Mn of 15.

Two % toluene solution (0.3 g) of chloroplatinic acid and 1.5 g of methyldimethoxysilane were added to 100 g of the ethylene/propylene/5-vinyl-2-norbornene random copolymer rubber ($A_0$-1), and they were allowed to react with each other at 120° C. for 2 hours. The excess methyldimethoxysilane and the solvent (toluene) were distilled off from the effluent. This produced 101.5 g of the ethylene/propylene/5-vinyl-2-norbornene random copolymer rubber (A-1) containing dimethoxymethylsilyl group (—$SiCH_3(OCH_3)_2$).

Reference Example A1 n-Butyl acrylate 128 g (1 mol), 0.74 g (0.005 mols) of vinyl trimethoxysilane and 1.44 g (0.008 mols) of γ-mercaptopropylmethyldimethoxysilane were mixed with each other, to which 0.3 g of α,α'-azobisisobutylonitrile was added to be dissolved therein with stirring. A portion (30 g) of the mixed solution was put in a 300 ml, 4-mouthed flask equipped with a condenser, drip-feed funnel and agitator, after it was purged with dried nitrogen gas, and heated in a nitrogen atmosphere by an oil bath (80° C.). The polymerization started in a couple of minutes to generate heat and thicken the mixed solution. The remaining mixed solution was added dropwise through the funnel, after the heat generation calmed down, and the mixed solution was totally added in about 3 hours. Sixty mL of 20% (by weight) acetone solution of α,α'-azobisisobutylonitrile was added 15 minutes and then 30 minutes after the addition of the mixed solution was completed, and the solution was stirred for another 30 minutes under heating, to terminate the polymerization. The polymer thus produced was colorless, transparent and viscous, had a viscosity of 890 poise at 23° C., contained the residual monomer at 15% determined by gas chromatography, and had an average molecular weight of 21,000 measured by gel permeation chromatography (GPC).

Rererence Examples A2 to A7

The polymers were prepared in the same manner as in REFERENCE EXAMPLE A1, except that the components given in Table A1 were used. Viscosity, residual monomer content and average molecular weight of each polymer are given in Table A1.

TABLE A1

(Production of organic vinyl-based polymers)

| | REFERENCE EXAMPLES | | | | | |
|---|---|---|---|---|---|---|
| | A2 | A3 | A4 | A5 | A6 | A7 |
| Monomer as major ingredients (g) | BA (50) | BA (100) | BA (128) | BA (128) | BA (128) | BA (128) |
| Other monomers (g) | 2EHA (50) MAPDMS (0.50) | VAc (20) MAPDMS (0.50) | HDDA (1.70) | TMPA (1.78) | NPCDA (2.12) MAPDMS (0.70) | FA-731A (4.24) |
| Chain transfer agent (g) | MPTES (5.50) | MPDMS (3.50) | MPDMS (1.70) | MPDMS (3.25) | MPDMS (3.61) | MPDMS (4.93) |
| Polymerization initiator (g) | AIBN (0.35) | AIBN (0.35) | AIBN (0.41) | AIBN (0.41) | AIBN (0.35) | AIBN (0.35) |
| Viscosity (poise at 23° C.)*1 | 180 | 230 | 670 | 350 | 250 | 430 |
| Residual monomer (%)*2 | 1.5 | 1.7 | 1.6 | 2.1 | 1.8 | 1.3 |
| Average molecular weight*3 | 6000 | 8000 | 15000 | 10000 | 8000 | 12000 |

*1: Determined by a B type viscometer
*2: Determined by gas chromatography (internal standard method)
*3: Determined by GPC
BA: n-butyl acrylate
2EHA: 2-Ethylhexyl acrylate
VAc: Vinyl acetate
HDDA: $CH_2$=CH—CO—O($CH_2$)$_6$O—CO—CH=$CH_2$
TMPA: ($CH_2$=CH—CO—O)$_3$C—$CH_2CH_3$
NPCDA: $CH_2$=CH—CO—O$CH_2$—C($CH_3$)$_2$—$CH_2$O—CO—CH=$CH_2$ FA-731A:
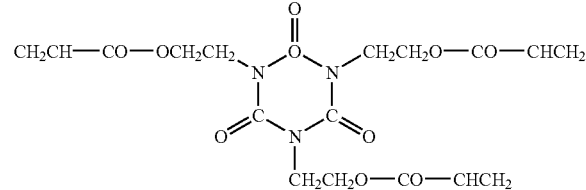

MAPDMS: $CH_2$=C($CH_3$)—CO—O($CH_2$)$_5$—Si($OCH_3$)$_2$($CH_3$)
MAPTMS: $CH_2$=C($CH_3$)—CO—($CH_2$)$_5$—Si($OCH_3$)$_3$
MPDMS: γ-mercaptopropylmethyldimethoxysilane
MPTES: γ-mercaptopropyltriethoxysilane
AIBN: α,α'-azobisisobutylonitrile

Example A1

A mixture of 30 g of the silyl-containing ethylene/propylene/5-vinyl-2-norbornene random copolymer rubber (A-1), prepared in PRODUCTION EXAMPLE, and 0.43 g of triphenyl silanol became completely transparent and uniform, when stirred at 90° C. for 2 hours. As the curing catalyst, 0.9 g of NO918 (heat-treated 2:1 mixture of dibutyl tin oxide and di-2-ethylhexyl phthalate, SANKYO ORGANIC CHEMICALS) was added to the above mixture. The resultant mixture was sufficiently stirred for mixing, subjected to centrifugal defoaming at 3,000 rpm for 10 minutes, and put in a polyethylene mold frame, 11 by 8 by 0.3 cm, in which it was cured at room temperature for 3 days and at 50° C. for 4 days. This produced a colorless, transparent cured sheet showing rubber-like elasticity.

The cured sheet was punched into a dumbbells-shaped test piece (No. 3 in accordance with JIS K-6301). It was subjected to the tensile test at a tensile speed of 200 mm/minute by an Autograph, to determine its elongation breaking strength. The results are given in Table A2.

As shown in Table A2, incorporation of triphenyl silanol greatly improves the tensile characteristics, and can improve elongation of a cured acrylic-based polymer which tends to show insufficient elongation.

Comparative Examples A1 to A23

A mixture of 30 g of the organic polymer (1), prepared in REFERENCE EXAMPLE A1, and 0.43 g of triphenyl silanol was prepared for each of COMPARATIVE EXAMPLES. It became completely transparent and uniform, when stirred at 90° C. for 2 hours. As the curing catalyst, 0.9 g of NO918 (heat-treated 2:1 mixture of dibutyl tin oxide and di-2-ethylhexyl phthalate, SANKYO ORGANIC CHEMICALS) was added to the above mixture. The resultant mixture was sufficiently stirred for mixing, subjected to centrifugal defoaming at 3,000 rpm for 10 minutes, and put in a polyethylene mold frame, 11 by 8 by 0.3 cm, in which it was cured at room temperature for 3 days and at 50° C. for 4 days. This produced a colorless, transparent cured sheet showing rubber-like elasticity.

The cured sheet was punched into a dumbbells-shaped test piece (No. 3 in accordance with JIS K-6301). It was subjected to the tensile test at a tensile speed of 200 mm/minute by an Autograph, to determine its elongation breaking strength. The results are given in Table A2, together with those of the cured sheets free of triphenyl silanol.

The cured sheets were also prepared from the organic polymers (2) to (7) prepared in REFERENCE EXAMPLES A2 to A7, and tested. The results are also given in Table A2, together with those of the cured sheets free of triphenyl silanol.

As shown in Table A2, incorporation of triphenyl silanol greatly improves the tensile characteristics, and can improve elongation of a cured acrylic-based polymer which tends to show insufficient elongation.

The cured sheets were prepared in the same manner as in COMPARATIVE EXAMPLE A1 except that triphenyl silanol was replaced by $(CH_3)_2Si(OCH_3)_2$ (hereinafter referred to as the dimethoxy compound) or $CH_2=CHSi(OCH_3)_3$ (hereinafter referred to as the trimethoxy compound) which can form a compound having 2 or more silanol groups in the molecule, to analyze their elongation and breaking strength. The results are given in Table A3 (COMPARATIVE EXAMPLES A8 to A15) and Table A4 (COMPARATIVE EXAMPLES A16 to A23).

It is found, when the results in Table A2 are compared with those in Tables A3 and A4, that a compound having only one silanol group, e.g., triphenyl silanol, greatly improves elongation of the cured sheet in a peculiar manner.

TABLE A2

| | | COMPARATIVE EXAMPLES | | | | | | | |
|---|---|---|---|---|---|---|---|---|---|
| Copolymer rubber or Polymer | | EXAMPLE A1 PRODUCTION EXAMPLE | A1 REFERENCE EXAMPLE A1 | A2 REFERENCE EXAMPLE A2 | A3 REFERENCE EXAMPLE A3 | A4 REFERENCE EXAMPLE A4 | A5 REFERENCE EXAMPLE A5 | A6 REFERENCE EXAMPLE A6 | A7 REFERENCE EXAMPLE A7 |
| Triphenylsilanol Quantity (g) | | 0.43 | 0.43 | 0.39 | 0.29 | 0.38 | 0.45 | 0.71 | 0.24 |
| Triphenylsilanol Ratio (mol %)* | | 50 | 50 | 20 | 25 | 40 | 40 | 50 | 15 |
| Curing speed | | ⊙ | X | X | X | X | X | X | X |
| Resistance to weather | | A | B | C | C | B | B | B | C |
| Elongation (%) | | 620 | 500 | 300 | 350 | 450 | 520 | 350 | 250 |
| Breaking strength (kg/cm³) | | 3.0 | 2.3 | 2.0 | 2.3 | 1.9 | 1.8 | 2.0 | 1.8 |
| No triphonyl-silanol added | Elongation (%) | 310 | 260 | 120 | 150 | 190 | 240 | 110 | 130 |
| | Breaking Strength (kg/cm³) | 2.9 | 2.5 | 2.1 | 2.3 | 2.1 | 1.8 | 2.2 | 1.9 |

*Mol % based on the silicon-containing compound used when the copolymer rubber or organic polymer is produced Evaluation of resistance to weather: A: No cracks or molten portion observed, B: Small cracks or molten portion observed, although slightly, C: Cracks or molten portion observed.

TABLE A3

(Effects of incorporation of the dimethoxy compound)

COMPARATIVE EXAMPLES

| Copolymer rubber or polymer | A8 PRODUCTION EXAMPLE | A9 REFERENCE EXAMPLE A1 | A10 REFERENCE EXAMPLE A2 | A11 REFERENCE EXAMPLE A3 | A12 REFERENCE EXAMPLE A4 | A13 REFERENCE EXAMPLE A5 | A14 REFERENCE EXAMPLE A6 | A15 REFERENCE EXAMPLE A7 |
|---|---|---|---|---|---|---|---|---|
| Dimethoxy compound Quantity (g) | 0.21 | 0.21 | 0.17 | 0.13 | 0.17 | 0.20 | 0.31 | 0.10 |
| Dimethoxy compound Ratio (mol %)* | 50 | 50 | 20 | 25 | 40 | 40 | 50 | 15 |
| Curing speed | ⊙ | Δ | X | X | Δ | Δ | Δ | X |
| Resistance to weather | A | B | C | C | B | B | B | C |
| Elongation (%) | 320 | 250 | 130 | 180 | 230 | 270 | 120 | 130 |
| Breaking strength (kg/cm³) | 3.2 | 2.5 | 2.0 | 2.4 | 2.3 | 1.9 | 2.1 | 2.0 |

*Mol % based on the silicon-containing compound used when the copolymer rubber or organic polymer is produced
Evaluation of resistance to weather: A: No cracks or molten portion observed; B: Small cracks or molten portion observed, although slightly, C: Cracks or molten portion observed.

TABLE A4

(Effects of incorporation of the trimethoxy compound)

COMPARATIVE EXAMPLES

| Copolymer rubber or polymer | A16 PRODUCTION EXAMPLE | A17 REFERENCE EXAMPLE A1 | A18 REFERENCE EXAMPLE A2 | A19 REFERENCE EXAMPLE A3 | A20 REFERENCE EXAMPLE A4 | A21 REFERENCE EXAMPLE A5 | A22 REFERENCE EXAMPLE A6 | A23 REFERENCE EXAMPLE A7 |
|---|---|---|---|---|---|---|---|---|
| Trimethoxy compound Quantity (g) | 0.27 | 0.27 | 0.21 | 0.16 | 0.20 | 0.24 | 0.38 | 0.13 |
| Trimethoxy compound Ratio (mol %)* | 50 | 50 | 20 | 25 | 40 | 40 | 50 | 15 |
| Curing speed | ⊙ | Δ | X | X | Δ | Δ | Δ | X |
| Resistance to weather | A | B | C | C | B | B | B | C |
| Elongation (%) | 270 | 200 | 100 | 130 | 180 | 210 | 90 | 110 |
| Breaking strength (kg/cm³) | 2.5 | 2.1 | 1.9 | 2.0 | 2.0 | 1.6 | 1.8 | 1.7 |

*Mol % based on the silicon-containing compound used when the copolymer rubber or organic polymer is produced
Evaluation of resistance to weather: A: No cracks or molten portion observed, B: Small cracks or molten portion observed, although slightly, C: Cracks or molten portion observed.

Examples A2 to A4

The cured sheet was prepared for each of EXAMPLES A2 to A4 and subjected to the tensile test in the same manner as in EXAMPLE A1, except that each silanol compound shown in Table A5 was incorporated in the silyl-containing ethylene/propylene/5-vinyl-2-norbornene random copolymer rubber (A-1) prepared in PRODUCTION EXAMPLE in place of triphenyl silanol. The results are given in Table A5.

As shown, each silanol compound achieved high elongation.

Comparative Examples A24 to A26

The cured sheet was prepared for each of COMPARATIVE EXAMPLES A24 to A26 and subjected to the tensile test in the same manner as in COMPARATIVE EXAMPLE A1, except that each silanol compound shown in Table A5 was incorporated in the organic polymer (1) prepared in REFERENCE EXAMPLE A1 in place of triphenyl silanol. The results are given in Table A5.

As shown, each silanol compound achieved high elongation.

TABLE A5

| | EXAMPLES | | | COMPARATIVE EXAMPLES | | |
| --- | --- | --- | --- | --- | --- | --- |
| | | | | A24 | A25 | A26 |
| Copolymer rubber or polymer | A2 PRODUCTION EXAMPLE | A3 PRODUCTION EXAMPLE | A4 PRODUCTION EXAMPLE | REFERENCE EXAMPLE A1 | REFERENCE EXAMPLE A1 | REFERENCE EXAMPLE A1 |
| Silanol compound Type | MeSiOH | EtSiOH | Ph(Me)SiOH | MeSiOH | EtSiOH | Ph(Me)SiOH |
| Quantity (g) | 0.09 | 0.09 | 0.36 | 0.09 | 0.09 | 0.36 |
| Ratio (mol %)* | 30 | 20 | 50 | 30 | 20 | 50 |
| Curing speed | ⊚ | ⊚ | ⊚ | Δ | Δ | Δ |
| Resistance to weather | A | A | A | B | B | B |
| Elongation (%) | 480 | 520 | 660 | 390 | 400 | 480 |
| Breaking strength (kg/cm³) | 2.9 | 3.1 | 2.6 | 2.4 | 2.5 | 2.0 |

*Mol % based on the silicon-containing compound used when the copolymer rubber or organic polymer is produced
Evaluation of resistance to weather: A: No cracks or molten portion observed, B: Small cracks or molten portion observed, although slightly, C: Cracks or molten portion observed.

Examples A5 to A7

The cured sheet was prepared for each of EXAMPLES A5 to A7 and subjected to the tensile test in the same manner as in EXAMPLE A1, except that each silanol compound capable of forming a silanol-containing compound by reacting with moisture, shown in Table A6, was incorporated in the silyl-containing ethylene/propylene/5-vinyl-2-norbornene random copolymer rubber (A-1) prepared in PRODUCTION EXAMPLE in place of triphenyl silanol. The results are given in Table A6.

Comparative Examples A27 to A29

The cured sheet was prepared for each of COMPARATIVE EXAMPLES A27 to A29 and subjected to the tensile test in the same manner as in COMPARATIVE EXAMPLE A1, except that each silicon compound capable of forming a silanol-containing compound by reacting with moisture, shown in Table A6, was incorporated in the organic polymer (1) prepared in REFERENCE EXAMPLE A1 in place of triphenyl silanol. The results are given in Table A6.

As shown, incorporation of each of the compounds capable of forming a silanol-containing compound by reacting with moisture brings about almost the same effect as that of the silanol compound, greatly improving elongation of the cured acrylic-based polymer which tends to show insufficient elongation.

TABLE A6

| | EXAMPLES | | | COMPARATIVE EXAMPLES | | |
| --- | --- | --- | --- | --- | --- | --- |
| | | | | A27 | A28 | A29 |
| Copolymer rubber or polymer | A5 PRODUCTION EXAMPLE | A6 PRODUCTION EXAMPLE | A7 PRODUCTION EXAMPLE | REFERENCE EXAMPLE A1 | REFERENCE EXAMPLE A1 | REFERENCE EXAMPLE A1 |
| Silanol compound Type | Si(1) | Si(2) | Si(3) | Si(1) | Si(2) | Si(3) |
| Quantity (g) | 0.16 | 0.27 | 0.22 | 0.16 | 0.27 | 0.22 |
| Ratio (mol %)* | 30 | 40 | 50 | 30 | 40 | 50 |
| Curing speed | ⊚ | ⊚ | ⊚ | X | Δ | Δ |
| Resistance to weather | A | A | A | C | B | B |
| Elongation (%) | 550 | 590 | 620 | 420 | 480 | 480 |
| Breaking Strength (kg/cm³) | 2.9 | 2.5 | 2.6 | 2.4 | 2.2 | 2.2 |

*Mol % based on the silicon-containing compound used when the copolymer rubber or organic polymer is produced
Si(1): $Me_3SiNHSiMe_3$
Si(2): $Me_3SiO-C(CH_3)NSiMe_3$
Si(3): $CH_3-CO-NHSiMe_2$
Evaluation of resistance to weather: A: No cracks or molten portion observed, B: Small cracks or molten portion observed, although slightly, C: Cracks or molten portion observed.

As shown, incorporation of each of the compounds capable of forming a silanol-containing compound by reacting with moisture brings about almost the same effect as that of the silanol compound, greatly improving elongation of the cured acrylic-based polymer which tends to show insufficient elongation.

Examples B Series

The composition, iodine value, intrinsic viscosity [η] and molecular weight distribution (Mw/Mn) of the copolymer rubber used in each of EXAMPLES and COMPARATIVE EXAMPLES were determined by the method described earlier.

The weather resistance test was conducted by the following method.

[Accelerated Weather Resistance Test]

The weather resistance test was conducted in accordance with JIS B-7753 using a Sunshine Carbon Arc weatherometer.

<Testing Conditions>
Light irradiation/rainfall cycles: Irradiation for 120 minutes/ rainfall for 18 minutes
Black panel temperature: 63±2° C.
Tank inside temperature: 40±2° C.
Total light irradiation time: 1000 hours
Analytical method:In accordance with JIS K-6301

Production Example B1

[Production of silyl-containing ethylene/propylene/5-vinyl-2-norbornene Random Copolymer Rubber (A-1)]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, VO(OEt)$_2$Cl and Al (Et)$_{1.5}$Cl$_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber (A$_0$-1) in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber (A$_0$-1) thus produced contained ethylene at 68% by mol, and had an intrinsic viscosity [η] of 0.2 dl/g measured in decalin kept at 135° C., iodine value (IV) of 10(g/100 g) and Mw/Mn of 15.

Two % toluene solution (0.3 g) of chloroplatinic acid and 1.5 g of methyldimethoxysilane were added to 100 g of the ethylene/propylene/5-vinyl-2-norbornene random copolymer rubber (A$_0$-1), and they were allowed to react with each other at 120° C. for 2 hours. The excess methyldimethoxysilane and the solvent (toluene) were distilled off from the effluent. This produced 101.5 g of the ethylene/propylene/5-vinyl-2-norbornene random copolymer rubber (A-1) containing dimethoxymethylsilyl group (—SiCH$_3$(OCH$_3$)$_2$).

Production Example B2

By a syringe, 54 mL of ethyl cyclohexane (left at least for a night and dried by molecular sieves 3A), 126 mL of toluene (left at least for a night and dried by molecular sieves 3A) and 1.16 g (5.02 mols) of p-DCC, represented by the following formula, were charged into a 500 mL pressure-resistant glass reactor equipped with a 3-way cock, purged by nitrogen.

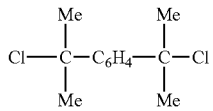

Then, a liquefied gas collecting tube of pressure-resistant glass, equipped with a needle valve and containing 56 mL of isobutylene monomer, was connected to the above-described 3-way cock. The polymerization reactor was cooled in a dry ice/ethanol bath kept at −70° C., and evacuated of the vapor phase to a vacuum by a vacuum pump. Then, the needle valve was opened, to charge the isobutylene monomer through the liquefied gas collecting tube into the polymerization reactor, and the reactor was returned back to the normal pressure with nitrogen from the one port of the 3-way cock.

Next, 0.093 g (1.0 mmol) of 2-methyl pyridine was added to the reaction system, and then 1.65 mL (15.1 mmols) of titanium tetrachloride was added, to initiate the polymerization. Then, 1.22 g (10.8 mmols) of allyl trimethylsilane was added 70 minutes after the reaction was initiated, to chemically introduce the allyl group into the polymer at the terminal. The reaction solution, obtained 120 minutes after the reaction was initiated, was washed 4 times each with 200 mL of water, and the solvent was distilled off to produce the isobutylene-based polymer with the allyl group at the terminal.

Next, 40 g of the isobutylene-based polymer with the allyl group at the terminal was dissolved in 20 mL of n-heptane, and the mixture was heated to around 70° C., to which 1.5 [eq/vinyl group] of methyl dimethoxysilane and 1×10$^{-4}$ [eq/vinyl group] of a platinum/vinyl siloxane complex were added, for the hydrosilylation. The reaction was followed by FT-IR. The olefin absorption at 1640 cm$^{-1}$ disappeared in around 4 hours.

The reaction solution was concentrated under a vacuum, to produce the isobutylene polymer with the reactive silicon groups at both terminals, represented by the following formula:

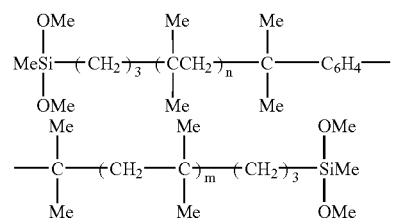

The polymer yield was estimated from the quantity produced. It was also analyzed for Mn and Mw/Mn by GPC, and for the terminal structure by comparing the intensities of the $^1$H-NMR-analyzed resonance signals of proton relevant to each structure (proton derived from the initiator: 6.5 to 7.5 ppm, methyl proton bonded to the silicon atom, derived from the polymer terminal: 0.0 to 0.1 ppm, methoxy proton: 3.4 to 3.5) with each other.

The $^1$H-NMR analysis was conducted at 300 MHz using a Varian Gemini 300 (300 MHz for $^1$H) in CDCl$_3$.

The FT-IR analysis was conducted by an analyzer (Shimadzu IR-408), and GPC analysis was conducted with a Waters LC Module 1 as the liquid sending system and Shodex K-804 as the column. The molecular weight was estimated as relative to the polystyrene standard. The polymer thus prepared had an Mn of 11,400, Mw/Mn of 1.23 and Fn (silyl) of 1.76, wherein the number-average molecular weight was as polystyrene, and number of the terminal silyl functional group was that per 1 mol of isobutylene polymer.

Production Example B3

The isobutylene-based polymer with the reactive silicon group was prepared in the same manner as in PRODUCTION EXAMPLE B2, except that different quantities of p-DCC and allyl trimethylsilane were charged, 2.32 g (10.0 mmols) and 14.4 g (126.0 mmols), respectively.

The polymer thus prepared had an Mn of 5,780, Mw/Mn of 1.28 and Fn (silyl) of 1.93.

Examples B1 and B2, and Comparative Examples B1 to B3

A mixture containing the silyl-containing ethylene/propylene/5-vinyl-2-norbornene random copolymer rubber (A-1) produced in PRODUCTION EXAMPLE B1 was prepared. It was composed of 100 parts by weight of the copolymer rubber (A-1), 90 parts (by weight) of a paraffin-based process oil (Idemitsu Kosan, Diana Process oil PS-32™), 180 parts of limestone powder (Shiraishi Calcium, PO320B10™), 50 parts of colloidal calcium carbonate (Shiraishi K. K., EDS-D10A™), 100 parts of talc (Fuji Talc Kogyo, Talc LMR™), 3 parts of nickel dimethyldithiocarbamate as the light stabilizer (Sanshin Chemical Industry Co., Sandant NBC™), 5 parts of a dipping inhibitor (Kusumoto Kasei, Disparlon#305™),1 part of a hindered phenol-based antioxidant (Ciba-Geigy Japan, Irganox 1010™), 1 part of a salicylate-based ultraviolet ray absorber (Sumitomo Chemical, Sumisorb 400™), 1 part of a hindered amine-based light stabilizer (Sankyo, Sanol LS-765™), 3 parts of dipentaerythritol penta- and hexa-acrylate as the light-curable compounds (TOAGOSEI, Aronix M-400™), 2 parts of γ-glycidoxypropyltrimethoxysilane (Nippon Unicar, Silane Coupling Agent A-187), 4 parts of γ-isocyanatepropyltriethoxysilane (Nippon Unicar, Silane Coupling Agent A-1310) as the isocyanate-containing silane coupling agent for the present invention, and the silicon compound described below in parts given in Table B2, all parts by weight. Each mixture was well kneaded by a3-paint roll unit, to produce the major ingredient.

Diphenyl dimethoxysilane (Shin-Etsu Chemical, LS-5300™), a silanol-free silicon compound as the component B2 for the present invention was incorporated in parts given in Table B1 for EXAMPLES B1 and B2, and COMPARATIVE EXAMPLE B1. Diphenyl disilanol (Chisso Co., $D_{6150}$™) as a silanol-containing silicon compound was incorporated in parts given in Table B1 for COMPARATIVE EXAMPLES B2 and B3.

The curing agent was prepared by the following procedure: a mixture comprising 16 parts of a paraffin-based process oil (Idemltsu Kosan, Diana Process Oil PS-32™), 10parts of limestone powder (Maruo Calcium, Snowlite SS™), 2.5 parts of carbon black (Mitsubishi Chemical, CB#30™), 2 parts of $H_2O$, and the silanol condensing catalyst described below in parts given in Table B1, all parts by weight, was manually kneaded in a disposal cup and stirred 3 times at 10,000 rpm each for 10 minutes by a homogenizer (Nihon Seiki Sesakusho Co., Ltd., Excel Auto Homogenizer).

EXAMPLES B1 and B2, and COMPARATIVE EXAMPLE B2 and B3 incorporated 4 parts by weight of dibutyl tin dimethoxide (Aldrich Chemical) as the component C for the present invention, which was a tetravalent tin compound as the silanol condensing catalyst, whereas COMPARATIVE EXAMPLE B1 incorporated 4 parts by weight of tin octylate (NITTO KASEI, $U_{-28}$™) as a divalent tin compound.

Curability of each composition was evaluated, after the above-described major ingredient and curing agent were kneaded, by following hardness of the cured product.

The test piece for measuring hardness comprised 16 parts of the major ingredient and 1 part of the curing catalyst, all by weight, wherein the mixture was thoroughly kneaded and cured in a constant-temperature bath kept at 25° C. in a mold, 12 by 12 by 50 mm, lined with a Teflon sheet. Hardness of the rectangular parallelepiped test piece, cured at 25° C., was measured using a hardness meter (Shimadzu, Hardness Meter 200) in accordance with JIS K-6301/1975 for the spring type hardness test A. Curability was determined by measuring time required for the composition to attain hardness of 20 immediately after kneading of the major ingredient and curing agent was completed. The results are given in Table B1.

TABLE B1

| | Silanol condensing Catalysts (Quantity) | Silicon compounds (Quantity) | Time required to attain hardness of 20 (hrs) | Resistance to Weather |
|---|---|---|---|---|
| EXAMPLE B1 | $(C_4H_9)_2Sn(OCH_3)_2$ (4 parts by weight) | $(C_6H_5)_2Si(OCH_3)_2$ (0.5 part by weight) | 1 | No cracks or molten portion observed |
| EXAMPLE B2 | $(C_4H_9)_2Sn(OCH_3)_2$ (4 parts by weight) | $(C_6H_5)_2Si(OCH_3)_2$ (1.0 part by weight) | 1 | No cracks or molten portion observed |
| COMPARATIVE EXAMPLE B1 | $Sn(OCOC_7H_{15})_2$ (4 parts by weight) | $(C_6H_5)_2Si(OCH_3)_2$ (0.5 part by weight) | 3 | No cracks or molten portion observed |
| COMPARATIVE EXAMPLE B2 | $(C_4H_9)_2Sn(OCH_3)_2$ (4 parts by weight) | $(C_6H_5)_2Si(OH)_2$ (0.5 part by weight) | 2 | No cracks or molten portion observed |
| COMPARATIVE EXAMPLE B3 | $(C_4H_9)_2Sn(OCH_3)_2$ (4 parts by weight) | $(C_6H_5)_2Si(OH)_2$ (1.0 part by weight) | 2 | No cracks or molten portion observed |

Reference Examples B1 to B6

The polymer prepared in PRODUCTION EXAMPLE B2 as the saturated hydrocarbon-based polymer was incorporated with the following components, wherein the quantity of each component is represented as part(s) by weight per 100 parts by weight of the polymer: 90 parts of a paraffin-based process oil (Idemitsu Kosan, Diana Process oil PS-32™), 180 parts of limestone powder (Shiraishi Calcium, PO320B10™), 50 parts of colloidal calcium carbonate (Shiraishi K. K., EDS-D10A™), 100 parts of talc (Fuji Talc Kogyo, Talc LMR™), 3 parts of nickel dimethyldithiocarbamate as the light stabilizer (Sanshin Kagaku Kogyo, Sandant NBC™), 5 parts of a dipping inhibitor (Kusumoto Kasei, Disparlon #305™), 1 part of a hindered phenol-based antioxidant (Ciba-Geigy Japan, Irganox 1010™), 1 part of a salicylate-based ultraviolet ray absorber (Sumitomo Chemical, Sumisorb 400™), part of a hindered amine-based light stabilizer (Sankyo, Sanol LS-765™), 3 parts of dipentaerythritol penta- and hexa-acrylate as the light-curable compounds (TOAGOSEI, Aronix M-400™), 2 parts of γ-glycidoxypropyltrimethoxysilane (Nippon Unicar, Silane Coupling Agent A-187), 4 parts of γ-isocyanatepropyltriethoxysilane (Nippon Unicar, Silane Coupling Agent A-1310) as the isocyanate-containing silane coupling agent for the present invention, and the silicon compound described below in parts given in Table B2. Each mixture was well kneaded by a 3-paint roll unit, to produce the major ingredient.

Diphenyl dimethoxysilane (Shin-Etsu Chemical, LS-5300™), a silanol-free silicon compound as the component B2 for the present invention was incorporated in parts given in Table B2 for REFERENCE EXAMPLES B1 to B3, no silicon compound was incorporated in REFERENCE EXAMPLE B4, and diphenyl disilanol (Chisso, D6150™) as a silanol-containing silicon compound was incorporated in parts given in Table B2 for REFERENCE EXAMPLES B5 and B6.

The curing agent was prepared by the following procedure: a mixture comprising 16 parts of a paraffin-based process oil (Idemitsu Kosan, Diana Process Oil PS-32™), 10 parts of limestone powder (Maruo Calcium, Snowlite SS™) 2.5 parts of carbon black (Mitsubishi Chemical, CB#30™), 2 parts of $H_2O$, and the silanol condensing catalyst described below in parts given in Table B2, all parts by weight, was manually kneaded in a disposal cup and stirred 3 times at 10,000 rpm each for 10 minutes by a homogenizer (Nihon Seiki Sesakusho Co., Ltd., Excel Auto Homogenizer).

REFERENCE EXAMPLES B1 to B2 and B4 to B6 incorporated 4 parts by weight of dibutyl tin dimethoxide (Aldrich Chemical) as the component C for the present invention which was a tetravalent tin compound as the silanol condensing catalyst, whereas REFERENCE EXAMPLE B3 incorporated 4 parts by weight of tin octylate (NITTO KASEI, U-28™) as a divalent tin compound.

Curability of each composition was evaluated, after the above-described major ingredient and curing agent were kneaded, by following hardness of the cured product.

The test piece for measuring hardness comprised 16 parts of the major ingredient and 1 part of the curing catalyst, all by weight, wherein the mixture was thoroughly kneaded and cured in a constant-temperature bath kept at 25° C. in a mold, 12 by 12 by 50 mm, lined with a Teflon sheet. Hardness of the rectangular parallelepiped test piece, cured at 25° C., was measured using a hardness meter (Shimadzu, Hardness Meter 200) in accordance with JIS K-6301/1975 for the spring type hardness test A. Curability was determined by measuring time required for the composition to attain hardness of 20 immediately after kneading of the major ingredient and curing agent was completed. The results are given in Table B2.

TABLE B2

| | Silanol condensing catalysts (Quantity) | Silicon compounds (Quantity) | Time required to attain hardness of 20 (hrs) | Resistance to Weather |
|---|---|---|---|---|
| REFERENCE EXAMPLE B1 | $(C_4H_9)_2Sn(OCH_3)_2$ (4 parts by weight) | $(C_6H_5)_2Si(OCH_3)_2$ (0.5 part by weight) | 2.1 | Molten portion observed slightly |
| REFERENCE EXAMPLE B2 | $(C_4H_9)_2Sn(OCH_3)_2$ (4 parts by weight) | $(C_6H_5)_2Si(OCH_3)_2$ (1.0 part by weight) | 2.0 | Molten portion observed slightly |
| REFERENCE EXAMPLE B3 | $Sn(OCOC_7H_{15})_2$ (4 parts by weight) | $(C_6H_5)_2Si(OCH_3)_2$ (0.5 part by weight) | >12 | Molten portion observed slightly |
| REFERENCE EXAMPLE B4 | $(C_4H_9)_2Sn(OCH_3)_2$ (4 parts by weight) | Not used (0 part by weight) | 4.0 | Molten portion observed slightly |
| REFERENCE EXAMPLE B5 | $(C_4H_9)_2Sn(OCH_3)_2$ (4 parts by weight) | $(C_6H_5)_2Si(OH)_2$ (0.5 part by weight) | 3.8 | Molten portion observed slightly |
| REFERENCE EXAMPLE B6 | $(C_4H_9)_2Sn(OCH_3)_2$ (4 parts by weight) | $(C_6H_5)_2Si(OH)_2$ (1.0 part by weight) | 3.5 | Molten portion observed slightly |

Rererence Examples B7 to B9

The adhesion improving effect of the isocyanate-containing silane coupling agent of the present invention was evaluated by the adhesion test, described below.

The test piece for the tensile adhesion test was prepared in accordance with the method specified by JIS A-5758/1992, wherein a glass substrate formed into an H-shape was filled with the composition (an accurately weighed 16:1 mixture of the major ingredient and curing agent prepared in REFERENCE EXAMPLE B1 for REFERENCE EXAMPLE B7, and of the major ingredient and curing agent prepared in REFERENCE EXAMPLE B2 for REFERENCE EXAMPLE B8) while breaking the bubbles in each composition by using a spatula. Each composition was cured in an oven under the conditions of 23° C.×7 days+50° C.×7 days. The substrate used for the H type tensile test was of aluminum (Taiyu Kizai, A1100P, 3 by 5 by 0.2 cm in size), in accordance with JIS H-4000. It was washed with methylethylketone (Wako-Junyaku Kogyo special grade) and wiped with clean cotton cloth, before it was filled with the composition. It was not coated with a primer.

The adhesion test was conducted in REFERENCE EXAMPLE B9 in the same manner as in REFERENCE EXAMPLE B7, except that γ-isocyanatepropyltriethoxysilane was not used.

The test piece prepared above for the H type tensile test was tested for tensile adhesion, after it was cured, to evaluate adhesion in the absence of a primer by comparing the tensile characteristics with fractured morphology.

The tensile adhesion test was conducted in accordance with JIS A-5758/1992 in a constant-temperature chamber kept at 23° C. and RH (relative humidity) 50±10% at a tensile speed of 50 mm/minute using a Shimadzu's Autograph AG-2000A.

The results are given in Table B3.

Examples B3 to B5

The adhesion test was conducted in EXAMPLES B3 to B5 in the same manner as in REFERENCE EXAMPLES B7 to B9, except that the polymer prepared in PRODUCTION EXAMPLE B2 was replaced by the silyl-containing ethylene/propylene/5-vinyl-2-norbornene random copolymer rubber (A-1) prepared in PRODUCTION EXAMPLE B1.

The results are given in Table B4.

The ethylene/propylene/5-vinyl-2-norbornene random copolymer rubber ($A_0$-1) thus produced contained ethylene at 68% by mol, and had an intrinsic viscosity [$\eta$] of 0.2 dl/g measured in decalin kept at 135° C., iodine value (IV) of 10(g/100 g) and Mw/Mn of 15.

TABLE B3

| | Silanol condensing Catalysts (Quantity) | Silicon Compounds (Quantity) | Isocyanate-containing silane coupling agent (Quantity) | Adhesion tests Fractured morphology | Resistance to Weather |
|---|---|---|---|---|---|
| REFERENCE EXAMPLE B7 | $(C_4H_9)_2Sn(OCH_3)_2$ (4 parts by weight) | $(C_6H_5)_2Si(OCH_3)_2$ (0.5 part by weight) | $OCNC_3H_6Si(OCH_3)_3$ (4 parts by weight) | Cohesive fracture | Molten portion observed slightly |
| REFERENCE EXAMPLE B8 | $(C_4H_9)_2Sn(OCH_3)_2$ (4 parts by weight) | $(C_6H_5)_2Si(OCH_3)_2$ (1.0 part by weight) | $OCNC_3H_6Si(OCH_3)_3$ (4 parts by weight) | Cohesive fracture | Molten portion observed slightly |
| REFERENCE EXAMPLE B9 | $(C_4H_9)_2Sn(OCH_3)_2$ (4 parts by weight) | $(C_6H_5)_2Si(OCH_3)_2$ (0.5 part by weight) | Not used (0 part by weight) | Interfacial fracture | Molten portion observed slightly |

TABLE B4

| | Silanol condensing Catalysts (Quantity) | Silicon Compounds (Quantity) | Isocyanate-containing silane coupling agent (Quantity) | Adhesion tests Fractured morphology | Resistance to Weather |
|---|---|---|---|---|---|
| EXAMPLE B3 | $(C_4H_9)_2Sn(OCH_3)_2$ (4 parts by weight) | $(C_6H_5)_2Si(OCH_3)_2$ (0.5 part by weight) | $OCNC_3H_6Si(OCH_3)_3$ (4 parts by weight) | Cohesive fracture | No cracks or molten portion observed |
| EXAMPLE B4 | $(C_4H_9)_2Sn(OCH_3)_2$ (4 parts by weight) | $(C_6H_5)_2Si(OCH_3)_2$ (1.0 part by weight) | $OCNC_3H_6Si(OCH_3)_3$ (4 parts by weight) | Cohesive fracture | No cracks or molten portion observed |
| EXAMPLE B5 | $(C_4H_9)_2Sn(OCH_3)_2$ (4 parts by weight) | $(C_6H_5)_2Si(OCH_3)_2$ (0.5 part by weight) | Not used (0 part by weight) | Interfacial fracture | No cracks or molten portion observed |

The weather resistance tests were conducted according to the method described above for the cured products prepared in EXAMPLES B1 to B5, COMPARATIVE EXAMPLES B1 to B3 and REFERENCE EXAMPLES B1 to B9. The results are given in Tables B1 to B4.

Examples C Series

The composition, iodine value, intrinsic viscosity [$\eta$] and molecular weight distribution (Mw/Mn) of the copolymer rubber used in each of EXAMPLES and COMPARATIVE EXAMPLES were determined by the methods described earlier.

Production Example

[Production of ethylene/propylene/5-vinyl-2-norbornene random copolymer rubber (A-1)]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, $VO(OEt)_2Cl$ and $Al(Et)_{1.5}Cl_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber ($A_0$-1) in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

Two % toluene solution (0.3 part by weight) of chloroplatinic acid, and methyldimethoxysilane, 1.5 parts by weight were added to 100 parts by weight of the ethylene/propylene/5-vinyl-2-norbornene random copolymer rubber ($A_0$-1), and they were allowed to react with each other at 120° C. for 2 hours. The excess methyldimethoxysilane and the solvent (toluene) were distilled off from the effluent. This produced 101.5 parts by weight of the ethylene/propylene/5-vinyl-2-norbornene random copolymer rubber (A-1) containing dimethoxymethylsilyl group ($—Si(CH_3)(OCH_3)_2$)

Example C1

A mixture containing the ethylene/propylene/5-vinyl-2-norbornene random copolymer rubber (A-1) containing the hydrolyzable silyl group, prepared in the above-described PRODUCTION EXAMPLE, was stirred at 120° C. for 2 hours under a vacuum in a kneader (planetary mixer), which could be closed, and dehydrated. The mixture was composed of 100 parts of the copolymer rubber (A-1), 55 parts of diisodecyl phthalate (DIDP) as the plasticizer, 120 parts of surface-treated colloidal calcium carbonate as the filler, 20 parts of titanium oxide, 2 parts of aliphatic amide wax as the dipping inhibitor, 1 part of an ultraviolet ray absorber, and 1 part of a light stabilizer, all part(s) by weight. The mixture was cooled to room temperature, and incorporated with 2 parts of vinyl trimethoxysilane as the viscosity stabilizer, 2 parts of a curing catalyst (NITTO KASEI, U-220) and 3 parts of N-($\beta$-aminoethyl)-$\gamma$-aminopropyltrimethylsiloxydimethoxysilane as the surface modifier, all part(s) by weight. The resultant mixture was stirred at room temperature, and put in a closed container, to produce a one-liquid type curable composition. Each composition prepared in EXAMPLES C1 to C3 was evaluated by the following methods immediately after it was prepared. The one stored at 50° C. for 14 days was evaluated as well.

Each composition was spread to a thickness of 3 mm, cured at 23° C. and RH 55%, and, after 1 day, painted with a total of 5 types of commercial solvent-based acrylic paints for industrial purposes (3 types of acrylourethane-based ones, 1 type of acrylic lacquer, and 1 type of acryloenamel) with a brush. It was then tested, after 7 days, by a checker pattern with 25 meshes (2 mm square) using a cellophane tape (Nichiban), wherein the composition was evaluated by percentage of the meshes remaining on the sealant surface, based on the total meshes.

The residual tackiness was evaluated for each composition spread to a thickness of 3 mm, and cured at 23° C. and RH 55% for 1 and 7 days, by the touch of finger on the cured surface. Each composition was also evaluated for its tensile characteristics in accordance with JIS K-6251. The results are given in Table C1.

Each composition was further tested for its curing speed and weather resistance by the following methods. The results are given in Table C1.

(1) Curing Speed Test

Each composition was spread to a thickness of 3 mm, and cured at 23° C. and RH 55%, to measure its curing speed, where curing speed was defined as time required for the composition to attain hardness of 20 (JIS A).

(2) Weather Resistance Test (Ozone-caused Aging Test)

The accelerated weather resistance test was conducted in accordance with JIS B-7753 under the following conditions:
Analyzer:Sunshine Carbon Arc Weatherometer
Light irradiation/rainfall cycles:Irradiation for 120 minutes/ rainfall for 18 minutes
Black panel temperature: 63±2° C.
Tank inside temperature: 40±2° C.
Total light irradiation time: 1000 hours Examples C2 and C3

The composition for each of EXAMPLES C2 and C3 was prepared in the same manner as in EXAMPLE C1, except that the content of N-(β-aminoethyl)-γ-aminopropyltrimethylsiloxydimethoxysilane was changed to a level given in Table C1, and incorporated with N-(β-aminoethyl)-γ-aminopropyltrimethoxysilane (A-1120) as the common tackifier. It was tested in the same manner. The results are given in Table C1.

Comparative Examples C1 and C2

The composition for each of COMPARATIVE EXAMPLES C1 and C2 was prepared in the same manner as in EXAMPLE C1, except that N-(β-aminoethyl)-γ-aminopropyltrimethylsiloxydimethoxysilane was replaced by N-(β-aminoethyl)-γ-aminopropyltrimethoxysilane (A-1120) as the common tackifier. It was tested in the same manner. The results are given in Table C1.

As shown in Table C1, each of the composition of the present invention is excellent in residual tackiness on the cured surface and adhesion to the paint. It also shows that the composition has adhesion varying as it is stored, a phenomenon which is not substantiated yet.

Rererence Example C1

A mixture containing the propylene oxide polymer having 2.1 methyldimethoxysilyl groups [—Si(CH$_3$)(OCH$_3$)$_2$] on the average in the molecule and a number-average molecular weight of 17,000 was stirred at 120° C. for 2 hours under a vacuum in a kneader (planetary mixer), which could be closed, and dehydrated. The mixture was composed of 100 parts of the above polymer, 55 parts of diisodecyl phthalate (DIDP) as the plasticizer, 120 parts of surface-treated colloidal calcium carbonate as the filler, 20 parts of titanium oxide, 2 parts of aliphatic amide wax as the dipping inhibitor, 1 part of an ultraviolet ray absorber, and 1 part of a light stabilizer, all part(s) by weight. The mixture was cooled to room temperature, and incorporated with 2 parts of vinyl trimethoxysilane as the viscosity stabilizer, 2 parts of a curing catalyst (NITTO KASEI, U-220) and 3 parts of N-(β-aminoethyl)-γ-aminopropyltrimethylsiloxy-
dimethoxysilane as the surface modifier, all part(s) by weight. The resultant mixture was stirred at room temperature, and put in a closed container, to produce a one-liquid type curable composition.

The above composition was tested in the same manner as in EXAMPLE C1. The results are given in Table C1.

TABLE C1

|  |  | EXAMPLES | | | COMPARATIVE EXAMPLES | | |
|---|---|---|---|---|---|---|---|
|  |  | C1 | C2 | C3 | C1 | C2 | C3 |
| Additive | N-(β-aminoethyl)-γ-aminopropyltrimethyl-siloxydimethoxysilane | 3 | 3 | 4 |  |  | 3 |
|  | A-1120 |  | 1 | 1 | 3 | 5 |  |
| Paint adhesion | Initial (%) | 85 | 100 | 100 | 5 | 5 | 90 |
|  | After storage (%) | 65 | 90 | 85 | 40 | 50 | 70 |
| Residual Tackiness* | After one day | ⊚ | ⊚ | ⊚ | ○ | ○ | ⊚ |
|  | After seven days | ⊚ | ⊚ | ⊚ | ⊚ | ⊚ | ⊚ |
| Stress at 100% elongation (MPa) |  | 1.0 | 1.1 | 1.0 | 0.9 | 0.9 | 1.0 |
| Breaking strength (MPa) |  | 3.0 | 3.2 | 2.9 | 2.5 | 2.2 | 2.5 |
| Breaking elongation (%) |  | 550 | 500 | 580 | 490 | 450 | 450 |

TABLE C1-continued

|  | EXAMPLES | | | COMPARATIVE EXAMPLES | | |
| --- | --- | --- | --- | --- | --- | --- |
|  | C1 | C2 | C3 | C1 | C2 | C3 |
| Time required to attain hardness of 20 (hrs) | 3.0 | 2.5 | 2.5 | 6.0 | 7.0 | 3.0 |
| Resistance to weather | No cracks or molten portion observed | No cracks or molten portion observed | No cracks or molten portion observed | No cracks or molten portion observed | No cracks or molten portion observed | Cracks or molten portion observed |

*⊚: No residual tackiness observed, ◯: Residual tackiness observed very slightly, Δ: Residual tackiness observed slightly; X: Sticky surface Examples C4 to C8

A mixture containing the ethylene/propylene/5-vinyl-2-norbornene random copolymer rubber (A-1) containing the hydrolyzable silyl group, prepared in the above-described PRODUCTION EXAMPLE, was prepared for each of EXAMPLES C4 to C8. The mixture was composed of 100 parts of the copolymer rubber (A-1), 55 parts of diisodecyl phthalate (DIDP) as the plasticizer, 120 parts of surface-treated colloidal calcium carbonate as the filler, 20 parts of titanium oxide, 2 parts of aliphatic amide wax as the dipping inhibitor, 1 part of an ultraviolet ray absorber, 1 part of a light stabilizer, 2 parts of vinyl trimethoxysilane as the viscosity stabilizer, 2 parts of a curing catalyst (NITTO KASEI, U-220), and a silicon compound having at least one amino group and at least one trialkylsiloxy group in the molecule, shown in Table C2, as the surface modifier all part(s) by weight. Each composition was only stirred at room temperature; unlike the ones prepared in EXAMPLES C1 to C3, which were dehydrated under a vacuum and put in a closed container.

Each composition was spread to a thickness of 3 mm, cured at 23° C. and RH 55%, and, after 1 day, painted with a total of 5 types of commercial solvent-based paints for industrial purposes with a brush. It was then tested, after 7 days, by a checker pattern with 25 meshes (2 mm square) using a cellophane tape (Nichiban), wherein the composition was evaluated by percentage of the meshes remaining on the sealant surface, based on the total meshes. The results are given in Table C2.

Each composition was further tested for its residual tackiness, tensile property, curing seed and weather resistance. The results are also given in Table C2.

Comparative Examples C3 and C4

COMPARATIVE EXAMPLES C3 and C4 were conducted in the same manner as in EXAMPLE C4, except that N-(β-aminoethyl)-γ-aminopropyltrimethylsiloxy-dimethoxysilane was not used (COMPARATIVE EXAMPLE C4), or 3 parts by weight of N-(β-aminoethyl)-γ-aminopropyltrimethoxysilane (A-1120) was used in place of N-(β-aminoethyl)-γ-aminopropyltrimethylsiloxy-dimethoxysilane (COMPARATIVE EXAMPLE C3). The results are also given in Table C2.

TABLE C2

|  | EXAMPLE C4 | EXAMPLE C5 | EXAMPLE C6 | EXAMPLE C7 | EXAMPLE C8 | COMPARATIVE EXAMPLE C3 | COMPARATIVE EXAMPLE C4 |
| --- | --- | --- | --- | --- | --- | --- | --- |
| Additive |  |  |  |  |  |  |  |
| N-(β-aminoethyl)-γ-aminopropyltrimethyl-siloxydimethoxysilane | 3 |  |  | 2.5 | 1.5 |  |  |
| γ-aminopropyltrimethyl-siloxydimethoxysilane |  | 3 |  |  |  |  |  |
| N,N-dimethyl-γ-aminoproyltrimethyl-dimethoxysilane |  |  | 3 |  |  |  |  |
| A-1120 |  |  |  | 3 | 3 | 3 |  |
| Paint Adhesion (%) | 98 | 85 | 100 | 86 | 80 | 0 | 0 |
| Residual tackiness |  |  |  |  |  |  |  |
| After one day | ⊚ | ⊚ | ⊚ | ⊚ | ⊚ | ◯ | Δ |
| After two days | ⊚ | ⊚ | ⊚ | ⊚ | ⊚ | ◯ | ◯ |
| Stress at 100% elongation (MPa) | 0.70 | 0.55 | 0.30 | 0.80 | 0.75 | 0.70 | 0.40 |
| Breaking strength (MPa) | 3.10 | 2.50 | 1.40 | 3.50 | 3.20 | 2.20 | 1.40 |
| Breaking elongation (%) | 630 | 750 | 950 | 560 | 590 | 430 | 570 |
| Time required to attain hardness of 20 (hrs) | 2.5 | 3.0 | 3.5 | 3.0 | 3.0 | 6.0 | 7.0 |
| Resistance to weather | No cracks or molten portion observed | No cracks or molten portion observed | No cracks or molten portion observed | No cracks or molten portion observed | No cracks or molten portion observed | No cracks or molten portion observed | No cracks or molten portion observed |

Example C9 and Comparative Example C5

A mixture containing the ethylene/propylene/5-vinyl-2-norbornene random copolymer rubber (A-1) containing the hydrolyzable silyl group, prepared in the above-described PRODUCTION EXAMPLE, was prepared for each of EXAMPLE C9 and COMPARATIVE EXAMPLE C5. The mixture was composed of 100 parts by weight of the copolymer rubber (A-1), 2 parts by weight of a curing catalyst (NITTO KASEI, U-220), and N-(β-aminoethyl)-γ-aminopropyltrimethylsiloxydimethoxysilane (for EXAMPLE C9) or N-(β-aminoethyl)-γ-aminopropyltrimethoxysilane (A-1120) for COMPARATIVE EXAMPLE C5 as the surface modifier. Each composition was stirred at room temperature. It was spread to a thickness of 3 mm, cured at 23° C. and RH 55%, and, after 1 day, painted with a total of 5 types of commercial solvent-based paints for industrial purposes with a brush. It was then tested, after 7 days, by a checker pattern with 25 meshes (2 mm square) using a cellophane tape (Nichiban), wherein the composition was evaluated by percentage of the meshes remaining on the sealant surface, based on the total meshes. The results are given in Table C3.

Each composition was further tested for its residual tackiness, tensile property, curing seed and weather resistance, as was the case with the one for EXAMPLE C1. The results are also given in Table C3.

TABLE C3

| | | EXAMPLE C9 | COMPARATIVE EXAMPLE C5 |
|---|---|---|---|
| Additive | N-(β-aminoethyl)-γ-aminopropyltrimethylsiloxydimethoxysilane | 3 | |
| | A-1120 | | 3 |
| Paint adhesion (%) | | 90 | 0 |
| Residual tackiness | After one day | ⊚ | Δ |
| | After two days | ⊚ | ○ |
| Tensile stress at 100% elongation (MPa) | | 0.40 | 0.50 |
| Breaking strength (MPa) | | 0.52 | 0.58 |
| Breaking elongation (%) | | 220 | 150 |
| Time required to attain hardness of 20 (hrs) | | 2.5 | 4 |
| Resistance to weather | | No cracks observed | Cracks observed |

Examples D Series

The composition, iodine value, intrinsic viscosity [η] and molecular weight distribution (Mw/Mn) of the copolymer rubber used in each of EXAMPLES and COMPARATIVE EXAMPLES were determined by the methods described earlier.

Production Example

[Production of silyl-containing ethylene/propylene/5-vinyl-2-norbornene random Copolymer Rubber (A-1)]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, $VO(OEt)_2Cl$ and $Al(Et)_{1.5}Cl_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber ($A_0$-1) in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber ($A_0$-1) thus produced contained ethylene at 68% by mol, and had an intrinsic viscosity [η] of 0.2 dl/g measured in decalin kept at 135° C., iodine value (IV) of 10(g/100 g) and Mw/Mn of 15.

Two % toluene solution (0.3 part by weight) of chloroplatinic acid and methyldimethoxysilane, 1.5 parts by weight were added to 100 parts by weight of the ethylene/propylene/5-vinyl-2-norbornene random copolymer rubber ($A_0$-1), and they were allowed to react with each other at 120° C. for 2 hours. The excess methyldimethoxysilane and the solvent (toluene) were distilled off from the effluent. This produced 101.5 parts by weight of the ethylene/propylene/5-vinyl-2-norbornene random copolymer rubber (A-1) containing dimethoxymethylsilyl group ($—Si(CH_3)(OCH_3)_2$).

Example 1

The copolymer rubber (A-1), 100 g, prepared in the above-described PRODUCTION EXAMPLE, was incorporated with 1.75 g of $(CH_3)_3SiOC_6H_5$, and the resultant mixture was stirred at 80° C. for 2 hours. It was then incorporated with 150 g of colloidal calcium carbonate treated with a fatty acid (Shiraishi K. K., CCR™), 65 g of dioctyl phthalate, 1 g of a hindered phenol-based aging inhibitor (Ouchishinko Chemical Industrial Co., Nocrac NS-6™), 3 g of tin octylate and 1 g of lauryl amine, and the resultant mixture was sufficiently kneaded using a 3-paint roll unit.

The composition thus prepared was used to form an H-2 type test piece in accordance with JISA-5758 (base: anodized aluminum oxide, primer: Nippon Unicar's APZ-730), which was cured under given conditions, and tested by a tensile tester to measure its H-type tensile properties. It was also tested for tackiness by the touch of finger. Its storage stability was evaluated by viscosity (B type viscosity at 23° C., poise) ratio, i.e., ratio of viscosity of the composition stored at 50° C. for a week to that of the one immediately after it was prepared. The results are given in Table D1.

Each composition was further tested for its curing speed and weather resistance by the following methods. The results are also given in Table D1.

(1) Curing Speed Test

The curable composition was cured under the conditions of 23° C. and 50% RH for 24 hours in a mold, 20 by 80 by 5 mm in size.

Next, the cured product was released from the mold, and thickness of the cured portion was measured by a dial gauge of weak spring force to 0.1 mm, to evaluate its curing speed. It was marked with ○ when its thickness was 1 mm or more and x when it was less than 1 mm.

(2) Weather Resistance Test

The weather resistance test was conducted in accordance with JIS B-7753 under the following conditions:
Analyzer: Sunshine Carbon Arc Weatherometer
Light irradiation/rainfall cycles: Irradiation for 120 minutes/rainfall for 18 minutes
Black panel temperature: 63±2° C.
Tank inside temperature: 40±2° C.

Total light irradiation time: 250 hours

Weather resistance was evaluated by visual observation of the surface aging (cracks and molten portion). The composition was marked with ○ when no crackings or molten portions were observed, and x when the surface aging was observed.

The results are given in Table D1, wherein $M_{150}$ is the modulus when the test piece is stretched by 150%, $T_B$ is breaking modulus, $E_B$ is breaking elongation, and tackiness evaluation "A" means tackiness comparable with that of the composition free of an organosilicon compound (COMPARATIVE EXAMPLE D1) and "B" is tackiness more than the above. For storage stability, the lower value means better storage stability.

Comparative Examples D1 to D3

The composition was prepared in COMPARATIVE EXAMPLE D1 in the same manner as in EXAMPLE D1, except that $C_6H_5OSi(CH_3)_3$ was not used, and tested in the same manner. The results are given in Table D1.

The composition was prepared in each of COMPARATIVE EXAMPLES D2 and D3 in the same manner as in EXAMPLE D1, except that $C_6H_5OSi(CH_3)_3$ was replaced by the same quantity of $(CH_3)_3SiOH$ or $(C_6H_5)_3SiOH$, respectively, and tested in the same manner. The results are also given in Table D1.

The results given in Table D1 indicate that the composition with $(CH_3)_3SiOH$ is lower in improvement extent of modulus and elongation, although excellent in tackiness, and that the composition with $(C_6H_5)_3SiOH$ is deteriorated in tackiness, although improved in modulus and elongation. On the other hand, the composition with $(CH_3)_3SiOC_6H_5$ is improved in modulus and elongation, and, at the same time, excellent in tackiness.

Examples D2 to D5, and
Comparative Examples D4 to D6

The composition was prepared in each of the above examples in the same manner as in EXAMPLE D1, except that $C_6H_5OSi(CH_3)_3$ was replaced by the organosilicon compound shown in Table D2, and tested in the same manner. The results are given in Table D2, together with those of the composition prepared in EXAMPLE D1.

TABLE D1

| | | Characteristics | | | | | | |
|---|---|---|---|---|---|---|---|---|
| | | H type tensile properties | | | | | | |
| | Organosilicon compounds | $M_{150}$ (kg/cm$^2$) | $T_B$ (kg/cm$^2$) | $E_B$ (kg/cm$^2$) | Tackiness (to the touch) | Storage stability | Curing speed | Resistance to weather |
| EXAMPLE D1 | $(CH_3)_3SiOC_6H_5$ | 2.6 | 6.0 | 720 | A | 1.01 | ○ | ○ |
| COMPARATIVE EXAMPLE D1 | Not used | 5.3 | 7.7 | 320 | A | 1.25 | ○ | ○ |
| COMPARATIVE EXAMPLE D2 | $(CH_3)_3SiOH$ | 3.0 | 6.1 | 460 | A | 0.97 | ○ | ○ |
| COMPARATIVE EXAMPLE D3 | $(C_6H_5)_3SiOH$ | 2.5 | 5.8 | 690 | B | 0.97 | ○ | ○ |

TABLE D2

| | | Characteristics | | | | |
|---|---|---|---|---|---|---|
| | Organosilicon Compounds | $M_{150}$ (kg/cm$^2$) | Tackiness (to the touch) | Storage stability | Curing speed | Resistance to Weather |
| EXAMPLE D1 | $(CH_3)_3SiOC_6H_5$ | 2.6 | A | 1.01 | ○ | ○ |
| EXAMPLE D2 | $(CH_3)_3SiOCH_3Cl$ | 2.7 | A | 1.02 | ○ | ○ |
| EXAMPLE D3 | $((CH_3)_3SiOCH_2)_2$ | 2.6 | A | 0.97 | ○ | ○ |
| EXAMPLE D4 | $((CH_3)_3SiOCCH_2CH_2)_3$ $\parallel$ O | 2.8 | A | 1.16 | ○ | ○ |
| EXAMPLE D5 | $((CH_3)_3SiO)_3B$ | 2.7 | A | 0.99 | ○ | ○ |
| COMPARATIVE EXAMPLE D4 | $((CH_3)_3Si)_2NH$ | 2.7 | A | 1.36 | ○ | ○ |
| COMPARATIVE EXAMPLE D5 | $((CH_3)_3Si)_2NCH_3$ | 2.6 | A | 1.86 | ○ | ○ |
| COMPARATIVE EXAMPLE D6 | $(CH_3SiNH)_2CO$ | 2.5 | A | 1.62 | ○ | ○ |

The results given in Table D2 indicate that each composition of the present invention is excellent in all of curing speed, modulus, tackiness, storage stability and resistance to weather, and that use of the organosilicon compound, which generates the compound working as the silanol condensing catalyst, e.g., ammonia or amine, deteriorates storage stability.

Reference Example D1

The composition was prepared in the same manner as in EXAMPLE D1, except that 100 g of the copolymer rubber (A-1) was replaced by the propylene oxide polymer having, in the molecule, 3 dimethoxysilyl groups on the average, represented by the following formula, and having an average molecular weight of 9,600, and tested in the same manner. The results are given in Table D4.

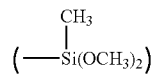

Reference Examples D2 to D4

The composition was prepared in REFERENCE EXAMPLE D2 in the same manner as in EXAMPLE D1, except that $C_6H_5OSi(CH_3)_3$ was not used, and tested in the same manner. The results are given in Table D3.

The composition was prepared in each of REFERENCE EXAMPLES D3 and D4 in the same manner as in EXAMPLE D1, except that $C_6H_5OSi(CH_3)_3$ was replaced by the same quantity of $(CH_3)_3SiOH$ or $(C_6H_5)_3SiOH$, respectively, and tested in the same manner. The results are also given in Table D3.

TABLE D3

| | | Characteristics | | | | | | |
|---|---|---|---|---|---|---|---|---|
| | | H type tensile properties | | | | | | |
| | Organosilicon compounds | $M_{150}$ (kg/cm$^2$) | $T_B$ (kg/cm$^2$) | $E_B$ (kg/cm$^2$) | Tackiness (to the touch) | Storage stability | Curing speed | Resistance to Weather |
| REFERENCE EXAMPLE D1 | $(CH_3)_3SiOC_6H_5$ | 2.5 | 5.8 | 710 | A | 0.92 | ○ | X |
| REFERENCE EXAMPLE D2 | Not used | 5.2 | 7.6 | 340 | A | 1.22 | ○ | X |
| REFERENCE EXAMPLE D3 | $(CH_3)_3SiOH$ | 3.5 | 6.3 | 490 | A | 0.92 | ○ | X |
| REFERENCE EXAMPLE D4 | $(C_6H_5)_3SiOH$ | 2.5 | 5.9 | 680 | B | 0.92 | ○ | X |

Reference Example D5 to D11

The composition was prepared in each of the above examples in the same manner as in REFERENCE EXAMPLE D1, except that $C_6H_5OSi(CH_3)_3$ was replaced by the organosilicon compound shown in Table D4, and tested in the same manner. The results are given in Table D4, together with those of the composition prepared in REFERENCE EXAMPLE D1.

TABLE D4

| | | Characteristics | | | | |
|---|---|---|---|---|---|---|
| | Organosilicon Compounds | $M_{150}$ (kg/cm$^2$) | Tackiness (to the touch) | Storage stability | Curing speed | Resistance to Weather |
| REFERENCE EXAMPLE D1 | $(CH_3)_3SiOC_6H_5$ | 2.5 | A | 0.92 | ○ | X |
| REFERENCE EXAMPLE D5 | $(CH_3)_3SiOCH_3Cl$ | 3.3 | A | 1.02 | ○ | X |
| REFERENCE EXAMPLE D6 | $((CH_3)_3SiOCH_2)_2$ | 2.2 | A | 0.92 | ○ | X |
| REFERENCE EXAMPLE D7 | $((CH_3)_3SiOCCH_2CH_2)_3$ $\parallel$ O | 3.3 | A | 1.18 | ○ | X |
| REFERENCE EXAMPLE D8 | $((CH_3)_3SiO)_3B$ | 3.1 | A | 0.92 | ○ | X |
| REFERENCE EXAMPLE D9 | $((CH_3)_3Si)_2NH$ | 2.7 | A | 1.38 | ○ | X |

TABLE D4-continued

|  | Organosilicon Compounds | Characteristics | | | | |
|---|---|---|---|---|---|---|
|  |  | $M_{150}$ (kg/cm$^2$) | Tackiness (to the touch) | Storage stability | Curing speed | Resistance to Weather |
| REFERENCE EXAMPLE D10 | $((CH_3)_3Si)_2NCH_3$ | 3.6 | A | 1.78 | ○ | X |
| REFERENCE EXAMPLE D11 | $(CH_3SiNH)_2CO$ | 4.3 | A | 1.51 | ○ | X |

Example E Series

The composition, iodine value, intrinsic viscosity [η] and molecular weight distribution (Mw/Mn) of the copolymer rubber used in each of EXAMPLES and COMPARATIVE EXAMPLES were determined by the methods described earlier.

Each composition was tested for its curing speed and accelerated weather resistance by the following methods.

(1) Curing Speed Tests (1A)

Each curing composition was followed for changed frequency by a scanning VNC (SVNC, RAPRA TECHNOLOGY LTD.). Frequency increased with time and became stabilized, and curing speed was based on time required for frequency to change by 95%, wherein the stabilized frequency was set at 100%. The test was conducted at room temperature, in accordance with the instructions described in the following manuals:

(i) Operating manual for the RAPRA's scanning, vibrating probe-type curing tester (scanning VNC) (Software Version 2.2)

(ii) Understanding the RAPRA's scanning, vibrating probe-type curing tester (scanning VNC)(RTL/2844)

(1B)

The curable composition (stock material) was cured under the conditions of 23° C. and 50% RH for 24 hours in a mold, 20 by 80 by 5 mm in size.

Next, the cured product was released from the mold, and thickness of the cured portion was measured by a dial gauge of weak spring force to 0.1 mm, to evaluate its curing speed. It was marked with ○ when its thickness was 1 mm or more and x when it was less than 1 mm.

(2) Accelerated Weather Resistance Test

The weather resistance test was conducted in accordance with JIS B-7753 under the following conditions, using a Sunshine Carbon Arc weatherometer:

<Test Conditions>
Light Irradiation/Rainfall Cycles: Irradiation for 120 minutes/rainfall for 18 minutes
Black panel temperature: 63±2° C.
Tank inside temperature: 40±2° C.
Total light irradiation time: 500 hours Production Example E1

[Production of silyl-containing ethylene/propylene/5-vinyl-2-norbornene Random Copolymer Rubber (A-1)]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, VO(OEt)$_2$Cl and Al(Et)$_{1.5}$Cl$_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber (A$_0$-1) in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber (A$_0$-1) thus produced contained ethylene at 68% by mol, and had an intrinsic viscosity [η] of 0.2 dl/g measured in decalin kept at 135° C., iodine value (IV) of 10(g/100 g) and Mw/Mn of 15.

Two % toluene solution (0.3 g) of chloroplatinic acid and 1.5 g of methyldimethoxysilane were added to 100 g of the ethylene/propylene/5-vinyl-2-norbornene random copolymer rubber (A$_0$-1), and they were allowed to react with each other at 120° C. for 2 hours. The excess methyldimethoxysilane and the solvent (toluene) were distilled off from the effluent. This produced 101.5 g of the ethylene/propylene/5-vinyl-2-norbornene random copolymer rubber (A-1) containing dimethoxymethylsilyl group (—SiCH$_3$(OCH$_3$)$_2$).

Production Example E2

[Production of silyl-containing Vinyl Polymer]

Xylene, 340 g was charged in a reactor, equipped with an agitator, a thermometer, a nitrogen-supplying nozzle, a drip-feed funnel and a condenser, and heated at 110° C.

Then, the reactor was continuously charged for 3 hours with a solution of 140 g of styrene, 166 g of butyl acrylate, 467 g of methyl methacrylate, 100 g of stearyl methacrylate, 117 g of γ-methacryloxypropyltrimethoxysilane, 10 g of N-methylol acrylamide, 30 g of γ-mercaptopropyltrimethoxysilane and 30 g of azobisisobutylonitrile.

On completion of the addition of the monomer, a separately prepared solution of 3 g of azobisisobutylonitrile dissolved in 200 g of toluene was added to the above mixture in 1 hour for the polymerization for another 1 hour, to produce the silyl-containing vinyl resin.

The silyl-containing vinyl resin solution thus prepared contained nonvolatiles at 65%. The resin had a number-average molecular weight of 4,400, determined by GPC.

Production Example E3

[Production of Product of the Reaction Between an Epoxy Compound and an Acidic Phosphate Ester]

Monobutyl phosphate, 50 g (Daihachi Kagaku, MP-4) having an acid value of 670 was charged in a reactor, equipped with an agitator, a thermometer, a nitrogen-supplying nozzle, a drip-feed funnel and a condenser, to which 70.5 g of γ-glycidoxypropyltrimethoxysilane was added slowly dropwise in a nitrogen atmosphere, with stirring. After heat generation was no longer observed, the mixture was further heated at 80° C. for 1 hour, to continue the reaction. The effluent was incorporated with 12 g of methyl orthoacetate, 12 g of methanol and 96.5 g of xylene, after it was cooled, to produce the curing catalyst containing the active component at 50% (Curing Catalyst 1).

Production Example E4

[Production of Copolymer Containing Acidic Phosphate Ester]

Isopropanol, 170 g and butyl acetate, 170 g were charged in a reactor, equipped with an agitator, a thermometer, a nitrogen-supplying nozzle, a drip-feed funnel and a condenser, and heated at 110° C.

Then, the reactor was continuously charged for 3 hours with a solution of 200 g of styrene, 300 g of butyl acrylate, 380 g of methyl methacrylate, 110 g of α-acid phosphooxyethyl methacrylate (Daihachi Kagaku, MR-200), 20 g of acrylic acid and 30 g of azobisisobutylonitrile.

On completion of the addition of the monomer, a separately prepared solution of 3 g of azobisisobutylonitrile dissolved in 200 g of butyl acetate was added to the above mixture in 1 hour for the polymerization for another 1 hour. It was further incorporated with 350 g of isopropanol, to produce the copolymer containing acidic phosphate ester, containing resin solid at 50% (Curing Catalyst 2).

Production Example E5

1,9-Decadiene, 138 g was charged in a pressure-resistant reactor, to which 256 g of trimethoxysilane and 1.04 g of 10% isopropanol solution of chloroplatinic acid were added in a nitrogen atmosphere, to allow them to react with each other at 90° C. for 4 hours. On completion of the reactions, the product was analyzed by infrared absorption spectroscopy. Infrared absorption of the allyl group at 1640cm$^{-1}$ was found to disappear. The unreacted trimethoxysilane was distilled off at 100° C. under a vacuum (5 Torr), to obtain the silane compound (B-1) having a structure of $(CH_3O)_3Si(CH_2)_{10}Si(OCH_3)_3$.

Production Example E6

1-Octadecene, 252 g was charged in a pressure-resistant reactor, to which 142 g of trichlorosilane and 0.5 g of 10% isopropanol solution of chloroplatinic acid were added in a nitrogen atmosphere, to allow them to react with each other at 90° C. for 4 hours. On completion of the reactions, the product was analyzed by infrared absorption spectroscopy. Infrared absorption of the allyl group at 1640 cm$^{-1}$ was found to disappear. The unreacted trichlorosilane was distilled off at 100° C. under a vacuum (5 Torr). The effluent was incorporated with 192 g of methanol, treated under a vacuum to remove hydrogen chloride gas formed, further subjected to ester exchanging at 60° C. for 2 hours with the addition of 100 g of methyl orthoformate, and treated under a vacuum (5 Torr) to distill of the volatiles, to obtain the silane compound (B-2) having a structure of $(CH_3O)_3Si(CH_2)_{17}CH_3$.

Production Example E7

1-Octadecanol, 270 g was charged in a pressure-resistant reactor, to which 14 g of hexane was added, and the mixture was treated for deaeration under a vacuum (5 Torr) at 90° C. for 1 hour to remove moisture.

It was incorporated with 257 g of γ-isocyanate propyltriethoxysilane in a nitrogen atmosphere, and they were allowed to react with each other at 90° C. for 2 hours and then at 110° C. for 1 hour. The product was analyzed by infrared absorption spectroscopy. Infrared absorption of isocyanate at 2270 cm$^{-1}$ disappeared, and that relevant to the urethane bond was observed at 1530 cm$^{-1}$. Thus, it is judged that the silane compound (B-6) having the following structure was formed.

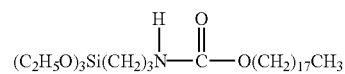

Production Example E8

Hydrogenated polybutadiene glycol, 500 g (Nippon Soda Co., Ltd., NISSO-PB GI-1000) having a hydroxyl value of 63.6 was charged in a pressure-resistant reactor, to which 25 g of hexane was added, and the mixture was treated for deaeration under a vacuum (5 Torr) at 90° C. for 1 hour to remove moisture.

Next, the above composition was incorporated with 126 g of 28% methanol solution of sodium methoxide, and the reactants were allowed to react with each other for 4 hours, while methanol was distilled off at 140° C. under a vacuum. Then, 52.5 g of allyl chloride was added to the above system dropwise for the reactions at 110° C. for 2 hours. The effluent was distilled at 110° C. under a vacuum to remove the volatiles. The effluent was incorporated with 1.5 L of hexane and 50 g of aluminum silicate after it was cooled, and the resultant mixture was stirred for 1 hour, allowed to stand, filtered by celite to remove the salt, and distilled under a vacuum to remove hexane, to obtain the hydrogenated polybutadiene with allyl groups at both terminals.

Then, 300 g of the above product was charged in a pressure-resistant reactor, to which 15 g of hexane was added, and the mixture was treated for deaeration under a vacuum at 90° C. to remove moisture. Next, the above composition was incorporated with 49.9 g of trimethoxysilane and 0.21 g of 10% isopropanol solution of chloroplatinic acid, to allow them to react with each other at 90° C. for 4 hours.

On completion of the reactions, the effluent was distilled at 100° C. under a vacuum to remove the volatiles. This produced the hydrogenated polybutadiene with trimethoxysilyl groups at both terminals (Silane Compound B-3).

Examples E1 to E7

The composition containing the dimethoxymethylsilyl-containing ethylene/propylene/5-vinyl-2-norbornene random copolymer rubber (A-1), prepared in PRODUCTION EXAMPLE E1, was prepared for each of EXAMPLES E1 to E7. The other components were the silane compound (B) having a long polyolefin chain prepared in one of PRODUCTION EXAMPLES E5 to E8, and the curing catalyst (C) prepared in PRODUCTION EXAMPLE E3 or E4, or of a commercial tin compound (dioctyl tin maleate, Sakai Kagaku, TN801™). The composition for each EXAMPLE is given in Table E1. It was diluted with xylene to have an adequate viscosity for a paint.

The coating film of the thermosetting resin was prepared by the following procedure. A soft steel plate was ground by a #240, abrasive paper, coated with a 2-liquid type urethane surfacer (Isamu Toryo, Hiprisurf 2C™), ground again by a #400 abrasive paper after it was dried, and coated with a clear paint of melamine acrylic resin (Kansai Paint Co., Ltd., Magiclon M-77™). The coating film was baked at 150° C. for 30 minutes, and treated with a medium rubbing compound, to form the base.

The coating film of the thermosetting resin was spray-coated with the composition prepared in each of EXAMPLES E1 to E7, after it was made into the paint, by the common method, forcedly dried at 60° C. for 30 minutes, and allowed to stand at room temperature for 7 days, to produce the cured coating film.

Its adhesion was evaluated by a 2 mm square checker pattern cut by a knife, wherein a cellophane tape was put on the pattern and then taken off, for visual observation of the surface exfoliation conditions.

Then, the test piece was placed in a blister box kept at 50° C. and RH 98% for 3 days, and evaluated again for adhesion, based on the standards provided by Nippon Paint, Inspection and Testing Association (Point 10: No exfoliation of the coating film, and Point 0: Coating film is totally exfoliated).

The results are given in Table E1.

Comparative Examples E1 to E11

The composition containing the silyl-containing vinyl resin, prepared in PRODUCTION EXAMPLE E2, was prepared for each of COMPARATIVE EXAMPLES E1 to E11. The other components were the silane compound (B) having a long polyolefin chain prepared in one of PRODUCTION EXAMPLES E5 to E8, and the curing catalyst (C) prepared in PRODUCTION EXAMPLE E3 or E4, or of a commercial tin compound (dioctyl tin maleate, Sakai Kagaku, TN801™). The composition for each COMPARATIVE EXAMPLE is given in Table E1 . It was diluted with xylene to have an adequate viscosity for a paint.

Each composition was evaluated its adhesion in the same manner as in EXAMPLE E1.

The results are given in Table E2.

The composition prepared in each of EXAMPLES E1 to E7 and COMPARATIVE EXAMPLES E1 to E11 was tested for curing speed and resistance to weather, in accordance with the methods described earlier.

TABLE E1

|  | EXAMPLES | | | | | | |
| --- | --- | --- | --- | --- | --- | --- | --- |
|  | E1 | E2 | E3 | E4 | E5 | E6 | E7 |
| Dimethoxysilyl-containing EPDM (1) | 100 | 100 | 100 | 100 | 100 | 100 | 100 |
| Silane compound (B) having a long polyolefin chain | | | | | | | |
| B-1 (PRODUCTION EXAMPLE E5) | 6.5 | — | — | — | — | — | — |
| B-2 (PRODUCTION EXAMPLE E6) | — | 6.5 | — | — | 6.5 | 6.5 | 6.5 |
| B-3 (PRODUCTION EXAMPLE E7) | — | — | 6.5 | — | — | — | — |
| B-4 (PRODUCTION EXAMPLE E8) | — | — | — | 6.5 | — | — | — |
| Curing catalyst (C) | | | | | | | |
| AP-8 * | — | — | — | — | 1 | — | — |
| Curing catalyst 1 (PRODUCTION EXAMPLE E3) | 2 | 2 | 2 | 2 | — | — | — |
| Curing catalyst 2 (PRODUCTION EXAMPLE E4) | — | — | — | — | — | 10 | — |
| TN801 ** | — | — | — | — | — | — | 2 |
| Adhesion | | | | | | | |
| Primary | 10 | 10 | 10 | 10 | 10 | 10 | 10 |
| Secondary | 10 | 10 | 10 | 10 | 10 | 10 | 10 |
| Curing speed | | | | | | | |
| (1A) [Hr] | 6 | 7 | 8 | 9 | 7 | 8 | 10 |
| (1B) | ○ | ○ | ○ | ○ | ○ | ○ | ○ |
| Resistance to weather *** | A | A | A | A | A | A | A |

* AP-8 (Trade mark), Daihachi Kagaku, A mixture of dioctyl phosphate and monooctyl phosphate
** TN801 (Trade mark), Sakai Kagaku, Dioctyl tin maleate
*** Evaluation of resistance to weather: A: No cracks or molten portion observed, B: Small cracks or molten portion observed, although slightly, C: Cracks or molten portion observed.

The results are given in Tables E1 and E2.

TABLE E2

|  | COMPARATIVE EXAMPLES | | | | | | | | | | |
| --- | --- | --- | --- | --- | --- | --- | --- | --- | --- | --- | --- |
|  | E1 | E2 | E3 | E4 | E5 | E6 | E7 | E8 | E9 | E10 | E11 |
| Silyl-containing vinyl-based resin (PRODUCTION EXAMPLE E2) | 100 | 100 | 100 | 100 | 100 | 100 | 100 | 100 | 100 | 100 | 100 |
| Silane compound (B) having a long polyolefin chain |  |  |  |  |  |  |  |  |  |  |  |
| B-1 (PRODUCTION EXAMPLE E5) | 6.5 | — | — | — | — | — | — | — | — | — | — |
| B-2 (PRODUCTION EXAMPLE E6) | — | 6.5 | — | — | 6.5 | 6.5 | 6.5 | — | — | — | — |
| B-3 (PRODUCTION EXAMPLE E7) | — | — | 6.5 | — | — | — | — | — | — | — | — |
| B-4 (PRODUCTION EXAMPLE E8) | — | — | — | 6.5 | — | — | — | — | — | — | — |
| Curing catalyst (C) |  |  |  |  |  |  |  |  |  |  |  |
| AP-8 * | — | — | — | — | 1 | — | — | 1 | — | — | — |
| Curing catalyst 1 (PRODUCTION EXAMPLE E3) | 2 | 2 | 2 | 2 | — | — | — | — | 2 | — | — |
| Curing catalyst 2 (PRODUCTION EXAMPLE E4) | — | — | — | — | — | 10 | — | — | — | 10 | — |
| TN801 ** | — | — | — | — | — | — | 2 | — | — | — | 2 |
| Adhesion |  |  |  |  |  |  |  |  |  |  |  |
| Primary | 10 | 10 | 10 | 10 | 9 | 8 | 8 | 1 | 2 | 0 | 0 |
| Secondary | 9 | 9 | 9 | 9 | 8 | 7 | 7 | 0 | 0 | 0 | 0 |
| Curing speed (Hr) |  |  |  |  |  |  |  |  |  |  |  |
| (1A) | 18 | 20 | 24 | 22 | 14 | 16 | 18 | 24 | 36 | 20 | 48 |
| (1B) | X | X | X | X | X | X | X | X | X | X | X |
| Resistance to weather *** | B | B | B | B | C | C | C | C | C | C | C |

\* AP-8 (Trade mark), Daihachi Kagaku, A mixture of dioctyl phosphate and monooctyl phosphate
\*\* TN801 (Trade mark), Sakai Kagaku, Dioctyl tin maleate
\*\*\* Evaluation of resistance to weather: A: No cracks or molten portion observed, B: Small cracks or molten portion observed, although slightly, C: Cracks or molten portion observed.

Examples F Series

The composition, iodine value, intrinsic viscosity [η] and molecular weight distribution (Mw/Mn) of the copolymer rubber used in each of EXAMPLES and COMPARATIVE EXAMPLES were determined by the methods described earlier.

The curing speed tests and the weather resistance tests were conducted by the following methods for EXAMPLES and COMPARATIVE EXAMPLES.

(1) Curing Speed Test

The curable composition (stock material) was cured under the conditions of 23° C. and 50% RH for 24 hours in a mold, 20 by 80 by 5 mm in size.

Next, the cured product was released from the mold, and thickness of the cured portion was measured by a dial gauge of weak spring force to 0.1 mm, to evaluate its curing speed. It was marked with ⊚ when its thickness was 2 mm or more, Δ when it was 1 to 1.9 mm, and x when it was less than 0.9 mm.

(2) Weather Resistance Test

The weather resistance test was conducted in accordance with JIS B-7753 using a Sunshine Carbon Arc weatherometer.

<Testing Conditions>
Light irradiation/rainfall cycles: Irradiation for 120 minutes/rainfall for 18 minutes
Black panel temperature: 63±2° C.
Tank inside temperature: 40±2° C.
Total light irradiation time: 500 hours Production Example F1

[Production of silyl-containing ethylene/propylene/5-vinyl-2-norbornene Random Copolymer Rubber (A-1)]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, VO(OEt)$_2$Cl and Al(Et)$_{1.5}$Cl$_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber (A$_0$-1) in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber (A$_0$-1) thus produced contained ethylene at 68% by mol, and had an intrinsic viscosity [η] of 0.2 dl/g measured in decalin kept at 135° C., iodine value (IV) of 10(g/100 g) and Mw/Mn of 15.

Two % toluene solution (0.3 g) of chloroplatinic acid and 1.5 g of methyldimethoxysilane were added to 100 g of the ethylene/propylene/5-vinyl-2-norbornene random copolymer rubber (A$_0$-1), and they were allowed to react with each other at 120° C. for 2 hours. The excess methyldimethoxysilane and the solvent (toluene) were distilled off from the effluent. This produced 101.5 g of the ethylene/propylene/5-vinyl-2-norbornene random copolymer rubber (A-1) containing dimethoxymethylsilyl group ($-SiCH_3(OCH_3)_2$).

Production Example F2

In a 1 L metallic autoclave, 148 g of phthalic anhydride, 46.4 g of propylene oxide, 22.8 g of acrylglycidyl ether, 11.6 g of allyl alcohol and 0.5 g of dimethylbenzylamine were charged and reacted with each other at 100° C. for 3 hours, to which 46 g of propylene oxide was added for further reactions for another 1 hour. Then, the excess propylene oxide was removed, to obtain the polyester having a molecular weight of 1,200.

Next, 100 g of the polyester thus produced was reacted with 9.5 g of acetic anhydride at 120° C. for 2 hours, and the hydroxyl group in the polyester was treated, after the excess acetic anhydride was removed. Then 22.2 g of the polyester with the treated hydroxyl group was reacted with 0.0035 g of chloroplatinic acid and 8.65 g of methyl dichlorosilane at 80° C. for 3 hours. The excess methyl dichlorosilane was removed under a vacuum. Then, the above effluent was incorporated with 20 mL of methanol and 20 mL of methyl orthoformate, and the mixture was stirred at room temperature for 1 hour to remove the low-boiling materials under a vacuum. This produced the silyl-containing polyester.

Production Example F3

A solution of 2 g of azobisisobutylonitrile dissolved in 30 g of styrene, 16 g of allyl methacrylate, 20 g of methyl methacrylate, 19 g of n-butyl methacrylate, 14 g of n-butyl acrylate, 1 g of acrylic acid and 2 g of n-dodecylmercaptan was added dropwise to 100 g of toluene as the solvent heated at 90° C., and they were allowed to react with each other for 10 hours, to obtain the vinyl-based polymer having a molecular weight of 8,000 and containing an allyl type unsaturated group.

The vinyl-based polymer had the infrared absorption relevant to the carbon-carbon double bond at 1648 $cm^{-1}$.

A solution of 1.5 g of methyldimethoxysilane and 0.0005 g of chloroplatinic acid dissolved in isopropanol was added to 20 g of the vinyl-based polymer having an allyl type unsaturated group thus produced, and they were allowed to react with each other at 90° C. for 6 hours under sealed conditions. The product had no infrared absorption at 1648 $cm^{-1}$ in the infrared absorption spectral pattern. Therefore, it was judged that the silyl-containing vinyl-based polymer was produced.

Production Example F4

The silyl-containing diallyl phthalate-based copolymer was produced in the same manner as in PRODUCTION EXAMPLE F3, except that 16 g of allyl methacrylate was replaced by 31 g of diallyl phthalate.

Production Example F5

A solution of 2 g of azobisisobutylonitrile dissolved in 30 g of styrene, 27 g of γ-methacryloxypropyltrimethoxysilane, 20 g of methyl methacrylate, 19 g of n-butyl methacrylate, 14 g of n-butyl acrylate, 1 g of acrylic acid and 2 g of n-dodecylmercaptan was added dropwise to 100 g of toluene as the solvent heated at 100° C., and they were allowed to react with each other for 10 hours, to obtain the silyl-containing vinyl-based polymer having a molecular weight of 9,000.

Production Example F6

One hundred grams of diallyl phthalate prepolymer (DAISO Co. Ltd., DAISO DAP L™) having an iodine value of around 80, 0.00001 g of chloroplatinic acid and 1 g of hydroquinone were dissolved in 100 mL of toluene, to which 35mL of methyl diethoxysilane was added, and they were allowed to react with each other at 90° C. for 3 hours, to obtain the silyl-containing diallyl phthalate prepolymer.

Production Example F7

[Production of silyl-containing Polymer]

Xylene, 45.9parts by weight was charged in a reactor, equipped with an agitator, a thermometer, a reflux condenser, an $N_2$ gas-supplying nozzle and a drip-feed funnel, and heated to 110° C. in a flow of $N_2$ gas, to which the mixture (a) described below was added dropwise through the drip-feed funnel at a constant rate for 5 hours:

Mixture (a);

| | |
|---|---|
| Styrene | 12.8 parts by weight |
| Methyl methacrylate | 50.1 parts by weight |
| Stearyl methacrylate | 6.9 parts by weight |
| γ-Methacryloxypropyltrimethoxysilane | 30.2 parts by weight |
| Xylene | 13.5 parts by weight |
| 2,2'-Azobisisobutylonitrile | 4.5 parts by weight |

On completion of addition of the above mixture (a), 0.5 part by weight of 2,2'-azobisisobutylonitrile and 5 parts by weight of toluene were further added at a constant rate for 1 hour. The resultant resin solution was cured at 110° C. for 2 hours and cooled, to which xylene was added to adjust the solid content at 60%.

The characteristics of the Resin Solution A thus obtained are given in Table F1.

Production Example F8

[Production of Acrylic-based Resin for Paints]

Resin Solution B was produced in the same manner as in PRODUCTION EXAMPLE F7, except that 31.8 parts by weight of butyl acetate and 9.5 parts by weight of xylene were charged, to which the mixture (b) described below was added in place of the mixture (a):

Mixture (b)

| | |
|---|---|
| Xylene | 18.0 parts by weight |
| Styrene | 28.3 parts by weight |
| Methyl methacrylate | 6.9 parts by weight |
| n-Butyl acrylate | 47.6 parts by weight |
| Methacrylic acid | 0.3 part by weight |
| 2-Hydroxyethyl methacrylate | 16.9 parts by weight |
| 2,2'-Azobisisobutylonitrile | 1.8 parts by weight |

On completion of addition of the above mixture (b), 0.2 part by weight of 2,2'-azobisisobutylonitrile and 3.8 parts by weight of toluene were further added at a constant rate for 1 hour. The resultant resin solution was cured at 110° C. for 2 hours and cooled, to which xylene was added to adjust the solid content at 60%.

The characteristics of the Resin Solution B thus obtained are given in Table F1.

TABLE F1

| Characteristics | Resin Solution A | Resin Solution B |
|---|---|---|
| Non-volatile matters [%] | 60 | 60 |
| Viscosity (23° C.) [cPs] | 900 | 4400 |
| Acid value (KOH/g solid) | 0 | 2.0 |
| Hydroxyl value (KOH/g solid) | 0 | 73 |
| Color Number (Gardner) | <1 | <1 |

Examples F1 to F8, and Comparative Examples F1 to F14

A soft steel plate as the base for the test piece was degreased, ground by a#240 abrasive paper, coated with a urethane surfacer, and baked at 80° C. for 30 minutes. Then, the coated surface was further ground by a #600 abrasive paper, coated with a clear paint, described in Table F2 for each of EXAMPLES F1 to F8 and COMPARATIVE EXAMPLES F1 to F14, and baked at 140° C. for30 minutes, to prepare the test piece.

Each test piece was left at room temperature for 30 minutes, after it was baked under the above conditions. Their characteristics are given in Table F2.

The notes *1 to *4 in Table F2 are described below:

*1: Q-631 is a modified cycloaliphatic polyamine, produced by Mitsui Chemicals, Inc.

*2: Hardness was determined in accordance with JIS K-5400.

*3: For the toluene spot test, several drops of toluene were dropped onto the coating film, left at room temperature and dried, to observe the coating film conditions.

Resistance of the film to the solvent was evaluated according to the following four-grade system.

<Four-grade System for Evaluation of the Resistance to the Solvent>

◎: No change is observed at all on the coating film surface

○: No change is observed on the coating film surface

Δ: Traces are left on the coating film surface x: The coating film is dissolved

*4: Evaluation of resistance to weather

A: No cracks or molten portion observed.

B: Small cracks or molten portion observed, although slightly.

C: Cracks or molten portion observed.

TABLE F2

|  | EXAMPLES ||||||||
|---|---|---|---|---|---|---|---|---|
|  | F1 | F2 | F3 | F4 | F5 | F6 | F7 | F8 |
| Composition [parts by weight] | | | | | | | | |
| Silyl-Containing Copolymer PRODUCTION EXAMPLE F1 | 100 | 100 | 100 | 100 | 100 | 100 | 100 | 100 |
| Acrylic Resin PRODUCTION EXAMPLE F8 | 80 | — | — | — | — | — | — | — |
| Thermosetting Acrylic Paint (Belcoat No. 5200) | — | 80 | — | — | — | 80 | — | 80 |
| Alkyd paint (Hariphthal SFC42-60X) | — | — | 40 | — | — | — | — | — |
| Epoxy-based paint (Epikote 1001) | — | — | — | 40 | — | — | — | — |
| Organopolysiloxane (Z6018) | — | — | — | — | 40 | — | 40 | — |
| Amines(B) | | | | | | | | |
| Q-631 *1 | — | — | — | — | — | 2 | 2 | — |
| Piperidine | — | — | — | — | — | — | — | 3 |
| Monoethanol amine | 2 | 2 | 2 | 2 | 2 | — | — | — |
| Silane-coupling agent (C) | | | | | | | | |
| N-β-(aminoethyl)-γ-aminopropyl trimethoxysilane | — | — | — | — | — | 1 | 1 | — |
| γ-aminopropyltriethoxysilane | — | — | — | — | — | — | — | 1.5 |
| γ-mercaptopropyltriethoxysilane | 1 | 1 | 1 | 1 | 1 | — | — | — |
| Tests | | | | | | | | |
| Hardness *2 | 3H | 3H | 3H | 3H | 3H | 3H | 3H | 3H |
| Toluene spot test *3 | ○ to ◎ | ○ to ◎ | ○ to ◎ | ○ to ◎ | ○ to ◎ | ○ to ◎ | ○ to ◎ | ○ to ◎ |
| Curing speed (Film tension) | ◎ | ◎ | ◎ | ◎ | ◎ | ◎ | ◎ | ◎ |
| Resistance to weather *4 | A | A | A | A | A | A | A | A |

TABLE F2-continued

|  | COMPARATIVE EXAMPLES | | | | | | |
| --- | --- | --- | --- | --- | --- | --- | --- |
|  | F1 | F2 | F3 | F4 | F5 | F6 | F7 |
| Composition [parts by weight] | | | | | | | |
| Silyl-Containing Copolymer | | | | | | | |
| PRODUCTION EXAMPLE F3 | — | — | — | — | — | 100 | 100 |
| PRODUCTION EXAMPLE F4 | — | — | — | — | — | — | — |
| PRODUCTION EXAMPLE F5 | 100 | 100 | 100 | 100 | 100 | — | — |
| Acrylic Resin PRODUCTION EXAMPLE F8 | 80 | — | — | — | — | — | — |
| Thermosetting acrylic paint (Belcoat No. 5200) | — | 80 | — | — | — | 80 | — |
| Alkyd paint (Hariphthal SFC42-60X) | — | — | 40 | — | — | — | — |
| Epoxy-based paint (Epikote 1001) | — | — | — | 40 | — | — | 40 |
| Organopolysiloxane (Z6018) | — | — | — | — | 40 | — | — |
| Amines (B) | | | | | | | |
| Q-631 *1 | — | — | — | — | — | 2 | 2 |
| Piperidine | — | — | — | — | — | — | — |
| Monoethanolamine | 2 | 2 | 2 | 2 | 2 | — | — |
| Silane-coupling agent (C) | | | | | | | |
| N-β-(aminoethyl)-γ-aminopropyl-Trimethoxysilane | — | — | — | — | — | 1 | 1 |
| γ-Aminopropyltriethoxysilane | — | — | — | — | — | — | — |
| γ-Mercaptopropyltriethoxysilane | 1 | 1 | 1 | 1 | 1 | — | — |
| Tests | | | | | | | |
| Hardness *2 | 2H | 2H | 2H | 2H | 2H | 2H | 2H |
| Toluene spot test *3 | ○ | ○ | ○ | ○ | ○ | ○ | ○ |
| Curing speed (Film tension) | X | X | Δ | Δ | Δ | X | X |
| Resistance to weather *4 | B | B | B | B | B | B | B |

|  | COMPARATIVE EXAMPLES | | | | | | |
| --- | --- | --- | --- | --- | --- | --- | --- |
|  | F8 | F9 | F10 | F11 | F12 | F13 | F14 |
| Composition [parts by weight] | | | | | | | |
| Silyl-Containing Copolymer | | | | | | | |
| PRODUCTION EXAMPLE F2 | — | — | — | — | — | — | 100 |
| PRODUCTION EXAMPLE F3 | — | — | — | — | — | — | — |
| PRODUCTION EXAMPLE F4 | 100 | — | — | — | — | — | — |
| PRODUCTION EXAMPLE F5 | — | 100 | 100 | — | — | — | — |
| Acrylic Resin PRODUCTION EXAMPLE F8 | — | — | — | — | — | — | 80 |
| Thermosetting acrylic paint (Belcoat No. 5200) | 80 | — | 80 | 180 | — | — | — |
| Alkyd paint (Hariphthal SFC42-60X) | — | — | — | — | — | — | — |
| Epoxy-based paint (Epikote 1001) | — | — | — | — | 140 | — | — |
| Organopolysiloxane (Z6018) | — | — | — | — | — | 140 | — |
| Amines (B) | | | | | | | |
| Q-631 *1 | — | — | — | — | — | — | — |
| Piperidine | 3 | — | — | — | — | — | — |
| Monoethanolamine | — | 2 | — | 2 | 2 | 2 | 2 |
| Silane-coupling agent (C) | | | | | | | |
| N-β-(aminoethyl)-γ-aminopropyl trimethoxysilane | — | — | — | — | — | — | — |
| γ-aminopropyltriethoxysilane | 1.5 | — | — | — | — | — | — |
| γ-mercaptopropyltriethoxysilane | — | 1 | — | 1 | 1 | 1 | 1 |
| Tests | | | | | | | |
| Hardness *2 | 2H | HB | 6B | 2H | 2H | 2H | 3H |
| Toluene spot test *3 | ○ | Δ | X | ○ | ○ | ○ | ○ to ⊙ |

TABLE F2-continued

| Curing speed (Film tension) | X | X | X | X | X | X | ◉ |
| Resistance to weather *4 | B | C | C | B to C | B to C | B to C | C |

Reference Examples F1 to F5, and Reference Comparative Examples F1 to F5

A soft steel plate as the base for the test piece was degreased, ground by a #240 abrasive paper, coated with a urethane surfacer, and baked at 80° C. for 30 minutes. Then, the coated surface was further ground by a #600 abrasive paper, coated with a clear paint, described in Table F3 for each of REFERENCE EXAMPLES F1 to F5 and REFERENCE COMPARATIVE EXAMPLES F1 to F5, and baked at 140° C. for 30 minutes, to prepare the test piece.

Each test piece was left at room temperature for 30 minutes, after it was baked under the above conditions. Their characteristics are given in Table F3.

The notes *1 to *11 in Table F3 are described below:
*1 : Thermosetting acrylic paint, produced by NOF Corp.
*2 : Soybean fatty acid short-oil type alkyd resin, produced by Harima Chemicals.
*3 : Epoxy resin, produced by Shell
*4 : Organopolysiloxane, produced by Dow Corning
*5 : Dioctyl tin maleate, Sakai Kagaku Kogyo
*6 : Amino-containing silane coupling agent, produced by UCC
*7 : Epoxy-containing silane coupling agent, produced by UCC
*8 : Dioctyl acid phosphate, produced by Daihachi Kagaku
*9 : Hardness was determined in accordance with JIS K-5400
*10 : For the toluene spot test, several drops of toluene was dropped onto the coating film, left at room temperature and dried, to observe the coating film conditions. Resistance of the film to the solvent was evaluated according to the following four-grade system.

<Four-grade System for Evaluation of the Resistance to the Solvent>
  ◉: No change is observed at all on the coating film surface
  ○: No change is observed on the coating film surface
  Δ: Traces are left on the coating film surface
  x: The coating film is dissolved
*11 : Evaluation of resistance to weather
  A: No cracks or molten portion observed
  B: Small cracks or molten portion observed, although slightly
  C: Cracks or molten portion observed

TABLE F3

| | REFERENCE EXAMPLE | | | | |
| --- | --- | --- | --- | --- | --- |
| | F1 | F2 | F3 | F4 | F5 |
| Composition [parts by weight] | | | | | |
| Silyl-Containing Copolymer PRODUCTION EXAMPLE F7 | 100 | 100 | 100 | 100 | 100 |
| Acrylic Resin PRODUCTION EXAMPLE F8 | 80 | — | — | — | — |
| Thermosetting acrylic paint (Belcoat No. 5200, Clear S) *1 | — | 80 | — | — | — |
| Alkyd paint (Hariphthal SFC42-60X) *2 | — | — | 40 | — | — |
| Epoxy-based paint (Epikote 1001) *3 | — | — | — | 40 | — |
| Organopolysiloxane (Z6018) *4 | — | — | — | — | 40 |
| Curing catalysts | | | | | |
| TN801 *5 | 4 | 4 | — | — | — |
| A-1120 *6 | 1 | 1 | — | — | — |
| A-187 *7 | 1 | 1 | — | — | — |
| DP-8 *8 | — | — | 1 | 1 | 1 |
| N,N-dimethyl-n-dodecylamine | — | — | 1 | 1 | 1 |
| Tests | | | | | |
| Hardness *9 | 2H | 2H | 2H | 2H | 2H |
| Toluene spot test *10 | ○ | ○ | ○ | ○ | ○ |
| Curing speed (Film tension) | X | X | X | X | X |
| Resistance to weather *11 | B | B | B | B | B |

| | REFERENCE COMPARATIVE EXAMPLE | | | | |
| --- | --- | --- | --- | --- | --- |
| | F1 | F2 | F3 | F4 | F5 |
| Composition [parts by weight] | | | | | |
| Silyl-Containing Copolymer PRODUCTION EXAMPLE F7 | 100 | 100 | — | — | — |
| Acrylic Resin PRODUCTION EXAMPLE F8 | — | 80 | — | — | — |
| Thermosetting acrylic paint (Belcoat No. 5200, Clear S) *1 | — | — | 180 | — | — |
| Alkyd paint Hariphthal SFC42-60X) *2 | — | — | — | — | — |
| Epoxy-based paint (Epikote 1001) *3 | — | — | — | 140 | — |
| Organopolysiloxane (Z6018) *4 | — | — | — | — | 140 |
| Curing catalysts | | | | | |
| TN801 *5 | 4 | — | 4 | — | — |
| A-1120 *6 | 1 | — | 1 | — | — |
| A-187 *7 | 1 | — | 1 | — | — |
| DP-8 *8 | — | — | — | 1 | 1 |
| N,N-dimethyl-n-dodecylamine | — | — | — | 1 | 1 |
| Tests | | | | | |
| Hardness *9 | HB | 6B | 2H | 2H | 2H |
| Toluene spot test *10 | Δ | X | ○ | ○ | ○ |
| Curing speed (Film tension) | X | X | X | X | X |
| Resistance to weather *11 | C | C | C | C | C |

Examples G Series

The composition, iodine value, intrinsic viscosity [η] and molecular weight distribution (Mw/Mn) of the copolymer rubber used in each of EXAMPLES and COMPARATIVE EXAMPLES were determined by the methods described earlier.

Production Example

[Production of silyl-containing ethylene/propylene/5-vinyl-2-norbornene Random Copolymer Rubber (A-1)]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, VO(OEt)$_2$Cl and Al(Et)$_{1.5}$Cl$_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber (A$_0$-1) in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber (A$_0$-1) thus produced contained ethylene at 68% by mol, and had an intrinsic viscosity [η] of 0.2 dl/g measured in decalin kept at 135° C., iodine value (IV) of 10 (g/100 g) and Mw/Mn of 15.

Two % toluene solution (0.3 part by weight) of chloroplatinic acid and 1.5 parts by weight of methyldimethoxysilane were added to 100 parts by weight of the ethylene/propylene/5-vinyl-2-norbornene random copolymer rubber (A$_0$-1), and they were allowed to react with each other at 120° C. for 2 hours. The excess methyldimethoxysilane and the solvent (toluene) were distilled off from the effluent. This produced 101.5 parts by weight of the ethylene/propylene/5-vinyl-2-norbornene random copolymer rubber (A-1) containing dimethoxymethylsilyl group (—Si (CH$_3$) (OCH$_3$)$_2$).

Examples G1 to G8, and Reference Example G1

A mixture containing the silyl-containing ethylene/propylene/5-vinyl-2-norbornene random copolymer rubber (A-1), prepared in PRODUCTION EXAMPLE, was prepared for each of the above examples. It was composed of 100 g of the copolymer rubber (A-1), 120 g of calcium carbonate as the filler (Shiraishi K. K., CCR™), 20 g of titanium dioxide (Ishihara Sangyo Kaisha, Ltd., R820™), 2 g of dibutyl tin diacetylacetonate (NITTO KASEI, U-220™) as the curing promoter, 50 g of a paraffin-based process oil as the plasticizer (Idemitsu Kosan, Diana Process Oil PW-380™) for EXAMPLES G1 to G8 and REFERENCE, EXAMPLE G1, 2 g of a monovalent silanol compound shown in Table G1, and N-(β-aminoethyl)-γ-aminopropyltrimethoxy silane (H$_2$NCH$_2$CH$_2$NHCH$_2$CH$_2$CH$_2$Si (OCH$_3$)$_3$) and N-(β-aminoethyl)-γ-aminopropylmethyldimethoxysilane (NH$_2$CH$_2$CH$_2$NHCH$_2$CH$_2$CH$_2$Si (CH$_3$) (OCH$_3$)$_2$) as the trifunctional and bifunctional aminosilane compound, respectively, in a quantity shown in Table G1. It was sufficiently kneaded to mix the components by a 3-paint roll unit, and put in the H-shape test piece prepared in accordance with JIS A-5758, to determine its tensile characteristics, adhesion strength and resistance of the adhesion strength to weather while the test piece was irradiated with light (weather-resistant adhesion). It was also analyzed for its curing speed and resistance to weather (ozone-caused aging test). The results are given in Table G1. The following testing methods were used.

(Tensile Characteristics)

The composition thus prepared was put in the H-shape test piece prepared in accordance with JIS A-5758 (base: anodized aluminum oxide), which was cured at 23° C. and RH60% for 14 days, and further cured at 30° C. for 14 days, to be tensile-tested at a speed of 30 mm/minute.

(Adhesion Strength)

The test piece, when fractured in the tensile test, was observed for the fractured conditions.

It is judged to have a high adhesion strength to the base, when the cured product itself was fractured (cohesion fracture, CF), and a low adhesion strength when the cured product and base were separated from each other at the adhesion interface (adhesion fracture, AF)

(Weather-resistant Adhesion)

The H-shape test piece (base: glass) was prepared in accordance with JIS A-5758, irradiated with light for 480 hours for accelerated exposure test by a Sunshine weatherometer (Suga Shikenki, WEL-3-HC), and tensile-tested by an Autograph (Shimadzu, IS-5000).

(Curing Speed Test)

The curable composition was cured under the conditions of 23° C. and 50% RH for 24 hours in a mold, 20 by 80 by 5 mm in size.

Next, the cured product was released from the mold, and thickness of the cured portion was measured by a dial gauge of weak spring force to 0.1 mm, to evaluate its curing speed. It was marked with ○ when its thickness was more than 1 mm, Δ when it was 0.5 to 1 mm, and x when it was less than 0.5 mm.

(Weather Resistance Test)

The accelerated weather resistance test was conducted in accordance with JIS B-7753 under the following conditions.
Analyzer: Sunshine Carbon Arc weatherometer
Light irradiation/rainfall cycles: Irradiation for 120 minutes/ rainfall for 18 minutes
Black panel temperature: 63±2° C.
Tank inside temperature: 40±2° C.
Total light irradiation time: 500 hours The tested test piece was visually observed, to evaluate its resistance to weather according to the following four grades:
⊚: No cracks or molten portion observed
○: Cracks or molten portion observed, although slightly
Δ: Cracks or molten portion observed to some extent
x: Cracks or molten portion observed significantly

TABLE G1

|  | Monovalent silanol-based compound | Trifunctional Aminosilane (g) Bifunctional Aminosilane (g) | H type tensile characteristics $M_{150}$ (kg/cm$^2$) | $T_B$ (kg/cm$^2$) | $E_B$ (%) |
|---|---|---|---|---|---|
| EXAMPLE G1 | 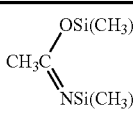 | 0.5 3.0 | 2.0 | 8.9 | 550 |
| EXAMPLE | (CH$_3$)$_3$Si—NH—Si(CH$_3$)$_3$ | 1.0 | 2.4 | 8.5 | 530 |

TABLE G1-continued

| | | | | | |
|---|---|---|---|---|---|
| G2 | | | 3.0 | | |
| EXAMPLE G3 | $(CH_3)_3Si$—O—$C_6H_5$ | 0.5 3.0 | | 2.6 | 8.4 | 560 |
| EXAMPLE G4 | — | 0.5 3.0 | | 3.9 | 8.6 | 520 |
| EXAMPLE G5 | $(CH_3)_3Si$—NH—$Si(CH_3)_3$ | 3.0 0 | | 5.8 | 9.4 | 320 |
| EXAMPLE G6 | $(CH_3)_3Si$—NH—$Si(CH_3)_3$ | 0 3.0 | | 2.8 | 8.2 | 450 |
| REFERENCE EXAMPLE G1 | $(CH_3)_3SI$—NH—$Si(CH_3)_3$ | 0 0 | | 4.9 | — | — |
| EXAMPLE G7 | — | 0 3.0 | | 5.1 | — | — |
| EXAMPLE G8 | — | 3.0 0 | | 6.2 | — | — |

| | Adhesive strength to aluminum | Weather-resistant adhesion | | | Curing speed | Resistance to weather |
|---|---|---|---|---|---|---|
| | | $T_B$ (kg/cm$^2$) | $E_B$ (%) | Adhesion conditions | | |
| EXAMPLE G1 | CF | 8.7 | 530 | CF | ○ | ◉ |
| EXAMPLE G2 | CF | 8.3 | 510 | CF | ○ | ◉ |
| EXAMPLE G3 | CF | 8.2 | 530 | CF | ○ | ◉ |
| EXAMPLE G4 | CF | 8.2 | 500 | CF | Δ | ○ |
| EXAMPLE G5 | CF | 8.9 | 290 | CF | ○ | ○ |
| EXAMPLE G6 | CF | 7.9 | 400 | AF | ○ | ○ |
| REFERENCE EXAMPLE G1 | AF | — | — | AF | ○ | ○ |
| EXAMPLE G7 | AF | — | — | AF | Δ | ○ |
| EXAMPLE G8 | AF | — | — | AF | Δ | ○ |

In the table, the bar "-" was for a test piece with the composition separated from the base and the properties of the cured product itself were immeasurable.

The comprehensive evaluation results of the compositions prepared in EXAMPLES G1 to G8 and REFERENCE EXAMPLE G1 are given in Table G2, wherein those marked with ○ have good characteristics, x have not and Δ are in-between.

TABLE G2

| | Monovalent silanol-based compound | Trifunctional aminosilane (g) Bifunctional aminosilane(g) | Modulus | Adhesive strength | Weather-resistant adhesion | Curing speed | Resistance to weather |
|---|---|---|---|---|---|---|---|
| EXAMPLE G1 | Used | 0.5/3.0 | ○ | ○ | ○ | ○ | ○ |
| EXAMPLE G2 | Used | 1.0/3.0 | ○ | ○ | ○ | ○ | ○ |
| EXAMPLE G3 | Used | 0.5/3.0 | ○ | ○ | ○ | ○ | ○ |
| EXAMPLE G4 | Not used | 0.5/3.0 | Δ | ○ | ○ | Δ | Δ |
| EXAMPLE G5 | Used | 3.0/0 | X | ○ | ○ | Δ | Δ |
| REFERENCE EXAMPLE G1 | Used | 0/3.0 | ○ | ○ | X | Δ | Δ |
| EXAMPLE G6 | Used | 0/0 | X | X | X | Δ | Δ |
| EXAMPLE G7 | Not used | 0/3.0 | X | X | X | Δ | Δ |
| EXAMPLE G8 | Not used | 3.0/0 | X | X | X | Δ | Δ |

Comparative Production Example

Eight hundred g of a polyoxypropylene-based polymer, with allyl ether group at 97% of the total terminals and having an average molecular weight of around 8,000, was charged in a pressure-resistant reactor equipped with an agitator, to which 19 g of methyldimethoxysilane was added. The mixture was then incorporated with 0.34 mL of a solution of chloroplatinic acid ($H_2PtCl_6.6H_2O$), 8.9 g dissolved in 18 mL of isopropyl alcohol and 160 mL of tetrahydrofuran, and they were allowed to react with each other at 80° C. for 6 hours.

The quantitative analysis by IR spectroscopy indicated that the hydrogenated silicon group little remained in the reaction solution. The quantitative analysis of the reactive silicon group by NMR indicated that the polyoxypropylene-based polymer (CA-1) produced had approximately 1.7 groups represented by the following formula on the average in one molecule at the terminal.

Reference Examples G2 to G10

The curable composition was prepared for each of REFERENCE EXAMPLES G2 to G10 in the same manner as in EXAMPLES G1 to G8 and REFERENCE EXAMPLE G1, except that the silyl-containing ethylene/propylene/5-vinyl-2-norbornene random copolymer rubber (A-1) was replaced by the polymer (CA-1) prepared in COMPARATIVE PRODUCTION EXAMPLE, and the paraffin-based process oil as the plasticizer (Idemitsu Kosan, Diana Process Oil PW-380™) was replaced by the oxypropylene polymer of the allyl ether type at the terminal, having an Mn of 5,200 and Mw/Mn of 1.6 for REFERENCE EXAMPLES G2 to G3 and G5 to G10), or (2-ethylhexyl) phthalate (Daihachi Kagaku) for REFERENCE EXAMPLE G4. The characteristics of these compositions were evaluated. The results are given in Table G3.

TABLE G3

|  | Monovalent silanol-based compound | Trifunctional aminosilane (g) / Bifunctional aminosilane (g) | $M_{150}$ (kg/cm²) | $T_B$ (kg/cm²) | $E_B$ (%) |
|---|---|---|---|---|---|
| REFERENCE EXAMPLE G2 | CH₃C(=NSi(CH₃)₃)OSi(CH₃)₃ | 0.1 / 2.0 | 2.9 | 8.3 | 460 |
| REFERENCE EXAMPLE G3 | (CH₃)₃Si—NH—Si(CH₃)₃ | 0.5 / 2.0 | 2.9 | 7.9 | 420 |
| REFERENCE EXAMPLE G4 | (CH₃)₃Si—O—C₆H₅ | 0.5 / 2.0 | 2.8 | 7.8 | 440 |
| REFERENCE EXAMPLE G5 | — | 0.5 / 2.0 | 3.9 | 8.2 | 460 |
| REFERENCE EXAMPLE G6 | (CH₃)₃Si—NH—Si(CH₃)₃ | 2.0 / 0 | 5.3 | 9.1 | 330 |
| REFERENCE EXAMPLE G7 | (CH₃)₃Si—NH—Si(CH₃)₃ | 0 / 2.0 | 2.8 | 8.1 | 440 |
| REFERENCE EXAMPLE G8 | (CH₃)₃Si—NH—Si(CH₃)₃ | 0 / 0 | — | (2.0) | (90) |
| REFERENCE EXAMPLE G9 | — | 0 / 2.0 | 4.7 | 9.2 | 400 |
| REFERENCE EXAMPLE G10 | — | 2.0 / 0 | 5.8 | 9.6 | 320 |

|  | Adhesive strength to aluminum | Weather-resistant adhesion $T_B$ (kg/cm²) | $E_B$ (%) | Adhesion conditions | Curing speed | Resistance to weather |
|---|---|---|---|---|---|---|
| REFERENCE EXAMPLE G2 | CF | 8.0 | 420 | CF | ○ | Δ or X |
| REFERENCE EXAMPLE G3 | CF | 7.7 | 400 | CF | ○ | Δ or X |
| REFERENCE EXAMPLE G4 | CF | 7.2 | 380 | CF | ○ | Δ or X |

TABLE G3-continued

| | | | | | | | |
|---|---|---|---|---|---|---|---|
| REFERENCE EXAMPLE G5 | CF | 8.1 | 440 | CF | Δ | X | |
| REFERENCE EXAMPLE G6 | CF | 8.9 | 300 | CF | ○ | X | |
| REFERENCE EXAMPLE G7 | CF | (1.9) | (120) | AF | ○ | X | |
| REFERENCE EXAMPLE G8 | AF | (0.9) | (60) | AF | ○ | X | |
| REFERENCE EXAMPLE G9 | CF | (1.5) | (110) | AF | Δ | X | |
| REFERENCE EXAMPLE G10 | CF | 8.1 | 290 | CF | Δ | X | |

In the table, the value in the parentheses ( ) was for a test piece with the composition separated from the base at the adhesion interface, and consequently the properties are not of the cured product itself.

The comprehensive evaluation results of the compositions prepared in EXAMPLES G2 to G10 are given in Table G4, wherein those marked with ○ have good characteristics, x have not and Δ are in-between.

TABLE G4

| | | Monovalent silanol-based compound | Trifunctional Aminosilane (g) Bifunctional Aminosilane (g) | Modulus | Adhesive strength | Weather-resistant adhesion | Curing speed | Resistance to weather |
|---|---|---|---|---|---|---|---|---|
| REFERENCE EXAMPLE G | 2 | Used | 0.1/2.0 | ○ | ○ | ○ | X | X |
| | 3 | Used | 0.5/2.0 | ○ | ○ | ○ | X | X |
| | 4 | Used | 0.5/2.0 | ○ | ○ | ○ | X | X |
| | 5 | Not used | 0.5/2.0 | X | ○ | ○ | X | X |
| | 6 | Used | 2.0/0 | X | ○ | ○ | X | X |
| | 7 | Used | 0/2.0 | ○ | ○ | X | X | X |
| | 8 | Used | 0/0 | — | X | X | X | X |
| | 9 | Not used | 0/2.0 | X | ○ | X | X | X |
| | 10 | Not used | 2.0/0 | X | ○ | ○ | X | X |

Examples H Series

The composition, iodine value, intrinsic viscosity [η] and molecular weight distribution (Mw/Mn) of the copolymer rubber used in each of EXAMPLE and COMPARATIVE EXAMPLE were determined by the methods described earlier.

Production Example

[Production of silyl-containing ethylene/propylene/5-vinyl-2-norbornene Random Copolymer Rubber (A-1)]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, VO(OEt)$_2$Cl and Al(Et)$_{1.5}$Cl$_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber (A$_0$-1) in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber (A$_0$-1) thus produced contained ethylene at 68% by mol, and had an intrinsic viscosity [η] of 0.2 dl/g measured in decalin kept at 135° C., iodine value (IV) of 10(g/100 g) and Mw/Mn of 15.

Two % toluene solution (0.3 part by weight) of chloroplatinic acid and 1.5 parts by weight of methyldimethoxysilane were added to 100 parts by weight of the ethylene/propylene/5-vinyl-2-norbornene random copolymer rubber (A$_0$-1), and they were allowed to react with each other at 120° C. for 2 hours. The excess methyldimethoxysilane and the solvent (toluene) were distilled off from the effluent. This produced 101.5 parts by weight of the ethylene/propylene/5-vinyl-2-norbornene random copolymer rubber (A-1) containing dimethoxymethylsilyl group (—Si (CH$_3$) (OCH$_3$)$_2$).

Example H1 and Comparative Example H1

The one-liquid type curable composition was prepared using the silyl-containing ethylene/propylene/5-vinyl-2-norbornene random copolymer rubber (A-1) prepared in PRODUCTION EXAMPLE, to evaluate its storage stability and resistance of the cured product to weather. Their compositions are given in Table H1 (parts by weight), and the evaluation results in Table H2.

It was evaluated by the following methods.

(Viscosity and Curing Speed (Tack-free Time))

These were determined in accordance with JIS A-5758.

(Curing Speed Test)

The curable composition was cured under the conditions of 23° C. and 50% RH for 24 hours in a mold, 20 by 80 by 5 mm in size.

Next, the cured product was released from the mold, and thickness of the cured portion was measured by a dial gauge of weak spring force to 0.1 mm, to evaluate its curing speed. It was marked with ◯ when its thickness was 1 mm or more and x when it was less than 1.0 mm.

(Weather Resistance Test)

The accelerated weather resistance test was conducted in accordance with JIS B-7753 under the following conditions.
Analyzer: Sunshine Carbon Arc weatherometer
Light irradiation/rainfall cycles: Irradiation for 120 minutes/ rainfall for 18 minutes (Storage Stability)

Storage stability of the curable composition was evaluated by viscosity, i.e., ratio of viscosity of the composition stored at 50° C. for 4 weeks in a nitrogen-purged container to that of the one immediately after its was prepared.

The composition having the ratio closer to unity (1) means it is more excellent in storage stability.

Reference Examples H1 to H3

The one-liquid type curable composition was prepared for each of REFERENCE EXAMPLES H1 to H3 using the oxypropylene polymer having around 2 dimethoxymethylsilyl groups ($-Si(CH_3)(OCH_3)_2$) in the molecule and an average molecular weight of 9,000 (KANEKA CORP., MS Polymer, hereinafter referred to as CA-1) and oxypropylene polymer having around 1.5 dimethoxysilyl groups in the molecule and an average molecular weight of 8,000 (KANEKA CORP., MS Polymer, hereinafter referred to as CA-2), and evaluated in the same manner as in EXAMPLE H1. Their compositions are given in Table H1 (parts by weight), and the evaluation results in Table H2.

TABLE H1

| | Components | EXAMPLE H1 | COMPARATIVE EXAMPLE H1 | REFERENCE EXAMPLE H1 | REFERENCE EXAMPLE H2 | REFERENCE EXAMPLE H3 |
|---|---|---|---|---|---|---|
| Polymer rubber | A-1 | 100 | 100 | 0 | 0 | 0 |
| | CA-1 | 0 | 0 | 50 | 50 | 50 |
| | CA-2 | 0 | 0 | 50 | 50 | 50 |
| Filler | Colloidal calcium Carbonate*1 | 120 | 120 | 120 | 120 | 120 |
| | Titanium oxide*2 | 20 | 20 | 20 | 20 | 20 |
| Plasticizer | Paraffin-based oil*3 | 50 | 50 | 50 | 50 | 50 |
| Dehydrator | VTMO*4 | 3 | 3 | 3 | 3 | 3 |
| Tackifier | DAMO*5 | 2 | 2 | 2 | 2 | 2 |
| Curing catalyst | U-220*6 | 1 | 1 | 1 | 1 | 1 |
| Organic carboxylic | 2-Ethylhexanoic acid | 0.2 | 0 | 0.2 | 0 | 0 |
| acid | Stearic acid | 0 | 0 | 0 | 0.4 | 0 |

*1 CALFORT-S (STURGE)
*2 TIOFWE R85 (TDF)
*3 Paraffin-based oil (Idemitsu Kosan, Diana Process Oil PW-3 ™)
*4 DYNASYLAN VTMO (Huls)
*5 DYNASYLAN DAMO (Huls)
*6 Dibutyl tin diacetylacetate (NITTO KAGAKU)

TABLE H2

| | Characteristics | EXAMPLE H1 | COMPARATIVE EXAMPLE H1 | REFERENCE EXAMPLE H1 | REFERENCE EXAMPLE H2 | REFERENCE EXAMPLE H3 |
|---|---|---|---|---|---|---|
| Immediately after the test piece was prepared | Viscosity (Poise) | 12000 | 11000 | 13000 | 11000 | 9500 |
| | Tack-free time (hr) | 4 | 2.5 | 5.5 | 4.5 | 2.5 |
| | Curing speed | ◯ | ◯ | ◯ | ◯ | ◯ |
| | Resistance to weather | ◯ | ◯ | X | X | X |
| After the test piece was stored at 50° C. for four weeks | Viscosity (Poise) | 14000 | 15000 | 13000 | 13000 | 13000 |
| | Tack-free time (hr) | 4 | 8 | 5.5 | 5.0 | >10 |
| | Curing speed | ◯ | ◯ | ◯ | ◯ | X |
| | Resistance to weather | ◯ | ◯ | X | X | X |
| Storage stability | Viscosity ratio | 1.17 | 1.36 | 1.18 | 1.18 | 1.37 |

Black panel temperature: 63±2° C.
Tank inside temperature: 40±2° C.
Total light irradiation time: 500 hours The tested test piece was visually observed, to evaluate its resistance to weather according to the following two-grade system: ◯: No cracks or molten portion observed, and x: Cracks or molten portion observed.

Examples J Series

The composition, iodine value, intrinsic viscosity [η] and molecular weight distribution (Mw/Mn) of the copolymer rubber used in each of EXAMPLE and EXAMPLE were determined by the methods described earlier.

The curing speed tests and accelerated weather resistance tests were conducted by the following methods for EXAMPLES and REFERENCE EXAMPLES.

(1) Curing Speed Test

The curable composition (stock material) was cured under the conditions of 23° C. and 50% RH for 24 hours in a mold, 20 by 80 by 5 mm in size.

Next, the cured product was released from the mold, and thickness of the cured portion was measured by a dial gauge of weak spring force to 0.1 mm, to evaluate its curing speed. It was marked with ◯ when its thickness was 1 mm or more, and x when it was less than 1 mm.

(2) Accelerated Weather Resistance Test

The weather resistance test was conducted in accordance with JIS B-7753 using a Sunshine Carbon Arc weatherometer.

<Testing Conditions>
Light irradiation/rainfall cycles: Irradiation for 120 minutes/rainfall for 18 minutes
Black panel temperature: 63±2° C.
Tank inside temperature: 40±2° C.
Total light irradiation time: 500 hours
Property measurements: in accordance with JIS K-6301

Production Example J1

[Production of silyl-containing ethylene/propylene/5-vinyl-2-norbornene Random Copolymer Rubber (A-1)]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, $VO(OEt)_2Cl$ and $Al(Et)_{1.5}Cl_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber ($A_0$-1) in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber ($A_0$-1) thus produced contained ethylene at 68% by mol, and had an intrinsic viscosity [η] of 0.2 dl/g measured in decalin kept at 135° C., iodine value (IV) of 10(g/100 g) and Mw/Mn of 15.

Two % toluene solution (0.3 g) of chloroplatinic acid and 1.5 g of methyldimethoxysilane were added to 100 g of the ethylene/propylene/5-vinyl-2-norbornene random copolymer rubber ($A_0$-1), and they were allowed to react with each other at 120° C. for 2 hours. The excess methyldimethoxysilane and the solvent (toluene) were distilled off from the effluent. This produced 101.5 g of the ethylene/propylene/5-vinyl-2-norbornene random copolymer rubber (A-1) containing dimethoxymethylsilyl group ($-SiCH_3(OCH_3)_2$)

Production Example J2

Methyl methacrylate, 0.2 mol, allyl methacrylate, 0.086 mol and n-dodecyl mercaptan, 5 g were dissolved in 70 mL of toluene, to which 0.5 g of azobisisobutylonitrile was added, and they were allowed to react with each other at 80° C. for 4 hours (the toluene solution could be directly used for the subsequent hydrosilylation). The solvent was distilled off under a vacuum, in order to obtain the acrylic-based polymer having a molecular weight of around 2,000 and containing an allyl type unsaturated group.

The far-infrared absorption spectroscopic analysis indicated that the acrylic-based polymer thus produced had the absorption relevant to the carbon-carbon double bond at 1648 $cm^{-1}$, in addition to the strong absorption relevant to the ester at 1730 $cm^{-1}$.

Production Example J3

Methyl methacrylate, 0.2 mol, allyl acrylate, 0.086 mol and n-dodecyl mercaptan, 5 g were dissolved in 70 mL of toluene, to which 0.5 g of azobisisobutylonitrile was added, and they were allowed to react with each other at 80° C. for 4 hours. This produced the acrylic-based polymer having a molecular weight of around 2,000 and containing an allyl type unsaturated group.

The far-infrared absorption spectroscopic analysis indicated that the acrylic-based polymer thus produced had the absorption relevant to the carbon-carbon double bond at 1648 $cm^{-1}$.

Production Example J4

Methyl methacrylate, 0.1 mol, styrene, 0.1 mol, allyl methacrylate, 0.086 mol and n-dodecyl mercaptan, 5 g were dissolved in 70 mL of toluene, to which 0.5 g of azobisisobutylonitrile was added, and they were allowed to react with each other at 80° C. for 4 hours. This produced the vinyl copolymer having a molecular weight of around 2,000.

The far-infrared absorption spectroscopic analysis indicated that the copolymer thus produced also had the absorption relevant to the carbon-carbon double bond at 1648 $cm^{-1}$.

Example J1

A mixture composed of 100 parts by weight of the ethylene/propylene/5-vinyl-2-norbornene random copolymer rubber containing the hydrolyzable silyl group (A-1), prepared in PRODUCTION EXAMPLE J1, 10 parts by weight of methanol (B-1) and 4 parts by weight of methyl orthoformate (B-2) was stirred 3 times at 10,000 rpm each for 10 minutes by a homogenizer (Nihon Seiki Sesakusho Co., Ltd. Excel Auto Homogenizer), to prepare the composition. It was tested for storage stability at room temperature, after it was diluted to 35% by toluene and incorporated with 2,000 ppm of moisture. The results are given in Table J2 for the test piece stored for 3 weeks.

Reference Example J1

Methyl dichlorosilane, 1.6 mL and chloroplatinic acid, 0.00001 g were added to 20 g of the toluene solution of the acrylic-based polymer, prepared in PRODUCTION EXAMPLE J2, and they were allowed to react with each other at 90° C. for 3 hours under sealed conditions. The effluent was incorporated with 5 mL of methanol and 5 mL of methyl orthoformate, and the mixed solution was continuously stirred until the solution became neutral.

The hydrosilylated product had an infrared absorption spectral pattern in which the infrared absorption at 1648 $cm^{-1}$ had completely disappeared.

The gas chromatography analysis results of the polymer solution are given in Table J1.

TABLE J1

| 1 Gas chromatographic analysis results of the polymer solution | |
|---|---|
| Methyltrimethoxy silane | 3.8% |
| Methyl orthoformate | 5.0% |
| Methanol | 10.5% |

The polymer solution thus prepared was tested for storage stability at room temperature, after it was diluted to 35% by toluene and incorporated with 2,000 ppm of moisture. The results are given in Table J2 for the test piece stored for 3 weeks.

TABLE J2

| | Viscosity * (23° C.; cPs) | | Viscosity changes |
|---|---|---|---|
| | Initial | After 21 days | (21 days/Initial) |
| EXAMPLE J1 | 300 | 520 | 1.7 |
| REFERENCE EXAMPLE J1 | 10 | 21 | 2.1 |

* Viscosity was determined by a B type viscometer at 23° C.

As shown in Table J2, the compositions prepared in EXAMPLE J1 and REFERENCE EXAMPLE J1 are excellent in storage stability.

Reference Example J2

The hydrosilylation was effected in the same manner as in REFERENCE EXAMPLE J1, except that 1.6 mL of methyl dichlorosilane was replaced by 1.8 mL of methyl diethoxysilane. The hydrosilylated product also had an infrared absorption spectral pattern in which the infrared absorption at 1648 cm$^{-1}$ had completely disappeared, from which it was judged that silyl-containing acrylic-based polymer was produced.

Reference Examples J3 and J4

The hydrosilylation was effected in exactly the same manner as in REFERENCE EXAMPLE J1 for each of the above examples, except that the copolymer rubber (A-1) was replaced by the polymer prepared in respective PRODUCTION EXAMPLE J3 and J4, to prepare the resin curable at normal temperature.

Reference Examples J5 to J8

Two parts by weight of dibutyl tin maleate was added to 100 parts by weight of the resin prepared in each of REFERENCE EXAMPLES J1 to J4, and each composition was spread over a soft steel plate, to evaluate its capacity of forming a coating film and other characteristics. The results are given in Table J3.

TABLE J3

| Resin | Tack-free Time [minutes] | Time for which the test piece was left * [hrs] | Surface gloss * |
|---|---|---|---|
| EXAMPLE J1 | 20 | 48 | Excellent |
| REFERENCE EXAMPLE J1 | 30 | 48 | Excellent |
| ** | 35 | 48 | Excellent |// 
| REFERENCE EXAMPLE J2 | 40 | 48 | Excellent |
| REFERENCE EXAMPLE J3 | 30 | 48 | Excellent |
| REFERENCE EXAMPLE J4 | 45 | 72 | Excellent |

* Left at 25° C. and RH 70%
** Resin prepared in REFERENCE EXAMPLE J1 which was further incorporated with 30% by weight of ethyl silicate Moreover, each composition prepared in EXAMPLE J1 and REFERENCE EXAMPLES J5 to J8 was tested for curing speed, and the cured product for resistance to weather, in accordance with the methods described earlier. The results are given in Table J4.

TABLE J4

| | Curing speed | Resistance to weather |
|---|---|---|
| EXAMPLE J1 | ○ | No cracks observed |
| REFERENCE EXAMPLE J5 | X | Cracks observed slightly |
| REFERENCE EXAMPLE J6 | X | Cracks observed slightly |
| REFERENCE EXAMPLE J7 | X | Cracks observed slightly |
| REFERENCE EXAMPLE J8 | X | Cracks observed slightly |

Examples K Series

The composition, iodine value, intrinsic viscosity [η] and molecular weight distribution (Mw/Mn) of the copolymer rubber used in each of EXAMPLES and REFERENCE EXAMPLES were determined by the methods described earlier.

The curing speed tests and accelerated weather resistance tests were conducted by the following methods for EXAMPLES and REFERENCE EXAMPLES.

(1) Curing Speed Test

The curable composition (stock material) was cured under the conditions of 23° C. and 50% RH for 24 hours in a mold, 20 by 80 by 5 mm in size.

Next, the cured product was released from the mold, and thickness of the cured portion was measured by a dial gauge of weak spring force to 0.1 mm, to evaluate its curing speed. It was marked with ○ when its thickness was 5 mm or more, and x when it was less than 5 mm.

(2) Accelerated Weather Resistance Test

The weather resistance test was conducted in accordance with JIS B-7753 using a Sunshine Carbon Arc weatherometer.

<Testing Conditions>
Light irradiation/rainfall cycles: Irradiation for 120 minutes/rainfall for 18 minutes
Black panel temperature: 63±2° C.
Tank inside temperature: 40±2° C.
Total light irradiation time: 500 hours

Production Example K1

[Production of silyl-containing ethylene/propylene/5-vinyl-2-norbornene Random Copolymer Rubber (A-1)]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, VO(OEt)$_2$Cl and Al(Et)$_{1.5}$Cl$_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber (A$_0$-1) in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber (A$_0$-1) thus produced contained ethylene at 68% by mol, and had an intrinsic viscosity [η] of 0.2 dl/g measured in decalin kept at 135° C., iodine value (IV) of 10(g/100 g) and Mw/Mn of 15.

Two % toluene solution (0.3 g) of chloroplatinic acid and 1.5 g of methyldimethoxysilane were added to 100 g of the ethylene/propylene/5-vinyl-2-norbornene random copolymer rubber (A$_0$-1), and they were allowed to react with each other at 120° C. for 2 hours. The excess methyldimethoxysilane were distilled off from the effluent. This produced 101.5 g of the ethylene/propylene/5-vinyl-2-norbornene random copolymer rubber (A-1) containing dimethoxymethylsilyl group (—SiCH$_3$(OCH$_3$)$_2$)

Production Example K2

[Production of the Saturated Hydrocarbon-based Polymer]

p-DCC, 7.5 mmols, represented by the following formula, compound A, was charged in a 1 L pressure-resistant glass autoclave, to which agitator blades, a 3-way cock and vacuum line were attached. Then, the autoclave was purged by nitrogen.

Then, the autoclave was charged with 330 mL of toluene and 141 mL of hexane, dried by a molecular sieve, as the solvents by a syringe, and then with 3.0 mmols of α-picoline, while supplying nitrogen through one side of the 3-way cock.

Next, a pressure-resistant glass-made liquefied gas collecting tube equipped with a needle valve and containing 113 g of isobutylene, passed through a column packed with barium oxide for dehydration, was connected to the 3-way cock. Then the autoclave as the polymerization reactor was immersed in a dry ice/acetone bath kept at −70° C., to cool the solution for 1 hour while stirring inside. The polymerization reactor was evacuated to a vacuum via the vacuum line, after it was cooled, and charged with isobutylene from the liquefied gas collecting tube by opening the needle valve. Then, the reactor inside was returned back to the normal pressure by introducing nitrogen with handling the 3-way cock.

TiCl$_4$, 7.18 g (3.8 mmols) was charged in the polymerization reactor by a syringe via the 3-way cock, after confirming that the reactor inside was kept at −70° C., to initiate the polymerization. After a lapse of 2 hours, 2.57 g (22.5 mmols) of allyl trimethylsilane was added to the reactor. The reaction process was continued for another 1 hour, and water was added to the reaction mixture to deactivate the catalyst. Then, the organic layer was washed with pure water 3 times, and, after water was removed, distilled to remove the solvent under a vacuum. This produced the isobutylene polymer with the allyl group at the terminal.

Compound A is represented by the following structural formula:

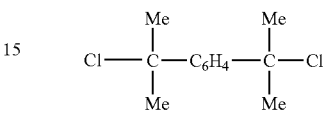

Then, 100 g of the isobutylene polymer with the allyl group at the terminal was dissolved in 50 mL of n-heptane, and the solution was heated to around 70° C., to which 1.2 [eq./allyl group] of methyl dimethoxysilane and 1×10$^{-4}$ [eq./allyl group] of platinum (vinyl siloxane) complex were added for the hydrosilylation. The reaction process was followed by FT-IR, and stopped in around 4 hours, after confirming that the olefin-derived absorption at 1640 cm$^{-1}$ disappeared.

The reaction solution was enriched under a vacuum, to produce the isobutylene polymer with the reactive silicon at both terminals, represented by the following formula:

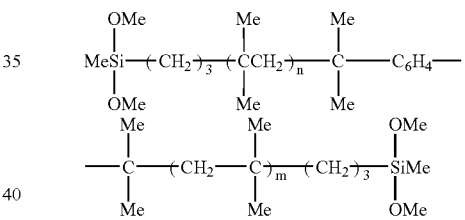

The polymer yield was estimated from the quantity produced. It was also analyzed for number-average molecular weight (Mn) and Mw/Mn by GPC, and the terminal structure by comparing the intensities of the $^1$H-NMR-analyzed resonance signals of proton relevant to each structure (proton derived from the initiator: 6.5 to 7. 5 ppm, methyl proton bonded to the silicon atom, derived from the polymer terminal: 0.0 to 0.1 ppm, and methoxy proton: 3.5 to 3.4) with each other. The polymer had an Mn of 11,416, Mn/Mw of 1.47 and Fn (silyl) of 1.95 (number-average molecular weight is a relative value to that of the standard polystyrene, and Fn (silyl) is number of the terminal functional silyl groups in one molecule of the isobutylene polymer).

Example K1

A mixture containing the silyl-containing ethylene/propylene/5-vinyl-2-norbornene random copolymer rubber (A-1), prepared in PRODUCTION EXAMPLE K1, was prepared. It was composed of 100 parts of the copolymer rubber (A-1), 90 parts of a paraffin-based process oil (Idemitsu Kosan, Diana Process Oil PS-32™), 180 parts of limestone powder (Shiraishi Calcium, PO320B™), 50 parts of colloidal calcium carbonate (Shiraishi K. K., EDS-D10A™), 100 parts of talc (Maruo Calcium, LMR™), 1 part of an aging inhibitor (Ciba-Geigy Japan, Irganox 1010™) as Aging Inhibitor 1, 1 part of another aging inhibitor (Sumitomo Chemical, Sumisorb 400™) as Aging Inhibitor 2, 1 part of still another aging inhibitor (Sankyo, Sanol LS-765™) as Aging Inhibitor 3, 3 parts of a light stabilizer (Sanshin Kagaku Kogyo, Sandant NBC™), 3 parts of light-curable resin (TOAGOSEI, Aronix M-400™), 5 parts of a thixotropy imparting agent (Kusumoto Kasei, Disparlon #305™), and 4 parts of γ-isocyanate propyltriethoxysilane as the silane coupling agent (Nippon Unicar, Y-9030™), all parts by weight. The mixture was well kneaded by a 3-paint roll unit, to produce the major ingredient for REFERENCE EXAMPLE K1.

The curing agent was prepared for EXAMPLE K1 by the following procedure: a mixture comprising 4 parts of dibutyl tin bisacetylacetonate (NITTO KASEI, U-220™) as the silanol condensing catalyst, 4parts of salt cake ($Na_2SO_4.10H_2O$), 10 parts of a paraffin-based process oil (Idemitsu Kosan, Diana Process Oil PS-32™), 20 parts of limestone powder (Maruo Calcium, Snowlite SS™), and 2.5 parts of carbon black (Mitsubishi Chemical, CB#30™), all parts by weight, was manually kneaded in a disposal cup and stirred 3 times at 10,000 rpm each for 10 minutes by a homogenizer (Nihon Seiki Sesakusho Co., Ltd. Excel Auto Homogenizer).

The above composition put in a sealed glass bottle was stored for a month in a perfect oven kept at 50° C., to measure viscosity of the major ingredient.

The viscosity was measured by a B type viscometer (Tokyo Keiki, Model BS) at 23° C. using a No. 7 rotor.

It had a viscosity of 8,525 poise at 10 rpm immediately after it was prepared, and 9,020 poise also at 10 rpm after it was stored.

Reference Examples K1 and K2

A mixture containing the polymer prepared in PRODUCTION EXAMPLE K2 was prepared for each of REFERENCE EXAMPLES K1 and K2. It was composed of 100 parts of the polymer, 90 parts of a paraffin-based process oil (Idemitsu Kosan, Diana Process Oil PS-32™), 180 parts of limestone powder (Shiraishi Calcium, PO320B™), 50 parts of colloidal calcium carbonate (Shiraishi K. K., EDS-D10A™), 100 parts of talc (Maruo Calcium, LMR™), 1 part of an aging inhibitor (Ciba-Geigy Japan, Irganox 1010™) as Aging Inhibitor 1, 1 part of another aging inhibitor (Sumitomo Chemical, Sumisorb 400™) as Aging Inhibitor 2, 1 part of still another aging inhibitor (Sankyo, Sanol LS-765™) as Aging Inhibitor 3, 3 parts of a light stabilizer (Sanshin Kagaku Kogyo, Sandant NBC™), 3 parts of light-curable resin (TOAGOSEI, Aronix M-400™), 5 parts of a thixotropy imparting agent (Kusumoto Kasei, Disparlon #305™), and 4 parts of γ-isocyanate propyltriethoxysilane as the silane coupling agent (Nippon Unicar, Y-9030™), all parts by weight. The mixture was well kneaded by a 3-paint roll unit, to produce the major ingredient for REFERENCE EXAMPLE K1.

The curing agent was prepared for REFERENCE EXAMPLE K1 by the following procedure: a mixture comprising 4 parts of dibutyl tin bisacetylacetonate (NITTO KASEI, U-220™) as the silanol condensing catalyst, 4 parts of salt cake ($Na_2SO_4.10H_2O$), 10 parts of a paraffin-based process oil (Idemitsu Kosan, Diana Process Oil PS-32™), 20 parts of limestone powder (Maruo Calcium, Snowlite SS™), and 2.5 parts of carbon black (Mitsubishi Chemical, CB#30™), all parts by weight, was manually kneaded in a disposal cup and stirred 3 times at 10,000 rpm each for 10 minutes by a homogenizer (Nihon Seiki Sesakusho Co., Ltd. Excel Auto Homogenizer).

The major ingredient and curing agent were prepared for REFERENCE EXAMPLE K2 in the same manner as in REFERENCE EXAMPLE K1, except that 4 parts of salt cake ($Na_2SO_4.10H_2O$) was incorporated in the former and omitted from the latter, to prepare the composition to be tested in the same manner.

Each of the above compositions put in a sealed glass bottle was stored for a month in a perfect oven kept at 50° C., to measure viscosity of the major ingredient.

The viscosity was measured by a B type viscometer (Tokyo Keiki, Model BS) at 23° C. using a No. 7 rotor.

These compositions had a viscosity of 7,632 poise (REFERENCE EXAMPLE K1) and 8,928 poise (REFERENCE EXAMPLE K2) at 10 rpm immediately after they were prepared, and 9,072 poise and higher than 12,000 poise (beyond the measurable range), respectively, also at 10 rpm after they were stored. The results indicate that the major ingredient has a higher viscosity when incorporated with a hydrate of metallic salt than when not, and that its viscosity increases when it is stored.

Example K2

A mixture containing the ethylene/propylene/5-vinyl-2-norbornene random copolymer rubber (A-1), prepared in PRODUCTION EXAMPLE K1, was prepared. It was composed of 100 parts of the copolymer rubber (A-1), 90 parts of a paraffin-based process oil (Idemitsu Kosan, Diana Process Oil PS-32™), 180 parts of limestone powder (Shiraishi Calcium, PO320™) 50 parts of colloidal calcium carbonate (Shiraishi K. K., EDS-D10A™), 100 parts of talc (Maruo Calcium, LMR™), 1 part of an aging inhibitor (Ciba-Geigy Japan, Irganox 1010™) as Aging Inhibitor 1, 1 part of another aging inhibitor (Sumitomo Chemical, Sumisorb 400™) as Aging Inhibitor 2, 1 part of still another aging inhibitor (Sankyo, Sanol LS-765™) as Aging Inhibitor 3, 3 parts of a light stabilizer (Sanshin Kagaku Kogyo, Sandant NBC™), 3 parts of light-curable resin (TOAGOSEI, Aronix M-400™), 5 parts of a thixotropy imparting agent (Kusumoto Kasei, Disparlon #305™), 4 parts of γ-isocyanatepropyltriethoxysilane as the silane coupling agent (Nippon Unicar, Y-9030™) and 2 parts of γ-glycidoxypropyltrimethoxysilane (Nippon Unicar, A-187™), all parts by weight. The mixture was well kneaded by a 3-paint roll unit, to produce the major ingredient for REFERENCE EXAMPLE K2.

The curing agent was prepared for EXAMPLE K2 by the following procedure: a mixture comprising 4 parts of dibutyl tin bisacetylacetonate (NITTO KASEI, U-220™) as the silanol condensing catalyst, 4 parts of salt cake ($Na_2SO_4.10H_2O$), 10 parts of a paraffin-based process oil (Idemitsu Kosan, Diana Process Oil PS-32™), 20 parts of limestone powder (Maruo Calcium, Snowlite SS™), and 2.5 parts of carbon black (Mitsubishi Chemical, CB#30™), all parts by weight, was manually kneaded in a disposal cup and stirred 3 times at 10,000 rpm each for 10 minutes by a homogenizer (Nihon Seiki Sesakusho Co., Ltd. Excel Auto Homogenizer).

The above composition put in a sealed glass bottle was stored for a month in a perfect oven kept at 50° C., to measure changes with time in adhesion to various base materials and mechanical characteristics immediately after it was prepared and after it was stored. The results are given in Tables K1 and K2.

The test piece for the tensile test was prepared in accordance with JIS A-5758/1992 specifying the method for preparing the test piece for the tensile test; the composition comprising the major ingredient and curing agent in a given weight ratio was well kneaded and put in the H-shape of glass or aluminum substrate, and cured in an oven.

The curing conditions were 23° C.×7 days+50° C.×7 days for each composition.

Three types of materials were used to prepare substrates for the H-type tensile test; float glass (Koen-sha, designated by Japan Sealant Industry Association, 3 by 5 by 0.5 cm in size) in accordance with JIS A-5758/1992, pure aluminum (Taiyu Kizai, A1100P, 5 by 5 by 0.2 cm in size) in accordance with JIS H-4000, and heat ray reflective glass (KLS™, 5 by 5 by 0.6 cm). Each of these H-shapes was washed with methylethylketone (Wako-Junyaku Kogyo, special grade) and wiped with clean cotton cloth, before it was filled with the composition.

The H-shape test piece thus prepared was tested by the method of testing tensile adhesion in accordance with JIS A-5758/1992, wherein it was cured at a tensile speed of 50 mm/minute in a constant-temperature chamber kept at 23° C. and 65±5% RH. The cohesion fracture (CF)/thin film fracture (TCF)/adhesion fracture (AF) ratio shown in the tables for the K Series were determined by visual observation of the cross-sections of the tensile-tested pieces.

Reference Examples K3 and K4

A mixture containing the polymer prepared in PRODUCTION EXAMPLE K2 was prepared for each of REFERENCE EXAMPLES K3 and K4. It was composed of 100 parts of the polymer, 90 parts of a paraffin-based process oil (Idemitsu Kosan, Diana Process Oil PS-32™), 180 parts of limestone powder (Shiraishi Calcium, PO320B™), 50 parts of colloidal calcium carbonate (Shiraishi K. K., EDS-D10A™), 100 parts of talc (Maruo Calcium, LMR™), 1 part of an aging inhibitor (Ciba-Geigy Japan, Irganox 1010™) as Aging Inhibitor 1, 1 part of another aging inhibitor (Sumitomo Chemical, Sumisorb 400™) as Aging Inhibitor 2, 1 part of still another aging inhibitor (Sankyo, Sanol LS-765™) as Aging Inhibitor 3, 3 parts of a light stabilizer (Sanshin Kagaku Kogyo, Sandant NBC™), 3 parts of light-curable resin (TOAGOSEI, Aronix M-400™), 5 parts of a thixotropy imparting agent (Kusumoto Kasei, Disparlon #305™), 4 parts of γ-isocyanate propyltriethoxysilane as the silane coupling agent (Nippon Unicar, Y-9030™), and 2 parts of γ-glycidoxypropyltrimethoxysilane (Nippon Unicar, A-187™), all parts by weight. The mixture was well kneaded by a 3-paint roll unit, to produce the major ingredient for REFERENCE EXAMPLE K3.

The curing agent was prepared for REFERENCE EXAMPLE K3 by the following procedure: a mixture comprising 4 parts of dibutyl tin bisacetylacetonate (NITTO KASEI, U-220™) as the silanol condensing catalyst, 4 parts of salt cake ($Na_2SO_4 \cdot 10H_2O$), 10 parts of a paraffin-based process oil (Idemitsu Kosan, Diana Process Oil PS-32™), 20 parts of limestone powder (Maruo Calcium, Snowlite SS™), and 2.5 parts of carbon black (Mitsubishi Chemical, CB#30™), all parts by weight, was manually kneaded in a disposal cup and stirred 3 times at 10,000 rpm each for 10 minutes by a homogenizer (Nihon Seiki Sesakusho Co., Ltd. Excel Auto Homogenizer).

The major ingredient and curing agent were prepared for REFERENCE EXAMPLE K4 in the same manner as in REFERENCE EXAMPLE K3, except that 4 parts of salt cake ($Na_2SO_4 \cdot 10H_2O$) was incorporated in the major ingredient of REFERENCE EXAMPLE K3 and omitted from the curing agent of REFERENCE EXAMPLE K3, to prepare the composition to be tested in the same manner.

Each of the above compositions put in a sealed glass bottle was stored for a month in a perfect oven kept at 50° C., to measure changes with time in adhesion to various base materials and mechanical characteristics immediately after it was prepared and after it was stored. The results are given in Tables K1 and K2.

The test piece for the tensile test was prepared in accordance with JIS A-5758/1992 specifying the method for preparing the test piece for the tensile test; the composition comprising the major ingredient and curing agent in a given ratio was well kneaded and put in the H-shape of glass or aluminum substrate, and cured in an oven.

The curing conditions were 23° C.×7 days+50° C.×7 days for each composition.

Three types of materials were used to prepare substrates for the H-type tensile test; float glass (Koen-sha, designated by Japan Sealant Industry Association, 3 by 5 by 0.5 cm in size) in accordance with JIS A-5758/1992, pure aluminum (Taiyu Kizai, A1100P, 5 by 5 by 0.2 cm in size) in accordance with JIS H-4000, and heat ray reflective glass (KLS™, 5 by 5 by 0.6 cm in size) Each of these H-shapes was washed with methylethylketone (Wako-Junyaku Kogyo, special grade) and wiped with clean cotton cloth, before it was filled with the composition.

The H-shape test piece thus prepared was tested by the method of testing tensile adhesion in accordance with JIS A-5758/1992, wherein it was cured at a tensile speed of 50 mm/minute in a constant-temperature chamber kept at 23° C. and 65±5% RH. The cohesion fracture (CF)/thin film fracture (TCF)/adhesion fracture (AF) ratio shown in the tables for the K Series were determined by visual observation of the cross-sections of the tensile-tested pieces.

TABLE K1

(H type tensile test results with the just produced compositions)

| | Substrate | $M_{50}$ kgf/ $cm^2$ | $T_B$ kgf/ $cm^2$ | $E_B$ % | Fractured conditions (%) | | |
|---|---|---|---|---|---|---|---|
| | | | | | CF | TCF | AF |
| EXAMPLE K2 | FL | 6.22 | 6.60 | 68 | 100 | 0 | 0 |
| | pAl | 5.10 | 6.80 | 72 | 100 | 0 | 0 |
| | KLS | 5.20 | 6.61 | 68 | 100 | 0 | 0 |
| REFERENCE EXAMPLE K3 | FL | 6.14 | 7.80 | 79 | 100 | 0 | 0 |
| | pAl | 5.56 | 7.96 | 88 | 100 | 0 | 0 |
| | KLS | 5.97 | 7.79 | 82 | 99 | 1 | 0 |
| REFERENCE EXAMPLE K4 | FL | 5.48 | 7.49 | 85 | 99 | 1 | 0 |
| | pAl | 4.94 | 8.13 | 107 | 94 | 5 | 1 |
| | KLS | 5.39 | 7.82 | 95 | 99 | 1 | 0 |

(Notes)
FL: Float glass,
pAl: pure aluminum,
KLS: Heat ray reflective glass,
$M_{50}$: 50% Tensile stress,
$T_B$: Tensile breaking strength,
$E_B$: Tensile breaking elongation

TABLE K2

(H type tensile test results with the stored compositions)

| | Substrate | $M_{50}$ kgf/cm$^2$ | $T_B$ kgf/cm$^2$ | $E_B$ % | Fractured conditions (%) | | |
|---|---|---|---|---|---|---|---|
| | | | | | CF | TCF | AF |
| EXAMPLE K2 | FL | 5.20 | 7.10 | 79 | 100 | 0 | 0 |
| | pAl | 5.12 | 7.32 | 85 | 98 | 2 | 0 |
| | KLS | 5.24 | 7.06 | 77 | 98 | 2 | 0 |
| REFERENCE EXAMPLE K3 | FL | 5.94 | 8.88 | 91 | 100 | 0 | 0 |
| | pAl | 5.47 | 8.39 | 93 | 97 | 0 | 3 |
| | KLS | 6.50 | 9.01 | 81 | 98 | 2 | 0 |
| REFERENCE EXAMPLE K4 | FL | — | 2.62 | 30 | 1 | 0 | 99 |
| | pAl | — | 1.85 | 23 | 0 | 0 | 100 |
| | KLS | — | 1.32 | 15 | 0 | 0 | 100 |

(Notes)
FL: Float glass,
pAl: pure aluminum,
KLS: Heat ray reflective glass,
$M_{50}$: 50% Tensile stress,
$T_B$: Tensile breaking strength,
$E_B$: Tensile breaking elongation

Example K3

The curing agent was prepared in the same manner as in EXAMPLE K2, except that U-220 as the silanol condensing catalyst was replaced by 4 parts by weight of dibutyl tin dimethoxide (Aldrich Chemical), and tested also by use of the major ingredient of EXAMPLE K2 in the same manner as in EXAMPLE K2. The results are given in Tables K3 and K4.

Reference Example K5

The curing agent was prepared in the same manner as in REFERENCE EXAMPLE K3, except that U-220 as the silanol condensing catalyst was replaced by 4 parts by weight of dibutyl tin dimethoxide (Aldrich Chemical), and tested also by use of the major ingredient of REFERENCE EXAMPLE K3 in the same manner as in REFERENCE EXAMPLE K3. The results are given in Tables K3 and K4.

TABLE K3

(H type tensile test results with the just produced compositions)

| | Substrate | $M_{50}$ kgf/cm$^2$ | $T_B$ kgf/cm$^2$ | $E_B$ % | Fractured conditions (%) | | |
|---|---|---|---|---|---|---|---|
| | | | | | CF | TCF | AF |
| EXAMPLE K3 | FL | 3.78 | 6.53 | 113 | 100 | 0 | 0 |
| | pAl | 3.69 | 6.70 | 120 | 98 | 2 | 0 |
| | KLS | 3.82 | 6.74 | 122 | 98 | 2 | 0 |
| REFERENCE EXAMPLE K5 | FL | 4.42 | 7.70 | 130 | 100 | 0 | 0 |
| | pAl | 4.23 | 8.32 | 144 | 97 | 3 | 0 |
| | KLS | 4.60 | 7.26 | 127 | 97 | 3 | 0 |

(Notes)
FL: Float glass,
pAl: pure aluminum,
KLS: Heat ray reflective glass,
$M_{50}$: 50% Tensile stress,
$T_B$: Tensile breaking strength,
$E_B$: Tensile breaking elongation

TABLE K4

(H type tensile test results with the stored compositions)

| | Substrate | $M_{50}$ kgf/cm$^2$ | $T_B$ kgf/cm$^2$ | $E_B$ % | Fractured conditions (%) | | |
|---|---|---|---|---|---|---|---|
| | | | | | CF | TCF | AF |
| EXAMPLE K3 | FL | 3.86 | 7.09 | 116 | 100 | 0 | 0 |
| | pAl | 3.76 | 7.22 | 122 | 99 | 1 | 0 |
| | KLS | 3.86 | 7.33 | 126 | 100 | 0 | 0 |
| REFERENCE EXAMPLE K5 | FL | 4.50 | 8.34 | 133 | 98 | 0 | 2 |
| | pAl | 4.32 | 8.46 | 139 | 100 | 0 | 0 |
| | KLS | 4.69 | 8.41 | 125 | 100 | 0 | 0 |

(Notes)
FL: Float glass,
pAl = pure aluminium,
KLS: Heat ray reflective glass,
$M_{50}$: 50% Tensile stress,
$T_B$: Tensile breaking strength,
$E_B$: Tensile breaking elongation

Examples K4 to K7

A mixture containing the silyl-containing ethylene/propylene/5-vinyl-2-norbornene random copolymer rubber (A-1), prepared in PRODUCTION EXAMPLE K1, was prepared for each of EXAMPLES K4 to K7. It was composed of 100 parts of the copolymer rubber (A-1), 90 parts of a paraffin-based process oil (Idemitsu Kosan, Diana Process Oil PS-32™), 180 parts of limestone powder (Shiraishi Calcium, PO320B™), 50 parts of colloidal calcium carbonate (Shiraishi K. K., EDS-D10A™), 100 parts of talc (Maruo Calcium, LMR™), 1 part of an aging inhibitor (Ciba-Geigy Japan, Irganox 1010™) as Aging Inhibitor 1, 1 part of another aging inhibitor (Sumitomo Chemical, Sumisorb 400™) as Aging Inhibitor 2, 1 part of still another aging inhibitor (Sankyo, Sanol LS-765™) as Aging Inhibitor 3, 3 parts of a light stabilizer (Sanshin Kagaku Kogyo, Sandant NBC™), 5 parts of a thixotropy imparting agent (Kusumoto Kasei, Disparlon#305™), 4 parts of the silane coupling agent 1 (Nippon Unicar, Y-9030™) and 2 parts of the silane coupling agent 2 (Nippon Unicar, A-187™), all parts by weight. The mixture was well kneaded by a 3-paint roll unit, to produce the major ingredient for REFERENCE EXAMPLES K6 to K9.

The curing agent was prepared for EXAMPLE K4 by the following procedure: a mixture comprising 4 parts of the silanol condensing catalyst (NITTO KASEI, U-220™), 4 parts of salt cake ($Na_2SO_4 \cdot 10H_2O$), 10 parts of a paraffin-based process oil (Idemitsu Kosan, Diana Process Oil PS-32™), 20 parts of limestone powder (Maruo Calcium, Snowlite SS™), and 2.5 parts of carbon black (Mitsubishi Chemical, CB#30™), all parts by weight, was manually kneaded in a disposal cup and stirred 3 times at 10,000 rpm each for 10 minutes by a homogenizer (Nihon Seiki Sesakusho Co., Ltd. Excel Auto Homogenizer).

The composition was prepared for each of EXAMPLES K4 to K7 in the same manner as in EXAMPLE K2, except that salt cake ($Na_2SO_4 \cdot 10H_2O$) for the curing agent was replaced by another hydrate of metallic salt, 6 parts of hypo ($Na_2S_2O_3 \cdot 5H_2O$) for EXAMPLE K5, 6 parts of magnesium sulfate ($MgSO_4 \cdot 7H_2O$) for EXAMPLE K6 and 4 parts of sodium phosphate ($Na_3PO_4 \cdot 12H_2O$) for EXAMPLE K7 to prepare the curing agent, and tested in the same manner as in EXAMPLE K2. The results are given in Tables K5 and K6.

Reference Examples K6 to K9

A mixture containing the polymer prepared in PRODUCTION EXAMPLE K2 was prepared for each of REFERENCE EXAMPLES K6 to K9. It was composed of 100 parts of the polymer, 90 parts of a paraffin-based process oil (Idemitsu Kosan, Diana Process Oil PS-32™), 180 parts of limestone powder (Shiraishi Calcium, PO320B™), 50 parts of colloidal calcium carbonate (Shiraishi K. K., EDS-D10A™), 100 parts of talc (Maruo Calcium, LMR™), 1 part of an aging inhibitor (Ciba-Geigy Japan, Irganox 1010™) as Aging Inhibitor 1, 1 part of another aging inhibitor (Sumitomo Chemical, Sumisorb 400™) as Aging Inhibitor 2, 1 part of still another aging inhibitor (Sankyo, Sanol LS-765™) as Aging Inhibitor 3, 3 parts of a light stabilizer (Sanshin Kagaku Kogyo, Sandant NBC™), 5 parts of a thixotropy imparting agent (Kusumoto Kasei, Disparlon #305™), 4 parts of silane coupling agent 1 (Nippon Unicar, Y-9030™) and 2 parts of silane coupling agent 2 (Nippon Unicar, A-187™), all parts by weight. The mixture was well kneaded by a 3-paint roll unit, to produce the major ingredient.

The curing agent was prepared for REFERENCE EXAMPLE K6 by the following procedure: a mixture comprising 4 parts of the silanol condensing catalyst (NITTO KASEI, U-220™), 4 parts of salt cake ($Na_2SO_4 \cdot 10H_2O$), 10 parts of a paraffin-based process oil (Idemitsu Kosan, Diana Process Oil PS-32™), 20 parts of limestone powder (Maruo Calcium, Snowlite SS™), and 2.5 parts of carbon black (Mitsubishi Chemical, CB#30™), all parts by weight, was manually kneaded in a disposal cup and stirred 3 times at 10,000 rpm each for 10 minutes by a homogenizer (Nihon Seiki Seisakusho Co., Ltd. Excel Auto Homogenizer).

The composition was prepared for each of REFERENCE EXAMPLES K7 to K9 in the same manner as in REFERENCE EXAMPLE K3, except that salt cake ($Na_2SO_4 \cdot 10H_2O$) for the curing agent was replaced by another hydrate of metallic salt, 6 parts of hypo ($Na_2S_2O_3 \cdot 5H_2O$) for REFERENCE EXAMPLE K7, 6 parts of magnesium sulfate ($MgSO_4 \cdot 7H_2O$) for REFERENCE EXAMPLE K8 and 4 parts of sodium phosphate ($Na_3PO_4 \cdot 12H_2O$) for REFERENCE EXAMPLE K9 to prepare the curing agent, and tested in the same manner as in REFERENCE EXAMPLE K3. The results are given in Tables K5 and K6.

The composition comprising the major ingredient and curing agent, prepared in each of EXAMPLES K1 to K7 and REFERENCE EXAMPLES K1 to K9 was tested for curing speed and resistance to weather by the methods described earlier.

The results are given in Table K7.

TABLE K5

(H type tensile test results with the just produced compositions)

| | Substrate | $M_{50}$ kgf/cm² | $T_B$ kgf/cm² | $E_B$ % | Fractured conditions (%) CF | TCF | AF |
|---|---|---|---|---|---|---|---|
| EXAMPLE K4 | FL | 4.32 | 5.94 | 83 | 100 | 0 | 0 |
| | KLS | 4.36 | 5.80 | 78 | 100 | 0 | 0 |
| EXAMPLE K5 | FL | 4.85 | 6.20 | 72 | 100 | 0 | 0 |
| | KLS | 4.90 | 6.04 | 68 | 100 | 0 | 0 |
| EXAMPLE K6 | FL | 4.59 | 6.80 | 88 | 100 | 0 | 0 |
| | KLS | 4.60 | 6.62 | 83 | 100 | 0 | 0 |
| EXAMPLE K7 | FL | 4.18 | 6.20 | 91 | 100 | 0 | 0 |
| | KLS | 4.23 | 6.00 | 86 | 100 | 0 | 0 |
| REFERENCE EXAMPLE K6 | FL | 4.92 | 7.40 | 94 | 100 | 0 | 0 |
| | KLS | 5.20 | 7.29 | 83 | 99 | 1 | 0 |
| REFERENCE EXAMPLE K7 | FL | 5.51 | 7.71 | 80 | 100 | 0 | 0 |
| | KLS | 5.63 | 7.45 | 74 | 100 | 0 | 0 |
| REFERENCE EXAMPLE K8 | FL | 5.22 | 8.45 | 99 | 100 | 0 | 0 |
| | KLS | 5.31 | 7.94 | 87 | 100 | 0 | 0 |
| REFERENCE EXAMPLE K9 | FL | 4.78 | 7.69 | 102 | 100 | 0 | 0 |
| | KLS | 5.12 | 7.76 | 96 | 100 | 0 | 0 |

(Notes)
FL: Float glass,
KLS: Heat ray reflective glass,
$M_{50}$: 50% Tensile stress,
$T_B$: Tensile breaking strength,
$E_B$: Tensile breaking elongation

TABLE K6

(H type tensile test results with the stores compositions)

| | Substrate | $M_{50}$ kgf/cm² | $T_B$ kgf/cm² | $E_B$ % | Fractured conditions (%) CF | TCF | AF |
|---|---|---|---|---|---|---|---|
| EXAMPLE K4 | FL | 4.33 | 6.25 | 84 | 100 | 0 | 0 |
| | KLS | 4.34 | 6.34 | 91 | 100 | 0 | 0 |
| EXAMPLE K5 | FL | 4.87 | 6.70 | 80 | 100 | 0 | 0 |
| | KLS | 4.88 | 6.80 | 77 | 100 | 0 | 0 |
| EXAMPLE K6 | FL | 4.58 | 7.00 | 92 | 100 | 0 | 0 |
| | KLS | 4.54 | 7.42 | 94 | 100 | 0 | 0 |
| EXAMPLE K7 | FL | 4.22 | 6.80 | 95 | 100 | 0 | 0 |
| | KLS | 4.32 | 6.90 | 102 | 100 | 0 | 0 |
| REFERENCE EXAMPLE K6 | FL | 4.92 | 7.40 | 90 | 100 | 0 | 0 |
| | KLS | 5.20 | 7.29 | 83 | 99 | 1 | 0 |
| REFERENCE EXAMPLE K7 | FL | 5.51 | 7.71 | 80 | 100 | 0 | 0 |
| | KLS | 5.63 | 7.45 | 74 | 100 | 0 | 0 |
| REFERENCE EXAMPLE K8 | FL | 5.22 | 8.45 | 99 | 100 | 0 | 0 |
| | KLS | 5.31 | 7.94 | 87 | 100 | 0 | 0 |
| REFERENCE EXAMPLE K9 | FL | 4.78 | 7.69 | 102 | 100 | 0 | 0 |
| | KLS | 5.12 | 7.76 | 96 | 100 | 0 | 0 |

(Notes)
FL: Float glass,
KLS: Heat ray reflective glass,
$M_{50}$: 50% Tensile stress,
$T_B$: Tensile breaking strength,
$E_B$: Tensile breaking elongation

TABLE K7

| | Just produced compositions | | Stored compositions | |
|---|---|---|---|---|
| | Curing speed | Resistance to weather | Curing speed | Resistance to weather |
| EXAMPLE K1 | ○ | No cracks or molten portion observed | ○ | No cracks or molten portion observed |
| REFERENCE EXAMPLE K1 | x | No cracks or molten portion observed | x | No cracks or molten portion observed |
| REFERENCE EXAMPLE K2 | x | No cracks or molten portion observed | x | No cracks or molten portion observed |
| EXAMPLE K2 | ○ | No cracks or molten portion observed | ○ | No cracks or molten portion observed |
| REFERENCE EXAMPLE K3 | x | No cracks or molten portion observed | x | No cracks or molten portion observed |
| REFERENCE EXAMPLE K4 | x | No cracks or molten portion observed | x | No cracks or molten portion observed |
| EXAMPLE K3 | ○ | No cracks or molten portion observed | ○ | No cracks or molten portion observed |
| REFERENCE EXAMPLE K5 | x | No cracks or molten portion observed | x | No cracks or molten portion observed |
| EXAMPLE K4 | ○ | No cracks or molten portion observed | ○ | No cracks or molten portion observed |
| EXAMPLE K5 | ○ | No cracks or molten portion observed | ○ | No cracks or molten portion observed |
| EXAMPLE K6 | ○ | No cracks or molten portion observed | ○ | No cracks or molten portion observed |
| EXAMPLE K7 | ○ | No cracks or molten portion observed | ○ | No cracks or molten portion observed |
| REFERENCE EXAMPLE K6 | x | No cracks or molten portion observed | x | No cracks or molten portion observed |
| REFERENCE EXAMPLE K7 | x | No cracks or molten portion observed | x | No cracks or molten portion observed |
| REFERENCE EXAMPLE K8 | x | No cracks or molten portion observed | x | No cracks or molten portion observed |
| REFERENCE EXAMPLE K9 | x | No cracks or molten portion observed | x | No cracks or molten portion observed |

Examples L Series

Production Example 1

[Production of Silyl-containing ethylene/propylene/5-vinyl-2-norbornene Random Copolymer Rubber]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, $VO(OC_2H_5)_2Cl$ and $Al(Et)_{1.5}Cl_{1.5}$ as the catalysts at 700 L, 45 mmols and 315 mmols per hour, respectively also continuously.

The copolymerization effected under the above conditions produced the ethylene/propylene/5-vinyl-2-norbornene random copolymer rubber in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber thus produced contained ethylene at 68% by mol, and had an iodine value of 10, an intrinsic viscosity [η] of 0.2 dl/g, and Mw/Mn of 15.

Two % toluene solution (0.3 g) of chloroplatinic acid and 1.5 g of methyldimethoxysilane were added to 100 g of the ethylene/propylene/5-vinyl-2-norbornene random copolymer rubber, and they were allowed to react with each other at 120° C. for 2 hours. The excess methyldimethoxysilane and the solvent were distilled off from the effluent. This produced 101.5 g of the copolymer rubber containing dimethoxymethylsilyl group.

Examples L1 to L4, and Comparative Example L1

A uniform rubber composition was prepared in each of EXAMPLES L1 to L4, and COMPARATIVE EXAMPLE L1 using the components given in Table L1 in a ratio also given in Table L1, to measure its viscosity. The results are shown in Table L1.

Each composition prepared was flow-cast to a 3 mm thick sheet, and cured at room temperature for 4 days and 50° C. for another 4 days.

The cured sheet was evaluated for its tackiness, resistance to heat, curing speed and resistance to weather by the following methods.

Curing speed (film expandability) and resistance to weather were also measured using different aliquots of each example. The results are given in Table L2.

1) Tackiness

Tackiness was evaluated according to the following three-grade system by feeling of touching the sheet with a finger:

⊙: No tackiness is felt to the touch

○: Tackiness is felt to the touch slightly

Δ: Tackiness is felt to the touch

2) Resistance to Heat

Resistance to heat was evaluated by the time required for the sheet surface to start melting at 130° C.

3) Resistance to Weather

Resistance to weather was evaluated by the time required for the sheet surface to start melting in the accelerated weather resistance test using a Sunshine weatherometer.

4) Curing Speed Test

The composition comprising the major ingredient and the catalyst was measured for its film expandability at room temperature, i.e., curing speed.

The composition and mold (20 by 80 by 5 mm in size) were kept and adjusted under the conditions of 23° C. and 50% RH overnight, and then the mold was filled with the composition. Next, the cured composition was released from the mold after it was kept therein for 24 hours, and thickness of the cured portion was measured by a dial gauge of weak spring force to 0.1 mm, to evaluate its curing speed.

(Evaluation Standards)

x: when thickness of the cured portion is less than 1 mm

○: when thickness of the cured portion is 1 mm or more

5) Weather Resistance Test

The accelerated weather resistance test was conducted in accordance with JIS B-7753:

Analyzer: Sunshine Carbon Arc weatherometer

Light irradiation/rainfall cycles: Irradiation for 120 minutes/rainfall for 18 minutes Black panel temperature: 63±2° C.

Tank inside temperature: 40±2° C.

Total light irradiation time: 500 hours

The surface state of tested test piece was visually observed, to evaluate its resistance to weather according to the following three grades:

○: No cracks or molten portion observed

Δ: Cracks or molten portion observed slightly x: Cracks or molten portion observed Reference Examples L1 to L6

Three types of polymers containing a reactive silicon group were prepared by the methods disclosed by Japanese Patent Laid-Open Publication No. 252670/1989 in PRODUCTION EXAMPLES 1 to 3 (column 16 to 18).

A uniform rubber composition was prepared using each of these polymers and other components shown in Tale L1. Table L1 describes the ratio of these compositions.

These rubber compositions and those cured products prepared in EXAMPLES were evaluated for the properties in the same manner as in EXAMPLES. The results are given in Table L1.

TABLE L1

| Composition (Parts) | EXAMPLE L1 | EXAMPLE L2 | REFERENCE EXAMPLE L1 | REFERENCE EXAMPLE L2 | EXAMPLE L3 | EXAMPLE L4 | REFERENCE EXAMPLE L3 | REFERENCE EXAMPLE L4 | COMPARATIVE EXAMPLE L1 | REFERENCE EXAMPLE L5 | REFERENCE EXAMPLE L6 |
|---|---|---|---|---|---|---|---|---|---|---|---|
| Component (A2) | | | | | | | | | | | |
| PRODUCTION EXAMPLE L1 | 80 | 80 | — | — | — | — | — | — | — | — | — |
| PRODUCTION EXAMPLE L2 | — | — | 80 | 80 | 100 | 100 | — | — | — | — | — |
| PRODUCTION EXAMPLE L2 (Note 6) | — | — | — | — | — | — | 100 | 100 | 100 | — | — |
| PRODUCTION EXAMPLE L3 (Note 7) | — | — | — | — | — | — | — | — | — | 100 | 100 |
| Component (K1) | | | | | | | | | | | |
| PS 340.5 (Note 1) | 20 | — | 20 | — | — | — | — | — | — | — | — |
| PS 084 (Note 2) | — | 20 | — | 20 | 24 (Note 4) | 35 (Note 5) | 80 (Note 4) | 90 (Note 5) | — | — | — |
| PS 080 (Note 3) | 3 | 3 | 3 | 3 | 3 | 3 | 3 | 3 | 3 | 3 | 3 |
| Tin octylate | 0.75 | 0.75 | 0.75 | 0.75 | 0.75 | 0.75 | 0.75 | 0.75 | 0.75 | 0.75 | 0.75 |
| Lauryl amine | ○ | ○ | X | X | ○ | ○ | X | X | ○ | X | X |
| Curability (day, 23° C.) | ◎ | ◎ | ◎ | ◎ | ◎ | ◎ | ◎ | ◎ | ○ | △ | ○ |
| Tackiness | 110 | 105 | 45 | 48 | 120 | 115 | 40 | 41 | 115 | 50 | 43 |
| Resistance to heat (day) | ○ | ○ | △ | △ | ○ | ○ | △ | △ | ○ | △ | △ |
| Resistance to weather (day) | | | | | | | | | | | |

Notes for Table L1:
(Note 1) PS 340.5: Polydimethylsiloxane with a silanol group at the terminal (Chisso Corp.)
(Note 2) PS 084: Polydimethyldiphenylsiloxane with a diphenyl silanol group at the terminal (Chisso Corp.)
(Note 3) PS 080: Polydiphenylsiloxane with a silanol group at the terminal (Chisso Corp.)
(Note 4) Ratio of silanol group in polysiloxane to methoxysilyl group in the polymer: 1 by equivalent
(Note 5) Ratio of silanol group in polysiloxane to methoxysilyl group in the polymer: 1.2 by equivalent
(Note 6) Polymer with a reactive silicon group, synthesized in accordance with the methods disclosed by Japanese Patent Laid-Open Publication No.252670/1989 in PRODUCTION EXAMPLE 1 (column 16 to 18),
(Note 7) Polymer with a reactive silicon group, synthesized in accordance with the methods disclosed by Japanese Patent Laid-Open Publication No.252670/1989 in PRODUCTION EXAMPLE 3 (column 16 to 18).

Examples M Series

Production Example M1

[Production of Silyl-containing ethylene/propylene/5-vinyl-2-norbornene Random Copolymer Rubber]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, $VO(OC_2H_5)_2Cl$ and $Al(Et)_{1.5}C_{1.5}$ as the catalysts at 700 L, 45 mmols and 315 mmols per hour, respectively also continuously.

The copolymerization effected under the above conditions produced the ethylene/propylene/5-vinyl-2-norbornene random copolymer rubber in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber thus produced contained ethylene at 68% by mol, and had an iodine value of 10, an intrinsic viscosity [η] of 0.2 dl/g, and Mw/Mn of 15.

Two % toluene solution (0.3 g) of chloroplatinic acid and 1.5 g of methyldimethoxysilane were added to 100 g of the ethylene/propylene/5-vinyl-2-norbornene random copolymer rubber, and they were allowed to react with each other at 120° C. for 2 hours. The excess methyldimethoxysilane and the solvent were distilled off from the effluent. This produced 101.5 g of the random copolymer rubber containing dimethoxymethylsilyl group.

Examples M1 to M5

A rubber composition was prepared in each of EXAMPLES M1 to M5 using the components given in Table M1 in a ratio also given in Table M1. It comprised the dimethoxymethylsilyl group containing copolymer rubber prepared in PRODUCTION EXAMPLE M1 as the component (A2); and an organic rubber of polybutadiene rubber, stytrene/butadiene copolymer rubber, acrylic rubber (JSR Corp., AR101), polypropylene glycol containing a hydrolyzable silyl group (KANEKA CORP., MS Polymer, MS203™) or nitrile rubber (JSR Corp., N230S) as the component (K2). The mixture was kneaded by a Banbury mixer (Kobe Steel, Ltd. 1.9) at 120° C. for 5 minutes, and further by an 8-inch open roll in the presence of a vulcanizing agent. The sample of the rubber composition was measured for vulcanizing speed $T_{90}$ in accordance with JIS K-6300/1994.

Moreover, it was extruded into a sheet by a biaxial extruder, and continuously vulcanized under heating at 180° C. for 1 hour, to produce the vulcanized rubber sheet.

The cured sheet was evaluated for tensile elongation, resistance to heat, surface resistance to weather, curing speed and resistance to weather by the following methods. The results are given in Table M1.

(Evaluation Methods)

1) Tensile Test

The tensile test was conducted in accordance with JIS 6251 at 23° C. using the JIS No. 1 dumbbell-shaped test piece.

2) Weather Resistance Test

The accelerated weather resistance test was conducted in accordance with JIS B-7753, to determine resistance to weather:

Analyzer: Sunshine Carbon Arc weatherometer

Light irradiation/rainfall cycles: Irradiation for 120 minutes/rainfall for 18 minutes Black panel temperature: 63±2° C.

Tank inside temperature: 40±2° C.

Total light irradiation time: 500 hours

The surface state of tested test piece was visually observed, to evaluate its resistance to weather according to the following three grades:

◯: No cracks or molten portion observed

Δ: Cracks or molten portion observed slightly

×: Cracks or molten portion observed

Reference Examples M1 to M5

The vulcanized rubber sheet was prepared and tested in each of REFERENCE EXAMPLES M1 to M5 as shown in Table M1 in the same manner as in corresponding EXAMPLE, except that the silyl-containing copolymer rubber as the component (A2) was replaced by the compound A (represented by the following general formula), synthesized by the method disclosed by Japanese Patent Laid-Open Publication No. 105005/1988, and having a number-average molecular weight of 10, 600, a molecular weight distribution (Mw/Mn) of 1.2 and terminal functional dimethoxymethylsilyl group number of 1.9. The results are given in Table M1.

Compound A

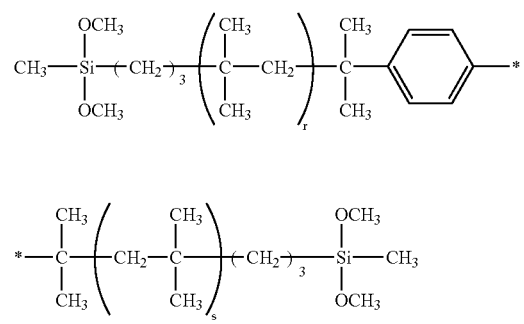

wherein, "r" and "s" are each an integer.

TABLE M1

|  | EXAMPLES | | | | | REFERENCE EXAMPLES | | | | |
| --- | --- | --- | --- | --- | --- | --- | --- | --- | --- | --- |
|  | M1 | M2 | M3 | M4 | M5 | M1 | M2 | M3 | M4 | M5 |
| Composition (parts by weight) | | | | | | | | | | |
| Component (A2) | | | | | | | | | | |
| Silyl-containing copolymer rubber compound A | 50 | 50 | 50 | 50 | 50 | | | | | |
| Component (K2) | | | | | | | | | | |
| Polybutadiene rubber | | | | | | | | | | |
| Styrene/butadiene copolymer rubber | 50 | | | | | 100 | | | | |
| Acrylic rubber | | 50 | | | | | 100 | | | |
| MS Polymer, MS203 | | | 50 | | | | | 100 | | |
| Nitrile rubber | | | | 50 | | | | | 100 | |
| Other component | | | | | | | | | | |
| Asahi #60G | | | | | 50 | | | | | 100 |
| Vulcanizer (M) | 40 | 40 | 40 | 40 | 40 | 40 | 40 | 40 | 40 | 40 |
| Dicumyl peroxide | 2.7 | 2.7 | 2.7 | 2.7 | 2.7 | 2.7 | 2.7 | 2.7 | 2.7 | 2.7 |
| Curing speed of rubber composition: T90 (170° C.) minutes | | | | | | | | | | |
| Properties of the cured product | 5.6 | 5.8 | 6.2 | 6.9 | 6.5 | 6.8 | 6.5 | 8.2 | 10.5 | 8.6 |
| Tensile elongation (%) | 400 | 420 | 480 | 500 | 490 | 250 | 280 | 290 | 300 | 310 |
| Resistance to weather | ○ | ○ | ○ | ○ | ○ | Δ | Δ | Δ | Δ | Δ |

Notes)
MS Polymer MS203 ™: Polypropylene glycol containing a hydrolysable silyl group, KANEKA Corp.
Asahi #60G: FEF grade carbon black, Asahi Carbon As shown in Table M1, the rubber composition prepared in each of EXAMPLES is superior to that prepared in corresponding REFERENCE EXAMPLE in all of curing speed, and surface resistance to weather, resistance to weather and resistance to heat in its cured product.

Examples N Series

Production Example 1

[Production of Silyl-containing ethylene/propylene/5-vinyl-2-norbornene Random Copolymer Rubber]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, VO(OC$_2$H$_5$)$_2$Cl and Al(Et)$_{1.5}$Cl$_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber thus produced contained ethylene at 68% by mol, and had an iodine value of 10, an intrinsic viscosity [η] of 0.2 dl/g, and Mw/Mn of 15.

Two % toluene solution (0.3 g) of chloroplatinic acid and 1.5 g of methyldimethoxysilane were added to 100 g of the ethylene/propylene/5-vinyl-2-norbornene random copolymer rubber, and they were allowed to react with each other at 120° C. for 2 hours. The excess methyldimethoxysilane and the solvent were distilled off from the effluent. This produced 101.5 g of the random copolymer rubber containing dimethoxymethylsilyl group.

Reference Production Examples 1 to 6

The polymer was prepared in each of REFERENCE PRODUCTION EXAMPLES 1 to 6 in accordance with the respective method of PRODUCTION EXAMPLES 1 to 6 disclosed by Japanese Patent Laid-Open Publication No. 292616/1992 [0036] to [0037].

Examples N1 TO N4, and
Reference Examples N1 to N6

The curable resin composition was prepared in each of EXAMPLES N1 to N4 using the components given in Table N1 in a weight ratio also given in Table N1. It comprised the copolymer rubber containing dimethoxysilyl group, prepared in PRODUCTION EXAMPLE 1, an epichlorohydrin-bisphenol A type epoxy resin (Yuka Shell Epoxy, Epikote #828™, epoxy equivalents: around 190), γ-(2-aminoethyl) aminopropyl trimethoxysilane (Nippon Unicar, A1122™) as the silane coupling agent, 50/50 mixture of dibutyl tin oxide and dioctyl phthalate (Sankyo Organic Chemicals, Ltd., #918™) as the silanol condensing catalyst, and 2,4,6-tris (dimethylaminomethyl)phenol (Kayaku Nooly Co., Ltd., DMP30™) as the epoxy resin curing catalyst. The composition was also prepared in the same manner as in the above, except that the polymers prepared in COMPARATIVE PRODUCTION EXAMPLES 1 to 6 were used for respective COMPARATIVE EXAMPLES N1 to N6.

The curable resin composition prepared in each of EXAMPLES N1 to N4, and COMPARATIVE EXAMPLES N1 to N6 was evaluated by the following methods.

1) Tensile Test Using the Dumbbell-Shaped Test Piece

The curable resin composition was molded in a Teflon frame into a sheet by curing at 23° C. for 3 days and 50° C. for another 4 days. The cured sheet was stamped out into the No. 3 dumbbell-shaped test piece in accordance with JIS K-6301. It was stretched at 200 mm/minute, to determine its moduli at 50 and 100% tension ($M_{50}$ and $M_{100}$), breaking strength ($T_B$) and breaking elongation ($E_B$).

2) Measurement of Tensile Shear Strength

The test was conducted in accordance with JIS K-6850. An aluminum plate (A-1050P aluminum plate, 100 by 25 by 2 mm in size, specified by JISH-4000) was wiped lightly with acetone, on which the curable resin composition was spread by a spatula to an area of around 25 by 12.5 mm and thickness of 0.05 mm. The coated surfaces of the two plates were attached face-to-face and manually pressed against each other. The coated test pieces were fixed, and the resin was cured at 23° C. for 3 days and 50° C. for another 4 days. Then, they were stretched at 5 mm/minute away from each other until their cured resin was fractured. The maximum load value measured at which the cured resin was fractured was divided by the coated area to find the tensile shear strength.

Curing speed and resistance to weather were measured by the following methods:

3) Curing Speed

The composition comprising the major ingredient and the catalyst was measured for its film expandability at room temperature, i.e., curing speed.

The curable composition was cured at 23° C. and 50% RH for 24 hours in a mold (20 by 80 by 5 mm in size), and thickness of the cured portion was measured by a dial gauge of weak spring force to 0.1 mm.

(Evaluation Standards)

×: when thickness of the cured portion is less than 1 mm
○: when thickness of the cured portion is 1 mm or more 4) Weather Resistance Test The accelerated weather resistance test was conducted in accordance with JIS B-7753, to determine resistance to weather:

Analyzer: Sunshine Carbon Arc weatherometer
Light irradiation/rainfall cycles: Irradiation for 120 minutes/ rainfall for 18 minutes
Black panel temperature: 63±2° C.
Tank inside temperature: 40±2° C.
Total light irradiation time: 500 hours The surface state of tested test piece was visually observed, to evaluate its resistance to weather according to the following three grades:

○: No cracks or molten portion observed
Δ: Cracks or molten portion observed slightly
×: Cracks or molten portion observed The results are given in Table N1.

TABLE N1

| | EXAMPLE N | | | | REFERENCE EXAMPLE N | | | | | |
|---|---|---|---|---|---|---|---|---|---|---|
| | 1 | 2 | 3 | 4 | 1 | 2 | 3 | 4 | 5 | 6 |
| Silyl-containing polymers | | | | | | | | | | |
| PRODUCTION (P) EXAMPLE 1 | 100 | 100 | 100 | 100 | — | — | — | — | — | — |
| COMPARATIVE P. EXAMPLE 1 | — | — | — | — | 100 | — | — | — | — | — |
| COMPARATIVE P. EXAMPLE 2 | — | — | — | — | — | 100 | — | — | — | — |
| COMPARATIVE P. EXAMPLE 3 | — | — | — | — | — | — | 100 | — | — | — |
| COMPARATIVE P. EXAMPLE 4 | — | — | — | — | — | — | — | 100 | — | — |
| COMPARATIVE P. EXAMPLE 5 | — | — | — | — | — | — | — | — | 100 | — |
| COMPARATIVE P. EXAMPLE 6 | — | — | — | — | — | — | — | — | — | 100 |
| Epoxy resin #828 | 50 | 50 | 50 | 50 | 50 | 50 | 50 | 50 | 50 | 50 |
| Silane coupling agent | 1 | 2 | 5 | 7.5 | 2 | 2 | 2 | 2 | 2 | 2 |
| Silanol condensing catalyst | 1 | 1 | 1 | 1 | 1 | 1 | 1 | 1 | 1 | 1 |
| Epoxy curing catalyst | 5 | 5 | 5 | 5 | 5 | 5 | 5 | 5 | 5 | 5 |
| $M_{50}$ | 14.9 | 30.1 | 23.7 | 21.6 | 32.7 | 36.9 | 27.4 | 24.9 | 37.9 | 10.7 |
| $M_{100}$ | 29.7 | 55.4 | 51.3 | 50.7 | 59.6 | 64.4 | 46.3 | 41.8 | 67.1 | 21.2 |
| $T_B$ (kgf/cm$^2$) | 78.1 | 86.3 | 80.1 | 77.7 | 90.5 | 77.7 | 74.4 | 112 | 121 | 68.2 |
| $E_B$ (%) | 180 | 131 | 111 | 107 | 158 | 125 | 180 | 314 | 189 | 250 |
| Shear strength (kgf/cm$^2$) | 91 | 138 | 133 | 131 | 147 | 180 | 100 | 143 | 92 | 100 |
| Curing speed | ○ | ○ | ○ | ○ | ○ | ○ | ○ | ○ | ○ | ○ |
| Resistance to weather | ○ | ○ | ○ | ○ | X | X | X | X | X | X |

Examples O Series

Production Example 1

[Production of Silyl-containing ethylene/propylene/5-vinyl-2-norbornene Random Copolymer Rubber]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, VO(OC$_2$H$_5$)$_2$Cl and Al (Et)$_{1.5}$Cl$_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber thus produced contained ethylene at 68% by mol, and had an iodine value of 10, intrinsic viscosity [η] of 0.2 dl/g, and Mw/Mn of 15.

Two % toluene solution (0.3 g) of chloroplatinic acid and 1.5 g of methyldimethoxysilane were added to 100 g of the ethylene/propylene/5-vinyl-2-norbornene random copolymer rubber, and they were allowed to react with each other at 120° C. for 2 hours. The excess methyldimethoxysilane and the solvent were distilled off from the effluent. This produced 101.5 g of the ethylene/propylene/5-vinyl-2-norbornene random copolymer rubber containing dimethoxymethylsilyl group.

Reference Production Examples 1 and 2

The polymers were prepared in REFERENCE PRODUCTION EXAMPLES 1 and 2 in accordance with the respective methods of PRODUCTION EXAMPLES 1 and 3, respectively, disclosed by Japanese Patent Laid-Open Publication No. 280217/1987.

Example O1, and Reference Examples O1 and O2

A mixture containing the copolymer rubber as the component (A2), prepared in PRODUCTION EXAMPLE 1, was prepared for EXAMPLE O1. It was composed of 100 parts of the copolymer rubber, 50 parts of a bisphenol A type epoxy resin (Yuka Shell Epoxy, Epikote #828™), 1 part of a bisphenol type antioxidant (Ouchishinko Chemical Industrial Co., Nocrac NS-6™), 1 part of N-β-(aminoethyl)-γ-aminopropyltrimethoxysilane (silicon compound as the component (Q) for the present invention), 1 part of diphenyl silanediol (silicon compound as the component (R) for the present invention), 2 parts of an organotin-based compound (Sankyo Organic Chemicals, Ltd., #918™) as the silanol condensing catalyst, 5 parts of 2,4,6-tris(dimethylaminomethyl)phenol as the epoxy resin curing agent, and 0.4 part of water, all by weight. These components were well mixed with each other, and the mixture was poured into a polyethylene frame carefully to prevent the bubbles from entering the frame, where it was cured at 23° C. for 1 day and 50° C. for another 3 days into the 3 mm thick sheet. The similar procedures were repeated for preparation of the mixtures and sheets containing the polymers prepared in REFERENCE PRODUCTION EXAMPLES 1 and 2 (REFERENCE EXAMPLES O1 and O2).

The composition prepared in each of EXAMPLE O1, and REFERENCE EXAMPLES O1 and O2 was tensile-tested using the dumbbell-shaped test piece, and also measured for curing speed and resistance to weather by the following methods. The results are given in Table O1.

1) Tensile Test Using the Dumbbell-Shaped Test Piece

The cured sheet was stamped out into the No. 3 dumbbell-shaped test piece in accordance with JIS K-6301. It was stretched at 500 mm/minute, to determine its breaking strength ($T_B$) and breaking elongation ($E_B$).

Curing speed and resistance to weather were determined by the following methods.

1) Curing Speed

The composition comprising the major ingredient and the catalyst was measured for its film expandability at room temperature, i.e., curing speed.

The curable composition prepared in each of EXAMPLE and REFERENCE EXAMPLES was cured at 23° C. and 50% RH for 24 hours in a mold (20 by 80 by 5 mm in size), and thickness of the cured portion was measured by a dial gauge of weak spring force to 0.1 mm.

(Evaluation Standards)

×: when thickness of the cured portion is less than 1 mm

◯: when thickness of the cured portion is 1 mm or more

2) Weather Resistance Test

The accelerated weather resistance test was conducted in accordance with JIS B-7753, to determine resistance to weather:

Analyzer: Sunshine Carbon Arc weatherometer

Light irradiation/rainfall cycles: Irradiation for 120 minutes/rainfall for 18 minutes Black panel temperature: 63±2° C.

Tank inside temperature: 40±2° C.

Total light irradiation time: 500 hours

The surface state of tested test piece was visually observed, to evaluate its resistance to weather according to the following three grades:

TABLE O1

|  | Tensile properties | | | |
| --- | --- | --- | --- | --- |
|  | $T_B$ (kg/cm$^2$) | $E_B$ (%) | Curing speed | Resistance to weather |
| EXAMPLE O1 | 35 | 380 | ◯ | ◯ |
| REFERENCE EXAMPLE O1 | 48 | 410 | ◯ | × |
| REFERENCE EXAMPLE O2 | 25 | 210 | × | × |

◯: No cracks or molten portion observed
Δ: Cracks or molten portion observed slightly
×: Cracks or molten portion observed Examples O2 to O4, and
Reference Examples O3 TO O5

The cured sheet was prepared in the same manner as in EXAMPLE O1 for each of EXAMPLES O2 to O4, except that diphenyl silanediol as the component (R) for the present invention was replaced by 0.5 part of bis(hydroxydimethylsilyl)benzene and 0.5 part of polydimethyl-diphenylsiloxane with terminal diphenyl silanol group (Petrarch Systems Inc., PS-084™) or 0.5 part of silicone varnish having silanol group (Shin-Etsu Chemical Co., Ltd., KR-212™), all by weight, to measure $T_B$ and $E_B$. The cured sheet was prepared similarly using the composition prepared in REFERENCE EXAMPLE O1 for each of REFERENCE EXAMPLES O3 to O5. The results are given in Table O2.

TABLE O2

|  |  | Tensile properties | | | |
| --- | --- | --- | --- | --- | --- |
|  | Types of component (R) | $T_B$ (kg/cm$^2$) | $E_B$ (%) | Curing speed | Resistance to weather |
| EXAMPLE O2 | Bis(hydroxydimethylsilyl)benzene | 67 | 550 | ◯ | ◯ |

TABLE O2-continued

| | Types of component (R) | $T_B$ (kg/cm$^2$) | $E_B$ (%) | Curing speed | Resistance to weather |
|---|---|---|---|---|---|
| EXAMPLE O3 | PS-084 | 65 | 800 | ◯ | ◯ |
| EXAMPLE O4 | KR-212 | 73 | 720 | ◯ | ◯ |
| REFERENCE EXAMPLE O3 | Bis(hydroxydimethylsilyl)benzene | 55 | 510 | ◯ | X |
| REFERENCE EXAMPLE O4 | PS-084 | 55 | 750 | ◯ | X |
| REFERENCE EXAMPLE O5 | KR-212 | 63 | 660 | ◯ | X |

Examples O5 TO O8, and Reference Examples O7 to O12

The adhesion test piece was prepared from the composition prepared in each of EXAMPLES O1 to O4 by the following procedure, to measure its adhesion strength in EXAMPLES O5 to O8. The results are shown in Table O3.

Methods of Preparing the Test Piece and Testing for the Tensile Shear Strength (in Accordance with JIS K-6850)

An aluminum plate (A-1050P aluminum plate, 100 by 25 by 2 mm in size, specified by JIS H-4000) was wiped lightly with acetone, on which the resin composition was spread by a spatula to an area of around 25 by 12.5 mm and thickness of 0.05 mm. The coated surfaces of the two plates were attached face-to-face and manually pressed against each other. The coated test pieces were fixed, and the resin composition was cured at 23° C. for 1 day and 50° C. for another 3 days. Then, they were stretched at 5 mm/minute away from each other until their cured resin was fractured. The maximum load value measured at which the cured resin was fractured was divided by the sheared area to find the tensile shear strength.

Methods of Preparing the Test Piece and Testing for the T Type Releasing Strength An aluminum plate (A-1050P aluminum plate, 200 by 25 by 0.1 mm in size, specified by JIS H-4000) was wiped lightly with acetone, on which the resin composition was spread by a spatula to an area of around 100 by 25 mm and thickness of 0.3 mm. The coated surfaces of the two plates were attached face-to-face and pressed against each other by a 5 kg hand roller repeatedly 5 times in such a way to avoid back-and-forth motion. The resin composition was cured at 23° C. for 1 day and 50° C. for another 3 days. Then, the test piece thus prepared was set in a tensile tester in a T-shape, and stretched at 200 mm/minute until the adhesive portion was fractured. The strength at which the adhesive portion was fractured was measured as the T-type releasing strength.

TABLE O3

| | | Types of compositions used | Adhesion strength | |
|---|---|---|---|---|
| | | | Tensile shear Strength (kg/cm$^2$) | T type releasing strength (kg/25 mm) |
| EXAMPLES | O5 | EXAMPLE O1 | 142 | 13.2 |
| | O6 | EXAMPLE O2 | 116 | 10.7 |
| | O7 | EXAMPLE O3 | 104 | 11.1 |
| | O8 | EXAMPLE O4 | 105 | 8.9 |

Example O9

The curable resin composition was prepared in EXAMPLE O1 using the polymer prepared in PRODUCTION EXAMPLE 1. It comprised 100 parts of the polymer, 50 parts of Epikote #828™, 1 part of Nocrac NS-6™, 1 part of N-β-(aminoethyl)-γ-aminopropyltrimethoxysilane, 1 part of diphenyl silanediol, 2 parts of #918™, and 5 parts of 2,4,6-tris(dimethylaminomethyl)phenol. These components were well mixed with each other in a nitrogen atmosphere in such a way to prevent contamination with moisture in air.

The test piece was prepared from the above composition following the above-described method of preparing the test piece, and cured at 23° C. for 1 day and 50° C. for another 3 days, to measure its adhesion strength. It had a tensile shear strength of 126 kg/cm$^2$ and a T-type releasing strength of 9.0 kg/25 mm (EXAMPLE O9).

Examples P Series

Production Example 1

[Production of Silyl-containing ethylene/propylene/5-vinyl-2-norbornene Random Copolymer Rubber]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, VO(OC$_2$H$_5$)$_2$Cl and Al (Et)$_{1.5}$Cl$_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber thus produced contained ethylene at 68% by mol, and had an iodine value of 10, an intrinsic viscosity [η] of 0.2 dl/g, and Mw/Mn of 15.

Two % toluene solution (0.3 g) of chloroplatinic acid and 1.5 g of methyldimethoxysilane were added to 100 g of the ethylene/propylene/5-vinyl-2-norbornene random copolymer rubber, and they were allowed to react with each other at 120° C. for 2 hours. The excess methyldimethoxysilane and the solvent were distilled off from the effluent. This produced 101.5 g of the ethylene/propylene/5-vinyl-2-norbornene random copolymer rubber containing dimethoxymethylsilyl group.

Examples P1 and P2, and
Comparative Examples P1 to P3

A mixture containing the copolymer rubber containing dimethoxysilyl group, prepared in PRODUCTION EXAMPLE P1, was prepared for each of EXAMPLES P1 and P2, and COMPARATIVE EXAMPLES P1 to P3. It was composed of the copolymer rubber, a paraffin-based process oil (Idemitsu Kosan, Diana Process Oil PS-32™), colloidal calcium carbonate (Shiraishi K. K., EDS-D10A™), limestone powder (Maruo Calcium, Snowlite SS™), talc (Fuji Talc Kogyo, Talc LMR™), $Na_2SO_4 \cdot 10H_2O$, (Wako Junyaku Kogyo), and γ-isocyanate propyltriethoxysilane as a silane coupling agent (Nippon Unicar, $Y_{-9030}$™). Table P1 gives each composition in parts by weight. The mixture was well kneaded by a 3-paint roll unit, to produce the major ingredient for each of the examples.

Each of the major ingredients was evaluated for its thready property by a spatula.

The major ingredient was incorporated with dibutyl tin bisacetylacetonate (NITTO KASEI Co., Neostann $U_{-220}$™) to prepare the mixture of 404/2 ratio by weight. The components were well kneaded manually, and the resultant mixture was formed into a sheet in a 2 mm thick aluminum frame lined with a Teflon sheet while breaking the bubbles in the composition by a spatula. It was cured in an oven at 23° C. for 7 days and 50° C. for 7 days. The cured sheet was stamped out into the No. 3 dumbbell-shaped test piece in accordance with JIS K-6251/1993, the "method of tensile testing vulcanized rubber," where the test piece was stretched at 500 mm/minute by an autograph (Shimadzu, Autograph AG-2000A) in a constant-temperature chamber kept at 23° C. and 50±10% RH.

The cured test piece for hardness measurement was prepared in the following procedure. The major ingredient was incorporated with a curing catalyst (NITTO KASEI, Neostann U-220™) to prepare the mixture of 404/2 ratio by weight. The components were well kneaded, and the resultant mixture was cured into a rectangular parallelepiped test piece in a frame (12 by 12 by 50 mm in size) lined with a Teflon sheet under the standard conditions of 23° C. for 7 days and 50° C. also for 7 days, to measure its hardness. Hardness of the rod-shaped test piece was measured in accordance with JIS K-6301/1975 by the spring type hardness test A method using a rubber type hardness meter (Shimadzu, Hardness meter 200). A total of 5 measurements were made for each composition, and the average value was reported.

Table P1 gives the composition, viscosity (at 10 rpm) of the major ingredient, and thready property, dumbbell tensile test results, hardness, curing speed and resistance to weather of each composition.

Thready property was evaluated according to the following two-grade system:

○: The composition is low in thready property, and easy to finish by spatula

×: The composition is high in thready property, and difficult to finish by spatula M50, $T_{max}$ and $E_{max}$ in Table P1 are 50% tensile stress, maximum tensile stress and elongation at the maximum load, respectively.

Curing speed and resistance to weather were measured by the following methods:

1) Curing Speed

The composition comprising the major ingredient and the catalyst was measured for its film expandability at room temperature, i.e., curing speed.

The curable composition was cured at 23° C. and 50% RH for 24 hours in a mold (20 by 80 by 5 mm in size), and thickness of the cured portion was measured by a dial gauge of weak spring force to 0.1 mm.

(Evaluation Standards)
×: when thickness of the cured portion is less than 1 mm
○: when thickness of the cured portion is 1 mm or more 2) Weather Resistance Test The accelerated weather resistance test was conducted in accordance with JIS B-7753, to determine resistance to weather:

Analyzer: Sunshine Carbon Arc weatherometer
Light irradiation/rainfall cycles: Irradiation for 120 minutes/rainfall for 18 minutes
Black panel temperature: 63±2° C.
Tank inside temperature: 40±2° C.
Total light irradiation time: 500 hours The surface state of tested test piece was visually observed, to evaluate its resistance to weather according to the following three grades:

○: No cracks or molten portion observed
Δ: Cracks or molten portion observed slightly
×: Cracks or molten portion observed The results are given in Table P1.

Comparative Examples P4 to P8

An isobutylene polymer having a reactive silicon group was synthesized in accordance with the method described in Japanese Patent Laid-Open Publication No. 316804/1998, paragraphs 0049 to 0055.

The composition was prepared for each of COMPARATIVE EXAMPLES P4 to P8 in the same manner as in each of EXAMPLES P1 and P2, and COMPARATIVE EXAMPLES P1 to P3, respectively, except that the copolymer rubber containing dimethoxysilyl group was replaced by the isobutylene polymer having a reactive silicon group. Several properties of the compositions were measured. The results are shown in Table P2

TABLE P1

| Compositions | Additives | EXAMPLE P | | COMPARATIVE EXAMPLE P | | |
|---|---|---|---|---|---|---|
| | | 1 | 2 | 1 | 2 | 3 |
| Major ingredients (parts by weight) | Polymer produced in PRODUCTION EXAMPLE | 100 | 100 | 100 | 100 | 100 |
| | PS-32 | 100 | 100 | 100 | 100 | 100 |
| | EDS-D10A | 100 | 50 | 200 | — | — |

TABLE P1-continued

| Compositions | Additives | EXAMPLE P 1 | EXAMPLE P 2 | COMPARATIVE EXAMPLE P 1 | COMPARATIVE EXAMPLE P 2 | COMPARATIVE EXAMPLE P 3 |
|---|---|---|---|---|---|---|
| | Snowlite SS | 50 | 200 | — | 300 | — |
| | LMR | 100 | 100 | — | — | 200 |
| | $Na_2SO_4 \cdot 10H_2O$ | 2 | 2 | 2 | 2 | 2 |
| | Y-9030 | 2 | 2 | 2 | 2 | 2 |
| Curing catalyst (parts by weight) | U-220 | 2 | 2 | 2 | 2 | 2 |
| Thready property | | ◯ | ◯ | ◯ | X | X |
| Tensile characteristics | M50 (kgf/cm$^2$) | 7.90 | 7.91 | 3.52 | 4.12 | 9.69 |
| | Tmax (kgf/cm$^2$) | 11.7 | 12.6 | 11.6 | 8.8 | 13.1 |
| | Emax (%) | 85 | 83 | 215 | 118 | 62 |
| JIS Hardness A | | 34 | 34 | 24 | 28 | 38 |
| Curing speed | | ◯ | ◯ | ◯ | ◯ | ◯ |
| Resistance to weather | | ◯ | ◯ | ◯ | ◯ | ◯ |

TABLE P2

| Compositions | Additives | COMPARATIVE EXAMPLE P 4 | 5 | 6 | 7 | 8 |
|---|---|---|---|---|---|---|
| Major ingredients (parts by weight) | Note (1) | 100 | 100 | 100 | 100 | 100 |
| | PS-32 | 100 | 100 | 100 | 100 | 100 |
| | EDS-D10A | 200 | — | — | 100 | 50 |
| | Snowlite SS | — | 300 | — | 50 | 200 |
| | LMR | — | — | 200 | 100 | 100 |
| | $Na_2SO_4 \cdot 10H_2O$ | 2 | 2 | 2 | 2 | 2 |
| | Y-9030 | 2 | 2 | 2 | 2 | 2 |
| Curing catalyst (parts by weight) | U-220 | 2 | 2 | 2 | 2 | 2 |
| Thready property | | ◯ | X | X | ◯ | ◯ |
| Tensile characteristics | M50 (kgf/cm$^2$) | 4.1 | 4.8 | 11.3 | 9.0 | 9.2 |
| | Tmax (kgf/cm$^2$) | 13.8 | 10.4 | 15.4 | 13.8 | 14.7 |
| | Emax (%) | 248 | 132 | 70 | 93 | 95 |
| JIS Hardness A | | 29 | 33 | 39 | 38 | 38 |
| Curing speed | | X | X | X | X | X |
| Resistance to weather | | Δ | Δ | Δ | Δ | Δ |

Note (1): The polymer used in EXAMPLE described in Japanese Patent Laid-Open Publication No.316804/1998

It is apparent that the following findings are derived from the results given in Tables P1 and P2.

The composition prepared in each of EXAMPLES P1 and P2 using the silyl-containing copolymer rubber is excellent in workability. The cured product is excellent in mechanical strength and hardness, and these properties are well-balanced. Moreover, it has sufficient resistance to weather and curing speed.

The composition prepared in each of COMPARATIVE EXAMPLES P1 to P3, which was free of calcium carbonate or talc although containing the silyl-containing copolymer rubber, was less balanced between these properties mentioned above.

The composition prepared in each of COMPARATIVE EXAMPLES P4 to P8, which was free of the silyl-containing copolymer rubber, was less balanced between these properties, and less resistant to weather or lower in curing speed.

Examples Q Series

The composition, the iodine value, the intrinsic viscosity [η] and the molecular weight distribution (Mw/Mn) of the copolymer rubber used in each of EXAMPLES and COMPARATIVE EXAMPLES were determined by the methods described earlier.

Production Example

[Production of Silyl-containing ethylene/propylene/5-vinyl-2-norbornene Random Copolymer Rubber (A-1)]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, VO(OEt)$_2$Cl and Al(Et)$_{1.5}$Cl$_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber (A$_0$-1) in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber (A$_0$-1) thus produced contained ethylene at 68% by mol, and had an intrinsic viscosity [η] of 0.2 dl/g determined in decalin kept at 135° C., iodine value (IV) of 10 (g/100 g) and Mw/Mn of 15.

Two % toluene solution (0.3 part by weight) of chloroplatinic acid and 1.5 parts by weight of methyldimethoxysilane were added to 100 parts by weight of the ethylene/propylene/5-vinyl-2-norbornene random copolymer rubber (A$_0$-1), and they were allowed to react with each other at 120° C. for 2 hours. The excess methyldimethoxysilane and the solvent (toluene) were distilled off from the effluent. This produced 101.5 parts by weight of the ethylene/propylene/5-vinyl-2-norbornene random copolymer rubber (A-1) containing dimethoxymethylsilyl group (—Si(CH$_3$)(OCH$_3$)$_2$).

Example Q1

A mixture containing the silyl-containing ethylene/propylene/5-vinyl-2-norbornene random copolymer rubber (A-1) prepared in PRODUCTION EXAMPLE, was prepared for EXAMPLE Q1. It was composed of 100 parts of the copolymer rubber (A-1), 90 parts of a paraffin-based process oil (Idemitsu Kosan, Diana Process Oil PS-32™) as the plasticizer, 360 parts of limestone powder (Shiraishi Calcium, Whiton SB™) as the filler, 5 parts of salt cake $Na_2SO_4.10H_2O$ as the water source, 1 part of tetrakis-[methylene-3-(3',5'-di-t-butyl-4-hydroxyphenyl) propionate]methane (Ciba-Geigy Japan, Irganox 1010™) as the aging inhibitor, 1 part of 2-(2'-hydroxy-3',5'-t-butyl)-5-chlorobenzotriazole (Ciba-Geigy Japan, Tinuvin 327™) as the stabilizer, 1 part of bis-(2,2,6,6-tetramethyl-4-piperidyl)cebacate (Sankyo, Sanol LS-770™), 5 parts of a thixotropy imparting agent (Kusumoto Kasei, Disparlon #305™), 2 parts of γ-isocyanate propyltriethoxysilane (Nippon Unicar, Y-9030™) as the silane coupling agent, and 3 parts of nickel dimethyldithiocarbamate (Sanshin Kagaku Kogyo, Sandant NBC™), represented by the following structural formula, as the light stabilizer, all parts by weight. It was sufficiently kneaded to mix the components by a 3-paint roll unit, to prepare the major ingredient.

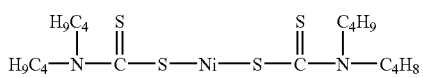

The curing agent was prepared by the following procedure: a mixture comprising 10 parts of a paraffin-based process oil (Idemitsu Kosan, Diana Process Oil PS-32™), 25 parts of limestone powder (Shiraishi Calcium, Whiton SB™), 4 parts of tetravalent tin compound (NITTO KASEI, U-220™) as the curing catalyst, and 2.5 parts of carbon black (Mitsubishi Chemical, CB#30™), all parts by weight, was manually kneaded in a disposal cup and stirred repeatedly 3 times at 10,000 rpm each for 10 minutes by a homogenizer (Nihon Seiki Sesakusho, Excel Auto Homogenizer)

The test piece was prepared in accordance with JIS A-5758-1992 specifying the method of preparing the test piece for tensile adhesion test; the composition comprising 14 parts by weight of the above-described major ingredient and 1 part by weight of the curing agent was put in the H-shape frame of glass or aluminum substrate, after being sufficiently kneaded. The composition was cured in an oven under the conditions of 23° C. for 7 days and 50° C. for 7 days. The heat ray reflective glass sheets (Central Glass, SGY-32™ and TCB-35™, 5 by 5 by 0.6 cm in size) surface-coated with $TiO_2$ by sputtering were used as the substrates for the H-shaped frames. Each H-shape frame was washed with methylethyl ketone (Wako-Junyaku, special grade) and wiped with clean cotton cloth, before it was filled with the composition.

The light-resistant adhesion test was conducted using the H-shaped test piece prepared as described above, wherein its H-type mechanical properties before and after the test were measured. The results are given in Table Q1. In the test, the H-type tensile test piece, put in a Sunshine superlong-life weathermeter (Suga Shikenki, WEL-SUN-HC) with black panel temperature kept at 63° C., was irradiated with light emitted from sunshine carbon as the light source, and taken out from the analyzer after 480 hours.

The H-shape test piece thus prepared was tested by the method of testing tensile adhesion in accordance with JIS A-5758/1992 at a tensile speed of 50 mm/minute in a constant-temperature chamber kept at 23° C. and 65±5% RH. The cohesion fracture (CF)/thin-coat fracture (TCF)/adhesion fracture (AF) ratio shown in the tables was determined by visual observation of the cross-sections of the tensile-tested pieces.

The cohesion fracture means the fracture of the cured composition itself, not at the interface between the base and cured composition, indicating that the cured composition is adhered to the base at a high adhesion strength. The adhesion fracture means the separation of the base and cured composition from each other at the interface, indicating that the cured composition is adhered to the base at a low adhesion strength. The thin-coat fracture is the cohesion fracture at the interface, indicating that its adhesion strength is medium between those for the above two fracture modes.

The weather resistance test was conducted by the following procedure. The results are also given in Table Q1.

Weather Resistance Test

The accelerated weather resistance test was conducted in accordance with JIS B-7753 under the following conditions::

Analyzer: Sunshine Carbon Arc weatherometer
Light irradiation/rainfall cycles: Irradiation for 120 minutes/rainfall for 18 minutes
Black panel temperature: 63±2° C.
Tank inside temperature: 40±2° C.
Total light irradiation time: 500 hours Comparative Examples Q1 to Q3

The same procedures as used for EXAMPLE Q1 were repeated, except that 3 parts by weight of nickel dimethyldithiocarbamate (Sanshin Kagaku Kogyo, Sandant NBC™) as the light stabilizer was not incorporated (COMPARATIVE EXAMPLE Q1), 3 parts by weight of 2-(2'-hydroxy-3',5'-t-butyl)-5-chlorobenzotriazole (Ciba-Geigy Japan, Tinuvin 327™) was incorporated as the non-nickel-based stabilizer (COMPARATIVE EXAMPLE Q2), and 5 parts by weight of bis(2,2,6,6-tetramethyl-4-piperidyl)cebacate (Sankyo, Sanol LS-770™) was incorporated as the non-nickel-based stabilizer (COMPARATIVE EXAMPLE Q3). The results are given in Table Q1.

TABLE Q1

| | $M_{50}$ | $T_{max}$ | $E_{max}$ | Fractured conditions (%) | | | |
|---|---|---|---|---|---|---|---|
| | (kgf/cm²) | (kgf/cm²) | (%) | CF | TCF | AF | Resistance to weather |
| Before Testing | | | | | | | |
| EXAMPLE Q1 | 4.4 | 5.8 | 60 | 100 | 0 | 0 | No cracks or molten portion observed |
| COMPARATIVE EXAMPLE Q1 | 4.3 | 5.9 | 62 | 99 | 1 | 0 | No cracks or molten portion observed |
| COMPARATIVE EXAMPLE Q2 | 4.3 | 5.8 | 63 | 100 | 0 | 0 | No cracks or molten portion observed |
| COMPARATIVE EXAMPLE Q3 | 4.3 | 5.6 | 60 | 100 | 0 | 0 | No cracks or molten portion observed |

TABLE Q1-continued

| | $M_{50}$ (kgf/cm$^2$) | $T_{max}$ (kgf/cm$^2$) | $E_{max}$ (%) | Fractured conditions (%) | | | Resistance to weather |
|---|---|---|---|---|---|---|---|
| | | | | CF | TFC | AF | |
| After Testing | | | | | | | |
| EXAMPLE Q1 | 3.2 | 4.7 | 75 | 100 | 0 | 0 | |
| COMPARATIVE EXAMPLE Q1 | 3.0 | 3.2 | 52 | 0 | 2 | 98 | |
| COMPARATIVE EXAMPLE Q2 | 2.9 | 3.4 | 54 | 0 | 1 | 99 | |
| COMPARATIVE EXAMPLE Q3 | 3.1 | 3.1 | 50 | 1 | 0 | 99 | |

As shown in Table Q1, the composition prepared in each of EXAMPLE Q1 and COMPARATIVE EXAMPLES Q1 to Q3 exhibited good adhesion to the surface-treated SGY-32 glass substrate before the weather-resistant adhesion test. After the test, on the other hand, only the test piece prepared in EXAMPLE Q1 showed the cohesion fracture, and the others the adhesion fracture. These results indicate that incorporation of the Ni-based stabilizer (Sandant NBC™) improves light-resistant adhesion.

Example Q2 and Comparative Example Q4

The same procedures as used for EXAMPLE Q1 were repeated for EXAMPLE Q2, except that 3 parts by weight of nickel dimethyldithiocarbamate (Sanshin Kagaku Kogyo, Sandant NBC™) was replaced by 3 parts by weight of nickel [2,2'-thiobis(4-t-octylphenolate)]-n-butylamine (ACC, SYASORB UV1084), represented by the following formula, also as the Ni-based light stabilizer:

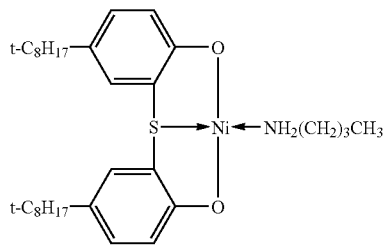

The same procedures as used for EXAMPLE Q2 were repeated for COMPARATIVE EXAMPLE Q4, except that 3 parts by weight of nickel [2,2'-thiobis (4-t-octylphenolate)]-n-butylamine (ACC, SYASORB UV1084™) was replaced by 3 parts by weight of 3,5-di-t-butyl-4-hydroxybenzoic acid-n-hexadecyl ester (ACC, SYASORB UV2908™), represented by the following formula, as the non-Ni-based light stabilizer:

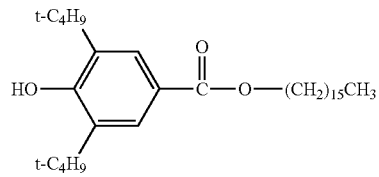

The results are given in Table Q2.

Example Q3 and Comparative Example Q5

The same procedures as used for EXAMPLE Q1 were repeated for EXAMPLE Q3, except that quantity of limestone powder (Shiraishi Calcium, Whiton SB™) was reduced from 25 to 20 parts by weight. The same procedures as used for EXAMPLE Q3 were repeated for COMPARATIVE EXAMPLE Q5, except that 3 parts by weight of nickel dimethyldithiocarbamate (Sanshin Kagaku Kogyo, Sandant NBC™) as the Ni-based light stabilizer was replaced by 3 parts by weight of 2,4-dibutylphenyl-3',5'-di-t-butyl-4'-hydroxybenzoate (ACC, SYASORB 712™), represented by the following formula, as the non-Ni-based light stabilizer:

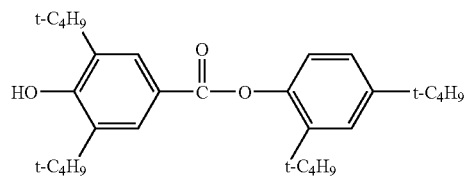

The results are given in Table Q2.

TABLE Q2

| | $M_{50}$ (kgf/cm$^2$) | $T_{max}$ (kgf/cm$^2$) | $E_{max}$ (%) | Fractured conditions (%) | | | Resistance to weather |
|---|---|---|---|---|---|---|---|
| | | | | CF | TFC | AF | |
| EXAMPLE Q2 | 3.2 | 4.4 | 78 | 100 | 0 | 0 | No cracks or molten portion observed |
| EXAMPLE Q3 | 3.3 | 4.8 | 80 | 100 | 0 | 0 | No cracks or molten portion observed |
| COMPARATIVE EXAMPLE Q4 | 3.0 | 3.2 | 52 | 0 | 1 | 99 | No cracks or molten portion observed |
| COMPARATIVE EXAMPLE Q5 | 3.2 | 3.2 | 50 | 0 | 2 | 98 | No cracks or molten portion observed |

Examples R Series

The composition, the iodine value, the intrinsic viscosity [η] and the molecular weight distribution (Mw/Mn) of the copolymer rubber used in each of EXAMPLES and COMPARATIVE EXAMPLES were determined by the methods described earlier.

Curing speed and resistance to weather tests were conducted in EXAMPLES and COMPARATIVE EXAMPLES by the following methods:

(1) Curing Speed Test

The compositions prepared in EXAMPLES and COMPARATIVE EXAMPLES, were cured at 23° C. and 50% RH for 24 hours in a mold (20 by 80 by 5 mm in size), and then released from the mold. Thickness of the cured portion was measured by a dial gauge of weak spring force to 0.1 mm, to evaluate its curing speed. It was marked with ○ when its thickness was more than 1 mm, Δ when it was 0.5 to 1 mm, and × when it was less than 0.5 mm (2) Weather Resistance Test The weather resistance test was conducted in accordance with JIS B-7753 using a Sunshine Carbon Arc weatherometer, to determine resistance to weather:

<Testing Conditions>
Light irradiation/rainfall cycles: Irradiation for 120 minutes/rainfall for 18 minutes
Black panel temperature: 63±2° C.
Tank inside temperature: 40±2° C.
Total light irradiation time: 500 hours <Evaluation Standards for Resistance to Weather>
○: No cracks or molten portion observed on one side of the tested piece
Δ: Cracks or molten portion observed slightly on one side of the tested piece
×: Cracks or molten portion observed on one side of the tested piece

Production Example R1

[Production of Silyl-containing ethylene/propylene/5-vinyl-2-norbornene Random Copolymer Rubber (A-1)]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, VO(OEt)$_2$Cl and Al(Et)$_{1.5}$Cl$_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber (A$_0$-1) in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber (A$_0$-1) thus produced contained ethylene at 68% by mol, and had an intrinsic viscosity [η] of 0.2 dl/g determined in decalin kept at 135° C., iodine value (IV) of 10 (g/100 g) and Mw/Mn of 15.

Two % toluene solution (0.3 g) of chloroplatinic acid and 1.5 g of methyldimethoxysilane were added to 100 g of the ethylene/propylene/5-vinyl-2-norbornene random copolymer rubber (A$_0$-1), and they were allowed to react with each other at 120° C. for 2 hours. The excess methyldimethoxysilane and the solvent (toluene) were distilled off from the effluent. This produced 101.5 g of the ethylene/propylene/5-vinyl-2-norbornene random copolymer rubber (A-1) containing dimethoxymethylsilyl group (—SiCH$_3$(OCH$_3$)$_2$).

Production Example R2

Two hundred grams of a polypropylene oxide with allyl ether group at 97% of the total terminals and having an average molecular weight of 5,000, was charged in a 500 mL four-mouthed flask, to which 100 μL of a 10% ethanol solution of chloroplatinic acid was added and then methyldimethoxysilane was added dropwise at 50° C., and they were allowed to react with each other at 80° C. for around 3 hours.

The resultant reaction product was a polypropylene oxide having 1.7 structures represented by the following formula in one molecule and an average molecular weight of around 5,200, as revealed by the $^1$H-NMR analysis:

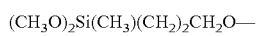

(CH$_3$O)$_2$Si(CH$_3$)(CH$_2$)$_2$CH$_2$O—

Examples R1 to R6

The silyl-containing ethylene/propylene/5-vinyl-2-norbornene random copolymer rubber (A-1), prepared by PRODUCTION EXAMPLE R1, was used to prepare the toluene solution of uniform composition, described in Table R1, for each of EXAMPLES R1 to R6.

Each solution was cured at room temperature for 1 day and at 50° C. for another 4 days in an about 3 mm thick frame, and then treated at 50° C. for 2 hours under a vacuum of 2 to 3 mmHg, to completely evaporate toluene.

The resultant cured sheet was put in a hot wind type drier kept at 150° C. for 20 days, to observe temporal property changes (measurement of resistance to heat). The results are given in Table R1, wherein the resistance to heat was evaluated by the three grades, ○: no cracks or molten portion observed, Δ: cracks or molten portion observed slightly, and ×: cracks or molten portion observed; and NISSAN DLTP: sulfide carboxylate ester-based antioxidant (NOF Corp.), Nocrac 300: sulfur-containing hindered phenol (Ouchishinko Chemical Industries Co.,) and Irgano 1010: hindered phenol (Ciba Geigy, Japan).

TABLE R1

| EXAMPLES | Compositions [parts by weight] | | | | | | Properties | | |
| --- | --- | --- | --- | --- | --- | --- | --- | --- | --- |
| | Component (A1) | Component (U) | | Tin octylate | Lauryl amine | Toluene | Water | Resistance to heat | Resistance to weather | Curing speed |
| R1 | 100 | NISSAN DLTP | 1 | 3 | 0.75 | 50 | 0.5 | ○ | ○ | ○ |
| R2 | 100 | NISSAN DLTP | 3 | 3 | 0.75 | 50 | 0.5 | ○ | ○ | ○ |
| R3 | 100 | NISSAN DLTP | 5 | 3 | 0.75 | 50 | 0.5 | ○ | ○ | ○ |
| R4 | 100 | Nocrac 300 | 1 | 3 | 0.75 | 50 | 0.5 | ○ | ○ | ○ |
| R5 | 100 | Nocrac 300 | 3 | 3 | 0.75 | 50 | 0.5 | ○ | ○ | ○ |
| R6 | 100 | Nocrac 300 | 5 | 3 | 0.75 | 50 | 0.5 | ○ | ○ | ○ |

Component (A1): ethylene/propylene/5-vinyl-2-norbornene random copolymer rubber (A-1)

Examples R7 to R9, and Comparative Example R1

The 1 mm thick sheet was prepared for each of EXAMPLES R7 to R9, and COMPARATIVE EXAMPLE R1 in the same manner as in EXAMPLE R1, except that the sulfur-based aging inhibitor was replaced by the additive given in Table R2 to prepare the composition. A test tube type rubber aging tester was used to measure the time required for the sheet to be completely decomposed at 150° C. and start to flow.

The results are given in Table R2.

Comparative Example R2

The sheet was prepared for COMPARATIVE EXAMPLE R2 in the same manner as in EXAMPLE R7, except that the silyl-containing ethylene/propylene/5-vinyl-2-norbornene random copolymer rubber (A-1) prepared in PRODUCTION EXAMPLE R1 was replaced by the polymer prepared in PRODUCTION EXAMPLE R2, and tested also in the same manner. The results are given in Table R2.

TABLE R2

| | EXAMPLE R | | | COMPARATIVE EXAMPLE R | |
| --- | --- | --- | --- | --- | --- |
| | 7 | 8 | 9 | 1 | 2 |
| NISSAN DLTP [parts by weight] | 1 | — | 1 | — | 1 |
| Nocrac 300 [parts by weight] | — | 1 | 1 | — | — |
| Resistance to heat | ○ | ○ | ○ | Δ | Δ |
| Resistance to weather | ○ | ○ | ○ | Δ | X |
| Curing speed | ○ | ○ | ○ | ○ | ○ |

The cured composition prepared in each of EXAMPLES R1 to R9 and COMPARATIVE EXAMPLES R1 and R2 was tested for resistance to weather following the method described earlier. As a result, no cracks were observed in the test pieces prepared in EXAMPLES R1 to R9, but observed in those prepared in COMPARATIVE EXAMPLES R1 and R2.

Examples S Series

The composition, the iodine value, the intrinsic viscosity [η] and the molecular weight distribution (Mw/Mn) of the copolymer rubber used in each of EXAMPLES and COMPARATIVE EXAMPLES were determined by the methods described earlier.

Production Example

[Production of Silyl-containing ethylene/propylene/5-vinyl-2-norbornene Random Copolymer Rubber (A-1)]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, VO(OEt)$_2$Cl and Al(Et)$_{1.5}$Cl$_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber (A$_0$-1) in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber (A$_0$-1) thus produced contained ethylene at 68% by mol, and had an intrinsic viscosity [η] of 0.2 dl/g determined in decalin kept at 135° C., iodine value (IV) of 10 g/100 g and Mw/Mn of 15.

Two % toluene solution (0.3 part by weight) of chloroplatinic acid and 1.5 parts by weight of methyldimethoxysilane were added to 100 parts by weight of the ethylene/propylene/5-vinyl-2-norbornene random copolymer rubber (A$_0$-1), and they were allowed to react with each other at 120° C. for 2 hours. The excess methyldimethoxysilane and the solvent (toluene) were distilled off from the effluent. This produced 101.5 parts by weight of the ethylene/propylene/5-vinyl-2-norbornene random copolymer rubber (A-1) containing dimethoxymethylsilyl group (—Si(CH$_3$)(OCH$_3$)$_2$).

Examples S1 to S5

A mixture containing the polymer prepared in PRODUCTION EXAMPLE was prepared for each of EXAMPLES S1 to S5. It was composed of 100 parts of the polymer, 90 parts of a paraffin-based process oil (Idemitsu Kosan, Diana Process Oil PS-32™), 30 parts of limestone powder (Maruo Calcium, Snowlite SS™), 100 parts of colloidal calcium carbonate (Shiraishi K. K., EDS-D10A™), 100 parts of talc (Fuji Talc Kogyo, Talc LMR™), 6 parts of Na$_2$SO$_4$.10H$_2$O, 6 parts of china wood oil as the compound and component (V) for the present invention having an unsaturated group polymerizable on reacting with oxygen in air, 3 parts of dipentaerythritol penta- and hexa-acrylate as the photopolymerizable compounds (TOAGOSEI, Aronix M-400™), and a tackifier given in Table S1 in a quantity also given in Table S1, all parts by weight. Each mixture was well kneaded by a 3-paint roll unit, to produce the major ingredient for each example.

The tackifiers used in EXAMPLES S1 to S3 were γ-glycidoxypropyltrimethoxysilane (Nippon Unicar, Silane coupling agent A-187™) as the silane coupling agent for the present invention and/or γ-isocyanatepropyltriethoxysilane (Nippon Unicar, Silane coupling agent Y-9030™) in quantities given in Table S1. EXAMPLE S4 used no tackifier, while EXAMPLE S5 used 4 parts by weight of an epoxy resin as the tackifier containing no hydrolyzable silicon group (except the silane coupling agent) (Yuka Shell Epoxy, Epikote #828™).

The curing agent was prepared by the following procedure: a mixture comprising 10 parts of a paraffin-based process oil (Idemitsu Kosan, Diana Process Oil PS-32™), 20 parts of limestone powder (Maruo Calcium, Snowlite SS™), 4 parts of a curing catalyst (NITTO KASEI, U-22 ™), and 2.5 parts of carbon black (Mitsubishi Chemical, CB#30™), all parts by weight, was manually kneaded in a disposal cup and stirred 3 times at 10,000 rpm each for 10 minutes by a homogenizer (Nihon Seiki Seisakusho Co., Ltd., Excel Auto Homogenizer).

The cured test piece for tensile adhesion measurement was prepared in the following procedure in accordance with JIS A-5758/1992. The major ingredient was incorporated with the curing agent to prepare the mixture of 12/1 by weight. The components were well kneaded, and the resultant mixture was put in the H-shape of glass base while breaking the bubbles in the composition by a spatula, and cured in an oven, under the conditions of 23° C.×1 day+50° C.×5 days for each composition. The substrate for the H-type tensile test was of float glass (Koen-sha, designated by Japan Sealant Industry Association, 3 by 5 by 0.5 cm in size) in accordance with JIS A-5758/1992, or heat ray reflective glass (Central Glass, KLS™, 5 by 5 by 0.6 cm in size) coated with thermally fused TiOx. Each of these H-shaped bases was washed with methylethyl ketone (Wako-Junyaku, special grade) and wiped with clean cotton cloth, before it was filled with the composition. It was not coated with a primer.

The H-shape test piece thus prepared for the tensile test was tested after it was cured in the absence of primer by the method of testing tensile adhesion in accordance with JIS A-5758/1992. The test was conducted at a tensile speed of 50 mm/minute by an autograph (Shimadzu, Autograph AG-2000A) in a constant-temperature chamber kept at 23° C. and 50±10% RH, to evaluate adhesion in the absence of a primer by comparing the tensile characteristics with fractured morphology. The results are given in Table S1, where the cohesion fracture (CF)/thin-coat fracture (TCF)/adhesion fracture (AF) ratio was determined by visual observation of the cross-sections of each tensile-tested piece.

Curing speed and resistance to weather were measured by the following methods. The results are given in Table S7.

(1) Curing Speed Test

The curable composition was cured at 23° C. and 50% RH for 24 hours in a mold (20 by 80 by 5 mm in size), and then released from the mold. Thickness of the cured portion was measured by a dial gauge of weak spring force to 0.1 mm, to evaluate its curing speed. It was marked with ◯ when its thickness was 1 mm or more, and × when it was less than 1 mm.

(2) Weather Resistance Test

The accelerated weather resistance test was conducted in accordance with JIS B-7753 under the following conditions, to determine resistance to weather:

Analyzer: Sunshine Carbon Arc weatherometer
Light irradiation/rainfall cycles: Irradiation for 120 minutes/rainfall for 18 minutes
Black panel temperature: 63±2° C.
Tank inside temperature: 40±2° C.
Total light irradiation time: 1000 hours

TABLE S1

| EXAMPLES | Tackifier (addition rate) | Base materials | Elongation at max. load*[1] | Fractured Morphologies (%)*[2] | | |
|---|---|---|---|---|---|---|
| | | | | CF | TCF | AF |
| S1 | A-187 (4 parts) | Float glass | ◯ | 100 | 0 | 0 |
| | | Heat ray reflective glass: KLS | ◯ | 100 | 0 | 0 |
| S2 | Y-9030 (4 parts) | Float glass | ◯ | 100 | 0 | 0 |
| | | Heat ray reflective glass: KLS | ◯ | 100 | 0 | 00 |
| S3 | A-187 (2 parts) | Float glass | ◯ | 100 | 0 | 0 |
| | Y-9030 (4 parts) | Heat ray reflective glass: KLS | ◯ | 100 | 0 | 0 |
| S4 | Not used | Float glass | X | 0 | 0 | 100 |
| | | Heat ray reflective glass: KLS | X | 0 | 0 | 100 |
| S5 | Epikote 828 (4 parts) | Float glass | Δ | 0 | 0 | 100 |
| | | Heat ray reflective glass: KLS | Δ | 0 | 0 | 100 |

*[1]◯: Elongation of 80% or more, Δ: Elongation of less than 80%, X: Elongation of less than 60%
*[2]CF: Cohesion fracture, TCF: Thin-coat fracture, AF: Adhesion fracture Examples S6 to S9, and Comparative Example S1

A mixture containing the polymer prepared in PRODUCTION EXAMPLE was prepared for each of EXAMPLES S6 to S9, and COMPARATIVE EXAMPLE S1. It was composed of 100 parts of the polymer, 90 parts of a paraffin-based process oil (Idemitsu Kosan, Diana Process Oil PS-32™), 30 parts of limestone powder (Maruo Calcium, Snowlite SS™), 100 parts of colloidal calcium carbonate (Shiraishi K. K., EDS-D10A™), 100 parts of talc (Fuji Talc Kogyo, Talc LMR™), 6 parts of $Na_2SO_4 \cdot 10H_2O$, 3 parts of nickel dimethyldithiocarbamate (Sanshin Kagaku Kogyo, Sandant NBC™) as a light stabilizer, 3 parts of nickel [2,2'-thiobis(4-t-octylphenolate)]-n-butylamine (ACC, CYASORB UV-1084), 1 part of antioxidant (Ciba-Geigy Japan, Irganox 1010™), 1 part of ultraviolet ray absorber (Ciba-Geigy Japan, Tinuvin 327™), 1 part of light stabilizer (Sankyo, Sanol LS-770™), and 2 parts of γ-glycidoxypropyltrimethoxysilane (Nippon Unicar, Silane coupling agent A-187™) as the silane coupling agent for the present invention and 4 parts of γ-isocyanatepropyltriethoxysilane (Nippon Unicar, Silane coupling agent Y-9030™), all parts by weight. It was also incorporated with china wood oil as the compound and component (V) for the present invention having an unsaturated group polymerizable on reacting oxygen in air, and dipentaerythritol penta- and hexa-acrylate as the photopolymerizable compounds (TOAGOSEI, Aronix M-400™) in a quantity given in Table S2. Each mixture was well kneaded by a 3-paint roll unit, to produce the major ingredient for each example.

The curing agent was prepared by the following procedure: a mixture comprising 10 parts of a paraffin-based process oil (Idemitsu Kosan, Diana Process Oil PS-32™), 20 parts of limestone powder (Maruo Calcium, Snowlite SS), 4 parts of a curing catalyst (NITTO KASEI, U-220™), and 2.5 parts of carbon black (Mitsubishi Chemical, CB#30™), all parts by weight, was manually kneaded in a disposal cup and stirred 3 times at 10,000 rpm each for 10 minutes by a homogenizer (Nihon Seiki Sesakusho Co., Ltd., Excel Auto Homogenizer).

The H-shaped test piece was prepared in the same manner as in the above, except that it was cured under the conditions of 23° C.×7 days+50° C.×7 days. The H-type tensile test piece, put in a Sunshine superlong-life weathermeter (Suga Shikenki, WEL-SUN-HC) with black panel temperature kept at 63° C., was exposed to light emitted from sunshine carbon as the light source in the weather resistance tester (SWOM) for a time given in Table S2, and taken out from the tester to be tested for tensile adhesion. Its weather-resistant adhesion was evaluated by comparing the tensile characteristics with fractured morphology. The results are given in Table S2.

The H-shaped test piece was also tested for tensile adhesion for reference before it was tested for weather-resistance. The results are given in Table S3.

The composition prepared in each of EXAMPLES S6 to S9 was tested for curing speed and resistance to weather in the same manner as in EXAMPLES S1 to S3. The results are also given in Table S7.

TABLE S2

| | Unsaturated compound capable of reacting with oxygen in air (Addition rate) | Photopolymerizable Material (Addition rate) | Base materials | SWOM Exposure time | Elongation at max. load[*1] | Fractured morphologies (%)[*2] | | |
|---|---|---|---|---|---|---|---|---|
| | | | | | | CF | TCF | AF |
| COMPARATIVE EXAMPLE S1 | Not used | Not used | Float glass | 3000 | X | 0 | 0 | 100 |
| | | | Heat ray reflective glass: KLS | 500 | x | 100 | 0 | 0 |
| EXAMPLE S6 | Not used | AronixM400 (3 parts) | Float glass | 3000 | X | 50 | 50 | 0 |
| | | | Heat ray reflective glass: KLS | 600 | X | 0 | 0 | 100 |
| EXAMPLE S7 | Not used | AronixM400 (6 parts) | Heat ray reflective glass: KLS | 500 | ◯ | 100 | 0 | 0 |
| EXAMPLE S8 | China wood oil (6 parts) | Not used | Float glass | 3000 | ◯ | 100 | 0 | 0 |
| | | | Heat ray reflective glass: KLS | 1000 | ◯ | 100 | 0 | 0 |
| EXAMPLE S9 | China wood oil (6 parts) | AronixM400 (3 parts) | Float glass | 3000 | ◯ | 100 | 0 | 0 |
| | | | Heat ray reflective glass: KLS | 1000 | ◯ | 100 | 0 | 0 |

[*1]◯: Elongation of 80% or more, Δ: Elongation of less than 80%, X: Elongation of less than 60%
[*2]CF: Cohesion fracture, TCF: Thin-coated fracture, AF: Adhesion fracture

TABLE S3

| | Unsaturated compound capable of reacting with oxygen in air (Addition rate) | Photopolymerizable Material (Addition rate) | Base materials | Elongation at max. load[*1] | Fractured morphologies (%)[*2] | | |
|---|---|---|---|---|---|---|---|
| | | | | | CF | TCF | AF |
| COMPARATIVE EXAMPLE S1 | Not used | Not used | Float glass | Δ | 100 | 0 | 0 |
| | | | Heat ray reflective glass: KLS | Δ | 100 | 0 | 0 |
| EXAMPLE S6 | Not used | AronixM400 (3 parts) | Float glass | Δ | 100 | 0 | 0 |
| | | | Heat ray reflective glass: KLS | ◯ | 100 | 0 | 0 |
| EXAMPLE S7 | Not used | AronixM400 (6 parts) | Heat ray reflective glass: KLS | Δ | 100 | 0 | 0 |
| EXAMPLE S8 | China wood oil(6 parts) | Not used | Float glass | ◯ | 100 | 0 | 0 |
| | | | Heat ray reflective glass: KLS | Δ | 100 | 0 | 0 |
| EXAMPLE S9 | China wood oil(6 parts) | AronixM400 (3 parts) | Float glass | ◯ | 100 | 0 | 0 |
| | | | Heat ray reflective glass: KLS | ◯ | 100 | 0 | 0 |

[*1]◯: Elongation of 80% or more, Δ: Elongation of less than 80%, X: Elongation of less than 60%
[*2]CF: Cohesion fracture, TCF: Thin-coat fracture, AF: Adhesion fracture Reference Production Example A 500 mL pressure-resistant glass reactor was charged, after it was equipped with a 3-way cock and purged inside with nitrogen, 54 mL of ethyl cyclohexane (dried by molecular sieves 3A at least for a night), 126 mL of toluene (also dried by molecular sieves 3A at least for a night) and 1.16 g (5.02 mmols) of p-DCC represented by the following formula by a syringe.

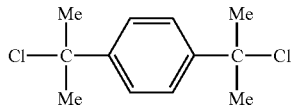

Next, a pressure-resistant glass-made liquefied gas collecting tube equipped with a needle valve and containing 56 mL of isobutylene monomer was connected to the 3-way cock. Then the reactor for polymerization was immersed in a dry ice/ethanol bath kept at −70° C. to cool the solution, and evacuated to a vacuum. It was then charged with isobutylene monomer from the liquefied gas collecting tube by opening the needle valve, and returned back to the normal pressure through introducing a nitrogen gas by handling the 3-way cock. The reactor was charged with 0.093 g (1.0 mmol) of 2-methylpyridine and then with 1.65 mL (15.1 mmols) of titanium tetrachloride, to initiate the polymerization. After a lapse of 70 minutes, 1.22 g (10.8 mmols) of allyl trimethylsilane was added to the reactor to introduce the allyl group at the polymer terminal. After a lapse of 120 minutes for the reaction, the reaction solution was washed 4 times each with 200 mL of water, and the solvent was distilled off to obtain the isobutylene-based polymer with the allyl group at the terminal.

Next, 40 g of the isobutylene-based polymer with the allyl group at the terminal thus obtained was dissolved in 20 mL of n-heptane, and the mixture was heated to around 70° C., to which 1.5 [eq/vinyl group] of methyl dimethoxysilane and $1×10^{-4}$ [eq/vinyl group] of a platinum/vinyl siloxane complex were added, for the hydrosilylation. The reaction was followed by FT-IR. The olefin absorption at 1640 cm$^{-1}$ disappeared in around 4 hours.

The reaction solution was concentrated under a vacuum, to produce the isobutylene polymer with the reactive silicon groups at both terminals, represented by the following formula:

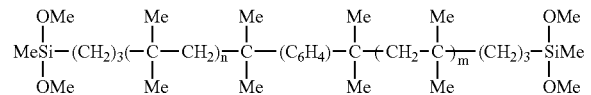

The polymer yield was estimated from the quantity produced. It was also analyzed for Mn and Mw/Mn by GPC, and the terminal structure by comparing the intensities of the 300 MHz $^1$H-NMR-analyzed resonance signals of proton relevant to each structure (proton derived from the initiator: 6.5 to 7.5 ppm, methyl proton bonded to the silicon atom, derived from the polymer terminal: 0.0 to 0.1 ppm, and methoxy proton: 3.4 to 3.5 ppm) with each other.

The $^1$H-NMR analysis was conducted using a Varian Gemini 300 (300 MHz for $^1$H) in CDCl$_3$.

The FT-IR analysis was conducted by an IR analyzer (Shimadzu IR-408), and GPC analysis was conducted with a Waters LC Module 1 as the liquid sending system and Shodex K-804 as the column. The molecular weight was the one relative to the polystyrene standard. The polymer thus prepared had an Mn of 11,400, Mw/Mn of 1.23 and Fn (silyl) of 1.76, wherein the number-average molecular weight was as polystyrene, and the number of the terminal silyl functional group was that per 1 mol of isobutylene polymer.

Reference Examples S1 to S5

A mixture containing the polymer prepared in REFERENCE PRODUCTION EXAMPLE was prepared for each of REFERENCE EXAMPLES S1 to S5. It was composed of 100 parts of the polymer, 90 parts of a paraffin-based process oil (Idemitsu Kosan, Diana Process Oil PS-32™), 30 parts of limestone powder (Maruo Calcium, Snowlite SS™), 100 parts of colloidal calcium carbonate (Shiraishi K. K., EDS-D10A™), 100 parts of talc (Fuji Talc Kogyo, Talc LMR™), 6 parts of Na$_2$SO$_4$.10H$_2$O, 6 parts of china wood oil as the compound and component (V) for the present invention having an unsaturated group polymerizable on reacting with oxygen in air, 3 parts of dipentaerythritol penta- and hexaacrylate as the photopolymerizable compounds (TOAGOSEI, Aronix M-400™), and a tackifier given in Table S4 in a quantity also given in Table S4, all parts by weight. Each mixture was well kneaded by a 3-paint roll unit, to produce the major ingredient for each example.

The tackifiers used in REFERENCE EXAMPLES S3 to S5 were γ-glycidoxypropyltrimethoxysilane (Nippon Unicar, Silane coupling agent A-187™) as the silane coupling agent and/or γ-isocyanatepropyltriethoxysilane (Nippon Unicar, Silane coupling agent Y-9030™) in quantities given in Table S1. REFERENCE EXAMPLE S1 used no tackifier, while REFERENCE EXAMPLE S2 used 4 parts by weight of an epoxy resin as the tackifier containing no hydrolyzable silicon group (except the silane coupling agent) (Yuka Shell Epoxy, Epikote #828™).

The curing agent was prepared by the following procedure: a mixture comprising 10 parts of a paraffin-based process oil (Idemitsu Kosan, Diana Process Oil PS-32™), 20 parts of limestone powder (Maruo Calcium, Snowlite SS™), 4 parts of a curing catalyst (NITTO KASEI, U-220™), and 2.5 parts of carbon black (Mitsubishi Chemical, CB#30™), all parts by weight, was manually kneaded in a disposal cup and stirred 3 times at 10,000 rpm each for 10 minutes by a homogenizer (Nihon Seiki Sesakusho Co., Ltd., Excel Auto Homogenizer).

The test piece was prepared in accordance with JIS A-5758/1992 for the tensile adhesion test; 12 parts by weight of the major ingredient and 1 part by weight of the curing agent were well kneaded, and the resultant mixture was put in the H-shape of glass base while breaking the bubbles in the composition by a spatula and cured in an oven under the conditions of 23° C.×1 day+50° C.×5 days for each composition. The substrate for the H-type tensile test was of float glass (Koen-sha, designated by Japan Sealant Industry Association, 3 by 5 by 0.5 cm in size) in accordance with JIS A-5758/1992, or heat ray reflective glass (Central Glass, KLS™, 5 by 5 by 0.6 cm in size) coated with thermally fused TiOx. Each of these H-shaped bases was washed with methylethylketone (Wako-Junyaku, special grade) and wiped with clean cotton cloth, before it was filled with the composition. It was not coated with a primer.

The H-shape test piece thus prepared for the tensile test was tested after it was cured in the absence of primer by the method of testing tensile adhesion in accordance with JIS A-5758/1992. The test was conducted at a tensile speed of 50 mm/minute by an autograph (Shimadzu, Autograph AG-2000A) in a constant-temperature chamber kept at 23° C. and 50±10% RH, to evaluate adhesion in the absence of a primer by comparing the tensile characteristics with fractured morphology. The results are given in Table S4, where the cohesion fracture (CF)/thin-coat fracture (TCF)/adhesion fracture (AF) ratio was determined by visual observation of the cross-sections of each tensile-tested piece.

Curing speed and resistance to weather were measured in REFERENCE EXAMPLES S3 to S5 in the same manner as in EXAMPLES S1 to S3. The results are given in Table S7.

weight. It was also incorporated with china wood oil as the compound and component (V) for the present invention having an unsaturated group polymerizable on reacting with oxygen in air, and dipentaerythritol penta- and hexa-acrylate as the photopolymerizable compounds (TOAGOSEI, Aronix M-400™) in a quantity given in Table S5. Each mixture was well kneaded by a 3-paint roll unit, to produce the major ingredient for each example.

The curing agent was prepared by the following procedure: a mixture comprising 10 parts of a paraffin-based process oil (Idemitsu Kosan, Diana Process Oil PS-32™), 20 parts of limestone powder (Maruo Calcium, Snowlite SS™), 4 parts of a curing catalyst (NITTO KASEI, U-22™), and 2.5 parts of carbon black (Mitsubishi Chemical, CB#30™), all parts by weight, was manually kneaded in a disposal cup and stirred 3 times at 10,000 rpm each for 10 minutes by a homogenizer (Nihon Seiki Sesakusho Co., Ltd., Excel Auto Homogenizer).

TABLE S4

| | Tackifier | | Elongation at | Fractured morphologies (%)[*2] | | |
|---|---|---|---|---|---|---|
| | (Addition rate) | Base materials | max. load[*1] | CF | TCF | AF |
| REFERENCE EXAMPLE S1 | Not used | Float glass | X | 0 | 0 | 100 |
| | | Heat ray reflective glass: KLS | X | 0 | 0 | 100 |
| REFERENCE EXAMPLE S2 | Epikote 828 (4 parts) | Float glass | X | 0 | 0 | 100 |
| | | Heat ray reflective glass: KLS | X | 0 | 0 | 100 |
| REFERENCE EXAMPLE S3 | A-187 (4 parts) | Float glass | ○ | 100 | 0 | 0 |
| | | Heat ray reflective glass: KLS | ○ | 100 | 0 | 0 |
| REFERENCE EXAMPLE S4 | Y-9030 (4 parts) | Float glass | Δ | 100 | 0 | 0 |
| | | Heat ray reflective glass: KLS | Δ | 100 | 0 | 0 |
| REFERENCE EXAMPLE S5 | A-187 (2 parts) Y-9030 (4 parts) | Float glass | ○ | 100 | 0 | 0 |
| | | Heat ray reflective glass: KLS | Δ | 100 | 0 | 0 |

[*1]○: Elongation of 80% or more, Δ: Elongation of less than 80%, X: Elongation of less than 60%
[*2]CF: Cohesion fracture, TCF: Thin-coat fracture, AF: Adhesion fracture Reference Examples S6 to S10

A mixture containing the polymer prepared in REFERENCE PRODUCTION EXAMPLE was prepared for each of REFERENCE EXAMPLES S6 to S10 in the same manner as in EXAMPLES S6 to S9 and COMPARATIVE EXAMPLE S1. It was composed of 100 parts of the polymer, 90 parts of a paraffin-based process oil (Idemitsu Kosan, Diana Process Oil PS-32™), 30 parts of limestone powder (Maruo Calcium, Snowlite SS™), 100 parts of colloidal calcium carbonate (Shiraishi K. K., EDS-D10A™), 100 parts of talc (Fuji Talc Kogyo, Talc LMR™), 6 parts of $Na_2SO_4 \cdot 10H_2O$, 3 parts of nickel dimethyldithiocarbamate (Sanshin Kagaku Kogyo, Sandant NBC™) as the light stabilizer, 3 parts of nickel [2,2'-thiobis(4-t-octylphenolate)]-n-butylamine (ACC, CYASORB UV-1084), 1 part of antioxidant (Ciba-Geigy Japan, Irganox 1010™), 1 part of ultraviolet ray absorber (Ciba-Geigy Japan, Tinuvin 327™), 1 part of light stabilizer (Sankyo, Sanol LS-770™), and 2 parts of γ-glycidoxypropyltrimethoxysilane (Nippon Unicar, Silane coupling agent A-187™) as the silane coupling agent and 4 parts of γ-isocyanatepropyltriethoxysilane (Nippon Unicar, Silane coupling agent Y-9030™), all parts by The H-shaped test piece was prepared in the same manner as in the above, except that it was cured under the conditions of 23° C.×7 days+50° C.×7 days. The H-type tensile test piece, put in a Sunshine superlong-life weathermeter (Suga Shikenki, WEL-SUN-HC) with black panel temperature kept at 63° C., was exposed to light emitted from sunshine carbon as the light source in the weather resistance tester (SWOM) for a time given in Table S5, and taken out from the tester to be tested for tensile adhesion. Its weather-resistant adhesion was evaluated by comparing the tensile characteristics with fractured morphology. The results are given in Table S5.

The H-shaped test piece prepared as described above was also tested for tensile adhesion for reference before it was tested for weather-resistance. The results are also given in Table S6.

The composition prepared in each of REFERENCE EXAMPLES S7 to S10 was tested for curing speed and resistance to weather in the same manner as in EXAMPLES S1 to S3. The results are also given in Table S7.

TABLE S5

| | Unsaturated compound capable of reacting with oxygen in air (Addition rate) | Photopolymerizable Material (Addition rate) | Base materials | SWOM Exposure time | Elongation at max. load*[1] | Fractured morphologies (%)*[2] | | |
|---|---|---|---|---|---|---|---|---|
| | | | | | | CF | TCF | AF |
| REFERENCE EXAMPLE S6 | Not used | Not used | Float glass | 3000 | Δ | 100 | 0 | 0 |
| | | | Heat ray reflective glass: KLS | 500 | Δ | 0 | 0 | 100 |
| REFERENCE EXAMPLE S7 | Not used | AronixM400 (3 parts) | Float glass | 3000 | Δ | 100 | 0 | 0 |
| | | | Heat ray reflective glass: KLS | 600 | Δ | 70 | 0 | 30 |
| REFERENCE EXAMPLE S8 | Not used | AronixM400 (6 parts) | Heat ray reflective glass: KLS | 500 | X | 50 | 0 | 50 |
| REFERENCE EXAMPLE S9 | China wood oil(6 parts) | Not used | Float glass | 3000 | Δ | 100 | 0 | 0 |
| | | | Heat ray reflective glass: KLS | 1000 | Δ | 100 | 0 | 0 |
| REFERENCE EXAMPLE S10 | China wood oil(6 parts) | AronixM400 (3 parts) | Float glass | 3000 | Δ | 100 | 0 | 0 |
| | | | Heat ray reflective glass: KLS | 1000 | Δ | 100 | 0 | 0 |

*[1] ○: Elongation of 80% or more, Δ: Elongation of less than 80%, X: Elongation of less than 60%
*[2] CF: Cohesion fracture, TCF: Thin-coat fracture, AF: Adhesion fracture

TABLE S6

| | Unsaturated compound capable of reacting with oxygen in air (Addition rate) | Photopolymerizable Material (Addition rate) | Base materials | Elongation at max. load*[1] | Fractured morphologies (%)*[2] | | |
|---|---|---|---|---|---|---|---|
| | | | | | CF | TCF | AF |
| REFERENCE EXAMPLE S6 | Not used | Not used | Float glass | Δ | 97 | 3 | 0 |
| | | | Heat ray reflective glass: KLS | Δ | 100 | 0 | 0 |
| REFERENCE EXAMPLE S7 | Not used | AronixM400 (3 parts) | Float glass | Δ | 98 | 2 | 0 |
| | | | Heat ray reflective glass: KLS | X | 98 | 2 | 0 |
| REFERENCE EXAMPLE S8 | Not used | AronixM400 (6 parts) | Heat ray reflective glass: KLS | X | 100 | 0 | 0 |
| REFERENCE EXAMPLE S9 | China wood oil (6 parts) | Not used | Float glass | Δ | 100 | 0 | 0 |
| | | | Heat ray reflective glass: KLS | Δ | 100 | 0 | 0 |
| REFERENCE EXAMPLE S10 | China wood oil (6 parts) | AronixM400 (3 parts) | Float glass | X | 100 | 0 | 0 |
| | | | Heat ray reflective glass: KLS | X | 100 | 0 | 0 |

*[1] ○: Elongation of 80% or more, Δ: Elongation of less than 80%, X: Elongation of less than 60%
*[2] CF: Cohesion fracture, TCF: Thin-coat fracture, AF: Adhesion fracture

TABLE S7

| | Curing speed* | Resistance to weather |
|---|---|---|
| EXAMPLE S1 | ○ | No cracks or molten portion observed |
| EXAMPLE S2 | ○ | No cracks or molten portion observed |
| EXAMPLE S3 | ○ | No cracks or molten portion observed |
| EXAMPLE S6 | ○ | No cracks or molten portion observed |
| EXAMPLE S7 | ○ | No cracks or molten portion observed |
| EXAMPLE S8 | ○ | No cracks or molten portion observed |
| EXAMPLE S9 | ○ | No cracks or molten portion observed |
| REFERENCE EXAMPLE S3 | x | Cracks or molten portion observed |
| REFERENCE EXAMPLE S4 | x | Cracks or molten portion observed |
| REFERENCE EXAMPLE S5 | x | Cracks or molten portion observed |
| REFERENCE EXAMPLE S7 | x | Cracks or molten portion observed |
| REFERENCE EXAMPLE S8 | x | Cracks or molten portion observed |
| REFERENCE EXAMPLE S9 | x | Cracks or molten portion observed |
| REFERENCE EXAMPLE S10 | x | Cracks or molten portion observed |

*○: Sufficiently serviceable,
Δ: Tackiness remaining,
x: Uncured

Examples T Series

The composition, the iodine value, the intrinsic viscosity [η] and the molecular weight distribution (Mw/Mn) of the copolymer rubber used in each of EXAMPLES and COMPARATIVE EXAMPLES were determined by the methods described earlier.

Release-resisting force to silicone release paper, residual tackiness, tackiness, curing speed and weather resistance of the compositions prepared in EXAMPLES and COMPARATIVE EXAMPLES were determined by the following methods.

(1) Release-Resisting Force to Silicone Release Paper

The adhesive tape was prepared and put on a commercially available silicone release paper, to prepare the test piece. It was kept at 50° C. for 7, 14 or 21 days for the accelerated adhesion, taken out and returned back to the normal temperature, and tested for its release-resisting force, defined as the resistance of the adhesive tape when it was released by 180° from the silicone release paper at a tensile speed of 300 mm/minute.

(2) Residual Tackiness

The adhesive tape was prepared and put on a commercially available silicone release paper, to prepare the test piece. It was left at 50° C., and the adhesive tape was released, to measure its tackiness. The residual tackiness is defined as the above tackiness relative to its initial tackiness, reported in percentage.

(3) Tackiness

The adhesive tape was prepared and put on a stainless steel plate, to prepare the test piece. It was left at 23° C. for 60 minutes, and tested for its tackiness, defined as the release strength of the adhesive tape when it was released by 180° from the stainless steel plate at a tensile speed of 300 mm/minute at 23° C.

(4) Curing Speed

The curable composition was cured at 23° C. and 50% RH for 24 hours in a mold (20 by 80 by 5 mm in size).

The cured composition was released from the mold, and thickness of the cured portion of the composition was measured by a dial gauge of weak spring force to 0.1 mm. It was marked with ○ when its thickness was 1 mm or more, and × when it was less than 1 mm.

Moreover, the time required for the composition to be cured under the conditions of 120° C. and 50% RH was measured. The composition was marked with ○ when it was cured in less than 5 minutes, Δ when it was cured in 5 to 10 minutes, and × when it was cured in more than 10 minutes.

(5) Weather Resistance Test

The weather resistance test was conducted in accordance with JIS B-7753 using a Sunshine Carbon Arc weatherometer, to determine resistance to weather:

<Testing Conditions>
Light irradiation/rainfall cycles: Irradiation for 120 minutes/rainfall for 18 minutes
Black panel temperature: 63±2° C.
Tank inside temperature: 40±2° C.
Total light irradiation time: 500 hours Production Example T1

[Production of Silyl-containing ethylene/propylene/5-vinyl-2-norbornene Random Copolymer Rubber (A-1)]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, $VO(OEt)_2Cl$ and $Al(Et)_{1.5}Cl_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber ($A_0$-1) in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber thus produced contained ethylene at 68% by mol, and had an iodine value of 10 (g/100 g), an intrinsic viscosity [η], as measured in decalin kept at 135° C., of 0.2 dl/g, and Mw/Mn of 15.

Two % toluene solution (0.3 g) of chloroplatinic acid and 1.5 g of methyldimethoxysilane were added to 100 g of the ethylene/propylene/5-vinyl-2-norbornene random copolymer rubber ($A_0$-1), and they were allowed to react with each other at 120° C. for 2 hours. The excess methyldimethoxysilane and the solvent (toluene) were distilled off from the effluent. This produced 101.5 g of the
    ethylene/propylene/5-vinyl-2-norbornene random copolymer rubber (A-1) containing dimethoxymethylsilyl group ($-SiCH_3(OCH_3)_2$).

Production Example T2

Eight hundred grams of a polypropylene oxide (produced from polypropylene glycol as the starting material) with allyl ether group at 98% of the total terminals and having an average molecular weight of around 8,000, was charged in an agitator-equipped, pressure-resistant reactor, to which 20 g of methyldimethoxysilane was added, and then 0.34 mL of a catalyst solution of chloroplatinic acid (8.9 g of $H_2PtCl.6H_2O$ dissolved in 18 mL of isopropyl alcohol and 160 mL of tetrahydrofuran) was added, and they were allowed to react with each other at 80° C. for 6 hours.

The unreacted silane was quantitatively analyzed by gas chromatography and infrared analysis, to find the conversion rate. The results indicated that a polypropylene oxide with the following group at 84% of its total terminals was produced:

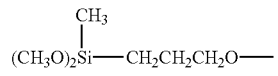

Production Example T3

Tetra-n-butoxy zirconium, 38.3 g (0.1 mol) was dissolved in 88 g of toluene, to which 10.0 g (0.1 mol) of acetylacetone was added slowly with stirring. This produced tri-n-butoxy zirconium acetylacetonate, accompanied by generation of heat. The mixed toluene solution is hereinafter referred to as the PRODUCTION EXAMPLE 3 Catalyst.

Production Example T4

Tetra-n-butoxy zirconium, 38.3 g (0.1 mol) was dissolved in 87 g of toluene, to which 20.0 g (0.2 mol) of acetylacetone was added slowly with stirring. This produced di-n-butoxy zirconium bisacetylacetonate, accompanied by generation of heat. The mixed toluene solution is hereinafter referred to as the PRODUCTION EXAMPLE 4 Catalyst.

Production Example T5

Tetra-n-butoxy zirconium, 38.8 g (0.1 mol) was dissolved in 86 g of toluene, to which 30.0 g (0.3 mol) of acetylacetone was added slowly with stirring. This produced di-n-butoxy zirconium trisacetylacetonate, accompanied by generation of heat. The mixed toluene solution is hereinafter referred to as the PRODUCTION EXAMPLE 5 Catalyst.

Production Example T6 n-Butyl acrylate, 128 g (1.0 mol), 3.48 g (0.015 mol) of γ-methacryloxypropylmethyldimethoxysialne, 2.46 g (0.015 mol) of γ-mercaptopropylmethyldimethoxysilane and 0.25 g of α,α'-azobisisobutylonitrile were mixed and dissolved, and 30 g of the resultant mixed solution was charged in a 300 mL four-mouthed flask purged with nitrogen gas and slowly heated with stirring in an oil bath kept at 70° C. This soon started the polymerization, which was accompanied by generation of heat and thickening of the reaction solution. The remaining mixed solution was slowly added with stirring to the reaction solution dropwise over 2.5 hours via the drip-feed funnel. The reaction solution was continuously stirred for 1 hour after completion of the addition of the mixed solution, to complete the polymerization. This produced a colorless, transparent, viscous substance having a viscosity of 350P (23° C.) at a polymerization rate of 97%.

Examples T1 to T9

The silyl-containing ethylene/propylene/5-vinyl-2-norbornene random copolymer rubber (A-1), prepared in PRODUCTION EXAMPLE T1, 100 parts by weight, was incorporated with 80 parts by weight of the tackifier resin given in Table T1, to prepare the toluene solution containing the solids at 80% for each of EXAMPLES T1 to T9.

The solution was incorporated with the curing catalyst given in Table T1, and the resultant composition was spread over a 25 μm thick polyester substrate (Toray Industries, Lumirror Film) by a coater to a thickness of 25 μm (on a dry basis), and cured at 120° C. for 0.5 to 5 minutes by a drier.

The resultant adhesive tape was measured for its releasability from a silicone release paper (Soken Industries, Inc., EK-130R). Its curing speed and resistance to weather were evaluated by the curing speed and weather resistance tests conducted according to the methods described earlier. The results are given in Table T1.

In Table T1, YS Polyster T-115 and YS Polyster S-145 are terpene phenolic resins (Yasuhara Yushi Kogyo), and Stepelite Ester 7 is a hydrogenated rosin ester resin (Hercules). $Zr(acac)_4$ in Table T1 is zirconium tetraacetylacetonate.

TABLE T1

| EXAMPLES | Tackifier resin | Curing catalysts Types | Content (parts by weight) | Curing Speed at 120° C. | Exfoliation resisting force [g/cm] 50° C. × 7 days | 50° C. × 14 days | 50° C. × 21 days | Adhesive force (initial) [g/cm] | Residual adhesion rate [%] 50° C. × 7 days | 50° C. × 14 days | 50° C. × 21 days | Curing speed at room temperature | Resistance to weather *4 |
|---|---|---|---|---|---|---|---|---|---|---|---|---|---|
| T1 | YS Polyster T-115 | PRODUCTION EXAMPLE 3 Catalyst *1 | 5 | ○ | 4 | 3 | 2 | 430 | 94 | 96 | 92 | ○ | ◉ |
| T2 | YS Polyster T-115 | PRODUCTION EXAMPLE 4 Catalyst *2 | 5 | ○ | 3 | 5 | 3 | 440 | 92 | 94 | 94 | ○ | ◉ |
| T3 | YS Polyster T-115 | PRODUCTION EXAMPLE 5 Catalyst *3 | 5 | ○ | 4 | 4 | 3 | 420 | 97 | 99 | 98 | ○ | ◉ |
| T4 | YS Polyster S-145 | PRODUCTION EXAMPLE 5 Catalyst *3 | 5 | ○ | 4 | 4 | 3 | 800 | 98 | 99 | 96 | ○ | ◉ |
| T5 | Stepelite Ester 7 | PRODUCTION EXAMPLE 5 Catalyst *3 | 5 | ○ | 2 | 2 | 3 | 220 | 90 | 88 | 87 | ○ | ◉ |
| T6 | YS Polyster T-115 | $Zr(acac)_4$ | 5 | ○ | 4 | 3 | 2 | 410 | 86 | 84 | 82 | ○ | ◉ |
| T7 | YS Polyster T-115 | $(n-BuO)_4Zr$ | 5 | ○ | 5 | 5 | 6 | 400 | 87 | 85 | 86 | ○ | ◉ |
| T8 | YS Polyster T-115 | $Al(acac)_3$ | 5 | ○ | 3 | 4 | 4 | 390 | 90 | 88 | 87 | ○ | ◉ |
| T9 | YS Polyster T-115 | Diisopropoxy Al ethylacetoacetate | 5 | ○ | 6 | 6 | 5 | 405 | 88 | 90 | 90 | ○ | ◉ |

*1: As $(n-BuO)_3Zr(acac)$,
*2: As $(n-BuO)_2Zr(acac)_2$,
*3: As $(n-BuO)Zr(acac)_3$,
*4: Evaluation standards for resistance to weather, ◉: No change observed, ○: Cracks or molten portion slightly observed, Δ: Cracks or molten portion observed, and X: Cracks or molten portion extensively observed Reference Examples T1 to T9

The polyalkylene oxide containing the hydrolysable silicon group, prepared in PRODUCTION EXAMPLE T2, 100 parts by weight was incorporated with 80 parts by weight of the tackifier resin given in Table T2, to prepare the toluene solution containing the solids at 80% for each of REFERENCE EXAMPLES T1 to T9.

The solution was incorporated with the curing catalyst given in Table T2, and the resultant composition was spread over a 25 μm thick polyester substrate (Toray Industries, Lumirror Film) by a coater to a thickness of 25 μm (on a dry basis), and cured at 120° C. for 1 to 19 minutes by a drier.

The resultant adhesive tape was measured for its releasability from a silicone release paper (Soken Industries, Inc., EK-130R). Its curing speed and resistance to weather were evaluated by the curing speed and weather resistance tests conducted according to the methods described earlier. The results are given in Table T2.

In Table T2, YS Polyster T-115 and YS Polyster S-145 are terpene phenolic resins (Yasuhara Yushi Kogyo), and Stepelite Ester 7 is a hydrogenated rosin ester resin (Hercules).

$Zr(acac)_4$ in Table T2 is zirconium tetraacetylacetonate.

Comparative Examples T1 to T3

The adhesive tape was prepared for each of COMPARATIVE EXAMPLES T1 to T3 in the same manner as in COMPARATIVE EXAMPLE T1, except that the organotin compound as the curing catalyst was used, as shown in Table T2, and measured for its releasability. Its curing speed and resistance to weather were evaluated by the curing speed and weather resistance tests conducted according to the methods described earlier. The results are given in Table T2.

TABLE T2

| | | Curing catalysts | | | Exfoliation resisting force [g/cm] | | | | Residual adhesion rate [%] | | | | |
|---|---|---|---|---|---|---|---|---|---|---|---|---|---|
| | Tackifier resin | Types | Content (parts by weight) | Curing Speed at 120° C. | 50° C. × 7 days | 50° C. × 14 days | 50° C. × 21 days | Adhesive force (initial) [g/cm] | 50° C. × 7 days | 50° C. × 14 days | 50° C. × 21 days | Curing speed | Resistance to weather *4 |
| REFERECE EXAMPLE T1 | YS Polyster T-115 | PRODUCTION EXAMPLE 3 Catalyst *1 | 5 | ○ | 3 | 3 | 2 | 360 | 90 | 92 | 90 | ○ | Δ |
| REFERECE EXAMPLE T2 | YS Polyster T-115 | PRODUCTION EXAMPLE 4 Catalyst *2 | 5 | ○ | 2 | 4 | 3 | 365 | 89 | 92 | 92 | ○ | Δ |
| REFERECE EXAMPLE T3 | YS Polyster T-115 | PRODUCTION EXAMPLE 5 Catalyst *3 | 5 | ○ | 2 | 3 | 3 | 360 | 94 | 97 | 95 | ○ | Δ |
| REFERECE EXAMPLE T4 | YS Polyster S-145 | PRODUCTION EXAMPLE 5 Catalyst *3 | 5 | ○ | 3 | 3 | 4 | 750 | 92 | 93 | 91 | ○ | X to Δ |
| REFERECE EXAMPLE T5 | Stepelite Ester 7 | PRODUCTION EXAMPLE 5 Catalyst *3 | 5 | ○ | 3 | 3 | 3 | 160 | 84 | 80 | 78 | ○ | Δ |
| REFERECE EXAMPLE T6 | YS Polyster T-115 | $Zr(acac)_4$ | 5 | ○ | 2 | 3 | 3 | 360 | 74 | 78 | 74 | ○ | Δ |
| REFERECE EXAMPLE T7 | YS Polyster T-115 | $(n\text{-}BuO)_4Zr$ | 5 | Δ | 4 | 4 | 5 | 370 | 77 | 76 | 75 | ○ | X |
| REFERECE EXAMPLE T8 | YS Polyster T-115 | $Al(acac)_3$ | 5 | ○ | 2 | 3 | 3 | 350 | 80 | 78 | 81 | ○ | Δ |
| REFERECE EXAMPLE T9 | YS Polyster T-115 | Diisopropoxy Al ethylacetoacetate | 5 | ○ | 5 | 6 | 6 | 375 | 78 | 80 | 80 | ○ | Δ |
| COMPARATIVE EXAMPLE T1 | YS Polyster T-115 | Dibutyl tin dilaurate | 5 | X | 260 | Immeasurable | Immeasurable | 365 | 50 | — | — | X | X |
| COMPARATIVE EXAMPLE T2 | YS Polyster T-115 | Dibutyl tin monononyl phenolate | 5 | ○ | 250 | Immeasurable | Immeasurable | 360 | 34 | — | — | ○ | X |

TABLE T2-continued

| | Tackifier resin | Curing catalysts | | Curing Speed at 120° C. | Exfoliation resisting force [g/cm] | | | Adhesive force (initial) [g/cm] | Residual adhesion rate [%] | | | Curing speed | Resistance to weather *4 |
|---|---|---|---|---|---|---|---|---|---|---|---|---|---|
| | | Types | Content (parts by weight) | | 50° C. × 7 days | 50° C. × 14 days | 50° C. × 21 days | | 50° C. × 7 days | 50° C. × 14 days | 50° C. × 21 days | | |
| COMPARATIVE EXAMPLE T3 | YS Polyster T-115 | Dibutyl tin dimethoxide | 5 | ○ | 240 | Immeasurable | Immeasurable | 355 | 32 | — | — | ○ | X |

*1: As (n-BuO)₃Zr(acac),
*2: As (n-BuO)₂Zr(acac)₂,
*3: As (n-BuO)Zr(acac)₃,
*4: Evaluation standards for resistance to weather, ⊚: No change observed, ○: Cracks or molten portion slightly observed, Δ: Cracks or molten portion observed, and X: Cracks or molten portion extensively observed As shown in Table T2, the adhesive tape with the composition prepared in each of REFERENCE EXAMPLES T1 to T9 has better releasability from the silicone release paper than that with the composition prepared in each of COMPARATIVE EXAMPLES T1 to T3.

Reference Examples T10 to T15

The acrylate copolymer containing the hydrolysable silicon group, prepared in PRODUCTION EXAMPLE T6, 100 parts by weight, was incorporated with 50 parts by weight of YS Polyster T-115, to prepare the toluene solution containing the solids at 80% for each of REFERENCE EXAMPLES T10 to T15.

The solution was incorporated with the curing catalyst given in Table T3, and the resultant composition was spread over a 25 μm thick polyester substrate (Toray Industries, Lumirror Film) to a thickness of 25 μm (on a dry basis), and cured at 120° C. for 3 minutes to prepare the adhesive tape.

The resultant adhesive tape was measured for its releasability from a silicone release paper in the same manner as in COMPARATIVE EXAMPLE T1. Its curing speed and resistance to weather were evaluated by the curing speed and weather resistance tests conducted according to the methods described earlier. The results are given in Table T3.

Comparative Examples T4 and T5

The adhesive tape was prepared for each of COMPARATIVE EXAMPLES T4 and T5 in the same manner as in REFERENCE EXAMPLE T10, except that the curing catalyst was replaced by the organotin compound shown in Table T3, and measured for its releasability. Its curing speed and resistance to weather were evaluated by the curing speed and weather resistance tests conducted according to the methods described earlier. The results are given in Table T3.

TABLE T3

| | Curing catalysts | | Exfoliation resisting force [g/cm] | | | Adhesive force (initial) [g/cm] | Residual adhesion rate [%] | | | Curing speed [ordinary temperature] | Resistance to weather *4 |
|---|---|---|---|---|---|---|---|---|---|---|---|
| | Types | Content (parts by weight) | 50° C. × 7 days | 50° C. × 14 days | 50° C. × 21 days | | 50° C. × 7 days | 50° C. × 14 days | 50° C. × 21 days | | |
| REFERENCE EXAMPLE T10 | PRODUCTION EXAMPLE 3 Catalyst*1 | 5 | 3 | 3 | 3 | 320 | 84 | 80 | 81 | ○ | Δ to X |
| REFERENCE EXAMPLE T11 | PRODUCTION EXAMPLE 4 Catalyst*2 | 5 | 3 | 2 | 3 | 330 | 78 | 79 | 81 | ○ | Δ to X |
| REFERENCE EXAMPLE T12 | PRODUCTION EXAMPLE 5 Catalyst*3 | 5 | 2 | 3 | 3 | 315 | 82 | 82 | 80 | ○ | Δ to X |
| REFERENCE EXAMPLE T13 | Zr(acac)₄ | 5 | 3 | 4 | 4 | 340 | 77 | 76 | 77 | ○ | Δ to X |
| REFERENCE EXAMPLE T14 | Al(acac)₃ | 5 | 4 | 6 | 5 | 355 | 79 | 79 | 80 | ○ | Δ |
| REFERENCE EXAMPLE T15 | Diisopropoxy Al ethylacetoacetate | 5 | 3 | 4 | 4 | 345 | 80 | 81 | 81 | ○ | Δ |
| COMPARATIVE EXAMPLE T4 | Dibutyl tin dilaurate | 5 | 120 | 250 | — | 360 | 45 | 33 | — | ○ | X |

TABLE T3-continued

| | Curing catalysts | | Exfoliation resisting force [g/cm] | | | | Residual adhesion rate [%] | | | | |
|---|---|---|---|---|---|---|---|---|---|---|---|
| | Types | Content (parts by weight) | 50° C. × 7 days | 50° C. × 14 days | 50° C. × 21 days | Adhesive force (initial) [g/cm] | 50° C. × 7 days | 50° C. × 14 days | 50° C. × 21 days | Curing speed [ordinary temperature] | Resistance to weather *4 |
| COMPARATIVE EXAMPLE T5 | Dibutyl tin mono-nonylpheonolate | 5 | 65 | 170 | — | 355 | 38 | 24 | — | ◯ | X |

*1: As (n-BuO)$_3$Zr(acac),
*2: As (n-BuO)$_2$Zr(acac)$_2$,
*3: As (n-BuO)Zr(acac)$_3$,
*4: Evaluation standards for resistance to weather, ⊚: No change observed, ◯: Cracks or molten portion slightly observed, Δ: Cracks or molten portion observed, and X: Cracks or molten portion extensively observed Examples U Series The composition, the iodine value, the intrinsic viscosity [η] and the molecular weight distribution (Mw/Mn) of the copolymer rubber used in each of EXAMPLES and REFERENCE EXAPLES were determined by the methods described earlier.

The gel fraction measurement and weather resistance tests in EXAMPLES and REFERENCE EXAMPLES were conducted according to the following methods.

(1) Gel Fraction Measurement Test

The cured coating film was immersed in acetone kept at 20° C. for 24 hours, to find the weight of its undissolved portion relative to the film weight before the test. It was marked with × when it was less than 60%, Δ when it was 60% or more but less than 80%, ◯ when it was 80% or more but less than 90%, and ⊚ when it was 90% or more.

(2) Weather Resistance Test

The weather resistance test was conducted in accordance with JIS B-7753 using a Sunshine Carbon Arc weatherometer, to determine resistance to weather:

<Testing Conditions>
Light irradiation/rainfall cycles: Irradiation for 120 minutes/rainfall for 18 minutes
Black panel temperature: 63±2° C.
Tank inside temperature: 40±2° C.
Total light irradiation time: 250 hours <Evaluation Standards for Resistance to Weather>
◯: No cracks or molten portion observed on one side of the tested piece
Δ: Cracks or molten portion observed slightly on one side of the tested piece
×: Cracks or molten portion observed on one side of the tested piece Example U

[Production of Silyl-containing ethylene/propylene/5-vinyl-2-norbornene Random Copolymer Rubber (A-1)]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, VO(OEt)$_2$Cl and Al(Et)$_{1.5}$Cl$_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber (A$_0$-1) in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber (A$_0$-1) thus produced contained ethylene at 68% by mol, and had an iodine value of 10 (g/100 g), an intrinsic viscosity [η], as measured in decalin at 135° C., of 0.2 dl/g, and Mw/Mn of 15.

Two % toluene solution (0.3 g) of chloroplatinic acid and 1.5 g of methyldimethoxysilane were added to 100 g of the ethylene/propylene/5-vinyl-2-norbornene random copolymer rubber (A$_0$-1), and they were allowed to react with each other at 120° C. for 2 hours. The excess methyldimethoxysilane and the solvent (toluene) were distilled off from the effluent. This produced 101.5 g of the
  ethylene/propylene/5-vinyl-2-norbornene   random copolymer rubber (A-1) containing dimethoxymethylsilyl group (—SiCH$_3$(OCH$_3$)$_2$).

Reference Example U1

A solution of 2 g of azobisisobutylonitrile dissolved in 30 g of styrene, 16 g of allyl methacrylate, 20 g of methyl methacrylate, 19 g of n-butyl methacrylate, 14 g of butyl acrylate, 4 g of maleic anhydride and 2 g of n-dodecylmercaptan was added dropwise in 90 g of xylene as the solvent kept at 90° C., and these compounds were allowed to react with each other for 10 hours, to obtain the vinyl-based polymer having a molecular weight of 8,000 and containing an allyl type unsaturated group. The polymer had absorptions relevant to the carbon-carbon double bond and acid anhydride at 1648 and 1780 cm$^{-1}$, respectively, in the infrared absorption spectral pattern. The polymer solution was distilled under a vacuum to remove 40 g of the solvent.

A solution of 1.5 g of trimethoxysilane and 0.0005 g of chloroplatinic acid dissolved in isopropanol was added to 16 g of the vinyl-based polymer having an allyl type unsaturated group, and they were allowed to react with each other at 90° C. for 6 hours in a sealed system. The reaction product had no infrared absorption at 1648 cm$^{-1}$ in the infrared absorption spectral pattern, from which it was judged that silyl-containing vinyl-based polymer was produced.

Reference Example U2

A solution of 2 g of azobisisobutylonitrile dissolved in 30 g of styrene, 22 g of γ-methacryloxypropyltrimethoxysilane, 22 g of methyl methacrylate, 15 g of n-butyl methacrylate and 18 g of butyl acrylate was added dropwise in 70 g of xylene as the solvent kept at 90° C., and these compounds were allowed to react with each other for 10 hours, to obtain the silyl-containing vinyl-based polymer having a molecular weight of 16,000.

Reference Example U3

A solution of 2 g of azobisisobutylonitrile dissolved in 30 g of styrene, 22 g of γ-methacryloxypropyltrimethoxysilane, 22 g of methylmethacrylate, 15 g of n-butyl methacrylate, 18 g of butyl acrylate and 2 g of n-dodecylmercaptan was added dropwise in 70 g of xylene as the solvent kept at 90° C., and these compounds were allowed to react with each other for 10 hours, to obtain the silyl-containing vinyl-based polymer having a molecular weight of 9,000.

Reference Example U4

A solution of 2 g of azobisisobutylonitrile dissolved in 30 g of styrene, 22 g of γ-methacryloxypropyltrimethoxysilane, 52 g of methylmethacrylate, 15 g of n-butyl methacrylate, 18 g of butyl acrylate, 4 g of acrylamide, 10 g of n-butanol and 4 g of n-dodecylmercaptan was added dropwise in 70 g of xylene as the solvent kept at 70° C., and these compounds were allowed to react with each other for 10 hours, to obtain the silyl-containing vinyl-based polymer having a molecular weight of 6,000.

Reference Example U5

A solution of 2 g of azobisisobutylonitrile dissolved in 30 g of styrene, 22 g of γ-methacryloxypropyltrimethoxysilane, 22 g of methyl methacrylate, 15 g of n-butyl methacrylate, 18 g of butyl acrylate, 4 g of 2-hydroxyethyl methacrylate and 4 g of n-dodecylmercaptan was added dropwise in 70 g of xylene as the solvent kept at 90° C., and these compounds were allowed to react with each other for 10 hours, to obtain the silyl-containing vinyl-based polymer having a molecular weight of 6,000.

Reference Example U6

The silyl-containing vinyl-based polymer having a molecular weight of 5,000 was obtained in the same manner as in REFERENCE EXAMPLE U4, except that 4 g of n-dodecylmercaptan and 4 g of 2-hydroxyethyl methacrylate in REFERENCE EXAMPLE U5 were replaced by 6 g of n-dodecylmercaptan, 4 g of acrylamide, 2 g of maleic anhydride and 10 g of n-butanol.

The resin solution obtained in each of EXAMPLE U and REFERENCE EXAMPLES U1 to U6 was incorporated with the additive(s) and the curing catalyst(s) given in Table U1, and diluted with xylene to the resin viscosity (Ford cup viscosity: 15 seconds), to measure the pot life before it was skinned or gelled under open conditions.

Moreover, the gel fraction measurement test was conducted in accordance with the above-described method for the mixture of the resin solution, obtained in each of EXAMPLE U and REFERENCE EXAMPLES U1 to U6, and the additive(s) and the curing catalyst(s) given in Table U1.

The mixture was left in a glass petri dish, 2 cm in diameter and 1.5 cm deep, to be cured at room temperature, and the cured composition was measured for resistance to weather by the above-described method.

The results are given in Table U1.

TABLE U1

| | EXAMPLE U | REFERENCE EXAMPLE U1 | REFERENCE EXAMPLE U2 | REFERENCE EXAMPLE U3 | | REFERENCE EXAMPLE U4 | REFERENCE EXAMPLE U5 | | REFERENCE EXAMPLE U6 |
|---|---|---|---|---|---|---|---|---|---|
| | | | | (1) | (2) | | (1) | (2) | |
| Curing catalyst [parts by weight] | | | | | | | | | |
| Stann JF-9B (*1) | 3 | 3 | 3 | 2.4 | — | 3 | — | — | 3 |
| Phthalic aid | — | — | — | — | — | — | — | 1 | — |
| Dibutyl tin dilaurate | — | — | — | — | — | — | 3 | 3 | — |
| Tin octylate | — | — | — | 0.6 | 1 | — | — | — | — |
| Additive [parts by weight] | | | | | | | | | |
| Methanol | 10 | 10 | 10 | — | — | — | 10 | 10 | 10 |
| Tetraethyl orthosilicate | 10 | 10 | — | 10 | 10 | — | 10 | 10 | 10 |
| Trimethyl orthoformate | — | — | — | — | — | — | — | — | 1 |
| Pot life under open conditions | 10 hrs≦ | 10 hrs≦ | 10 hrs≦ | 10 hrs≦ | Skinning in 3 hrs | 10 hrs≦ | Skinning in 3 hrs | 10 hrs≦ | 10 hrs≦ |
| Evaluation of gel fraction | ◎ | X | Δ | X | ○ | Δ | ○ | X | Δ |
| Evaluation of resistance to weather | ○ | Δ | Δ | Δ | X | Δ | X | Δ | X |

(*1) Stann JF-98: Stabilizer for vinyl chloride (Sankyo Organic Chemicals, Ltd.) Chemical formula of the major ingredient: $(n-C_4H_9-)_2Sn(-SCH_2COOR)_2$, (R: C4 to C12)
(*2) Parts by weight for the curing catalyst and additive are based on 100 parts by weight of the resin Examples V Series The composition, the iodine value, the intrinsic viscosity [η] and the molecular weight distribution (Mw/Mn) of the copolymer rubber used in each of EXAMPLES and COMPARATIVE EXAPLES were determined by the methods described earlier.

Production Example V1

Production of Silyl-containing ethylene/propylene/5-vinyl-2-norbornene Random Copolymer Rubber (A-1)

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, VO(OEt)$_2$Cl and Al(Et)$_{1.5}$Cl$_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber (A$_0$-1) in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber (A$_0$-1) thus produced contained ethylene at 68% by mol, and had an iodine value of 10 (g/100 g), an intrinsic viscosity [η], as measured in decalin at 135° C., of 0.2 dl/g, and Mw/Mn of 15.

Two % toluene solution (0.3 g) of chloroplatinic acid and 1.5 g of methyldimethoxysilane were added to 100 g of the ethylene/propylene/5-vinyl-2-norbornene random copolymer rubber (A$_0$-1), and they were allowed to react with each other at 120° C. for 2 hours. The excess methyldimethoxysilane and the solvent (toluene) were distilled off from the effluent. This produced 101.5 g of the ethylene/propylene/5-vinyl-2-norbornene random copolymer rubber (A-1) containing dimethoxymethylsilyl group (—SiCH$_3$(OCH$_3$)$_2$).

Production Example V2

[Production of Saturated Hydrocarbon-Based Polymer (D-1)]

A uniformly mixed solution of 560 mL of methylene chloride, 1,160 mL of n-hexane, 940 mg of a-methylpyridine and 22 g of p-dicumyl chloride, all dried, was formed in a four-mouthed flask equipped with an agitator and nitrogen line and cooled to −70° C., in which 570 mL of isobutylene monomer was charged under a vacuum through a molecular sieves tube.

A polymerization catalyst solution (comprising 14 mL of titanium tetrachloride and 80 mL of methylene chloride) cooled beforehand was added all at once to the above reaction solution, kept at −70° C., with stirring to initiate the polymerization reaction. The reaction solution was heated to −54° C., and then cooled to −70° C. in about 17 minutes.

About 20 minutes after the polymerization was initiated, 132 g of 1,9-decadiene was added to the reaction solution, and continuously stirred at −70° C. for 4 hours.

The yellowy turbid reaction solution thus produced was put in 3 L of warm water (around 45° C.) and stirred for around 2 hours. Then, the organic layer was separated, and washed with pure water 3 times. The resultant colorless, transparent organic layer was concentrated under a vacuum, to obtain approximately 400 g of the isobutylene oligomer with vinyl groups at both terminals.

Next, 400 g of the isobutylene oligomer with vinyl groups at both terminals was dissolved in 200 mL of n-heptane. The resultant solution was heated to around 70° C., to which 1.5 [eq/vinyl group] of methyl dimethoxysilane and 1×10$^{-4}$[eq/vinyl group] of a platinum/vinyl siloxane complex were added, for the hydrosilylation. The reaction was followed by FT-IR. The olefin absorption at 1640 cm$^{-1}$ disappeared in around 4 hours.

The reaction solution was concentrated under a vacuum, to obtain the target isobutylene oligomer (D-1) having the reactive silicon group at both terminals.

[Structural Formula]

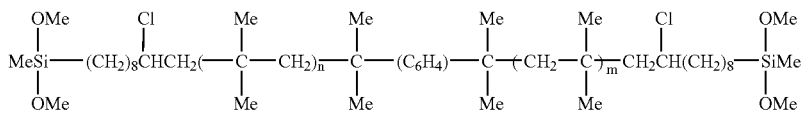

Production Example V3

[Production of Saturated Hydrocarbon-Based Polymer (D-2)]

The same procedure as used for PRODUCTION EXAMPLE V2 was repeated in PRODUCTION EXAMPLE V3, except that 1,9-decadiene was replaced by 24 g of allylmethylsilane, to obtain the isobutylene oligomer (D-2) of partly different production intermediate structure.

[Structural Formula]

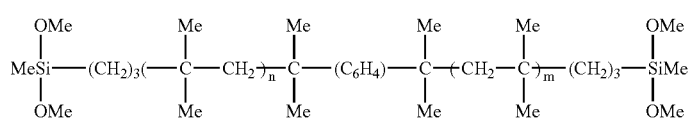

Production Example V4

[Production of Saturated Hydrocarbon-Based Polymer (D-3)]

A uniformly mixed solution of 560 mL of methylene chloride, 1,160 mL of n-hexane, 940 mg of α-methylpyridine and 22 g of p-dicumyl chloride, all dried, was formed in a four-mouthed flask equipped with an agitator and nitrogen line, and cooled to −70° C., in which 570 mL of isobutylene monomer was charged under a vacuum through a molecular sieves tube.

A polymerization catalyst solution (comprising 14 mL of titanium tetrachloride and 80 mL of methylene chloride) cooled beforehand was added all at once to the above reaction solution, kept at −70° C., with stirring to initiate the polymerization reaction. The reaction solution was heated to −54° C., and then cooled to −70° C. in about 17 minutes. The reaction solution was continuously stirred for around 60 minutes after the polymerization was initiated. The yellowy turbid reaction solution thus produced was put in 3 L of warm water (around 45° C.) and stirred for around 2 hours. Then, the organic layer was separated, and washed with pure water 3 times. The resultant colorless, transparent organic layer was concentrated under a vacuum, to obtain approximately 400 g of the isobutylene oligomer with chlorous groups at both terminals.

Then, the isobutylene oligomer was continuously heated at 170° C. under a vacuum for 2 hours for the thermal dehydrochlorination reaction, to obtain the isobutylene oligomer with isopropenyl groups at both terminals.

Next, 400 g of the isobutylene oligomer with isopropenyl groups at both terminals, prepared above, was dissolved in 200 mL of n-heptane. The resultant solution was heated in a pressure vessel to around 100° C., to which 1.5 [eq/vinyl group] of methyl dichlorosilane and $1\times10^{-4}$ [eq/vinyl group] of a platinum/vinyl siloxane complex were added, for the hydrosilylation. The reaction was followed by FT-IR. The olefin absorption at 1640 cm$^{-1}$ disappeared in around 10 hours. The reaction solution was cooled to 60° C., to which an excess quantity of methanol over methyl dichlorosilane was added, and the mixture was stirred for around 4 hours, to complete the methoxylation. The reaction solution was concentrated under a vacuum, to obtain the target isobutylene oligomer (D-3) having the structure with the reactive silicon group at both terminals.

[Structural Formula]

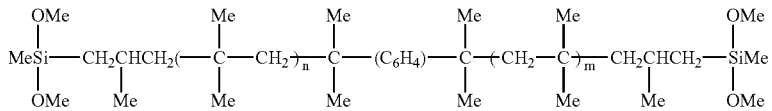

Example V1

A mixture containing the polymer (A-1) prepared in PRODUCTION EXAMPLE V1 as the silane-modified ethylene/α-olefin/non-conjugated polyene random copolymer rubber (A1) was prepared. It was composed of 100 parts of the polymer rubber (A-1), 120 parts of calcium carbonate (Shiraishi K. K., CCR™), 90 parts of a paraffin-based process oil (Idemitsu Kosan, Diana Process Oil PS-32™) as the plastcizer, 30 parts of titanium dioxide, 5 parts of sodium bisulfate, and 3 parts of dibutyl tin bisacetylacetonate as the curing catalyst (H8), all parts by weight. These components were uniformly kneaded to obtain the curable composition.

Curability (tack-free time) of the resultant composition was measured in accordance with JIS A-5758. It was cured in 16 minutes.

Dibutyl tin bisacetylacetonate

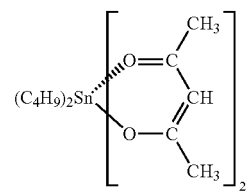

Comparative Example V1

The curable composition was prepared in the same manner as in EXAMPLE V1, except that the curing catalyst (H8) was replaced by tin dioctylate.

Curability (tack-free time) of the resultant composition was measured in accordance with JIS A-5758. It was not cured even after a lapse of 700 minutes or more.

Tin dioctylate

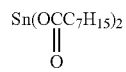

Reference Example V1

A mixture containing the polymer (D-1) prepared in PRODUCTION EXAMPLE V2 as the saturated hydrocarbon-based polymer component was prepared. It was composed of 100 parts of the polymer (D-1), 120 parts of calcium carbonate (Shiraishi K. K., CCR™), 90 parts of a paraffin-based process oil (Idemitsu Kosan, Diana Process Oil PS-32™) as the plastcizer, 30 parts of titanium dioxide, 5 parts of sodium bisulfate, and 3 parts of dibutyl tin bisacetylacetonate as the curing catalyst (H8), all parts by weight. These components were uniformly kneaded to obtain the curable composition.

Curability (tack-free time) of the resultant composition was measured in accordance with JIS A-5758. It was cured in 25 minutes.

Reference Example V2

A mixture containing the polymer (D-2) prepared in PRODUCTION EXAMPLE V3 as the saturated hydrocarbon-based polymer component was prepared. It was composed of 100 parts of the polymer (D-2), 120 parts of calcium carbonate (Shiraishi K. K., CCR™), 90 parts of a paraffin-based process oil (Idemitsu Kosan, Diana Process Oil PS-32™) as the plastcizer, 30 parts of titanium dioxide, 5 parts of sodium bisulfate, and 3 parts of dibutyl tin bisacetylacetonate as the curing catalyst (H8), all parts by weight. These components were uniformly kneaded to obtain the curable composition.

Curability (tack-free time) of the resultant composition was measured in accordance with JIS A-5758. It was cured in 30 minutes.

Reference Example V3

A mixture containing the polymer (D-3) prepared in PRODUCTION EXAMPLE V4 as the saturated hydrocarbon-based polymer component was prepared. It was composed of 100 parts of the polymer (D-3), 120 parts of calcium carbonate (Shiraishi K. K., CCR™), 90 parts of a paraffin-based process oil (Idemitsu Kosan, Diana Process Oil PS-32™) as the plasticzer, 30 parts of titanium dioxide, 5 parts of sodium bisulfate, and 3 parts of dibutyl tin bisacetylacetonate as the curing catalyst (H8), all parts by weight. These components were uniformly kneaded to obtain the curable composition.

Curability (tack-free time) of the resultant composition was measured in accordance with JIS A-5758. It was cured in 30 minutes.

Reference Example V4

The curable composition was prepared in the same manner as in REFERENCE EXAMPLE V1, except that the polymer (D-1) prepared in PRODUCTION EXAMPLE V2 as the saturated hydrocarbon-based polymer was incorporated with tin dioctylate in place of the curing catalyst (H8).

Curability (tack-free time) of the resultant composition was measured in accordance with JIS A-5758. It was not cured even after a lapse of 700 minutes or more.

Reference Example V5

The curable composition was prepared in the same manner as in REFERENCE EXAMPLE V2, except that the polymer (D-2) prepared in PRODUCTION EXAMPLE V3 as the saturated hydrocarbon-based polymer was incorporated with tin dioctylate in place of the curing catalyst (H8).

Curability (tack-free time) of the resultant composition was measured in accordance with JIS A-5758. It was not cured even after a lapse of 700 minutes or more.

Reference Example V6

The curable composition was prepared in the same manner as in REFERENCE EXAMPLE V3, except that the polymer (D-3) prepared in PRODUCTION EXAMPLE V4 as the saturated hydrocarbon-based polymer was incorporated with tin dioctylate in place of the curing catalyst (H8).

Curability (tack-free time) of the resultant composition was measured in accordance with JIS A-5758. It was not cured even after a lapse of 700 minutes or more.

The curing speed test and accelerated weather resistance test were conducted by the following methods for EXAMPLES and COMPARATIVE EXAMPLES.

(1) Curing Speed Test

The curable composition was cured under the conditions of 23° C. and 50% RH for 24 hours in a mold, 20 by 80 by 5 mm in size.

Next, the cured product was released from the mold, and thickness of the cured portion was measured by a dial gauge of weak spring force to 0.1 mm, to evaluate its curing speed. It was marked with ○ when its thickness was 1 mm or more, and × when it was less than 1 mm.

(2) Weather Resistance Test

The accelerated weather resistance test was conducted in accordance with JIS B-7753 under the following conditions:

Analyzer: Sunshine Carbon Arc weatherometer

Light irradiation/rainfall cycles: Irradiation for 120 minutes/rainfall for 18 minutes Black panel temperature: 63±2° C.

Tank inside temperature: 40±2° C.

Total light irradiation time: 250 hours

The tested test piece was visually observed, and marked with ○ when no deterioration (cracks or molten portion) was observed, and × when the deterioration was observed.

TABLE V1

|  |  | EXAMPLE V1 | COMPARATIVE EXAMPLE V1 |
|---|---|---|---|
| Silyl-containing ethylene/α-olefin/non-conjugated polyethylene copolymer rubber (A-1) |  | 100 | 100 |
| Curing catalyst | Curing catalyst (H8) | 3 | — |
|  | Tin dioctylate | — | 3 |
| Calcium carbonate |  | 120 | 120 |
| Process oil |  | 90 | 90 |
| Titanium dioxide |  | 30 | 30 |
| Sodium hydrogen sulfate |  | 5 | 5 |
| Tack-free (min) |  | 16 | >700 |
| Curability |  | ○ | × |
| Resistance to weather |  | ○ | ○ |

TABLE V2

|  |  | REFERENCE EXAMPLE V |  |  |  |  |  |
|---|---|---|---|---|---|---|---|
|  |  | 1 | 2 | 3 | 4 | 5 | 6 |
| Saturated hydrocarbon-based Polymer | D-1 | 100 | — | — | 100 | — | — |
|  | D-2 | — | 100 | — | — | 100 | — |
|  | D-3 | — | — | 100 | — | — | 100 |
| Curing catalyst | Curing catalyst (H8) | 3 | 3 | 3 | — | — | — |
|  | Tin dioctylate | — | — | — | 3 | 3 | 3 |
| Calcium carbonate |  | 120 | 120 | 120 | 120 | 120 | 120 |
| Process oil |  | 90 | 90 | 90 | 90 | 90 | 90 |
| Titanium dioxide |  | 30 | 30 | 30 | 30 | 30 | 30 |
| Sodium hydrogen sulfate |  | 5 | 5 | 5 | 5 | 5 | 5 |
| Tack-free (min) |  | 25 | 30 | 30 | >700 | >700 | >700 |
| Curability |  | X | X | X | X | X | X |
| Resistance to weather |  | ○ | ○ | ○ | ○ | ○ | ○ |

Examples W Series

The composition, the iodine value, the intrinsic viscosity [η] and the molecular weight distribution (Mw/Mn) of the copolymer rubber used in each of EXAMPLES and COMPARATIVE EXAMPLES were determined by the methods described earlier.

Curing speed and weather resistance of the compositions prepared in EXAMPLES, and COMPARATIVE and REFERENCE EXAMPLES were determined by the following methods.

(1) Curing Speed Test

The curable composition was cured at 23° C. and 50% RH in a mold (80 by 80 by 12. 5 mm in size), wherein hardness was followed by a JIS-A hardness meter after surface tackiness disappeared, to record the time required for hardness to reach 20.

(2) Weather Resistance Test

Accelerated weather resistance test: Conducted in accordance with JIS B-7753.

Analyzer: Sunshine Carbon Arc weatherometer

Light irradiation/rainfall cycles: Irradiation for 120 minutes/rainfall for 18 minutes Black panel temperature: 63±2° C.

Tank inside temperature: 40±2° C.

Total light irradiation time: 500 hours

Production Example W1

[Production of Silyl-containing ethylene/propylene/5-vinyl-2-norbornene Random Copolymer Rubber (A-1)]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, VO(OEt)$_2$Cl and Al(Et)$_{1.5}$Cl$_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber (A$_0$-1) in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber (A$_0$-1) thus produced contained ethylene at 68% by mol, and had an iodine value of 10 (g/100 g), intrinsic viscosity [η], as measured in decalin kept at 135° C., of 0.2 dl/g, and Mw/Mn of 15.

Two % toluene solution (0.3 g) of chloroplatinic acid and 1.5 g of methyldimethoxysilane were added to 100 g of the ethylene/propylene/5-vinyl-2-norbornene random copolymer rubber (A$_0$-1), and they were allowed to react with each other at 120° C. for 2 hours. The excess methyldimethoxysilane and the solvent (toluene) were distilled off from the effluent. This produced 101.5 g of the ethylene/propylene/5-vinyl-2-norbornene random copolymer rubber (A-1) containing dimethoxymethylsilyl group (—Si(CH$_3$)(OCH$_3$)$_2$).

Production Example W2

A 2 L pressure-resistant glass reactor was charged, after it was equipped with a 3-way cock and purged with nitrogen, with 138 mL of ethyl cyclohexane (dried by molecular sieves 3A at least for a night), 1012 mL of toluene (also dried by molecular sieves 3A at least for a night) and 8.14 g (35.2 mmols) of p-DCC represented by the following formula by a syringe.

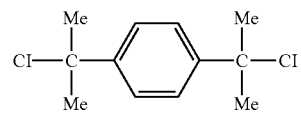

Next, a pressure-resistant glass-made liquefied gas collecting tube equipped with a needle valve and containing 254 mL (2.99 mols) of an isobutylene monomer was connected to one side of the 3-way cock. Then the reactor for polymerization was immersed in a dry ice/ethanol bath kept at −70° C. to cool the solution, and evacuated to a vacuum using a vacuum pump. It was then charged with the isobutylene monomer from the liquefied gas collecting tube by opening the needle valve, and returned back to the normal pressure with a nitrogen gas introduced from another side of the 3-way cock. The reactor was charged with 0.387 g (4.15 mmols) of 2-methyl pyridine and then with 4.90 mL (44.7 mmols) of titanium tetrachloride, to initiate the polymerization. After a lapse of 70 minutes, 9.65 g (13.4 mmols) of allyl trimethylsilane was added to the reactor to introduce the allyl group at the polymer terminal. After a lapse of 120 minutes for the reaction, the reaction solution was washed 4 times each with 200 mL of water, and the solvent was distilled off to obtain the isobutylene-based polymer with the allyl group at the terminal.

Next, 200 g of the isobutylene-based polymer with the allyl group at the terminal thus obtained was mixed with 60 g of a paraffin-based process oil (Idemitsu Kosan, Diana Process Oil PS-32™) as the hydrocarbon-based plasticizer, and the mixture was heated to around 75° C., to which 1.5 [eq/vinyl group] of methyl dimethoxysilane and 5×10$^{-5}$ [eq/vinyl group] of a platinum/vinyl siloxane complex were added, for the hydrosilylation. The reaction was followed by FT-IR. The olefin absorption at 1640 cm$^{-1}$ disappeared in around 20 hours.

This produced the mixture of the isobutylene polymer (represented by the following formula) having the reactive silicon group at both terminals and PS-32 as the plasticizer (10/3 by weight).

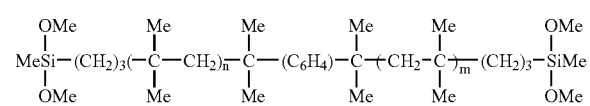

The polymer yield was estimated from the quantity produced. It was also analyzed for Mn and Mw/Mn by GPC, and the terminal structure by comparing the intensities of the 300 MHz $^1$H-NMR-analyzed resonance signals of proton relevant to each structure (proton derived from the initiator: 6.5 to 7.5 ppm, methyl proton bonded to the silicon atom, derived from the polymer terminal: 0.0 to 0.1 ppm, and methoxy proton: 3.4 to 3.5 ppm) with each other. The $^1$H-NMR analysis was conducted using a Varian Gemini 300 (300 MHz for $^1$H) in CDCl$_3$.

The FT-IR analysis was conducted by an IR analyzer (Shimadzu IR-408), and GPC analysis was conducted with a Waters LC Module 1 as the liquid sending system and Shodex K-804 as the column. The molecular weight was the one relative to the polystyrene standard. The polymer thus prepared had an Mn of 5,780, Mw/Mn of 1.28 and Fn (silyl) of 1.93, wherein the number-average molecular weight was as polystyrene, and the number of the terminal functional silyl group was that per 1 mol of isobutylene polymer.

Example W1

The silyl-containing ethylene/propylene/5-vinyl-2-norbornene random copolymer rubber (A-1), 130 parts, produced in PRODUCTION EXAMPLE W1, and a paraffin-based process oil (Idemitsu Kosan, Diana Process Oil PS-$_{32}$™), in which the silyl-containing ethylene/propylene/5-vinyl-2-norbornene random copolymer rubber as the component (A-1) accounted for 100 parts, was incorporated with 5 parts of tetra-n-butyl titanate (Wako-Junyaku) as the titanates of the component (Y), 2 parts of dibutyl tin bisacetylacetonate (NITTO KASEI, Neostann U-220™) as the silanol condensing catalyst and 1 part of H$_2$O, all parts by weight, to prepare the curable rubber composition.

The above composition was spread over a float glass substrate washed with methylethylketone (Wako-Junyaku), which was not coated with a primer, to a thickness of 5 mm, and cured in an oven. The cured composition was peeling-tested, in which it was manually released while the adhesive surface being cut by a cutter knife. The composition containing 5 parts by weight of the titanate was well adhesive to the float glass substrate, showing the cohesion fracture. The curing speed and weather resistance tests were also conducted according to the methods described earlier. It took 18 hours until its hardness reached 20 in the curing speed test, and showed no cracks in the weather resistance test.

Comparative Example W1

The composition was prepared in the same manner as in EXAMPLE W1, except that addition of the titanates as the component (Y) was omitted, and tested in the same manner. It was insufficient in adhesion to the float glass substrate, showing the adhesion fracture. Moreover, it took 72 hours or more until its hardness reached 20 in the curing speed test, and showed a number of cracks visible to the naked eye in the weather resistance test.

Reference Example W1

The composition was prepared in the same manner as in COMPARATIVE EXAMPLE W1, except that the silyl-containing ethylene/propylene/5-vinyl-2-norbornene random copolymer rubber prepared in PRODUCTION EXAMPLE W1 was replaced by the saturated hydrocarbon-based polymer containing the reactive silicon group prepared in PRODUCTION EXAMPLE W2, and tested in the same manner. The manual peeling test results indicated that the composition was insufficient in adhesion to the float glass substrate, showing the adhesion fracture. Moreover, it took 48 hours until its hardness reached 20 in the curing speed test, and showed cracks and molten portion visible to the naked eye, although slightly, in the weather resistance test.

Reference Example W2

The composition was prepared in the same manner as in EXAMPLE W1, except that the silyl-containing ethylene/propylene/5-vinyl-2-norbornene random copolymer rubber prepared in PRODUCTION EXAMPLE W1 was replaced by the saturated hydrocarbon-based polymer containing the reactive silicon group prepared in PRODUCTION EXAMPLE W2, and tested in the same manner. The manual peeling test results indicated that the composition was good in adhesion to the float glass substrate, showing the cohesion fracture. However, it took 36 hours until its hardness reached 20 in the curing speed test, and showed cracks and molten portion, although slightly, in the weather resistance test.

Examples X Series

The composition, the iodine value, the intrinsic viscosity [η] and the molecular weight distribution (Mw/Mn) of the copolymer rubber used in each of EXAMPLES and COMPARATIVE EXAMPLES were determined by the methods described earlier.

Production Example X1

Production of Silyl-containing ethylene/propylene/5-vinyl-2-norbornene Random Copolymer Rubber (A-1)

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 3.0 kg, 9.0 kg and 550 g per hour, respectively, from the reactor side into the liquid phase, and hydrogen 70 L, VOCl$_3$, Al(Et)$_2$Cl and Al(Et)$_{1.5}$Cl$_{1.5}$ as the catalysts at 95 mmols, 443 mmols and 127 mmols per hour, respectively, also continuously.

The copolymerization effected under the above conditions produced the ethylene/propylene/5-vinyl-2-norbornene random copolymer rubber (A$_0$-1) in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber (A$_0$-1) thus produced contained ethylene at 68% by mol, and had an iodine value of 15 (g/100 g), intrinsic viscosity [η], as measured in decalin at 135° C., of 0.2 dl/g, and Mw/Mn of 15. The yield was 3.5 kg/h.

Two % toluene solution (0.3 part by weight) of chloroplatinic acid and 1.5 parts by weight of methyldimethoxysilane were added to 100 parts by weight of the ethylene/propylene/5-vinyl-2-norbornene random copolymer rubber (A$_0$-1), and they were allowed to react with each other at 120° C. for 2 hours. The excess methyldimethoxysilane and the solvent (toluene) were distilled off from the effluent. This produced 101.5 parts by weight of the ethylene/propylene/5-vinyl-2-norbornene random copolymer rubber containing dimethoxymethylsilyl group (—SiH(OCH$_3$)$_2$).

Production Example X2

[Production of Saturated Hydrocarbon-Based Polymer (CA-1)]

A uniformly mixed solution of 560 mL of methylene chloride, 1,160 mL of n-hexane, 940 mg of α-methylpyridine and 22 g of p-dicumyl chloride, all dried, was formed in a four-mouthed flask equipped with an agitator and nitrogen line and cooled to −70° C., in which 570 mL of isobutylene monomer was charged under a vacuum through a molecular sieves tube.

A polymerization catalyst solution (comprising 14 mL of titanium tetrachloride and 80 mL of methylene chloride) cooled beforehand was added all at once to the above reaction solution, kept at −70° C., with stirring to initiate the polymerization reaction. The reaction solution was heated to −54° C., and then cooled to −70° C. in about 17 minutes. About 20 minutes after the polymerization was initiated, 132 g of 1,9-decadiene was added to the reaction solution, and continuously stirred at −70° C. for 4 hours.

The yellowy turbid reaction solution thus produced was put in 3 L of warm water (around 45° C.) and stirred for around 2 hours. Then, the organic layer was separated, and washed with pure water 3 times.

The resultant colorless, transparent organic layer was concentrated under a vacuum, to obtain approximately 400 g of the isobutylene oligomer with vinyl groups at both terminals.

Next, 400 g of the isobutylene oligomer with vinyl groups at both terminals was dissolved in 200 mL of n-heptane. The resultant solution was heated to around 70° C., to which 1.5 [eq/vinyl group] of methyl dimethoxysilane and $1×10^{-4}$ [eq/vinyl group] of a platinum/vinyl siloxane complex were added, for the hydrosilylation. The reaction was followed by FT-IR. The olefin absorption at 1640 cm$^{-1}$ disappeared in around 4 hours.

The reaction solution was concentrated under a vacuum, to obtain the isobutylene oligomer (represented by the following formula) having the reactive silicon group at both terminals.

Production Example X4

[Production of Saturated Hydrocarbon-Based Polymer (CA-3)]

A uniformly mixed solution of 560 mL of methylene chloride, 1,160 mL of n-hexane, 940 mg of α-methylpyridine and 22 g of p-dicumyl chloride, all dried, was formed in a four-mouthed flask equipped with an agitator and nitrogen line and cooled to −70° C., in which 570 mL of isobutylene monomer was charged under a vacuum through a molecular sieves tube.

A polymerization catalyst solution (comprising 14 mL of titanium tetrachloride and 80 mL of methylene chloride) cooled beforehand was added all at once to the above reaction solution, kept at −70° C., with stirring to initiate the polymerization reaction. The reaction solution was heated to −54° C., and then cooled to −70° C. in about 17 minutes. The reaction solution was continuously stirred for around 60 minutes after the polymerization was initiated. The yellowy turbid reaction solution thus produced was put in 3 L of warm water (around 45° C.) and stirred for around 2 hours. Then, the organic layer was separated, and washed with pure water 3 times. The resultant colorless, transparent organic layer was concentrated under a vacuum, to obtain approximately 400 g of the isobutylene oligomer with chlorous groups at both terminals.

Then, the isobutylene oligomer was continuously heated at 170° C. under a vacuum for 2 hours for the thermal dehydrochlorination reaction, to obtain the isobutylene oligomer with isopropenyl groups at both terminals.

Next, 400 g of the isobutylene oligomer with isopropenyl groups at both terminals was dissolved in 200 mL of n-heptane. The resultant solution was heated in a pressure vessel to around 100° C., to which 1.5 [eq/vinyl group] of methyl dichlorosilane and $1×10^{-4}$ [eq/vinyl group] of a

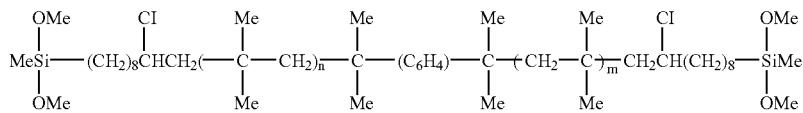

Production Example X3

[Production of Saturated Hydrocarbon-Based Polymer (CA-2)]

The same procedure as used for PRODUCTION EXAMPLE X2 was repeated in PRODUCTION EXAMPLE X3, except that 1,9-decadiene was replaced by 24 g of allylmethylsilane, to obtain the isobutylene oligomer (represented by the following formula) of a partly different production intermediate structure.

platinum/vinyl siloxane complex were added, for the hydrosilylation. The reaction was followed by FT-IR. The olefin absorption at 1640 cm$^{-1}$ disappeared in a round 10 hours. The reaction solution was cooled to 60°, to which an excess quantity of methanol over methyl dichlorosilane was added, and the mixture was stirred for around 4 hours, to complete the methoxylation. The reaction solution was concentrated under a vacuum, to obtain the isobutylene oligomer having the structure represented by the following formula, with the reactive silicon group at both terminals.

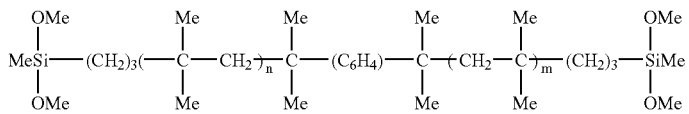

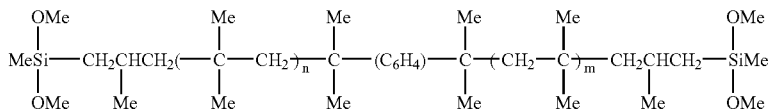

Synthesis Example 1

[Synthesis of Copolymer (B)]

A solution dissolving 5.7 g of butyl acrylate, 65.1 g of methyl methacrylate, 13.3 g of stearyl methacrylate, 5.6 g of γ-methacryloxypropyltrimethoxysilane, 8.0 g of γ-mercaptopropyltrimethoxysilane, 5.0 g of azobisisobutylonitrile and 22 g of xylene was added dropwise to 20 g of xylene as the solvent heated at 110° C. over 6 hours. They were allowed to react for polymerization with each other for 2 hours, to obtain the copolymer (B) containing the solids at 70% and having a number-average molecular weight (Mn) of 2,100 as polystyrene, determined by GPC.

Examples X1 to X5

The silyl-containing ethylene/propylene/5-vinyl-2-norbornene random copolymer rubber (A-1) prepared in PRODUCTION EXAMPLE X1 was blended with the copolymer (B) prepared in SYNTHESIS EXAMPLE 1 in a solid ratio of 60/40 by weight, and the mixture was evaporation-treated at 110° C. under a vacuum by an evaporator, to obtain the transparent, viscous liquid containing the solids at 99% or more.

The blended, evaporation-treated polymer, 100 g, was thoroughly kneaded with 100 g of limestone powder, 50 g of colloidal calcium carbonate, 5 g of glass balloons (average particle size: 70 μm), 100 g of diisononyl phthalate, 5 g of silicic anhydride, 2 g of a hindered phenol-based aging inhibitor, 10 g of calcium oxide, 2 g of an aluminum chelate-based curing catalyst, 1 g of an aminosilane compound and a silicone-based reactive diluent (Shin-etsu Silicone, AFP-1) by a planetary mixer, to obtain the sample (A-1) for EXAMPLES X1 to X5.

Reference Examples X1 to X9

The blended, evaporation-treated polymers were prepared for REFERENCE EXAMPLES X1 to X9 in the same manner as in EXAMPLES X1 to X5, except that the silyl-containing
ethylene/propylene/5-vinyl-2-norbornene random copolymer rubber (A-1) prepared in PRODUCTION EXAMPLE X1 was replaced by the saturated hydrocarbon-based polymers (CA-1) to (CA-3) prepared in PRODUCTION EXAMPLES X2 to X4, respectively, and the samples (CA-1) to (CA-3) were prepared for COMPARATIVE EXAMPLES X1 to X3 in the same manner as in EXAMPLES X1 to X5.

Comparative Examples X1 to X3

A vinyl chloride resin, 100 g, was thoroughly kneaded with 100 g of limestone powder, 50 g of colloidal calcium carbonate, 5 g of glass balloons (average particle size: 70 μm), 100 g of diisononyl phthalate, 3 g of lead-based dehydrochlorination inhibitor and 5 g of urethane prepolymer by a planetary mixer, to obtain the sample (CA-4) for COMPARATIVE EXAMPLES X1 to X3.

Each of these samples was spread over a cation-electrodeposited steel plate to a thickness given in Table X1 under varying conditions also given in Table X1, and cured to investigate its resistance to chipping, sprayed saline water and vibration. Resistance to weather and curing speed of the coating film were evaluated by the following methods. The results are given in Table X1.

The test methods are described below.

(Resistance to Chipping)

Three types of nuts (Nut M-4) were dropped onto the sample slanted at 45° from a height of 2 m until the base was exposed, and the chipping resistance was evaluated by the total weight of the nuts.

(Resistance to Sprayed Saline Water)

The sample coated on the cation-electrodeposited steel plate as the film of a given thickness was cross-cut at the center to the base metal, and put in a tank sprayed with saline water for 200 hours. The resistance to sprayed saline water was evaluated by the maximum width of exfoliation, when a cellophane tape put on the cut surface was torn off.

(Resistance to Vibration)

The resistance to vibration was evaluated by the vibration insulation coefficient (d), defined by the formula $d=(f_2-f_1)/f_0$ in accordance with the vibration insulation test method for automobile underbody coating materials (JASO7006), wherein $f_0$ is the resonance frequency at the secondary resonance point, and $f_2$ and $f_1$ are frequencies at the sections where sound intensity is decreased by 3 dB, the frequencies being measured at 25° C.

(Curing Speed Test)

Tackiness-free Time at Medium Temperature

A cation-electrodeposited steel plate coated with the composition to a thickness of 10 mm was kept at 60° C. in a drier. Tackiness of the coating composition was measured at given time intervals by fingering. Tackiness-free time is defined as the time at which the composition is no longer transferred to the fingertip.

(Weather Resistance Test)

The weather resistance was evaluated by the accelerated weather resistance test conducted in accordance with JIS B-7753 under the following conditions:
Analyzer: Sunshine Carbon Arc weatherometer
Light irradiation/rainfall cycles: Irradiation for 120 minutes/ rainfall for 18 minutes
Black panel temperature: 63±2° C.
Tank inside temperature: 40±2° C.
Total light irradiation time: 250 hours The tested test piece was visually observed, to evaluate its resistance to weather according to the following four grades:
◎: No cracks or molten portion observed entirely
○: Cracks or molten portion observed very slightly
Δ: Cracks or molten portion observed to some extent
×: Cracks or molten portion observed massively

TABLE X1

| | | EXAMPLE X | | | | | REFERENCE EXAMPLE X | | | | | | | | | COMPARATIVE EXAMPLE X | | |
|---|---|---|---|---|---|---|---|---|---|---|---|---|---|---|---|---|---|---|
| | | 1 | 2 | 3 | 4 | 5 | 1 | 2 | 3 | 4 | 5 | 6 | 7 | 8 | 9 | 1 | 2 | 3 |
| | | | | A-1 | | | | CA-1 | | | CA-2 | | | CA-3 | | | CA-4 | |
| Curing condition | 140° C. × 30 min | ○ | ○ | — | — | — | ○ | ○ | — | ○ | ○ | — | ○ | ○ | — | ○ | ○ | — |
| | 120° C. × 20 min | — | — | ○ | — | — | — | — | ○ | — | — | ○ | — | — | ○ | — | — | ○ |
| | 120° C. × 10 min | — | — | — | ○ | — | — | — | — | — | — | — | — | — | — | — | — | — |
| | 100° C. × 20 min | — | — | — | — | ○ | — | — | — | — | — | — | — | — | — | — | — | — |
| Thickness of coating film | 1.5 mm | ○ | — | — | — | — | ○ | — | — | ○ | — | — | ○ | — | — | ○ | — | — |
| | 0.5 mm | — | ○ | ○ | ○ | ○ | — | ○ | ○ | — | ○ | ○ | — | ○ | ○ | — | ○ | ○ |
| Resistance to chipping | | 135 | 98 | 92 | 92 | 81 | 103 | 79 | 74 | 102 | 80 | 79 | 101 | 73 | 77 | 68 | 41 | 9 |
| Resistance to vibration (× 10³) | | 55 | 16 | 15 | 14 | 14 | 45 | 10 | 12 | 42 | 11 | 12 | 42 | 11 | 13 | 8 | 5 | 4 |
| Resistance to sprayed saline water (mm) | | ≤1 | ≤1 | ≤1 | ≤1 | ≤1 | ≤1 | ≤1 | 1.2 | ≤1 | ≤1 | 1.3 | ≤1 | ≤1 | 1.3 | ≤1 | 1.8 | 3.6 |
| Tack-free time (min) | | 30 | 30 | 30 | 30 | 30 | 60 | 60 | 60 | 80 | 80 | 80 | 100 | 100 | 100 | 90 | 90 | 90 |
| Resistance to weather | | ⊚ | ⊚ | ⊚ | ⊚ | ⊚ | Δ | Δ | Δ | Δ | Δ | Δ | Δ | Δ | Δ | X | X | X |

As shown in Table X1, the coating materials of the present invention for automobiles exhibit excellent resistance to chipping, vibration, sprayed saline water and weather, and also very high curing speed, even when cured at low temperature and for a short time, and also when it is thin.

Examples Y Series

Production Example Y1

[Production of Silyl-containing ethylene/propylene/5-vinyl-2-norbornene Random Copolymer Rubber]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, $VO(OC_2H_5)_2Cl$ and $Al(Et)_{1.5}Cl_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber thus produced contained ethylene at 68% bymol, and had an iodine value of 10, intrinsic viscosity [η] of 0.2 dl/g, and Mw/Mn of 15.

Two % toluene solution (0.3 g) of chloroplatinic acid and 1.5 g of methyldimethoxysilane were added to 100 g of the ethylene/propylene/5-vinyl-2-norbornene random copolymer rubber, and they were allowed to react with each other at 120° C. for 2 hours. The excess methyldimethoxysilane and the solvent were distilled off from the effluent. This produced 101.5 g of the ethylene/propylene/5-vinyl-2-norbornene random copolymer rubber containing dimethoxymethylsilyl group.

Example Y1

The silyl-containing copolymer rubber prepared in PRODUCTION EXAMPLE Y1 was incorporated with a paraffin-based process oil (Idemitsu Kosan, Diana Process Oil PS-32™), limestone powder (Maruo Calcium, Snowlite SS™) and salt cake ($Na_2SO_4.10H_2O$), and the mixture was well kneaded by a 3-paint roll unit, to produce the major ingredient for the sealant. The respective amounts as the part by weight are given in Table Y1. Dibutyl tin bisacetylacetonate (NITTO KASEI, U-220™) was used as the curing catalyst.

The major ingredient and curing catalyst as the component of the test sample were well kneaded, formed into an around 1.5 mm thick sheet and cured in an oven under the conditions of 23° C. and 50% RH for 7 days and then 50° C. and 70% RH for another 7 days. The composition is given in Table Y1.

The cured sheet sample was tested in accordance with JIS Z-0208 (the moisture-permeability test for moisture-proof packing materials) under the temperature/humidity conditions B (40° C. and 90% RH).

The sample was evaluated by moisture permeability according to the following three grades:

○: Permeability: 1 to 25 g/m²·24 hr

Δ: Permeability: 25 to 50 g/m²·24 hr

×: Permeability: 50 g/m²·24 hr or more

The result is given in Table Y1.

Reference Example Y1

The sample was prepared and tested in the same manner as in EXAMPLE Y1, except that the silyl-containing copolymer rubber prepared in PRODUCTION EXAMPLE Y1 was replaced by the isobutene polymer with a group containing reactive silicon at both terminals, prepared by the method disclosed by Japanese Patent Laid-open Publication No. 209539/1999 (paragraphs 0044 to 0053). The moisture permeability result is given in Table Y1, wherein the isobutene polymer with a group containing reactive silicon is listed in the column of the component (A).

TABLE Y1

|  | EXAMPLE Y1 | REFERENCE EXAMPLE Y1 |
|---|---|---|
| Compositions (Major ingredient) |  |  |
| Component (A2) |  |  |
| Silyl-containing copolymer rubber, prepared in PRODUCTION EXAMPLE 1 | 100 | — |
| Isobutene polymer containing reactive silicon | — | 100 |
| Other additives |  |  |
| Process oil (PS-32) | 100 | 100 |
| Limestone powder (Snowlight SS) | 460 | 460 |
| $Na_2SO_4 \cdot 10H_2O$ | 2 | 2 |
| Component (H) |  |  |
| Curing agent (U-220) | 4 | 4 |
| Characteristics of cured product |  |  |
| Moisture permeability (g/m$^2$ · 24 hr) | 0 | 0 |
| Thickness (mm) | 1.637 | 1.868 |

Examples Y2 to Y5

The major ingredient was prepared for each of EXAMPLES Y2 to Y5, where the silyl-containing copolymer rubber prepared in PRODUCTION EXAMPLE Y1 was well kneaded by a 3-paint roll unit together with the additives: aging inhibitors (Ciba-Geigy Japan, Irganox 1010; Sumitomo Chemical, Sumisorb 400™, and Sankyo, Sanol LS-765™); light stabilizers (Sanshin Kagaku Kogyo, Sandant NBC™; and ACC, CYASORB UV-1084™); light-curable resin (TOAGOSEI, AronixM-400™); thixotropy imparting agent (Kusumoto Kasei, Disparlon #305™); silane coupling agents (Nippon Unicar, A-1310 and A-187™). Each compositions is given in Table Y2.

The curing agent was prepared by the following procedure: a mixture comprising a curing catalyst (Sankyo Organic Chemicals, Ltd., SCAT-27™) and other components was manually kneaded in a disposal cup and stirred 3 times at 10,000 rpm each for 10 minutes by a homogenizer (Nihon Seiki Sesakusho Co., Ltd., Excel Auto Homogenizer). Each composition is given in Table Y2.

The test piece was prepared in accordance with JIS A-5758/1992 specifying the method of preparing the test piece for tensile adhesion test; the composition comprising the major ingredient and curing agent (composition is given in Table Y2) was put in the H-shape frame of glass or aluminum substrate after it was sufficiently kneaded, and cured in an oven under the conditions of 23° C. and 50% RH for 7 days and 50° C. and 70% RH for another 7 days.

Three types of materials were used to prepare substrates for the H-type tensile test; float glass (Koen-sha, designated by Japan Sealant Industry Association, 3 by 5 by 0.5 cm in size) in accordance with JIS A-5758/1992, pure aluminum (Taiyu Kizai, A1100P, 5 by 5 by 0.2 cm in size) in accordance with JIS H-4000, and heat ray reflective glass (KLS™, 5 by 5 by 0.6 cm in size) coated with thermally fused TiOx.

Each of these H-shapes was washed with methylethylketone (Wako-Junyaku, special grade) and wiped with clean cotton cloth, before it was filled with the composition.

The H-shape test piece thus prepared was tested by the method of testing tensile adhesion in accordance with JIS A-5758/1992, wherein it was stretched at a tensile speed of 50 mm/minute in a constant-temperature chamber kept at 23° C. and 65±5%. The cohesion fracture CF)/thin-coat fracture (TCF)/adhesion fracture (AF) ratio shown in Table Y3 was determined by visual observation of the cross-sections of the tensile-tested pieces.

As shown in Table Y3, all of the compositions prepared in EXAMPLES Y2 to Y5 exhibit good adhesion to the substrate.

Reference Examples Y2 to Y5

The composition was prepared for each of REFERENCE EXAMPLES Y2 to Y5 and tested in the same manner as in EXAMPLES Y2 to Y5, except that the silyl-containing copolymer rubber prepared in PRODUCTION EXAMPLE Y1 was replaced by the isobutene polymer prepared in REFERENCE EXAMPLE Y1 to have a group containing reactive silicon at both terminals. The test results are given in Table Y4.

TABLE Y2

|  | EXAMPLES | | | |
|---|---|---|---|---|
|  | Y2 | Y3 | Y4 | Y5 |
| [Major ingredients] |  |  |  |  |
| Polymer prepared in PRODUCTION EXAMPLE Y1 | 100 | 100 | 100 | 100 |
| PS32 | 112.5 | 135 | 157 | 180 |
| EDS-D10A | 62.5 | 75 | 87.5 | 100 |
| PO320B10 | 22.5 | 270 | 315 | 360 |
| Talc LMR | 12.5 | 150 | 175 | 200 |
| Sandant NBC | 3 | 3 | 3 | 3 |
| Aronix M400 | 3 | 3 | 3 | 3 |
| Disparlon #306 | 5 | 5 | 5 | 5 |
| Sumisorp 400 | 1 | 1 | 1 | 1 |
| Sanol LS786 | 1 | 1 | 1 | 1 |
| Irganox 1010 | 1 | 1 | 1 | 1 |
| A-187 | 2 | 2 | 2 | 2 |
| A1310 | 4 | 4 | 4 | 4 |
| [Curing agents] |  |  |  |  |
| SCAT-27 | 4 | 4 | 4 | 4 |
| PS32 | 12.5 | 15 | 17.5 | 2.0 |
| CB#30 | 2.5 | 2.5 | 2.5 | 2.5 |
| $Na_2SO_4 \cdot 10H_2O$ | 4 | 4 | 4 | 4 |
| Snowlite SS | 25 | 30 | 35 | 40 |
| Polymer content (%) | 14.4 | 12.4 | 10.9 | 9.7 |

TABLE Y3

| No. | Substrates | | 50% Tensile stress M50 (kgf/cm²) | Max. tensile stress Tmax (kgf/cm²) | Elongation at the max. load Emax (%) | Fractured conditions (%) | | |
|---|---|---|---|---|---|---|---|---|
| | | | | | | CF | TCF | AF |
| EXAMPLE Y2 | Float glass | 1 | 4.46 | 6.17 | 87 | 100 | 0 | 0 |
| | | 2 | 4.66 | 6.20 | 86 | 100 | 0 | 0 |
| | | average | 4.64 | 6.19 | 87 | 100 | 0 | 0 |
| | Pure aluminum | 1 | 4.39 | 6.21 | 91 | 99 | 1 | 0 |
| | | 2 | 4.37 | 6.10 | 87 | 100 | 0 | 0 |
| | | average | 4.38 | 6.16 | 98 | 100 | 0 | 0 |
| | KLS | 1 | 4.67 | 6.22 | 88 | 99 | 1 | 0 |
| | | 2 | 4.69 | 6.25 | 93 | 100 | 0 | 0 |
| | | average | 4.68 | 6.24 | 91 | 100 | 0 | 0 |
| EXAMPLE Y3 | Float glass | 1 | 4.69 | 6.26 | 86 | 98 | 2 | 0 |
| | | 2 | 4.71 | 6.27 | 84 | 98 | 2 | 0 |
| | | average | 4.70 | 6.27 | 85 | 98 | 2 | 0 |
| | Pure aluminum | 1 | 4.37 | 6.18 | 87 | 99 | 1 | 0 |
| | | 2 | 4.35 | 6.12 | 82 | 100 | 0 | 0 |
| | | average | 4.36 | 6.15 | 85 | 100 | 0 | 0 |
| | KLS | 1 | 4.80 | 6.32 | 80 | 97 | 3 | 0 |
| | | 2 | 4.83 | 6.36 | 79 | 97 | 3 | 0 |
| | | average | 4.82 | 6.34 | 80 | 97 | 3 | 0 |
| EXAMPLE Y4 | Float glass | 1 | 4.66 | 6.11 | 72 | 98 | 2 | 0 |
| | | 2 | 4.69 | 6.02 | 74 | 100 | 0 | 0 |
| | | average | 4.68 | 6.07 | 73 | 99 | 1 | 0 |
| | Pure aluminum | 1 | 4.36 | 6.11 | 79 | 92 | 7 | 0 |
| | | 2 | 4.33 | 6.08 | 77 | 97 | 3 | 0 |
| | | average | 4.35 | 6.05 | 78 | 95 | 5 | 0 |
| | KLS | 1 | 4.67 | 6.13 | 75 | 99 | 1 | 0 |
| | | 2 | 4.70 | 6.11 | 72 | 99 | 1 | 0 |
| | | average | 4.69 | 6.12 | 74 | 99 | 1 | 0 |
| EXAMPLE Y5 | Float glass | 1 | 4.33 | 6.27 | 70 | 98 | 2 | 0 |
| | | 2 | 4.30 | 6.23 | 73 | 99 | 1 | 0 |
| | | average | 4.32 | 6.25 | 72 | 99 | 1 | 0 |
| | Pure aluminum | 1 | 3.76 | 5.89 | 73 | 99 | 2 | 0 |
| | | 2 | 3.72 | 5.91 | 77 | 98 | 2 | 0 |
| | | average | 3.74 | 5.90 | 75 | 98 | 2 | 0 |
| | KLS | 1 | 4.32 | 6.18 | 78 | 100 | 0 | 0 |
| | | 2 | 4.37 | 6.11 | 71 | 100 | 0 | 0 |
| | | average | 4.35 | 6.15 | 75 | 100 | 0 | 0 |

TABLE Y4

| No. | Substrates | | 50% Tensile stress M50 (kgf/cm²) | Max. tensile stress Tmax (kgf/cm²) | Elongation at the max. load Emax (%) | Fractured conditions (%) | | |
|---|---|---|---|---|---|---|---|---|
| | | | | | | CF | TCF | AF |
| REFERENCE EXAMPLE Y2 | Float glass | 1 | 4.67 | 6.98 | 98 | 100 | 0 | 0 |
| | | 2 | 4.76 | 6.87 | 91 | 100 | 0 | 0 |
| | | average | 4.72 | 6.93 | 95 | 100 | 0 | 0 |
| | Pure aluminum | 1 | 4.43 | 6.51 | 91 | 100 | 0 | 0 |
| | | 2 | 4.38 | 7.01 | 106 | 99 | 1 | 0 |
| | | average | 4.41 | 6.76 | 99 | 100 | 1 | 0 |
| | KLS | 1 | 4.79 | 7.25 | 99 | 98 | 2 | 0 |
| | | 2 | 4.66 | 7.43 | 105 | 100 | 0 | 0 |
| | | average | 4.73 | 7.34 | 102 | 99 | 1 | 0 |
| REFERENCE EXAMPLE Y3 | Float glass | 1 | 4.74 | 6.70 | 89 | 95 | 5 | 0 |
| | | 2 | 4.79 | 7.10 | 93 | 85 | 15 | 0 |
| | | average | 4.77 | 6.90 | 91 | 90 | 10 | 0 |
| | Pure aluminum | 1 | 4.38 | 6.81 | 94 | 100 | 0 | 0 |
| | | 2 | 4.43 | 6.53 | 85 | 95 | 6 | 0 |
| | | average | 4.41 | 6.67 | 90 | 98 | 3 | 0 |
| | KLS | 1 | 4.92 | 6.58 | 81 | 90 | 10 | 0 |
| | | 2 | 5.03 | 6.86 | 83 | 90 | 10 | 0 |
| | | average | 4.98 | 6.72 | 82 | 90 | 10 | 0 |
| REFERENCE EXAMPLE Y4 | Float glass | 1 | 4.75 | 6.32 | 77 | 98 | 2 | 0 |
| | | 2 | 4.79 | 6.43 | 77 | 100 | 0 | 0 |
| | | average | 4.77 | 6.38 | 77 | 95 | 1 | 0 |
| | Pure aluminum | 1 | 4.38 | 6.34 | 86 | 85 | 16 | 0 |
| | | 2 | 4.53 | 5.94 | 75 | 100 | 0 | 0 |
| | | average | 4.46 | 6.14 | 81 | 100 | 8 | 0 |

TABLE Y4-continued

| No. | Substrates | | 50% Tensile stress M50 (kgf/cm²) | Max. tensile stress Tmax (kgf/cm²) | Elongation at the max. load Emax (%) | Fractured conditions (%) | | |
|---|---|---|---|---|---|---|---|---|
| | | | | | | CF | TCF | AF |
| | KLS | 1 | 4.68 | 6.29 | 81 | 99 | 1 | 0 |
| | | 2 | 4.83 | 6.17 | 74 | 90 | 10 | 0 |
| | | average | 4.76 | 6.23 | 78 | 100 | 6 | 0 |
| REFERENCE EXAMPLE Y5 | Float glass | 1 | 4.28 | 6.00 | 79 | 95 | 5 | 0 |
| | | 2 | 4.36 | 5.98 | 76 | 100 | 0 | 0 |
| | | average | 4.32 | 5.99 | 78 | 98 | 3 | 0 |
| | Pure aluminum | 1 | 3.92 | 5.38 | 79 | 95 | 5 | 0 |
| | | 2 | 3.99 | 6.13 | 87 | 98 | 2 | 0 |
| | | average | 3.96 | 5.76 | 83 | 97 | 4 | 0 |
| | KLS | 1 | 4.37 | 6.35 | 85 | 100 | 0 | 0 |
| | | 2 | 4.83 | 5.86 | 70 | 100 | 0 | 0 |
| | | average | 4.60 | 6.11 | 78 | 100 | 0 | 0 |

The curing speed and weather resistance tests were conducted for the compositions prepared in EXAMPLES Y1 to Y5 and REFERENCE EXAMPLES Y1 to Y5. The results are given in Table Y5.

The curing speed and resistance to weather were measured for the compositions prepared in EXAMPLES Y1 to Y5 and REFERENCE EXAMPLES Y1 to Y5 by the following methods.

1) Curing Speed

Each of the compositions comprising the major ingredient and catalyst was measured for curing speed (film expandability) at room temperature by the method in which the composition was cured at 23° C. and 50% RH for 24 hours in a mold (20 by 80 by 5 mm in size), and then released from the mold. Thickness of the cured portion was measured by a dial gauge of weak spring force to 0.1 mm.

<Evaluation Standards for Curing Speed>
x: The cured portion was less than 0.5 mm thick
Δ: The cured portion was 0.5 mm thick or more but less than 1 mm
○: The cured portion was 1 mm thick or more.

2) Weather Resistance Test

The accelerated weather resistance test was conducted in accordance with JIS B-7753 under the following conditions:
Analyzer: Sunshine Carbon Arc weatherometer
Light irradiation/rainfall cycles: Irradiation for 120 minutes/rainfall for 18 minutes
Black panel temperature: 63±2° C.
Tank inside temperature: 40±2° C.
Total light irradiation time: 500 hours The tested test piece was visually observed, to evaluate its resistance to weather according to the following three grades:

TABLE Y5

| | Resistance to weather | Curing speed |
|---|---|---|
| EXAMPLE Y1 | ○ | ○ |
| EXAMPLE Y2 | ○ | ○ |
| EXAMPLE Y3 | ○ | ○ |
| EXAMPLE Y4 | ○ | ○ |
| EXAMPLE Y5 | ○ | ○ |
| REFERENCE EXAMPLE Y1 | Δ | x |
| REFERENCE EXAMPLE Y2 | Δ | x |
| REFERENCE EXAMPLE Y3 | Δ | x |
| REFERENCE EXAMPLE Y4 | Δ | x |
| REFERENCE EXAMPLE Y5 | Δ | x |

○: No cracks or molten portion observed
Δ: Cracks or molten portion observed slightly
x: Cracks or molten portion observed Examples Z Series Production Example Z1

[Production of Silyl-containing ethylene/propylene/5-vinyl-2-norbornene Random Copolymer Rubber]

The three-component copolymerization was effected continuously in a stainless steel polymerization reactor having an essential capacity of 100 L, equipped with agitator blades (agitating rotation speed: 250 rpm), wherein hexane, ethylene, propylene and 5-vinyl-2-norbornene were continuously supplied at 60 L, 2.5 kg, 4.0 kg and 380 g per hour, respectively, from the reactor side into the liquid phase, and hydrogen, $VO(OC_2H_5)_2Cl$ and $Al(Et)_{1.5}Cl_{1.5}$ as the catalysts at 700 L, 45 mmols and 315 mmols per hour, respectively, also continuously.

The copolymerization effected under the above conditions produced the ethylene/propylene/5-vinyl-2-norbornene random copolymer rubber in a form of uniform solution.

A small quantity of methanol was added to the polymer solution, continuously withdrawn from the reactor bottom, to terminate the polymerization. The polymer was separated from the solvent by steam-stripping the solution, and dried at 55° C. for 48 hours under a vacuum.

The ethylene/propylene/5-vinyl-2-norbornene random copolymer rubber thus produced contained ethylene at 68% by mol, and had an iodine value of 10, intrinsic viscosity [η] of 0.2 dl/g, and Mw/Mn of 15.

Two % toluene solution (0.3 g) of chloroplatinic acid and 1.5 g of methyldimethoxysilane were added to 100 g of the ethylene/propylene/5-vinyl-2-norbornene random copolymer rubber, and they were allowed to react with each other at 120° C. for 2 hours. The excess methyldimethoxysilane and the solvent were distilled off from the effluent. This produced 101.5 g of the copolymer rubber containing dimethoxymethylsilyl group.

Examples Z1 to Z3, and Comparative Example Z1

The polymer prepared in PRODUCTION EXAMPLE Z1, 100 parts was incorporated with 30 parts of a paraffin-based process oil (Idemitsu Kosan, Diana Process Oil PS-32™), 130 parts of a butyl-based hot melt (Yokohama Rubber, Hamatite HOTMELT M-120), 6 parts of salt cake (reagent, $Na_2SO_4 \cdot 10H_2O$), 3 parts of tin octylate (NITTO KASEI, Neostann U-28™) and 0.75 part of lauryl amine (Wako Jun-yaku), all parts by weight. The mixture was well kneaded by a 3-paint roll unit, to produce the test sample for EXAMPLE Z1.

The compositions were prepared for EXAMPLES Z2 and Z3 in the same manner as in EXAMPLE Z1, except that contents of the butyl-based hot melt were changed to 303.3 and 1169 parts by weight, respectively, to prepare the test samples. The composition was also prepared for COMPARATIVE EXAMPLE Z1 in the same manner as in EXAMPLE Z1, except that the polymer was incorporated only with the hot melt to prepare the test sample. These samples were used for the tensile test.

The test sample was prepared in accordance with JIS A-6850/1976 which specifies the method of sample preparation for testing tensile adhesion strength of adhesives. Each composition was spread over and pressed to an aluminum plate (Taiyu Kizai, A-1050P, 2.5 by 10 by 0.3 mm in size, specified by JIS H-4000) as the substrate, which was washed with methylethylketone (Wako Jun-yaku) and wiped with clean cotton cloth beforehand. Each composition was cured as the sealing material at 50° C. for 4 days in an oven.

The test sample prepared by the above method was stretched at 50 mm/minute in a constant-temperature chamber kept at 23° C. and RH65±5%, in accordance with JIS A-6850 for the tensile adhesion testing method. The results are given in Table Z1.

Reference Examples Z1 to Z3

The isobutene polymer was prepared and tested in each of REFERENCE EXAMPLES Z1 to Z3 in the same manner as in corresponding EXAMPLE Z1, Z2 or Z3, except that the silyl-containing copolymer rubber prepared in PRODUCTION EXAMPLE Z1 was replaced by the isobutene polymer with a group containing reactive silicon at both terminals, prepared according to the method disclosed by Japanese Patent Laid-open Publication No. 209540/1999 (paragraphs 0041 to 0050). The results are given in Table Z1, together with the results of the curing speed and weather resistance tests.

The curing speed and resistance to weather were measured by the following methods.

1) Curing Speed

Each of the compositions comprising the major ingredient and catalyst as described above was measured for curing speed (film expandability) at room temperature by the following method:

The composition was cured in a chamber kept at 23° C. and 50% RH for 24 hours in a mold (20 by 80 by 5 mm in size), and then released from the mold. Thickness of the cured portion was measured by a dial gauge of weak spring force to 0.1 mm.

<Evaluation Standards for Curing Speed>
×: The cured portion was less than 1 mm thick.
○: The cured portion was 1 mm thick or more.

2) Weather Resistance Test

The accelerated weather resistance test was conducted in accordance with JIS B-7753 under the following conditions:
Analyzer: Sunshine Carbon Arc weatherometer
Light irradiation/rainfall cycles: Irradiation for 120 minutes/rainfall for 18 minutes
Black panel temperature: 63±2° C.
Tank inside temperature: 40±2° C.
Total light irradiation time: 500 hours The tested test piece was visually observed, to evaluate its resistance to weather according to the following three grades:

TABLE Z1

|  |  | Max.tensile stress Tmax (kgf/cm$^2$) | Elongation at the max. load Emax (%) | Curing speed | Resistance to weather |
| --- | --- | --- | --- | --- | --- |
| EXAMPLE Z1 | 1 | 2.1 | 90 | ○ | ○ |
|  | 2 | 1.9 | 100 |  |  |
|  | average | 2.0 | 95 |  |  |
| EXAMPLE Z2 | 1 | 2.0 | 76 | ○ | ○ |
|  | 2 | 1.8 | 84 |  |  |
|  | average | 1.9 | 80 |  |  |
| EXAMPLE Z3 | 1 | 1.8 | 55 | — | — |
|  | 2 | 1.6 | 65 |  |  |
|  | average | 1.7 | 60 |  |  |
| COMPARATIVE EXAMPLE Z1 | 1 | 1.2 | 45 | X | Δ |
|  | 2 | 1.4 | 35 |  |  |
|  | average | 1.3 | 40 |  |  |
| REFERENCE EXAMPLE Z1 | 1 | 2.1 | 32 | X | Δ |
|  | 2 | 2.1 | 28 |  |  |
|  | average | 2.1 | 30 |  |  |
| REFERENCE EXAMPLE Z2 | 1 | 1.5 | 12 | X | Δ |
|  | 2 | 1.7 | 8 |  |  |
|  | average | 1.6 | 10 |  |  |

TABLE Z1-continued

|  |  | Max.tensile stress Tmax (kgf/cm$^2$) | Elongation at the max. load Emax (%) | Curing speed | Resistance to weather |
|---|---|---|---|---|---|
| REFERENCE EXAMPLE Z3 | 1 | 1.6 | 18 | — | — |
|  | 2 | 1.6 | 22 |  |  |
|  | average | 1.6 | 20 |  |  |

○: No cracks or molten portion observed
Δ: Cracks or molten portion observed slightly
X: Cracks or molten portion observed Example Z4 and Reference Example Z4

The cured sheet of about 2 mm thickness was prepared using the composition produced in each of EXMPLE Z1 and REFERENCE EXAMPLE Z1. The cured sheet was stamped out into the No. 3 dumbbell-shaped test piece in accordance with JIS K-6301. The results of tensile test are shown in Table Z2 (EXAMPLE Z4) and Table Z3 (REFERENCE EXAMPLE Z4), respectively. The test piece was cured at 23° C. for 7 days and at 50° C. for another 7 days, and then taken out for measurement of H-type mechanical characteristics.

The test was conducted at a stretching speed of 200 mm/min in a thermostat kept at 23, 50 and 70° C. according to the method of the tensile test specified by JIS K-6301.

The invention claimed is:

1. A curable composition comprising a silyl-containing ethylene/α-olefin/non-conjugated polyene random copolymer rubber (A1) which has a structural unit derived from a norbomene compound, represented by the following general formula [I] or [II], as the non-conjugated polyene with at least one specific vinyl group at the terminal, and containing a hydrolyzable silyl group, represented by general formula [III], and

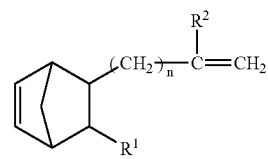

[I]

wherein, "n" is an integer of 0 to 10;

TABLE Z2

| EXAMPLE Z4 |  | 50% Tensile stress M50 (kgf/cm$^2$) | 100% Tensile stress M100 (kgf/cm$^2$) | Max.tensile stress Tmax (kgf/cm$^2$) | Elongation at the max. load Emax (%) |
|---|---|---|---|---|---|
| 23 (° C.) | 1 | 1.1 | 1.6 | 10.0 | 560 |
|  | 2 | 0.9 | 1.5 | 10.5 | 480 |
|  | 3 | 1.0 | 1.7 | 9.5 | 520 |
|  | Average | 1.0 | 1.6 | 10.0 | 520 |
| 50 (° C.) | 1 | 0.9 | 1.5 | 4.5 | 390 |
|  | 2 | 0.7 | 1.5 | 5.5 | 370 |
|  | 3 | 0.8 | 1.2 | 5.0 | 380 |
|  | Average | 0.8 | 1.4 | 5.0 | 380 |
| 70 (° C.) | 1 | 0.8 | 1.5 | 4.1 | 340 |
|  | 2 | 0.8 | 1.5 | 4.0 | 340 |
|  | 3 | 0.7 | 1.4 | 3.9 | 320 |
|  | Average | 0.8 | 1.5 | 4.0 | 330 |

TABLE Z3

| REFERENCE EXAMPLE Z4 |  | 50% Tensile stress M50 (kgf/cm$^2$) | 100% Tensile stress M100 (kgf/cm$^2$) | Max.tensile stress Tmax (kgf/cm$^2$) | Elongation at the max. load Emax (%) |
|---|---|---|---|---|---|
| 23 (° C.) | 1 | 1.0 | 1.7 | 9.2 | 410 |
|  | 2 | 1.1 | 1.7 | 11.0 | 480 |
|  | 3 | 1.2 | 1.9 | 11.7 | 470 |
|  | Average | 1.1 | 1.8 | 10.6 | 450 |
| 50 (° C.) | 1 | 0.9 | 1.5 | 4.4 | 310 |
|  | 2 | 0.8 | 1.5 | 5.1 | 320 |
|  | 3 | 1.0 | 1.7 | 5.8 | 330 |
|  | Average | 0.9 | 1.5 | 5.1 | 320 |
| 70 (° C.) | 1 | 1.0 | 1.7 | 5.0 | 330 |
|  | 2 | 0.9 | 1.6 | 4.4 | 300 |
|  | 3 | 0.9 | 1.5 | 3.5 | 260 |
|  | Average | 0.9 | 1.6 | 4.3 | 300 |

$R^1$ is a hydrogen atom or an alkyl group of 1 to 10 carbon atoms; and $R^2$ is a hydrogen atom or an alkyl group of 1 to 5 carbon atoms,

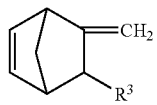
[II]

wherein, $R^3$ is a hydrogen atom or an alkyl group of 1 to 10 carbon atoms,

[III]

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, mercapto, alkenyloxy, thioalkoxy and amino group; and "a" is an integer of 0 to 2, wherein the rubber (A1) is produced by hydrosilylation, whereby said ethylene/α-olefin/non-conjugated polyene random copolymer rubber is reacted with a silicon compound represented by the following general formula [IV] in the presence of a transition metal complex catalyst:

[IV]

where R and "a" are as defined above; and a compound (B), other than the rubber (A1), having a hydroxyl group and/or a hydrolyzable group.

2. A curable, elastic composition comprising a silyl-containing ethylene/α/non-conjugated polyene random copolymer rubber (A1) which has a structural unit derived from a norbornene compound, represented by the following general formula [I] or [III], as the non-conjugated polyene with at least one specific vinyl group at the terminal, and containing a hydrolyzable silyl group, represented by the following general formula [III], and

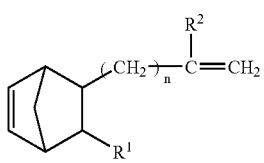
[I]

wherein, "n" is an integer of 0 to 10;

$R^1$ is a hydrogen atom or an alkyl group of 1 to 10 carbon atoms; and $R^2$ is a hydrogen atom or an alkyl group of 1 to 5 carbon atoms,

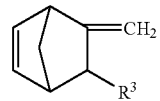
[II]

wherein, $R^3$ is a hydrogen atom or an alkyl group of 1 to 10 carbon atoms,

[III]

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, mercapto, alkenyloxy, thioalkoxy and amino group; and "a" is an integer of 0 to 2, wherein the rubber (A1) is produced by hydrosilylation, whereby said ethylene/α-olefin/non-conjugated polyene random copolymer rubber is reacted with a silicon compound represented by the following general formula [IV] in the presence of a transition metal complex catalyst:

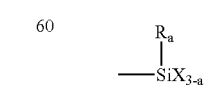
[IV]

wherein R and "a" are as defined above; and a compound (B1) having a silanol group and/or a compound which can react with moisture to form a compound having a silanol group in the molecule.

3. A curable rubber composition comprising a silyl-containing ethylene/α-olefin/non-conjugated polyene random copolymer rubber (A1) which has a structural unit derived from a norbornene compound, represented by the following general formula [I] or [III], as the non-conjugated polyene with at least one specific vinyl group at the terminal, and containing a hydrolyzable silyl group, represented by the following general formula [III],

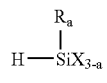
[III]

wherein, "n" is an integer of 0 to 10;

$R^1$ is a hydrogen atom or an alkyl group of 1 to 10 carbon atoms; and $R^2$ is a hydrogen atom or an alkyl group of 1 to 5 carbon atoms,

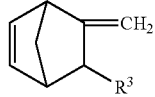   [II]

wherein, $R^3$ is a hydrogen atom or an alkyl group of 1 to 10 carbon atoms,

   [III]

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, mercapto, alkenyloxy, thioalkoxy and amino group; and "a" is an integer of 0 to 2, wherein the rubber (A1) is produced by hydrosilylation, whereby said ethylene/α-olefin/non-conjugated polyene random copolymer rubber is reacted with a silicon compound represented by the following general formula [IV] in the presence of a transition metal complex catalyst:

   [IV]

wherein R and "a" are as defined above;
a tetravalent tin compound (C), and
a silicon compound (B2) represented by the following general formula [V]:

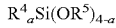   [V]

wherein, $R^4$ and $R^5$ are each a substituted or unsubstituted hydrocarbon group of 1 to 20 carbon atoms, and "a" is 0, 1, 2, or 3.

4. A curable composition comprising
(a) a silyl-containing ethylene/α-olefin/non-conjugated polyene random copolymer rubber (A1) which has a structural unit derived from a norbornene compound, represented by the following general formula [I] or [II], as the non-conjugated polyene with at least one specific vinyl group at the terminal, and containing a hydrolyzable silyl group, represented by the following general formula [III],

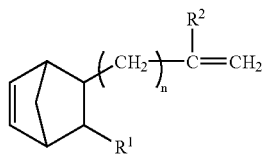   [I]

wherein, "n" is an integer of 0 to 10;

$R^1$ is a hydrogen atom or an alkyl group of 1 to 10 carbon atoms; and $R^2$ is a hydrogen atom or an alkyl group of 1 to 5 carbon atoms,

   [III]

wherein, $R^3$ is a hydrogen atom or an alkyl group of 1 to 10 carbon atoms,

   [III]

wherein, R is a monovalent hydrocarbon group of 1 to 12 carbon atoms; X is a hydrolyzable group selected from the group consisting of hydride, halogen, mercapto, alkenyloxy, alkoxyl, acyloxy, ketoximate, amide, acid amide, aminoxy, thioalkoxy and amino group; and "a" is an integer of 0 to 2, and (b) a silicon compound (B3) having at least one amino group and at least one trialkylsiloxy group in the molecule.

5. A curable composition comprising
(a) a silyl-containing ethylene/α-olefin/non-conjugated polyene random copolymer rubber (A1) which has a structural unit derived from a norbornene compound, represented by the following general formula [I] or [II], as the non-conjugated polyene with at least one specific vinyl group at the terminal, and containing a hydrolyzable silyl group, represented by the following general formula [III],

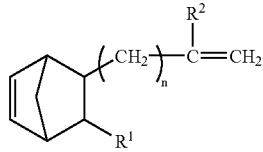   [I]

wherein, "n" is an integer of 0 to 10;

$R^1$ is a hydrogen atom or an alkyl group of 1 to 10 carbon atoms; and $R^2$ is a hydrogen atom or an alkyl group of 1 to 5 carbon atoms,

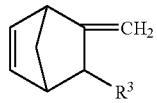   [II]

wherein, $R^3$ is a hydrogen atom or an alkyl group of 1 to 10 carbon atoms,

wherein, R is a monovalent hydrocarbon group of 1 to 12 carbon atoms; X is a hydrolyzable group selected from the group consisting of hydride, halogen, mercapto, alkenyloxy, alkoxyl, acyloxy, ketoximate, amide, acid amide, aminoxy, thioalkoxy and amino group; and "a" is an integer of 0 to 2, and (b) an organosilicon compound (B4) represented by the following general formula [VI]:

$(R^2(CH_3)_2SiO)_nR^1$     [VI]

wherein, $R^1$ is an alcohol residue or a weak acid residue, $R^2$ is a methyl or vinyl group, and "n" is a positive integer.

6. A rubber composition curable at an ordinary temperature and comprising a silyl-containing ethylene/α-olefin/non-conjugated polyene random copolymer rubber (A1) which has a structural unit derived from a norbornene compound, represented by the following general formula [I] or [II], as the non-conjugated polyene with at least one specific vinyl group at the tenninal, and containing a hydrolyzable silyl group, represented by the following general formula [III],

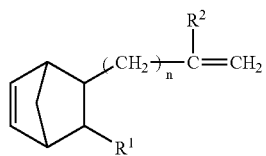

wherein, "n" is an integer of 0 to 10;

$R^1$ is a hydrogen atom or an alkyl group of 1 to 10 carbon atoms; and $R^2$ is a hydrogen atom or an alkyl group of 1 to 5 carbon atoms,

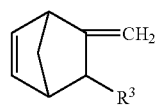

wherein, $R^3$ is a hydrogen atom or an alkyl group of 1 to 10 carbon atoms,

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, mercapto, alkenyloxy, thioalkoxy and amino group; and "a" is an integer of 0 to 2, and a silane compound (B5) represented by one of the following general formulae [VII-1] to [VII-6]:

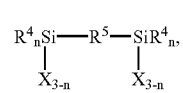

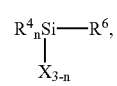

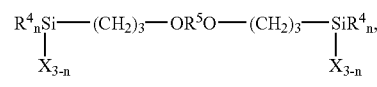

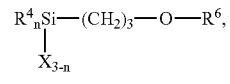

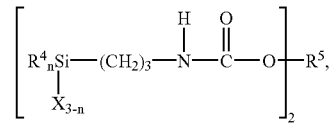

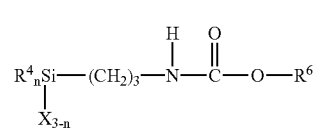

wherein, $R^4$ is a monovalent hydrocarbon group of 1 to 10 carbon atoms, selected from the group consisting of alkyl, aralkyl and aryl;

X is a group selected from the group consisting of halogen, hydroxy, alkoxyl, acyloxy, aminoxy, phenoxy, thioalkoxy, amino, ketoximate, mercapto and alkenyloxy; $R^5$ is an alkylene or arylene group of 8 to 200 carbon atoms; $R^6$ is a monovalent alkyl group of 8 to 200 carbon atoms; and "n" is an integer of 0 to 2.

7. A curable rubber composition comprising, as the active components, (A1) a silyl-containing ethylene/α-olefin/non-conjugated polyene random copolymer rubber which has a structural unit derived from a norbornene compound, represented by the following general formula [I] or [II], as the non-conjugated polyene with at least one specific vinyl group at the terminal, and containing a hydrolyzable silyl group, represented by the following general formula [III],

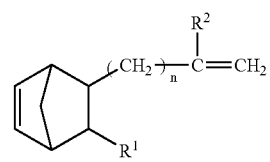

wherein, "n" is an integer of 0 to 10;

$R^1$ is a hydrogen atom or an alkyl group of 1 to 10 carbon atoms; and $R^2$ is a hydrogen atom or an alkyl group of 1 to 5 carbon atoms, the following general formula [I] or [II], as the non-conjugated polyene with at least one specific vinyl group at the terminal, and containing a hydrolyzable silyl group, represented by the following general formula [III],

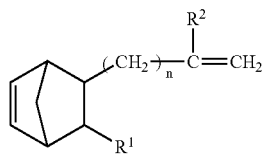

[I]

wherein, "n" is an integer of 0 to 10;
$R^1$ is a hydrogen atom or an alkyl group of 1 to 10 carbon atoms; and
$R^2$ is a hydrogen atom or an alkyl group of 1 to 5 carbon atoms,

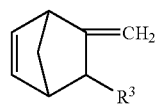

[II]

wherein, $R^3$ is a hydrogen atom or an alkyl group of 1 to 10 carbon atoms,

[III]

wherein, R is a monovalent hydrocarbon group of 1 to 12 carbon atoms; X is a hydrolyzable group selected from the group consisting of hydride, halogen, mercapto, alkenyloxy, alkoxyl, acyloxy, ketoximate, amide, acid amide, aminoxy, thioalkoxy and amino

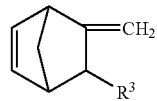

[II]

wherein, $R^3$ is a hydrogen atom or an alkyl group of 1 to 10 carbon atoms,

[III]

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, mercapto, alkenyloxy, thioalkoxy and amino group; and "a" is an integer of 0 to 2, (D) amines selected from the group consisting of aliphatic amines, alicyclic amines, modified cycloaliphatic polyamines and ethanolamines, (B6) a silane coupling agent represented by the general formula $Y_3(Si)Z$, wherein Y is an alkoxyl group; and Z is an alkyl group containing a functional group selected from the group consisting of amino group, which may be substituted with an aminoalkyl group or not, and mercapto group, and (E) a resin composed of a lacquer-based paint, an acrylic lacquer-based paint, an acrylic resin-based paint, a thermosetting acrylic paint, an alkyd paint, a melamine paint, an epoxy paint or organopolysiloxane.

8. A curable composition comprising,
(a) a silyl-containing ethylene/α-olefin/non-conjugated polyene random copolymer rubber (A1) which has a structural unit derived from a norbornene compound, represented by group; and "a" is an integer of 0 to 2, wherein the rubber (A1) is produced by hydrosilylation, whereby said ethylene/α-olefin/non-conjugated polyene random copolymer rubber is reacted with a silicon compound represented by the following general formula [IV] in the presence of a transition metal complex catalyst:

[IV]

wherein R and "a" are as defined above; and
(b) a silane-based compound (B7) substituted with an amino group.

9. A curable composition comprising,
(A1) a silyl-containing ethylene/α-olefin/non-conjugated polyene random copolymer rubber which has a structural unit derived from a norbornene compound, represented by the following general formula [I] or [II], as the non-conjugated polyene with at least one specific vinyl group at the terminal, and containing a hydrolyzable silyl group, represented by the following general formula [III],

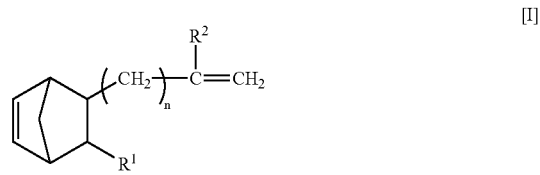

[I]

wherein, "n" is an integer of 0 to 10;
$R^1$ is a hydrogen atom or an alkyl group of 1 to 10 carbon atoms; and
$R^2$ is a hydrogen atom or an alkyl group of 1 to 5 carbon atoms,

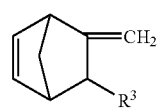

[II]

wherein, $R^3$ is a hydrogen atom or an alkyl group of 1 to 10 carbon atoms,

[III]

wherein, R is a monovalent hydrocarbon group of 1 to 12 carbon atoms; X is a hydrolyzable group selected from the group consisting of hydride, halogen, mercapto, alkenyloxy, alkoxyl, acyloxy, ketoximate, amide, acid amide, aminoxy, thioalkoxy and amino group; and "a" is an integer of 0 to 2, and (F) a filler, (G) a plasticizer, (H) a curing catalyst and (B8) an organocarboxylic acid compound.

10. A curable rubber composition comprising, a silyl-containing ethylene/α-olefin/non-conjugated polyene random copolymer rubber (A1) which has a structural unit derived from a norbornene compound, represented by the following general formula [I] or [II], as the non-conjugated polyene with at least one specific vinyl group at the terminal, and containing a hydrolyzable silyl group, represented by the following general formula [III],

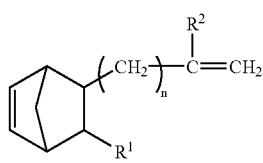

[I]

wherein, "n" is an integer of 0 to 10;
$R^1$ is a hydrogen atom or an alkyl group of 1 to 10 carbon atoms; and
$R^2$ is a hydrogen atom or an alkyl group of 1 to 5 carbon atoms,

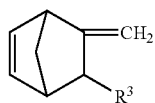

[II]

wherein, $R^3$ is a hydrogen atom or an alkyl group of 1 to 10 carbon atoms,

[III]

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, mercapto, alkenyloxy, thioalkoxy and amino group; and "a" is an integer of 0 to 2, wherein the rubber (A1) is produced by hydrosilylation, whereby said ethylene/α-olefin/non-conjugated polyene random copolymer rubber is reacted with a silicon compound represented by the following general formula [IV] in the presence of a transition metal complex catalyst:

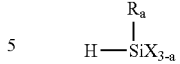

[IV]

wherein R and "a" are as defined above;
alcohols (B9) and/or a hydrolyzable ester (I) (except the hydrolyzable organosilicon compound (B10), and
a hydrolyzable organosilicon compound (B10) other than the rubber (A1).

11. A two- or more multi-liquid type curable rubber composition composed of at least two liquids, comprising a major ingredient (I) containing a silyl-containing ethylene/α-olefin/non-conjugated polyene random copolymer rubber (A1) which has a structural unit derived from a norbornene compound, represented by the following general formula [I] or [II], as the non-conjugated polyene with at least one specific vinyl group at the terminal, and containing a hydrolyzable silyl group, represented by the following general formula [III],

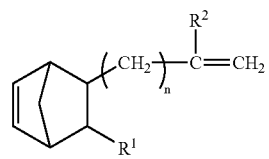

[I]

wherein, "n" is an integer of 0 to 10;
$R^1$ is a hydrogen atom or an alkyl group of 1 to 10 carbon atoms; and
$R^2$ is a hydrogen atom or an alkyl group of 1 to 5 carbon atoms,

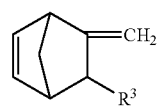

[II]

wherein, $R^3$ is a hydrogen atom or an alkyl group of 1 to 10 carbon atoms,

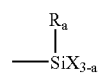

[III]

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, mercapto, alkenyloxy, thioalkoxy and amino group; and "a" is an integer of 0 to 2, wherein the rubber (A1) is produced by hydrosilylation, whereby said ethylene/α-olefin/non-conjugated polyene random copolymer rubber is reacted with a silicon compound represented by the following general formula [IV] in the presence of a transition metal complex catalyst:

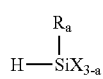

[IV]

wherein R and "a" are as defined above; and
a curing agent (II) containing asilanol condensing catalyst (J) and water or a hydrate of a metallic salt (B11).

12. A curable rubber composition comprising
a silyl-containing ethylene/α-olefin/non-conjugated polyene random copolymer rubber (A2) containing a hydrolyzable silyl group, represented by the following general formula (1):

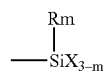

(1)

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, thioalkoxy, amino, mercapto and alkenyloxy group; and "m" is an integer of 0 to 2, and an inorganic filler (L), wherein the rubber (A2) is produced by hydrosilylation, whereby said ethylene/α-olefin/non-conjugated polyene random copolymer rubber is reacted with a silicon compound represented by the following general formula (6) in the presence of a transition metal complex catalyst:

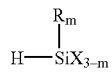

(6)

where R and "m" are as defined above.

13. A rubber composition comprising
a silyl-containing ethylene/α-olefin/non-conjugated polyene random copolymer rubber (A2) containing a hydrolyzable silyl group, represented by the following general formula (1):

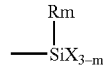

(1)

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, thioalkoxy, amino, mercapto and alkenyloxy group; and "m" is an integer of 0 to 2, and (K1) an organosilicon polymer.

14. A rubber composition comprising
(A2) a silyl-containing ethylene/α-olefin/non-conjugated polyene random copolymer rubber containing a hydrolyzable silyl group, represented by the following general formula (1):

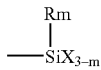

(1)

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, thioalkoxy, amino, mercapto and alkenyloxy group; and "m" is an integer of 0 to 2, (K2) organic rubber which is at least one rubber selected from the group consisting of propylene glycol-based rubber containing a hydrolysable silyl group, polyisobutylene-based rubber containing a hydrolysable silyl group, natural rubber, polyisoprene, polybutadiene polychloroprene, acrylic rubber, acrylonitrile/butadiene copolymer rubber, ethylene/propylene copolymer rubber (EPM), ethylene/propylene/non-conjugated polyene copolymer rubber (EPDM), butyl rubber, urethane rubber, silicone rubber, epichlorohydrin rubber, ethylene/vinyl acetate copolymer rubber, ethylene/acrylic copolymer rubber, fluorine rubber and chlorosulfonated polyethylene, and (M) a crosslinking agent for the organic rubber (K2).

15. A rubber composition comprising
(A2) a silyl-containing ethylene/α-olefin/non-conjugated polyene random copolymer rubber containing a hydrolyzable silyl group, represented by the following general formula (1):

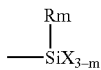

(1)

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, thioalkoxy, amino, mercapto and alkenyloxy group; and "m" is an integer of 0 to 2, (K3) an epoxy resin,
(N) a silane coupling agent,
(O) a silanol condensing catalyst, and
(P) a curing agent for the epoxy resin.

16. A rubber composition comprising
(A2) a silyl-containing ethylene/μ-olefin/non-conjugated polyene random copolymer rubber containing a hydrolyzable silyl group, represented by the following general formula (1):

(1)

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, thioalkoxy, amino, mercapto and alkenyloxy group; and "m" is an integer of 0 to 2, (K3) an epoxy resin,
(Q) a silicon compound containing a functional group reactive with an epoxy group and a hydrolyzable silyl group in the molecule, and
(R) a silicon compound containing at least two hydroxyl groups bonded to the silicon atom in the molecule.

17. A rubber composition comprising
(A2) a silyl-containing ethylene/α-olefin/non-conjugated polyene random copolymer rubber containing a hydrolyzable silyl group, represented by the following general formula (1):

(1)

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, thioalkoxy, amino, mercapto and alkenyloxy group; and "m" is an integer of 0 to 2, wherein the rubber (A2) is produced by hydrosilylation, whereby said ethylene/α-olefin/non-conjugated polyene random copolymer rubber is reacted with a silicon compound represented by the following general formula (6) in the presence of a transition metal complex catalyst:

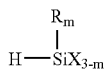
(6)

wherein R and "m" are as defined above;
(L1) calcium carbonate, and
(L2) talc.

18. The rubber composition according to any one of claims 13 to 17, wherein said silyl-containing ethylene/α-olefin/non-conjugated polyene random copolymer rubber (A2) has at least one type of silyl group containing units represented by the following general formula (2) or (3):

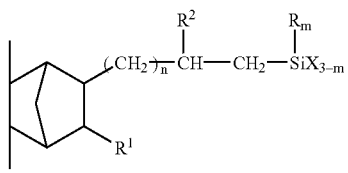
(2)

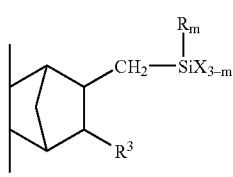
(3)

wherein, R is a monovalent hydrocarbon group of 1 to 12 carbon atoms; $R^1$ is a hydrogen atom or an alkyl group of 1 to 10 carbon atoms; $R^2$ is a hydrogen atom or an alkyl group of 1 to 5 carbon atoms; $R^3$ is a hydrogen atom or an alkyl group of 1 to 10 carbon atoms; X is a hydrolyzable group selected from the group consisting of hydride, halogen, alkoxyl, acyloxy, ketoximate, amide, acid amide, aminoxy, thioalkoxy, amino, mercapto and alkenyloxy group; and "m" is an integer of 0 to 2 and "n" is an integer of 0 to 10.

19. The rubber composition according to any one of claims 13 to 17, wherein said silyl-containing ethylene/α-olefin/non-conjugated polyene random copolymer rubber (A2) is produced by reacting an ethylene/α-olefin/non-conjugated polyene random copolymer rubber having a norbornene compound as the non-conjugated polyene with at least one terminal vinyl group represented by the following general formula (4) and/or (5):

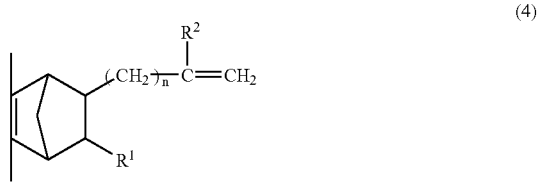
(4)

(5)

wherein, $R^1$ is a hydrogen atom or an alkyl group of 1 to 10 carbon atoms; $R^2$ is a hydrogen atom or an alkyl group of 1 to 5 carbon atoms; $R^3$ is a hydrogen atom or an alkyl group of 1 to 10 carbon atoms; and "n" is an integer of 0 to 10, with a silicon compound represented by the following general formula (6):

(6)

wherein, R is a monovalent hydrocarbon group of 1 to 12 carbon atoms; X is a hydrolysable group selected from the group consisting of hydride, halogen, alkoxyl, acyloxy, ketoximate, amide, acid amide, aminoxy, thioalkoxy, amino, mercapto and alkenyloxy group; and "m" is an integer of 0 to 2,
to add the SiH group of the silicon compound to the double bond of the copolymer rubber.

20. A curable composition comprising
(a) a silyl-containing ethylene/α-olefin/non-conjugated polyene random copolymer rubber (A1) which has a structural unit derived from a norbornene compound, represented by the following general formula [I] or [II], as the non-conjugated polyene with at least one specific vinyl group at the terminal, and containing a hydrolyzable silyl group, represented by the following general formula [III], and

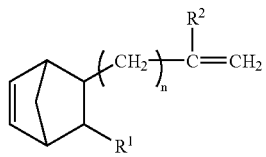   [I]

wherein, "n" is an integer of 0 to 10;
R¹ is a hydrogen atom or an alkyl group of 1 to 10 carbon atoms; and
R² is a hydrogen atom or an alkyl group of 1 to 5 carbon atoms,

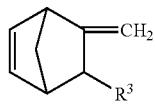   [II]

wherein, R³ is a hydrogen atom or an alkyl group of 1 to 10 carbon atoms,

   [III]

wherein, R is a monovalent hydrocarbon group of 1 to 12 carbon atoms; X is a hydrolyzable group selected from the group consisting of hydride, halogen, mercapto, alkenyloxy, alkoxyl, acyloxy, ketoximate, amide, acid amide, aminoxy, thioalkoxy and amino group; and "a" is an integer of 0 to 2,
(b) a nickel-containing light stabilizer (S) and
(c) a silane coupling agent (T).

21. A curable rubber composition comprising
a silyl-containing ethylene/α-olefin/non-conjugated polyene random copolymer rubber (A1) which has a structural unit derived from a norbornene compound, represented by the following general formula [I] or [II], as the non-conjugated polyene with at least one specific vinyl group at the terminal, and containing a hydrolyzable silyl group, represented by the following general formula [III], and

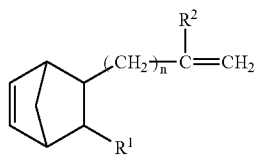   [I]

wherein, "n" is an integer of 0 to 10;
R¹ is a hydrogen atom or an alkyl group of 1 to 10 carbon atoms; and
R² is a hydrogen atom or an alkyl group of 1 to 5 carbon atoms,

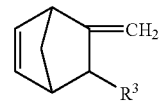   [II]

wherein, R³ is a hydrogen atom or an alkyl group of 1 to 10 carbon atoms,

   [III]

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, mercapto, alkenyloxy, thioalkoxy and amino group; and "a" is an integer of 0 to 2, and
a sulfur-based aging inhibitor (U).

22. A curable composition comprising
(A1) a silyl-containing ethylene/α-olefin/non-conjugated polyene random copolymer rubber which has a structural unit derived from a norbornene compound, represented by the following general formula [I] or [II], as the non-conjugated polyene with at least one specific vinyl group at the terminal, and containing a hydrolyzable silyl group, represented by the following general formula [III], and

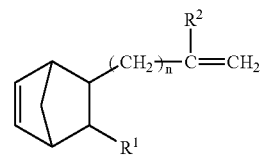   [I]

wherein, "n" is an integer of 0 to 10;
R¹ is a hydrogen atom or an alkyl group of 1 to 10 carbon atoms; and
R² is a hydrogen atom or an alkyl group of 1 to 5 carbon atoms,

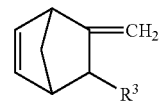   [II]

wherein, R³ is a hydrogen atom or an alkyl group of 1 to 10 carbon atoms,

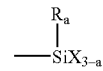   [III]

wherein, R is a monovalent hydrocarbon group of 1 to 12 carbon atoms; X is a hydrolyzable group selected from the group consisting of hydride, halogen, mercapto, alkenyloxy, alkoxyl, acyloxy, ketoximate, amide, acid amide, aminoxy, thioalkoxy and amino group; and "a" is an integer of 0 to 2, and (V) a compound having, in the molecule, an unsaturated group capable of triggering polymerization by reacting with oxygen in air andlor a photopolymerizable material.

23. An adhesive composition comprising a silyl-containing ethylene/α-olefin/non-conjugated polyene random copolymer rubber (A1) which has a structural unit derived from a norbomene compound, represented by the following general formula [I] or [II], as the non-conjugated polyene with at least one specific vinyl group at the terminal, and containing a hydrolyzable silyl group, represented by the following general formula [III], and

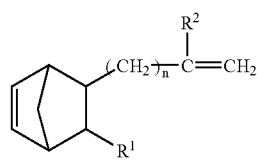

[I]

wherein, "n" is an integer of 0 to 10;

$R^1$ is a hydrogen atom or an alkyl group of 1 to 10 carbon atoms; and $R^2$ is a hydrogen atom or an alkyl group of 1 to 5 carbon atoms,

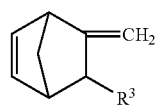

[II]

wherein, $R^3$ is a hydrogen atom or an alkyl group of 1 to 10 carbon atoms,

[III]

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, mercapto, alkenyloxy, thioalkoxy and amino group; and "a" is an integer of 0 to 2, a tackiness imparting resin (W), and a curing catalyst (H) composed of an organozirconium compound (H1) represented by the following general formula [VIII] or an organoaluminum compound (H2) represented by the following general formula [IX]:

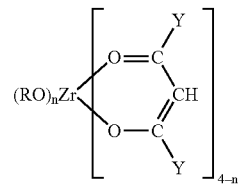

[VIII]

wherein, "n" is an integer of 0 to 4,

R is a monovalent hydrocarbon group of 1 to 20 carbon atoms, and

Y is a group selected from the group consisting of hydrocarbon of 1 to 8 carbon atoms, halogenated hydrocarbon, cyanoalkyl, alkoxyl, halogenated alkoxyl, cyanoalkoxy and amino group, which may be the same or different, and

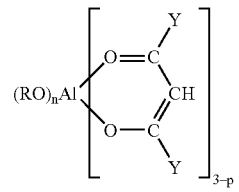

[IX]

wherein, "p" is an integer of 0 to 3,

R is a monovalent hydrocarbon group of 1 to 20 carbon atoms, and

Y is a group selected from the group consisting of hydrocarbon of 1 to 8 carbon atoms, halogenated hydrocarbon, cyanoalkyl, alkoxyl, halogenated alkoxyl, cyanoalkoxy and amino group, which may be the same or different.

24. A rubber composition of improved pot life, comprising a silyl-containing ethylene/α-olefin/non-conjugated polyene random copolymer rubber (A1) which has a structural unit derived from a norbornene compound, represented by the following general formula [I] or [II], as the non-conjugated polyene with at least one specific vinyl group at the terminal, and containing a hydrolyzable silyl group, represented by the following general formula [III], and

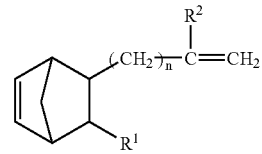

[I]

wherein, "n" is an integer of 0 to 10;

$R^1$ is a hydrogen atom or an alkyl group of 1 to 10 carbon atoms; and $R^2$ is a hydrogen atom or an alkyl group of 1 to 5 carbon atoms,

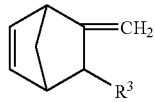

[II]

wherein, $R^3$ is a hydrogen atom or an alkyl group of 1 to 10 carbon atoms,

[III]

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, mercapto, alkenyloxy, thioalkoxy and amino group; and "a" is an integer of 0 to 2, a curing catalyst (H) composed of a mercaptide type organotin compound (H3) having the Sn—S bond, a sulfide type organotin compound (H4) having the Sn=S bond, organocarboxylic acid (H5), organocarboxylic anhydride (H6), or a mixture of one of the above compounds and a carboxylic type organotin compound (H7).

25. A curable composition comprising (A1) a silyl-containing ethylene/α-olefin/non-conjugated polyene random copolymer rubber which has a structural unit derived from a norbornene compound, represented by the following general formula [I] or [II], as the non-conjugated polyene with at least one specific vinyl group at the terminal, and containing a hydrolyzable silyl group, represented by the following general formula [III], and

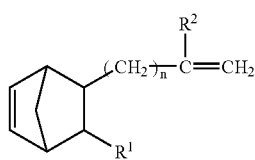

[I]

wherein, "n" is an integer of 0 to 10;
$R^1$ is a hydrogen atom or an alkyl group of 1 to 10 carbon atoms; and
$R^2$ is a hydrogen atom or an alkyl group of 1 to 5 carbon atoms,

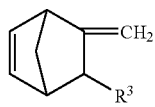

[II]

wherein, $R^3$ is a hydrogen atom or an alkyl group of 1 to 10 carbon atoms,

[III]

wherein, R is a monovalent hydrocarbon group of 1 to 12 carbon atoms; X is a hydrolyzable group selected from the group consisting of hydride, halogen, mercapto, alkenyloxy, alkoxyl, acyloxy, ketoximate, amide, acid amide, aminoxy, thioalkoxy and amino group; and "a" is an integer of 0 to 2, wherein the rubber (A1) is produced by hydrosilylation, whereby said ethylene/α-olefin/non-conjugated polyene random copolymer rubber is reacted with a silicon compound represented by the following general formula [IV] in the presence of a transition metal complex catalyst:

[IV]

wherein R and "a" are as defined above; and (H8) a compound as a curing catalyst (H), represented by the general formula $Q_2Sn(OZ)_2$ or $[Q_2Sn(OZ)]_2O$, wherein, Q is a monovalent hydrocarbon group of 1 to 20 carbon atoms; and Z is a monovalent hydrocarbon group of 1 to 20 carbon atoms or an organic group having a functional group capable of forming therein a coordination bond with Sn.

26. A curable rubber composition comprising a silyl-containing ethylene/α-olefin/non-conjugated polyene random copolymer rubber (A1) which has a structural unit derived from a norbornene compound, represented by the following general formula [I] or [II], as the non-conjugated polyene with at least one specific vinyl group at the terminal, and containing a hydrolyzable silyl group, represented by the following general formula [III], and

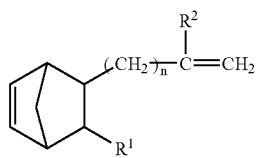

[I]

wherein, "n" is an integer of 0 to 10;
$R^1$ is a hydrogen atom or an alkyl group of 1 to 10 carbon atoms; and
$R^2$ is a hydrogen atom or an alkyl group of 1 to 5 carbon atoms,

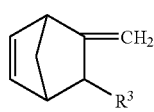

[II]

wherein, $R^3$ is a hydrogen atom or an alkyl group of 1 to 10 carbon atoms,

[III]

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, mercapto, alkenyloxy, thioalkoxy and amino group; and "a" is an integer of 0 to 2, wherein the rubber (A1) is produced by hydrosilylation, whereby said ethylene/α-olefin/non-conjugated polyene random copolymer rubber is reacted with a silicon compound represented by the following general formula [IV] in the presence of a transition metal complex catalyst:

[IV]

wherein R and "a" are as defined above; and titanates (Y).

27. A sealant for laminated glass, comprising (A2) a silyl-containing ethylene/α-olefin/non-conjugated polyene random copolymer rubber containing a hydrolyzable silyl group, represented by the following general formula (1):

(1)

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, thioalkoxy, amino, mercapto and alkenyloxy group; and "m" is an integer of 0 to 2, wherein the rubber (A2) is produced by hydrosilylation, whereby said ethylene/α-olefin/non-conjugated polyene random copolymer rubber is reacted with a silicon compound represented by the following general formula (6) in the presence of a transition metal complex catalyst:

(6)

wherein R and "m" are as defined above;

(H) a curing catalyst, and (B11) water or a hydrate of a metallic salt.

28. A sealant for laminated glass, comprising (A2) a silyl-containing ethylene/α-olefin/non-conjugated polyene random copolymer rubber containing a hydrolyzable silyl group, represented by the following general formula (1):

(1)

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, thioalkoxy, amino, mercapto and alkenyloxy group; and "m" is an integer of 0 to 2, (X) a hot melt resin, (H) a curing catalyst, and (B11) water or a hydrate of a metallic salt.

29. The sealant for laminated glass according to claim 27 or 28, wherein said silyl-containing ethylene/α-olefin/non-conjugated polyene random copolymer rubber (A2) has at least one type of silyl-containing units represented by the general formula (2) or (3):

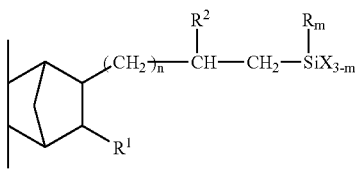

(2)

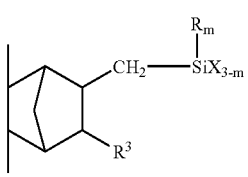

(3)

wherein, R is a monovalent hydrocarbon group of 1 to 12 carbon atoms; $R^1$ is a hydrogen atom or an alkyl group of 1 to 10 carbon atoms; $R^2$ is a hydrogen atom or an alkyl group of 1 to 5 carbon atoms; $R^3$ is a hydrogen atom or an alkyl group of 1 to 10 carbon atoms; X is a hydrolyzable group selected from the group consisting of hydride, halogen, alkoxyl, acyloxy, ketoximate, amide, acid amide, aminoxy, thioalkoxy, amino, mercapto and alkenyloxy group; and "m" is an integer of 0 to 2 and "n" is an integer of 0 to 10.

30. The sealant for laminated glass according to one of claim 27 to 28, wherein said silyl-containing ethylene/α-olefin/non-conjugated polyene random copolymer rubber (A2) is produced by reacting an ethylene/α-olefin/non-conjugated polyene random copolymer rubber having a norbornene compound as the non-conjugated polyene with at least one terminal vinyl group represented by the following general formula (4) and/or (5):

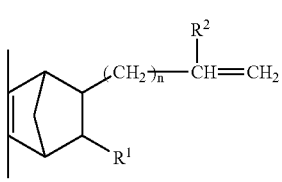

(4)

-continued

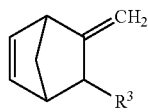
(5)

wherein, $R^1$ is a hydrogen atom or an alkyl group of 1 to 10 carbon atoms; $R^2$ is a hydrogen atom or an alkyl group of 1 to 5 carbon atoms; $R^3$ is a hydrogen atom or an alkyl group of 1 to 10 carbon atoms; and "n" is an integer of 0 to 10, with a silicon compound represented by the following general formula (6):

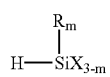
(6)

wherein, R is a monovalent hydrocarbon group of 1 to 12 carbon atoms; X is a hydrolysable group selected from the group consisting of hydride, halogen, alkoxyl, acyloxy, ketoximate, amide, acid amide, aminoxy, thioalkoxy, amino, mercapto and alkenyloxy group; and "m" is an integer of 0 to 2,
to add the SiH group of the silicon compound to the double bond of the copolymer rubber.

31. The rubber composition according to claim 18, wherein said silyl-containing ethylene/α-olefin/non-conjugated polyene random copolymer rubber (A2) is produced by reacting an ethylene/α-olefin/non-conjugated polyene random copolymer rubber having a norbornene compound as the non-conjugated polyene with at least one terminal vinyl group represented by the following general formula (4) and/or (5):

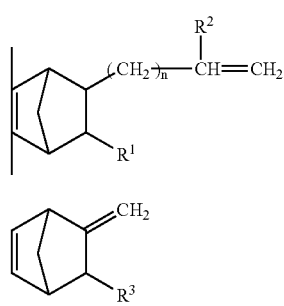

wherein, $R^1$ is a hydrogen atom or an alkyl group of 1 to 10 carbon atoms; $R^2$ is a hydrogen atom or an alkyl group of 1 to 5 carbon atoms; $R^3$ is a hydrogen atom or an alkyl group of 1 to 10 carbon atoms; and "n" is an integer of 0 to 10, with a silicon compound represented by the following general formula (6):

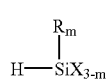
(6)

wherein, R is a monovalent hydrocarbon group of 1 to 12 carbon atoms; X is a hydrolysable group selected from the group consisting of hydride, halogen, alkoxyl, acyloxy, ketoximate, amide, acid amide, aminoxy, thioalkoxy, amino, mercapto and alkenyloxy group; and "m" is an integer of 0 to 2,
to add the SiH group of the silicon compound to the double bond of the copolymer rubber.

32. The rubber composition according to claim 29, wherein said silyl-containing ethylene/α-olefin/non-conjugated polyene random copolymer rubber (A2) is produced by reacting an ethylene/α-olefin/non-conjugated polyene random copolymer rubber having a norbornene compound as the non-conjugated polyene with at least one terminal vinyl group represented by the following general formula (4) andlor (5):

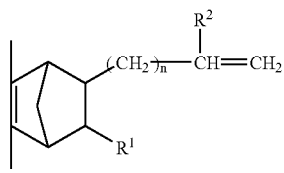
(4)

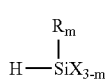
(5)

wherein, $R^1$ is a hydrogen atom or an alkyl group of 1 to 10 carbon atoms; $R^2$ is a hydrogen atom or an alkyl group of 1 to 5 carbon atoms; $R^3$ is a hydrogen atom or an alkyl group of 1 to 10 carbon atoms; and "n" is an integer of 0 to 10, with a silicon compound represented by the following general formula (6):

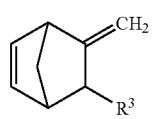
(6)

wherein , R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, thioalkoxy, amino, mercapto and alkenyloxy group; and "m" is an integer of 0 to 2,
to add the SiH group of the silicon compound to the double bond of the copolymer rubber.

33. A curable composition comprising
a silyl-containing ethylene/α-olefin/non-conjugated polyene random copolymer rubber (A1) which has a structural unit derived from a norbornene compound, represented by the following general formula [I] or [II], as the non-conjugated polyene with at least one specific vinyl group at the terminal, and containing a hydrolyzable silyl group, represented by the following general formula [III], and

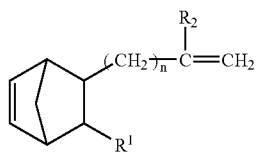

[I]

wherein, "n" is an integer of 0 to 10;

$R^1$ is a hydrogen atom or an alkyl group of 1 to 10 carbon atoms; and $R^2$ is a hydrogen atom or an alkyl group of 1 to 5 carbon atoms,

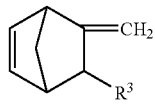

[II]

wherein, $R^3$ is a hydrogen atom or an alkyl group of 1 to 10 carbon atoms,

[III]

wherein, R is a monovalent hydrocarbon group of 1 to 12 carbon atoms; X is a hydrolyzable group selected from the group consisting of hydride, halogen, alkoxyl, acyloxy, ketoximate, amide, acid amide, aminoxy, mercapto, alkenyloxy, thioalkoxy and amino group; and "a" is an integer of 0 to 2, wherein the rubber (A1) is produced by hydrosilylation, whereby said ethylene/α-olefin/non-conjugated polyene random copolymer rubber is reacted with a silicon compound represented by the following general formula [IV] in the presence of a transition metal complex catalyst:

[IV]

wherein R and "a" are as defined above; and a compound (B), other than the rubber (A1), containing silicon and having a hydroxyl group andlor a hydrolyzable group.

34. An electric/electronic device member, transportation machine, civil engineering/construction, medical product or leisure product prepared from the composition of claims 1–17 or 20–26.

35. An electric/electronic device member, transportation machine, civil engineering/construction, medical product or leisure product prepared from the composition of claim 18.

36. An electric/electronic device member, transportation machine, civil engineering/construction, medical product or leisure product prepared from the composition of claim 19.

37. A sealant, potting material, coating material or adhesive for electrical/electronic devices, transportation machines, civil engineering/construction materials, medical products and leisure products prepared from the compositions of claims 1–17 or 20–26.

38. A sealant, potting material, coating material or adhesive for electrical/electronic devices, transportation machines, civil engineering/construction materials, medical products or leisure products prepared from the composition of claim 18.

39. A sealant, potting material, coating material or adhesive for electrical/electronic devices, transportation machines, civil engineering/construction materials, medical products or leisure products prepared from the composition of claim 19.

40. The curable rubber composition according to claim 10, wherein the hydrolysable organosilicon compound (B10) is at least one compound selected from the group consisting of trimethoxysilane, triethoxysilane, methyldiethoxysilane, methyldimethoxysilane, phenyldimethoxysilane, ethyldiethoxysilane, ethyldimethoxysilane, butyldiethoxysilane, butyldimethoxysilane, methyltrimethoxysilane, ethyltrimethoxysilane, butyltrimethoxysilane, phenyltrimethoxysilane, methyltriethoxysilane, ethyltriethoxysilane, butyltriethoxysilane, phenyltriethoxysilane, dimethyldiethoxysilane, dibutyldiethoxysilane, and diphenyldiethoxysilane.

* * * * *